US010875525B2

(12) United States Patent
Lord et al.

(10) Patent No.: US 10,875,525 B2
(45) Date of Patent: Dec. 29, 2020

(54) ABILITY ENHANCEMENT

(71) Applicant: Microsoft Technology Licensing, LLC, Redmond, WA (US)

(72) Inventors: Richard T. Lord, Tacoma, WA (US); Robert W. Lord, Seattle, WA (US); Nathan P. Myhrvold, Medina, WA (US); Clarence T. Tegreene, Bellevue, WA (US); Roderick A. Hyde, Redmond, WA (US); Lowell L. Wood, Bellevue, WA (US); Muriel Y. Ishikawa, Livermore, CA (US); Victoria Y. H. Wood, Livermore, CA (US); Charles Whitmer, North Bend, WA (US); Paramvir Bahl, Bellevue, WA (US); Douglas C. Burger, Bellevue, WA (US); Ranveer Chandra, Kirkland, WA (US); William H. Gates, III, Medina, WA (US); Pablos Holman, Seattle, WA (US); Jordin T. Kare, Seattle, WA (US); Craig J. Mundie, Seattle, WA (US); Tim Paek, Sammamish, WA (US); Desney S. Tan, Kirkland, WA (US); Lin Zhong, Houston, TX (US); Matthew G. Dyor, Bellevue, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 109 days.

(21) Appl. No.: 14/819,237

(22) Filed: Aug. 5, 2015

(65) Prior Publication Data

US 2015/0336578 A1 Nov. 26, 2015

Related U.S. Application Data

(63) Continuation-in-part of application No. 13/434,475, filed on Mar. 29, 2012, now Pat. No. 9,159,236,
(Continued)

(51) Int. Cl.
*G08G 1/16* (2006.01)
*B60W 30/09* (2012.01)
(Continued)

(52) U.S. Cl.
CPC ............... *B60W 30/09* (2013.01); *B60T 7/22* (2013.01); *B60T 17/22* (2013.01); *G08G 1/164* (2013.01);
(Continued)

(58) Field of Classification Search
None
See application file for complete search history.

(56) References Cited

U.S. PATENT DOCUMENTS 5,239,586 A 8/1993 Marui
5,515,026 A 5/1996 Ewert
(Continued)

OTHER PUBLICATIONS

Office Action for U.S. Appl. No. 15/177,535, dated Feb. 10, 2017, Lord et al., "Determining Threats Based on Information From Road-Based Devices in a Transportation-Related Context," 21 pages.
(Continued)

*Primary Examiner* — Masud Ahmed

(57) ABSTRACT

Techniques for ability enhancement are described. In some embodiments, devices and systems located in a transportation network share threat information with one another, in order to enhance a user's ability to operate or function in a transportation-related context. In one embodiment, a process in a vehicle receives threat information from a remote
(Continued)

device, the threat information based on information about objects or conditions proximate to the remote device. The process then determines that the threat information is relevant to the safe operation of the vehicle. Then, the process modifies operation of the vehicle based on the threat information, such as by presenting a message to the operator of the vehicle and/or controlling the vehicle itself.

14 Claims, 342 Drawing Sheets

Related U.S. Application Data which is a continuation-in-part of application No. 13/309,248, filed on Dec. 1, 2011, now Pat. No. 8,811,638, which is a continuation-in-part of application No. 13/324,232, filed on Dec. 13, 2011, now Pat. No. 8,934,652, which is a continuation-in-part of application No. 13/340,143, filed on Dec. 29, 2011, now Pat. No. 9,053,096, which is a continuation-in-part of application No. 13/356,419, filed on Jan. 23, 2012, now abandoned, which is a continuation-in-part of application No. 13/362,823, filed on Jan. 31, 2012, now Pat. No. 9,107,012, which is a continuation-in-part of application No. 13/397,289, filed on Feb. 15, 2012, now Pat. No. 9,245,254, which is a continuation-in-part of application No. 13/407,570, filed on Feb. 28, 2012, now Pat. No. 9,064,152, which is a continuation-in-part of application No. 13/425,210, filed on Mar. 20, 2012, now Pat. No. 9,368,028.

(51) Int. Cl.
*B60T 17/22* (2006.01)
*B60T 7/22* (2006.01)

(52) U.S. Cl.
CPC ..... *B60T 2201/022* (2013.01); *B60T 2210/36* (2013.01); *B60W 2555/00* (2020.02)

(56) References Cited

U.S. PATENT DOCUMENTS 5,983,161 A * 11/1999 Lemelson ............... G01S 19/11 340/436
5,995,898 A 11/1999 Tuttle
6,157,727 A 12/2000 Rueda
6,226,389 B1 5/2001 Lemelson et al.
6,304,648 B1 10/2001 Chang
6,326,903 B1 12/2001 Gross et al.
6,370,475 B1 * 4/2002 Breed .................. B60N 2/2863 340/436
6,466,862 B1 10/2002 DeKock et al.
6,529,866 B1 3/2003 Cope et al.
6,628,767 B1 9/2003 Wellner et al.
6,731,202 B1 5/2004 Klaus
6,944,474 B2 9/2005 Rader et al.
7,009,500 B2 * 3/2006 Rao ....................... B60R 21/013 340/435
7,224,981 B2 5/2007 Deisher et al.
7,324,015 B1 1/2008 Allen et al.
7,606,444 B1 10/2009 Erol et al.
7,783,022 B1 8/2010 Jay et al.
8,050,917 B2 11/2011 Caspi et al.
8,175,297 B1 5/2012 Ho et al.
8,352,245 B1 1/2013 Lloyd
8,369,184 B2 2/2013 Calhoun
8,618,952 B2 12/2013 Mochizuki
8,669,854 B2 3/2014 D'Ambrosio et al.
2002/0021799 A1 2/2002 Kaufholz
2002/0196134 A1 12/2002 Lutter et al.
2003/0009277 A1 1/2003 Fan et al.
2003/0139881 A1 7/2003 Miller et al.
2003/0158900 A1 8/2003 Santos
2004/0064322 A1 4/2004 Georgiopoulos et al.
2004/0100868 A1 5/2004 Patterson et al.
2004/0122678 A1 6/2004 Rousseau
2004/0172252 A1 9/2004 Aoki et al.
2004/0230651 A1 11/2004 Ivashin
2004/0263610 A1 12/2004 Whynot et al.
2005/0010407 A1 1/2005 Jaroker
2005/0018828 A1 1/2005 Nierhaus et al.
2005/0038648 A1 2/2005 Ju et al.
2005/0041529 A1 2/2005 Schliep et al.
2005/0088981 A1 4/2005 Woodruff et al.
2005/0135583 A1 6/2005 Kardos
2005/0207554 A1 9/2005 Ortel
2005/0222769 A1 10/2005 Simon
2006/0080004 A1 4/2006 Cheok et al.
2006/0195850 A1 8/2006 Knight et al.
2007/0118498 A1 5/2007 Song et al.
2007/0138347 A1 6/2007 Ehlers
2008/0061958 A1 3/2008 Birk et al.
2008/0117838 A1 5/2008 Yee et al.
2008/0119993 A1 * 5/2008 Breed ..................... G01S 7/023 701/46
2008/0195387 A1 8/2008 Zigel et al.
2008/0270132 A1 10/2008 Navratil et al.
2008/0300777 A1 12/2008 Fehr et al.
2009/0040037 A1 2/2009 Schraga
2009/0070102 A1 3/2009 Maegawa
2009/0119324 A1 5/2009 Simard et al.
2009/0198735 A1 8/2009 Yu et al.
2009/0204620 A1 8/2009 Thione et al.
2009/0271176 A1 10/2009 Bodin et al.
2009/0281789 A1 11/2009 Waibel et al.
2009/0282103 A1 11/2009 Thakkar et al.
2009/0306957 A1 12/2009 Gao et al.
2009/0307616 A1 12/2009 Nielsen
2010/0022098 A1 1/2010 Matsunaga et al.
2010/0040217 A1 2/2010 Aberg et al.
2010/0135478 A1 6/2010 Wald et al.
2010/0153497 A1 6/2010 Sylvain et al.
2010/0185434 A1 7/2010 Burvall et al.
2010/0222098 A1 9/2010 Garg
2010/0315218 A1 12/2010 Cades et al.
2011/0010041 A1 1/2011 Wagner et al.
2011/0153324 A1 6/2011 Ballinger et al.
2011/0184721 A1 7/2011 Subramanian et al.
2011/0196580 A1 8/2011 Xu et al.
2011/0216928 A1 9/2011 Eisenberg et al.
2011/0237295 A1 9/2011 Bartkowiak et al.
2011/0270922 A1 11/2011 Jones et al.
2011/0298603 A1 12/2011 King et al.
2011/0307241 A1 12/2011 Waibel et al.
2012/0010886 A1 1/2012 Razavilar
2012/0025965 A1 2/2012 Mochizuki et al.
2012/0046833 A1 2/2012 Sanma et al.
2012/0069131 A1 3/2012 Abelow
2012/0072109 A1 3/2012 Waite et al.
2012/0075407 A1 3/2012 Wessling
2012/0197629 A1 8/2012 Nakamura et al.
2012/0323575 A1 12/2012 Gibbon et al.
2013/0021950 A1 1/2013 Chen et al.
2013/0022189 A1 1/2013 Ganong et al.
2013/0057691 A1 3/2013 Atsmon et al.
2013/0058471 A1 3/2013 Garcia
2013/0063542 A1 3/2013 Bhat et al.
2013/0103399 A1 4/2013 Gammon
2013/0124073 A1 5/2013 Ren
2013/0141576 A1 6/2013 Lord et al.
2013/0204616 A1 8/2013 Aoki et al.
2014/0055242 A1 2/2014 Mendonca et al.

OTHER PUBLICATIONS

"Non-final Office Action Issued in U.S. Appl. No. 15/177,535", dated Oct. 2, 2017, 21 Pages.

(56) References Cited

OTHER PUBLICATIONS

"Final Office Action Issued in U.S. Appl. No. 13/309,248", dated Jan. 27, 2014, 37 Pages.
"Non Final Office Action Issued U.S. Appl. No. 13/309,248", dated Oct. 7, 2013, 33 Pages.
"Non Final Office Action Issued in U.S. Appl. No. 13/324,232", dated Mar. 17, 2014, 22 Pages.
"Non Final Office Action Issued in U.S. Appl. No. 13/340,143", dated Apr. 10, 2014, 22 Pages.
"Non Final Office Action Issued in U.S. Appl. No. 13/340,143", dated Aug. 26, 2014, 27 Pages.
"Final Office Action Issued in U.S. Appl. No. 13/356,419", dated Jun. 24, 2014, 20 Pages.
"Final Office Action Issued in U.S. Appl. No. 13/356,419", dated May 5, 2015, 21 Pages.
"Non Final Office Action Issued in U.S. Appl. No. 13/356,419", dated Nov. 20, 2014, 19 Pages.
"Non Final Office Action Issued in U.S. Appl. No. 13/356,419", dated Jan. 16, 2014, 18 Pages.
"Final Office Action Issued in U.S. Appl. No. 13/362,823", dated Nov. 21, 2014, 52 Pages.
"Non Final Office Action Issued in U.S. Appl. No. 13/362,823", dated Jun. 12, 2014, 48 Pages.
"Final Office Action Issued in U.S. Appl. No. 13/397,289", dated Jun. 25, 2014, 57 Pages.
"Non Final Office Action Issued in U.S. Appl. No. 13/397,289", dated Dec. 23, 2013, 48 Pages.
"Non Final Office Action Issued in U.S. Appl. No. 13/407,570", dated Oct. 16, 2014, 29 Pages.
"Non Final Office Action Issued in U.S. Appl. No. 13/425,210", dated Aug. 11, 2015, 18 Pages.
"Non Final Office Action Issued in U.S. Appl. No. 13/425,210", dated Jan. 23, 2015, 17 Pages.
"Final Office Action Issued in U.S. Appl. No. 13/434,475", dated Jan. 26, 2015, 9 Pages.
"Non Final Office Action Issued in U.S. Appl. No. 13/434,475", dated Sep. 9, 2014, 8 Pages.
"Non Final Office Action Issued in U.S. Appl. No. 15/177,535", dated Oct. 4, 2016, 21 Pages.
Menon, et al., "Roadside Range Sensors for Intersection Decision Support", In Proceedings of 7th International IEEE Conference on Intelligent Transportation Systems, Oct. 3, 2004, 6 Pages.

* cited by examiner

Fig. 3.1
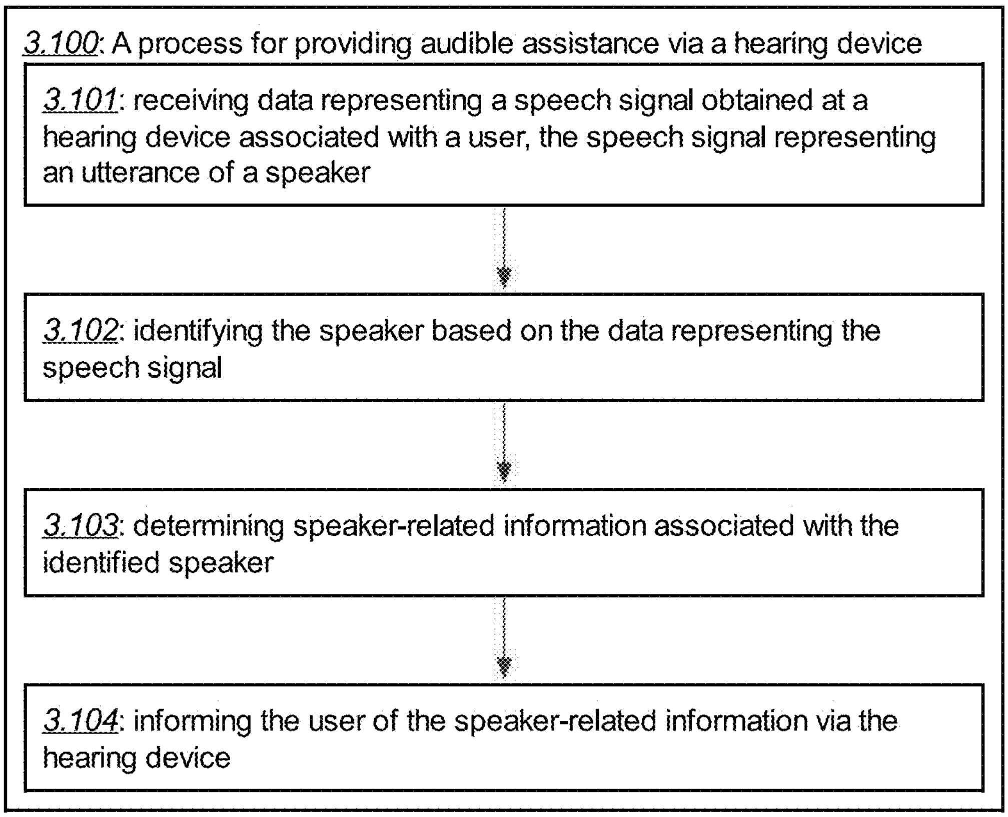
Fig. 3.2
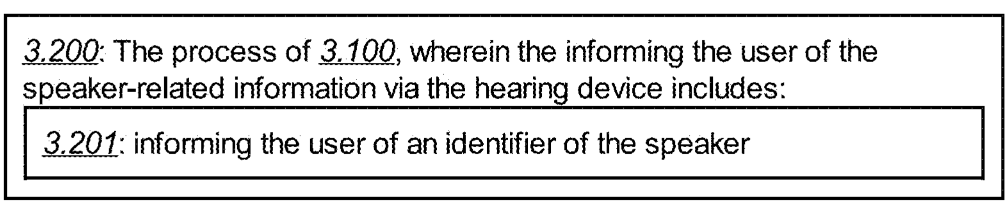

Fig. 3.3

3.300: The process of 3.100, wherein the informing the user of the speaker-related information via the hearing device includes:

3.301: informing the user of information aside from identifying information related to the speaker

Fig. 3.4

3.400: The process of 3.100, wherein the informing the user of the speaker-related information via the hearing device includes:

3.401: informing the user of an organization to which the speaker belongs

Fig. 3.5

3.500: The process of 3.400, wherein the informing the user of an organization includes:

3.501: informing the user of a company associated with the speaker

*Fig. 3.6*

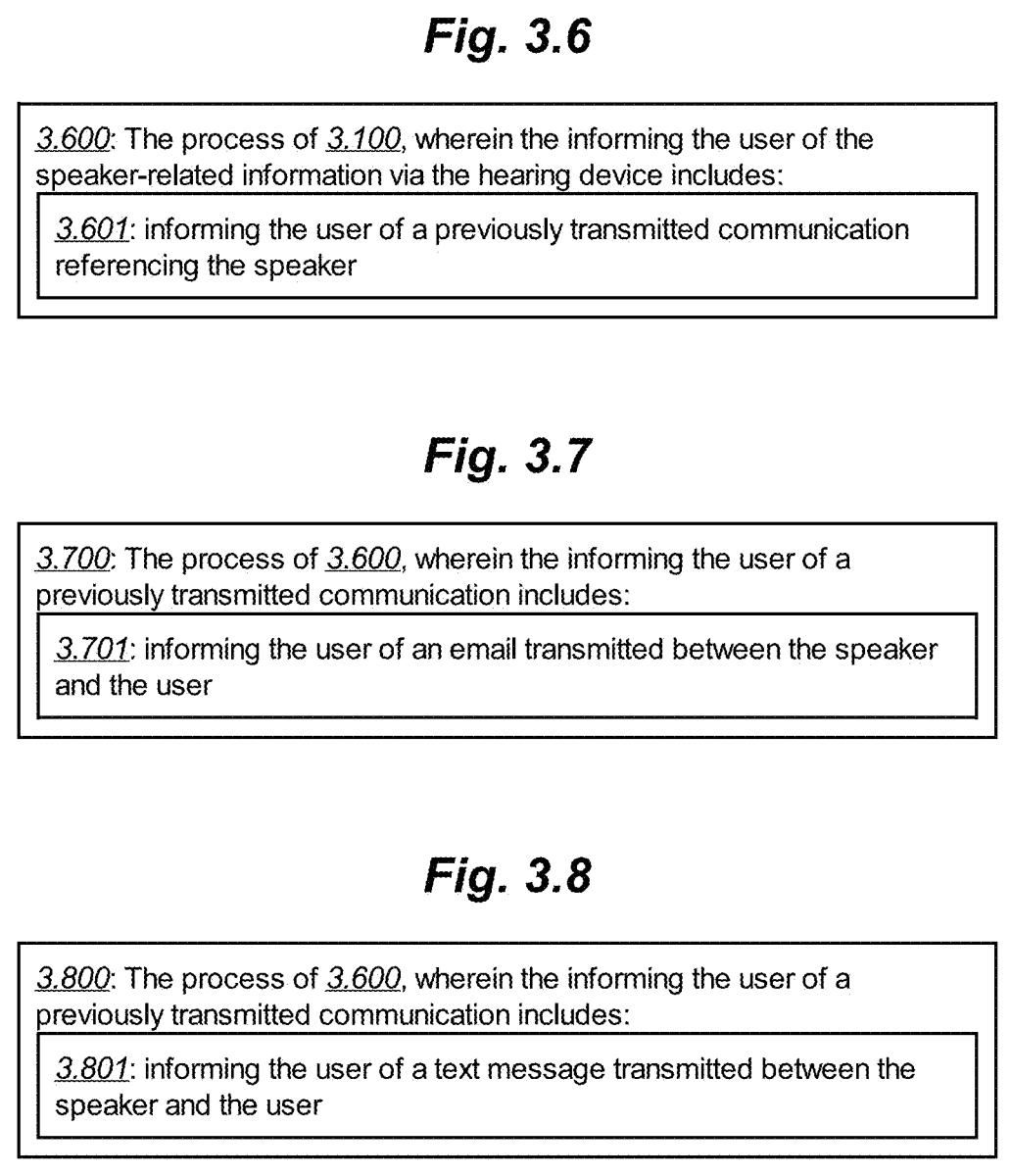

3.600: The process of 3.100, wherein the informing the user of the speaker-related information via the hearing device includes:

3.601: informing the user of a previously transmitted communication referencing the speaker

*Fig. 3.7*

3.700: The process of 3.600, wherein the informing the user of a previously transmitted communication includes:

3.701: informing the user of an email transmitted between the speaker and the user

*Fig. 3.8*

3.800: The process of 3.600, wherein the informing the user of a previously transmitted communication includes:

3.801: informing the user of a text message transmitted between the speaker and the user

Fig. 3.9

3.900: The process of 3.100, wherein the informing the user of the speaker-related information via the hearing device includes:

3.901: informing the user of an event involving the user and the speaker

Fig. 3.10

3.1000: The process of 3.900, wherein the informing the user of an event includes:

3.1001: informing the user of a previously occurring event

Fig. 3.11

3.1100: The process of 3.900, wherein the informing the user of an event includes:

3.1101: informing the user of a future event

Fig. 3.12

3.1200: The process of 3.900, wherein the informing the user of an event includes:

3.1201: informing the user of a project

*Fig. 3.13*

<u>*3.1300*</u>: The process of <u>*3.900*</u>, wherein the informing the user of an event includes:

<u>*3.1301*</u>: informing the user of a meeting

*Fig. 3.14*

<u>*3.1400*</u>: The process of <u>*3.900*</u>, wherein the informing the user of an event includes:

<u>*3.1401*</u>: informing the user of a deadline

*Fig. 3.15*

<u>*3.1500*</u>: The process of <u>*3.100*</u>, wherein the determining speaker-related information includes:

<u>*3.1501*</u>: accessing information items associated with the speaker

*Fig. 3.16*

*3.1600*: The process of *3.1500*, wherein the accessing information items associated with the speaker includes:

*3.1601*: searching for information items that reference the speaker

*Fig. 3.17*

*3.1700*: The process of *3.1500*, wherein the accessing information items associated with the speaker includes:

*3.1701*: searching stored emails to find emails that reference the speaker

*Fig. 3.18*

*3.1800*: The process of *3.1500*, wherein the accessing information items associated with the speaker includes:

*3.1801*: searching stored text messages to find text messages that reference the speaker

Fig. 3.19

3.1900: The process of 3.1500, wherein the accessing information items associated with the speaker includes:

3.1901: accessing a social networking service to find messages or status updates that reference the speaker

Fig. 3.20

3.2000: The process of 3.1500, wherein the accessing information items associated with the speaker includes:

3.2001: accessing a calendar to find information about appointments with the speaker

Fig. 3.21

3.2100: The process of 3.1500, wherein the accessing information items associated with the speaker includes:

3.2101: accessing a document store to find documents that reference the speaker

*Fig. 3.22*

3.2200: The process of 3.100, wherein the identifying the speaker includes:

3.2201: performing voice identification based on the received data to identify the speaker

*Fig. 3.23*

3.2300: The process of 3.2200, wherein the performing voice identification includes:

3.2301: comparing properties of the speech signal with properties of previously recorded speech signals from multiple distinct speakers

*Fig. 3.24*

3.2400: The process of 3.2300, further comprising:

3.2401: processing voice messages from the multiple distinct speakers to generate voice print data for each of the multiple distinct speakers

Fig. 3.25

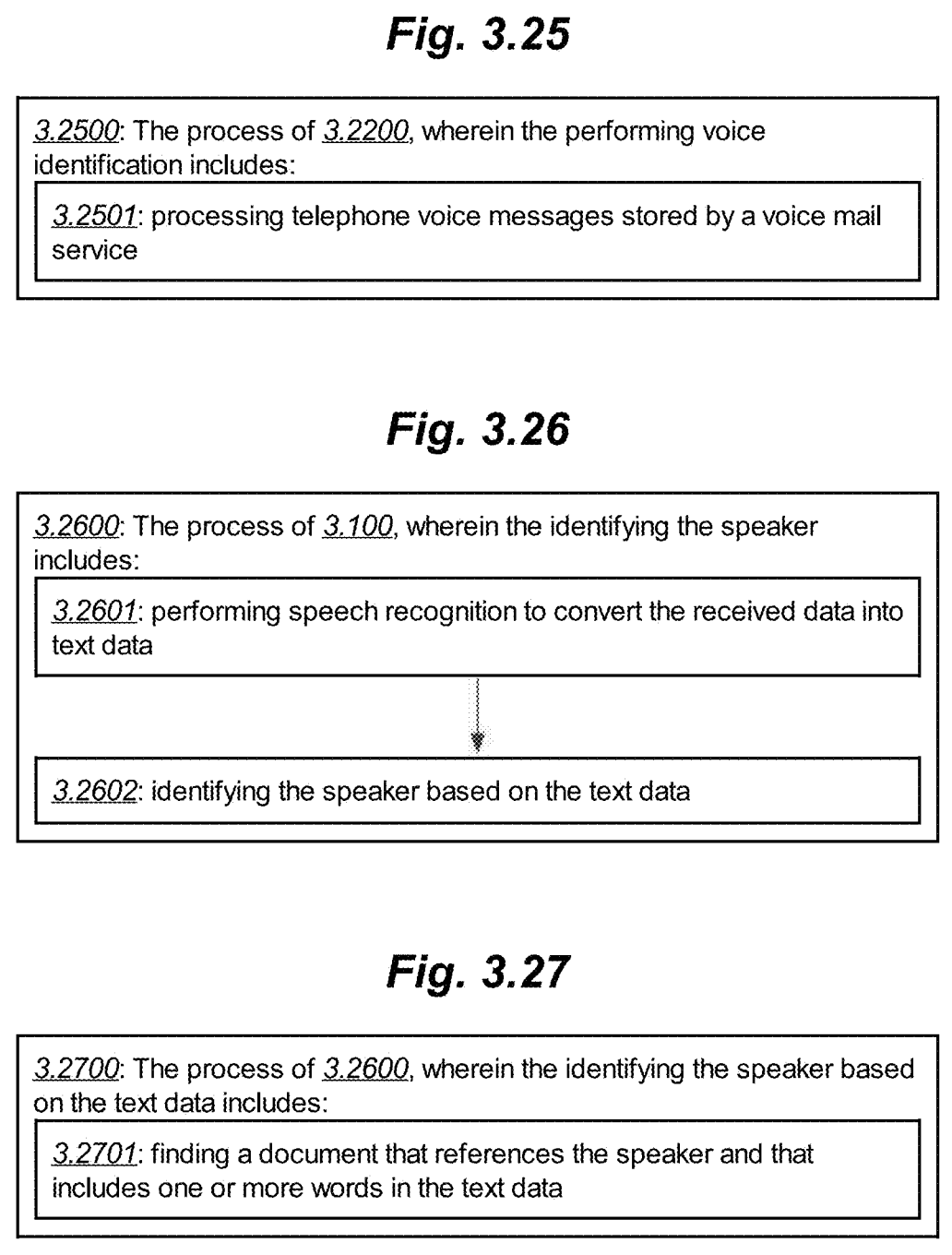

*3.2500*: The process of *3.2200*, wherein the performing voice identification includes:

*3.2501*: processing telephone voice messages stored by a voice mail service

Fig. 3.26

*3.2600*: The process of *3.100*, wherein the identifying the speaker includes:

*3.2601*: performing speech recognition to convert the received data into text data

↓

*3.2602*: identifying the speaker based on the text data

Fig. 3.27

*3.2700*: The process of *3.2600*, wherein the identifying the speaker based on the text data includes:

*3.2701*: finding a document that references the speaker and that includes one or more words in the text data

*Fig. 3.28*

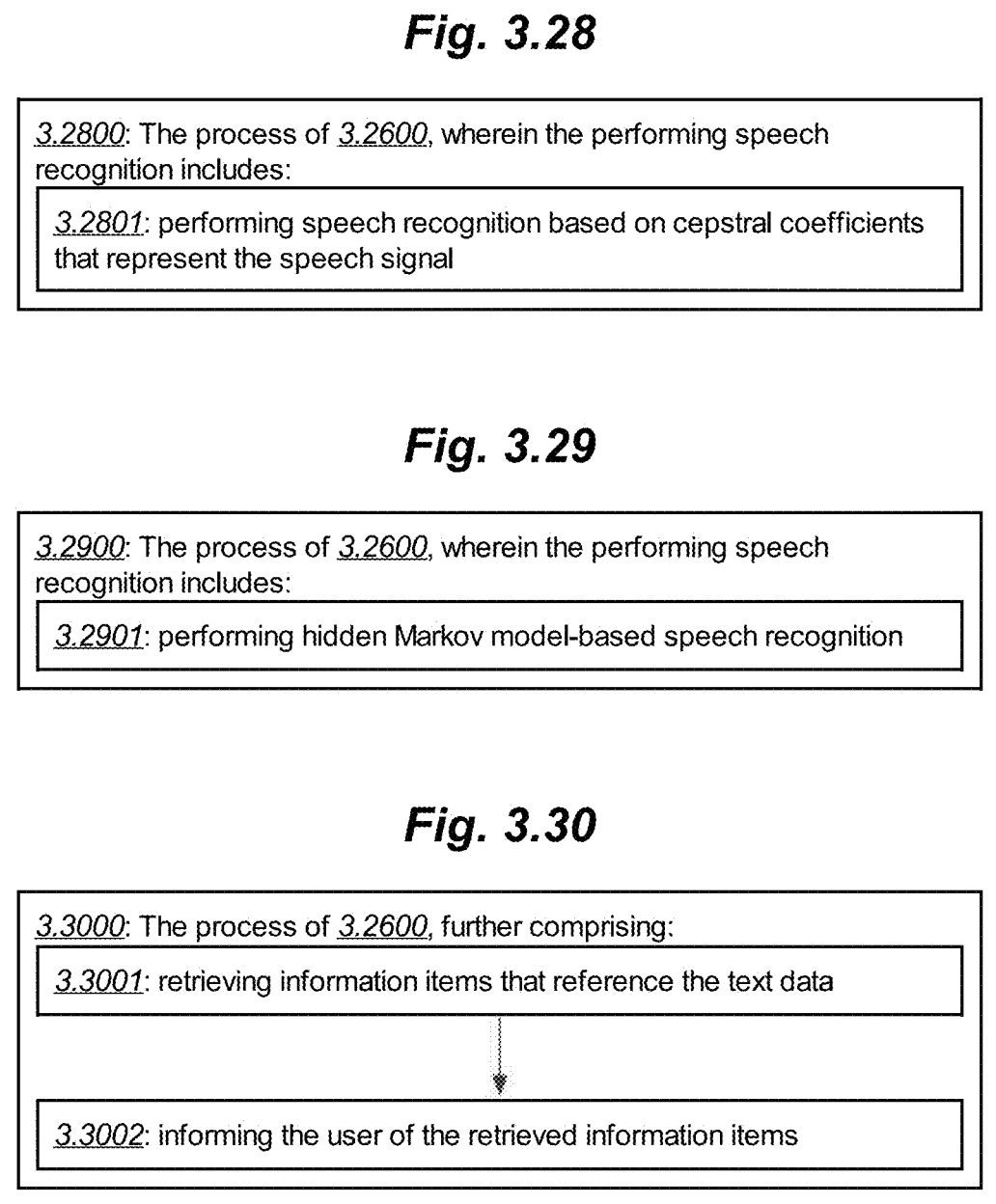

3.2800: The process of 3.2600, wherein the performing speech recognition includes:

3.2801: performing speech recognition based on cepstral coefficients that represent the speech signal

*Fig. 3.29*

3.2900: The process of 3.2600, wherein the performing speech recognition includes:

3.2901: performing hidden Markov model-based speech recognition

*Fig. 3.30*

3.3000: The process of 3.2600, further comprising:

3.3001: retrieving information items that reference the text data

↓

3.3002: informing the user of the retrieved information items

*Fig. 3.31*

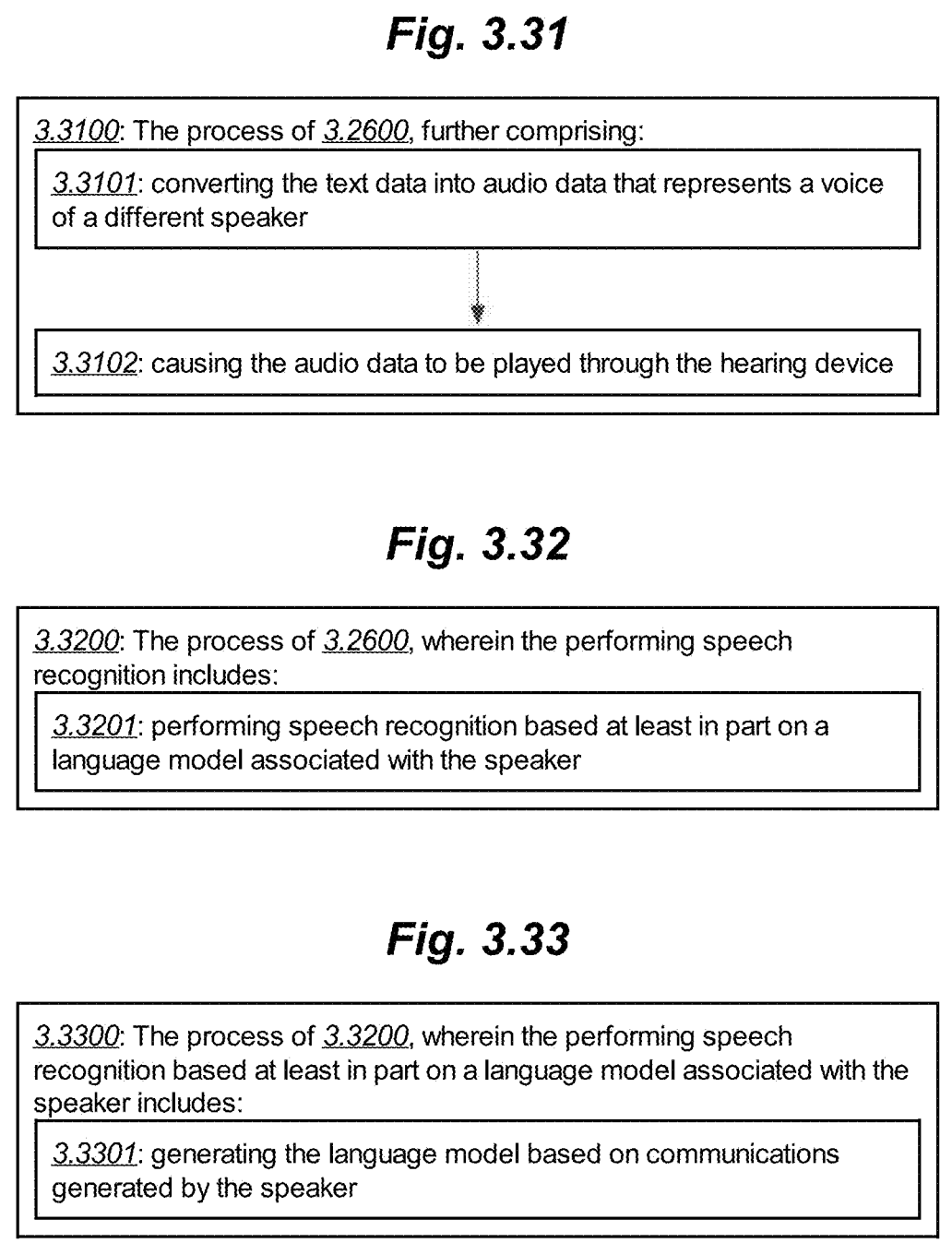

*3.3100*: The process of *3.2600*, further comprising:

*3.3101*: converting the text data into audio data that represents a voice of a different speaker

↓

*3.3102*: causing the audio data to be played through the hearing device

*Fig. 3.32*

*3.3200*: The process of *3.2600*, wherein the performing speech recognition includes:

*3.3201*: performing speech recognition based at least in part on a language model associated with the speaker

*Fig. 3.33*

*3.3300*: The process of *3.3200*, wherein the performing speech recognition based at least in part on a language model associated with the speaker includes:

*3.3301*: generating the language model based on communications generated by the speaker

Fig. 3.34

3.3400: The process of 3.3300, wherein the generating the language model based on communications generated by the speaker includes:

3.3401: generating the language model based on emails transmitted by the speaker

Fig. 3.35

3.3500: The process of 3.3300, wherein the generating the language model based on communications generated by the speaker includes:

3.3501: generating the language model based on documents authored by the speaker

Fig. 3.36

3.3600: The process of 3.3300, wherein the generating the language model based on communications generated by the speaker includes:

3.3601: generating the language model based on social network messages transmitted by the speaker

Fig. 3.37

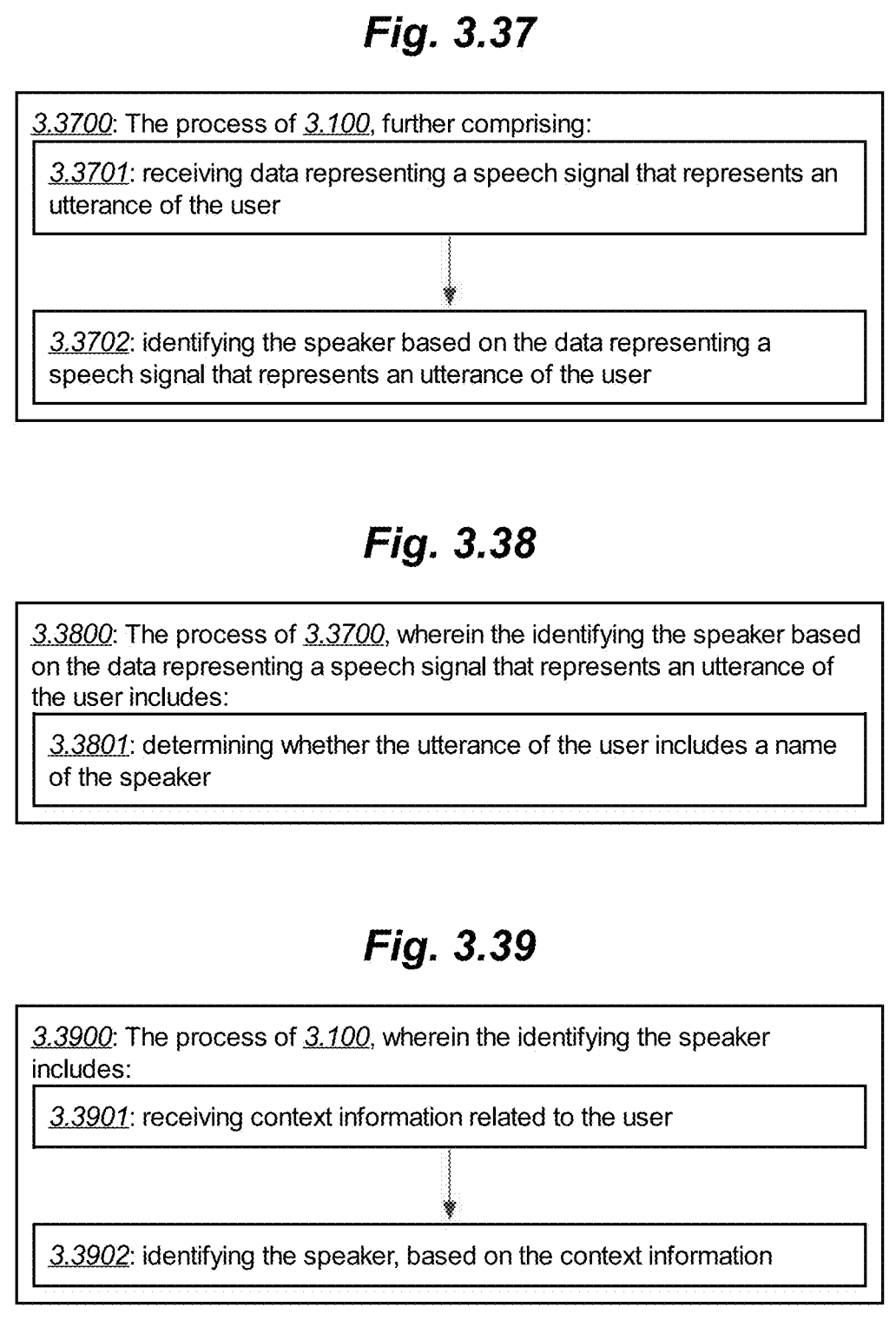

3.3700: The process of 3.100, further comprising:

3.3701: receiving data representing a speech signal that represents an utterance of the user

↓

3.3702: identifying the speaker based on the data representing a speech signal that represents an utterance of the user

Fig. 3.38

3.3800: The process of 3.3700, wherein the identifying the speaker based on the data representing a speech signal that represents an utterance of the user includes:

3.3801: determining whether the utterance of the user includes a name of the speaker

Fig. 3.39

3.3900: The process of 3.100, wherein the identifying the speaker includes:

3.3901: receiving context information related to the user

↓

3.3902: identifying the speaker, based on the context information

Fig. 3.40

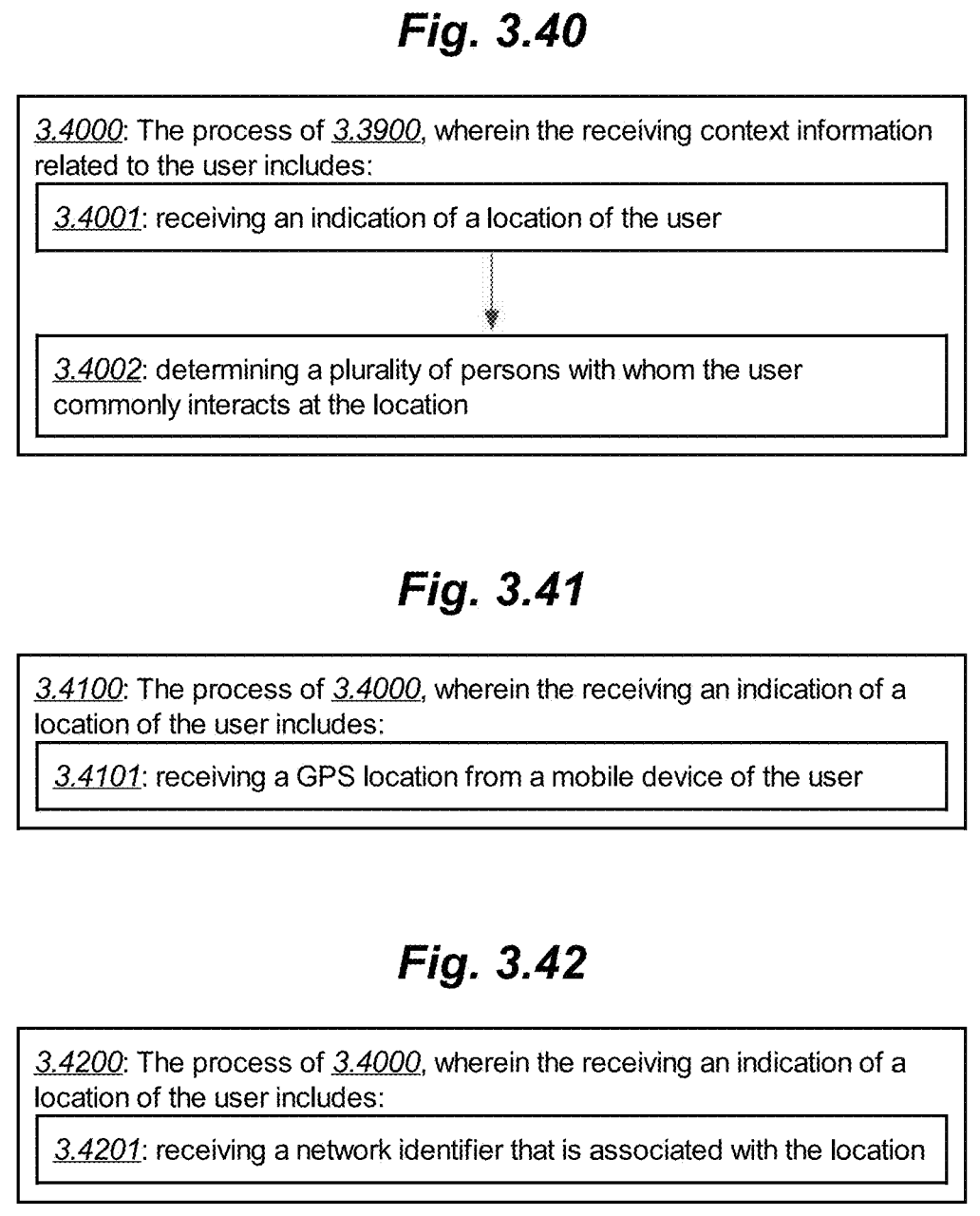

3.4000: The process of 3.3900, wherein the receiving context information related to the user includes:

3.4001: receiving an indication of a location of the user

↓

3.4002: determining a plurality of persons with whom the user commonly interacts at the location

Fig. 3.41

3.4100: The process of 3.4000, wherein the receiving an indication of a location of the user includes:

3.4101: receiving a GPS location from a mobile device of the user

Fig. 3.42

3.4200: The process of 3.4000, wherein the receiving an indication of a location of the user includes:

3.4201: receiving a network identifier that is associated with the location

Fig. 3.43

3.4300: The process of 3.4000, wherein the receiving an indication of a location of the user includes:

3.4301: receiving an indication that the user is at a workplace

Fig. 3.44

3.4400: The process of 3.4000, wherein the receiving an indication of a location of the user includes:

3.4401: receiving an indication that the user is at a residence

Fig. 3.45

3.4500: The process of 3.3900, wherein the receiving context information related to the user includes:

3.4501: receiving information about a communication that references the speaker

*Fig. 3.46*

<u>*3.4600*</u>: The process of <u>*3.4500*</u>, wherein the receiving information about a communication that references the speaker includes:

<u>*3.4601*</u>: receiving information about a message that references the speaker

*Fig. 3.47*

<u>*3.4700*</u>: The process of <u>*3.4500*</u>, wherein the receiving information about a communication that references the speaker includes:

<u>*3.4701*</u>: receiving information about a document that references the speaker

*Fig. 3.48*
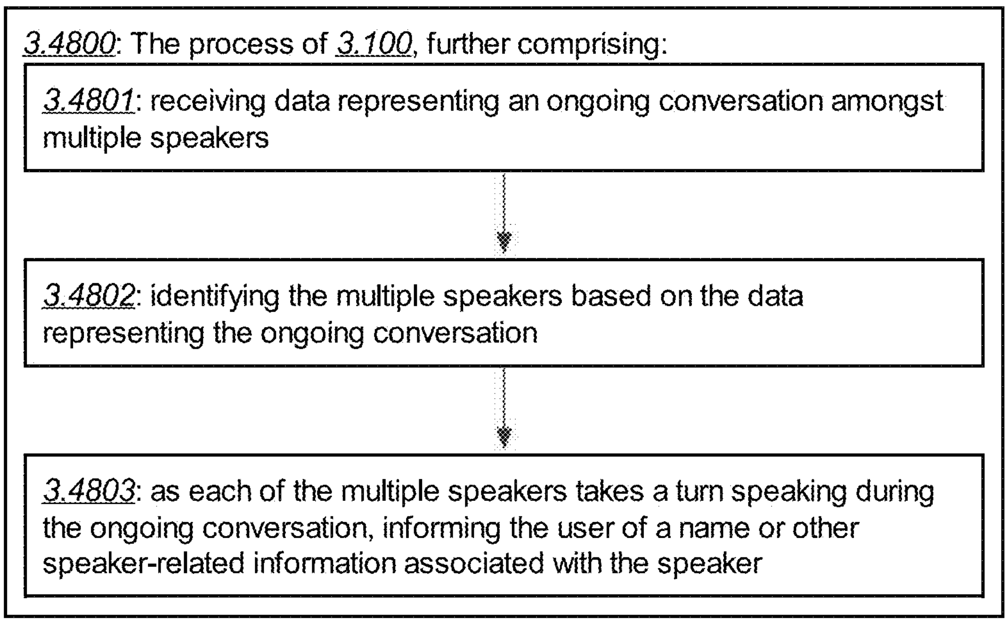
*Fig. 3.49*
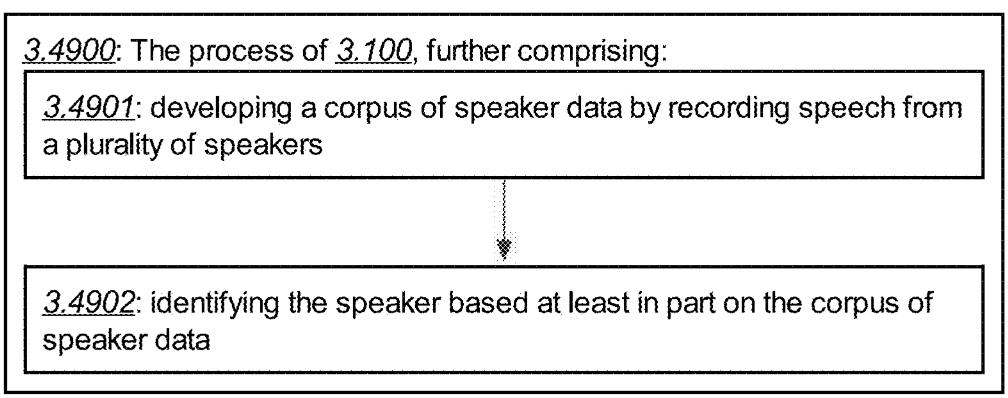

*Fig. 3.50*

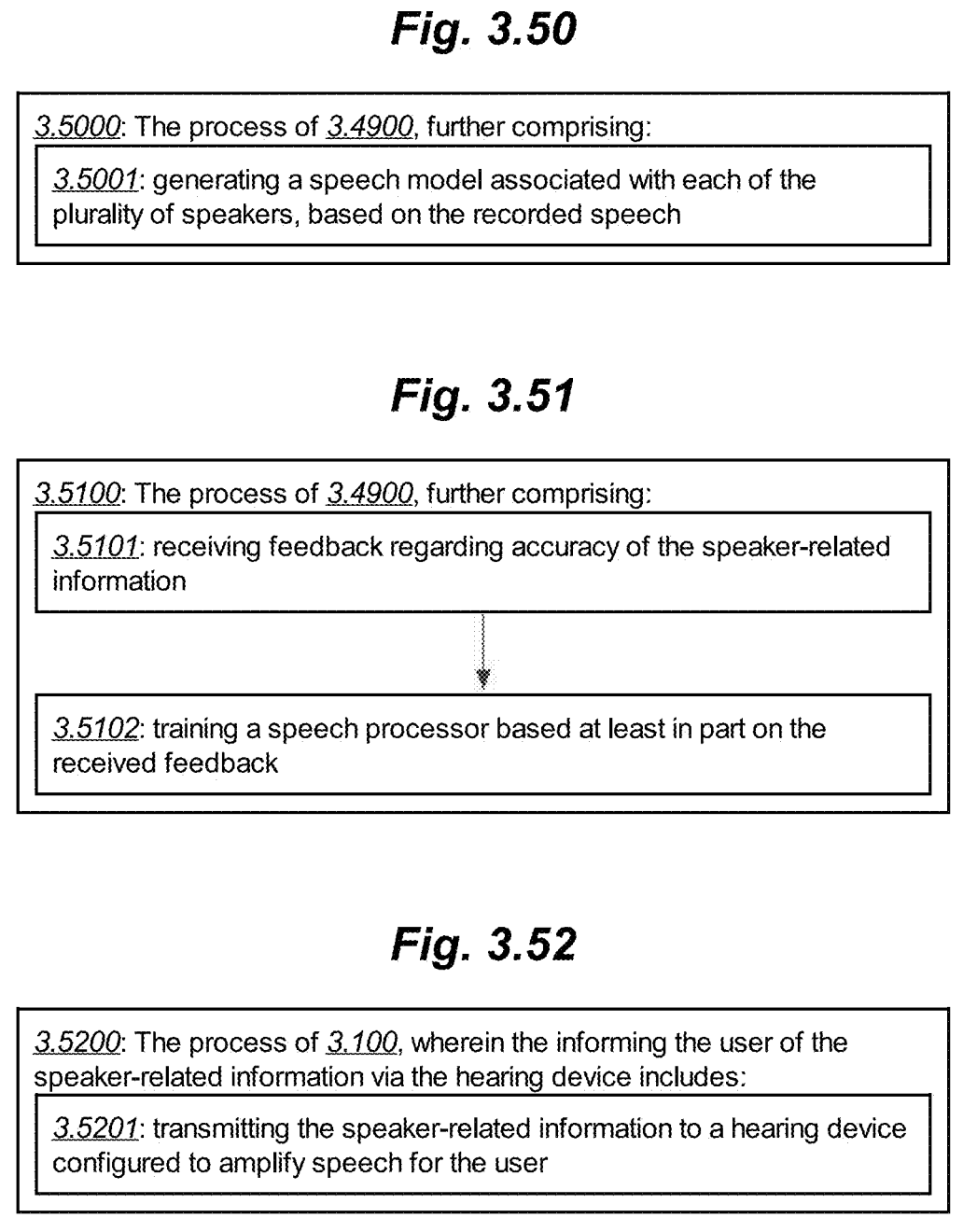

<u>*3.5000*</u>: The process of <u>*3.4900*</u>, further comprising:

<u>*3.5001*</u>: generating a speech model associated with each of the plurality of speakers, based on the recorded speech

*Fig. 3.51*

<u>*3.5100*</u>: The process of <u>*3.4900*</u>, further comprising:

<u>*3.5101*</u>: receiving feedback regarding accuracy of the speaker-related information

↓

<u>*3.5102*</u>: training a speech processor based at least in part on the received feedback

*Fig. 3.52*

<u>*3.5200*</u>: The process of <u>*3.100*</u>, wherein the informing the user of the speaker-related information via the hearing device includes:

<u>*3.5201*</u>: transmitting the speaker-related information to a hearing device configured to amplify speech for the user

*Fig. 3.53*

3.5300: The process of 3.100, wherein the informing the user of the speaker-related information via the hearing device includes:

3.5301: transmitting the speaker-related information to the hearing device from a computing system that is remote from the hearing device

*Fig. 3.54*

3.5400: The process of 3.5300, wherein the transmitting the speaker-related information to the hearing device from a computing system includes:

3.5401: transmitting the speaker-related information from a mobile device that is operated by the user and that is in communication with the hearing device

*Fig. 3.55*

3.5500: The process of 3.5400, wherein the transmitting the speaker-related information from a mobile device includes:

3.5501: wirelessly transmitting the speaker-related information from the mobile device to the hearing device

Fig. 3.56

3.5600: The process of 3.5400, wherein the transmitting the speaker-related information from a mobile device includes:

3.5601: transmitting the speaker-related information from a smart phone to the hearing device

Fig. 3.57

3.5700: The process of 3.5400, wherein the transmitting the speaker-related information from a mobile device includes:

3.5701: transmitting the speaker-related information from a portable media player to the hearing device

Fig. 3.58

3.5800: The process of 3.5300, wherein the transmitting the speaker-related information to the hearing device from a computing system includes:

3.5801: transmitting the speaker-related information from a server system

*Fig. 3.59*

*3.5900*: The process of *3.5800*, wherein the transmitting the speaker-related information from a server system includes:

*3.5901*: transmitting the speaker-related information from a server system that resides in a data center

*Fig. 3.60*

*3.6000*: The process of *3.100*, wherein the informing the user of the speaker-related information via the hearing device includes:

*3.6001*: transmitting the speaker-related information to earphones in communication with a mobile device that is operating as the hearing device

*Fig. 3.61*

*3.6100*: The process of *3.100*, wherein the informing the user of the speaker-related information via the hearing device includes:

*3.6101*: transmitting the speaker-related information to earbuds in communication with a mobile device that is operating as the hearing device

Fig. 3.62

3.6200: The process of 3.100, wherein the informing the user of the speaker-related information via the hearing device includes:

3.6201: transmitting the speaker-related information to a headset in communication with a mobile device that is operating as the hearing device

Fig. 3.63

3.6300: The process of 3.100, wherein the informing the user of the speaker-related information via the hearing device includes:

3.6301: transmitting the speaker-related information to a pillow speaker in communication with a mobile device that is operating as the hearing device

Fig. 3.64

3.6400: The process of 3.100, wherein the identifying the speaker includes:

3.6401: identifying the speaker, performed on a mobile device that is operated by the user

Fig. 3.65

*3.6500*: The process of *3.6400*, wherein the identifying the speaker includes:

*3.6501*: identifying the speaker, performed on a smart phone that is operated by the user

Fig. 3.66

*3.6600*: The process of *3.6400*, wherein the identifying the speaker includes:

*3.6601*: identifying the speaker, performed on a media device that is operated by the user

Fig. 3.67

*3.6700*: The process of *3.100*, wherein the determining speaker-related information includes:

*3.6701*: determining speaker-related information, performed on a mobile device that is operated by the user

Fig. 3.68

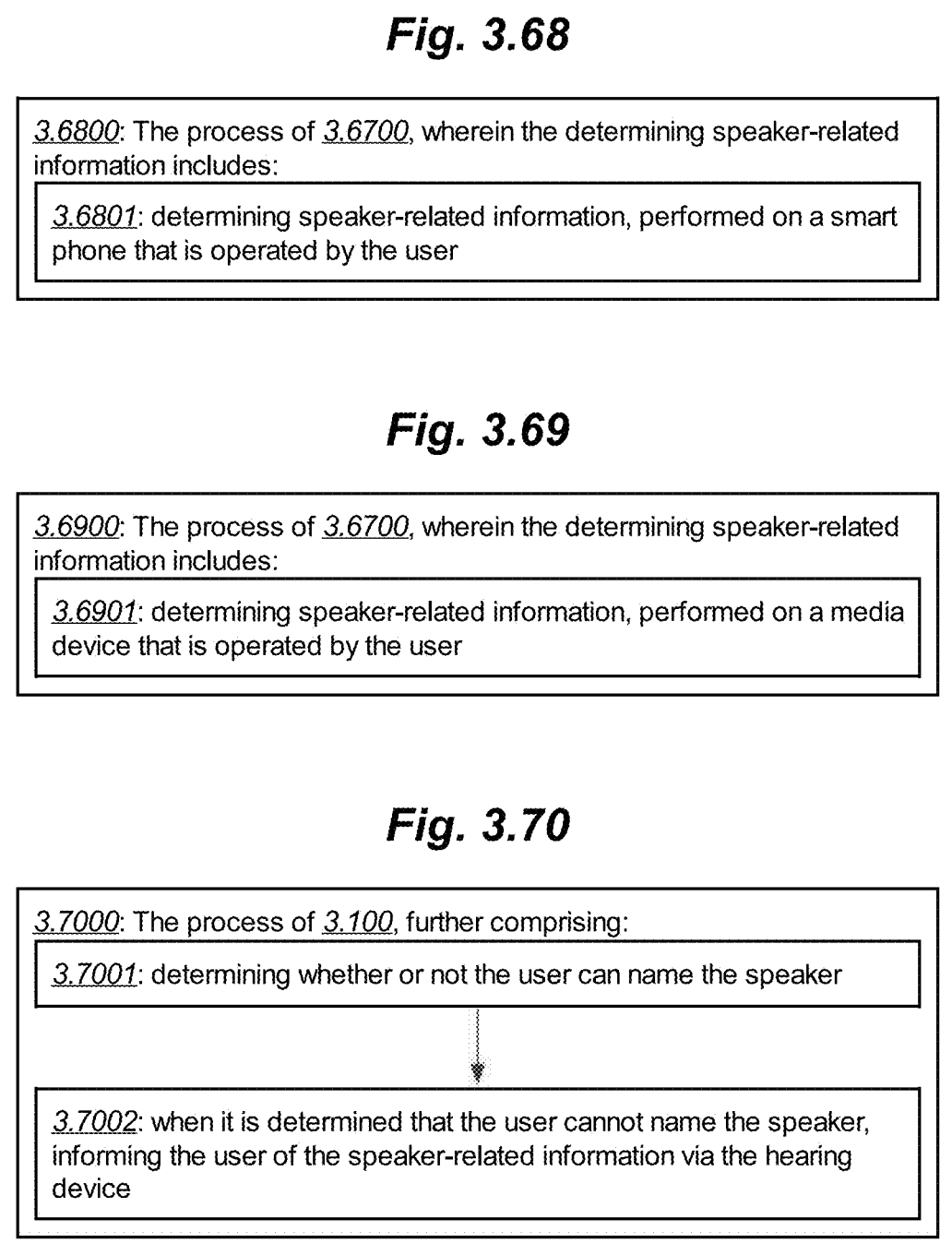

3.6800: The process of 3.6700, wherein the determining speaker-related information includes:

3.6801: determining speaker-related information, performed on a smart phone that is operated by the user

Fig. 3.69

3.6900: The process of 3.6700, wherein the determining speaker-related information includes:

3.6901: determining speaker-related information, performed on a media device that is operated by the user

Fig. 3.70

3.7000: The process of 3.100, further comprising:

3.7001: determining whether or not the user can name the speaker 3.7002: when it is determined that the user cannot name the speaker, informing the user of the speaker-related information via the hearing device

*Fig. 3.71*

3.7100: The process of 3.7000, wherein the determining whether or not the user can name the speaker includes:

3.7101: determining whether the user has named the speaker

*Fig. 3.72*

3.7200: The process of 3.7100, wherein the determining whether the user has named the speaker includes:

3.7201: determining whether the speaker has uttered a given name or surname of the speaker

*Fig. 3.73*

3.7300: The process of 3.7100, wherein the determining whether the user has named the speaker includes:

3.7301: determining whether the speaker has uttered a nickname of the speaker

*Fig. 3.74*

3.7400: The process of 3.7100, wherein the determining whether the user has named the speaker includes:

3.7401: determining whether the speaker has uttered a name of a relationship between the user and the speaker

*Fig. 3.75*

3.7500: The process of 3.7000, wherein the determining whether or not the user can name the speaker includes:

3.7501: determining whether the user has uttered information that is related to both the speaker and the user

*Fig. 3.76*

3.7600: The process of 3.7100, wherein the determining whether the user has named the speaker includes:

3.7601: determining whether the user has named a person, place, thing, or event that the speaker and the user have in common

Fig. 3.77

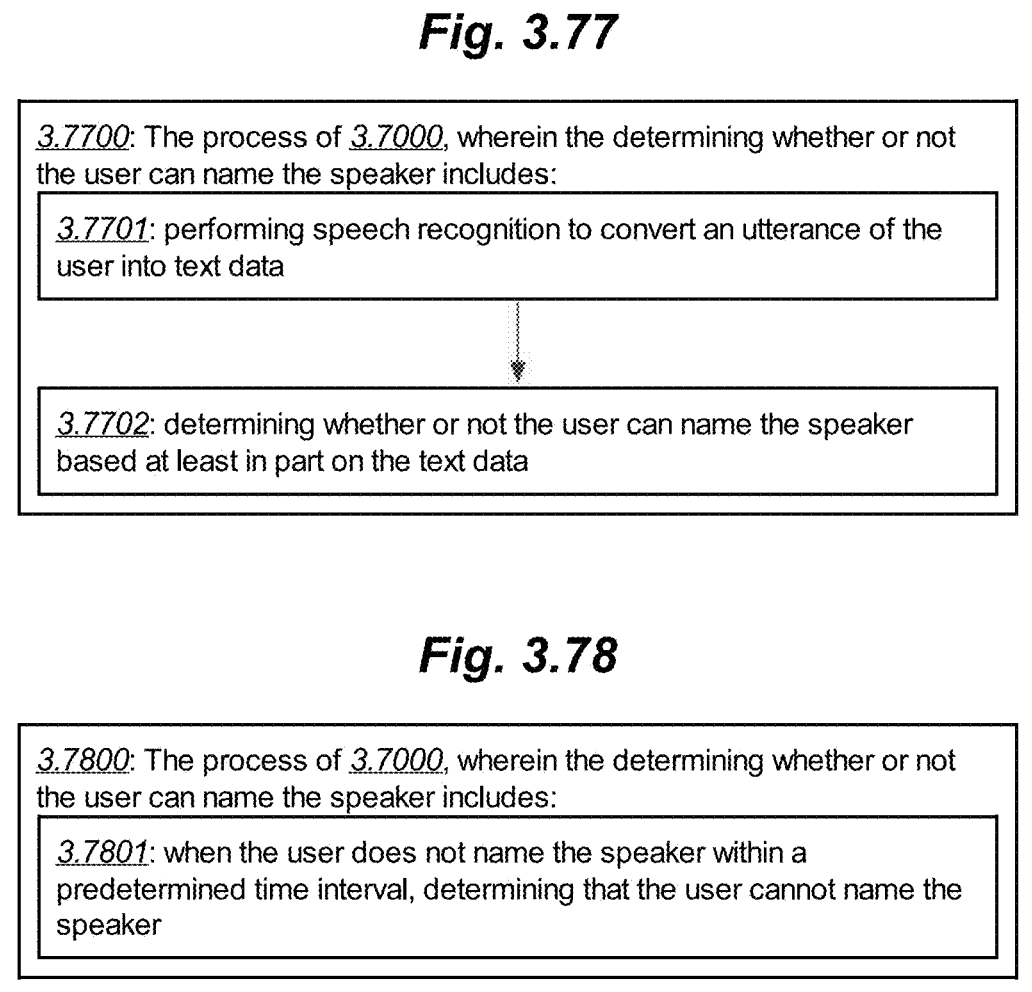

3.7700: The process of 3.7000, wherein the determining whether or not the user can name the speaker includes:

3.7701: performing speech recognition to convert an utterance of the user into text data 3.7702: determining whether or not the user can name the speaker based at least in part on the text data

Fig. 3.78

3.7800: The process of 3.7000, wherein the determining whether or not the user can name the speaker includes:

3.7801: when the user does not name the speaker within a predetermined time interval, determining that the user cannot name the speaker

Fig. 7.1
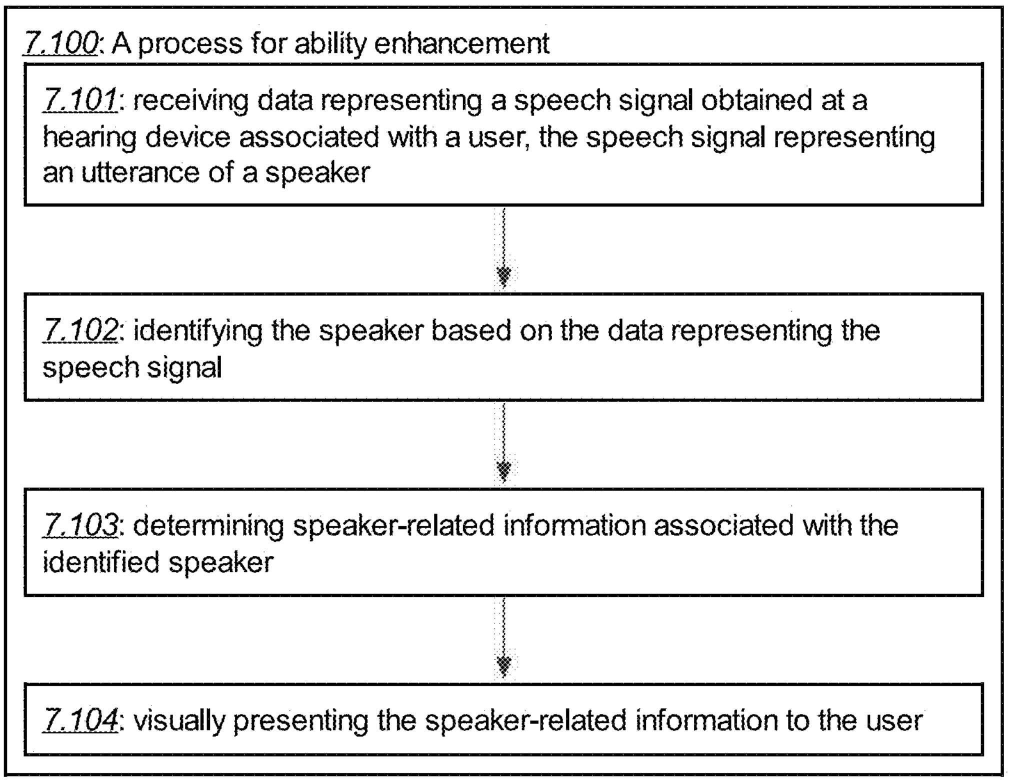
Fig. 7.2
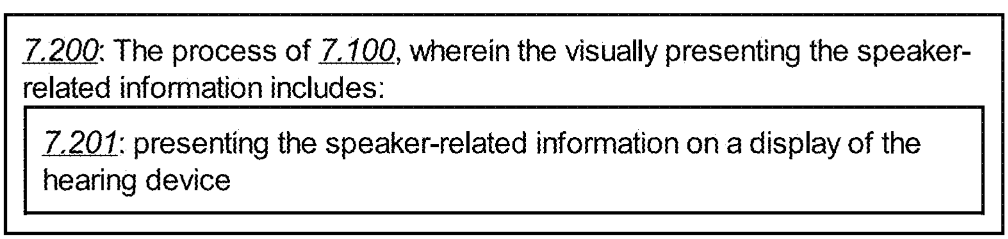

Fig. 7.3

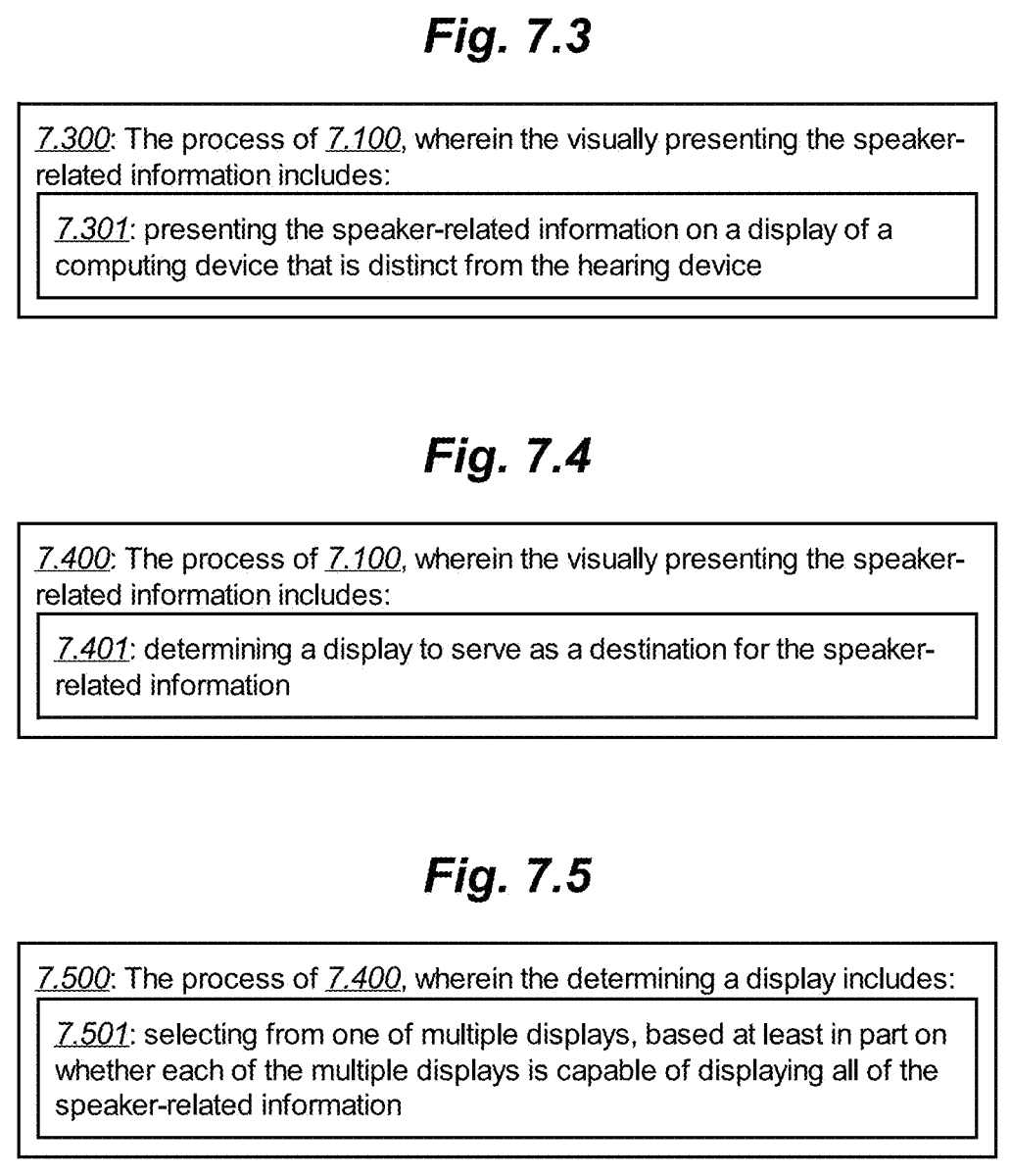

7.300: The process of 7.100, wherein the visually presenting the speaker-related information includes:

7.301: presenting the speaker-related information on a display of a computing device that is distinct from the hearing device

Fig. 7.4

7.400: The process of 7.100, wherein the visually presenting the speaker-related information includes:

7.401: determining a display to serve as a destination for the speaker-related information

Fig. 7.5

7.500: The process of 7.400, wherein the determining a display includes:

7.501: selecting from one of multiple displays, based at least in part on whether each of the multiple displays is capable of displaying all of the speaker-related information

*Fig. 7.6*

7.600: The process of 7.400, wherein the determining a display includes:

7.601: selecting from one of multiple displays, based at least in part on a size of each of the multiple displays

*Fig. 7.7*

7.700: The process of 7.400, wherein the determining a display includes:

7.701: selecting from one of multiple displays, based at least in part on whether each of the multiple displays is suitable for displaying the speaker-related information, the speaker-related information being at least one of text information, a communication, a document, an image, and/or a calendar event

*Fig. 7.8*

7.800: The process of 7.100, further comprising:

7.801: audibly notifying the user to view the speaker-related information on a display device

Fig. 7.9

7.900: The process of 7.800, wherein the audibly notifying the user includes:

7.901: playing a tone via an audio speaker of the hearing device

Fig. 7.10

7.1000: The process of 7.800, wherein the audibly notifying the user includes:

7.1001: playing synthesized speech via an audio speaker of the hearing device, the synthesized speech telling the user to view the display device

Fig. 7.11

7.1100: The process of 7.800, wherein the audibly notifying the user includes:

7.1101: telling the user that at least one of a document, a calendar event, and/or a communication is available for viewing on the display device

Fig. 7.12

7.1200: The process of 7.800, wherein the audibly notifying the user includes:

7.1201: audibly notifying the user in a manner that is not audible to the speaker

Fig. 7.13

7.1300: The process of 7.100, wherein the visually presenting the speaker-related information includes:

7.1301: informing the user of an identifier of the speaker

Fig. 7.14

7.1400: The process of 7.100, wherein the visually presenting the speaker-related information includes:

7.1401: informing the user of information aside from identifying information related to the speaker

Fig. 7.15

*7.1500*: The process of *7.100*, wherein the visually presenting the speaker-related information includes:

*7.1501*: informing the user of an organization to which the speaker belongs

Fig. 7.16

*7.1600*: The process of *7.1500*, wherein the informing the user of an organization includes:

*7.1601*: informing the user of a company associated with the speaker

Fig. 7.17

*7.1700*: The process of *7.100*, wherein the visually presenting the speaker-related information includes:

*7.1701*: informing the user of a previously transmitted communication referencing the speaker

*Fig. 7.18*

7.1800: The process of 7.1700, wherein the informing the user of a previously transmitted communication includes:

7.1801: informing the user of an email transmitted between the speaker and the user

*Fig. 7.19*

7.1900: The process of 7.1700, wherein the informing the user of a previously transmitted communication includes:

7.1901: informing the user of a text message transmitted between the speaker and the user

*Fig. 7.20*

7.2000: The process of 7.100, wherein the visually presenting the speaker-related information includes:

7.2001: informing the user of an event involving the user and the speaker

Fig. 7.21

*7.2100*: The process of *7.2000*, wherein the informing the user of an event includes:

> *7.2101*: informing the user of a previously occurring event and/or a future event

Fig. 7.22

*7.2200*: The process of *7.2000*, wherein the informing the user of an event includes:

> *7.2201*: informing the user of at least one of a project, a meeting, and/or a deadline

Fig. 7.23

*7.2300*: The process of *7.100*, wherein the determining speaker-related information includes:

> *7.2301*: accessing information items associated with the speaker

*Fig. 7.24*

*7.2400*: The process of *7.2300*, wherein the accessing information items associated with the speaker includes:

*7.2401*: searching for information items that reference the speaker

*Fig. 7.25*

*7.2500*: The process of *7.2300*, wherein the accessing information items associated with the speaker includes:

*7.2501*: searching stored emails to find emails that reference the speaker

*Fig. 7.26*

*7.2600*: The process of *7.2300*, wherein the accessing information items associated with the speaker includes:

*7.2601*: searching stored text messages to find text messages that reference the speaker

*Fig. 7.27*

7.2700: The process of 7.2300, wherein the accessing information items associated with the speaker includes:

7.2701: accessing a social networking service to find messages or status updates that reference the speaker

*Fig. 7.28*

7.2800: The process of 7.2300, wherein the accessing information items associated with the speaker includes:

7.2801: accessing a calendar to find information about appointments with the speaker

*Fig. 7.29*

7.2900: The process of 7.2300, wherein the accessing information items associated with the speaker includes:

7.2901: accessing a document store to find documents that reference the speaker

Fig. 7.30

7.3000: The process of 7.100, wherein the identifying the speaker includes:

7.3001: performing voice identification based on the received data to identify the speaker

Fig. 7.31

7.3100: The process of 7.3000, wherein the performing voice identification includes:

7.3101: comparing properties of the speech signal with properties of previously recorded speech signals from multiple distinct speakers

Fig. 7.32

7.3200: The process of 7.3100, further comprising:

7.3201: processing voice messages from the multiple distinct speakers to generate voice print data for each of the multiple distinct speakers

*Fig. 7.33*

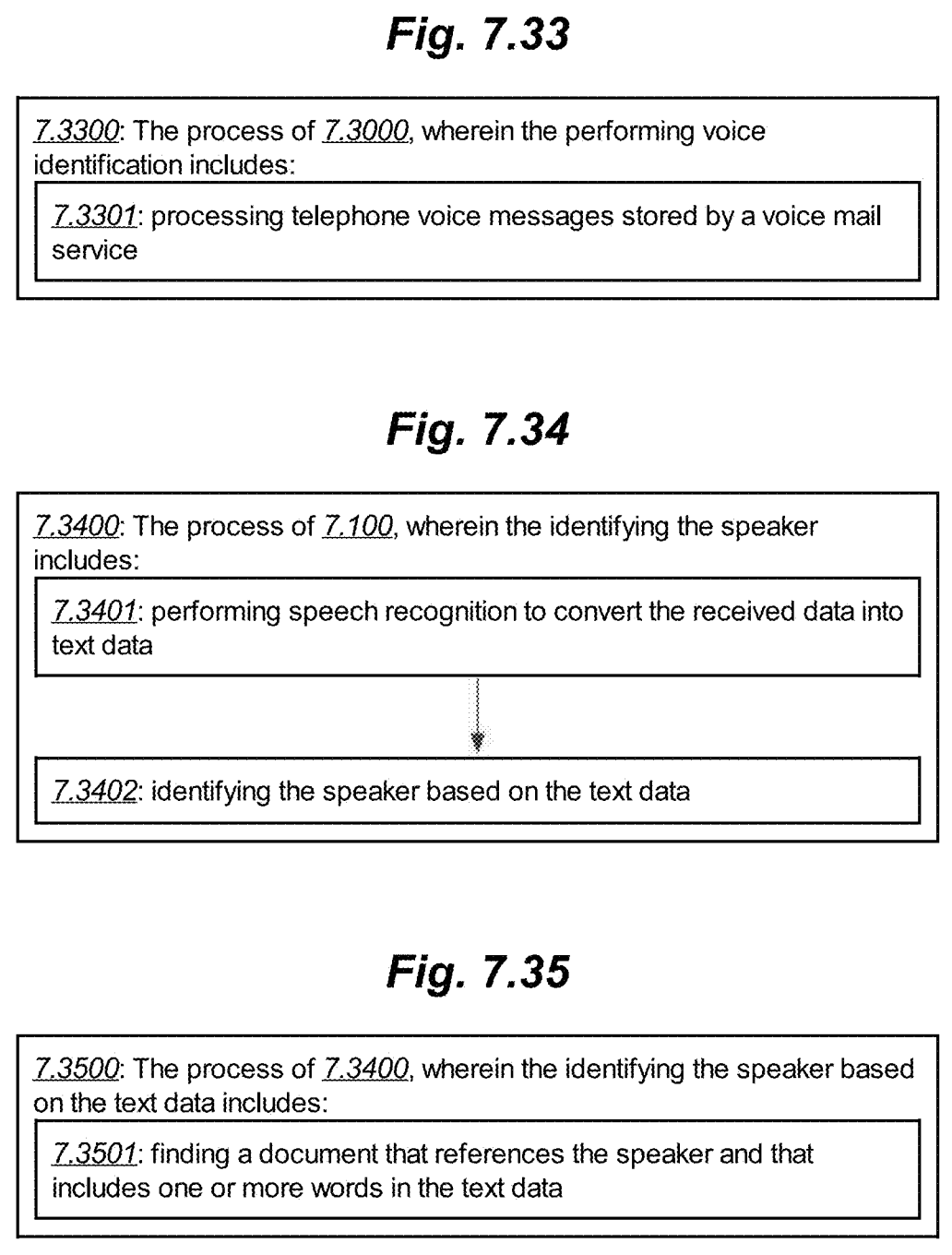

7.3300: The process of 7.3000, wherein the performing voice identification includes:

7.3301: processing telephone voice messages stored by a voice mail service

*Fig. 7.34*

7.3400: The process of 7.100, wherein the identifying the speaker includes:

7.3401: performing speech recognition to convert the received data into text data

↓

7.3402: identifying the speaker based on the text data

*Fig. 7.35*

7.3500: The process of 7.3400, wherein the identifying the speaker based on the text data includes:

7.3501: finding a document that references the speaker and that includes one or more words in the text data

Fig. 7.36

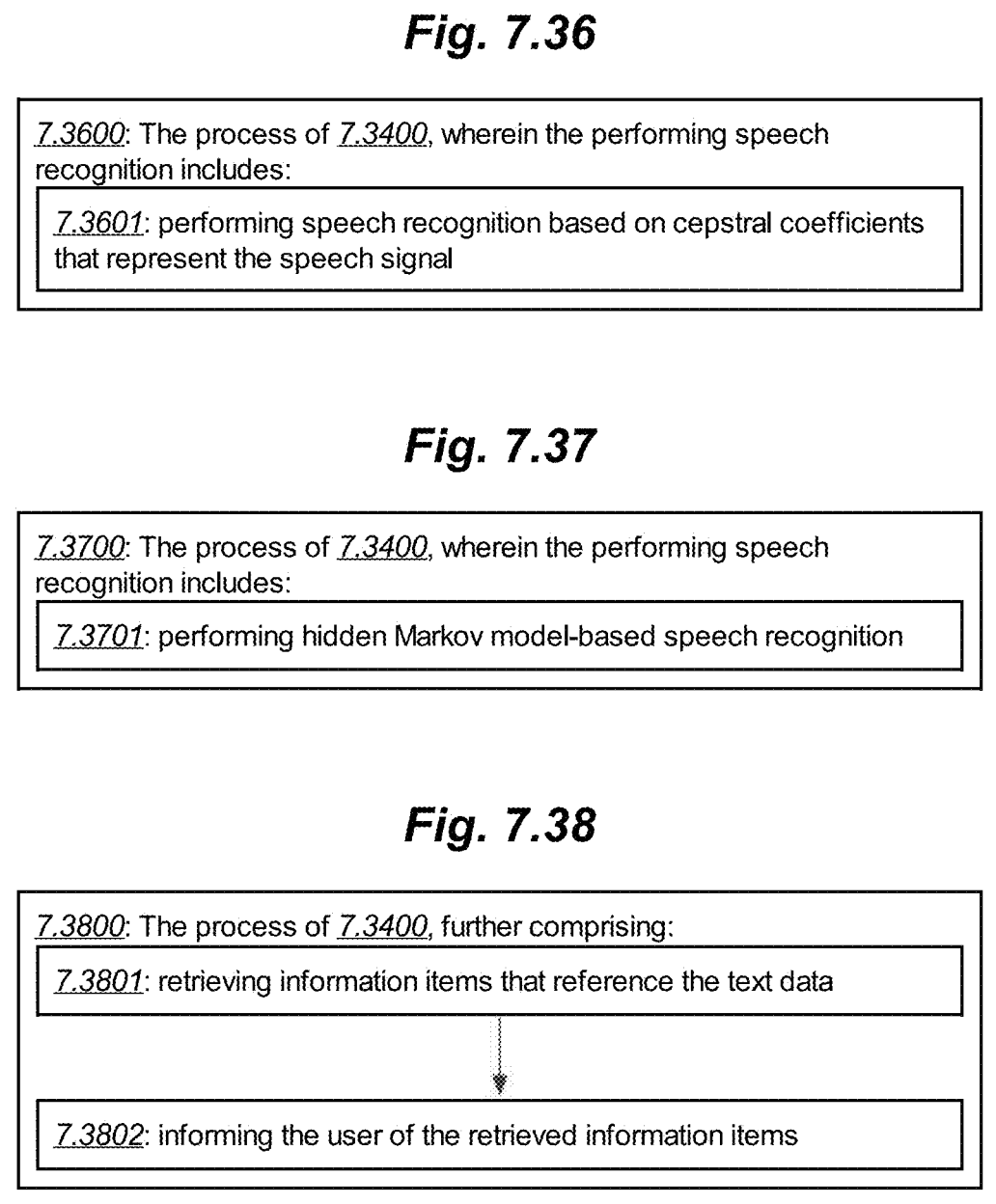

7.3600: The process of 7.3400, wherein the performing speech recognition includes:

7.3601: performing speech recognition based on cepstral coefficients that represent the speech signal

Fig. 7.37

7.3700: The process of 7.3400, wherein the performing speech recognition includes:

7.3701: performing hidden Markov model-based speech recognition

Fig. 7.38

7.3800: The process of 7.3400, further comprising:

7.3801: retrieving information items that reference the text data 7.3802: informing the user of the retrieved information items

Fig. 7.39

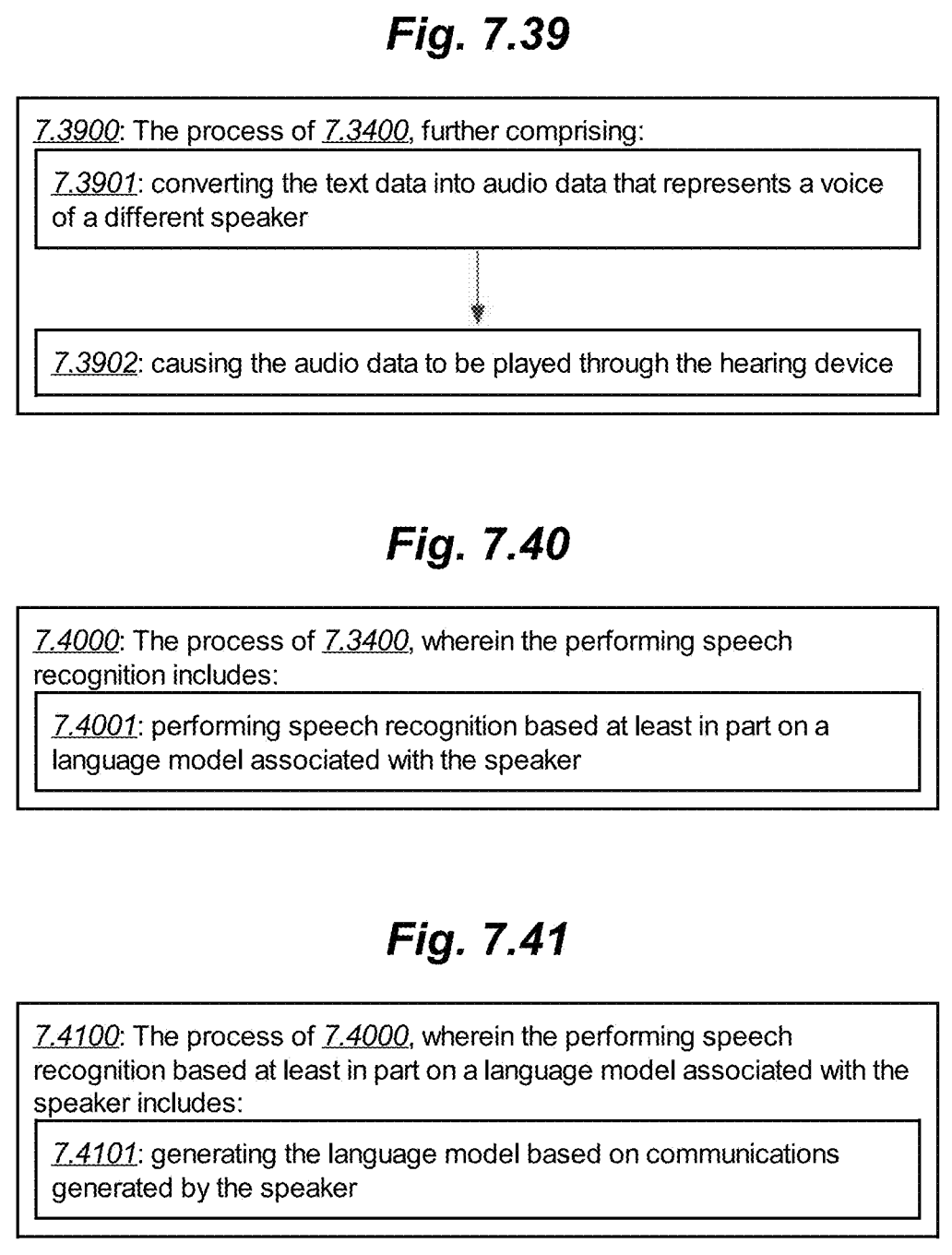

7.3900: The process of 7.3400, further comprising:

7.3901: converting the text data into audio data that represents a voice of a different speaker

↓

7.3902: causing the audio data to be played through the hearing device

Fig. 7.40

7.4000: The process of 7.3400, wherein the performing speech recognition includes:

7.4001: performing speech recognition based at least in part on a language model associated with the speaker

Fig. 7.41

7.4100: The process of 7.4000, wherein the performing speech recognition based at least in part on a language model associated with the speaker includes:

7.4101: generating the language model based on communications generated by the speaker

Fig. 7.42

_7.4200_: The process of _7.4100_, wherein the generating the language model based on communications generated by the speaker includes:

_7.4201_: generating the language model based on emails transmitted by the speaker

Fig. 7.43

_7.4300_: The process of _7.4100_, wherein the generating the language model based on communications generated by the speaker includes:

_7.4301_: generating the language model based on documents authored by the speaker

Fig. 7.44

_7.4400_: The process of _7.4100_, wherein the generating the language model based on communications generated by the speaker includes:

_7.4401_: generating the language model based on social network messages transmitted by the speaker

Fig. 7.45

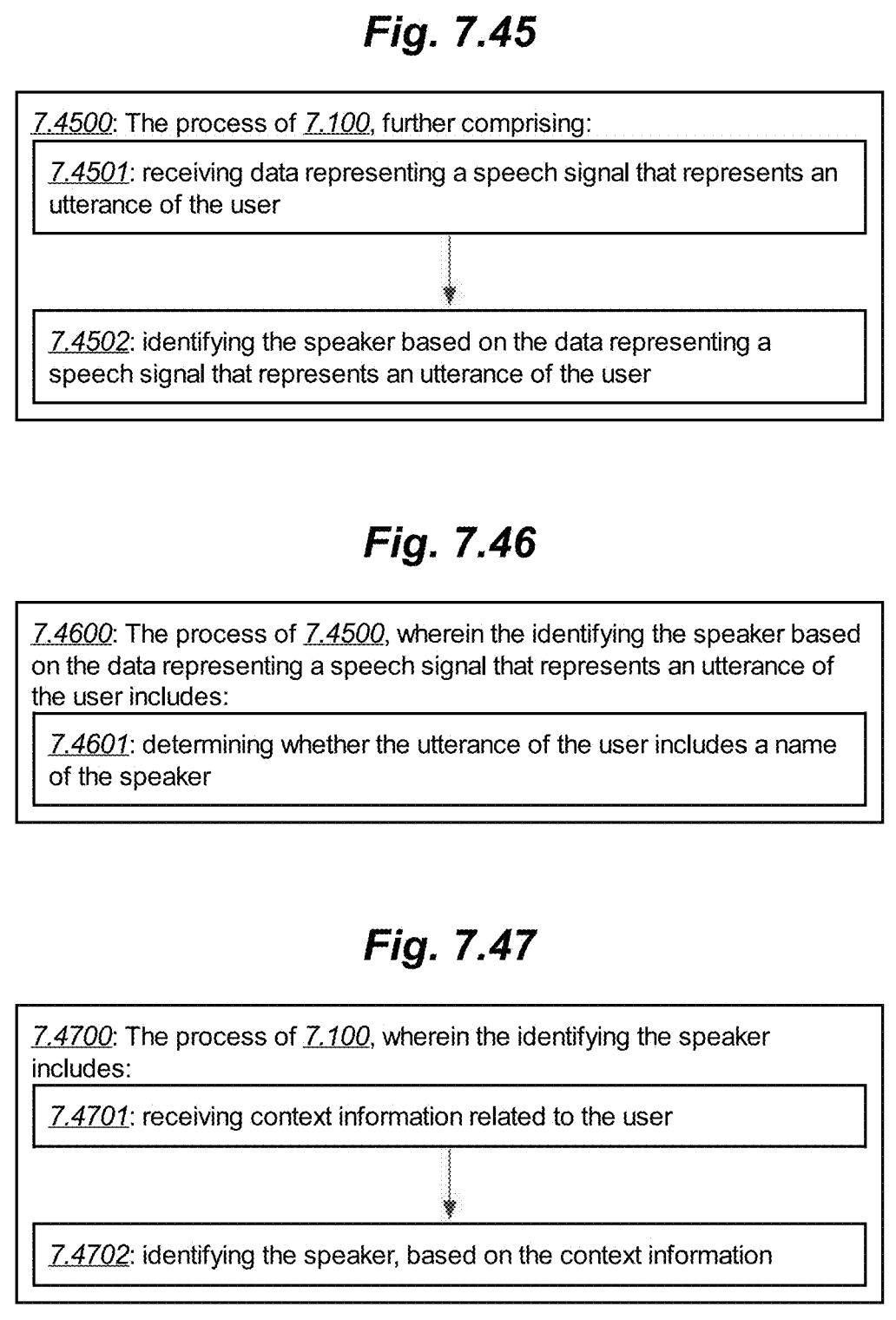

7.4500: The process of 7.100, further comprising:

7.4501: receiving data representing a speech signal that represents an utterance of the user

↓

7.4502: identifying the speaker based on the data representing a speech signal that represents an utterance of the user

Fig. 7.46

7.4600: The process of 7.4500, wherein the identifying the speaker based on the data representing a speech signal that represents an utterance of the user includes:

7.4601: determining whether the utterance of the user includes a name of the speaker

Fig. 7.47

7.4700: The process of 7.100, wherein the identifying the speaker includes:

7.4701: receiving context information related to the user

↓

7.4702: identifying the speaker, based on the context information

Fig. 7.48

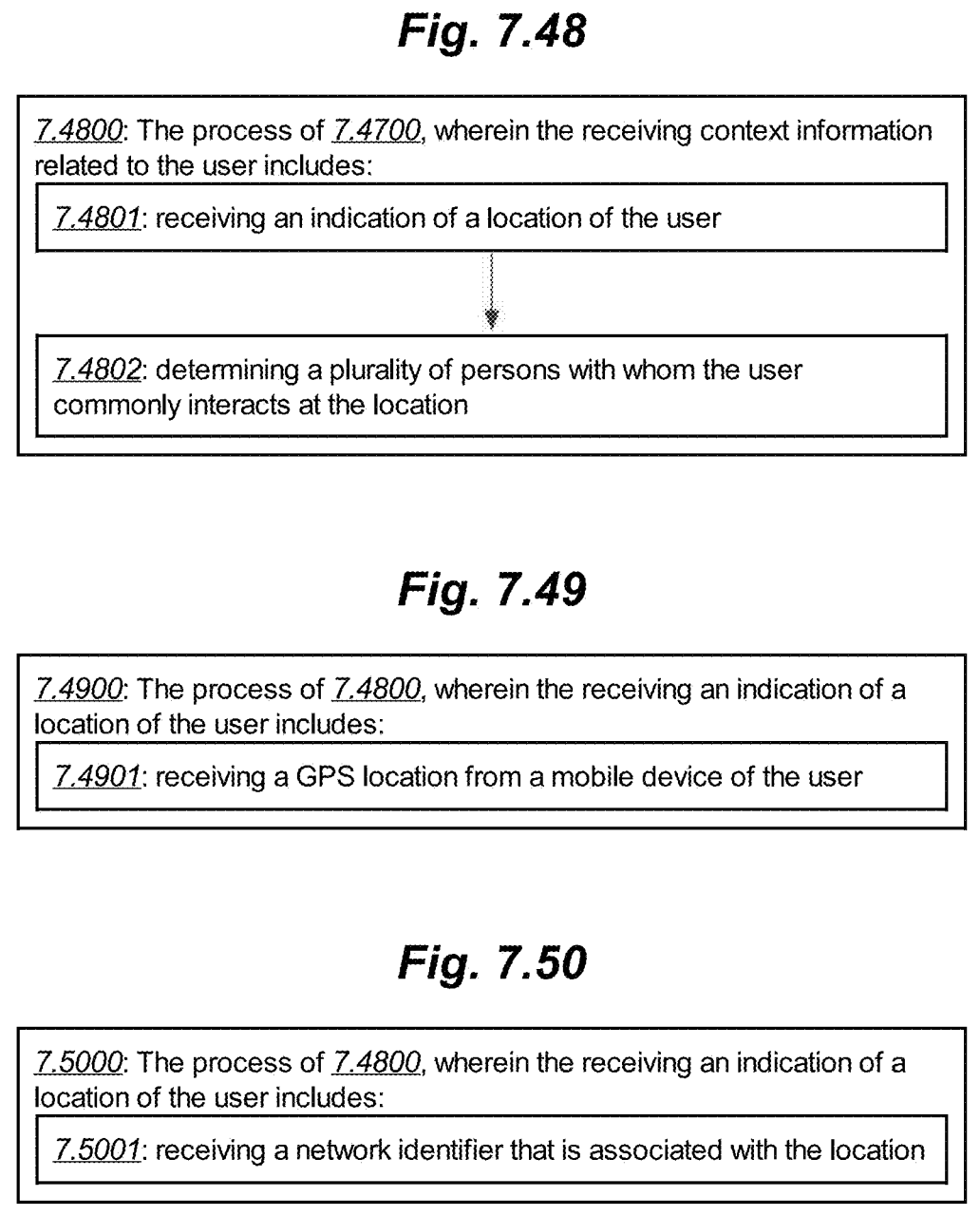

7.4800: The process of 7.4700, wherein the receiving context information related to the user includes:

7.4801: receiving an indication of a location of the user 7.4802: determining a plurality of persons with whom the user commonly interacts at the location

Fig. 7.49

7.4900: The process of 7.4800, wherein the receiving an indication of a location of the user includes:

7.4901: receiving a GPS location from a mobile device of the user

Fig. 7.50

7.5000: The process of 7.4800, wherein the receiving an indication of a location of the user includes:

7.5001: receiving a network identifier that is associated with the location

Fig. 7.51

_7.5100_: The process of _7.4800_, wherein the receiving an indication of a location of the user includes:

_7.5101_: receiving an indication that the user is at a workplace

Fig. 7.52

_7.5200_: The process of _7.4800_, wherein the receiving an indication of a location of the user includes:

_7.5201_: receiving an indication that the user is at a residence

Fig. 7.53

_7.5300_: The process of _7.4700_, wherein the receiving context information related to the user includes:

_7.5301_: receiving information about a communication that references the speaker

Fig. 7.54

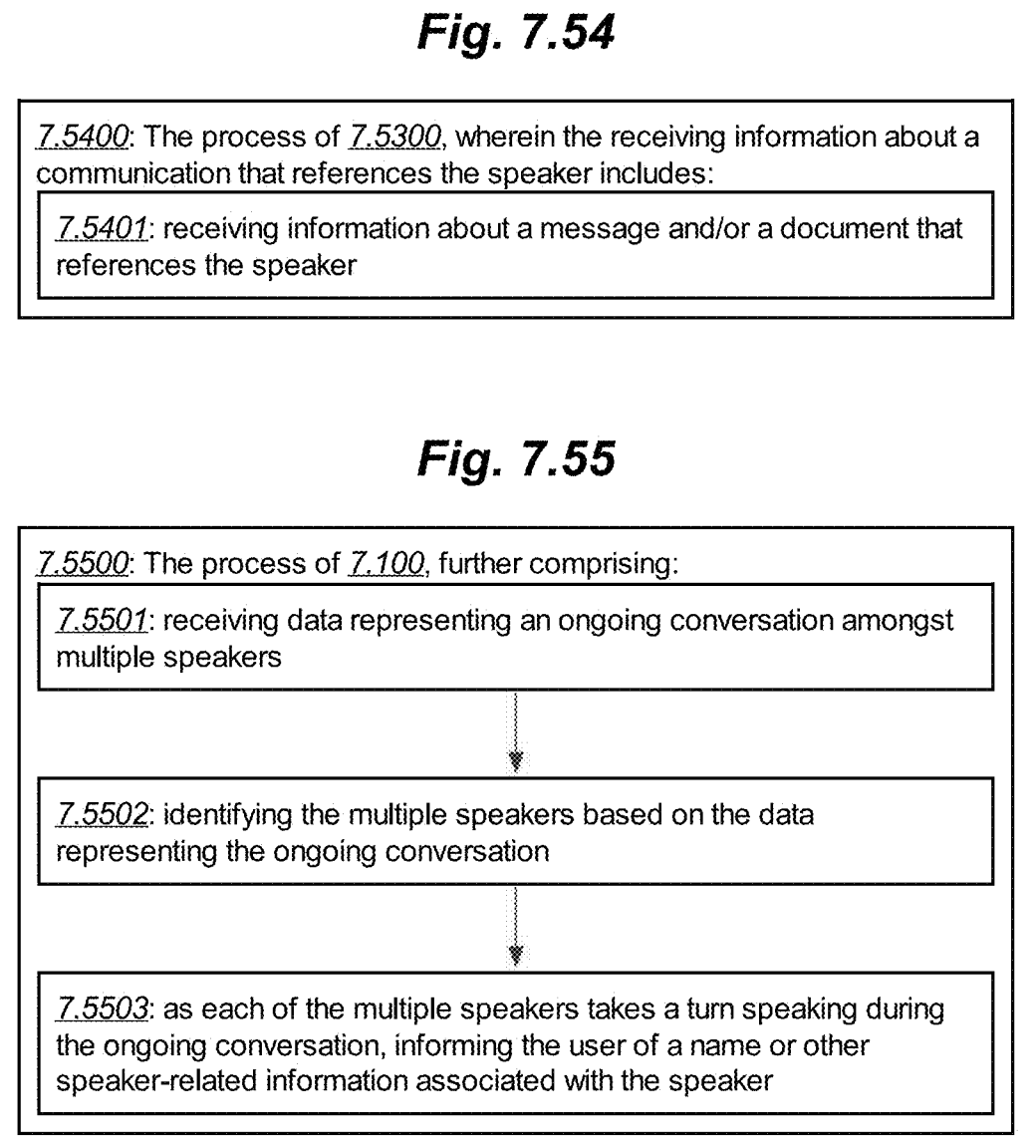

7.5400: The process of 7.5300, wherein the receiving information about a communication that references the speaker includes:

7.5401: receiving information about a message and/or a document that references the speaker

Fig. 7.55

7.5500: The process of 7.100, further comprising:

7.5501: receiving data representing an ongoing conversation amongst multiple speakers

↓

7.5502: identifying the multiple speakers based on the data representing the ongoing conversation

↓

7.5503: as each of the multiple speakers takes a turn speaking during the ongoing conversation, informing the user of a name or other speaker-related information associated with the speaker

Fig. 7.56

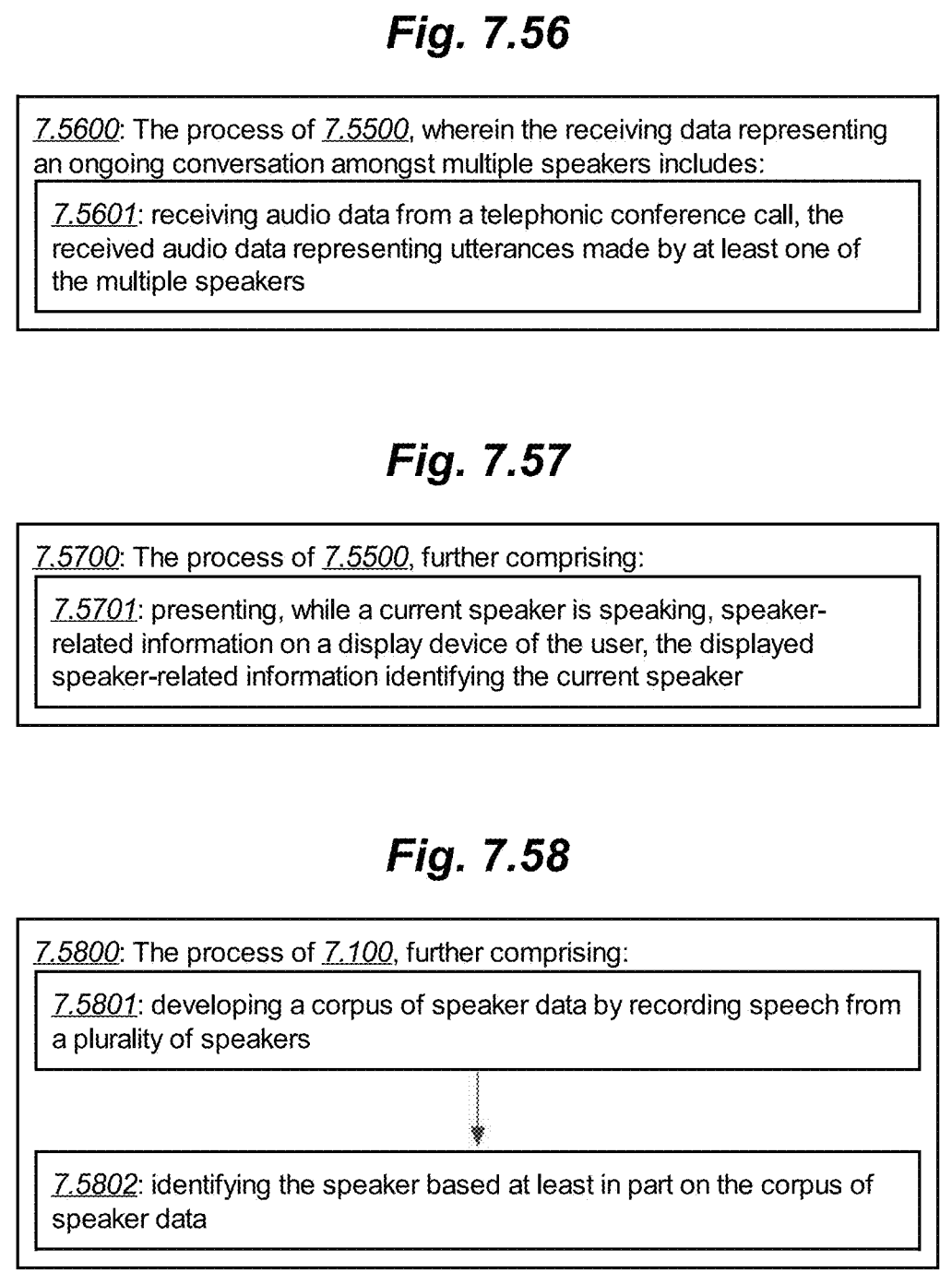

*7.5600*: The process of *7.5500*, wherein the receiving data representing an ongoing conversation amongst multiple speakers includes:

*7.5601*: receiving audio data from a telephonic conference call, the received audio data representing utterances made by at least one of the multiple speakers

Fig. 7.57

*7.5700*: The process of *7.5500*, further comprising:

*7.5701*: presenting, while a current speaker is speaking, speaker-related information on a display device of the user, the displayed speaker-related information identifying the current speaker

Fig. 7.58

*7.5800*: The process of *7.100*, further comprising:

*7.5801*: developing a corpus of speaker data by recording speech from a plurality of speakers

↓

*7.5802*: identifying the speaker based at least in part on the corpus of speaker data

*Fig. 7.59*

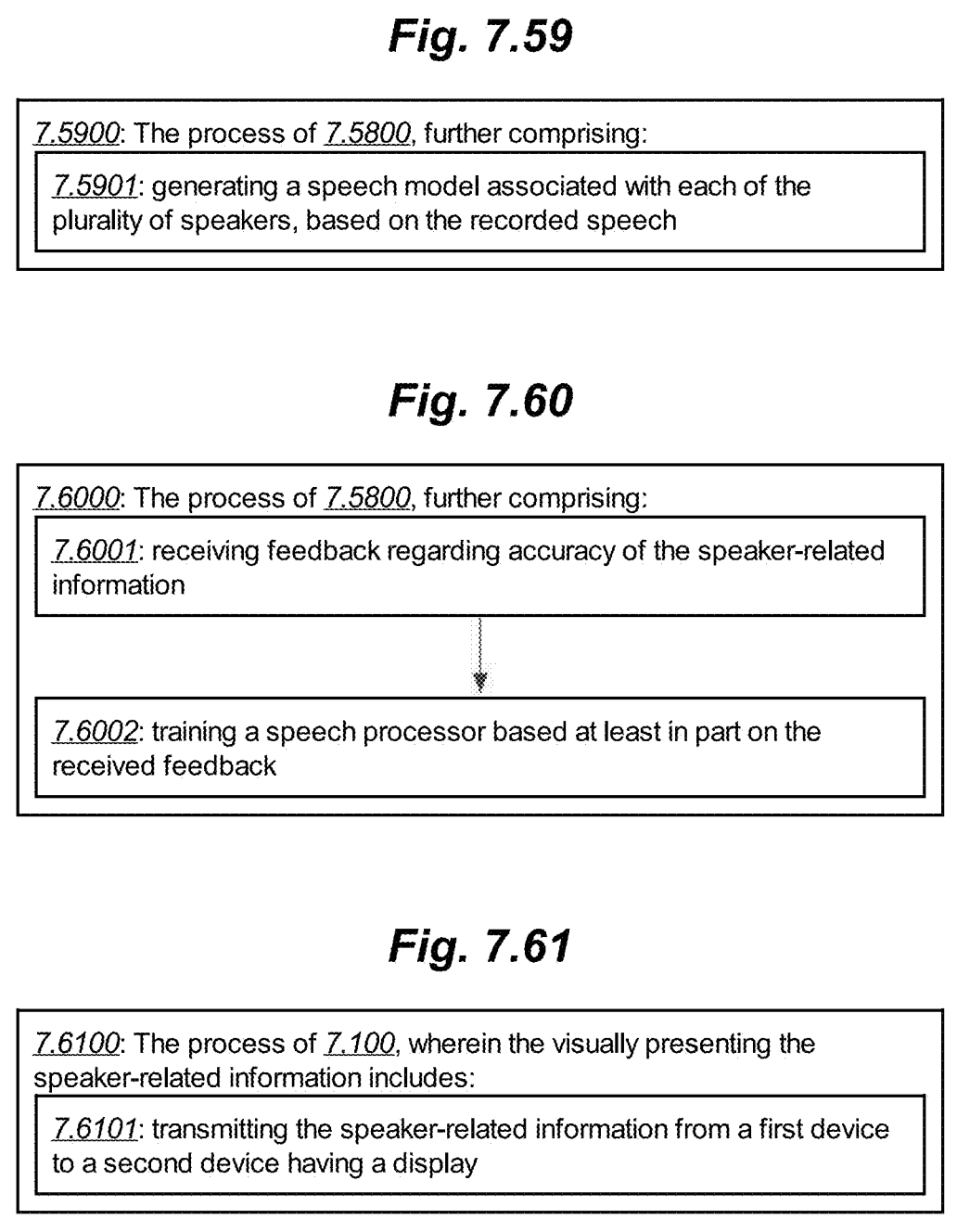

7.5900: The process of 7.5800, further comprising:

7.5901: generating a speech model associated with each of the plurality of speakers, based on the recorded speech

*Fig. 7.60*

7.6000: The process of 7.5800, further comprising:

7.6001: receiving feedback regarding accuracy of the speaker-related information

↓

7.6002: training a speech processor based at least in part on the received feedback

*Fig. 7.61*

7.6100: The process of 7.100, wherein the visually presenting the speaker-related information includes:

7.6101: transmitting the speaker-related information from a first device to a second device having a display

Fig. 7.62

*7.6200*: The process of *7.6100*, wherein the transmitting the speaker-related information from a first device to a second device includes:

*7.6201*: wirelessly transmitting the speaker-related information

Fig. 7.63

*7.6300*: The process of *7.6100*, wherein the transmitting the speaker-related information from a first device to a second device includes:

*7.6301*: transmitting the speaker-related information from a smart phone or portable media player to the second device

Fig. 7.64

*7.6400*: The process of *7.6100*, wherein the transmitting the speaker-related information from a first device to a second device includes:

*7.6401*: transmitting the speaker-related information from a server system to the second device

*Fig. 7.65*

| |
|---|
| 7.6500: The process of 7.6400, wherein the transmitting the speaker-related information from a server system includes: |
| 7.6501: transmitting the speaker-related information from a server system that resides in a data center |

*Fig. 7.66*

| |
|---|
| 7.6600: The process of 7.6400, wherein the transmitting the speaker-related information from a server system includes: |
| 7.6601: transmitting the speaker-related information from a server system to a desktop computer of the user |

*Fig. 7.67*

| |
|---|
| 7.6700: The process of 7.6400, wherein the transmitting the speaker-related information from a server system includes: |
| 7.6701: transmitting the speaker-related information from a server system to a mobile device of the user |

Fig. 7.68

7.6800: The process of 7.100, further comprising:

7.6801: performing the receiving data representing a speech signal, the identifying the speaker, and/or the determining speaker-related information on a mobile device that is operated by the user

Fig. 7.69

7.6900: The process of 7.6800, wherein the identifying the speaker includes:

7.6901: identifying the speaker, performed on a smart phone or a media player that is operated by the user

Fig. 7.70

7.7000: The process of 7.100, further comprising:

7.7001: performing the receiving data representing a speech signal, the identifying the speaker, and/or the determining speaker-related information on a desktop computer that is operated by the user

Fig. 7.71

*7.7100*: The process of *7.100*, further comprising:

*7.7101*: determining to perform at least some of identifying the speaker or determining speaker-related information on another computing device that has available processing capacity

Fig. 7.72

*7.7200*: The process of *7.7100*, further comprising:

*7.7201*: receiving at least some of speaker-related information from the another computing device

Fig. 7.73

*7.7300*: The process of *7.100*, further comprising:

*7.7301*: determining whether or not the user can name the speaker

*7.7302*: when it is determined that the user cannot name the speaker, visually presenting the speaker-related information

Fig. 7.74

*7.7400*: The process of *7.7300*, wherein the determining whether or not the user can name the speaker includes:

*7.7401*: determining whether the user has named the speaker

Fig. 7.75

*7.7500*: The process of *7.7400*, wherein the determining whether the user has named the speaker includes:

*7.7501*: determining whether the speaker has uttered a given name or surname of the speaker

Fig. 7.76

*7.7600*: The process of *7.7400*, wherein the determining whether the user has named the speaker includes:

*7.7601*: determining whether the speaker has uttered a nickname of the speaker

*Fig. 7.77*

7.7700: The process of 7.7400, wherein the determining whether the user has named the speaker includes:

7.7701: determining whether the speaker has uttered a name of a relationship between the user and the speaker

*Fig. 7.78*

7.7800: The process of 7.7300, wherein the determining whether or not the user can name the speaker includes:

7.7801: determining whether the user has uttered information that is related to both the speaker and the user

*Fig. 7.79*

7.7900: The process of 7.7400, wherein the determining whether the user has named the speaker includes:

7.7901: determining whether the user has named a person, place, thing, or event that the speaker and the user have in common

*Fig. 7.80*

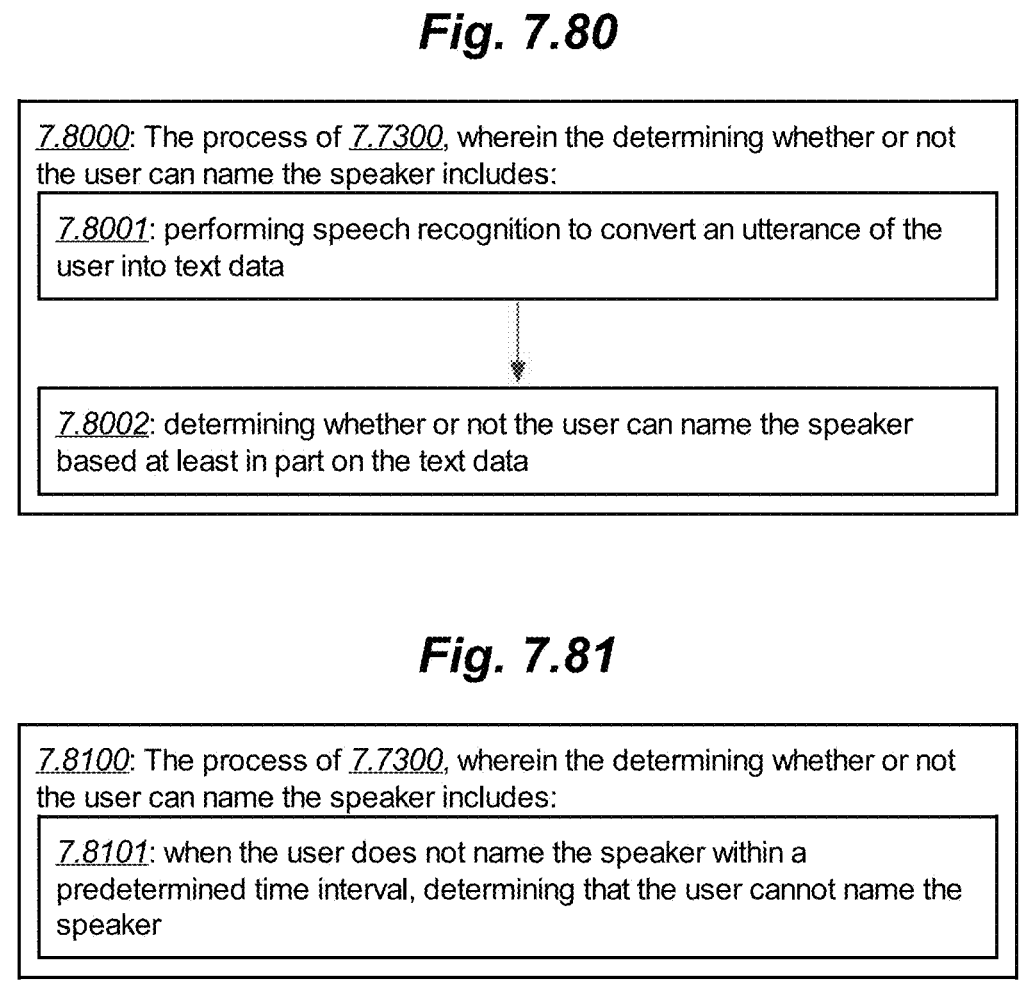

*7.8000*: The process of *7.7300*, wherein the determining whether or not the user can name the speaker includes:

*7.8001*: performing speech recognition to convert an utterance of the user into text data

*7.8002*: determining whether or not the user can name the speaker based at least in part on the text data

*Fig. 7.81*

*7.8100*: The process of *7.7300*, wherein the determining whether or not the user can name the speaker includes:

*7.8101*: when the user does not name the speaker within a predetermined time interval, determining that the user cannot name the speaker Fig. 11.1
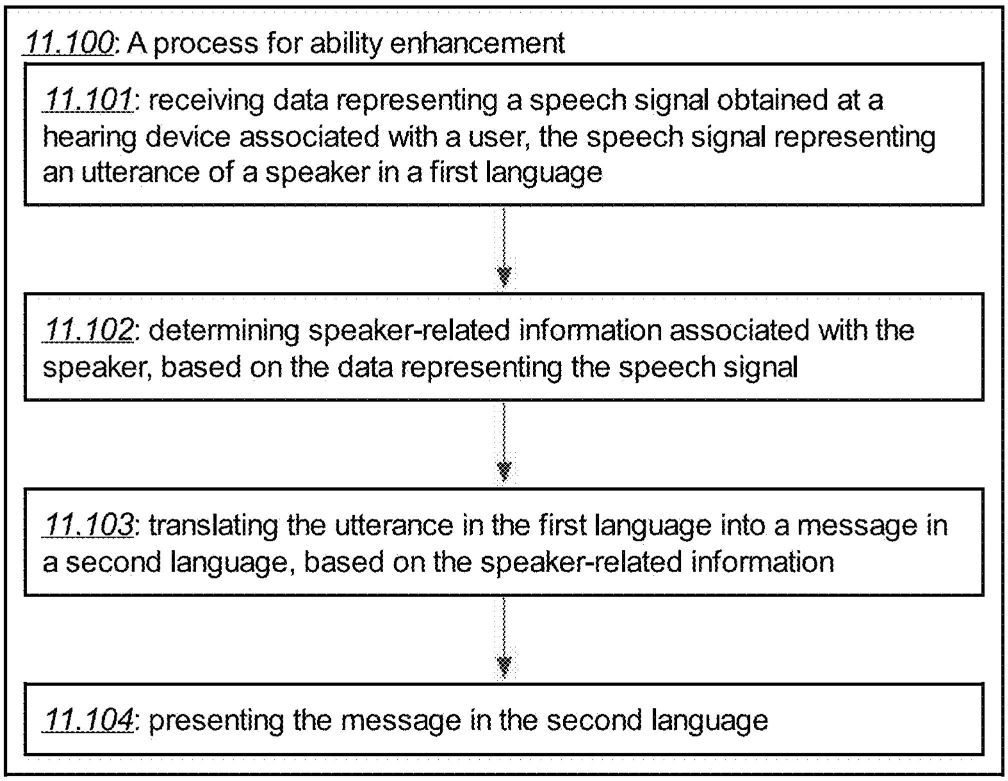
Fig. 11.2
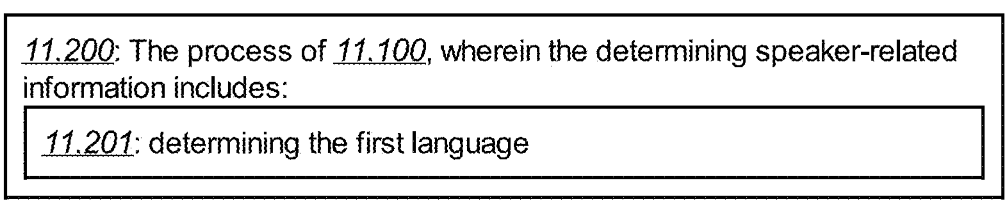

Fig. 11.3

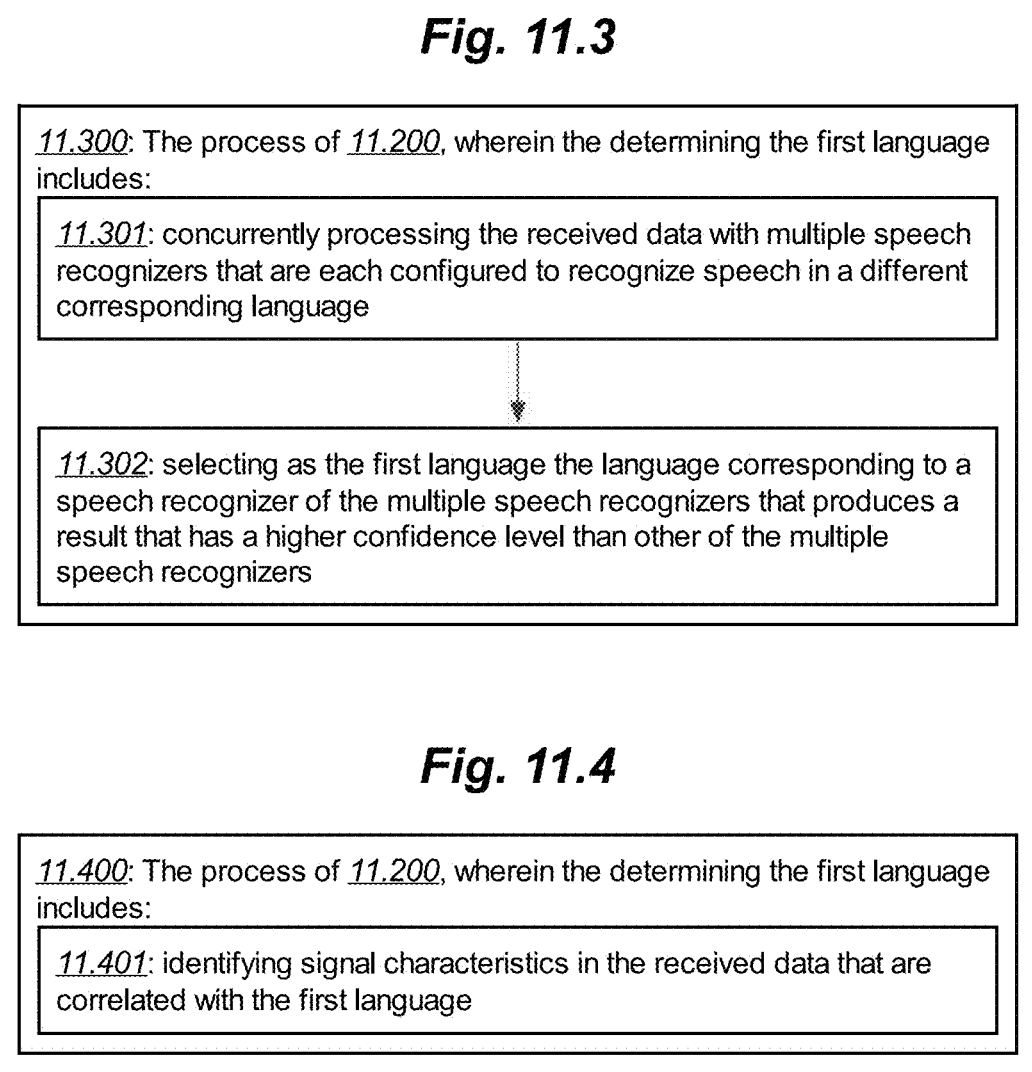

11.300: The process of 11.200, wherein the determining the first language includes:

11.301: concurrently processing the received data with multiple speech recognizers that are each configured to recognize speech in a different corresponding language 11.302: selecting as the first language the language corresponding to a speech recognizer of the multiple speech recognizers that produces a result that has a higher confidence level than other of the multiple speech recognizers

Fig. 11.4

11.400: The process of 11.200, wherein the determining the first language includes:

11.401: identifying signal characteristics in the received data that are correlated with the first language

Fig. 11.5

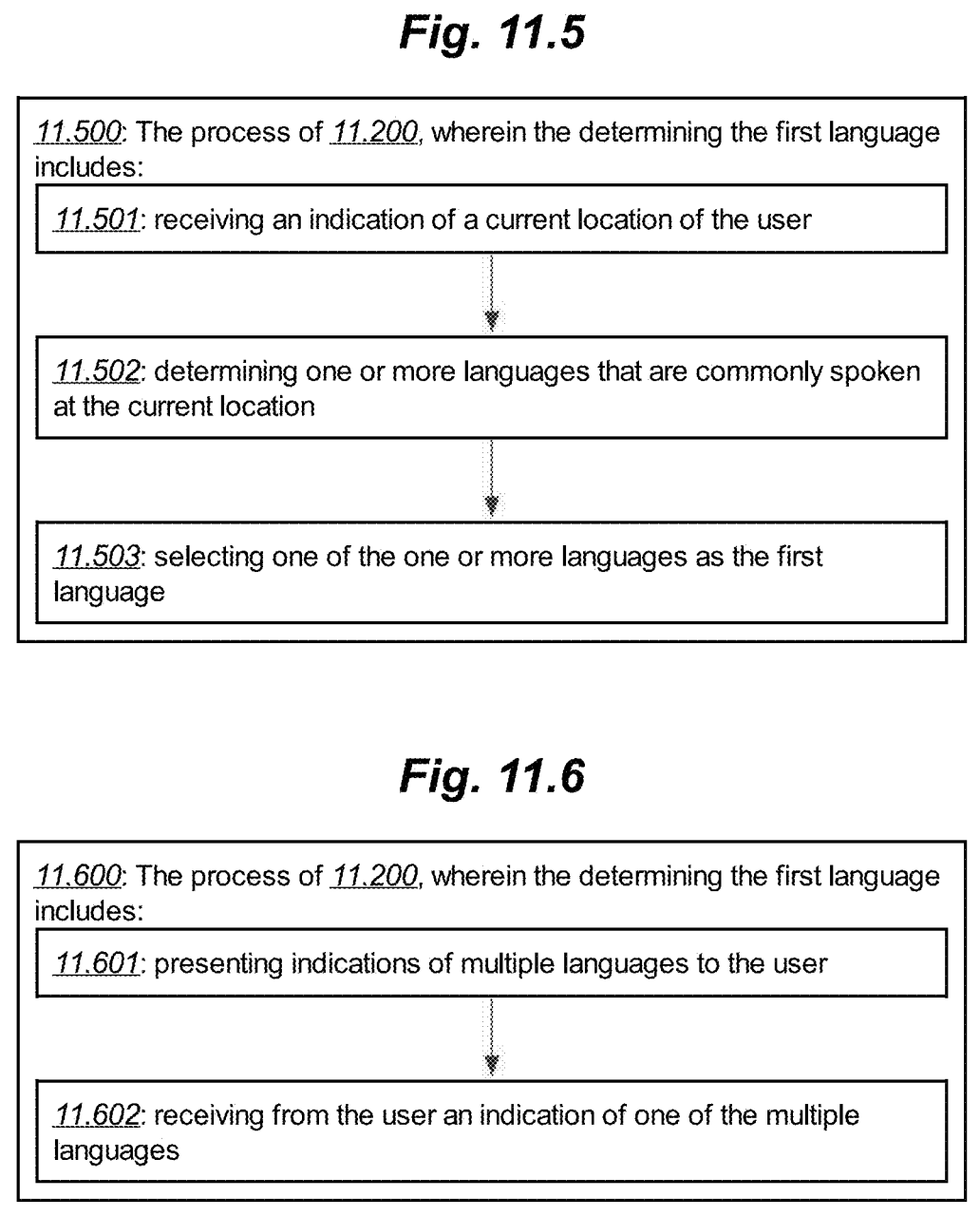

11.500: The process of 11.200, wherein the determining the first language includes:

11.501: receiving an indication of a current location of the user

↓

11.502: determining one or more languages that are commonly spoken at the current location

↓

11.503: selecting one of the one or more languages as the first language

Fig. 11.6

11.600: The process of 11.200, wherein the determining the first language includes:

11.601: presenting indications of multiple languages to the user

↓

11.602: receiving from the user an indication of one of the multiple languages

Fig. 11.7

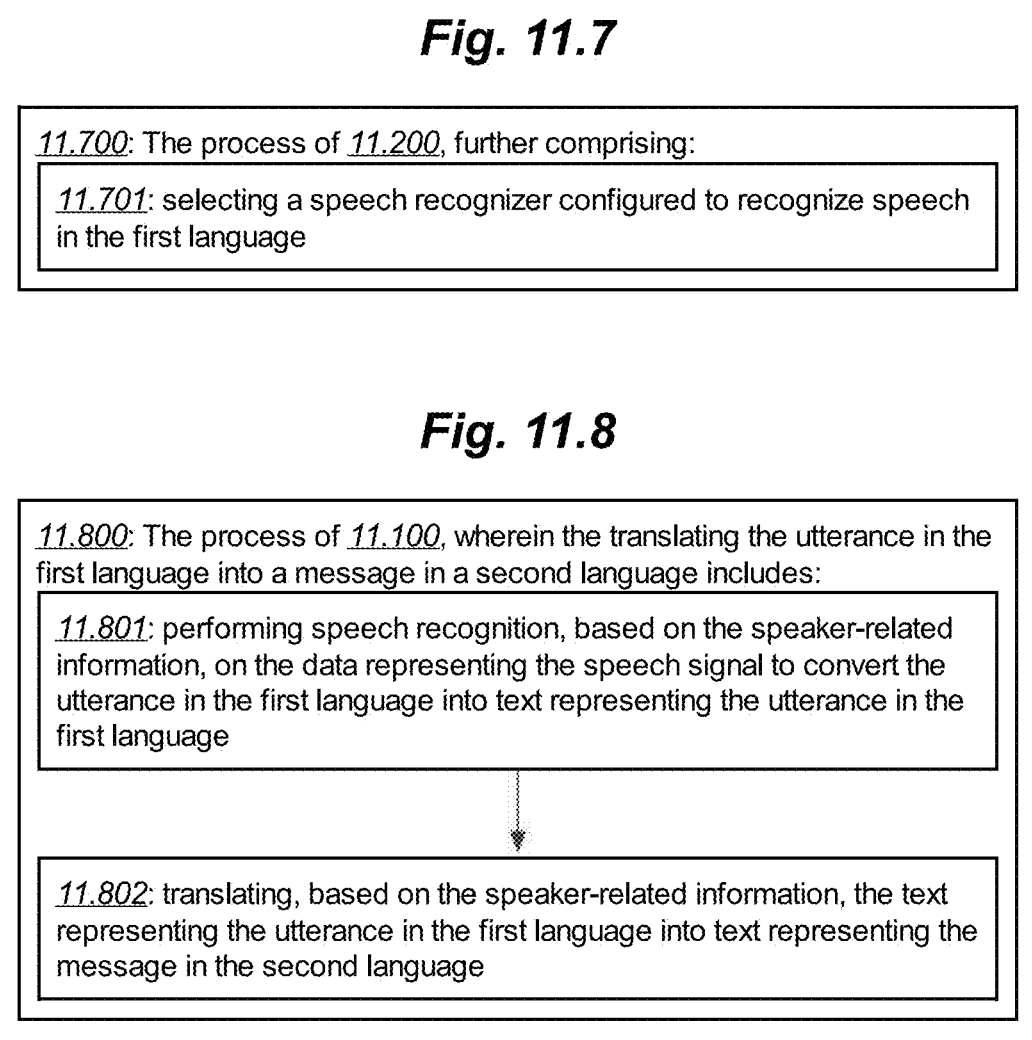

11.700: The process of 11.200, further comprising:

11.701: selecting a speech recognizer configured to recognize speech in the first language

Fig. 11.8

11.800: The process of 11.100, wherein the translating the utterance in the first language into a message in a second language includes:

11.801: performing speech recognition, based on the speaker-related information, on the data representing the speech signal to convert the utterance in the first language into text representing the utterance in the first language

↓

11.802: translating, based on the speaker-related information, the text representing the utterance in the first language into text representing the message in the second language

*Fig. 11.9*

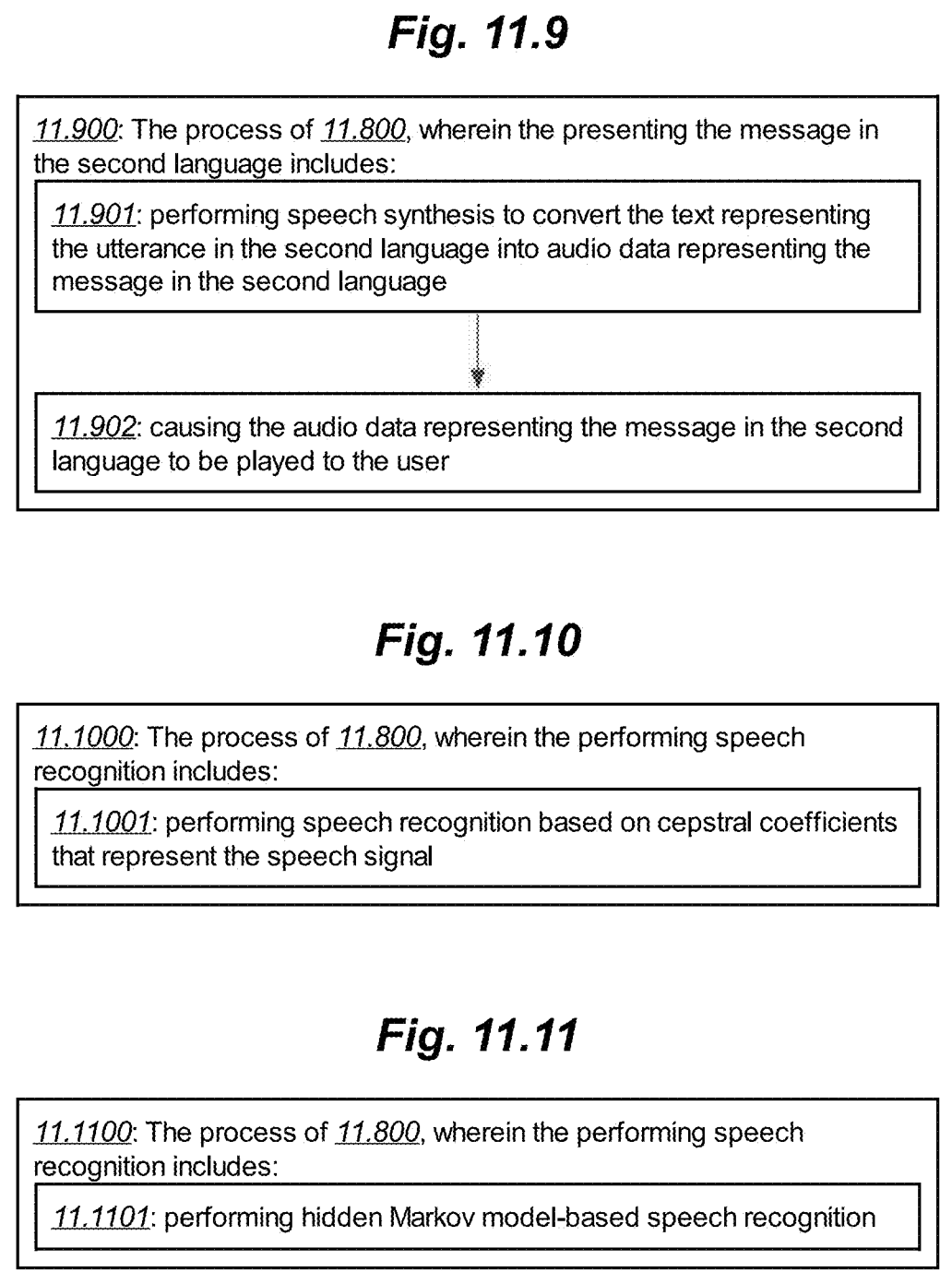

11.900: The process of 11.800, wherein the presenting the message in the second language includes:

11.901: performing speech synthesis to convert the text representing the utterance in the second language into audio data representing the message in the second language

↓

11.902: causing the audio data representing the message in the second language to be played to the user

*Fig. 11.10*

11.1000: The process of 11.800, wherein the performing speech recognition includes:

11.1001: performing speech recognition based on cepstral coefficients that represent the speech signal

*Fig. 11.11*

11.1100: The process of 11.800, wherein the performing speech recognition includes:

11.1101: performing hidden Markov model-based speech recognition

Fig. 11.12

11.1200: The process of 11.100, wherein the translating the utterance in the first language into a message in a second language includes:

11.1201: translating the utterance based on speaker-related information including an identity of the speaker

Fig. 11.13

11.1300: The process of 11.100, wherein the translating the utterance in the first language into a message in a second language includes:

11.1301: translating the utterance based on speaker-related information including a language model that is specific to the speaker

Fig. 11.14

11.1400: The process of 11.1300, wherein the translating the utterance based on speaker-related information including a language model that is specific to the speaker includes:

11.1401: translating the utterance based on a language model that is tailored to a group of people of which the speaker is a member

*Fig. 11.15*

*11.1500*: The process of *11.1300*, wherein the translating the utterance based on speaker-related information including a language model that is specific to the speaker includes:

*11.1501*: generating the language model based on communications generated by the speaker

*Fig. 11.16*

*11.1600*: The process of *11.1500*, wherein the generating the language model based on communications generated by the speaker includes:

*11.1601*: generating the language model based on emails transmitted by the speaker

*Fig. 11.17*

*11.1700*: The process of *11.1500*, wherein the generating the language model based on communications generated by the speaker includes:

*11.1701*: generating the language model based on documents authored by the speaker

*Fig. 11.18*

*11.1800*: The process of *11.1500*, wherein the generating the language model based on communications generated by the speaker includes:

*11.1801*: generating the language model based on social network messages transmitted by the speaker

*Fig. 11.19*

*11.1900*: The process of *11.100*, wherein the translating the utterance in the first language into a message in a second language includes:

*11.1901*: translating the utterance based on speaker-related information including a speech model that is tailored to the speaker

*Fig. 11.20*

*11.2000*: The process of *11.1900*, wherein the translating the utterance based on speaker-related information including a speech model that is tailored to the speaker includes:

*11.2001*: translating the utterance based on a speech model that is tailored to a group of people of which the speaker is a member

Fig. 11.21

11.2100: The process of 11.100, wherein the translating the utterance in the first language into a message in a second language includes:

11.2101: translating the utterance based on speaker-related information including an information item that references the speaker

Fig. 11.22

11.2200: The process of 11.100, wherein the translating the utterance in the first language into a message in a second language includes:

11.2201: translating the utterance based on speaker-related information including a document that references the speaker

Fig. 11.23

11.2300: The process of 11.100, wherein the translating the utterance in the first language into a message in a second language includes:

11.2301: translating the utterance based on speaker-related information including a message that references the speaker

*Fig. 11.24*

11.2400: The process of 11.100, wherein the translating the utterance in the first language into a message in a second language includes:

11.2401: translating the utterance based on speaker-related information including a calendar event that references the speaker

*Fig. 11.25*

11.2500: The process of 11.100, wherein the translating the utterance in the first language into a message in a second language includes:

11.2501: translating the utterance based on speaker-related information including an indication of gender of the speaker

*Fig. 11.26*

11.2600: The process of 11.100, wherein the translating the utterance in the first language into a message in a second language includes:

11.2601: translating the utterance based on speaker-related information including an organization to which the speaker belongs

Fig. 11.27

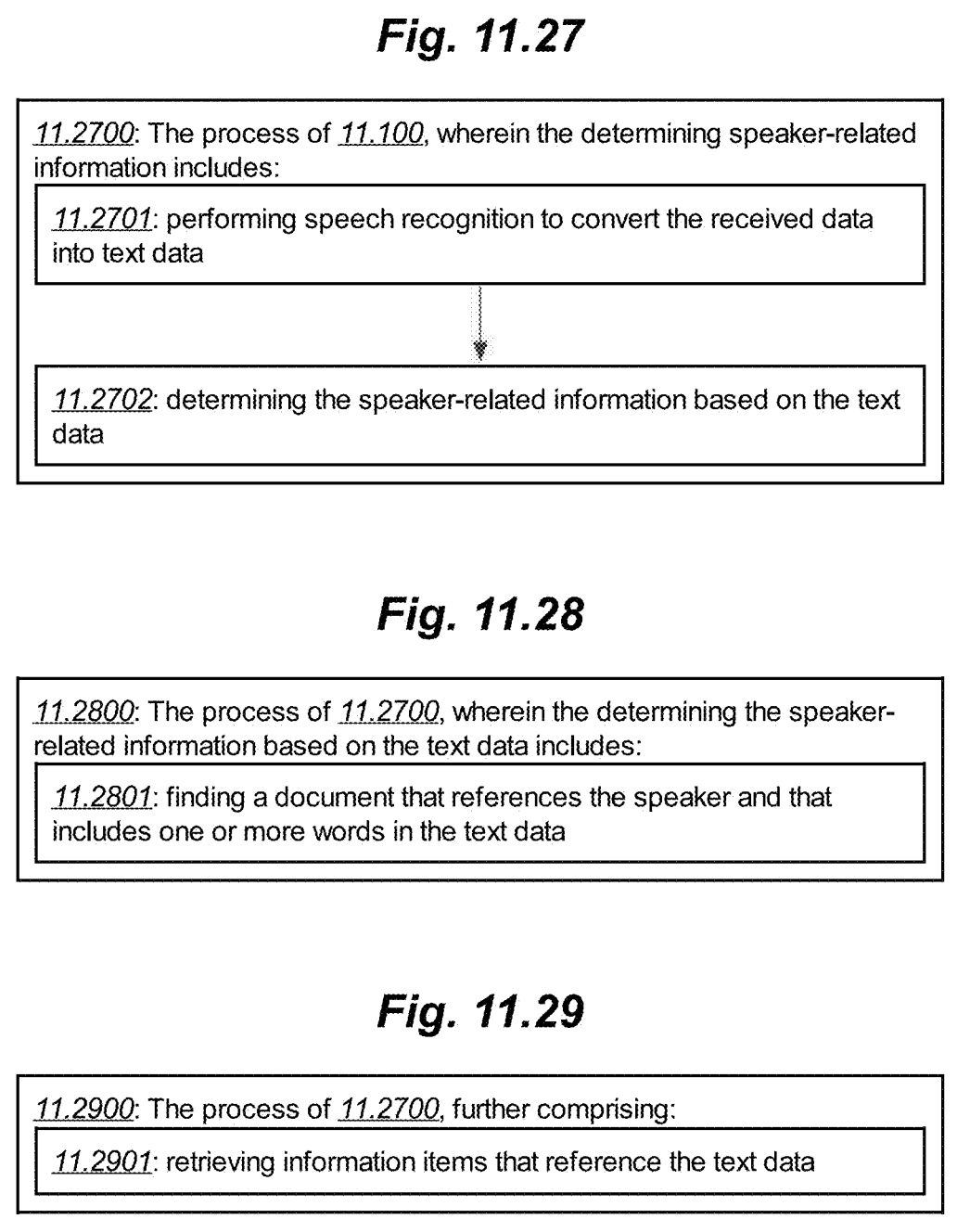

11.2700: The process of 11.100, wherein the determining speaker-related information includes:

11.2701: performing speech recognition to convert the received data into text data

↓

11.2702: determining the speaker-related information based on the text data

Fig. 11.28

11.2800: The process of 11.2700, wherein the determining the speaker-related information based on the text data includes:

11.2801: finding a document that references the speaker and that includes one or more words in the text data

Fig. 11.29

11.2900: The process of 11.2700, further comprising:

11.2901: retrieving information items that reference the text data

*Fig. 11.30*

11.3000: The process of 11.100, wherein the determining speaker-related information includes:

11.3001: accessing information items associated with the speaker

*Fig. 11.31*

11.3100: The process of 11.3000, wherein the accessing information items associated with the speaker includes:

11.3101: searching for information items that reference the speaker

*Fig. 11.32*

11.3200: The process of 11.3000, wherein the accessing information items associated with the speaker includes:

11.3201: searching stored emails to find emails that reference the speaker

Fig. 11.33

<u>11.3300</u>: The process of <u>11.3000</u>, wherein the accessing information items associated with the speaker includes:

<u>11.3301</u>: searching stored text messages to find text messages that reference the speaker

Fig. 11.34

<u>11.3400</u>: The process of <u>11.3000</u>, wherein the accessing information items associated with the speaker includes:

<u>11.3401</u>: accessing a social networking service to find messages or status updates that reference the speaker

Fig. 11.35

<u>11.3500</u>: The process of <u>11.3000</u>, wherein the accessing information items associated with the speaker includes:

<u>11.3501</u>: accessing a calendar to find information about appointments with the speaker

*Fig. 11.36*

<u>*11.3600*</u>: The process of <u>*11.3000*</u>, wherein the accessing information items associated with the speaker includes:

> <u>*11.3601*</u>: accessing a document store to find documents that reference the speaker

*Fig. 11.37*

<u>*11.3700*</u>: The process of <u>*11.100*</u>, wherein the determining speaker-related information includes:

> <u>*11.3701*</u>: performing voice identification based on the received data to identify the speaker

*Fig. 11.38*

<u>*11.3800*</u>: The process of <u>*11.3700*</u>, wherein the performing voice identification includes:

> <u>*11.3801*</u>: comparing properties of the speech signal with properties of previously recorded speech signals from multiple distinct speakers

*Fig. 11.39*

11.3900: The process of 11.3800, further comprising:

11.3901: processing voice messages from the multiple distinct speakers to generate voice print data for each of the multiple distinct speakers

*Fig. 11.40*

11.4000: The process of 11.3700, wherein the performing voice identification includes:

11.4001: processing telephone voice messages stored by a voice mail service

*Fig. 11.41*

11.4100: The process of 11.3700, further comprising:

11.4101: determining that the speaker cannot be identified

*Fig. 11.42*

11.4200: The process of 11.4100, further comprising:

11.4201: when it is determined that the speaker cannot be identified, storing the received data for system training

Fig. 11.43

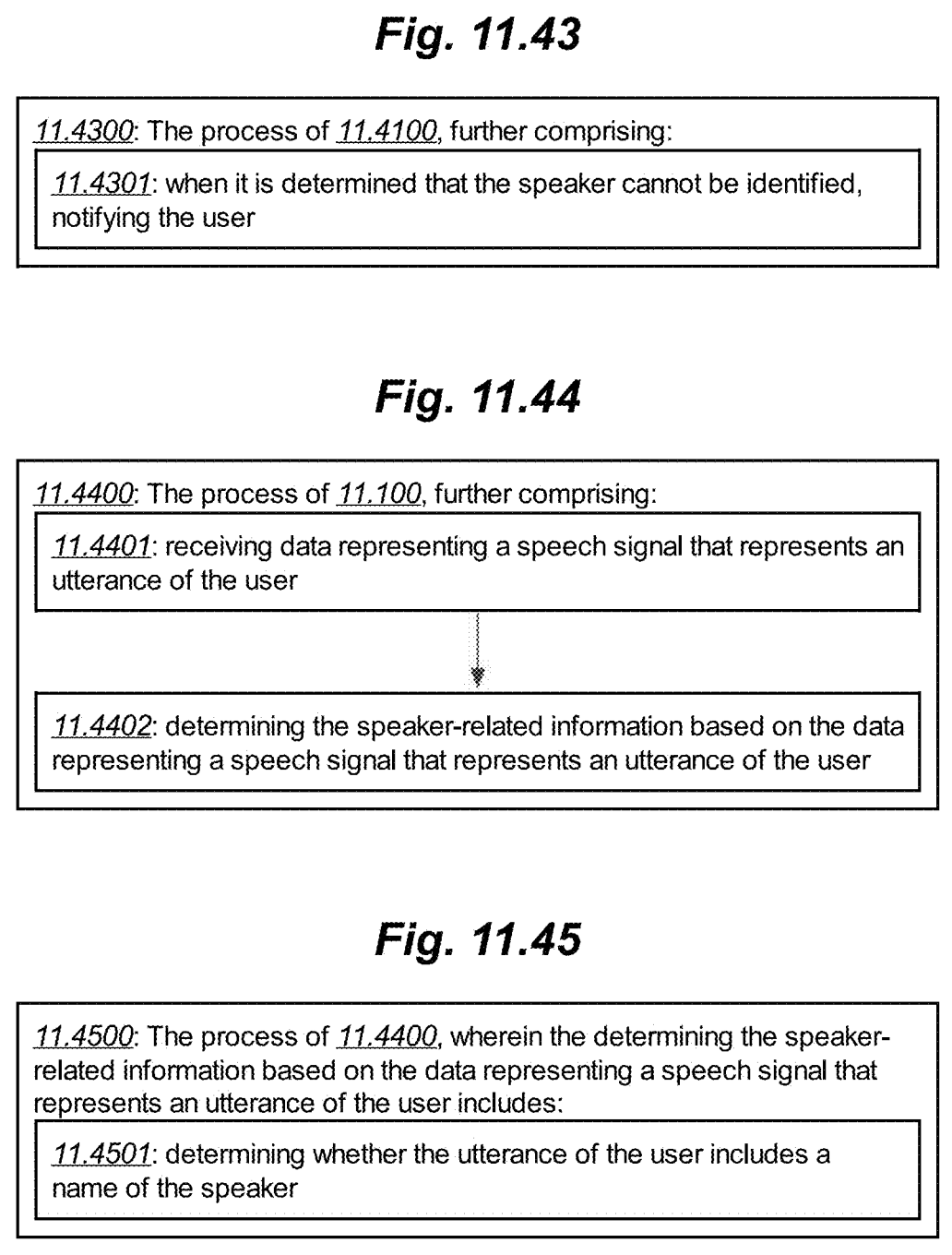

11.4300: The process of 11.4100, further comprising:

11.4301: when it is determined that the speaker cannot be identified, notifying the user

Fig. 11.44

11.4400: The process of 11.100, further comprising:

11.4401: receiving data representing a speech signal that represents an utterance of the user 11.4402: determining the speaker-related information based on the data representing a speech signal that represents an utterance of the user

Fig. 11.45

11.4500: The process of 11.4400, wherein the determining the speaker-related information based on the data representing a speech signal that represents an utterance of the user includes:

11.4501: determining whether the utterance of the user includes a name of the speaker

Fig. 11.46

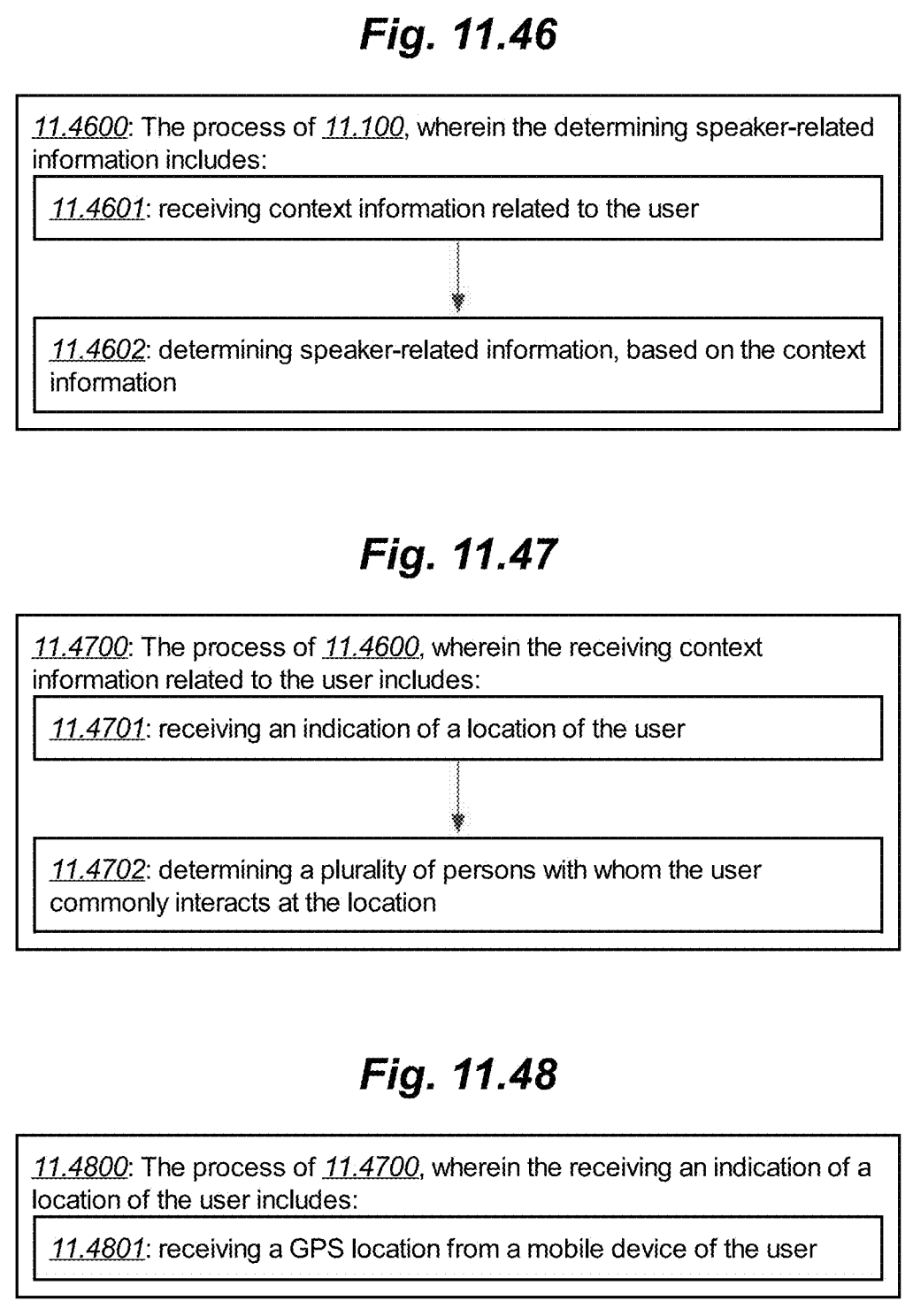

11.4600: The process of 11.100, wherein the determining speaker-related information includes:

11.4601: receiving context information related to the user

↓

11.4602: determining speaker-related information, based on the context information

Fig. 11.47

11.4700: The process of 11.4600, wherein the receiving context information related to the user includes:

11.4701: receiving an indication of a location of the user

↓

11.4702: determining a plurality of persons with whom the user commonly interacts at the location

Fig. 11.48

11.4800: The process of 11.4700, wherein the receiving an indication of a location of the user includes:

11.4801: receiving a GPS location from a mobile device of the user

Fig. 11.49

_11.4900_: The process of _11.4700_, wherein the receiving an indication of a location of the user includes:

_11.4901_: receiving a network identifier that is associated with the location

Fig. 11.50

_11.5000_: The process of _11.4700_, wherein the receiving an indication of a location of the user includes:

_11.5001_: receiving an indication that the user is at a workplace or a residence

Fig. 11.51

_11.5100_: The process of _11.4600_, wherein the receiving context information related to the user includes:

_11.5101_: receiving information about a communication that references the speaker

Fig. 11.52

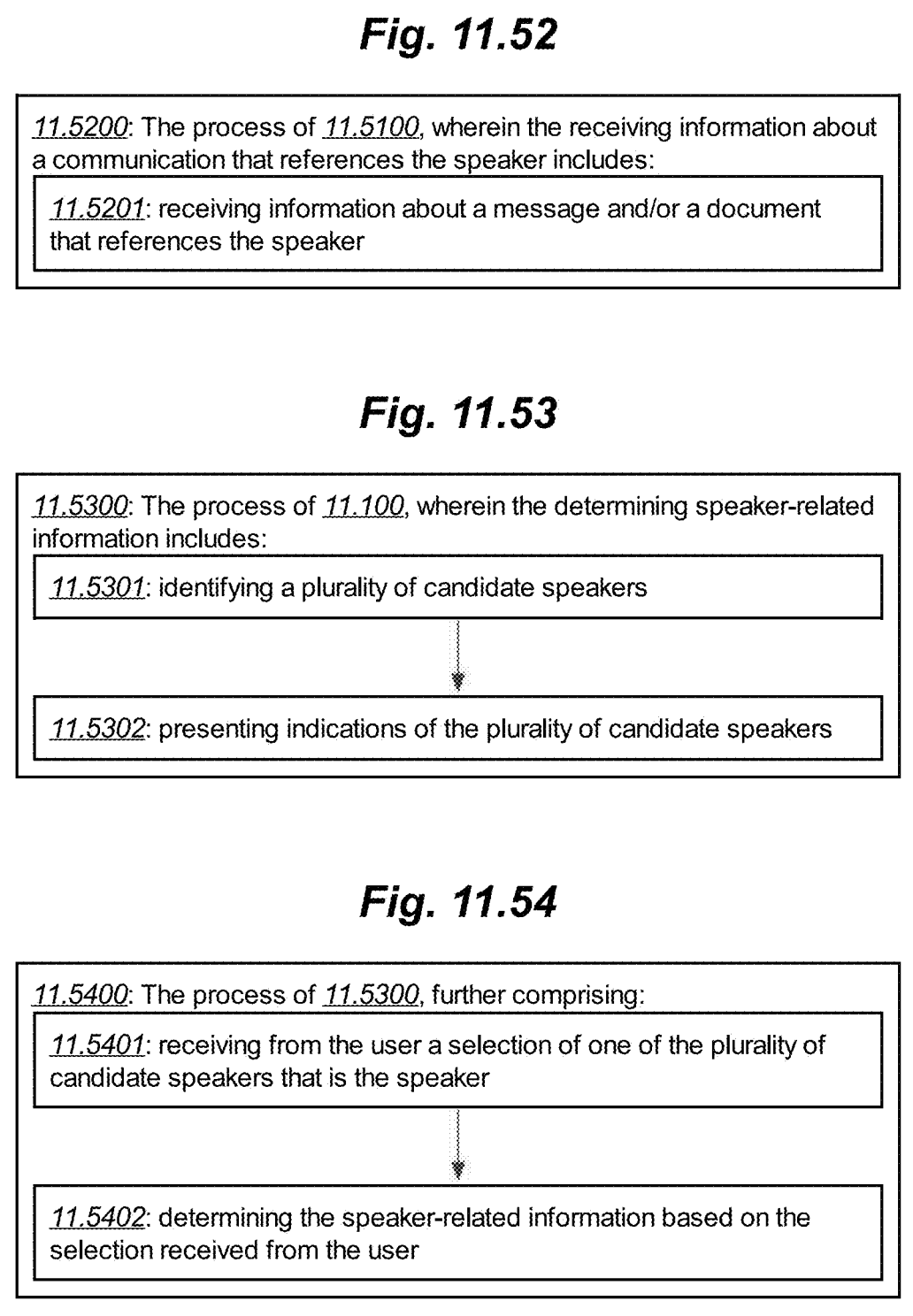

11.5200: The process of 11.5100, wherein the receiving information about a communication that references the speaker includes:

11.5201: receiving information about a message and/or a document that references the speaker

Fig. 11.53

11.5300: The process of 11.100, wherein the determining speaker-related information includes:

11.5301: identifying a plurality of candidate speakers 11.5302: presenting indications of the plurality of candidate speakers

Fig. 11.54

11.5400: The process of 11.5300, further comprising:

11.5401: receiving from the user a selection of one of the plurality of candidate speakers that is the speaker 11.5402: determining the speaker-related information based on the selection received from the user

Fig. 11.55

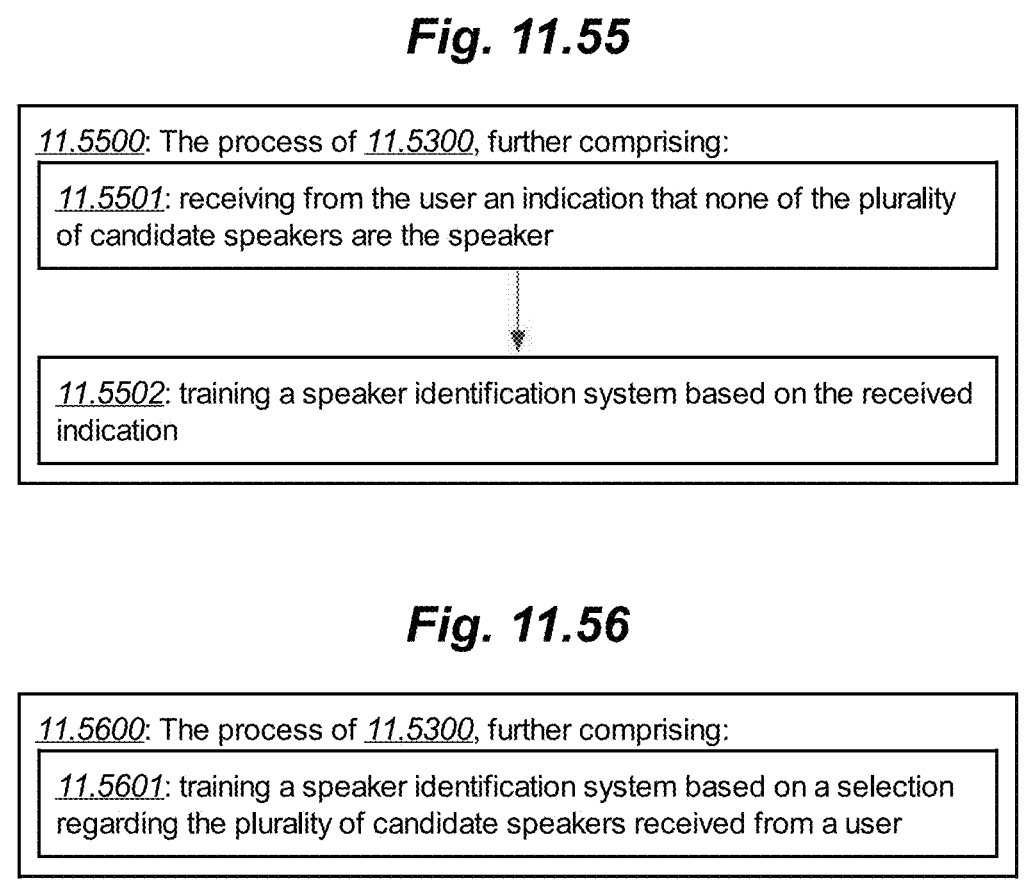

11.5500: The process of 11.5300, further comprising:

11.5501: receiving from the user an indication that none of the plurality of candidate speakers are the speaker

↓

11.5502: training a speaker identification system based on the received indication

Fig. 11.56

11.5600: The process of 11.5300, further comprising:

11.5601: training a speaker identification system based on a selection regarding the plurality of candidate speakers received from a user

Fig. 11.57

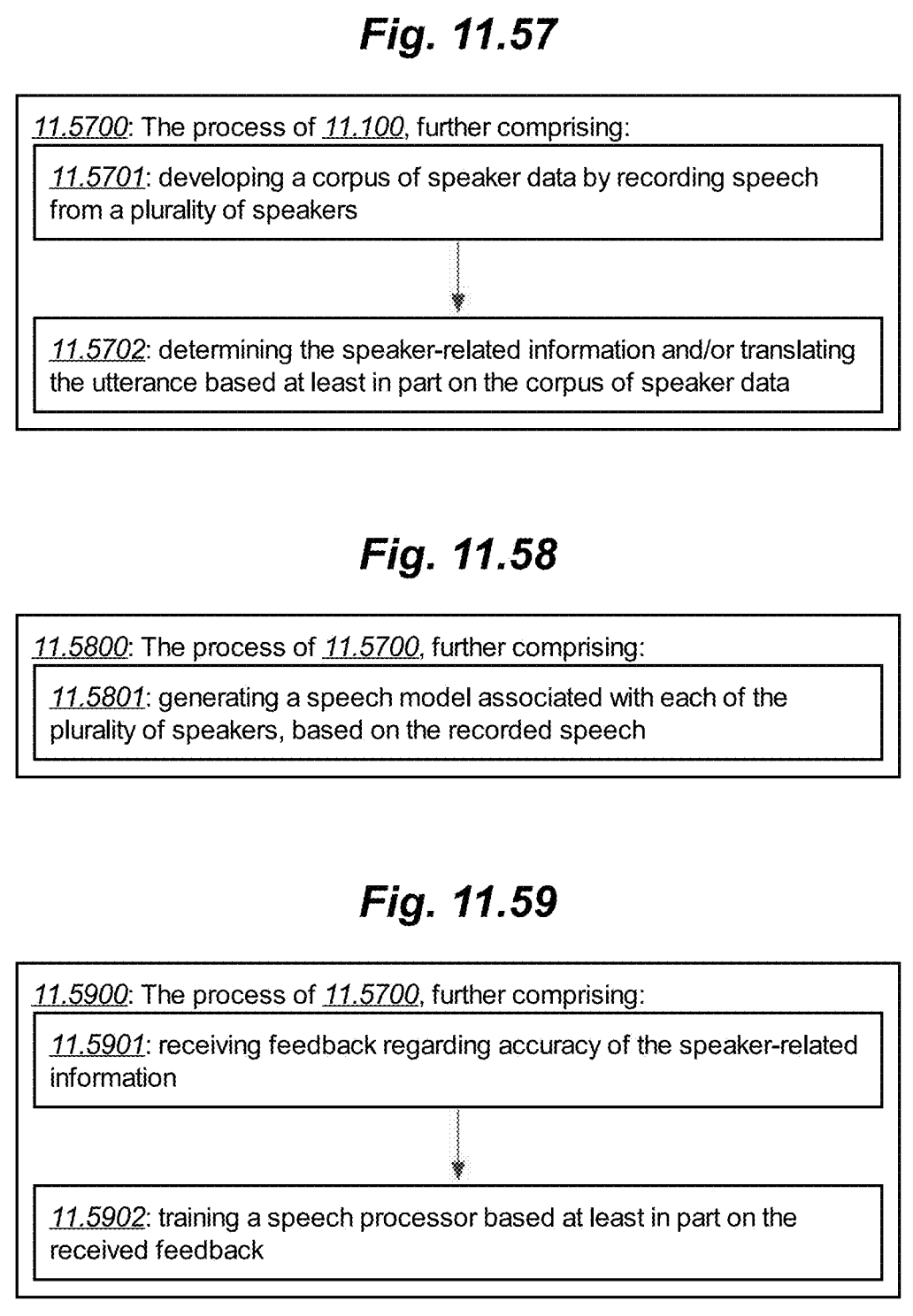

11.5700: The process of 11.100, further comprising:

11.5701: developing a corpus of speaker data by recording speech from a plurality of speakers

↓

11.5702: determining the speaker-related information and/or translating the utterance based at least in part on the corpus of speaker data

Fig. 11.58

11.5800: The process of 11.5700, further comprising:

11.5801: generating a speech model associated with each of the plurality of speakers, based on the recorded speech

Fig. 11.59

11.5900: The process of 11.5700, further comprising:

11.5901: receiving feedback regarding accuracy of the speaker-related information

↓

11.5902: training a speech processor based at least in part on the received feedback

*Fig. 11.60*

| |
|---|
| 11.6000: The process of 11.100, wherein the presenting the message in the second language includes: |
| 11.6001: transmitting the message in the second language from a first device to a second device |

*Fig. 11.61*

| |
|---|
| 11.6100: The process of 11.6000, wherein the transmitting the message in the second language from a first device to a second device includes: |
| 11.6101: wirelessly transmitting the message in the second language |

*Fig. 11.62*

| |
|---|
| 11.6200: The process of 11.6000, wherein the transmitting the message in the second language from a first device to a second device includes: |
| 11.6201: transmitting the message in the second language from a smart phone or portable media device to the second device |

*Fig. 11.63*

*11.6300*: The process of *11.6000*, wherein the transmitting the message in the second language from a first device to a second device includes:

*11.6301*: transmitting the message in the second language from a server system to the second device

*Fig. 11.64*

*11.6400*: The process of *11.6300*, wherein the transmitting the message in the second language from a server system includes:

*11.6401*: transmitting the message in the second language from a server system that resides in a data center

*Fig. 11.65*

*11.6500*: The process of *11.6300*, wherein the transmitting the message in the second language from a server system includes:

*11.6501*: transmitting the message in the second language from a server system to a desktop computer of the user

Fig. 11.66

11.6600: The process of 11.6300, wherein the transmitting the message in the second language from a server system includes:

11.6601: transmitting the message in the second language from a server system to a mobile device of the user

Fig. 11.67

11.6700: The process of 11.100, further comprising:

11.6701: performing the receiving data representing a speech signal, the determining speaker-related information, the translating the utterance in the first language into a message in a second language, and/or the presenting the message in the second language on a mobile device that is operated by the user

Fig. 11.68

11.6800: The process of 11.100, further comprising:

11.6801: performing the receiving data representing a speech signal, the determining speaker-related information, the translating the utterance in the first language into a message in a second language, and/or the presenting the message in the second language on a desktop computer that is operated by the user

Fig. 11.69

*11.6900*: The process of *11.100*, further comprising:

*11.6901*: determining to perform at least some of determining speaker-related information or translating the utterance in the first language into a message in a second language on another computing device that has available processing capacity

Fig. 11.70

*11.7000*: The process of *11.6900*, further comprising:

*11.7001*: receiving at least some of speaker-related information from the another computing device

Fig. 11.71

*11.7100*: The process of *11.100*, further comprising:

*11.7101*: informing the user of the speaker-related information

*Fig. 11.72*

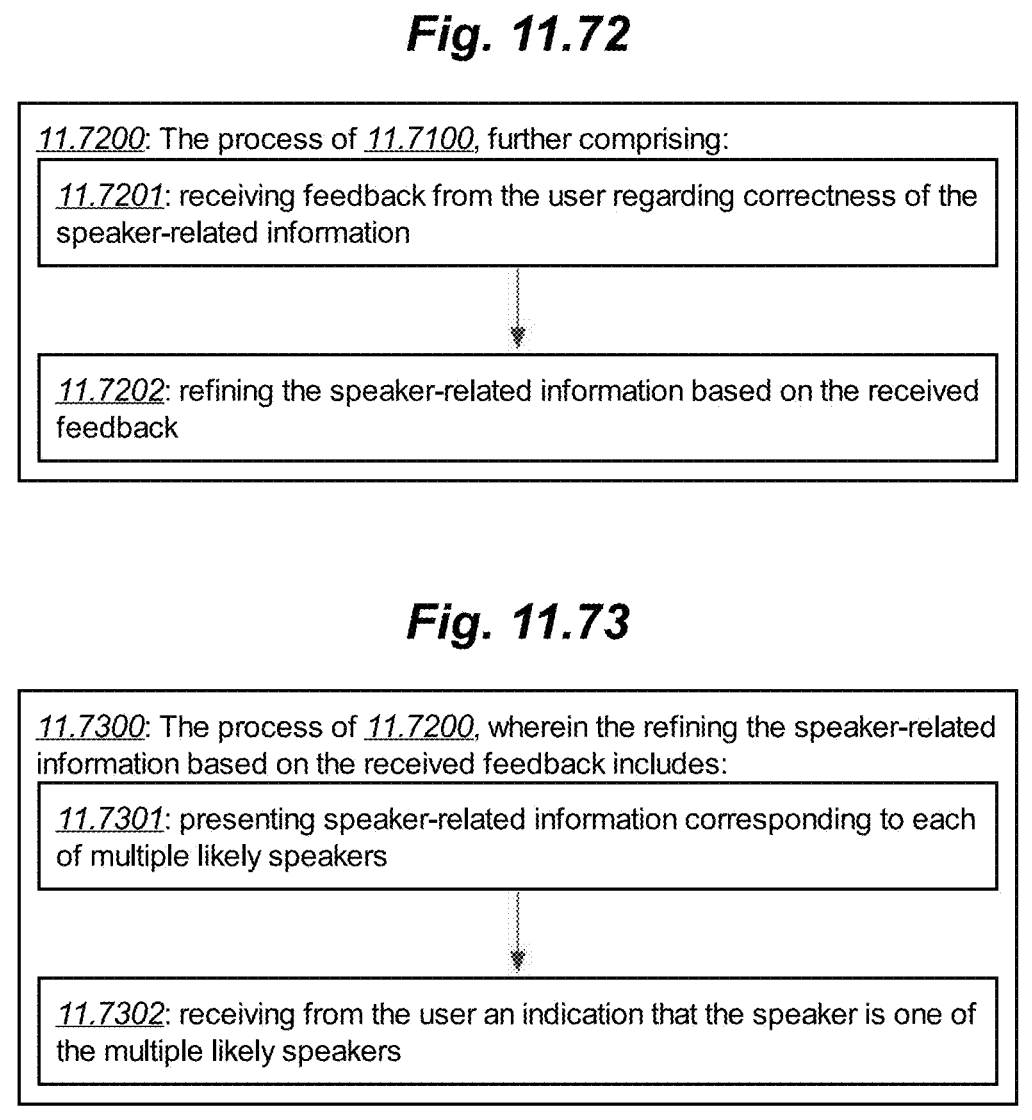

<u>*11.7200*</u>: The process of <u>*11.7100*</u>, further comprising:

<u>*11.7201*</u>: receiving feedback from the user regarding correctness of the speaker-related information

↓

<u>*11.7202*</u>: refining the speaker-related information based on the received feedback

*Fig. 11.73*

<u>*11.7300*</u>: The process of <u>*11.7200*</u>, wherein the refining the speaker-related information based on the received feedback includes:

<u>*11.7301*</u>: presenting speaker-related information corresponding to each of multiple likely speakers

↓

<u>*11.7302*</u>: receiving from the user an indication that the speaker is one of the multiple likely speakers

Fig. 11.74

_11.7400_: The process of _11.7100_, wherein the informing the user of the speaker-related information includes:

_11.7401_: presenting the speaker-related information on a display of the hearing device

Fig. 11.75

_11.7500_: The process of _11.7100_, wherein the informing the user of the speaker-related information includes:

_11.7501_: presenting the speaker-related information on a display of a computing device that is distinct from the hearing device

Fig. 11.76

_11.7600_: The process of _11.7100_, wherein the informing the user of the speaker-related information includes:

_11.7601_: audibly informing the user to view the speaker-related information on a display device

*Fig. 11.77*

11.7700: The process of 11.7600, wherein the audibly informing the user includes:

11.7701: playing a tone via an audio speaker of the hearing device

*Fig. 11.78*

11.7800: The process of 11.7600, wherein the audibly informing the user includes:

11.7801: playing synthesized speech via an audio speaker of the hearing device, the synthesized speech telling the user to view the display device

*Fig. 11.79*

11.7900: The process of 11.7600, wherein the audibly informing the user includes:

11.7901: telling the user that at least one of a document, a calendar event, and/or a communication is available for viewing on the display device

*Fig. 11.80*

| |
|---|
| *11.8000*: The process of *11.7600*, wherein the audibly informing the user includes: |
| *11.8001*: audibly informing the user in a manner that is not audible to the speaker |

Fig. 15.1

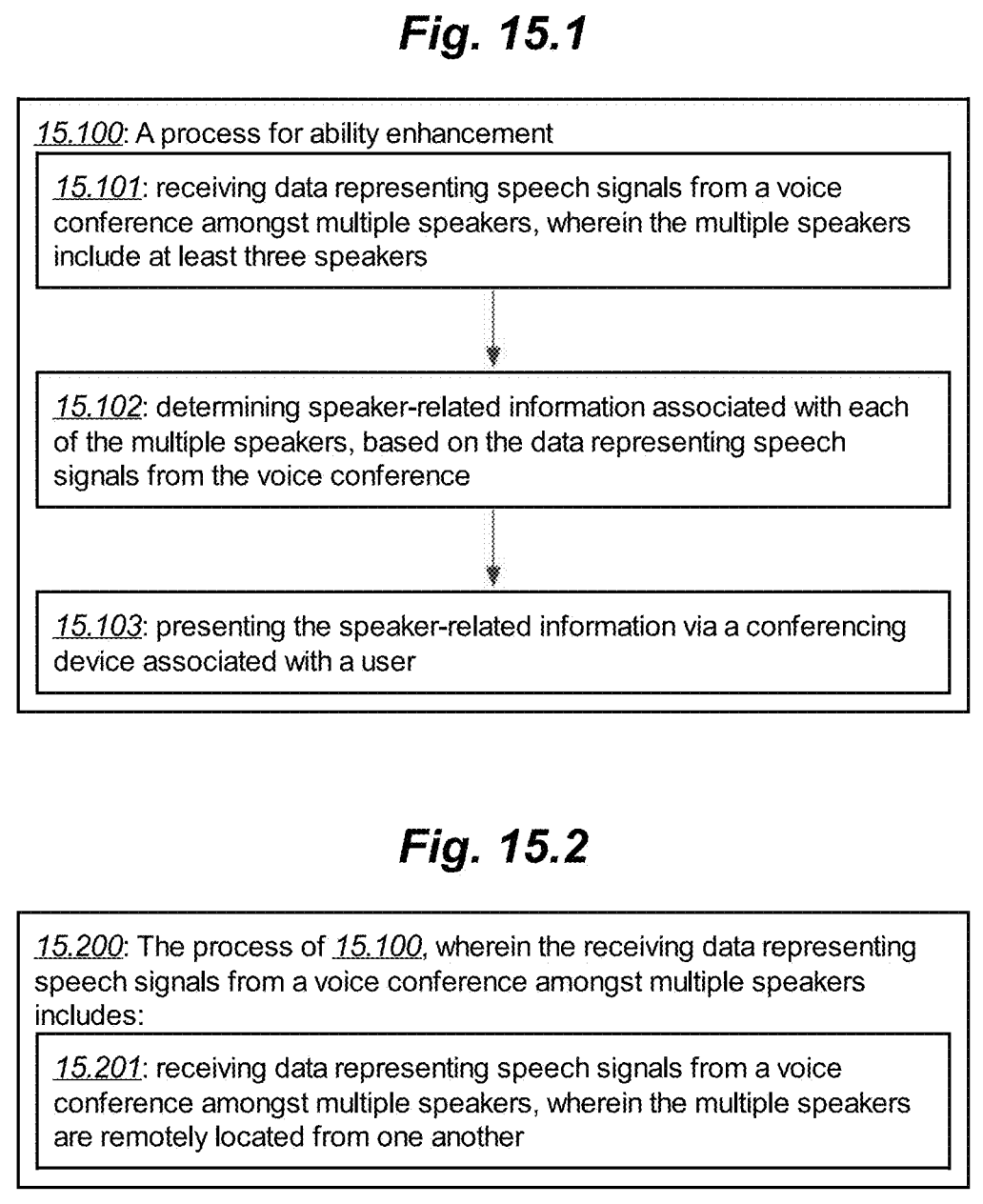

15.100: A process for ability enhancement 15.101: receiving data representing speech signals from a voice conference amongst multiple speakers, wherein the multiple speakers include at least three speakers 15.102: determining speaker-related information associated with each of the multiple speakers, based on the data representing speech signals from the voice conference 15.103: presenting the speaker-related information via a conferencing device associated with a user

Fig. 15.2

15.200: The process of 15.100, wherein the receiving data representing speech signals from a voice conference amongst multiple speakers includes:

15.201: receiving data representing speech signals from a voice conference amongst multiple speakers, wherein the multiple speakers are remotely located from one another

*Fig. 15.3*

15.300: The process of 15.100, wherein the presenting the speaker-related information includes:

15.301: as each of the multiple speakers takes a turn speaking during the voice conference, presenting speaker-related information associated with the speaker

*Fig. 15.4*

15.400: The process of 15.300, wherein the receiving data representing speech signals from a voice conference amongst multiple speakers includes:

15.401: in response to one of the speakers beginning to speak during the voice conference, presenting the speaker-related information associated with the speaker

*Fig. 15.5*

15.500: The process of 15.100, wherein the presenting the speaker-related information includes:

15.501: presenting the speaker-related information during a telephone conference call amongst the multiple speakers

Fig. 15.6

_15.600_: The process of _15.100_, further comprising:

_15.601_: presenting, while a current speaker is speaking, speaker-related information on a display device of the user, the displayed speaker-related information identifying the current speaker

Fig. 15.7

_15.700_: The process of _15.100_, wherein the receiving data representing speech signals from a voice conference amongst multiple speakers includes:

_15.701_: receiving audio data from a telephone conference call that includes the multiple speakers, the received audio data representing utterances made by at least one of the multiple speakers

Fig. 15.8

_15.800_: The process of _15.100_, wherein the receiving data representing speech signals from a voice conference amongst multiple speakers includes:

_15.801_: receiving audio data from an online audio chat that includes the multiple speakers, the received audio data representing utterances made by at least one of the multiple speakers

Fig. 15.9

*15.900*: The process of *15.100*, wherein the receiving data representing speech signals from a voice conference amongst multiple speakers includes:

*15.901*: receiving audio data from a video conference that includes the multiple speakers, the received audio data representing utterances made by at least one of the multiple speakers

Fig. 15.10

*15.1000*: The process of *15.100*, wherein the receiving data representing speech signals from a voice conference amongst multiple speakers includes:

*15.1001*: receiving data representing speech signals from the at least three speakers, the data obtained at the conferencing device

Fig. 15.11

*15.1100*: The process of *15.100*, further comprising:

*15.1101*: determining which one of the multiple speakers is speaking during a time interval

Fig. 15.12

15.1200: The process of 15.1100, wherein the determining which one of the multiple speakers is speaking during a time interval includes:

15.1201: associating a first portion of the received data with a first one of the multiple speakers

Fig. 15.13

15.1300: The process of 15.1200, wherein the associating a first portion of the received data with a first one of the multiple speakers includes:

15.1301: receiving the first portion of the received data along with an identifier associated with the first speaker

Fig. 15.14

15.1400: The process of 15.1300, wherein the receiving the first portion of the received data along with an identifier associated with the first speaker includes:

15.1401: receiving a network identifier associated with the first speaker

*Fig. 15.15*

15.1500: The process of 15.1300, wherein the receiving the first portion of the received data along with an identifier associated with the first speaker includes:

> 15.1501: receiving from a conferencing system the identifier associated with the first speaker, the conferencing system configured to facilitate a conference call among the multiple speakers

*Fig. 15.16*

15.1600: The process of 15.1200, wherein the associating a first portion of the received data with a first one of the multiple speakers includes:

> 15.1601: selecting the first portion based on the first portion representing only speech from the one speaker and no other of the multiple speakers

*Fig. 15.17*

15.1700: The process of 15.1100, further comprising:

> 15.1701: determining that two or more of the multiple speakers are speaking concurrently

*Fig. 15.18*

*15.1800*: The process of *15.1100*, wherein the determining which one of the multiple speakers is speaking during a time interval includes:

*15.1801*: performing voice identification to select which one of multiple previously analyzed voices is a best match for the one speaker who is speaking during the time interval

*Fig. 15.19*

*15.1900*: The process of *15.1100*, wherein the determining which one of the multiple speakers is speaking during a time interval includes:

*15.1901*: performing voice identification based on the received data to identify one of the multiple speakers

*Fig. 15.20*

*15.2000*: The process of *15.1900*, wherein the performing voice identification includes:

*15.2001*: comparing properties of the speech signal with properties of previously recorded speech signals from multiple persons

Fig. 15.21

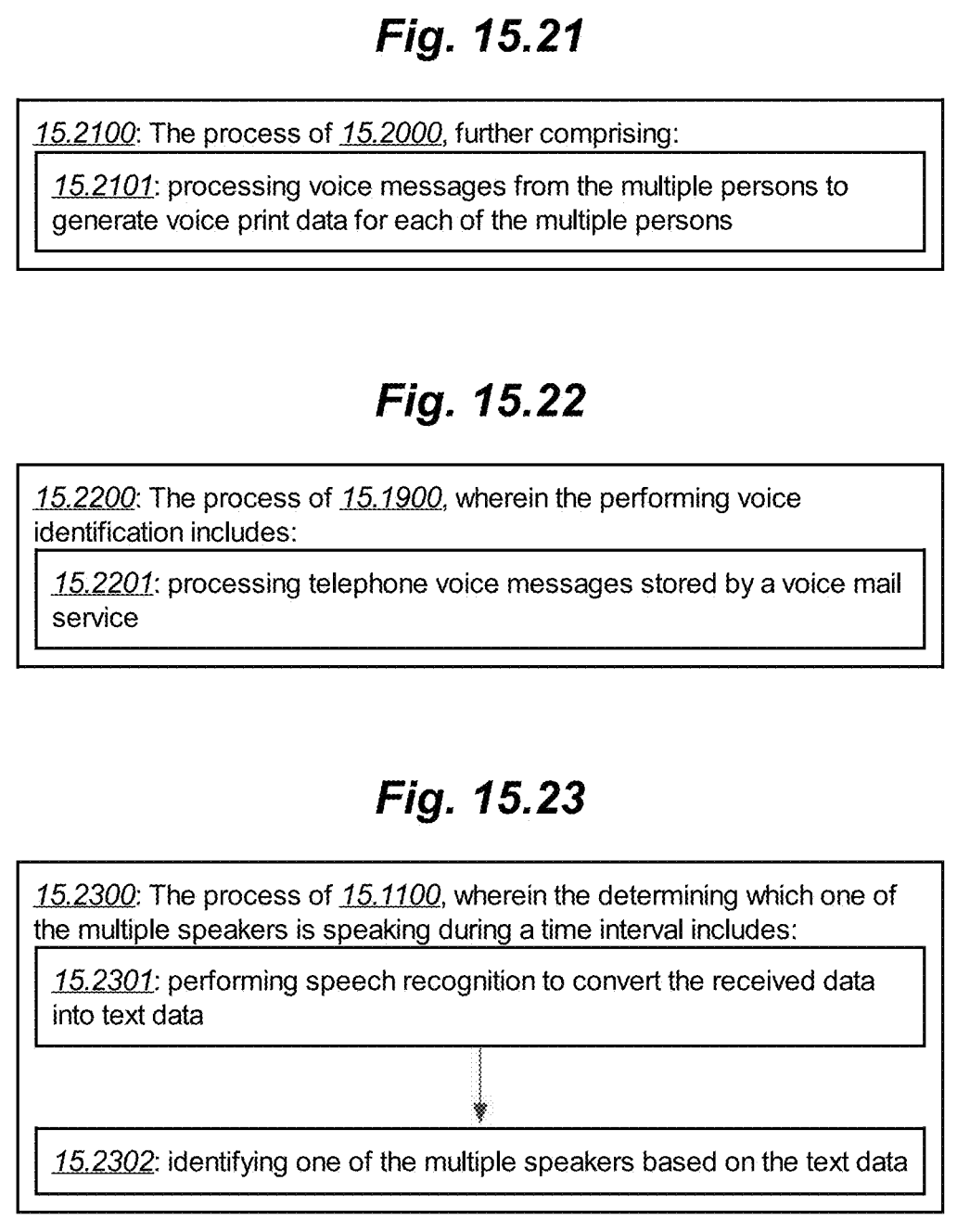

*15.2100*: The process of *15.2000*, further comprising:

*15.2101*: processing voice messages from the multiple persons to generate voice print data for each of the multiple persons

Fig. 15.22

*15.2200*: The process of *15.1900*, wherein the performing voice identification includes:

*15.2201*: processing telephone voice messages stored by a voice mail service

Fig. 15.23

*15.2300*: The process of *15.1100*, wherein the determining which one of the multiple speakers is speaking during a time interval includes:

*15.2301*: performing speech recognition to convert the received data into text data

↓

*15.2302*: identifying one of the multiple speakers based on the text data

Fig. 15.24

15.2400: The process of 15.2300, wherein the identifying one of the multiple speakers based on the text data includes:

15.2401: finding an information item that references the one speaker and that includes one or more words in the text data

Fig. 15.25

15.2500: The process of 15.2300, wherein the performing speech recognition includes:

15.2501: performing speech recognition based on cepstral coefficients that represent the speech signal

Fig. 15.26

15.2600: The process of 15.2300, wherein the performing speech recognition includes:

15.2601: performing hidden Markov model-based speech recognition

Fig. 15.27

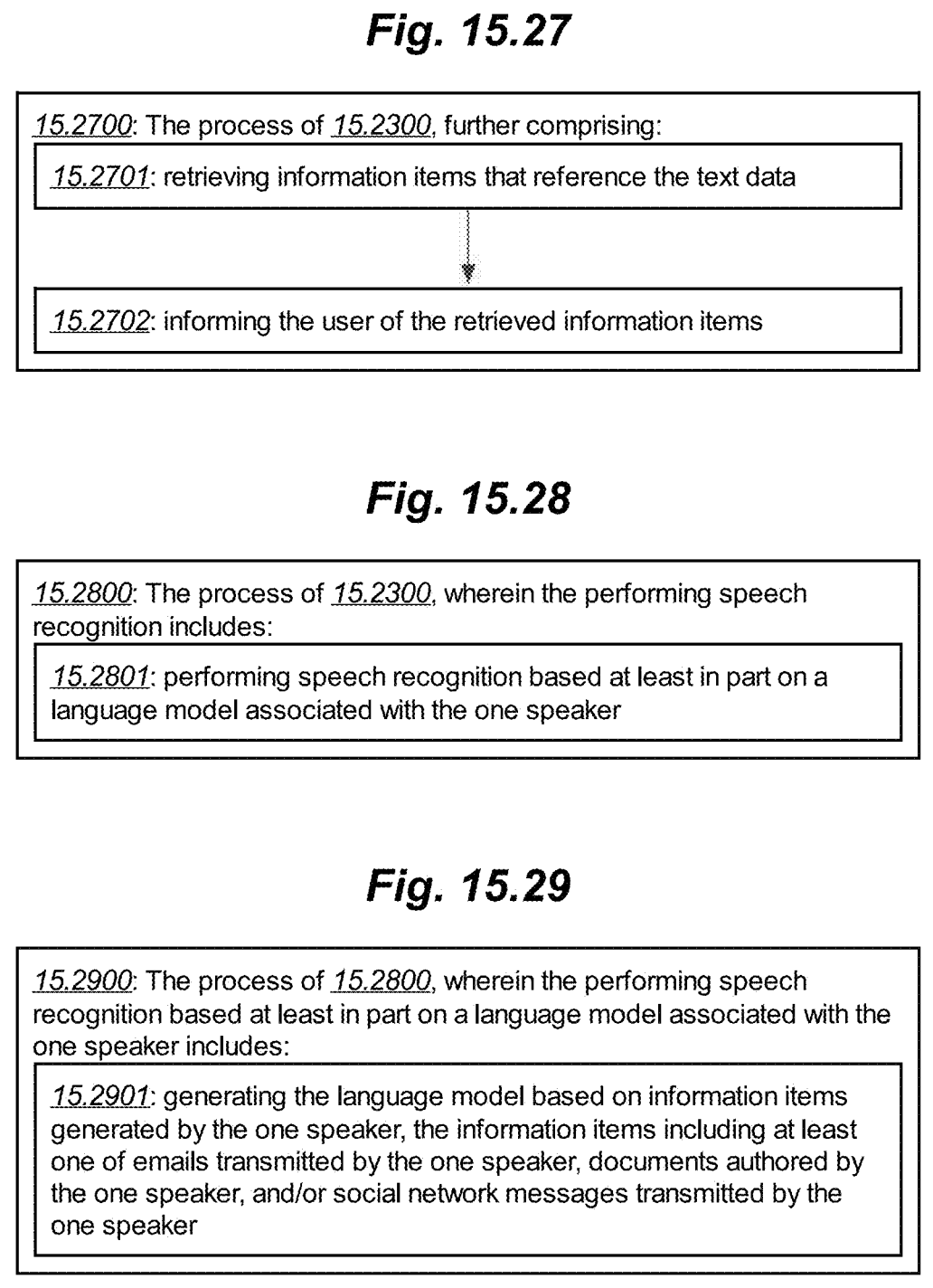

15.2700: The process of 15.2300, further comprising:

15.2701: retrieving information items that reference the text data 15.2702: informing the user of the retrieved information items

Fig. 15.28

15.2800: The process of 15.2300, wherein the performing speech recognition includes:

15.2801: performing speech recognition based at least in part on a language model associated with the one speaker

Fig. 15.29

15.2900: The process of 15.2800, wherein the performing speech recognition based at least in part on a language model associated with the one speaker includes:

15.2901: generating the language model based on information items generated by the one speaker, the information items including at least one of emails transmitted by the one speaker, documents authored by the one speaker, and/or social network messages transmitted by the one speaker

Fig. 15.30

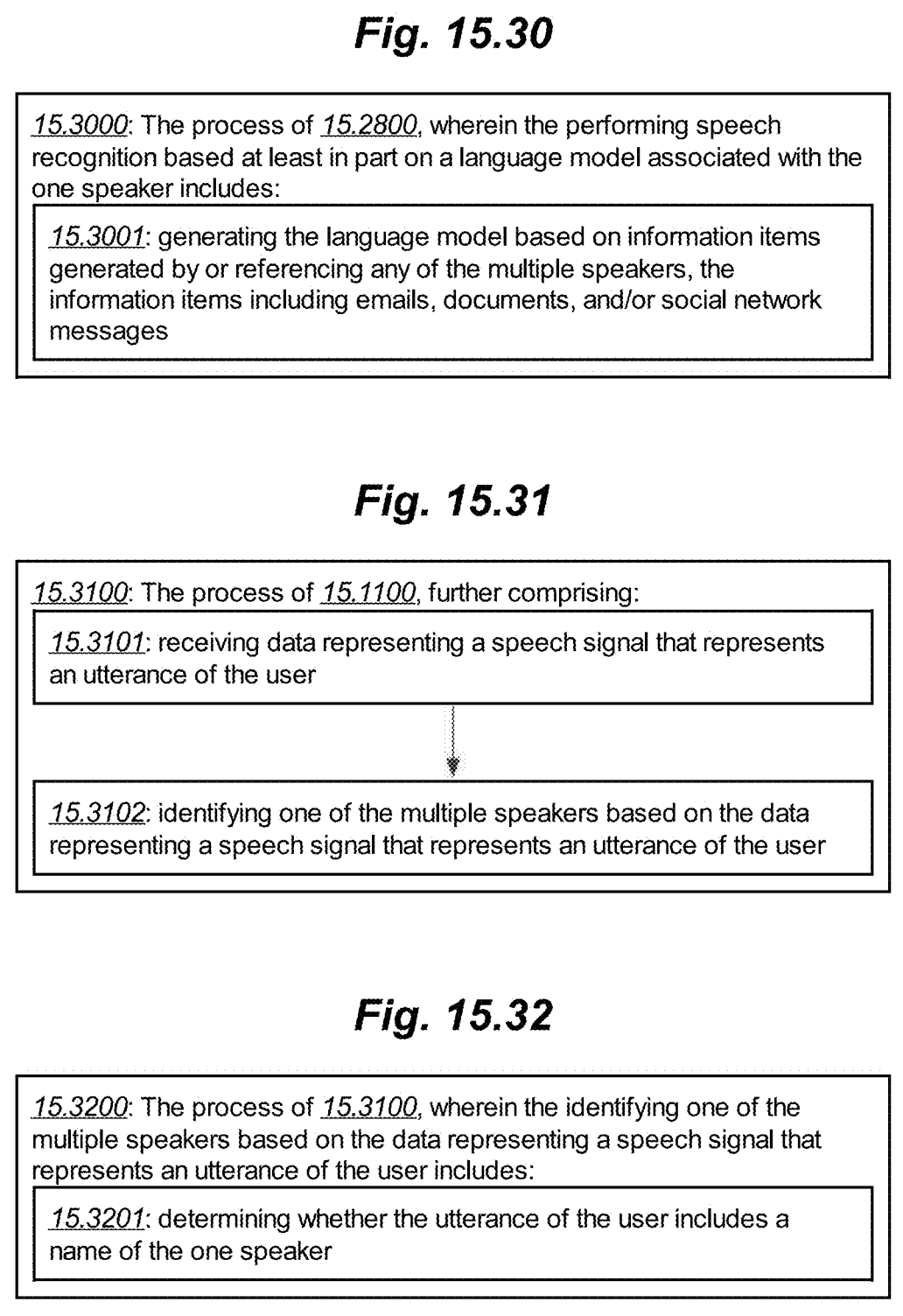

15.3000: The process of 15.2800, wherein the performing speech recognition based at least in part on a language model associated with the one speaker includes:

15.3001: generating the language model based on information items generated by or referencing any of the multiple speakers, the information items including emails, documents, and/or social network messages

Fig. 15.31

15.3100: The process of 15.1100, further comprising:

15.3101: receiving data representing a speech signal that represents an utterance of the user 15.3102: identifying one of the multiple speakers based on the data representing a speech signal that represents an utterance of the user

Fig. 15.32

15.3200: The process of 15.3100, wherein the identifying one of the multiple speakers based on the data representing a speech signal that represents an utterance of the user includes:

15.3201: determining whether the utterance of the user includes a name of the one speaker

Fig. 15.33

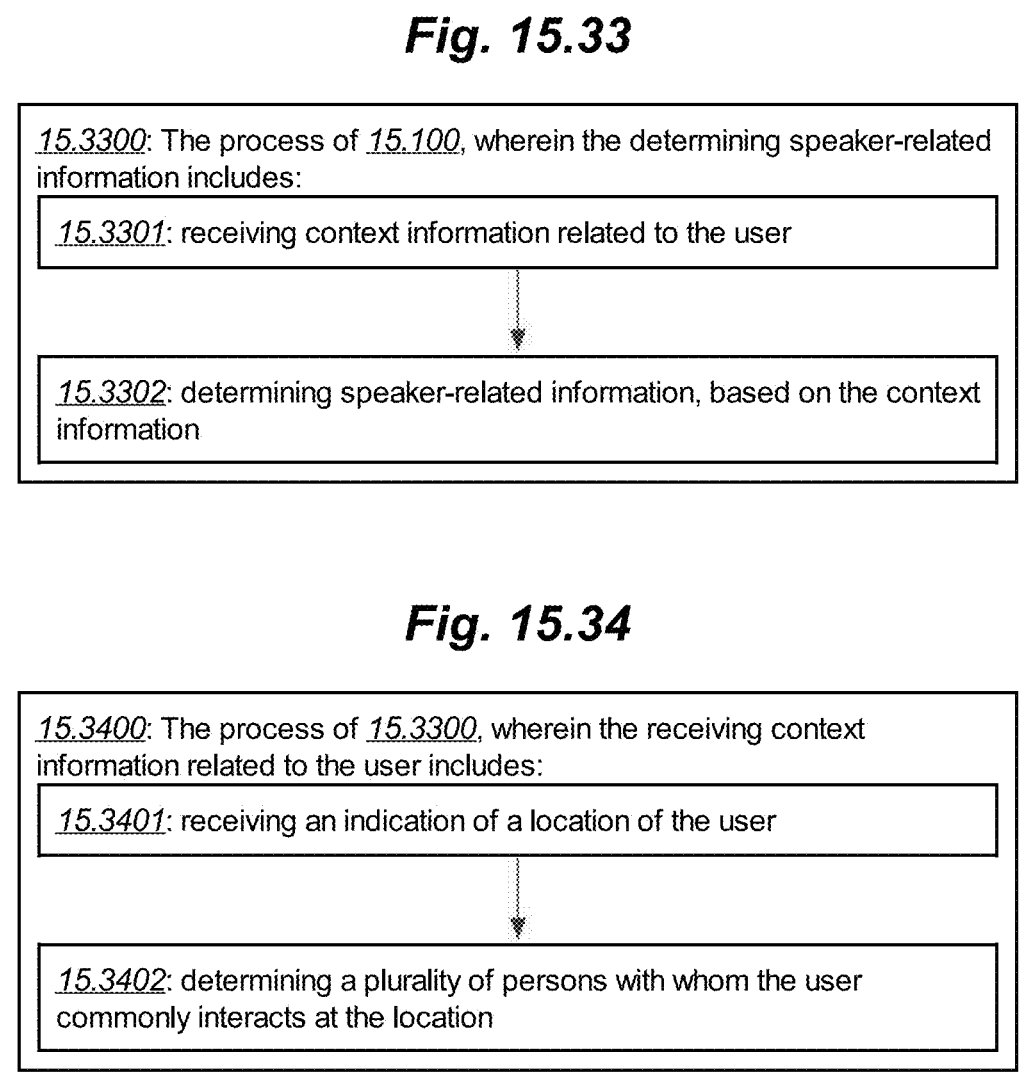

15.3300: The process of 15.100, wherein the determining speaker-related information includes:

15.3301: receiving context information related to the user

↓

15.3302: determining speaker-related information, based on the context information

Fig. 15.34

15.3400: The process of 15.3300, wherein the receiving context information related to the user includes:

15.3401: receiving an indication of a location of the user

↓

15.3402: determining a plurality of persons with whom the user commonly interacts at the location

*Fig. 15.35*

<u>*15.3500*</u>: The process of <u>*15.3400*</u>, wherein the receiving an indication of a location of the user includes:

<u>*15.3501*</u>: receiving a GPS location from a mobile device of the user

*Fig. 15.36*

<u>*15.3600*</u>: The process of <u>*15.3400*</u>, wherein the receiving an indication of a location of the user includes:

<u>*15.3601*</u>: receiving a network identifier that is associated with the location

*Fig. 15.37*

<u>*15.3700*</u>: The process of <u>*15.3400*</u>, wherein the receiving an indication of a location of the user includes:

<u>*15.3701*</u>: receiving an indication that the user is at a workplace or a residence

Fig. 15.38

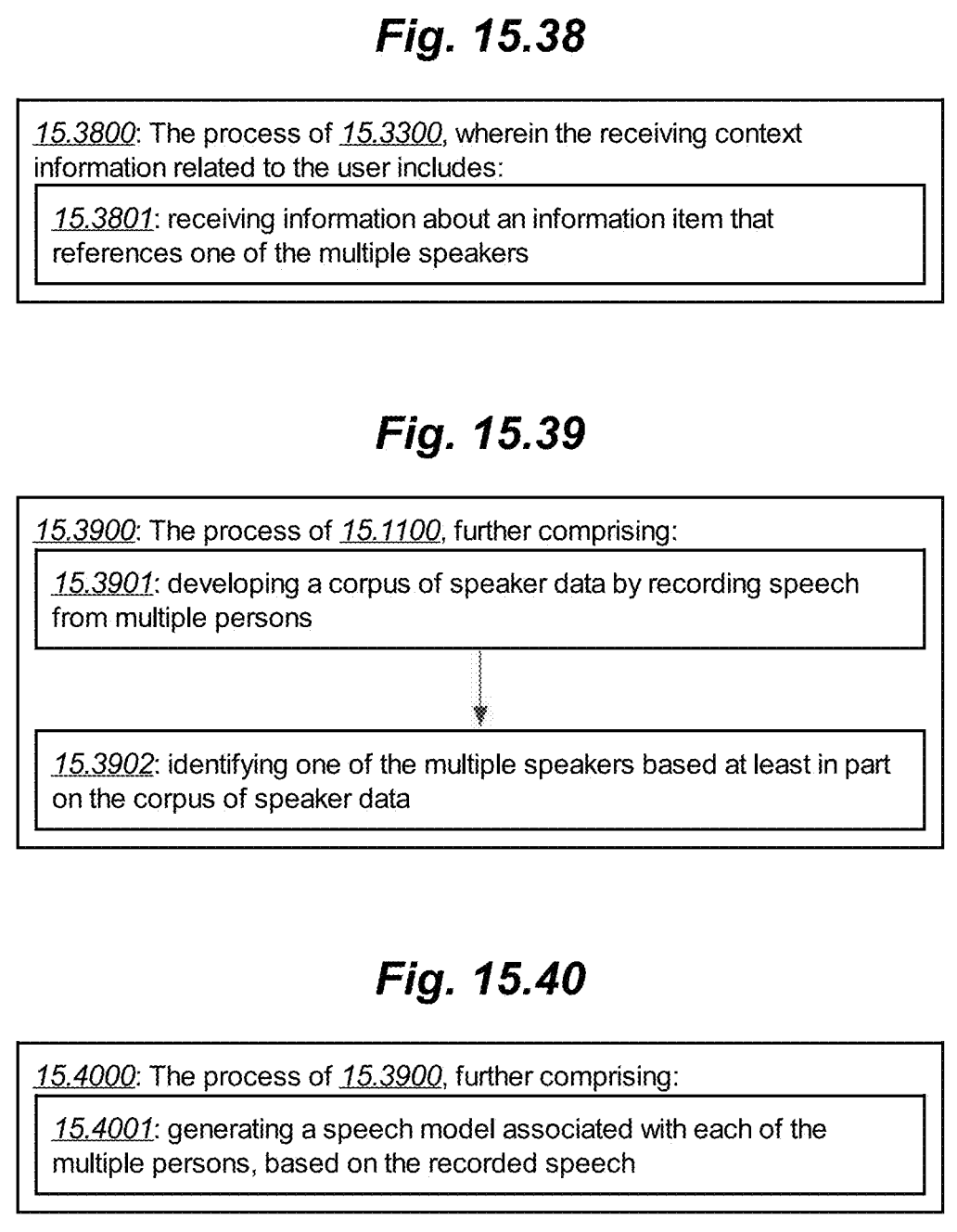

15.3800: The process of 15.3300, wherein the receiving context information related to the user includes:

15.3801: receiving information about an information item that references one of the multiple speakers

Fig. 15.39

15.3900: The process of 15.1100, further comprising:

15.3901: developing a corpus of speaker data by recording speech from multiple persons 15.3902: identifying one of the multiple speakers based at least in part on the corpus of speaker data

Fig. 15.40

15.4000: The process of 15.3900, further comprising:

15.4001: generating a speech model associated with each of the multiple persons, based on the recorded speech

Fig. 15.41

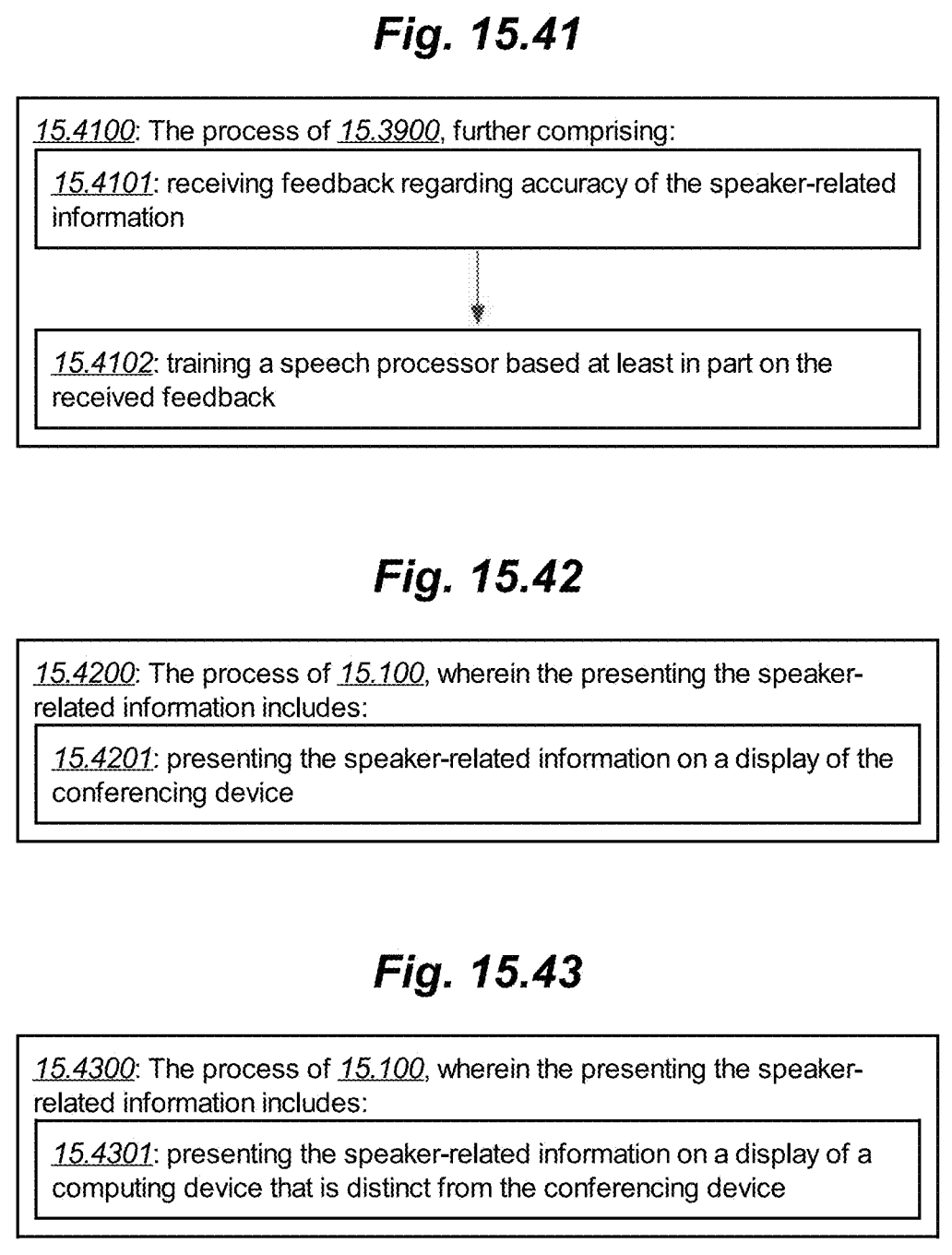

15.4100: The process of 15.3900, further comprising:

15.4101: receiving feedback regarding accuracy of the speaker-related information 15.4102: training a speech processor based at least in part on the received feedback

Fig. 15.42

15.4200: The process of 15.100, wherein the presenting the speaker-related information includes:

15.4201: presenting the speaker-related information on a display of the conferencing device

Fig. 15.43

15.4300: The process of 15.100, wherein the presenting the speaker-related information includes:

15.4301: presenting the speaker-related information on a display of a computing device that is distinct from the conferencing device

Fig. 15.44

15.4400: The process of 15.100, wherein the presenting the speaker-related information includes:

15.4401: determining a display to serve as a presentation device for the speaker-related information

Fig. 15.45

15.4500: The process of 15.4400, wherein the determining a display includes:

15.4501: selecting one display from multiple displays, based at least in part on whether each of the multiple displays is capable of displaying all of the speaker-related information

Fig. 15.46

15.4600: The process of 15.4400, wherein the determining a display includes:

15.4601: selecting one display from multiple displays, based at least in part on a size of each of the multiple displays

Fig. 15.47

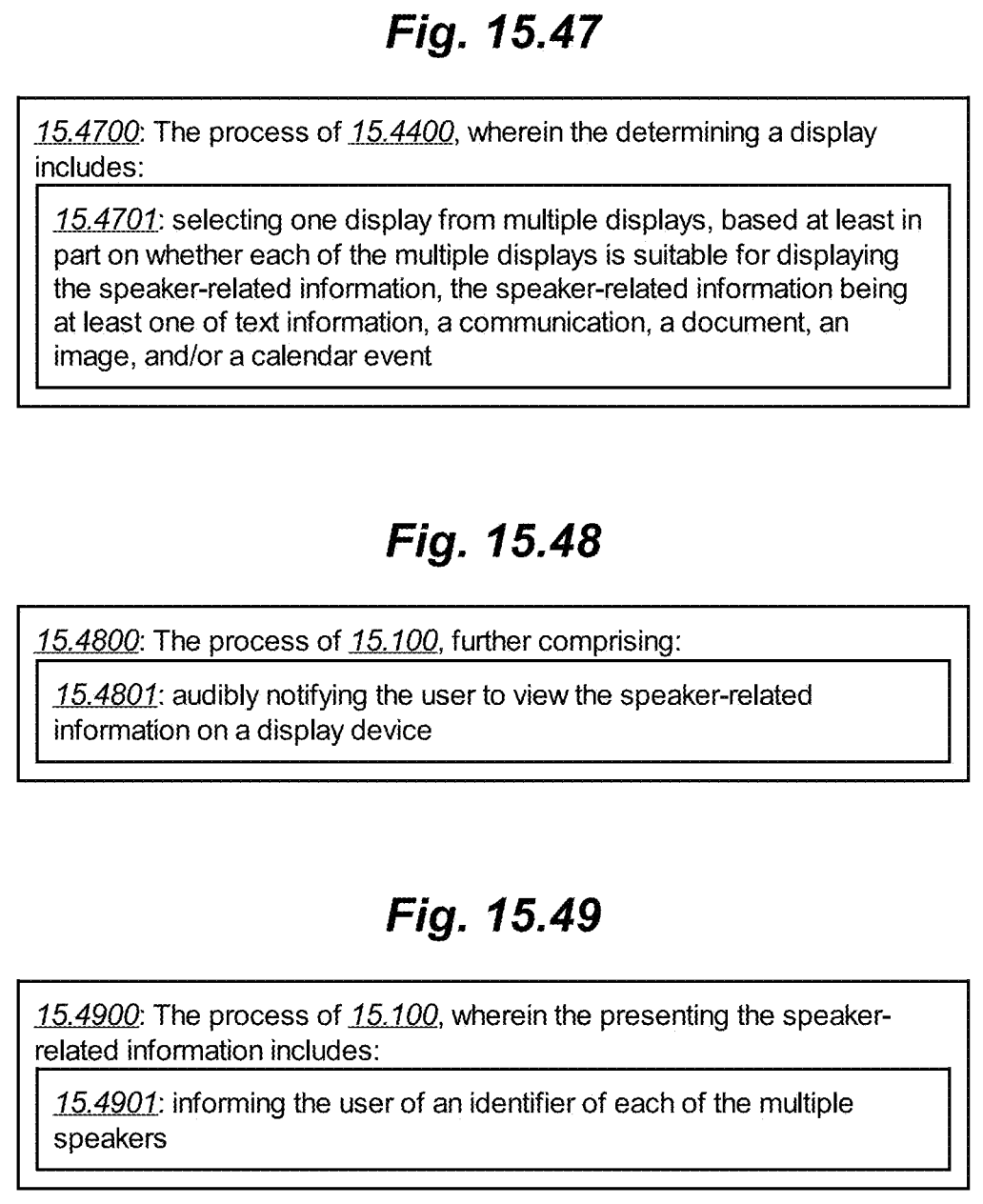

15.4700: The process of 15.4400, wherein the determining a display includes:

15.4701: selecting one display from multiple displays, based at least in part on whether each of the multiple displays is suitable for displaying the speaker-related information, the speaker-related information being at least one of text information, a communication, a document, an image, and/or a calendar event

Fig. 15.48

15.4800: The process of 15.100, further comprising:

15.4801: audibly notifying the user to view the speaker-related information on a display device

Fig. 15.49

15.4900: The process of 15.100, wherein the presenting the speaker-related information includes:

15.4901: informing the user of an identifier of each of the multiple speakers

Fig. 15.50

_15.5000_: The process of _15.100_, wherein the presenting the speaker-related information includes:

_15.5001_: informing the user of information aside from identifying information related to the multiple speakers

Fig. 15.51

_15.5100_: The process of _15.100_, wherein the presenting the speaker-related information includes:

_15.5101_: informing the user of an organization to which each of the multiple speakers belongs

Fig. 15.52

_15.5200_: The process of _15.100_, wherein the presenting the speaker-related information includes:

_15.5201_: informing the user of a previously transmitted communication referencing one of the multiple speakers

*Fig. 15.53*

15.5300: The process of 15.5200, wherein the informing the user of a previously transmitted communication includes:

15.5301: informing the user of at least one of: an email transmitted between the one speaker and the user and/or a text message transmitted between the one speaker and the user

*Fig. 15.54*

15.5400: The process of 15.100, wherein the presenting the speaker-related information includes:

15.5401: informing the user of an event involving the user and one of the multiple speakers

*Fig. 15.55*

15.5500: The process of 15.5400, wherein the informing the user of an event includes:

15.5501: informing the user of a previously occurring event and/or a future event that is at least one of a project, a meeting, and/or a deadline

*Fig. 15.56*

15.5600: The process of 15.100, wherein the determining speaker-related information includes:

15.5601: accessing information items associated with one of the multiple speakers

*Fig. 15.57*

15.5700: The process of 15.5600, wherein the accessing information items associated with one of the multiple speakers includes:

15.5701: searching for information items that reference the one speaker, the information items including at least one of a document, an email, and/or a text message

*Fig. 15.58*

15.5800: The process of 15.5600, wherein the accessing information items associated with one of the multiple speakers includes:

15.5801: accessing a social networking service to find messages or status updates that reference the one speaker

*Fig. 15.59*

| |
|---|
| _15.5900_: The process of _15.5600_, wherein the accessing information items associated with one of the multiple speakers includes: |
| _15.5901_: accessing a calendar to find information about appointments with the one speaker |

*Fig. 15.60*

| |
|---|
| _15.6000_: The process of _15.5600_, wherein the accessing information items associated with one of the multiple speakers includes: |
| _15.6001_: accessing a document store to find documents that reference the one speaker |

*Fig. 15.61*

| |
|---|
| _15.6100_: The process of _15.100_, wherein the presenting the speaker-related information includes: |
| _15.6101_: transmitting the speaker-related information from a first device to a second device having a display |

*Fig. 15.62*

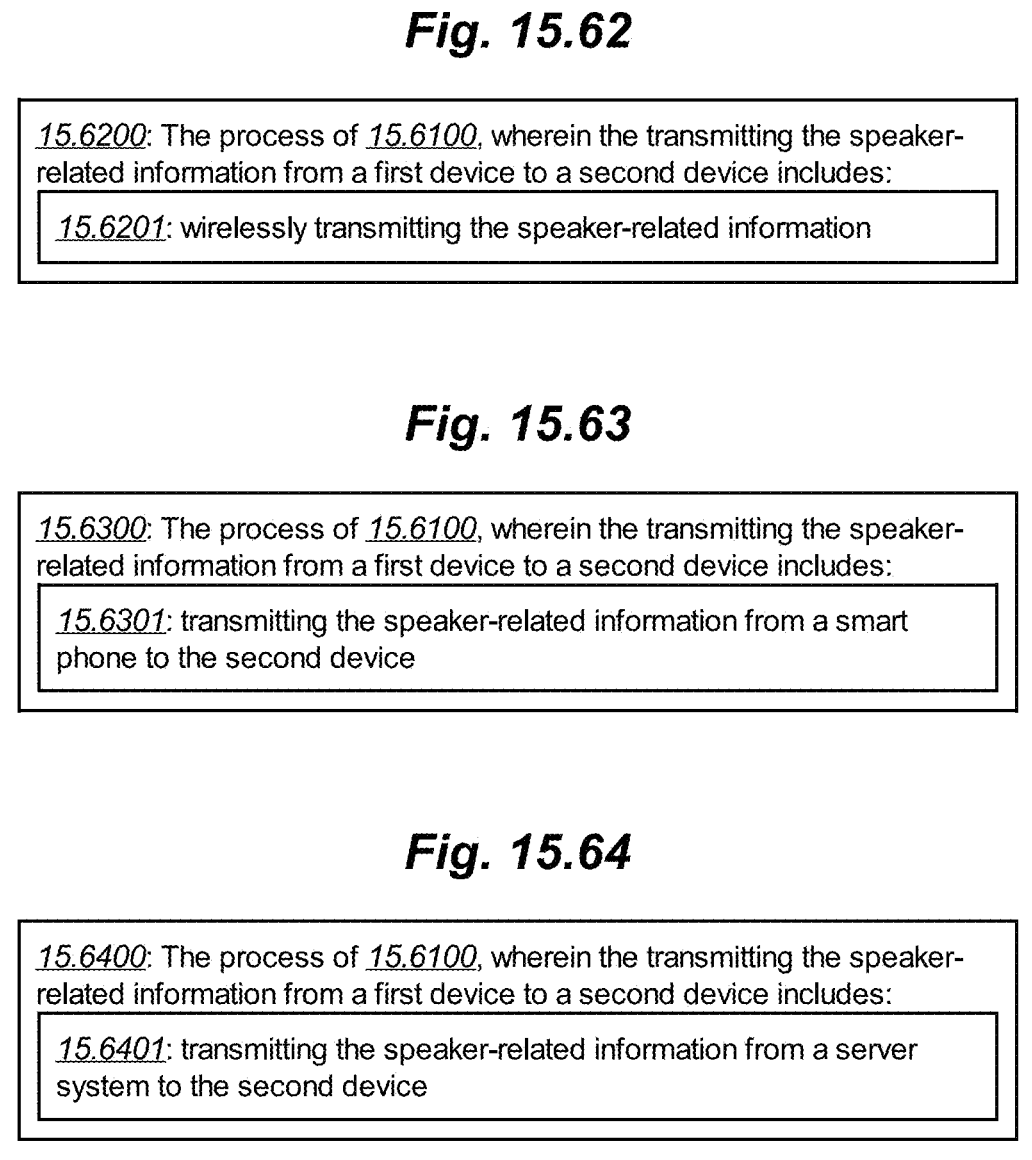

15.6200: The process of 15.6100, wherein the transmitting the speaker-related information from a first device to a second device includes:

15.6201: wirelessly transmitting the speaker-related information

*Fig. 15.63*

15.6300: The process of 15.6100, wherein the transmitting the speaker-related information from a first device to a second device includes:

15.6301: transmitting the speaker-related information from a smart phone to the second device

*Fig. 15.64*

15.6400: The process of 15.6100, wherein the transmitting the speaker-related information from a first device to a second device includes:

15.6401: transmitting the speaker-related information from a server system to the second device

Fig. 15.65

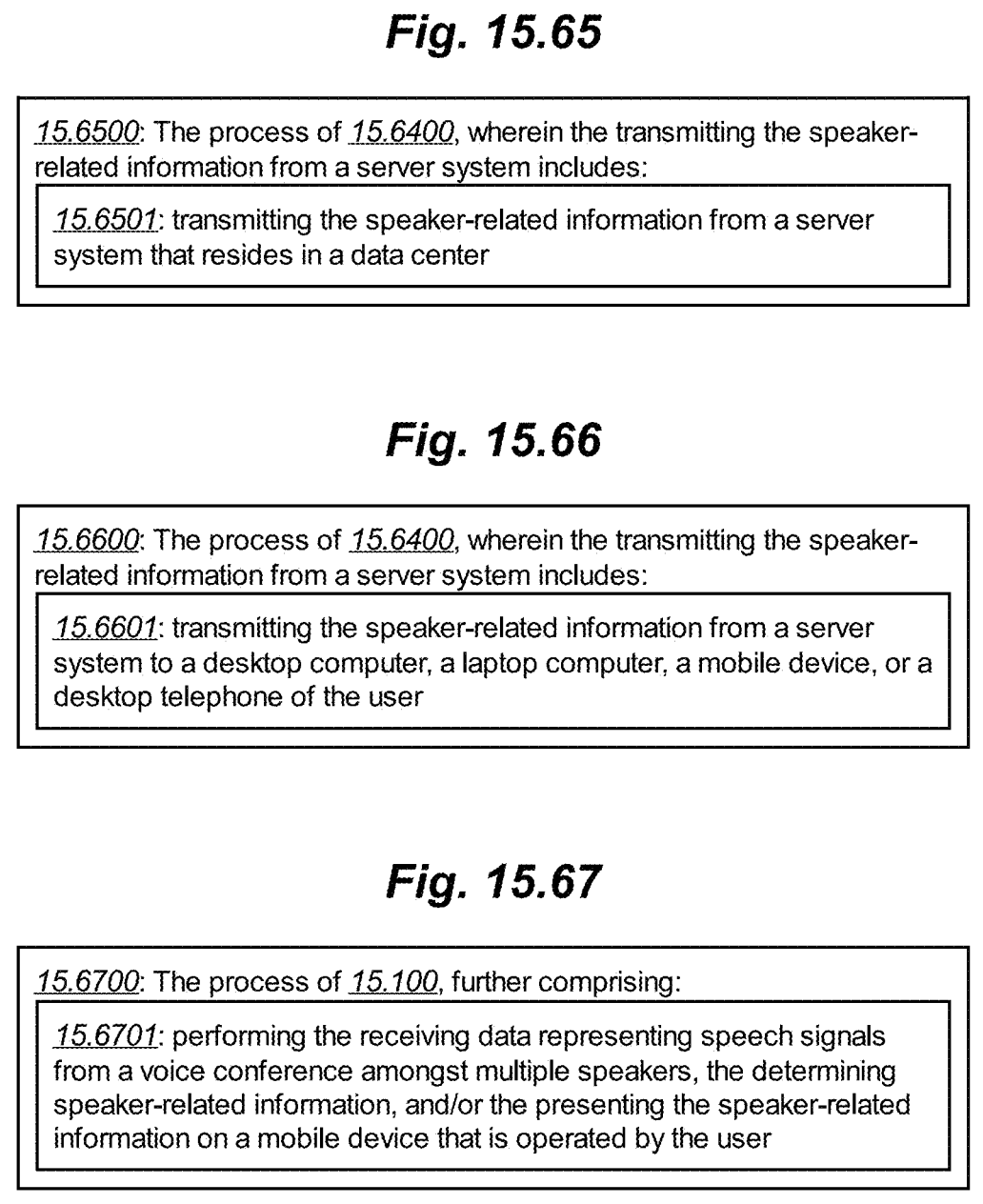

15.6500: The process of 15.6400, wherein the transmitting the speaker-related information from a server system includes:

15.6501: transmitting the speaker-related information from a server system that resides in a data center

Fig. 15.66

15.6600: The process of 15.6400, wherein the transmitting the speaker-related information from a server system includes:

15.6601: transmitting the speaker-related information from a server system to a desktop computer, a laptop computer, a mobile device, or a desktop telephone of the user

Fig. 15.67

15.6700: The process of 15.100, further comprising:

15.6701: performing the receiving data representing speech signals from a voice conference amongst multiple speakers, the determining speaker-related information, and/or the presenting the speaker-related information on a mobile device that is operated by the user

*Fig. 15.68*

15.6800: The process of 15.6700, wherein the determining speaker-related information includes:

15.6801: determining speaker-related information, performed on a smart phone or a media player that is operated by the user

*Fig. 15.69*

15.6900: The process of 15.100, further comprising:

15.6901: performing the receiving data representing speech signals from a voice conference amongst multiple speakers, the determining speaker-related information, and/or the presenting the speaker-related information on a desktop computer that is operated by the user

*Fig. 15.70*

15.7000: The process of 15.100, further comprising:

15.7001: determining to perform at least some of determining speaker-related information or presenting the speaker-related information on another computing device that has available processing capacity

Fig. 15.71

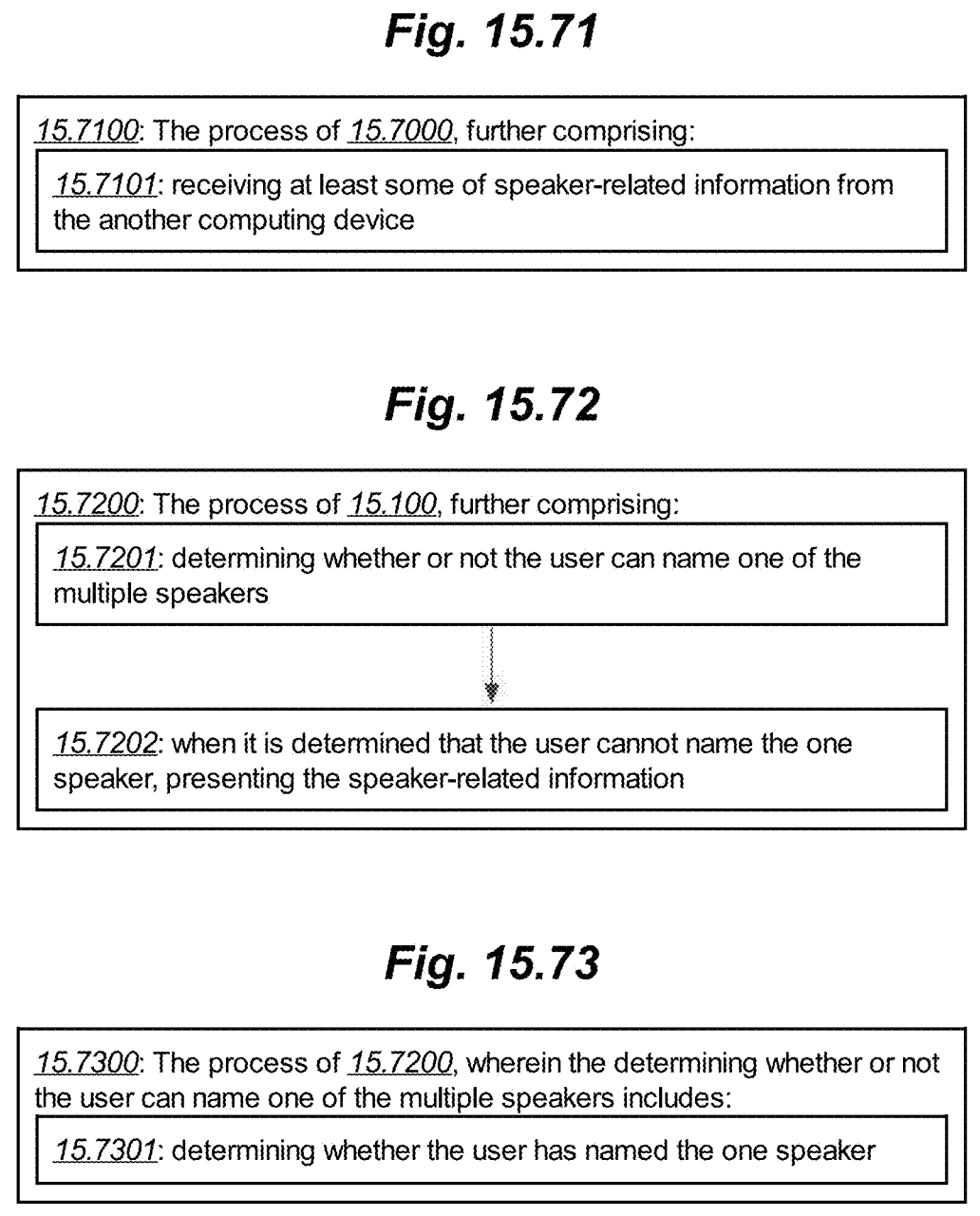

15.7100: The process of 15.7000, further comprising:

15.7101: receiving at least some of speaker-related information from the another computing device

Fig. 15.72

15.7200: The process of 15.100, further comprising:

15.7201: determining whether or not the user can name one of the multiple speakers

↓

15.7202: when it is determined that the user cannot name the one speaker, presenting the speaker-related information

Fig. 15.73

15.7300: The process of 15.7200, wherein the determining whether or not the user can name one of the multiple speakers includes:

15.7301: determining whether the user has named the one speaker

Fig. 15.74

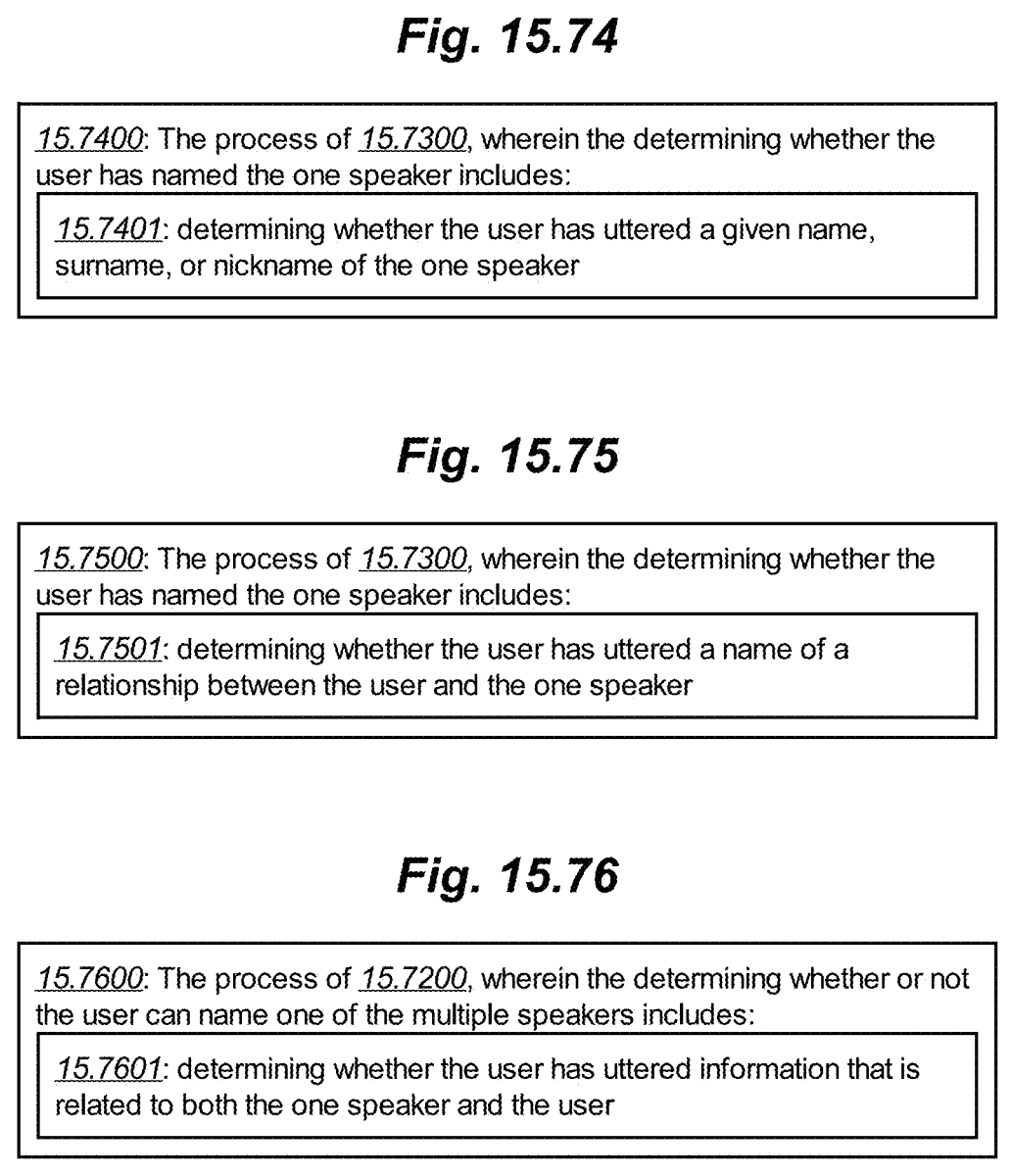

*15.7400*: The process of *15.7300*, wherein the determining whether the user has named the one speaker includes:

*15.7401*: determining whether the user has uttered a given name, surname, or nickname of the one speaker

Fig. 15.75

*15.7500*: The process of *15.7300*, wherein the determining whether the user has named the one speaker includes:

*15.7501*: determining whether the user has uttered a name of a relationship between the user and the one speaker

Fig. 15.76

*15.7600*: The process of *15.7200*, wherein the determining whether or not the user can name one of the multiple speakers includes:

*15.7601*: determining whether the user has uttered information that is related to both the one speaker and the user

Fig. 15.77

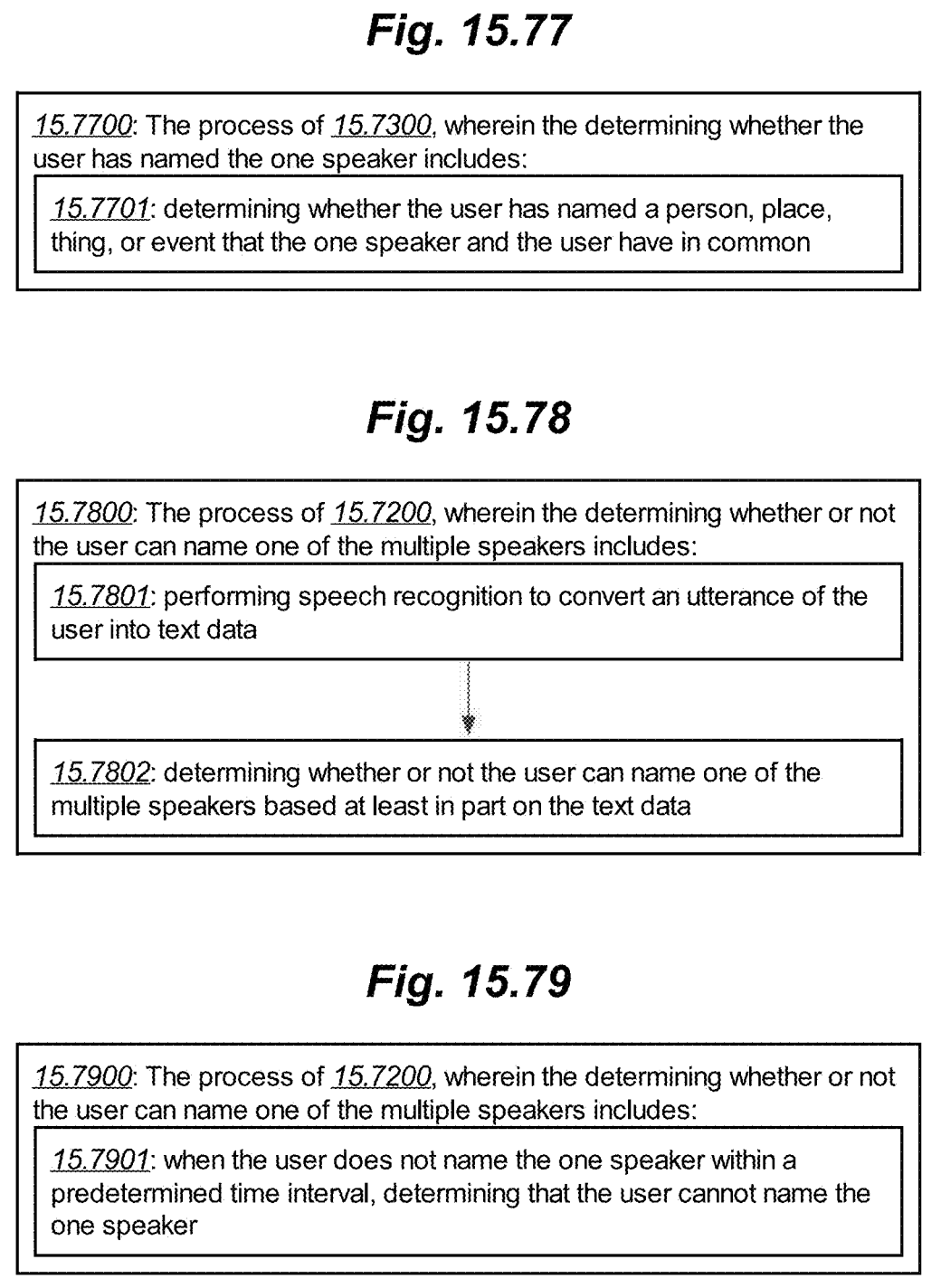

15.7700: The process of 15.7300, wherein the determining whether the user has named the one speaker includes:

15.7701: determining whether the user has named a person, place, thing, or event that the one speaker and the user have in common

Fig. 15.78

15.7800: The process of 15.7200, wherein the determining whether or not the user can name one of the multiple speakers includes:

15.7801: performing speech recognition to convert an utterance of the user into text data 15.7802: determining whether or not the user can name one of the multiple speakers based at least in part on the text data

Fig. 15.79

15.7900: The process of 15.7200, wherein the determining whether or not the user can name one of the multiple speakers includes:

15.7901: when the user does not name the one speaker within a predetermined time interval, determining that the user cannot name the one speaker

Fig. 15.80

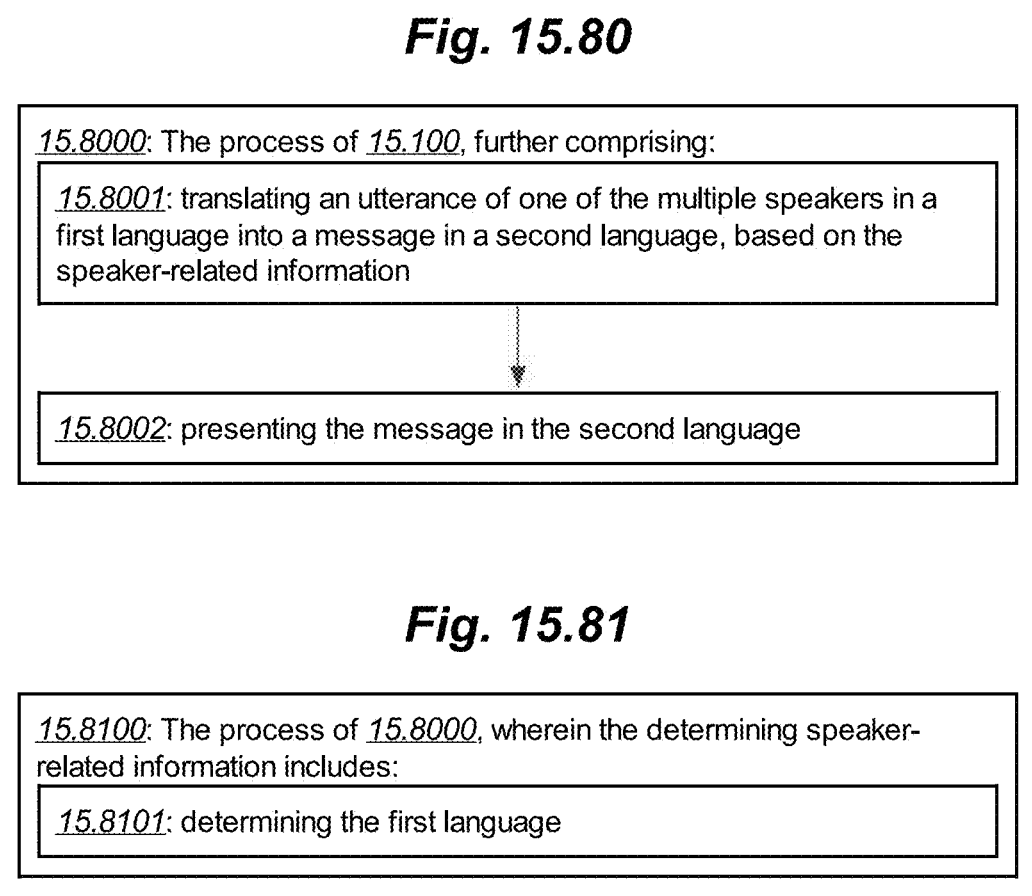

15.8000: The process of 15.100, further comprising:

15.8001: translating an utterance of one of the multiple speakers in a first language into a message in a second language, based on the speaker-related information 15.8002: presenting the message in the second language

Fig. 15.81

15.8100: The process of 15.8000, wherein the determining speaker-related information includes:

15.8101: determining the first language

*Fig. 15.82*

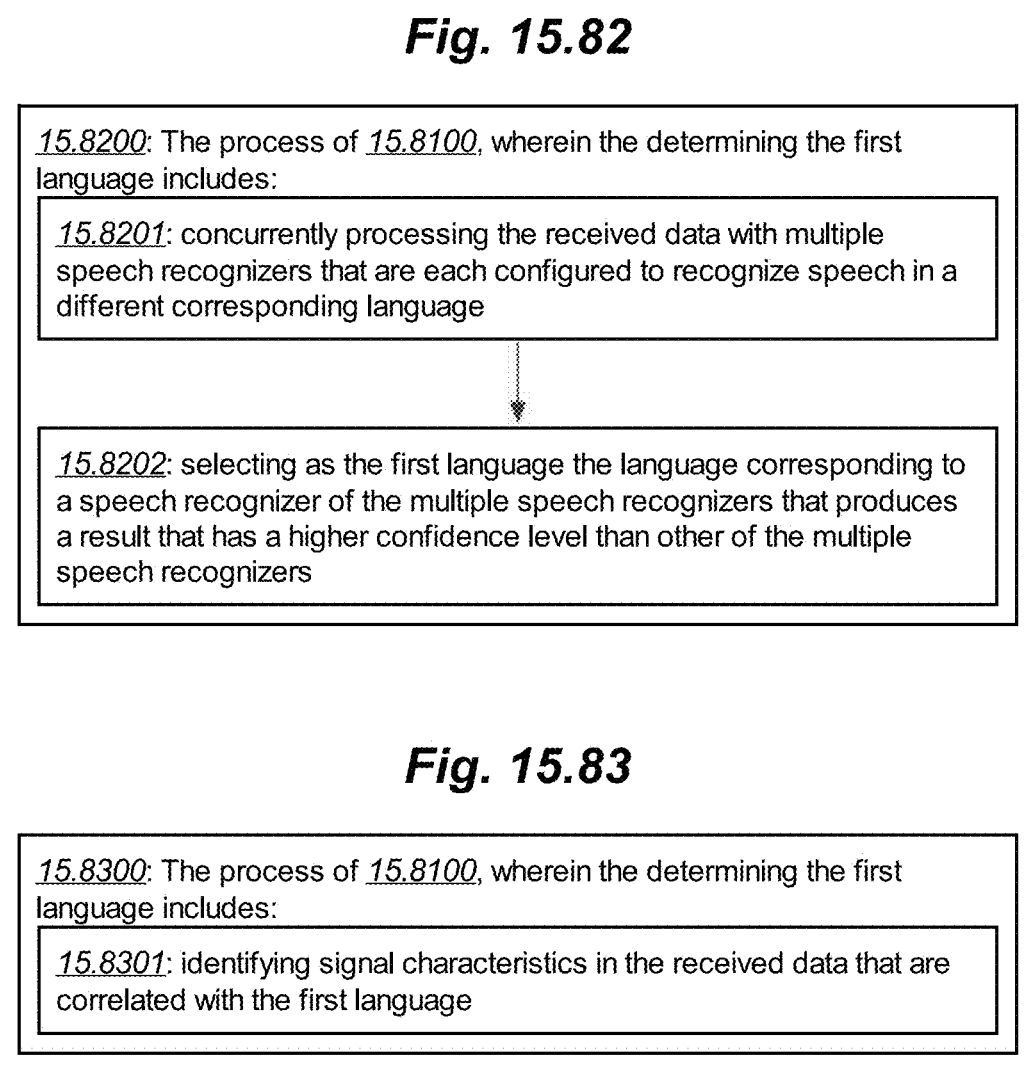

15.8200: The process of 15.8100, wherein the determining the first language includes:

15.8201: concurrently processing the received data with multiple speech recognizers that are each configured to recognize speech in a different corresponding language

↓

15.8202: selecting as the first language the language corresponding to a speech recognizer of the multiple speech recognizers that produces a result that has a higher confidence level than other of the multiple speech recognizers

*Fig. 15.83*

15.8300: The process of 15.8100, wherein the determining the first language includes:

15.8301: identifying signal characteristics in the received data that are correlated with the first language

*Fig. 15.84*

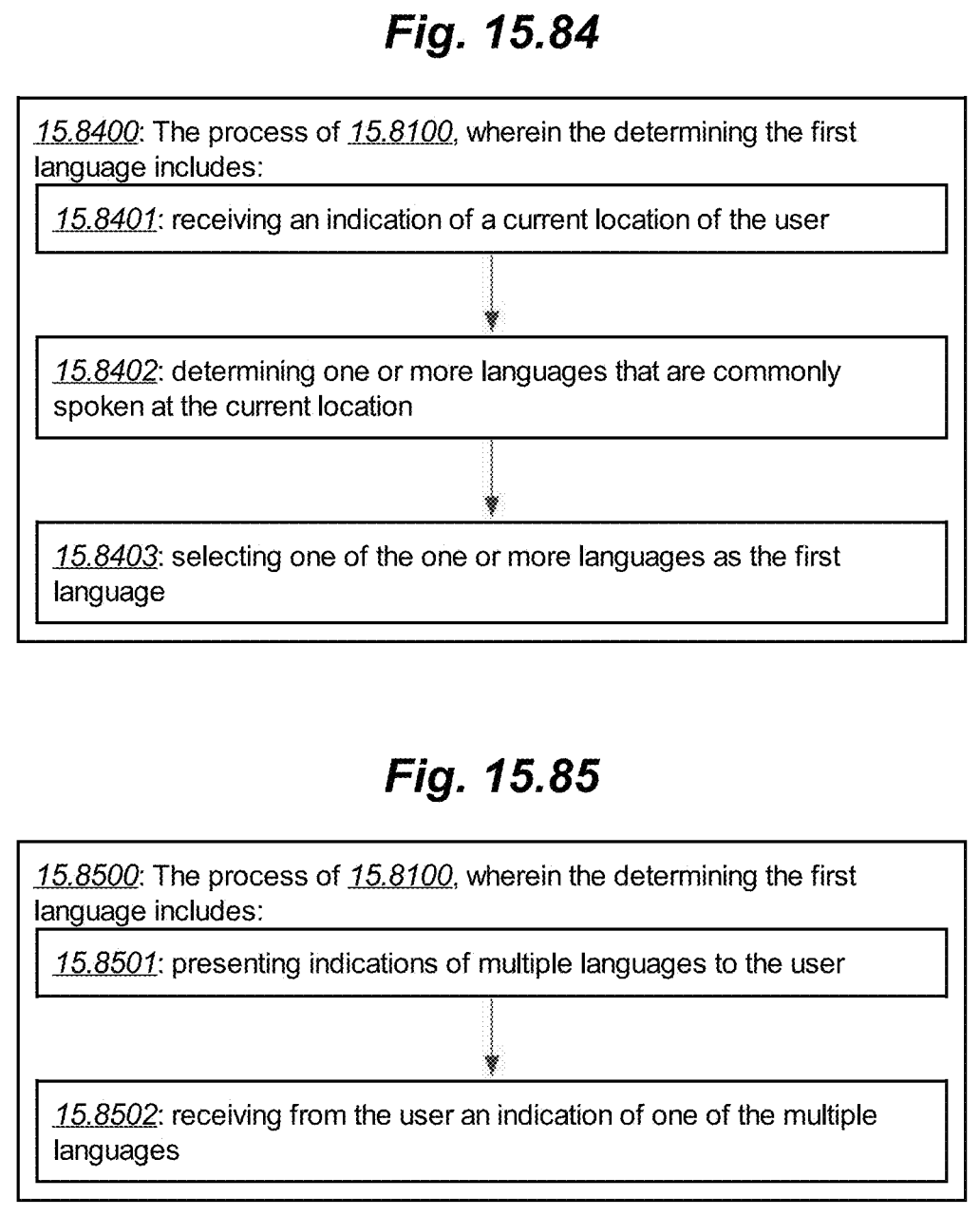

*15.8400*: The process of *15.8100*, wherein the determining the first language includes:

*15.8401*: receiving an indication of a current location of the user

↓

*15.8402*: determining one or more languages that are commonly spoken at the current location

↓

*15.8403*: selecting one of the one or more languages as the first language

*Fig. 15.85*

*15.8500*: The process of *15.8100*, wherein the determining the first language includes:

*15.8501*: presenting indications of multiple languages to the user

↓

*15.8502*: receiving from the user an indication of one of the multiple languages

Fig. 15.86

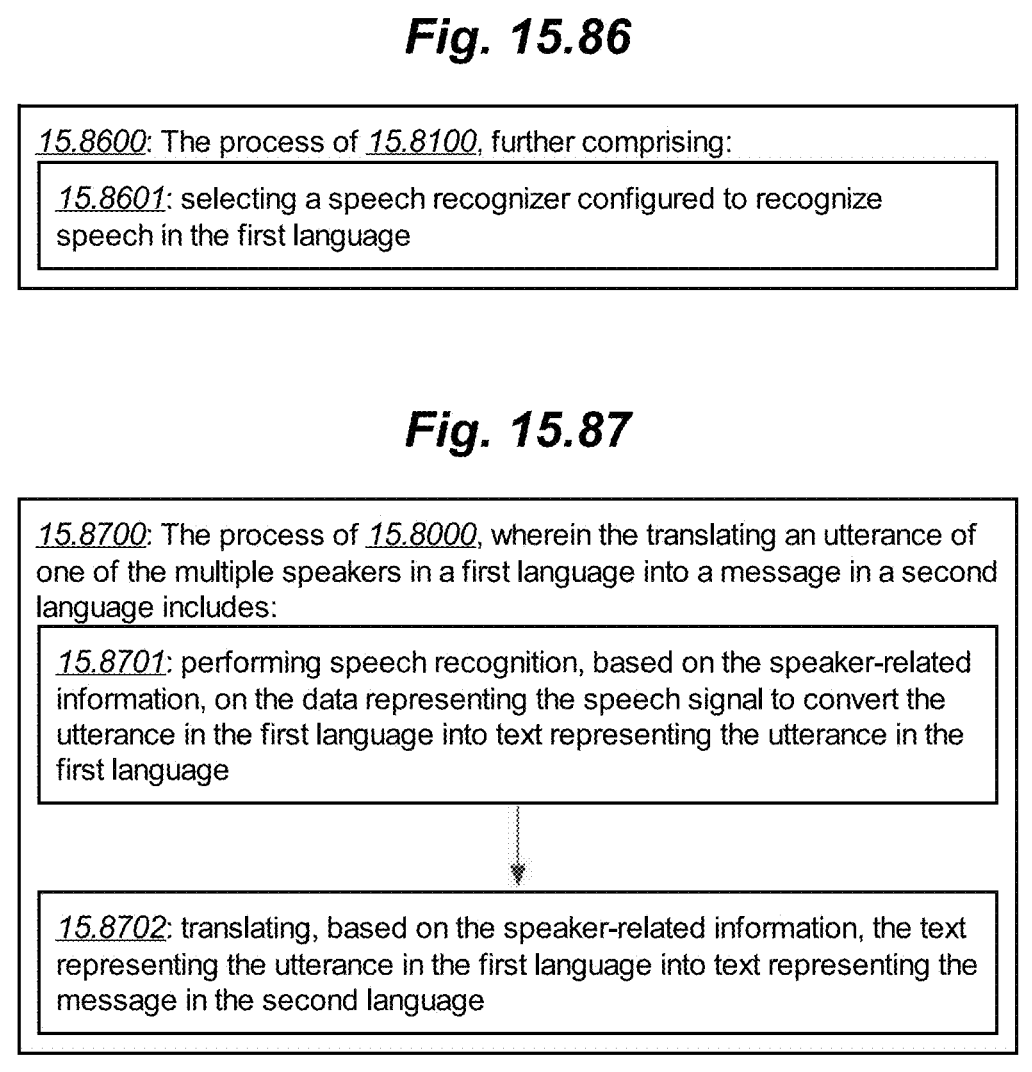

15.8600: The process of 15.8100, further comprising:

15.8601: selecting a speech recognizer configured to recognize speech in the first language

Fig. 15.87

15.8700: The process of 15.8000, wherein the translating an utterance of one of the multiple speakers in a first language into a message in a second language includes:

15.8701: performing speech recognition, based on the speaker-related information, on the data representing the speech signal to convert the utterance in the first language into text representing the utterance in the first language

↓

15.8702: translating, based on the speaker-related information, the text representing the utterance in the first language into text representing the message in the second language

*Fig. 15.88*

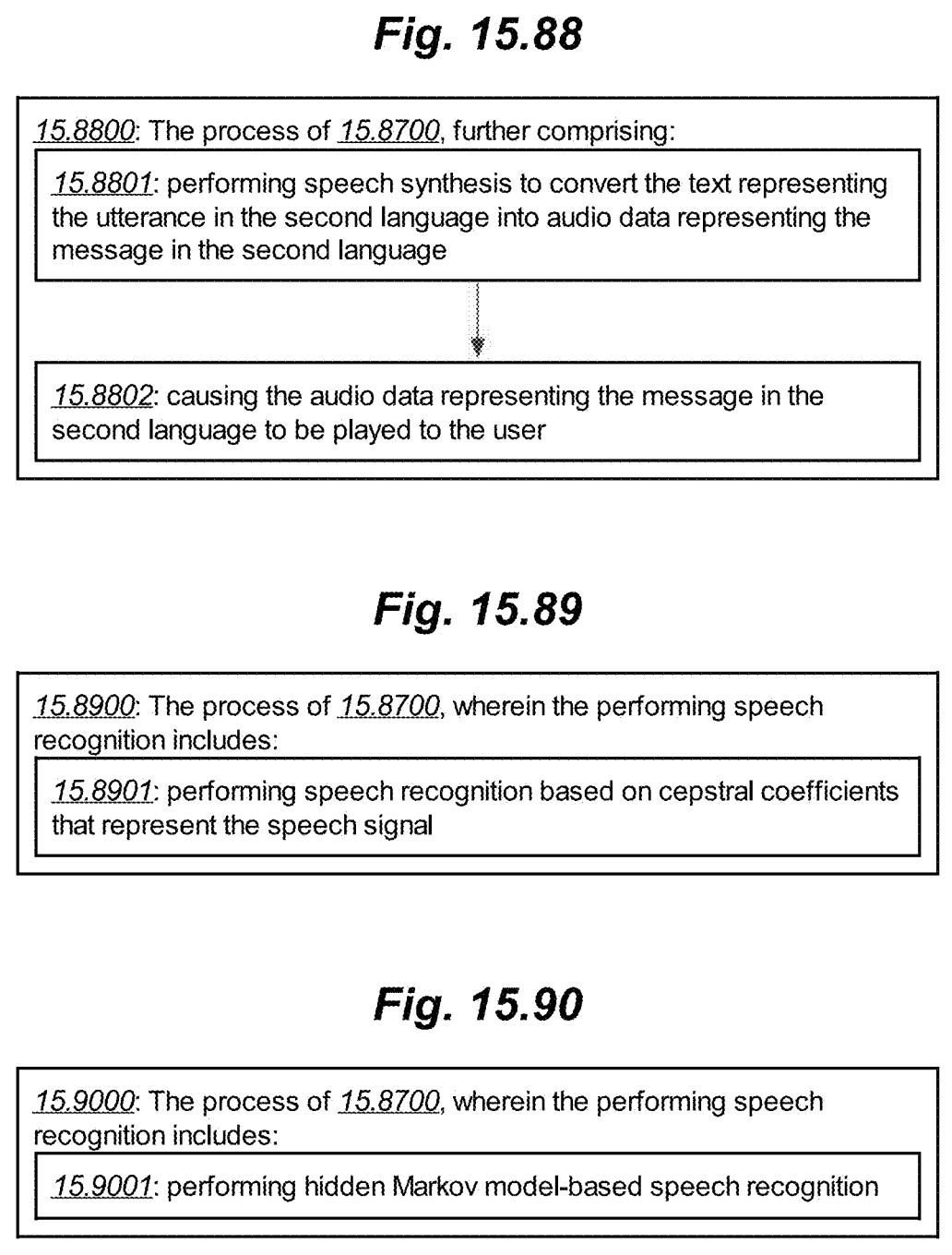

15.8800: The process of 15.8700, further comprising:

15.8801: performing speech synthesis to convert the text representing the utterance in the second language into audio data representing the message in the second language

↓

15.8802: causing the audio data representing the message in the second language to be played to the user

*Fig. 15.89*

15.8900: The process of 15.8700, wherein the performing speech recognition includes:

15.8901: performing speech recognition based on cepstral coefficients that represent the speech signal

*Fig. 15.90*

15.9000: The process of 15.8700, wherein the performing speech recognition includes:

15.9001: performing hidden Markov model-based speech recognition

*Fig. 15.91*

15.9100: The process of 15.8000, wherein the translating an utterance of one of the multiple speakers in a first language into a message in a second language includes:

15.9101: translating the utterance based on speaker-related information including an identity of the one speaker

*Fig. 15.92*

15.9200: The process of 15.8000, wherein the translating an utterance of one of the multiple speakers in a first language into a message in a second language includes:

15.9201: translating the utterance based on speaker-related information including a language model that is specific to the one speaker

*Fig. 15.93*

15.9300: The process of 15.9200, wherein the translating the utterance based on speaker-related information including a language model that is specific to the one speaker includes:

15.9301: translating the utterance based on a language model that is tailored to a group of people of which the one speaker is a member

*Fig. 15.94*

*15.9400*: The process of *15.9200*, wherein the translating the utterance based on speaker-related information including a language model that is specific to the one speaker includes:

*15.9401*: generating the language model based on information items generated by the one speaker, the information items including at least one of emails transmitted by the one speaker, documents authored by the one speaker, and/or social network messages transmitted by the one speaker

*Fig. 15.95*

*15.9500*: The process of *15.8000*, wherein the translating an utterance of one of the multiple speakers in a first language into a message in a second language includes:

*15.9501*: translating the utterance based on speaker-related information including a language model tailored to the voice conference

*Fig. 15.96*

*15.9600*: The process of *15.9500*, wherein the translating the utterance based on speaker-related information including a language model tailored to the voice conference includes:

*15.9601*: generating the language model based on information items by or about any of the multiple speakers, the information items including at least one of emails, documents, and/or social network messages

Fig. 15.97

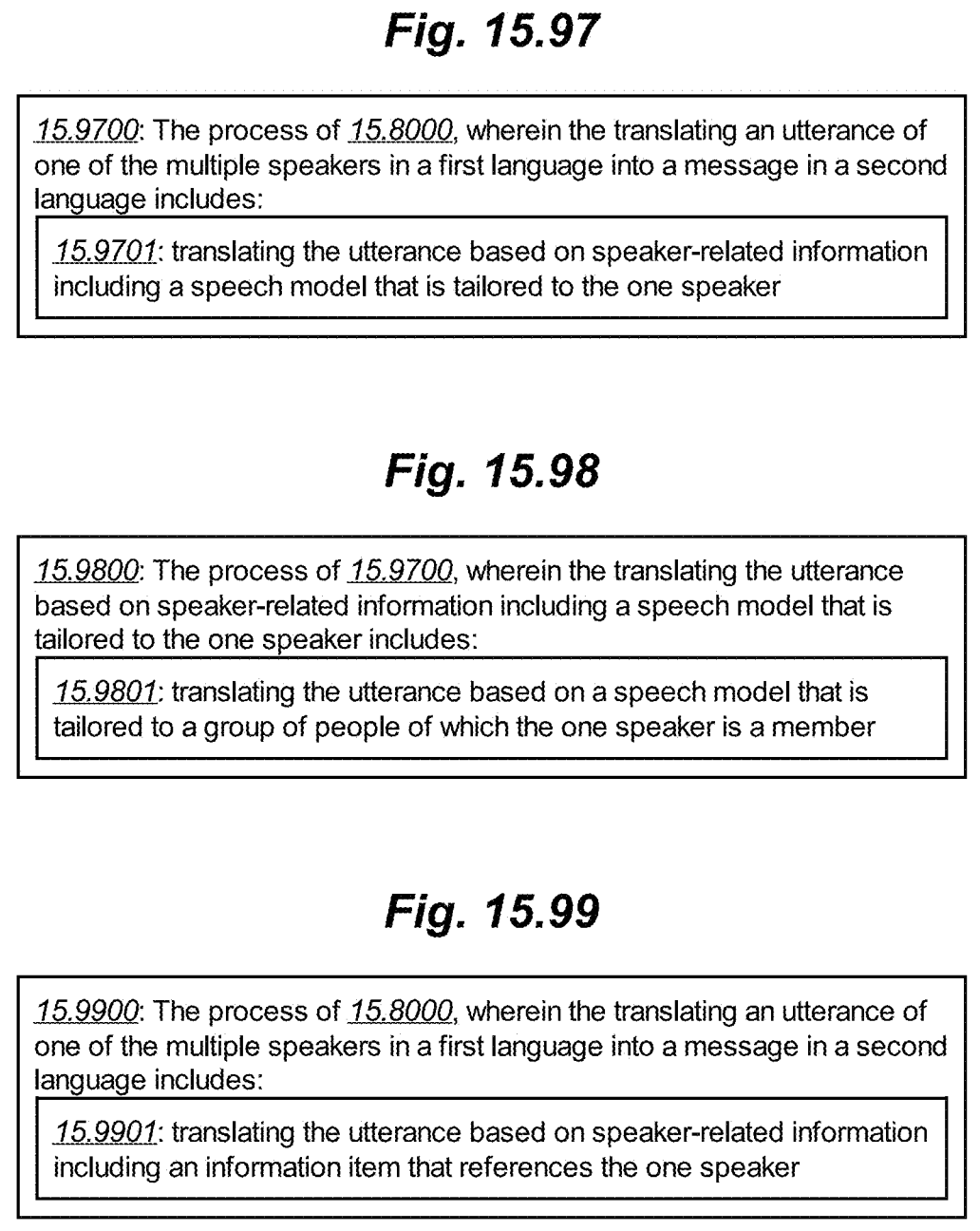

15.9700: The process of 15.8000, wherein the translating an utterance of one of the multiple speakers in a first language into a message in a second language includes:

15.9701: translating the utterance based on speaker-related information including a speech model that is tailored to the one speaker

Fig. 15.98

15.9800: The process of 15.9700, wherein the translating the utterance based on speaker-related information including a speech model that is tailored to the one speaker includes:

15.9801: translating the utterance based on a speech model that is tailored to a group of people of which the one speaker is a member

Fig. 15.99

15.9900: The process of 15.8000, wherein the translating an utterance of one of the multiple speakers in a first language into a message in a second language includes:

15.9901: translating the utterance based on speaker-related information including an information item that references the one speaker

Fig. 15.100

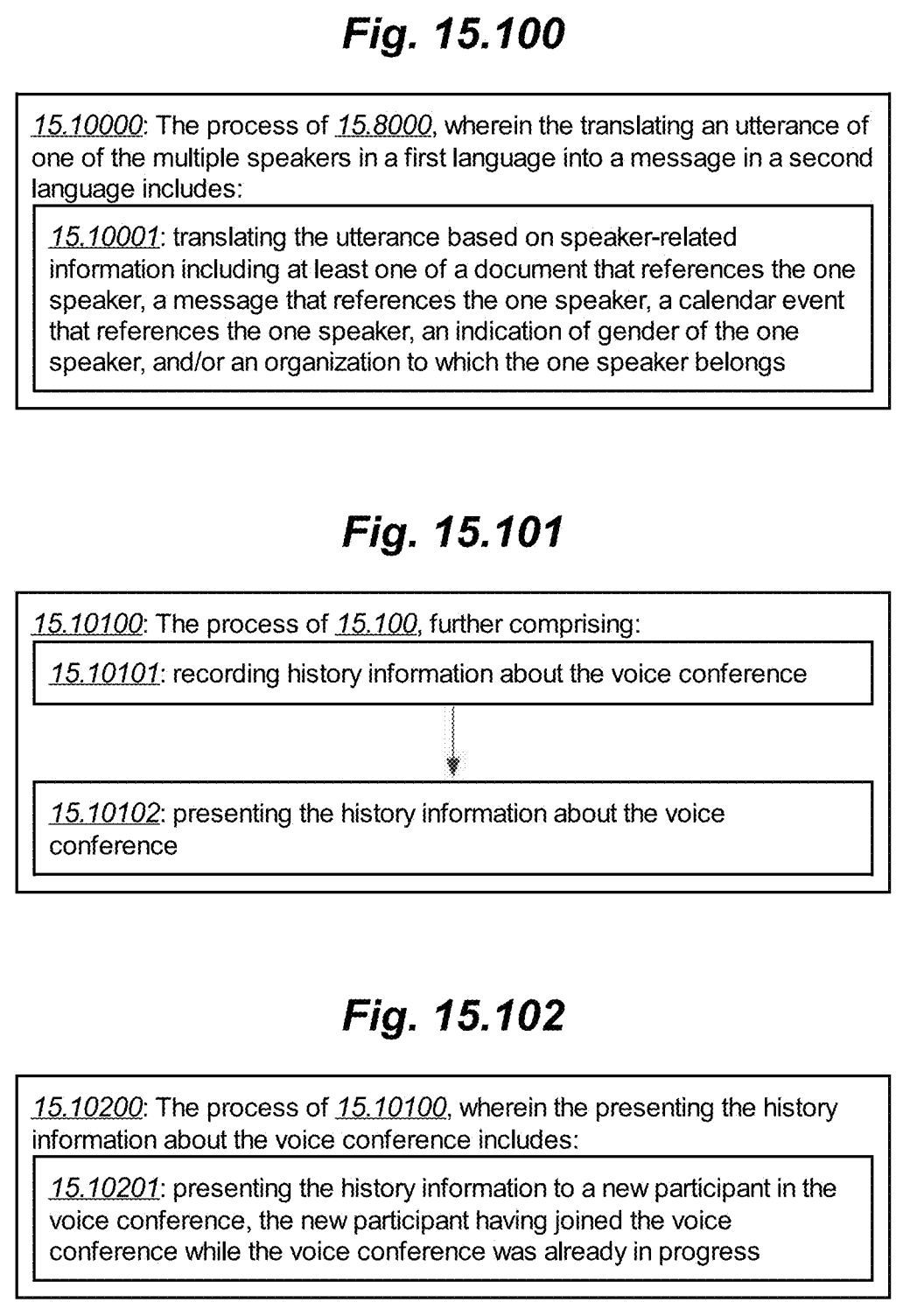

15.10000: The process of 15.8000, wherein the translating an utterance of one of the multiple speakers in a first language into a message in a second language includes:

15.10001: translating the utterance based on speaker-related information including at least one of a document that references the one speaker, a message that references the one speaker, a calendar event that references the one speaker, an indication of gender of the one speaker, and/or an organization to which the one speaker belongs

Fig. 15.101

15.10100: The process of 15.100, further comprising:

15.10101: recording history information about the voice conference 15.10102: presenting the history information about the voice conference

Fig. 15.102

15.10200: The process of 15.10100, wherein the presenting the history information about the voice conference includes:

15.10201: presenting the history information to a new participant in the voice conference, the new participant having joined the voice conference while the voice conference was already in progress

*Fig. 15.103*

15.10300: The process of 15.10100, wherein the presenting the history information about the voice conference includes:

15.10301: presenting the history information to a participant in the voice conference, the participant having rejoined the voice conference after having left the voice conference for a period of time

*Fig. 15.104*

15.10400: The process of 15.10100, wherein the presenting the history information about the voice conference includes:

15.10401: presenting at least one of a transcription of utterances made by speakers during the voice conference, indications of topics discussed during the voice conference, and/or indications of information items related to subject matter of the voice conference

*Fig. 15.105*

15.10500: The process of 15.10100, wherein the recording history information about the voice conference includes:

15.10501: recording the data representing speech signals from the voice conference

*Fig. 15.106*

15.10600: The process of 15.10100, wherein the recording history information about the voice conference includes:

15.10601: recording a transcription of utterances made by speakers during the voice conference

*Fig. 15.107*

15.10700: The process of 15.10100, wherein the recording history information about the voice conference includes:

15.10701: recording indications of topics discussed during the voice conference

*Fig. 15.108*

15.10800: The process of 15.10100, wherein the recording history information about the voice conference includes:

15.10801: recording indications of information items related to subject matter of the voice conference

Fig. 19.1

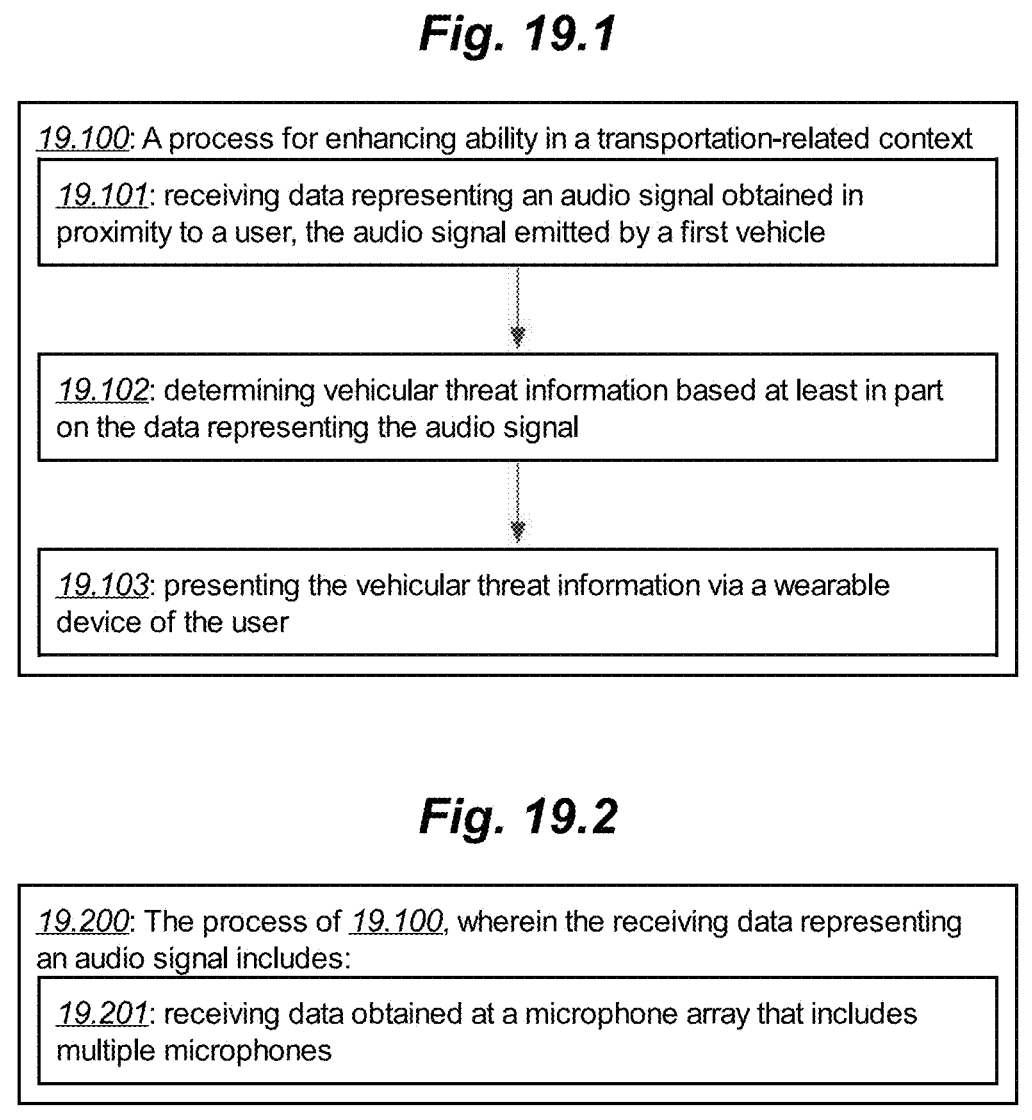

19.100: A process for enhancing ability in a transportation-related context 19.101: receiving data representing an audio signal obtained in proximity to a user, the audio signal emitted by a first vehicle

↓

19.102: determining vehicular threat information based at least in part on the data representing the audio signal

↓

19.103: presenting the vehicular threat information via a wearable device of the user

Fig. 19.2

19.200: The process of 19.100, wherein the receiving data representing an audio signal includes:

19.201: receiving data obtained at a microphone array that includes multiple microphones

Fig. 19.3

19.300: The process of 19.200, wherein the receiving data obtained at a microphone array includes:

19.301: receiving data obtained at a microphone array, the microphone array coupled to a vehicle of the user

Fig. 19.4

19.400: The process of 19.200, wherein the receiving data obtained at a microphone array includes:

19.401: receiving data obtained at a microphone array, the microphone array coupled to the wearable device

Fig. 19.5

19.500: The process of 19.100, wherein the determining vehicular threat information includes:

19.501: determining a position of the first vehicle

*Fig. 19.6*

<u>*19.600*</u>: The process of <u>*19.100*</u>, wherein the determining vehicular threat information includes:

<u>*19.601*</u>: determining a velocity of the first vehicle

*Fig. 19.7*

<u>*19.700*</u>: The process of <u>*19.100*</u>, wherein the determining vehicular threat information includes:

<u>*19.701*</u>: determining a direction of travel of the first vehicle

*Fig. 19.8*

<u>*19.800*</u>: The process of <u>*19.100*</u>, wherein the determining vehicular threat information includes:

<u>*19.801*</u>: determining whether the first vehicle is approaching the user

*Fig. 19.9*

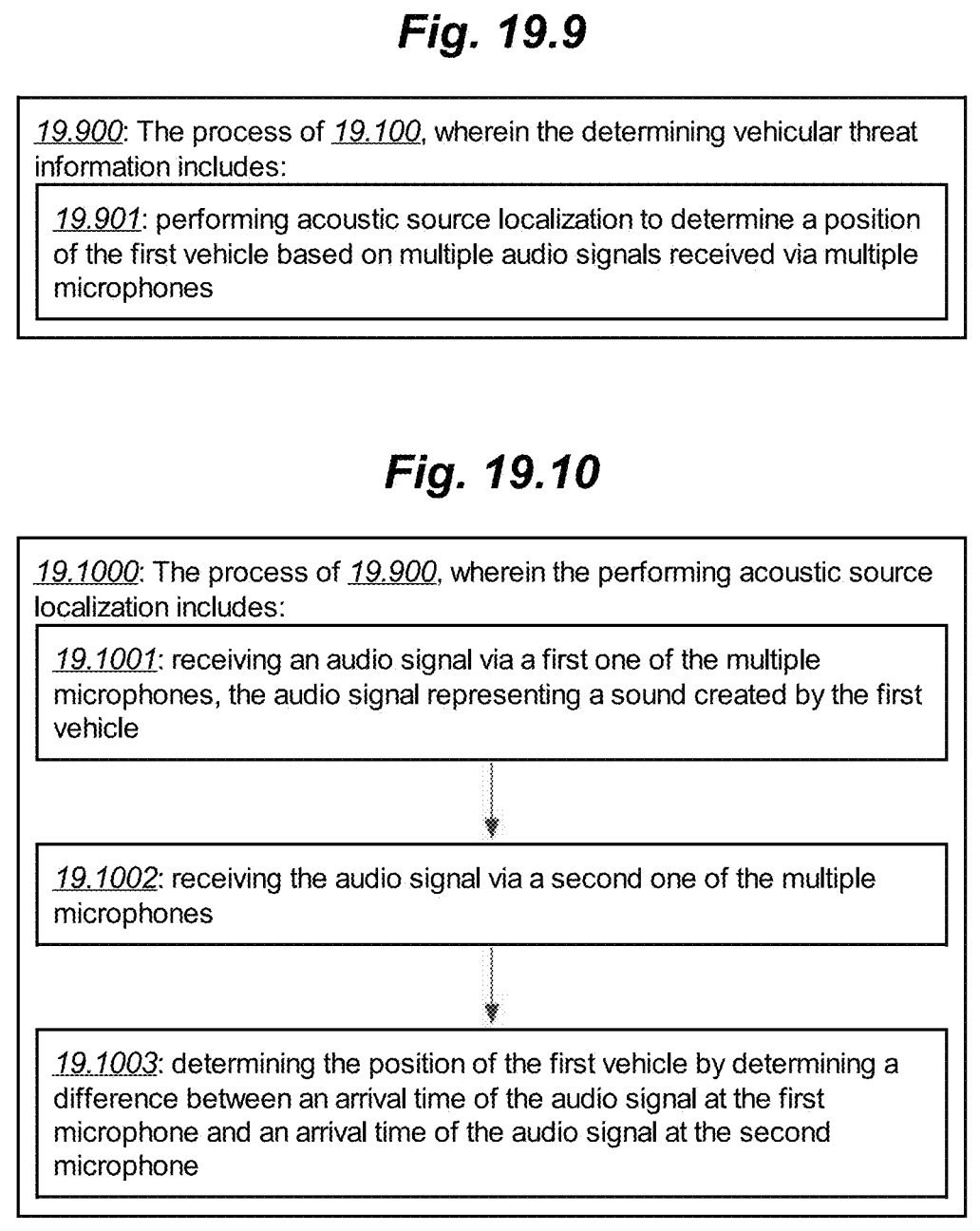

19.900: The process of 19.100, wherein the determining vehicular threat information includes:

19.901: performing acoustic source localization to determine a position of the first vehicle based on multiple audio signals received via multiple microphones

*Fig. 19.10*

19.1000: The process of 19.900, wherein the performing acoustic source localization includes:

19.1001: receiving an audio signal via a first one of the multiple microphones, the audio signal representing a sound created by the first vehicle

↓

19.1002: receiving the audio signal via a second one of the multiple microphones

↓

19.1003: determining the position of the first vehicle by determining a difference between an arrival time of the audio signal at the first microphone and an arrival time of the audio signal at the second microphone

*Fig. 19.11*

19.1100: The process of 19.900, wherein the performing acoustic source localization includes:

19.1101: triangulating the position of the first vehicle based on a first and second angle, the first angle measured between a first one of the multiple microphones and the first vehicle, the second angle measured between a second one of the multiple microphones and the first vehicle

*Fig. 19.12*

19.1200: The process of 19.100, wherein the determining vehicular threat information includes:

19.1201: performing a Doppler analysis of the data representing the audio signal to determine whether the first vehicle is approaching the user

*Fig. 19.13*

19.1300: The process of 19.1200, wherein the performing a Doppler analysis includes:

19.1301: determining whether frequency of the audio signal is increasing or decreasing

*Fig. 19.14*

*19.1400*: The process of *19.100*, wherein the determining vehicular threat information includes:

*19.1401*: performing a volume analysis of the data representing the audio signal to determine whether the first vehicle is approaching the user

*Fig. 19.15*

*19.1500*: The process of *19.1400*, wherein the performing a volume analysis includes:

*19.1501*: determining whether volume of the audio signal is increasing or decreasing

*Fig. 19.16*

*19.1600*: The process of *19.100*, wherein the determining vehicular threat information includes:

*19.1601*: determining the vehicular threat information based on gaze information associated with the user

Fig. 19.17

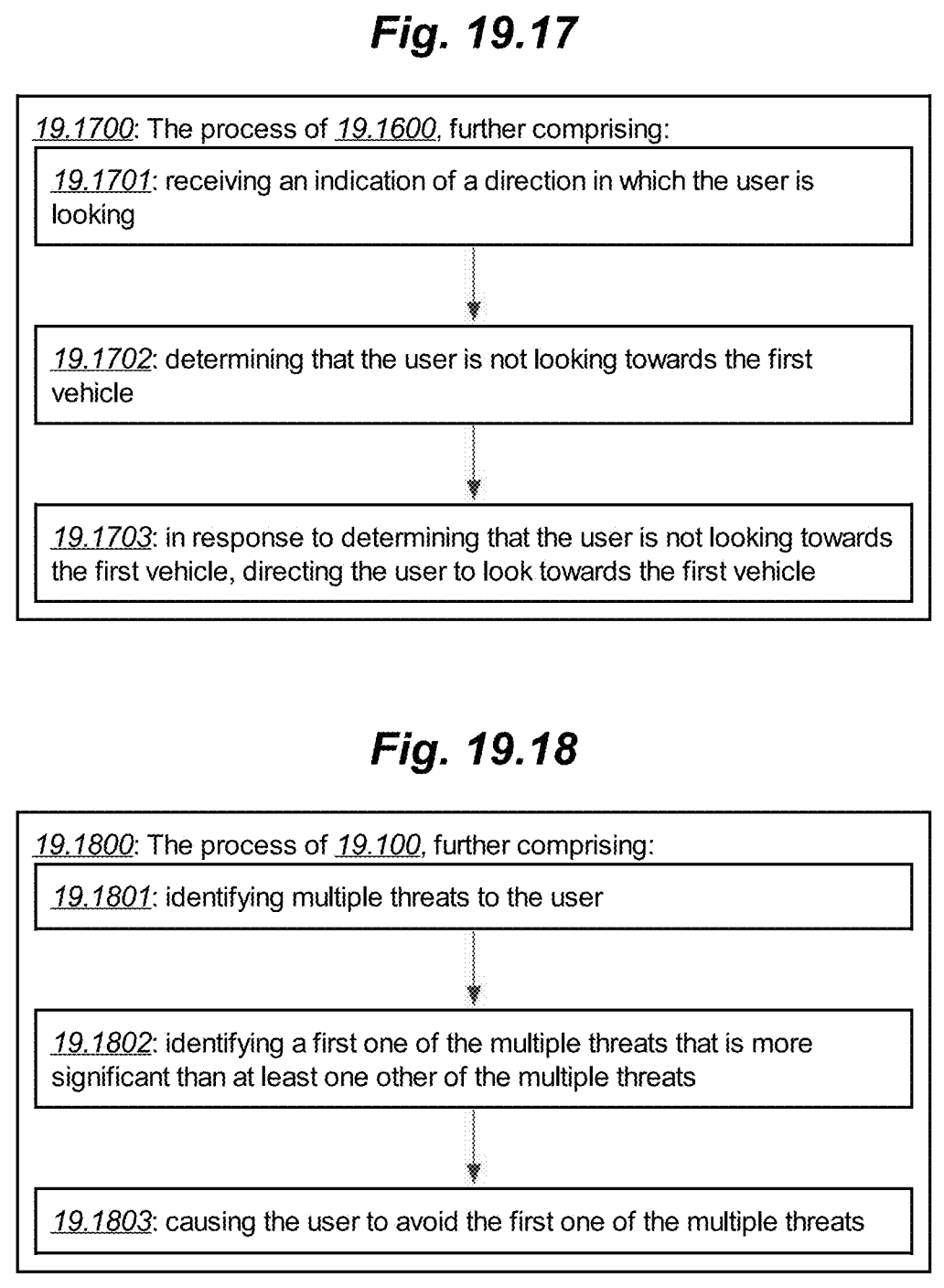

19.1700: The process of 19.1600, further comprising:

19.1701: receiving an indication of a direction in which the user is looking

↓

19.1702: determining that the user is not looking towards the first vehicle

↓

19.1703: in response to determining that the user is not looking towards the first vehicle, directing the user to look towards the first vehicle

Fig. 19.18

19.1800: The process of 19.100, further comprising:

19.1801: identifying multiple threats to the user

↓

19.1802: identifying a first one of the multiple threats that is more significant than at least one other of the multiple threats

↓

19.1803: causing the user to avoid the first one of the multiple threats

*Fig. 19.19*

19.1900: The process of 19.100, further comprising:

19.1901: determining vehicular threat information related to factors other than ones related to the first vehicle

*Fig. 19.20*

19.2000: The process of 19.1900, wherein the determining vehicular threat information related to factors other than ones related to the first vehicle includes:

19.2001: determining that poor driving conditions exist

*Fig. 19.21*

19.2100: The process of 19.1900, wherein the determining vehicular threat information related to factors other than ones related to the first vehicle includes:

19.2101: determining that a limited visibility condition exists

Fig. 19.22

19.2200: The process of 19.1900, wherein the determining vehicular threat information related to factors other than ones related to the first vehicle includes:

19.2201: determining that there is stalled or slow traffic in proximity to the user

Fig. 19.23

19.2300: The process of 19.1900, wherein the determining vehicular threat information related to factors other than ones related to the first vehicle includes:

19.2301: determining that poor surface conditions exist on a roadway traveled by the user

Fig. 19.24

19.2400: The process of 19.1900, wherein the determining vehicular threat information related to factors other than ones related to the first vehicle includes:

19.2401: determining that there is a pedestrian in proximity to the user

Fig. 19.25

19.2500: The process of 19.1900, wherein the determining vehicular threat information related to factors other than ones related to the first vehicle includes:

19.2501: determining that there is an accident in proximity to the user

Fig. 19.26

19.2600: The process of 19.1900, wherein the determining vehicular threat information related to factors other than ones related to the first vehicle includes:

19.2601: determining that there is an animal in proximity to the user

Fig. 19.27

19.2700: The process of 19.100, wherein the determining vehicular threat information includes:

19.2701: determining the vehicular threat information based on kinematic information

Fig. 19.28

_19.2800_: The process of _19.2700_, wherein the determining the vehicular threat information based on kinematic information includes:

_19.2801_: determining the vehicular threat information based on information about position, velocity, and/or acceleration of the user obtained from sensors in the wearable device

Fig. 19.29

_19.2900_: The process of _19.2700_, wherein the determining the vehicular threat information based on kinematic information includes:

_19.2901_: determining the vehicular threat information based on information about position, velocity, and/or acceleration of the user obtained from devices in a vehicle of the user

Fig. 19.30

_19.3000_: The process of _19.2700_, wherein the determining the vehicular threat information based on kinematic information includes:

_19.3001_: determining the vehicular threat information based on information about position, velocity, and/or acceleration of the first vehicle

Fig. 19.31

19.3100: The process of 19.100, wherein the presenting the vehicular threat information includes:

19.3101: presenting the vehicular threat information via an audio output device of the wearable device

Fig. 19.32

19.3200: The process of 19.100, wherein the presenting the vehicular threat information includes:

19.3201: presenting the vehicular threat information via a visual display device of the wearable device

Fig. 19.33

19.3300: The process of 19.3200, wherein the presenting the vehicular threat information via a visual display device includes:

19.3301: displaying an indicator that instructs the user to look towards the first vehicle

*Fig. 19.34*

19.3400: The process of 19.3200, wherein the presenting the vehicular threat information via a visual display device includes:

19.3401: displaying an indicator that instructs the user to accelerate, decelerate, and/or turn

*Fig. 19.35*

19.3500: The process of 19.100, wherein the presenting the vehicular threat information includes:

19.3501: directing the user to accelerate

*Fig. 19.36*

19.3600: The process of 19.100, wherein the presenting the vehicular threat information includes:

19.3601: directing the user to decelerate

*Fig. 19.37*

19.3700: The process of 19.100, wherein the presenting the vehicular threat information includes:

19.3701: directing the user to turn

*Fig. 19.38*

19.3800: The process of 19.100, further comprising:

19.3801: transmitting to the first vehicle a warning based on the vehicular threat information

*Fig. 19.39*

19.3900: The process of 19.100, further comprising:

19.3901: presenting the vehicular threat information via an output device of a vehicle of the user, the output device including a visual display and/or an audio speaker

*Fig. 19.40*

19.4000: The process of 19.100, wherein the wearable device is a helmet worn by the user

*Fig. 19.41*

19.4100: The process of 19.100, wherein the wearable device is goggles worn by the user

Fig. 19.42

*19.4200*: The process of *19.100*, wherein the wearable device is eyeglasses worn by the user

Fig. 19.43

*19.4300*: The process of *19.100*, wherein the presenting the vehicular threat information includes:

> *19.4301*: presenting the vehicular threat information via goggles worn by the user

Fig. 19.44

*19.4400*: The process of *19.100*, wherein the presenting the vehicular threat information includes:

> *19.4401*: presenting the vehicular threat information via a helmet worn by the user

Fig. 19.45

19.4500: The process of 19.100, wherein the presenting the vehicular threat information includes:

19.4501: presenting the vehicular threat information via a hat worn by the user

Fig. 19.46

19.4600: The process of 19.100, wherein the presenting the vehicular threat information includes:

19.4601: presenting the vehicular threat information via eyeglasses worn by the user

Fig. 19.47

19.4700: The process of 19.100, wherein the presenting the vehicular threat information includes:

19.4701: presenting the vehicular threat information via audio speakers that are part of at least one of earphones, a headset, earbuds, and/or a hearing aid

Fig. 19.48

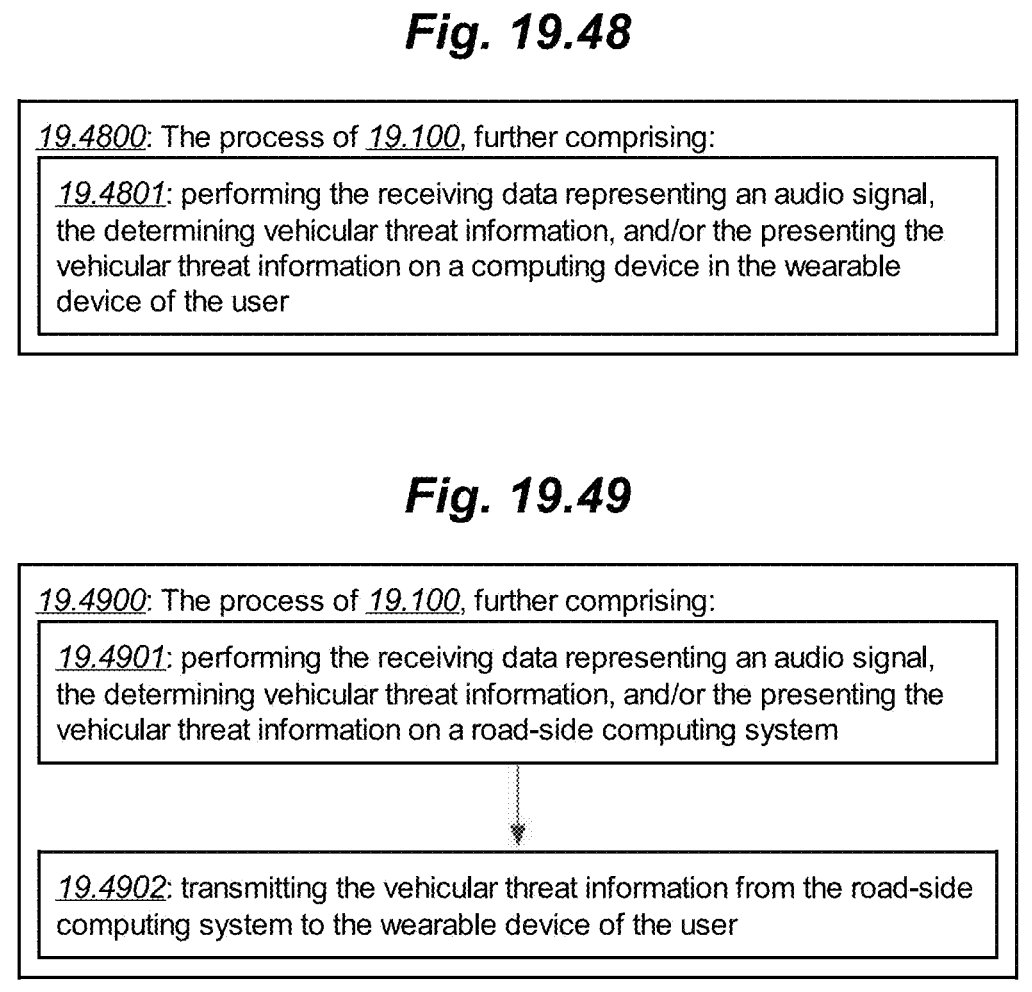

19.4800: The process of 19.100, further comprising:

19.4801: performing the receiving data representing an audio signal, the determining vehicular threat information, and/or the presenting the vehicular threat information on a computing device in the wearable device of the user

Fig. 19.49

19.4900: The process of 19.100, further comprising:

19.4901: performing the receiving data representing an audio signal, the determining vehicular threat information, and/or the presenting the vehicular threat information on a road-side computing system 19.4902: transmitting the vehicular threat information from the road-side computing system to the wearable device of the user

Fig. 19.50

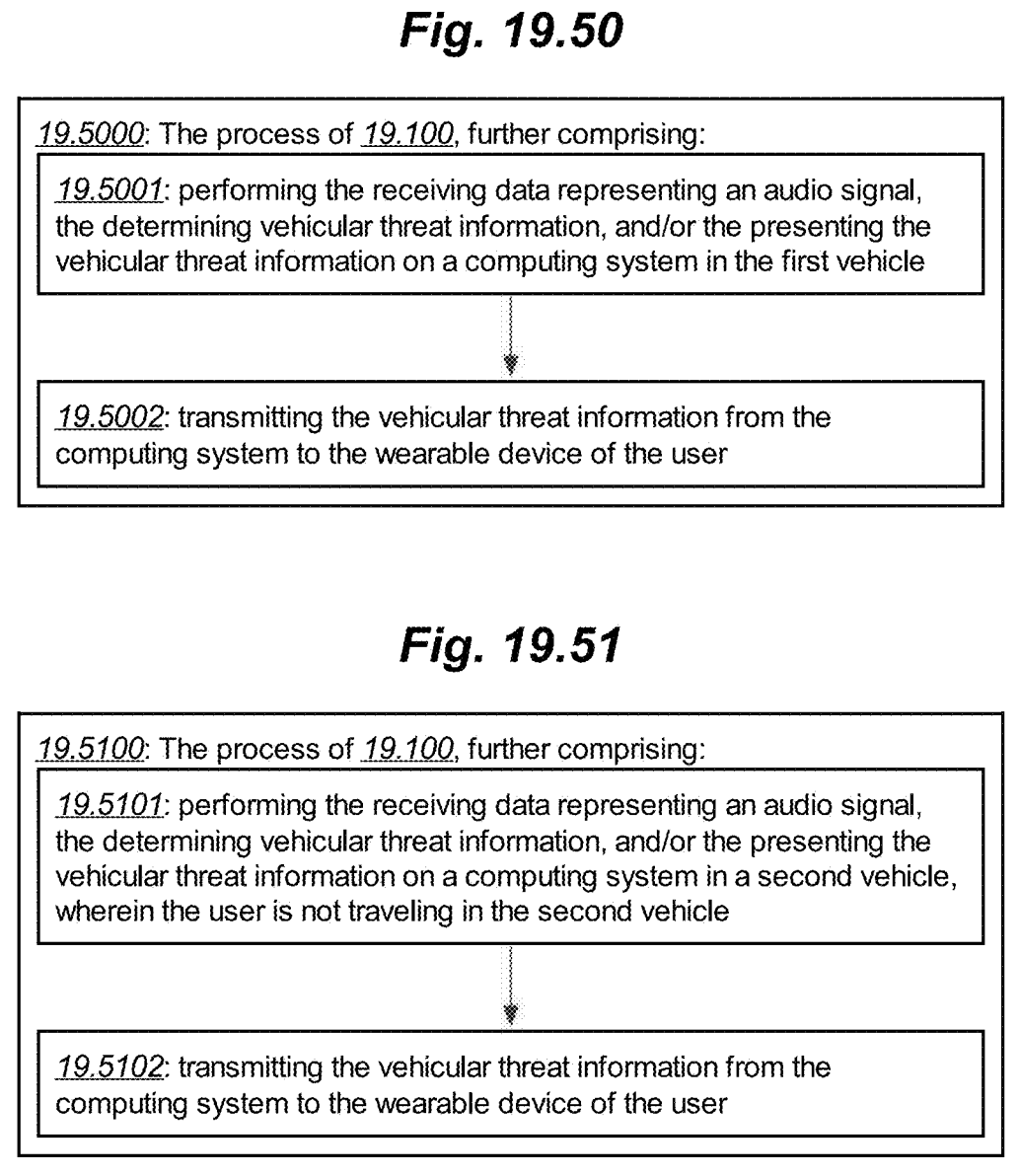

19.5000: The process of 19.100, further comprising:

19.5001: performing the receiving data representing an audio signal, the determining vehicular threat information, and/or the presenting the vehicular threat information on a computing system in the first vehicle

↓

19.5002: transmitting the vehicular threat information from the computing system to the wearable device of the user

Fig. 19.51

19.5100: The process of 19.100, further comprising:

19.5101: performing the receiving data representing an audio signal, the determining vehicular threat information, and/or the presenting the vehicular threat information on a computing system in a second vehicle, wherein the user is not traveling in the second vehicle

↓

19.5102: transmitting the vehicular threat information from the computing system to the wearable device of the user

Fig. 19.52

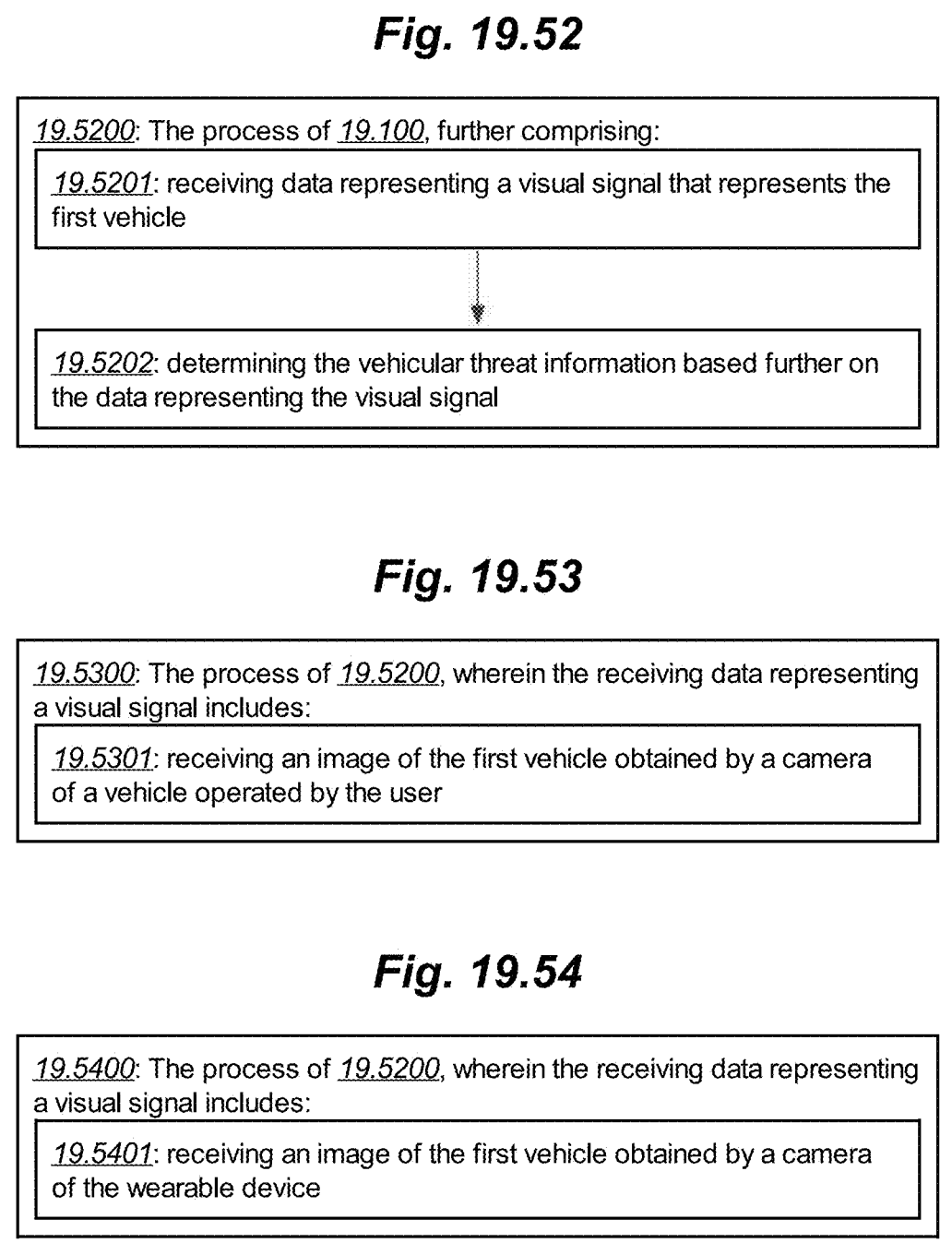

19.5200: The process of 19.100, further comprising:

19.5201: receiving data representing a visual signal that represents the first vehicle

↓

19.5202: determining the vehicular threat information based further on the data representing the visual signal

Fig. 19.53

19.5300: The process of 19.5200, wherein the receiving data representing a visual signal includes:

19.5301: receiving an image of the first vehicle obtained by a camera of a vehicle operated by the user

Fig. 19.54

19.5400: The process of 19.5200, wherein the receiving data representing a visual signal includes:

19.5401: receiving an image of the first vehicle obtained by a camera of the wearable device

*Fig. 19.55*

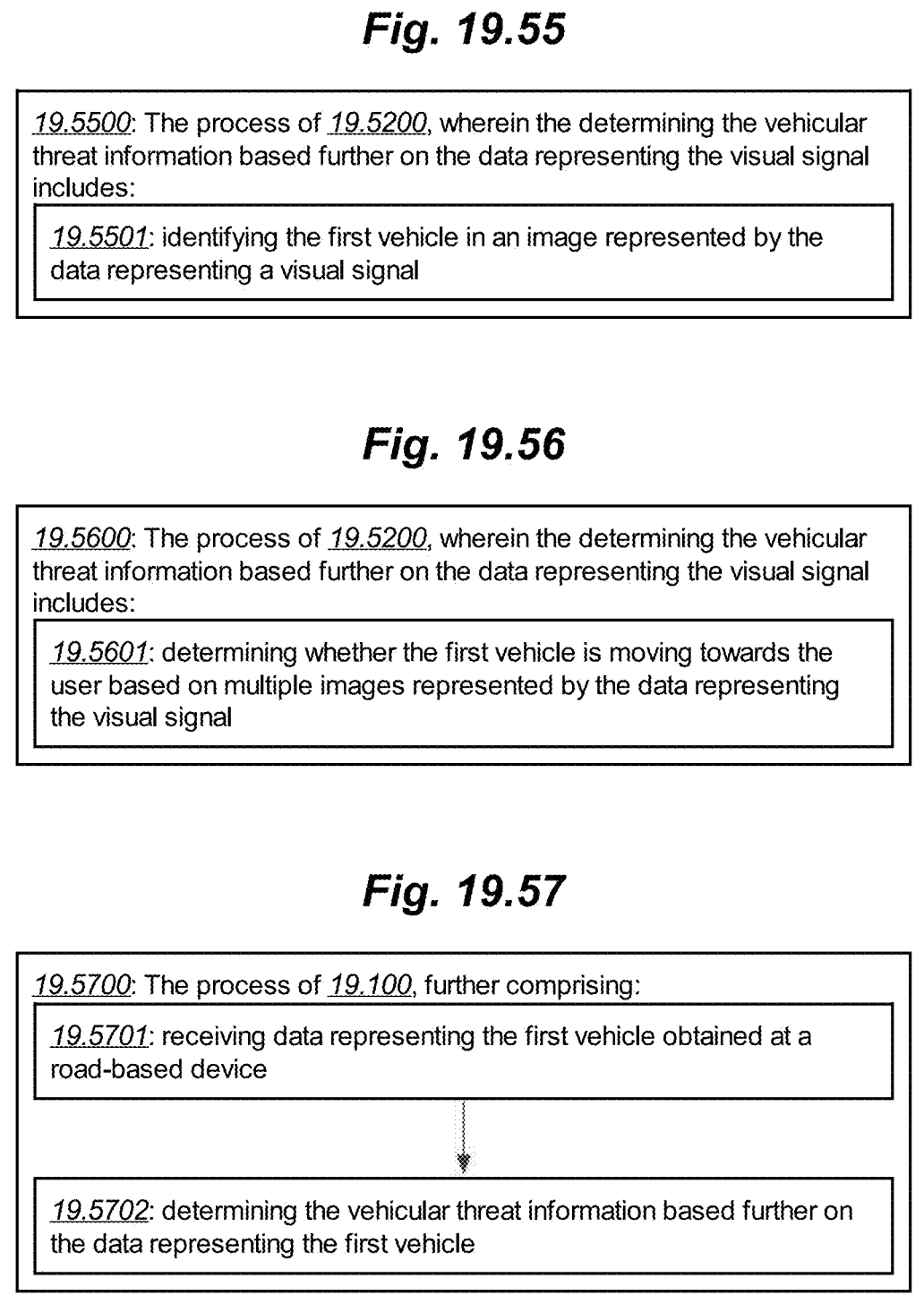

*19.5500*: The process of *19.5200*, wherein the determining the vehicular threat information based further on the data representing the visual signal includes:

*19.5501*: identifying the first vehicle in an image represented by the data representing a visual signal

*Fig. 19.56*

*19.5600*: The process of *19.5200*, wherein the determining the vehicular threat information based further on the data representing the visual signal includes:

*19.5601*: determining whether the first vehicle is moving towards the user based on multiple images represented by the data representing the visual signal

*Fig. 19.57*

*19.5700*: The process of *19.100*, further comprising:

*19.5701*: receiving data representing the first vehicle obtained at a road-based device

*19.5702*: determining the vehicular threat information based further on the data representing the first vehicle

Fig. 19.58

19.5800: The process of 19.5700, wherein the receiving data representing the first vehicle obtained at a road-based device includes:

19.5801: receiving the data from a sensor deployed at an intersection

Fig. 19.59

19.5900: The process of 19.5700, wherein the receiving data representing the first vehicle obtained at a road-based device includes:

19.5901: receiving an image of the first vehicle from a camera deployed at an intersection

Fig. 19.60

19.6000: The process of 19.5700, wherein the receiving data representing the first vehicle obtained at a road-based device includes:

19.6001: receiving ranging data from a range sensor deployed at an intersection, the ranging data representing a distance between the first vehicle and the intersection

Fig. 19.61

*19.6100*: The process of *19.5700*, wherein the receiving data representing the first vehicle obtained at a road-based device includes:

*19.6101*: receiving data from an induction loop deployed in a road surface, the induction loop configured to detect the presence and/or velocity of the first vehicle

Fig. 19.62

*19.6200*: The process of *19.5700*, wherein the determining the vehicular threat information based further on the data representing the first vehicle includes:

*19.6201*: identifying the first vehicle in an image obtained from the road-based sensor

Fig. 19.63

*19.6300*: The process of *19.5700*, wherein the determining the vehicular threat information based further on the data representing the first vehicle includes:

*19.6301*: determining a trajectory of the first vehicle based on multiple images obtained from the road-based device

*Fig. 19.64*

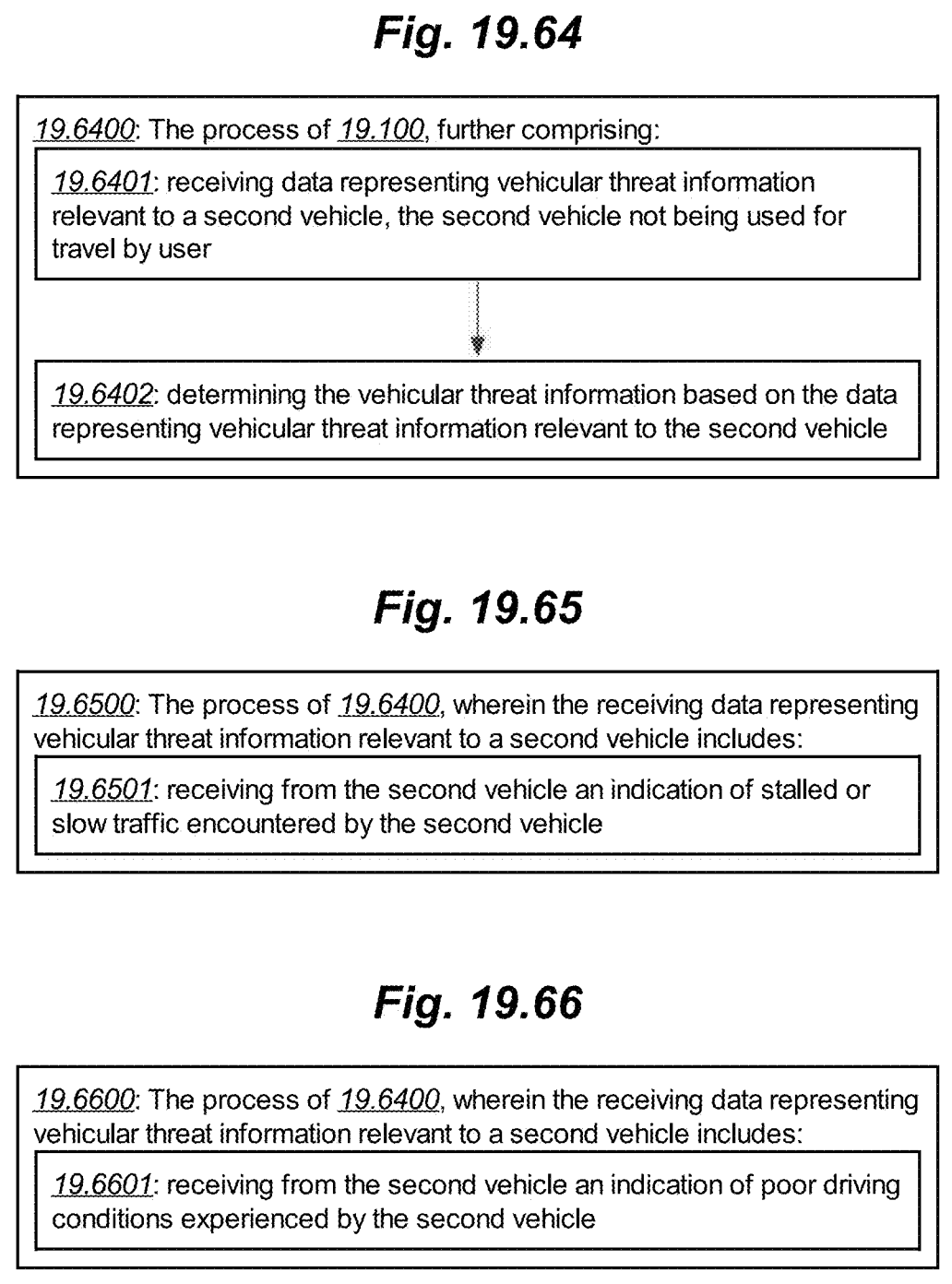

*19.6400*: The process of *19.100*, further comprising:

*19.6401*: receiving data representing vehicular threat information relevant to a second vehicle, the second vehicle not being used for travel by user

↓

*19.6402*: determining the vehicular threat information based on the data representing vehicular threat information relevant to the second vehicle

*Fig. 19.65*

*19.6500*: The process of *19.6400*, wherein the receiving data representing vehicular threat information relevant to a second vehicle includes:

*19.6501*: receiving from the second vehicle an indication of stalled or slow traffic encountered by the second vehicle

*Fig. 19.66*

*19.6600*: The process of *19.6400*, wherein the receiving data representing vehicular threat information relevant to a second vehicle includes:

*19.6601*: receiving from the second vehicle an indication of poor driving conditions experienced by the second vehicle

Fig. 19.67

19.6700: The process of 19.6400, wherein the receiving data representing vehicular threat information relevant to a second vehicle includes:

19.6701: receiving from the second vehicle an indication that the first vehicle is driving erratically

Fig. 19.68

19.6800: The process of 19.6400, wherein the receiving data representing vehicular threat information relevant to a second vehicle includes:

19.6801: receiving from the second vehicle an image of the first vehicle

Fig. 19.69

19.6900: The process of 19.100, further comprising:

19.6901: transmitting the vehicular threat information to a second vehicle

*Fig. 19.70*

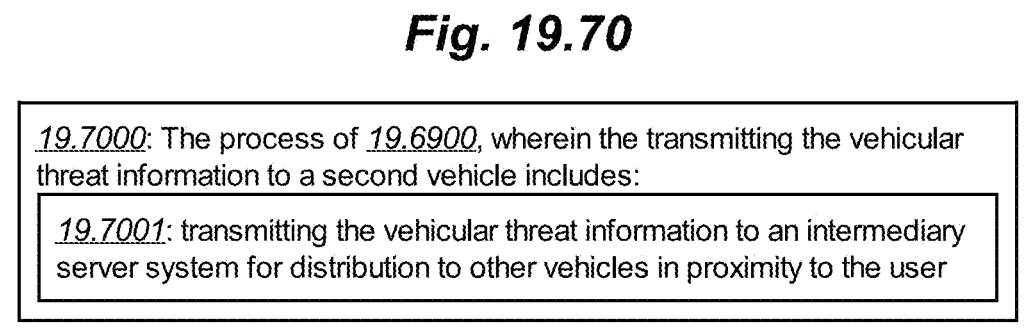

*19.7000*: The process of *19.6900*, wherein the transmitting the vehicular threat information to a second vehicle includes:

*19.7001*: transmitting the vehicular threat information to an intermediary server system for distribution to other vehicles in proximity to the user

*Fig. 23.1*

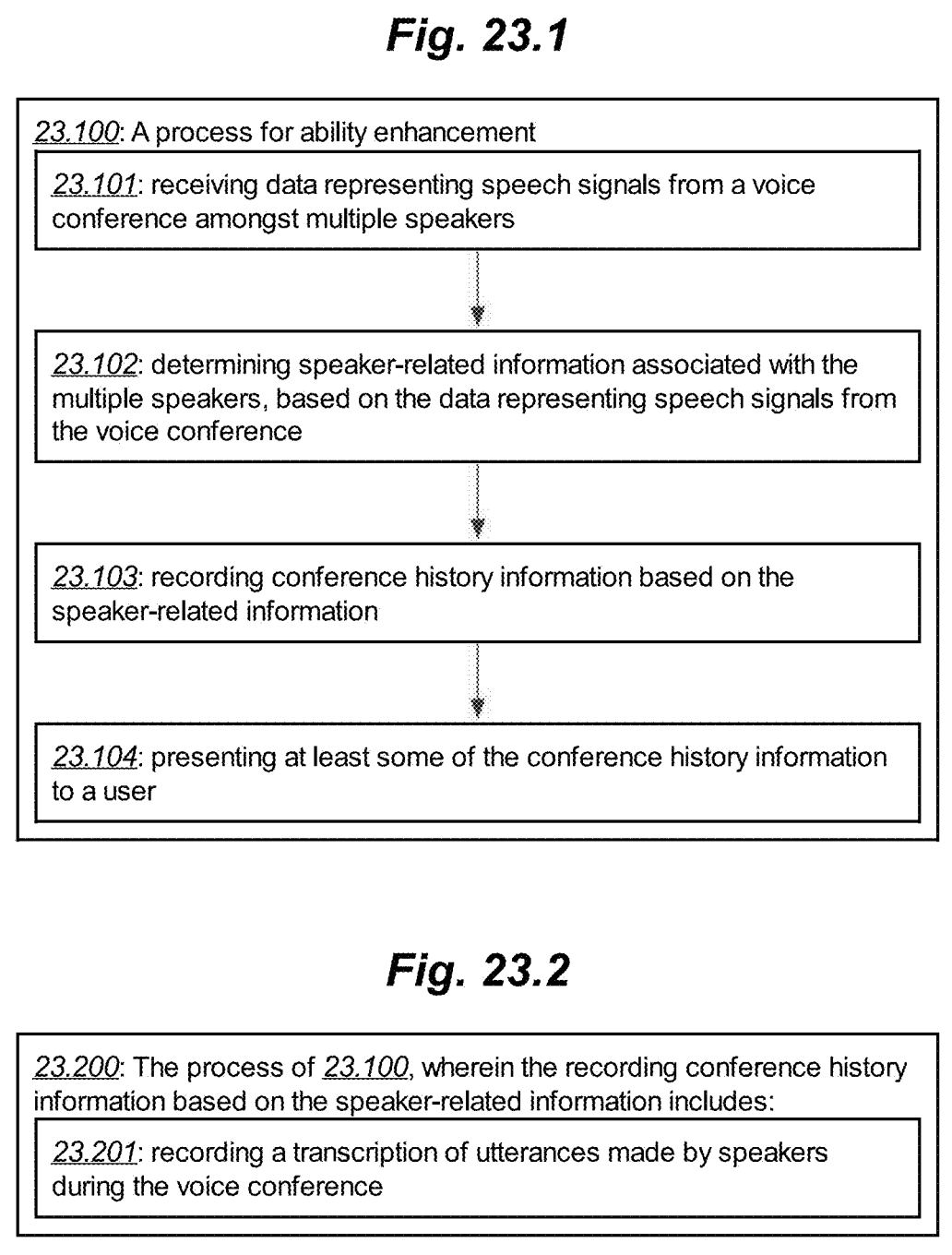

*23.100*: A process for ability enhancement

*23.101*: receiving data representing speech signals from a voice conference amongst multiple speakers

↓

*23.102*: determining speaker-related information associated with the multiple speakers, based on the data representing speech signals from the voice conference

↓

*23.103*: recording conference history information based on the speaker-related information

↓

*23.104*: presenting at least some of the conference history information to a user

*Fig. 23.2*

*23.200*: The process of *23.100*, wherein the recording conference history information based on the speaker-related information includes:

*23.201*: recording a transcription of utterances made by speakers during the voice conference

Fig. 23.3

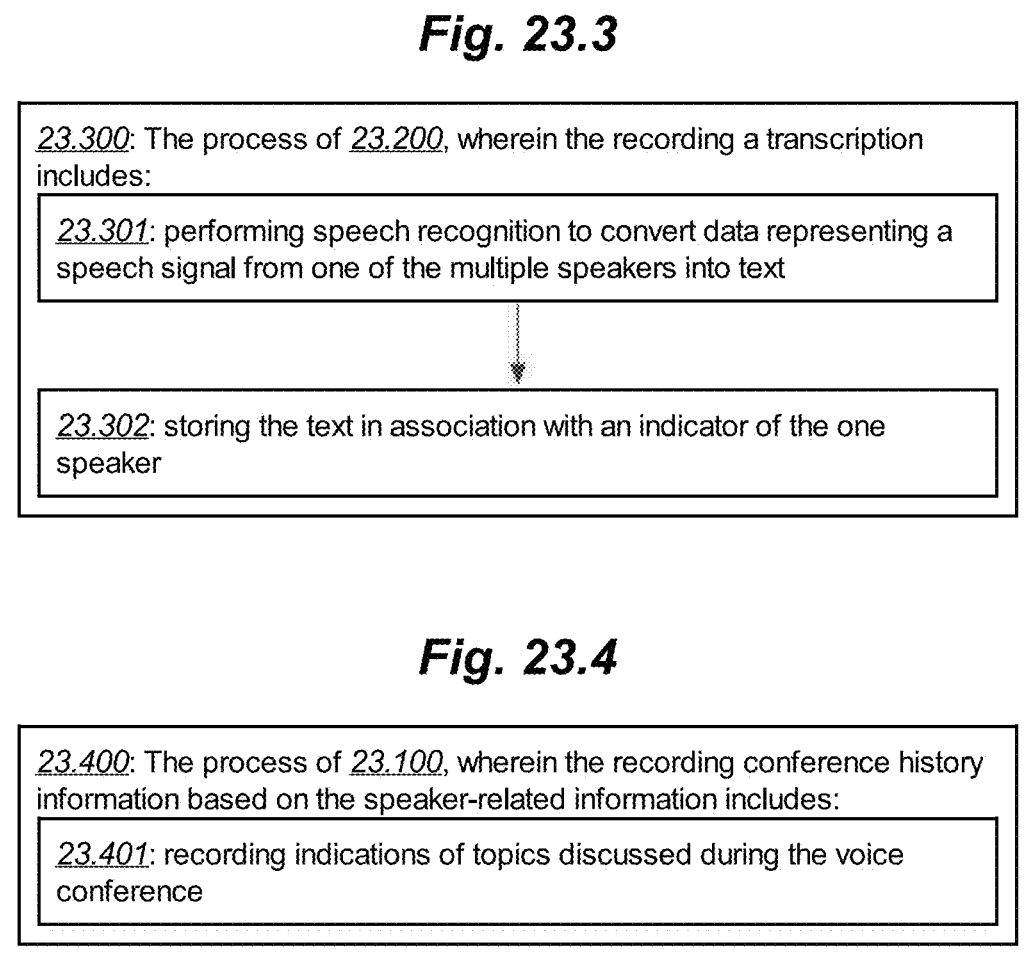

23.300: The process of 23.200, wherein the recording a transcription includes:

23.301: performing speech recognition to convert data representing a speech signal from one of the multiple speakers into text 23.302: storing the text in association with an indicator of the one speaker

Fig. 23.4

23.400: The process of 23.100, wherein the recording conference history information based on the speaker-related information includes:

23.401: recording indications of topics discussed during the voice conference

Fig. 23.5
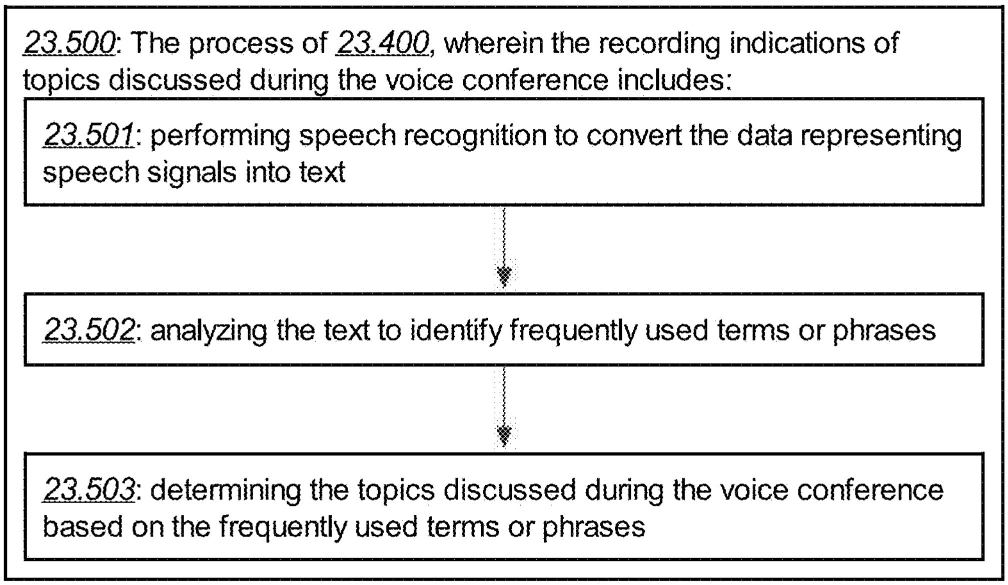
Fig. 23.6
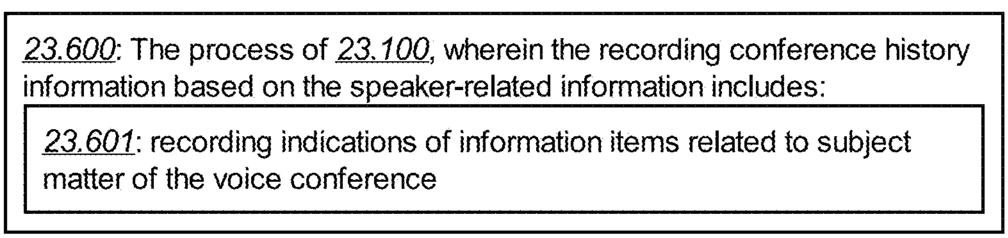

*Fig. 23.7*

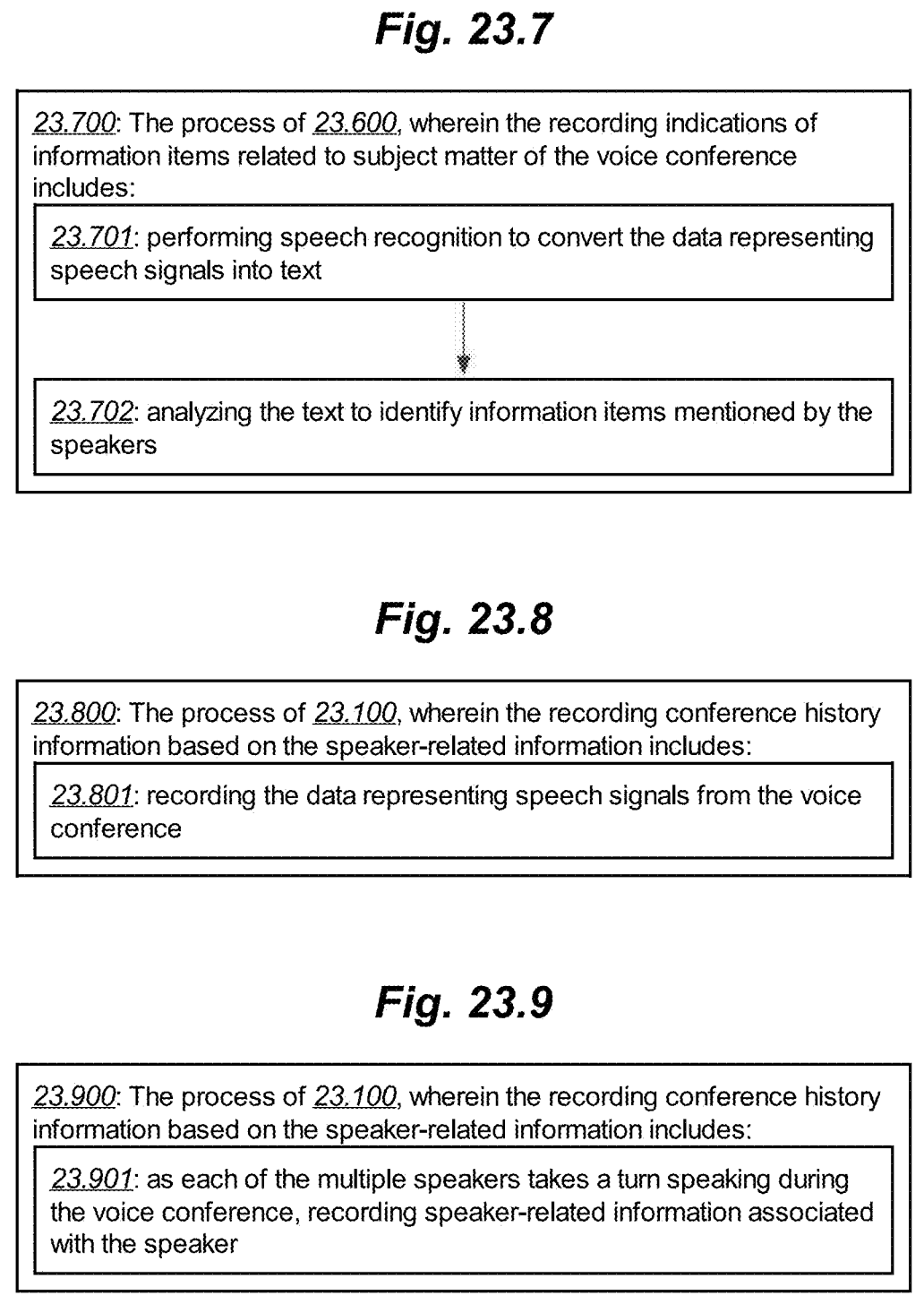

23.700: The process of 23.600, wherein the recording indications of information items related to subject matter of the voice conference includes:

23.701: performing speech recognition to convert the data representing speech signals into text

↓

23.702: analyzing the text to identify information items mentioned by the speakers

*Fig. 23.8*

23.800: The process of 23.100, wherein the recording conference history information based on the speaker-related information includes:

23.801: recording the data representing speech signals from the voice conference

*Fig. 23.9*

23.900: The process of 23.100, wherein the recording conference history information based on the speaker-related information includes:

23.901: as each of the multiple speakers takes a turn speaking during the voice conference, recording speaker-related information associated with the speaker

Fig. 23.10

23.1000: The process of 23.100, wherein the recording conference history information based on the speaker-related information includes:

23.1001: recording conference history information based on the speaker-related information during a telephone conference call amongst the multiple speakers

Fig. 23.11

23.1100: The process of 23.100, wherein the presenting at least some of the conference history information includes:

23.1101: presenting the conference history information to a new participant in the voice conference, the new participant having joined the voice conference while the voice conference was already in progress

Fig. 23.12

23.1200: The process of 23.100, wherein the presenting at least some of the conference history information includes:

23.1201: presenting the conference history information to a participant in the voice conference, the participant having rejoined the voice conference after having not participated in the voice conference for a period of time

Fig. 23.13

23.1300: The process of 23.1200, wherein the participant rejoins the voice conference after at least one of: pausing the voice conference, muting the voice conference, holding the voice conference, voluntarily leaving the voice conference, and/or involuntarily leaving the voice conference

Fig. 23.14

23.1400: The process of 23.100, wherein the presenting at least some of the conference history information includes:

23.1401: presenting the conference history information to a user after conclusion of the voice conference

Fig. 23.15

23.1500: The process of 23.100, wherein the presenting at least some of the conference history information includes:

23.1501: providing a user interface configured to access the conference history information by scrolling through a temporal record of the voice conference

Fig. 23.16

23.1600: The process of 23.100, wherein the presenting at least some of the conference history information includes:

23.1601: presenting a transcription of utterances made by speakers during the voice conference

Fig. 23.17

23.1700: The process of 23.100, wherein the presenting at least some of the conference history information includes:

23.1701: presenting indications of topics discussed during the voice conference

Fig. 23.18

23.1800: The process of 23.100, wherein the presenting at least some of the conference history information includes:

23.1801: presenting indications of information items related to subject matter of the voice conference

Fig. 23.19

23.1900: The process of 23.100, wherein the presenting at least some of the conference history information includes:

23.1901: presenting, while a current speaker is speaking, conference history information on a display device of the user, the displayed conference history information providing information related to previous statements made by the current speaker

Fig. 23.20

23.2000: The process of 23.100, further comprising:

23.2001: performing voice identification based on the data representing the speech signals from the voice conference

Fig. 23.21

23.2100: The process of 23.2000, wherein the performing voice identification includes:

23.2101: in a conference call system, matching a portion of the data representing the speech signals with an identity of one of the multiple speakers, based on a communication channel that is associated with the one speaker and over which the portion of the data is transmitted

Fig. 23.22

23.2200: The process of 23.2000, wherein the performing voice identification includes:

23.2201: comparing properties of the speech signal with properties of previously recorded speech signals from multiple persons

Fig. 23.23

23.2300: The process of 23.2200, further comprising:

23.2301: processing voice messages from the multiple persons to generate voice print data for each of the multiple persons

Fig. 23.24

23.2400: The process of 23.2300, wherein the processing voice messages includes:

23.2401: processing telephone voice messages stored by a voice mail service

Fig. 23.25

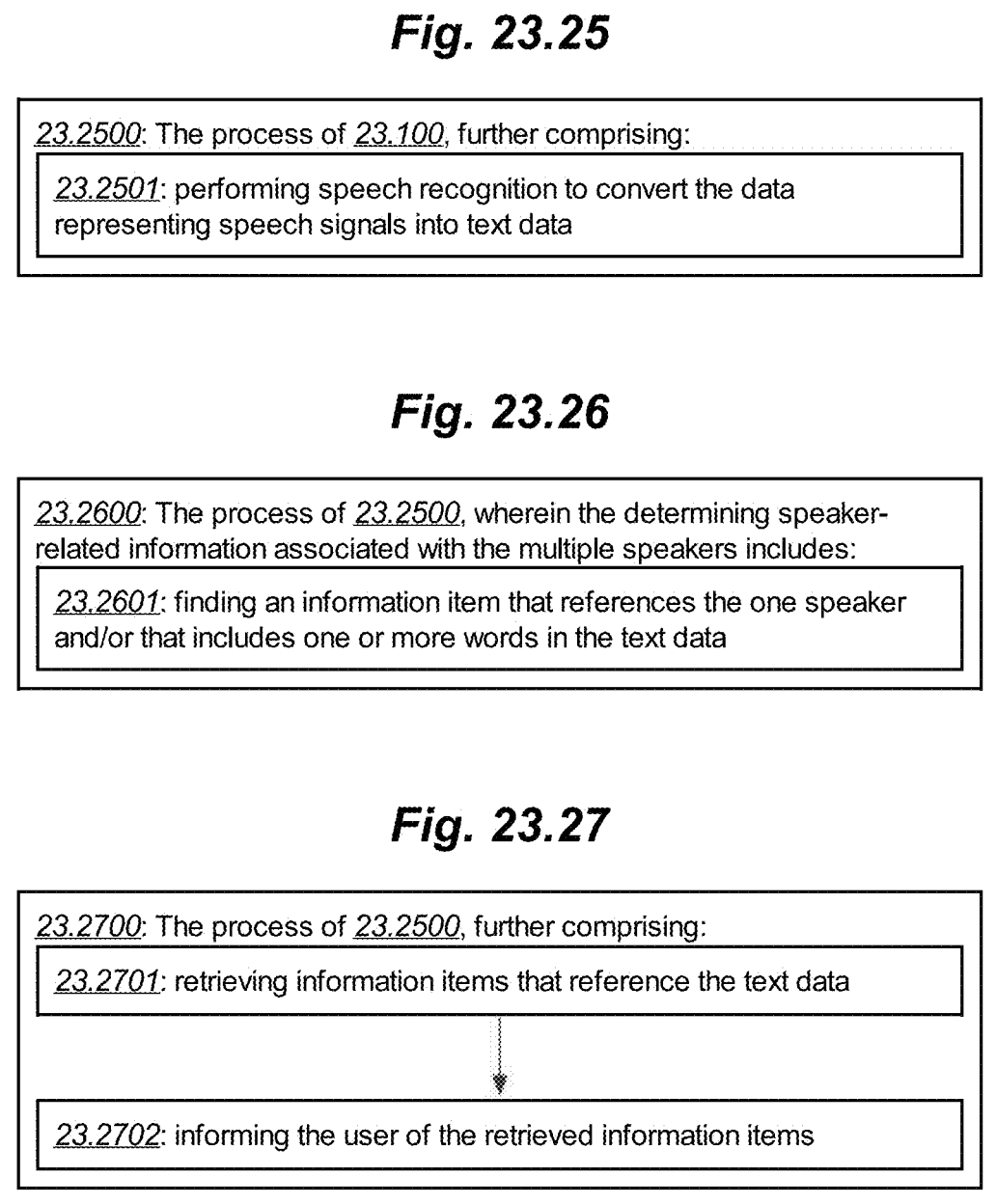

23.2500: The process of 23.100, further comprising:

23.2501: performing speech recognition to convert the data representing speech signals into text data

Fig. 23.26

23.2600: The process of 23.2500, wherein the determining speaker-related information associated with the multiple speakers includes:

23.2601: finding an information item that references the one speaker and/or that includes one or more words in the text data

Fig. 23.27

23.2700: The process of 23.2500, further comprising:

23.2701: retrieving information items that reference the text data 23.2702: informing the user of the retrieved information items

*Fig. 23.28*

<u>23.2800</u>: The process of <u>23.2500</u>, wherein the performing speech recognition includes:

<u>23.2801</u>: performing speech recognition based at least in part on a language model associated with the one speaker

*Fig. 23.29*

<u>23.2900</u>: The process of <u>23.2800</u>, wherein the performing speech recognition based at least in part on a language model associated with the one speaker includes:

<u>23.2901</u>: generating the language model based on information items generated by the one speaker, the information items including at least one of emails transmitted by the one speaker, documents authored by the one speaker, and/or social network messages transmitted by the one speaker

*Fig. 23.30*

<u>23.3000</u>: The process of <u>23.2800</u>, wherein the performing speech recognition based at least in part on a language model associated with the one speaker includes:

<u>23.3001</u>: generating the language model based on information items generated by or referencing any of the multiple speakers, the information items including emails, documents, and/or social network messages

Fig. 23.31

23.3100: The process of 23.100, wherein the determining speaker-related information associated with the multiple speakers includes:

23.3101: determining which one of the multiple speakers is speaking during a time interval

Fig. 23.32

23.3200: The process of 23.3100, wherein the determining which one of the multiple speakers is speaking during a time interval includes:

23.3201: associating a first portion of the received data with a first one of the multiple speakers

Fig. 23.33

23.3300: The process of 23.3200, wherein the associating a first portion of the received data with a first one of the multiple speakers includes:

23.3301: receiving the first portion of the received data along with an identifier associated with the first speaker

*Fig. 23.34*

*23.3400*: The process of *23.3200*, wherein the associating a first portion of the received data with a first one of the multiple speakers includes:

*23.3401*: selecting the first portion based on the first portion representing only speech from the one speaker and no other of the multiple speakers

*Fig. 23.35*

*23.3500*: The process of *23.3100*, further comprising:

*23.3501*: determining that two or more of the multiple speakers are speaking concurrently

*Fig. 23.36*

*23.3600*: The process of *23.3100*, wherein the determining which one of the multiple speakers is speaking during a time interval includes:

*23.3601*: performing voice identification to select which one of multiple previously analyzed voices is a best match for the one speaker who is speaking during the time interval

Fig. 23.37

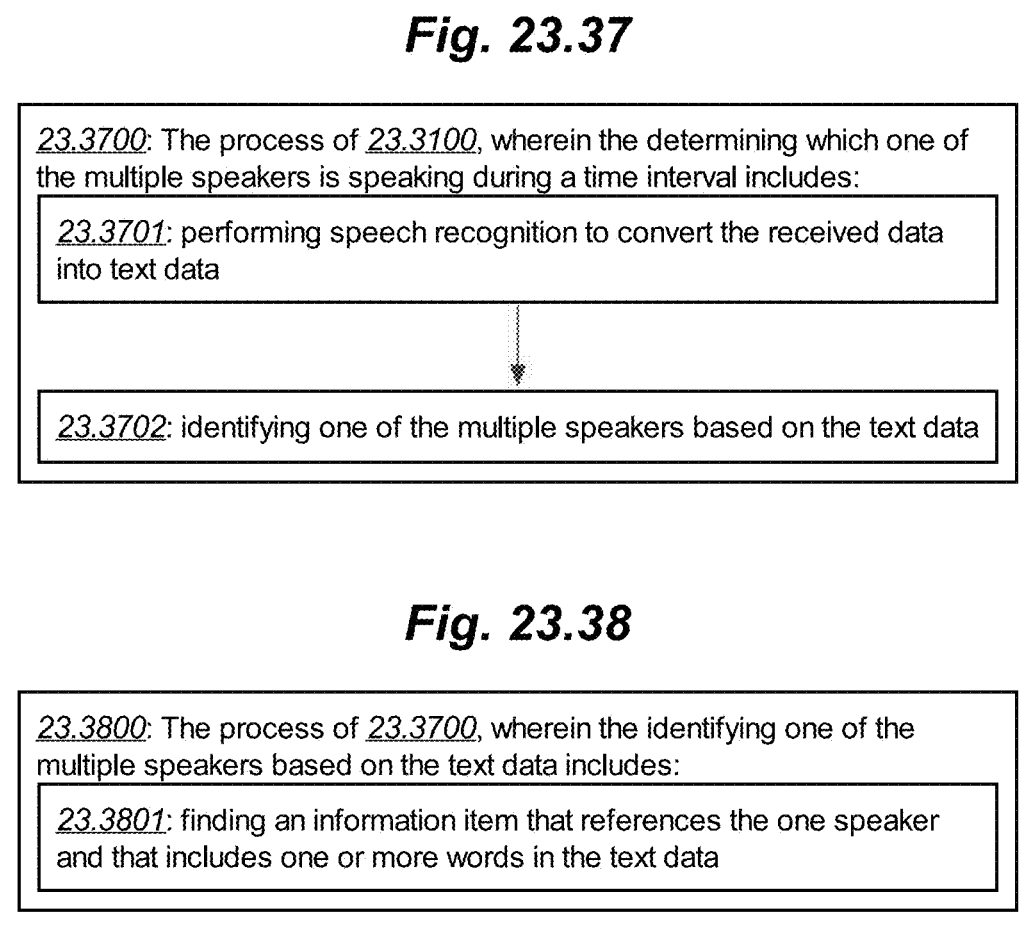

23.3700: The process of 23.3100, wherein the determining which one of the multiple speakers is speaking during a time interval includes:

23.3701: performing speech recognition to convert the received data into text data 23.3702: identifying one of the multiple speakers based on the text data

Fig. 23.38

23.3800: The process of 23.3700, wherein the identifying one of the multiple speakers based on the text data includes:

23.3801: finding an information item that references the one speaker and that includes one or more words in the text data

*Fig. 23.39*

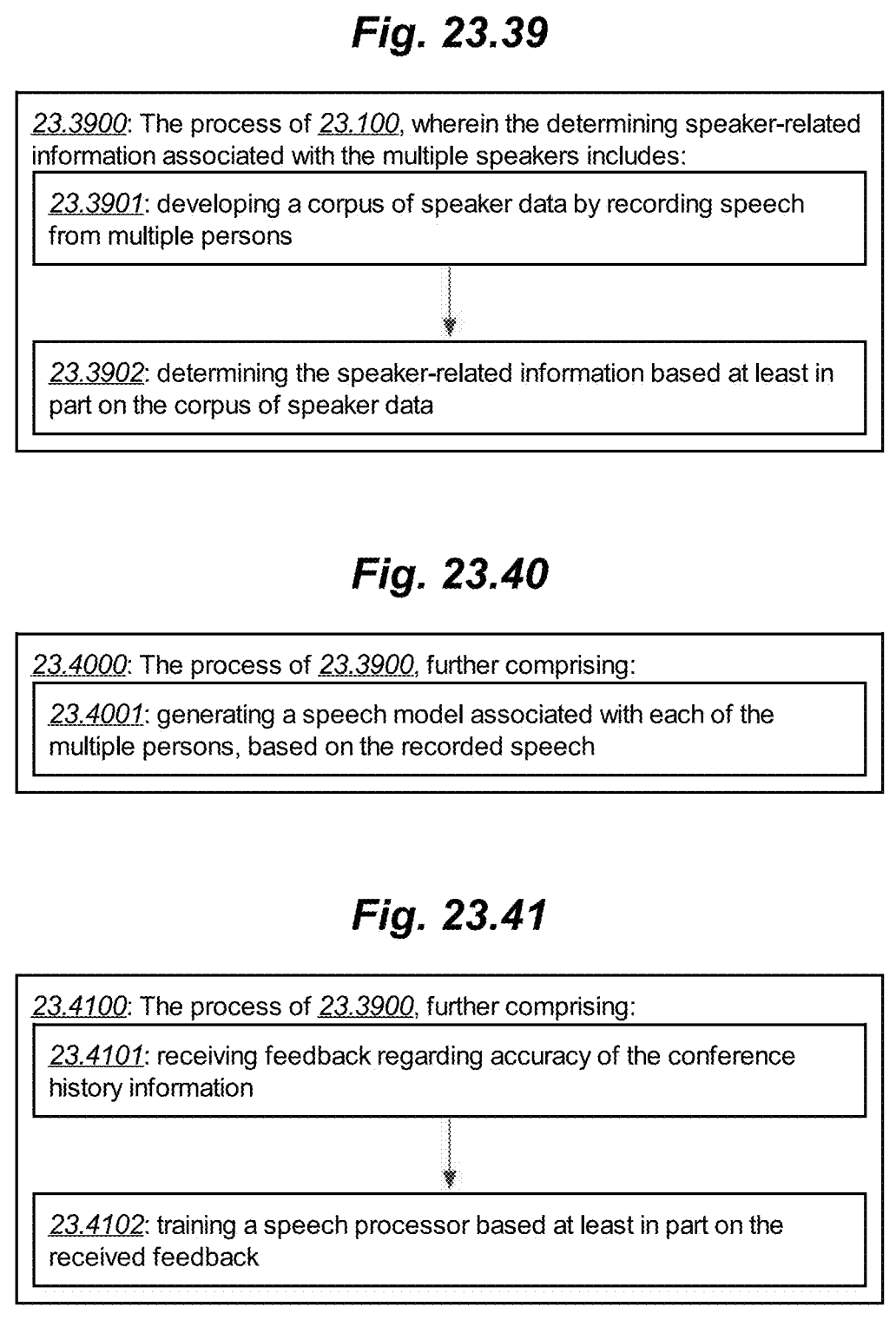

23.3900: The process of 23.100, wherein the determining speaker-related information associated with the multiple speakers includes:

23.3901: developing a corpus of speaker data by recording speech from multiple persons

↓

23.3902: determining the speaker-related information based at least in part on the corpus of speaker data

*Fig. 23.40*

23.4000: The process of 23.3900, further comprising:

23.4001: generating a speech model associated with each of the multiple persons, based on the recorded speech

*Fig. 23.41*

23.4100: The process of 23.3900, further comprising:

23.4101: receiving feedback regarding accuracy of the conference history information

↓

23.4102: training a speech processor based at least in part on the received feedback Fig. 23.42
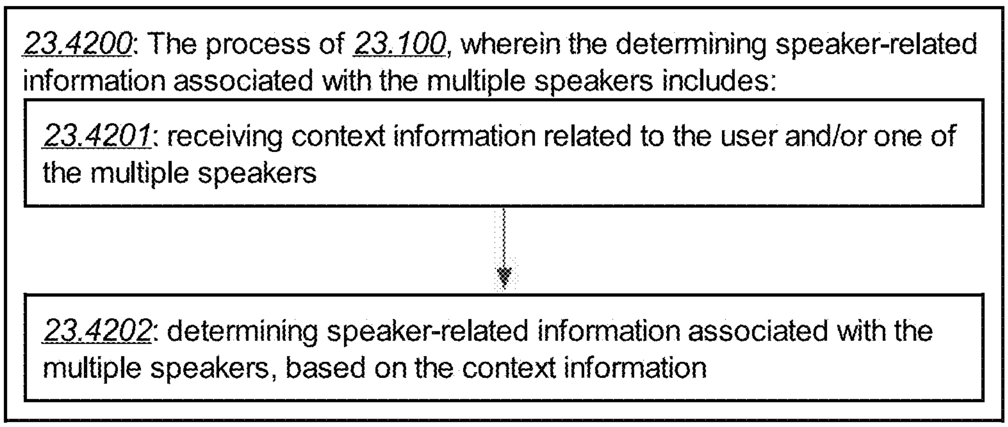
Fig. 23.43
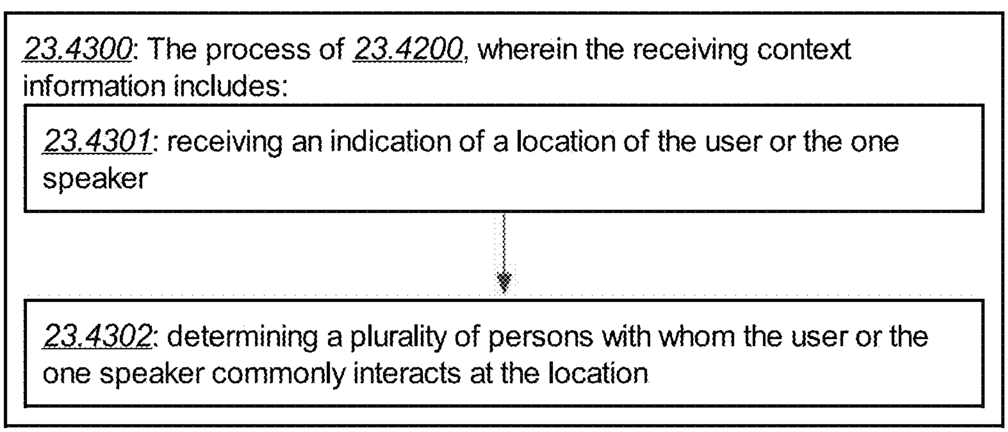

Fig. 23.44

23.4400: The process of 23.4300, wherein the receiving an indication of a location of the user or the one speaker includes:

23.4401: receiving at least one of a GPS location from a mobile device of the user or the one speaker, a network identifier that is associated with the location, an indication that the user or the one speaker is at a workplace, an indication that the user or the one speaker is at a residence, an information item that references the user or the one speaker, an information item that references the location of the user or the one speaker

Fig. 23.45

23.4500: The process of 23.100, wherein the presenting at least some of the conference history information includes:

23.4501: presenting the conference history information on a display of a conferencing device of the user

Fig. 23.46

23.4600: The process of 23.100, wherein the presenting at least some of the conference history information includes:

23.4601: presenting the conference history information on a display of a computing device that is distinct from a conferencing device of the user

Fig. 23.47

23.4700: The process of 23.100, wherein the presenting at least some of the conference history information includes:

23.4701: determining a display to serve as a presentation device for the conference history information

Fig. 23.48

23.4800: The process of 23.4700, wherein the determining a display includes:

23.4801: selecting one display from multiple displays, based on at least one of: whether each of the multiple displays is capable of displaying all of the conference history information, the size of each of the multiple displays, and/or whether each of the multiple displays is suitable for displaying the conference history information

Fig. 23.49

23.4900: The process of 23.100, further comprising:

23.4901: audibly notifying the user to view the conference history information on a display device

*Fig. 23.50*

*23.5000*: The process of *23.100*, wherein the presenting at least some of the conference history information includes:

*23.5001*: informing the user of an identifier of each of the multiple speakers

*Fig. 23.51*

*23.5100*: The process of *23.100*, wherein the presenting at least some of the conference history information includes:

*23.5101*: informing the user of information aside from identifying information related to the multiple speakers

*Fig. 23.52*

*23.5200*: The process of *23.100*, wherein the presenting at least some of the conference history information includes:

*23.5201*: informing the user of an identifier of a speaker along with a transcription of a previous utterance made by the speaker

*Fig. 23.53*

<u>*23.5300*</u>: The process of <u>*23.100*</u>, wherein the presenting at least some of the conference history information includes:

<u>*23.5301*</u>: informing the user of an organization to which each of the multiple speakers belongs

*Fig. 23.54*

<u>*23.5400*</u>: The process of <u>*23.100*</u>, wherein the presenting at least some of the conference history information includes:

<u>*23.5401*</u>: informing the user of a previously transmitted communication referencing one of the multiple speakers

*Fig. 23.55*

<u>*23.5500*</u>: The process of <u>*23.5400*</u>, wherein the presenting at least some of the conference history information includes:

<u>*23.5501*</u>: informing the user of at least one of: an email transmitted between the one speaker and the user and/or a text message transmitted between the one speaker and the user

Fig. 23.56

23.5600: The process of 23.100, wherein the presenting at least some of the conference history information includes:

23.5601: informing the user of an event involving the user and one of the multiple speakers

Fig. 23.57

23.5700: The process of 23.5600, wherein the presenting at least some of the conference history information includes:

23.5701: informing the user of a previously occurring event and/or a future event that is at least one of a project, a meeting, and/or a deadline

Fig. 23.58

23.5800: The process of 23.100, wherein the determining speaker-related information associated with the multiple speakers includes:

23.5801: accessing information items associated with one of the multiple speakers

*Fig. 23.59*

_23.5900_: The process of _23.5800_, wherein the accessing information items associated with one of the multiple speakers includes:

_23.5901_: searching for information items that reference the one speaker, the information items including at least one of a document, an email, and/or a text message

*Fig. 23.60*

_23.6000_: The process of _23.5800_, wherein the accessing information items associated with one of the multiple speakers includes:

_23.6001_: accessing a social networking service to find messages or status updates that reference the one speaker

*Fig. 23.61*

_23.6100_: The process of _23.5800_, wherein the accessing information items associated with one of the multiple speakers includes:

_23.6101_: accessing a calendar to find information about appointments with the one speaker

*Fig. 23.62*

23.6200: The process of 23.5800, wherein the accessing information items associated with one of the multiple speakers includes:

23.6201: accessing a document store to find documents that reference the one speaker

*Fig. 23.63*

23.6300: The process of 23.100, wherein the receiving data representing speech signals from a voice conference amongst multiple speakers includes:

23.6301: receiving audio data from at least one of a telephone, a conference call, an online audio chat, a video conference, and/or a face-to-face conference that includes the multiple speakers, the received audio data representing utterances made by at least one of the multiple speakers

*Fig. 23.64*

23.6400: The process of 23.100, wherein the receiving data representing speech signals from a voice conference amongst multiple speakers includes:

23.6401: receiving data representing speech signals from a voice conference amongst multiple speakers, wherein the multiple speakers are remotely located from one another

Fig. 23.65

23.6500: The process of 23.100, wherein the presenting at least some of the conference history information includes:

23.6501: transmitting the conference history information from a first device to a second device having a display

Fig. 23.66

23.6600: The process of 23.6500, wherein the transmitting the conference history information from a first device to a second device includes:

23.6601: wirelessly transmitting the conference history information

Fig. 23.67

23.6700: The process of 23.6500, wherein the transmitting the conference history information from a first device to a second device includes:

23.6701: transmitting the conference history information from a smart phone to the second device

*Fig. 23.68*

23.6800: The process of 23.6500, wherein the transmitting the conference history information from a first device to a second device includes:

23.6801: transmitting the conference history information from a server system to the second device

*Fig. 23.69*

23.6900: The process of 23.6800, wherein the transmitting the conference history information from a server system includes:

23.6901: transmitting the conference history information from a server system that resides in a data center

*Fig. 23.70*

23.7000: The process of 23.6800, wherein the transmitting the conference history information from a server system includes:

23.7001: transmitting the conference history information from a server system to a desktop computer, a laptop computer, a mobile device, or a desktop telephone of the user

Fig. 23.71

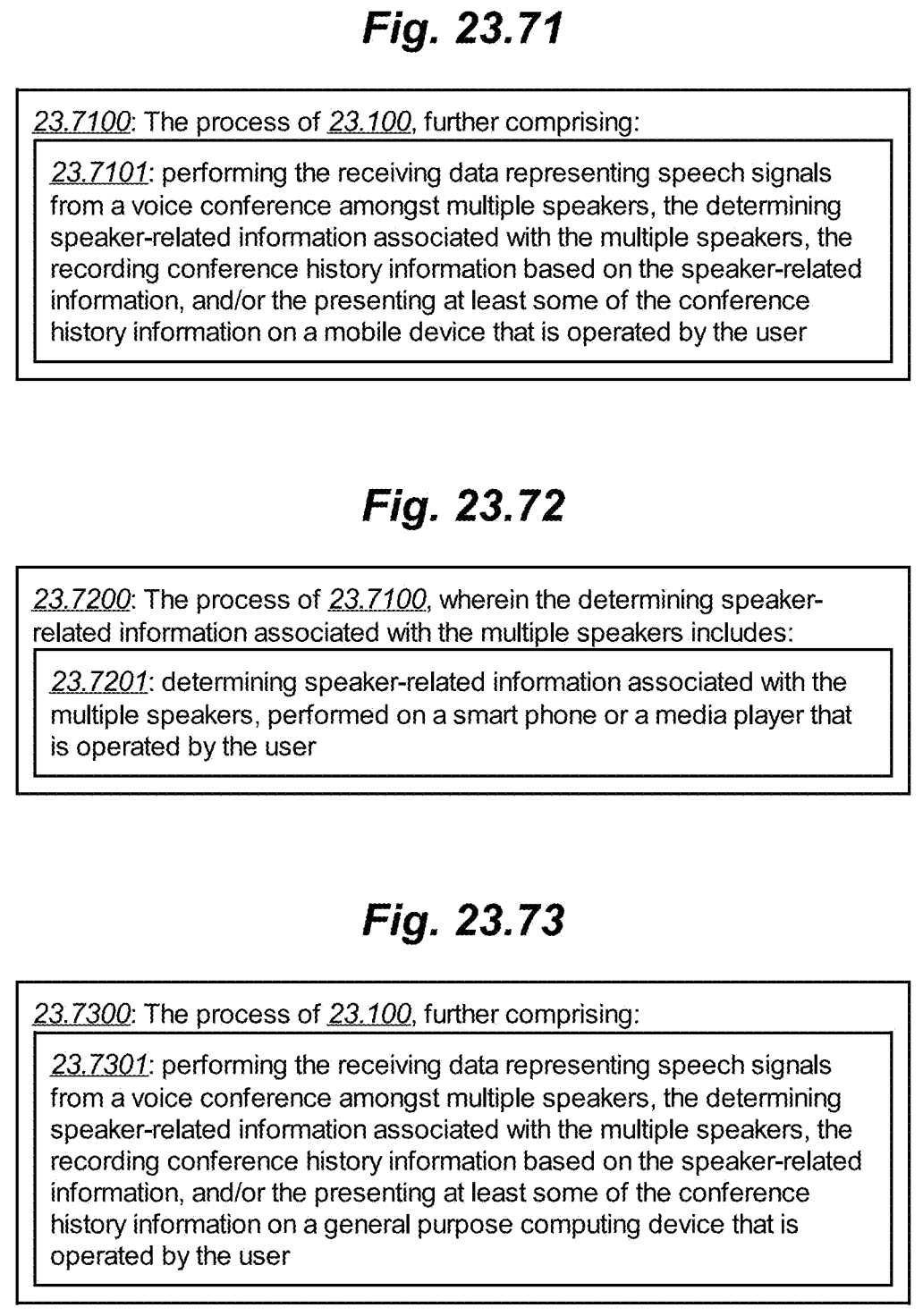

23.7100: The process of 23.100, further comprising:

23.7101: performing the receiving data representing speech signals from a voice conference amongst multiple speakers, the determining speaker-related information associated with the multiple speakers, the recording conference history information based on the speaker-related information, and/or the presenting at least some of the conference history information on a mobile device that is operated by the user

Fig. 23.72

23.7200: The process of 23.7100, wherein the determining speaker-related information associated with the multiple speakers includes:

23.7201: determining speaker-related information associated with the multiple speakers, performed on a smart phone or a media player that is operated by the user

Fig. 23.73

23.7300: The process of 23.100, further comprising:

23.7301: performing the receiving data representing speech signals from a voice conference amongst multiple speakers, the determining speaker-related information associated with the multiple speakers, the recording conference history information based on the speaker-related information, and/or the presenting at least some of the conference history information on a general purpose computing device that is operated by the user

Fig. 23.74

23.7400: The process of 23.100, further comprising:

23.7401: performing one or more of the receiving data representing speech signals from a voice conference amongst multiple speakers, the determining speaker-related information associated with the multiple speakers, the recording conference history information based on the speaker-related information, and/or the presenting at least some of the conference history information on each of multiple computing systems, wherein each of the multiple systems is associated with one of the multiple speakers

Fig. 23.75

23.7500: The process of 23.100, further comprising:

23.7501: performing one or more of the receiving data representing speech signals from a voice conference amongst multiple speakers, the determining speaker-related information associated with the multiple speakers, the recording conference history information based on the speaker-related information, and/or the presenting at least some of the conference history information within a conference call provider system

*Fig. 23.76*

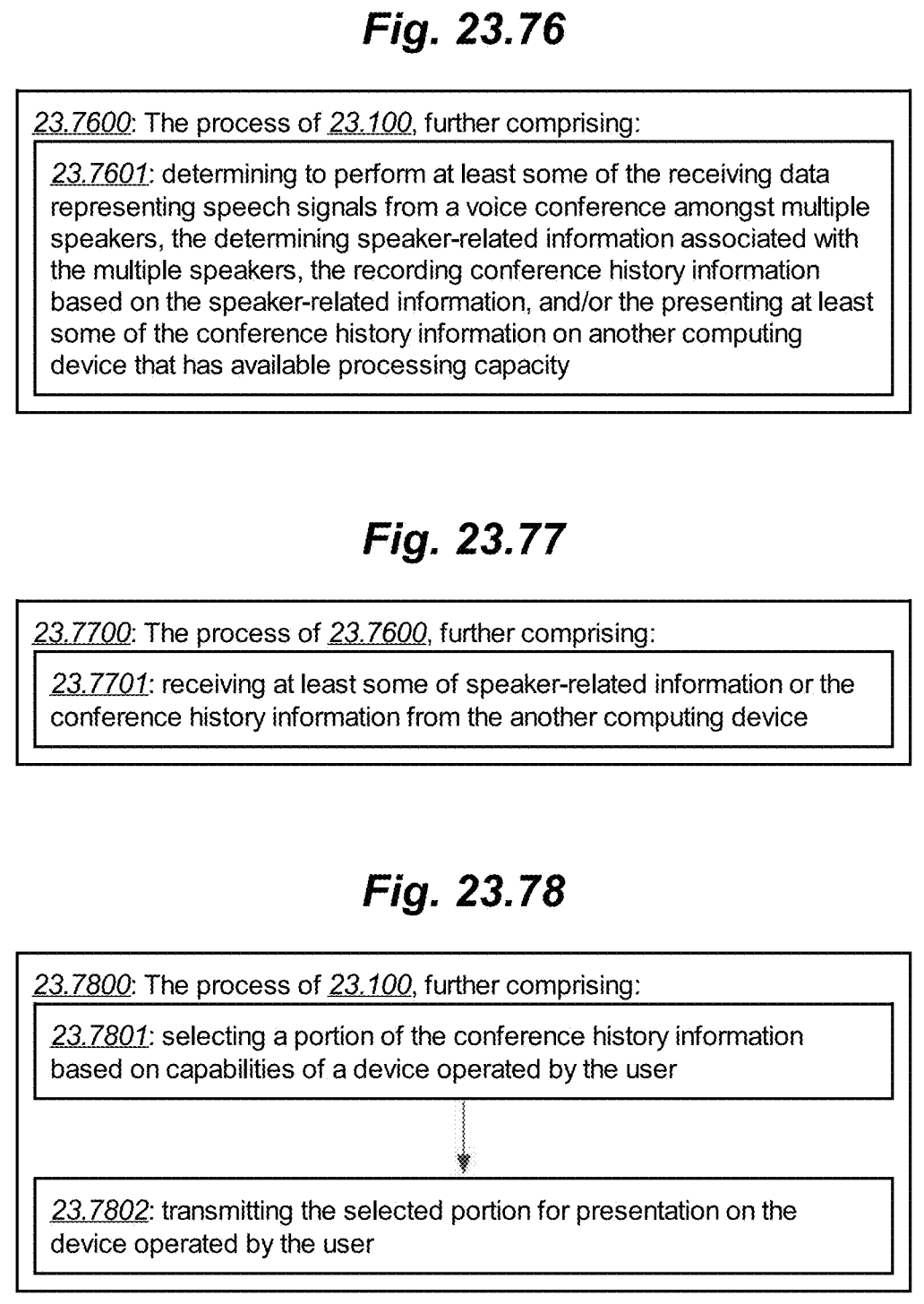

23.7600: The process of 23.100, further comprising:

23.7601: determining to perform at least some of the receiving data representing speech signals from a voice conference amongst multiple speakers, the determining speaker-related information associated with the multiple speakers, the recording conference history information based on the speaker-related information, and/or the presenting at least some of the conference history information on another computing device that has available processing capacity

*Fig. 23.77*

23.7700: The process of 23.7600, further comprising:

23.7701: receiving at least some of speaker-related information or the conference history information from the another computing device

*Fig. 23.78*

23.7800: The process of 23.100, further comprising:

23.7801: selecting a portion of the conference history information based on capabilities of a device operated by the user

↓

23.7802: transmitting the selected portion for presentation on the device operated by the user

Fig. 23.79

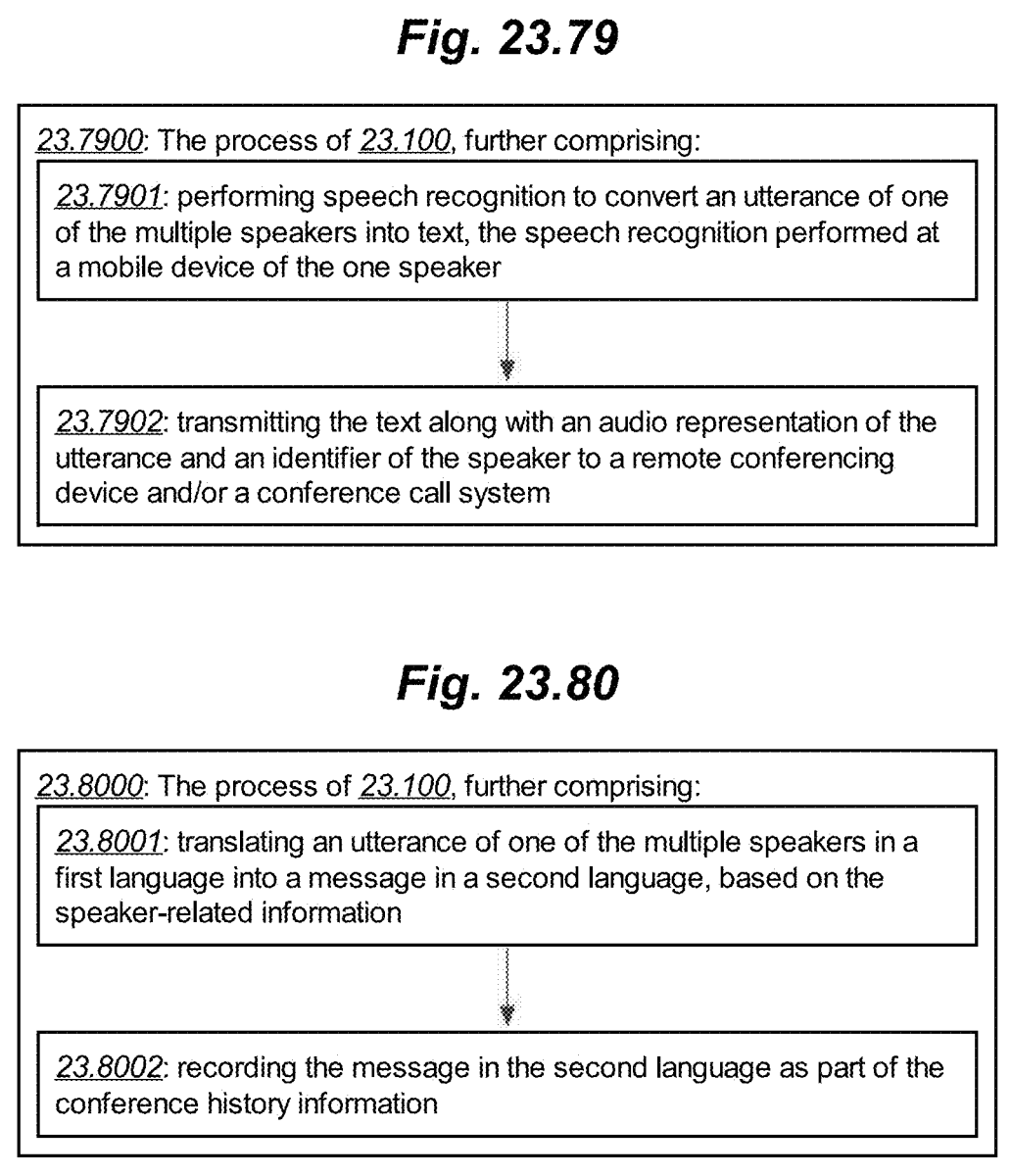

23.7900: The process of 23.100, further comprising:

23.7901: performing speech recognition to convert an utterance of one of the multiple speakers into text, the speech recognition performed at a mobile device of the one speaker

↓

23.7902: transmitting the text along with an audio representation of the utterance and an identifier of the speaker to a remote conferencing device and/or a conference call system

Fig. 23.80

23.8000: The process of 23.100, further comprising:

23.8001: translating an utterance of one of the multiple speakers in a first language into a message in a second language, based on the speaker-related information

↓

23.8002: recording the message in the second language as part of the conference history information

Fig. 23.81

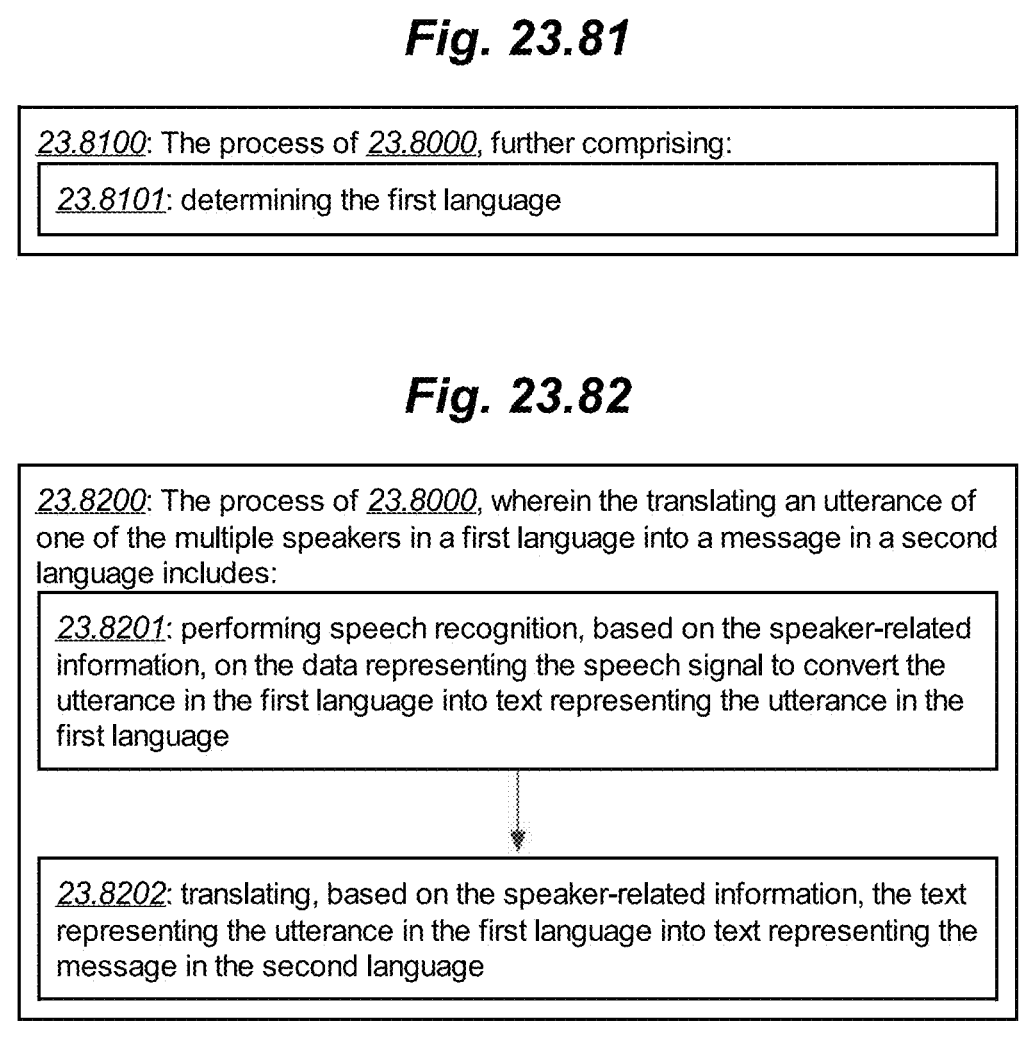

23.8100: The process of 23.8000, further comprising:

23.8101: determining the first language

Fig. 23.82

23.8200: The process of 23.8000, wherein the translating an utterance of one of the multiple speakers in a first language into a message in a second language includes:

23.8201: performing speech recognition, based on the speaker-related information, on the data representing the speech signal to convert the utterance in the first language into text representing the utterance in the first language

↓

23.8202: translating, based on the speaker-related information, the text representing the utterance in the first language into text representing the message in the second language

Fig. 23.83

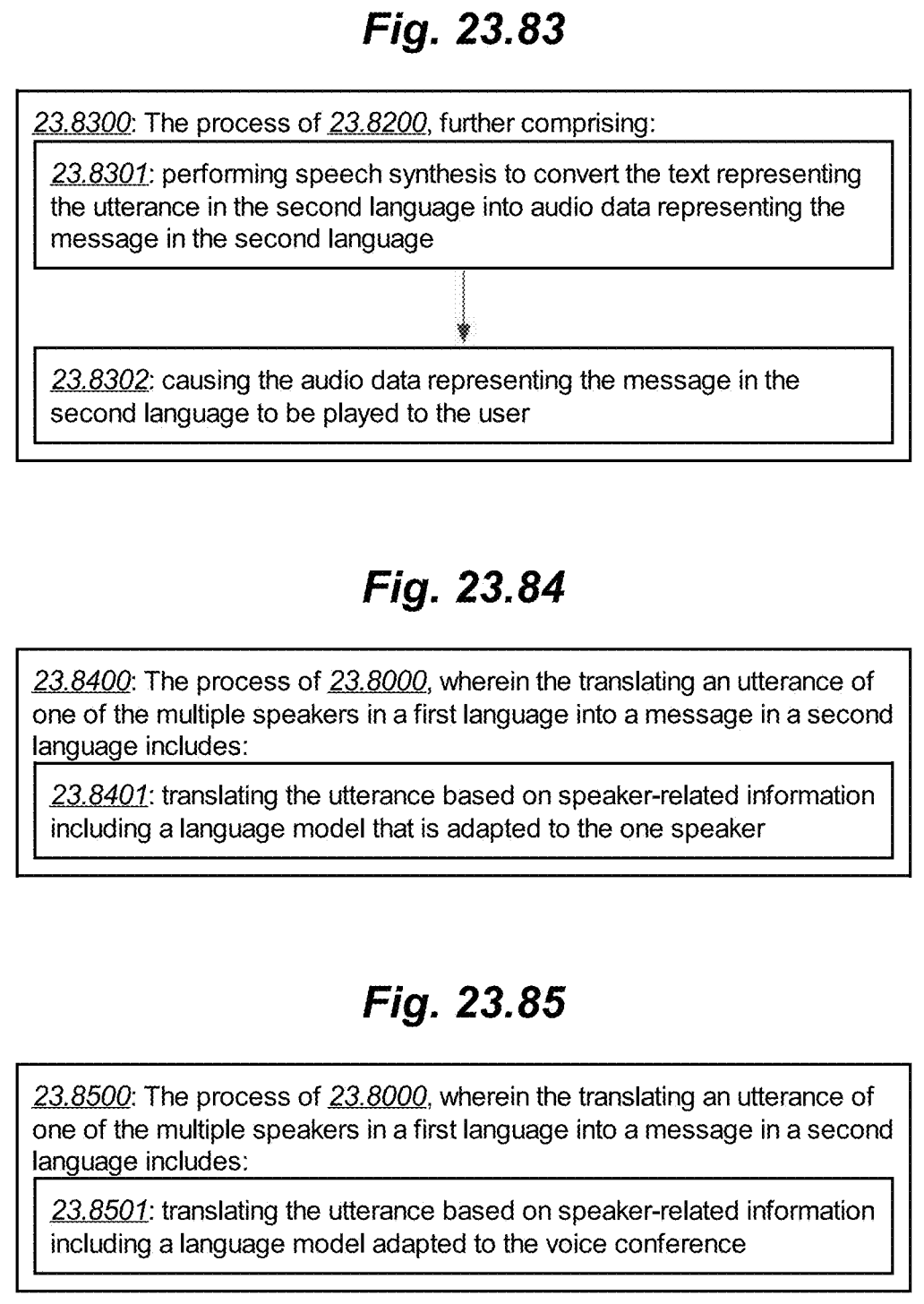

23.8300: The process of 23.8200, further comprising:

23.8301: performing speech synthesis to convert the text representing the utterance in the second language into audio data representing the message in the second language 23.8302: causing the audio data representing the message in the second language to be played to the user

Fig. 23.84

23.8400: The process of 23.8000, wherein the translating an utterance of one of the multiple speakers in a first language into a message in a second language includes:

23.8401: translating the utterance based on speaker-related information including a language model that is adapted to the one speaker

Fig. 23.85

23.8500: The process of 23.8000, wherein the translating an utterance of one of the multiple speakers in a first language into a message in a second language includes:

23.8501: translating the utterance based on speaker-related information including a language model adapted to the voice conference

*Fig. 23.86*

23.8600: The process of 23.8500, wherein the translating the utterance based on speaker-related information including a language model adapted to the voice conference includes:

23.8601: generating the language model based on information items by or about any of the multiple speakers, the information items including at least one of emails, documents, and/or social network messages

*Fig. 23.87*

23.8700: The process of 23.8000, wherein the translating an utterance of one of the multiple speakers in a first language into a message in a second language includes:

23.8701: translating the utterance based on speaker-related information including a language model developed with respect to a corpus of related content

*Fig. 23.88*

23.8800: The process of 23.8700, wherein the corpus of related content is obtained from at least one of a voice conference, an academic conference, a media program, an academic journal, and/or a Web site

*Fig. 23.89*

23.8900: The process of 23.100, wherein the receiving data representing speech signals from a voice conference amongst multiple speakers includes:

23.8901: receiving digital samples of an audio wave captured by a microphone

*Fig. 23.90*

23.9000: The process of 23.100, wherein the receiving data representing speech signals from a voice conference amongst multiple speakers includes:

23.9001: receiving a recorded voice samples from a storage device

*Fig. 23.91*

23.9100: The process of 23.100, wherein the user is one of the multiple speakers

*Fig. 23.92*

23.9200: The process of 23.100, wherein the user is not one of the multiple speakers

*Fig. 23.93*

*23.9300*: The process of *23.100*, wherein the speaker is not a human

*Fig. 23.94*

*23.9400*: The process of *23.100*, further comprising:

*23.9401*: determining to perform one or more of archiving, indexing, searching, removing, redacting, duplicating, or deleting some of the conference history information based on a data retention policy

Fig. 27.1

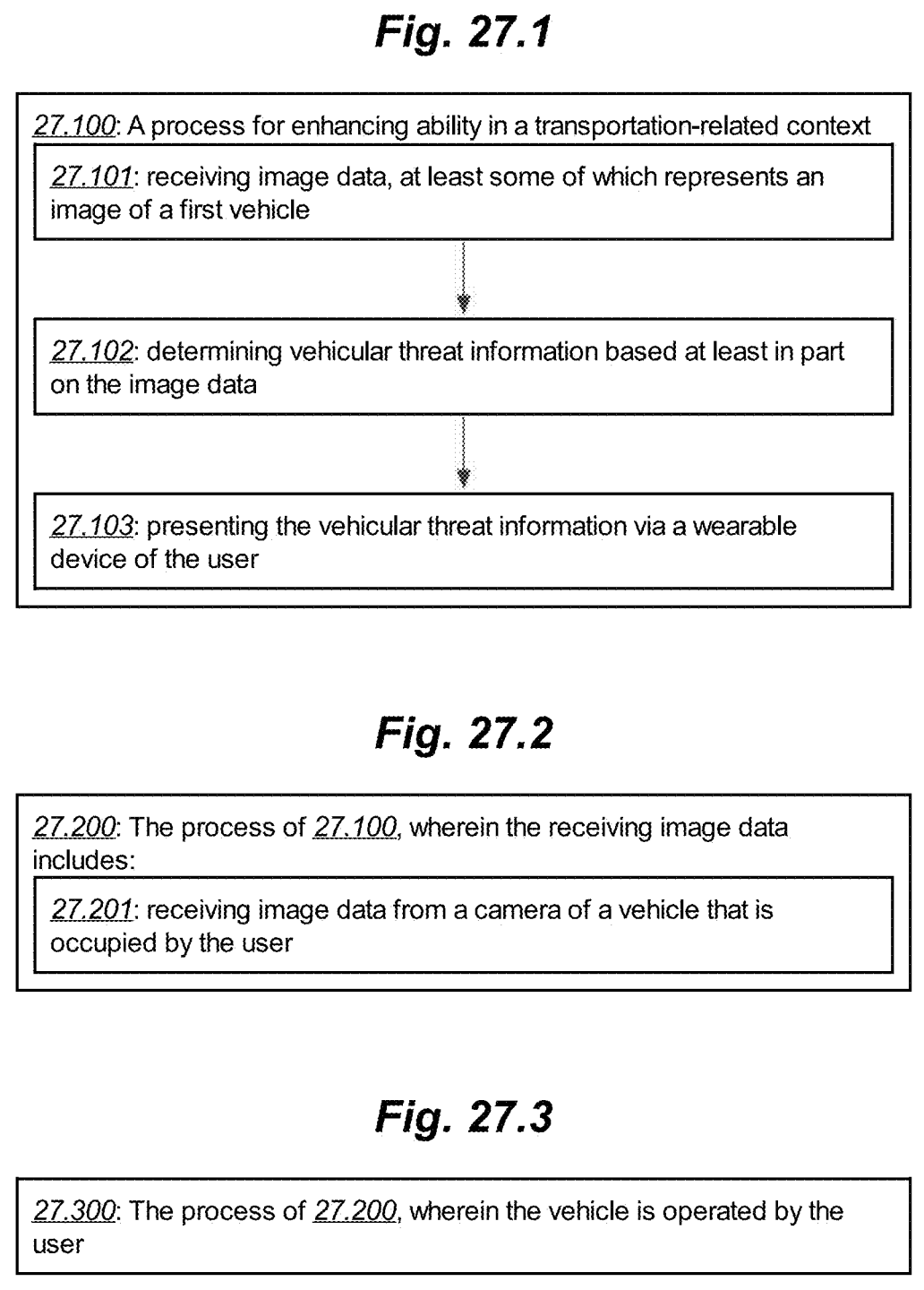

27.100: A process for enhancing ability in a transportation-related context 27.101: receiving image data, at least some of which represents an image of a first vehicle

↓

27.102: determining vehicular threat information based at least in part on the image data

↓

27.103: presenting the vehicular threat information via a wearable device of the user

Fig. 27.2

27.200: The process of 27.100, wherein the receiving image data includes:

27.201: receiving image data from a camera of a vehicle that is occupied by the user

Fig. 27.3

27.300: The process of 27.200, wherein the vehicle is operated by the user

*Fig. 27.4*

27.400: The process of 27.200, wherein the vehicle is operating autonomously

*Fig. 27.5*

27.500: The process of 27.100, wherein the receiving image data includes:

27.501: receiving image data from a camera of the wearable device

*Fig. 27.6*

27.600: The process of 27.100, wherein the receiving image data includes:

27.601: receiving image data from a camera of the first vehicle

*Fig. 27.7*

27.700: The process of 27.100, wherein the receiving image data includes:

27.701: receiving image data from a camera of a vehicle that is not the first vehicle and that is not occupied by the user

Fig. 27.8

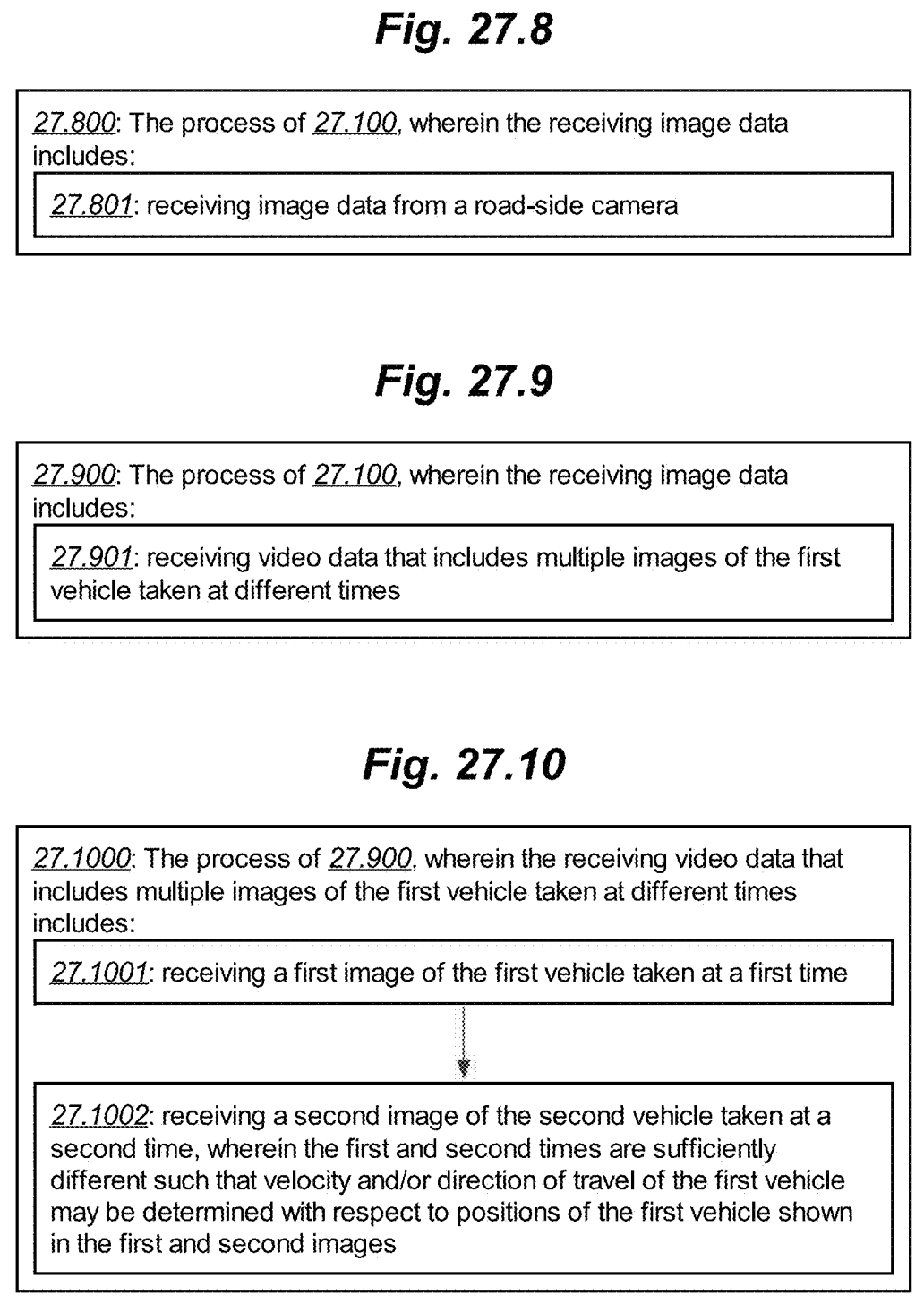

27.800: The process of 27.100, wherein the receiving image data includes:

27.801: receiving image data from a road-side camera

Fig. 27.9

27.900: The process of 27.100, wherein the receiving image data includes:

27.901: receiving video data that includes multiple images of the first vehicle taken at different times

Fig. 27.10

27.1000: The process of 27.900, wherein the receiving video data that includes multiple images of the first vehicle taken at different times includes:

27.1001: receiving a first image of the first vehicle taken at a first time

↓

27.1002: receiving a second image of the second vehicle taken at a second time, wherein the first and second times are sufficiently different such that velocity and/or direction of travel of the first vehicle may be determined with respect to positions of the first vehicle shown in the first and second images

Fig. 27.11

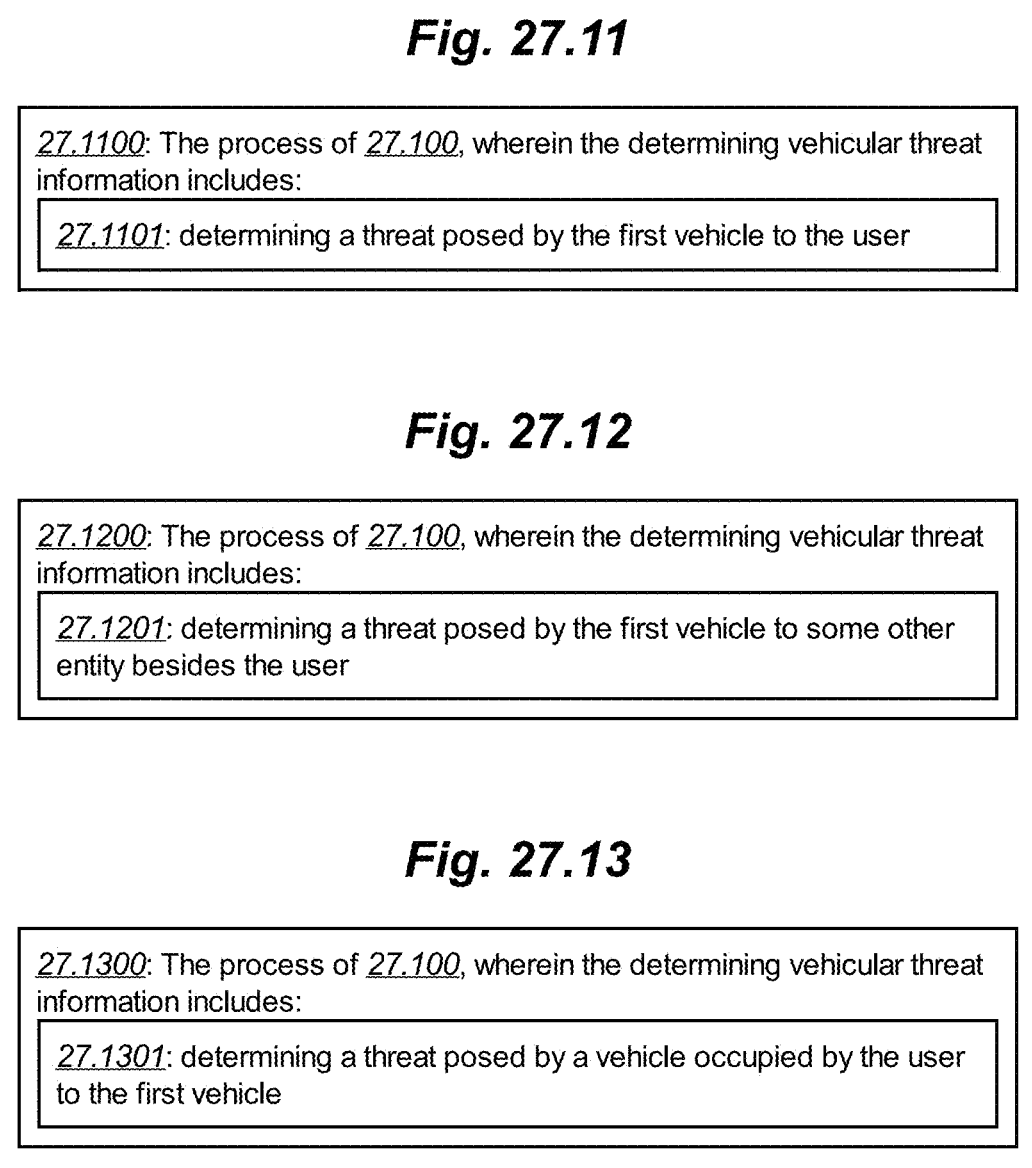

27.1100: The process of 27.100, wherein the determining vehicular threat information includes:

27.1101: determining a threat posed by the first vehicle to the user

Fig. 27.12

27.1200: The process of 27.100, wherein the determining vehicular threat information includes:

27.1201: determining a threat posed by the first vehicle to some other entity besides the user

Fig. 27.13

27.1300: The process of 27.100, wherein the determining vehicular threat information includes:

27.1301: determining a threat posed by a vehicle occupied by the user to the first vehicle

Fig. 27.14

27.1400: The process of 27.100, wherein the determining vehicular threat information includes:

27.1401: determining a threat posed by a vehicle occupied by the user to some other entity besides the first vehicle

Fig. 27.15

27.1500: The process of 27.100, wherein the determining vehicular threat information includes:

27.1501: identifying the first vehicle in the image data

Fig. 27.16

27.1600: The process of 27.100, wherein the determining vehicular threat information includes:

27.1601: determining whether the first vehicle is moving towards the user based on multiple images represented by the image data

Fig. 27.17

<u>*27.1700*</u>: The process of <u>*27.100*</u>, wherein the determining vehicular threat information includes:

<u>*27.1701*</u>: determining motion-related information about the first vehicle, based on one or more images of the first vehicle

Fig. 27.18

<u>*27.1800*</u>: The process of <u>*27.1700*</u>, wherein the determining motion-related information about the first vehicle includes:

<u>*27.1801*</u>: determining the motion-related information with respect to timestamps associated with the one or more images

Fig. 27.19

<u>*27.1900*</u>: The process of <u>*27.1700*</u>, wherein the determining motion-related information about the first vehicle includes:

<u>*27.1901*</u>: determining a position of the first vehicle

Fig. 27.20

27.2000: The process of 27.1700, wherein the determining motion-related information about the first vehicle includes:

27.2001: determining a velocity of the first vehicle

Fig. 27.21

27.2100: The process of 27.2000, wherein the determining a velocity of the first vehicle includes:

27.2101: determining the velocity with respect to a fixed frame of reference

Fig. 27.22

27.2200: The process of 27.2000, wherein the determining a velocity of the first vehicle includes:

27.2201: determining the velocity with respect to a frame of reference of the user

*Fig. 27.23*

| |
|---|
| _27.2300_: The process of _27.1700_, wherein the determining motion-related information about the first vehicle includes: |
| _27.2301_: determining a direction of travel of the first vehicle |

*Fig. 27.24*

| |
|---|
| _27.2400_: The process of _27.1700_, wherein the determining motion-related information about the first vehicle includes: |
| _27.2401_: determining acceleration of the first vehicle |

*Fig. 27.25*

| |
|---|
| _27.2500_: The process of _27.1700_, wherein the determining motion-related information about the first vehicle includes: |
| _27.2501_: determining mass of the first vehicle |

*Fig. 27.26*

| |
|---|
| _27.2600_: The process of _27.100_, wherein the determining vehicular threat information includes: |
| _27.2601_: determining that the first vehicle is driving erratically |

*Fig. 27.27*

27.2700: The process of 27.100, wherein the determining vehicular threat information includes:

27.2701: determining that the first vehicle is driving with excessive speed

*Fig. 27.28*

27.2800: The process of 27.100, wherein the determining vehicular threat information includes:

27.2801: identifying objects other than the first vehicle in the image data

*Fig. 27.29*

27.2900: The process of 27.100, wherein the determining vehicular threat information includes:

27.2901: determining driving conditions based on the image data

Fig. 27.30

<u>27.3000</u>: The process of <u>27.100</u>, further comprising:

<u>27.3001</u>: determining vehicular threat information that is not related to the first vehicle

Fig. 27.31

<u>27.3100</u>: The process of <u>27.3000</u>, wherein the determining vehicular threat information that is not related to the first vehicle includes:

<u>27.3101</u>: receiving and processing image data that includes images of objects and/or conditions aside from the first vehicle

Fig. 27.32

<u>27.3200</u>: The process of <u>27.3100</u>, wherein the receiving and processing image data that includes images of objects and/or conditions aside from the first vehicle includes:

<u>27.3201</u>: receiving image data of at least one of a stationary object, a pedestrian, and/or an animal

Fig. 27.33

27.3300: The process of 27.3000, wherein the determining vehicular threat information that is not related to the first vehicle includes:

27.3301: processing the image data to determine the vehicular threat information that is not related to the first vehicle

Fig. 27.34

27.3400: The process of 27.3000, wherein the determining vehicular threat information that is not related to the first vehicle includes:

27.3401: processing data other than the image data to determine the vehicular threat information that is not related to the first vehicle

Fig. 27.35

27.3500: The process of 27.3000, wherein the determining vehicular threat information that is not related to the first vehicle includes:

27.3501: determining that poor driving conditions exist

*Fig. 27.36*

*27.3600*: The process of *27.3000*, wherein the determining vehicular threat information that is not related to the first vehicle includes:

*27.3601*: determining that a limited visibility condition exists

*Fig. 27.37*

*27.3700*: The process of *27.3000*, wherein the determining vehicular threat information that is not related to the first vehicle includes:

*27.3701*: determining that there is slow traffic in proximity to the user

*Fig. 27.38*

*27.3800*: The process of *27.3700*, wherein the determining that there is slow traffic in proximity to the user includes:

*27.3801*: receiving information from a traffic information system regarding traffic congestion on a road traveled by the user

Fig. 27.39

27.3900: The process of 27.3700, wherein the determining that there is slow traffic in proximity to the user includes:

27.3901: determining that one or more vehicles are traveling slower than an average or posted speed for a road traveled by the user

Fig. 27.40

27.4000: The process of 27.3000, wherein the determining vehicular threat information that is not related to the first vehicle includes:

27.4001: determining that poor surface conditions exist on a roadway traveled by the user

Fig. 27.41

27.4100: The process of 27.3000, wherein the determining vehicular threat information that is not related to the first vehicle includes:

27.4101: determining that there is a pedestrian in proximity to the user

*Fig. 27.42*

*27.4200*: The process of *27.3000*, wherein the determining vehicular threat information that is not related to the first vehicle includes:

*27.4201*: determining that there is an accident in proximity to the user

*Fig. 27.43*

*27.4300*: The process of *27.3000*, wherein the determining vehicular threat information that is not related to the first vehicle includes:

*27.4301*: determining that there is an animal in proximity to the user

*Fig. 27.44*

*27.4400*: The process of *27.100*, wherein the determining vehicular threat information includes:

*27.4401*: determining the vehicular threat information based on motion-related information that is not based on images of the first vehicle

Fig. 27.45

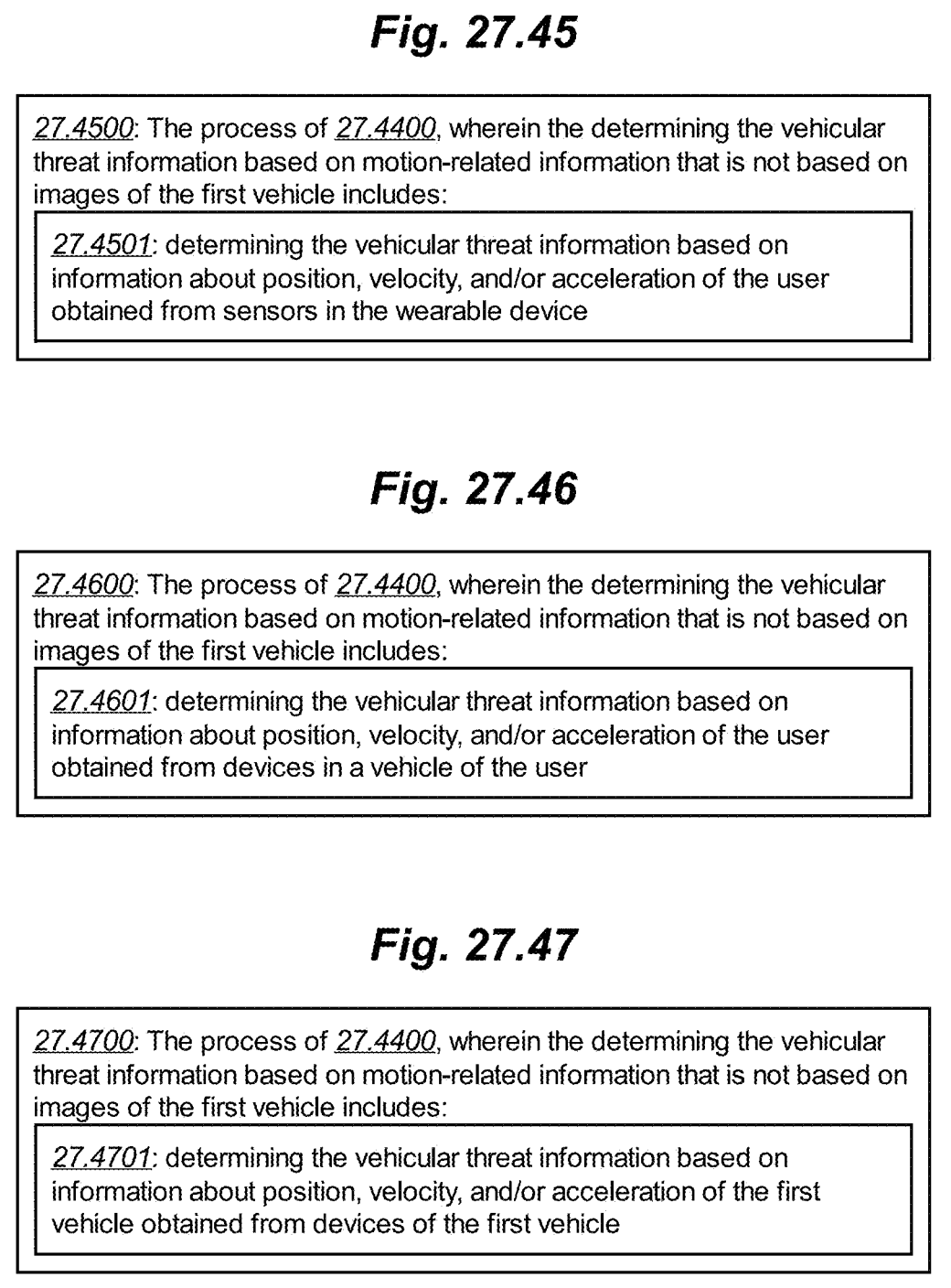

27.4500: The process of 27.4400, wherein the determining the vehicular threat information based on motion-related information that is not based on images of the first vehicle includes:

27.4501: determining the vehicular threat information based on information about position, velocity, and/or acceleration of the user obtained from sensors in the wearable device

Fig. 27.46

27.4600: The process of 27.4400, wherein the determining the vehicular threat information based on motion-related information that is not based on images of the first vehicle includes:

27.4601: determining the vehicular threat information based on information about position, velocity, and/or acceleration of the user obtained from devices in a vehicle of the user

Fig. 27.47

27.4700: The process of 27.4400, wherein the determining the vehicular threat information based on motion-related information that is not based on images of the first vehicle includes:

27.4701: determining the vehicular threat information based on information about position, velocity, and/or acceleration of the first vehicle obtained from devices of the first vehicle

Fig. 27.48

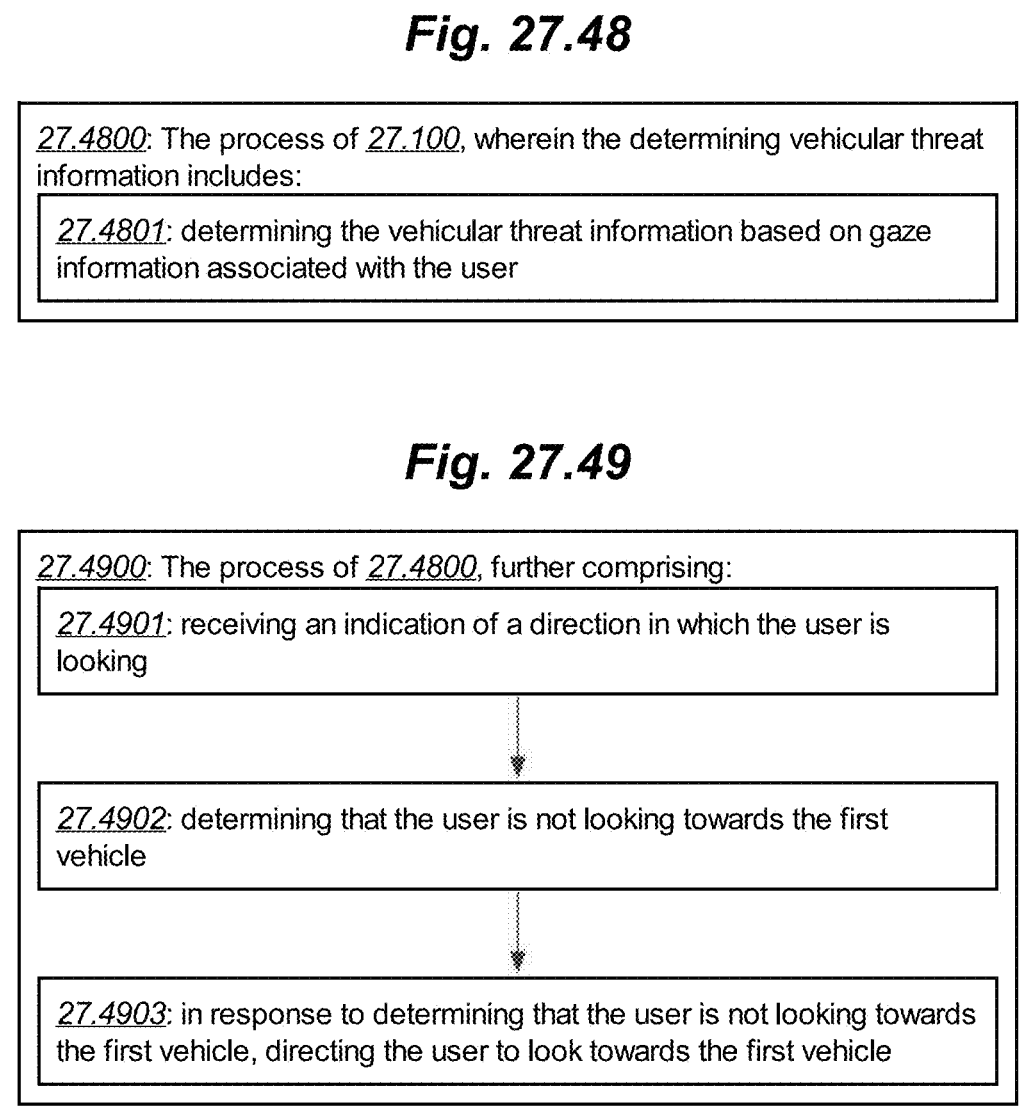

27.4800: The process of 27.100, wherein the determining vehicular threat information includes:

27.4801: determining the vehicular threat information based on gaze information associated with the user

Fig. 27.49

27.4900: The process of 27.4800, further comprising:

27.4901: receiving an indication of a direction in which the user is looking

↓

27.4902: determining that the user is not looking towards the first vehicle

↓

27.4903: in response to determining that the user is not looking towards the first vehicle, directing the user to look towards the first vehicle

*Fig. 27.50*

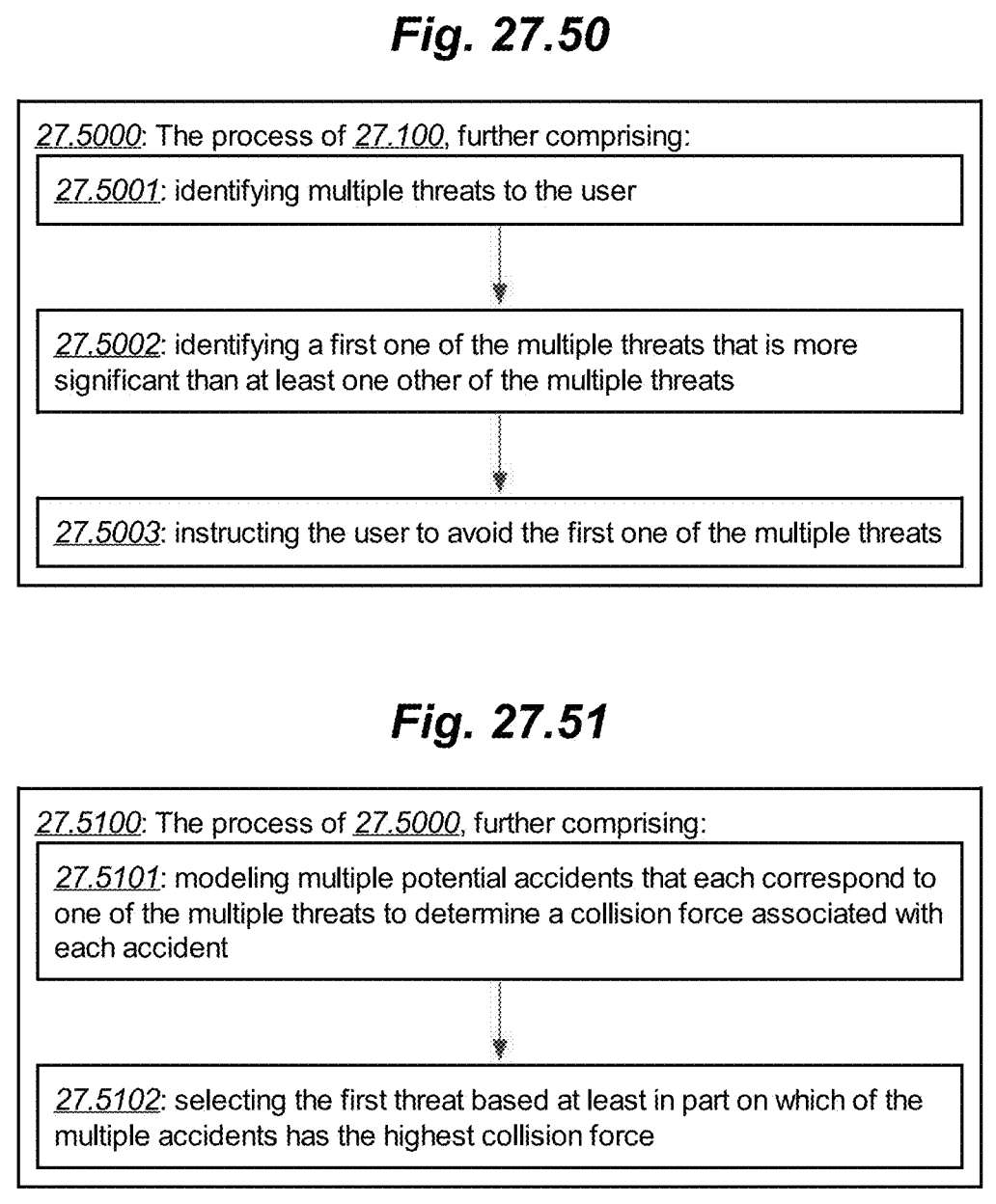

27.5000: The process of 27.100, further comprising:

27.5001: identifying multiple threats to the user

↓

27.5002: identifying a first one of the multiple threats that is more significant than at least one other of the multiple threats

↓

27.5003: instructing the user to avoid the first one of the multiple threats

*Fig. 27.51*

27.5100: The process of 27.5000, further comprising:

27.5101: modeling multiple potential accidents that each correspond to one of the multiple threats to determine a collision force associated with each accident

↓

27.5102: selecting the first threat based at least in part on which of the multiple accidents has the highest collision force

Fig. 27.52

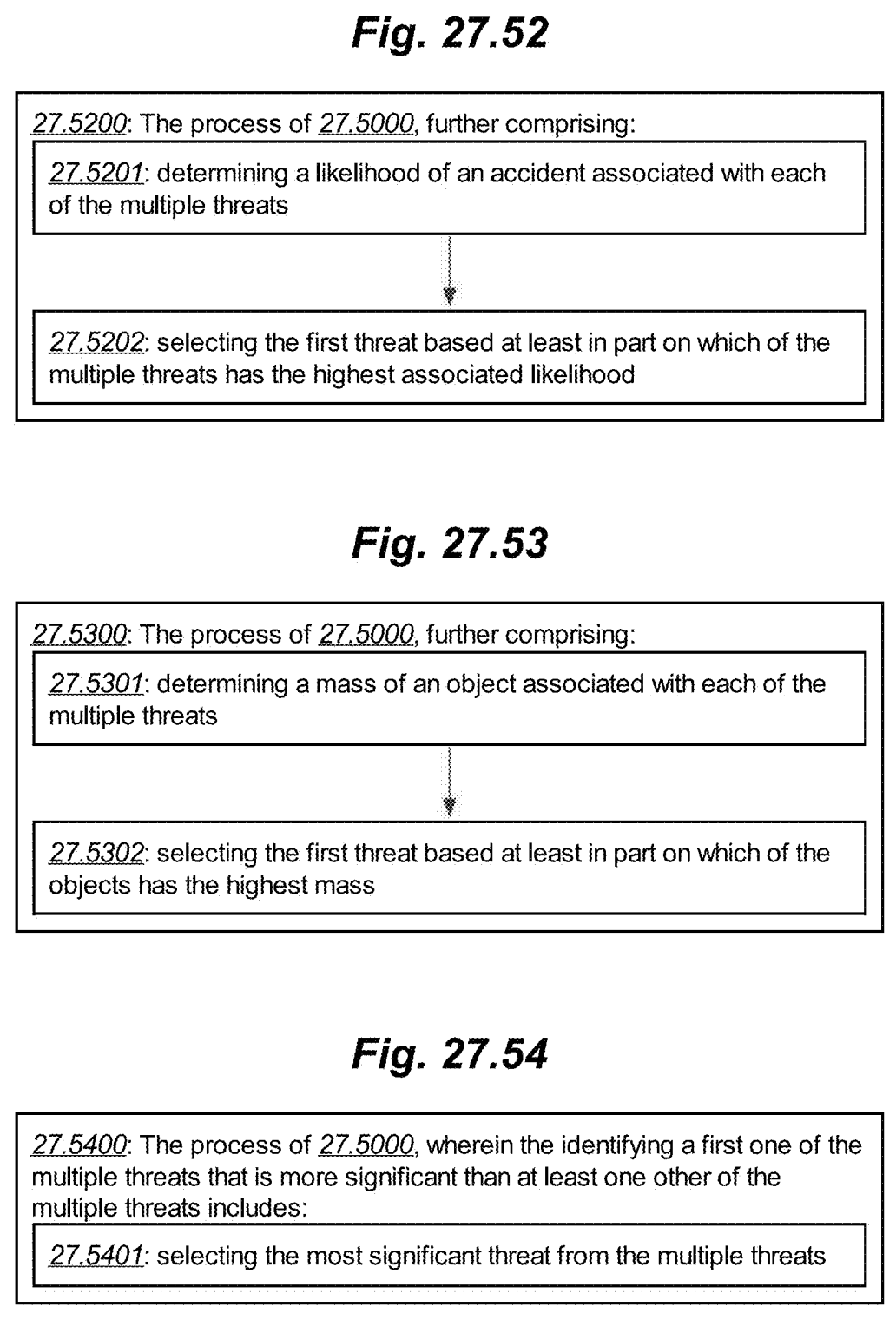

27.5200: The process of 27.5000, further comprising:

27.5201: determining a likelihood of an accident associated with each of the multiple threats 27.5202: selecting the first threat based at least in part on which of the multiple threats has the highest associated likelihood

Fig. 27.53

27.5300: The process of 27.5000, further comprising:

27.5301: determining a mass of an object associated with each of the multiple threats 27.5302: selecting the first threat based at least in part on which of the objects has the highest mass

Fig. 27.54

27.5400: The process of 27.5000, wherein the identifying a first one of the multiple threats that is more significant than at least one other of the multiple threats includes:

27.5401: selecting the most significant threat from the multiple threats

Fig. 27.55

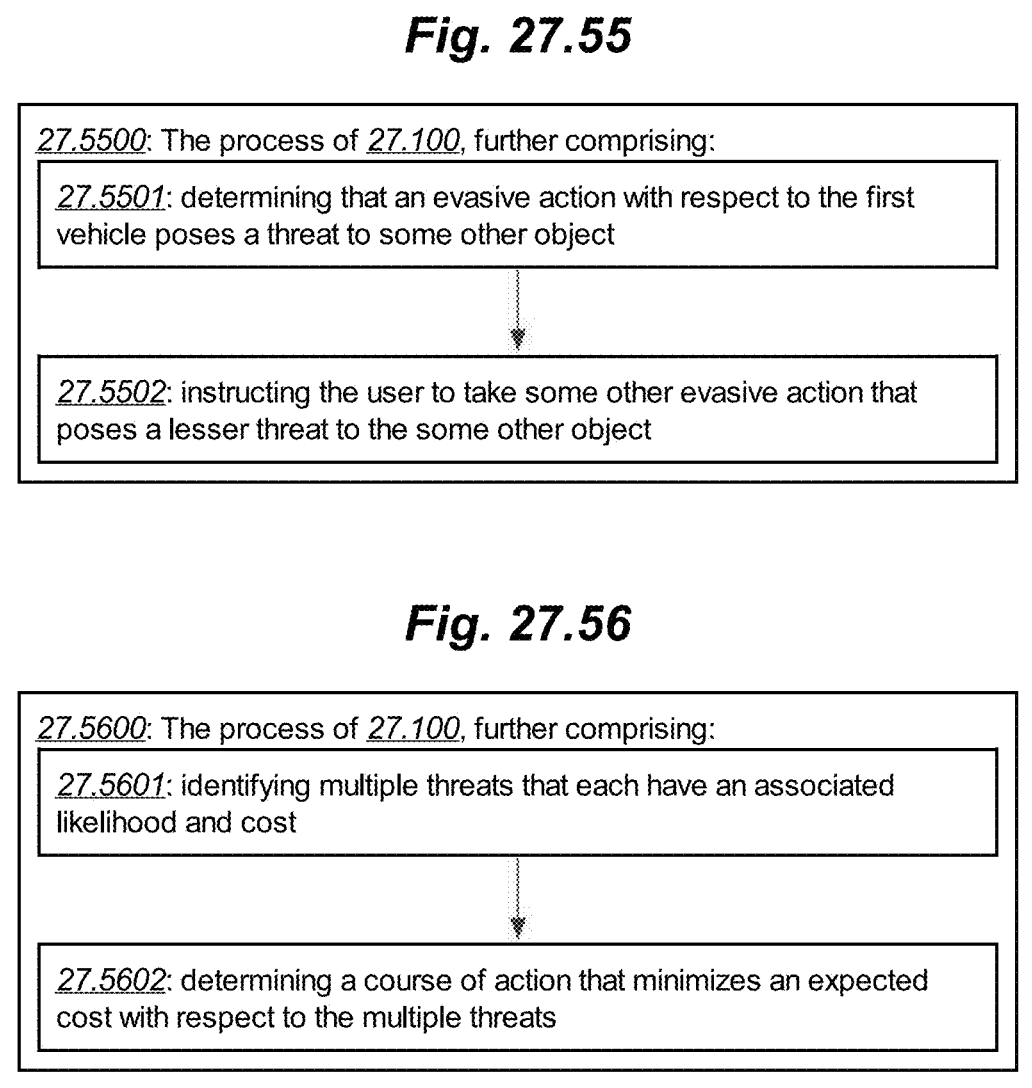

27.5500: The process of 27.100, further comprising:

27.5501: determining that an evasive action with respect to the first vehicle poses a threat to some other object

↓

27.5502: instructing the user to take some other evasive action that poses a lesser threat to the some other object

Fig. 27.56

27.5600: The process of 27.100, further comprising:

27.5601: identifying multiple threats that each have an associated likelihood and cost

↓

27.5602: determining a course of action that minimizes an expected cost with respect to the multiple threats

Fig. 27.57

27.5700: The process of 27.5600, wherein the cost is based on one or more of a cost of damage to a vehicle, a cost of injury or death of a human, a cost of injury or death of an animal, a cost of damage to a structure, a cost of emotional distress, and/or cost to a business or person based on negative publicity associated with an accident

Fig. 27.58

27.5800: The process of 27.5600, wherein the identifying multiple threats includes:

27.5801: identifying multiple threats that are each related to different persons or things

Fig. 27.59

27.5900: The process of 27.5600, wherein the identifying multiple threats includes:

27.5901: identifying multiple threats that are each related to the user

*Fig. 27.60*

27.6000: The process of 27.5600, wherein the determining a course of action that minimizes an expected cost includes:

27.6001: minimizing expected costs to the user posed by the multiple threats

*Fig. 27.61*

27.6100: The process of 27.5600, wherein the determining a course of action that minimizes an expected cost includes:

27.6101: minimizing overall expected costs posed by the multiple threats, the overall expected costs being a sum of expected costs borne by the user and other persons/things

*Fig. 27.62*

27.6200: The process of 27.100, wherein the presenting the vehicular threat information includes:

27.6201: presenting the vehicular threat information via an audio output device of the wearable device

Fig. 27.63

27.6300: The process of 27.100, wherein the presenting the vehicular threat information includes:

27.6301: presenting the vehicular threat information via a visual display device of the wearable device

Fig. 27.64

27.6400: The process of 27.6300, wherein the presenting the vehicular threat information via a visual display device includes:

27.6401: displaying an indicator that instructs the user to look towards the first vehicle

Fig. 27.65

27.6500: The process of 27.6300, wherein the presenting the vehicular threat information via a visual display device includes:

27.6501: displaying an indicator that instructs the user to accelerate, decelerate, and/or turn

Fig. 27.66

27.6600: The process of 27.100, wherein the presenting the vehicular threat information includes:

27.6601: directing the user to accelerate

Fig. 27.67

27.6700: The process of 27.100, wherein the presenting the vehicular threat information includes:

27.6701: directing the user to decelerate

Fig. 27.68

27.6800: The process of 27.100, wherein the presenting the vehicular threat information includes:

27.6801: directing the user to turn

Fig. 27.69

27.6900: The process of 27.100, further comprising:

27.6901: transmitting to the first vehicle a warning based on the vehicular threat information

*Fig. 27.70*

27.7000: The process of 27.100, further comprising:

27.7001: presenting the vehicular threat information via an output device of a vehicle of the user, the output device including a visual display and/or an audio speaker

*Fig. 27.71*

27.7100: The process of 27.100, wherein the wearable device is a helmet worn by the user

*Fig. 27.72*

27.7200: The process of 27.100, wherein the wearable device is goggles worn by the user

*Fig. 27.73*

27.7300: The process of 27.100, wherein the wearable device is eyeglasses worn by the user

Fig. 27.74

27.7400: The process of 27.100, wherein the presenting the vehicular threat information includes:

27.7401: presenting the vehicular threat information via goggles worn by the user

Fig. 27.75

27.7500: The process of 27.100, wherein the presenting the vehicular threat information includes:

27.7501: presenting the vehicular threat information via a helmet worn by the user

Fig. 27.76

27.7600: The process of 27.100, wherein the presenting the vehicular threat information includes:

27.7601: presenting the vehicular threat information via a hat worn by the user

Fig. 27.77

27.7700: The process of 27.100, wherein the presenting the vehicular threat information includes:

27.7701: presenting the vehicular threat information via eyeglasses worn by the user

Fig. 27.78

27.7800: The process of 27.100, wherein the presenting the vehicular threat information includes:

27.7801: presenting the vehicular threat information via audio speakers that are part of at least one of earphones, a headset, earbuds, and/or a hearing aid

Fig. 27.79

27.7900: The process of 27.100, further comprising:

27.7901: performing the receiving image data, the determining vehicular threat information, and/or the presenting the vehicular threat information on a computing device in the wearable device of the user

Fig. 27.80

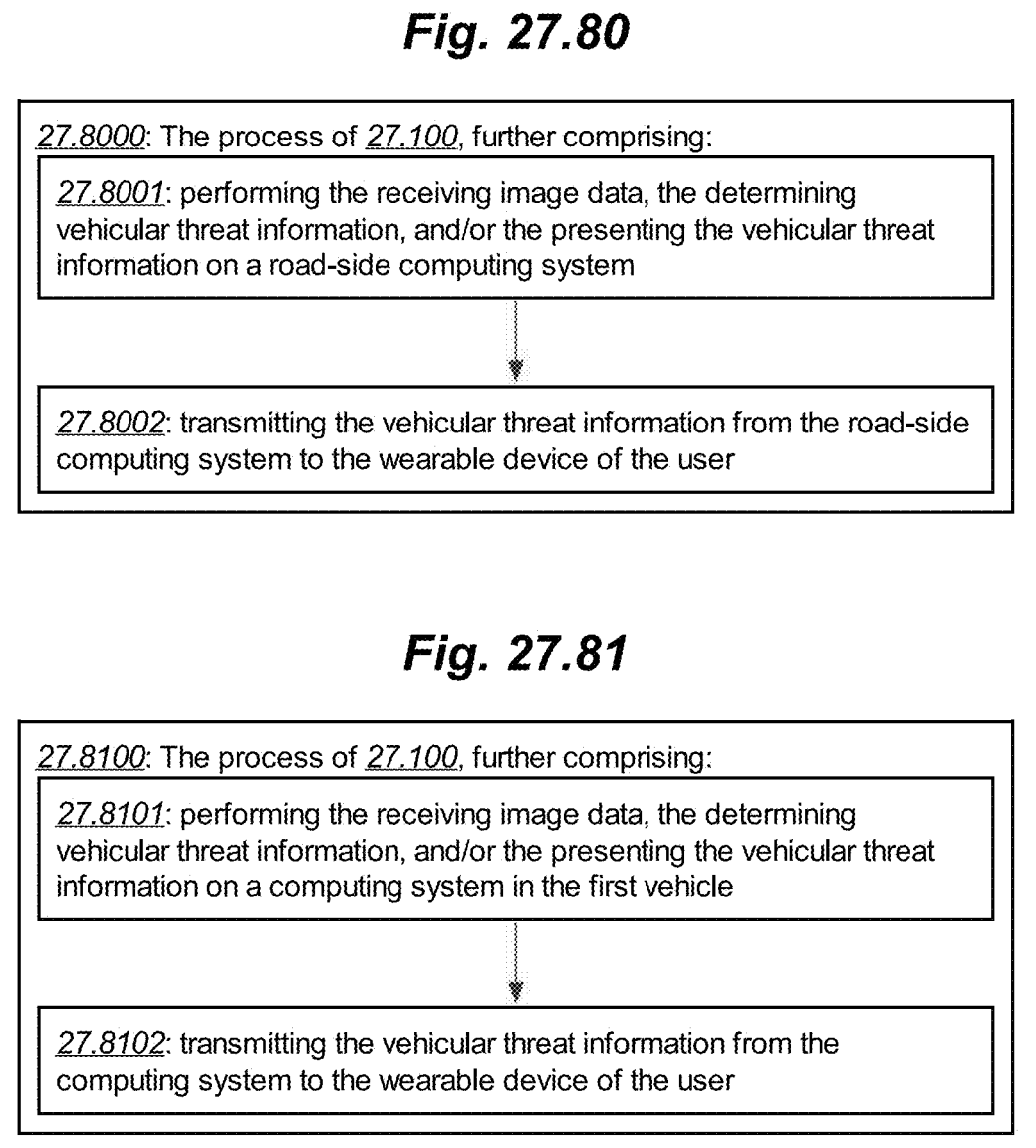

27.8000: The process of 27.100, further comprising:

27.8001: performing the receiving image data, the determining vehicular threat information, and/or the presenting the vehicular threat information on a road-side computing system

↓

27.8002: transmitting the vehicular threat information from the road-side computing system to the wearable device of the user

Fig. 27.81

27.8100: The process of 27.100, further comprising:

27.8101: performing the receiving image data, the determining vehicular threat information, and/or the presenting the vehicular threat information on a computing system in the first vehicle

↓

27.8102: transmitting the vehicular threat information from the computing system to the wearable device of the user

Fig. 27.82

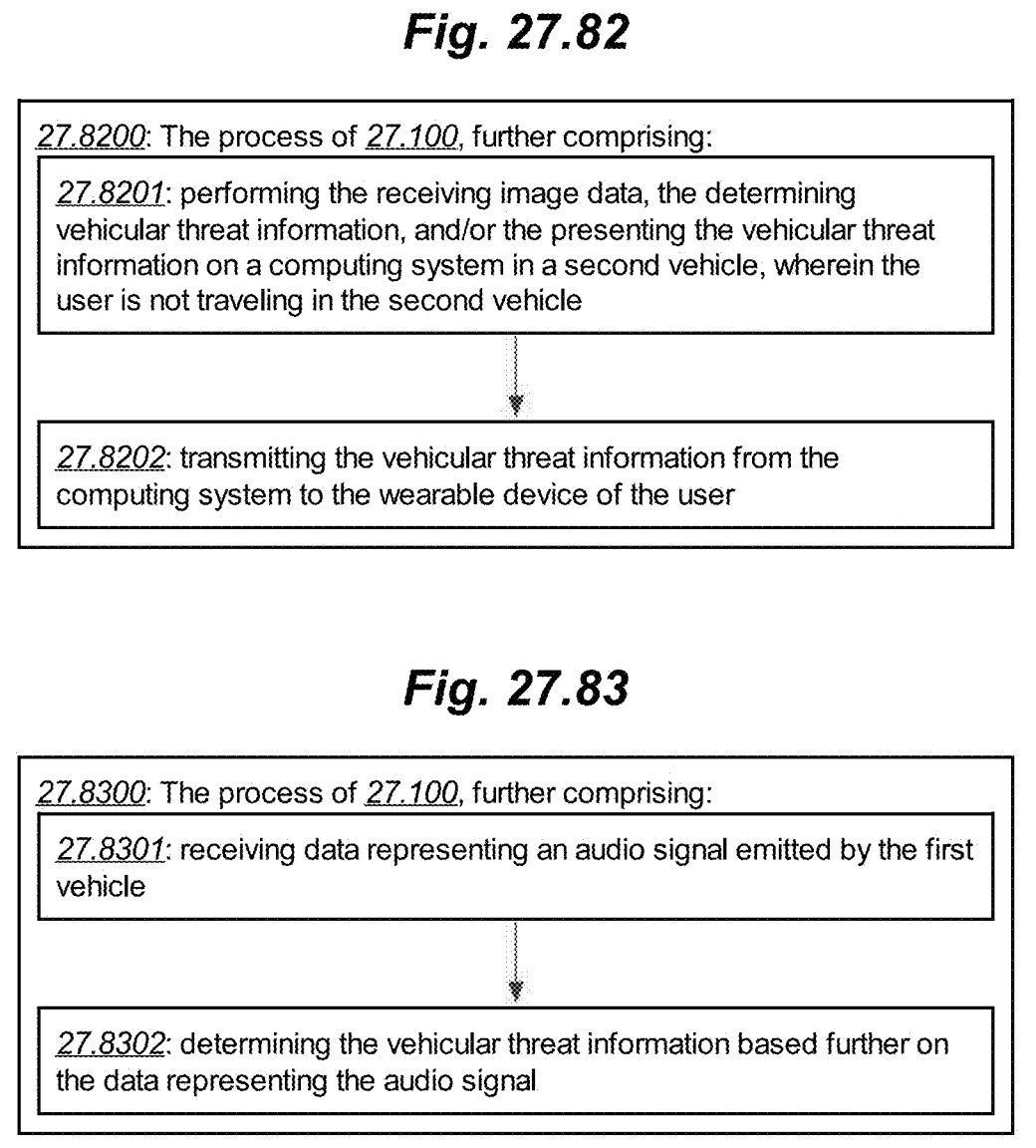

27.8200: The process of 27.100, further comprising:

27.8201: performing the receiving image data, the determining vehicular threat information, and/or the presenting the vehicular threat information on a computing system in a second vehicle, wherein the user is not traveling in the second vehicle

↓

27.8202: transmitting the vehicular threat information from the computing system to the wearable device of the user

Fig. 27.83

27.8300: The process of 27.100, further comprising:

27.8301: receiving data representing an audio signal emitted by the first vehicle

↓

27.8302: determining the vehicular threat information based further on the data representing the audio signal

*Fig. 27.84*

_27.8400_: The process of _27.8300_, wherein the receiving data representing an audio signal emitted by the first vehicle includes:

_27.8401_: receiving data obtained at a microphone array that includes multiple microphones

*Fig. 27.85*

_27.8500_: The process of _27.8400_, wherein the receiving data obtained at a microphone array includes:

_27.8501_: receiving data obtained at a microphone array, the microphone array coupled to a vehicle of the user

*Fig. 27.86*

_27.8600_: The process of _27.8400_, wherein the receiving data obtained at a microphone array includes:

_27.8601_: receiving data obtained at a microphone array, the microphone array coupled to the wearable device

*Fig. 27.87*

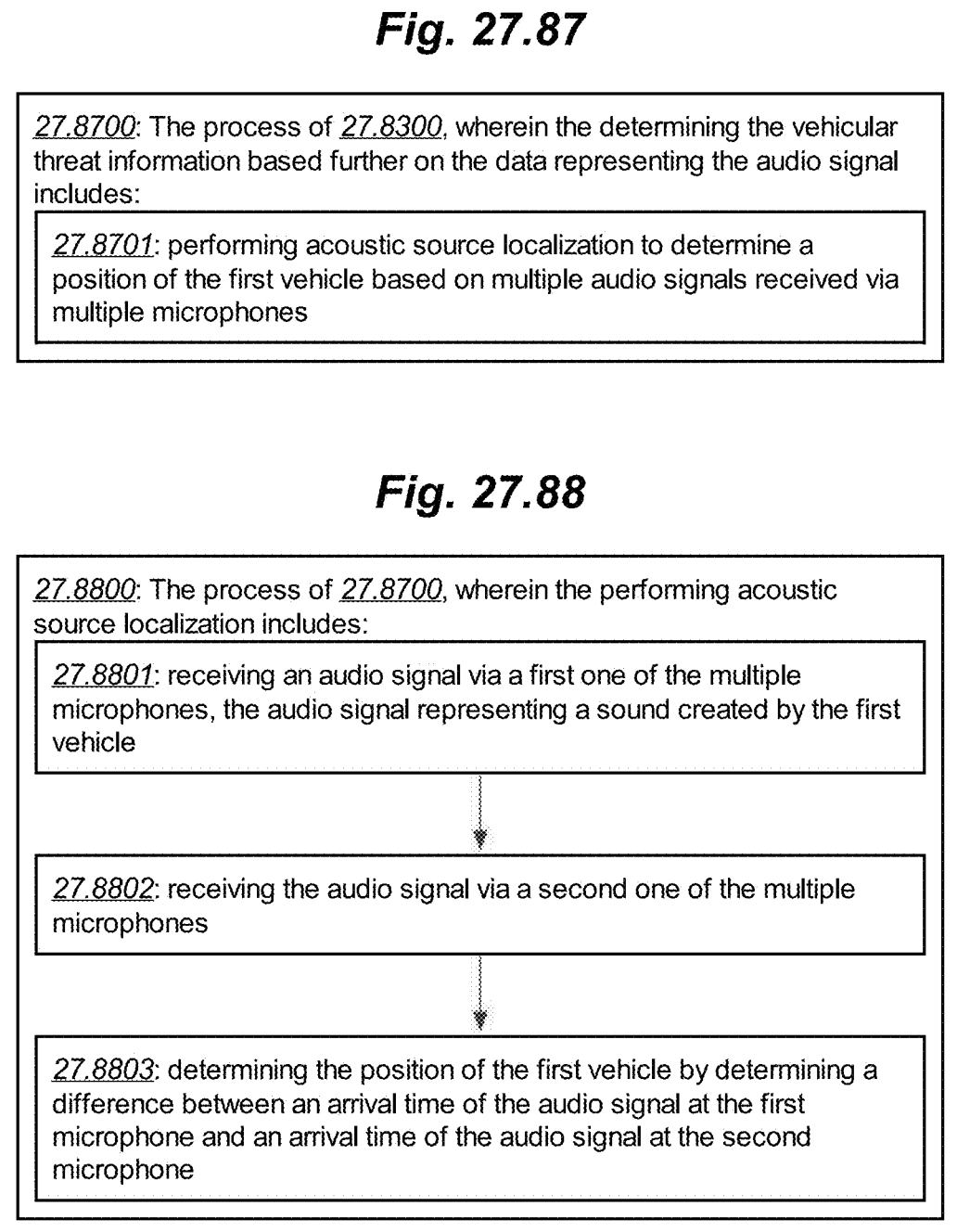

27.8700: The process of 27.8300, wherein the determining the vehicular threat information based further on the data representing the audio signal includes:

27.8701: performing acoustic source localization to determine a position of the first vehicle based on multiple audio signals received via multiple microphones

*Fig. 27.88*

27.8800: The process of 27.8700, wherein the performing acoustic source localization includes:

27.8801: receiving an audio signal via a first one of the multiple microphones, the audio signal representing a sound created by the first vehicle

↓

27.8802: receiving the audio signal via a second one of the multiple microphones

↓

27.8803: determining the position of the first vehicle by determining a difference between an arrival time of the audio signal at the first microphone and an arrival time of the audio signal at the second microphone

Fig. 27.89

27.8900: The process of 27.8700, wherein the performing acoustic source localization includes:

27.8901: triangulating the position of the first vehicle based on a first and second angle, the first angle measured between a first one of the multiple microphones and the first vehicle, the second angle measured between a second one of the multiple microphones and the first vehicle

Fig. 27.90

27.9000: The process of 27.8300, wherein the determining the vehicular threat information based further on the data representing the audio signal includes:

27.9001: performing a Doppler analysis of the data representing the audio signal to determine whether the first vehicle is approaching the user

Fig. 27.91

27.9100: The process of 27.9000, wherein the performing a Doppler analysis includes:

27.9101: determining whether frequency of the audio signal is increasing or decreasing

Fig. 27.92

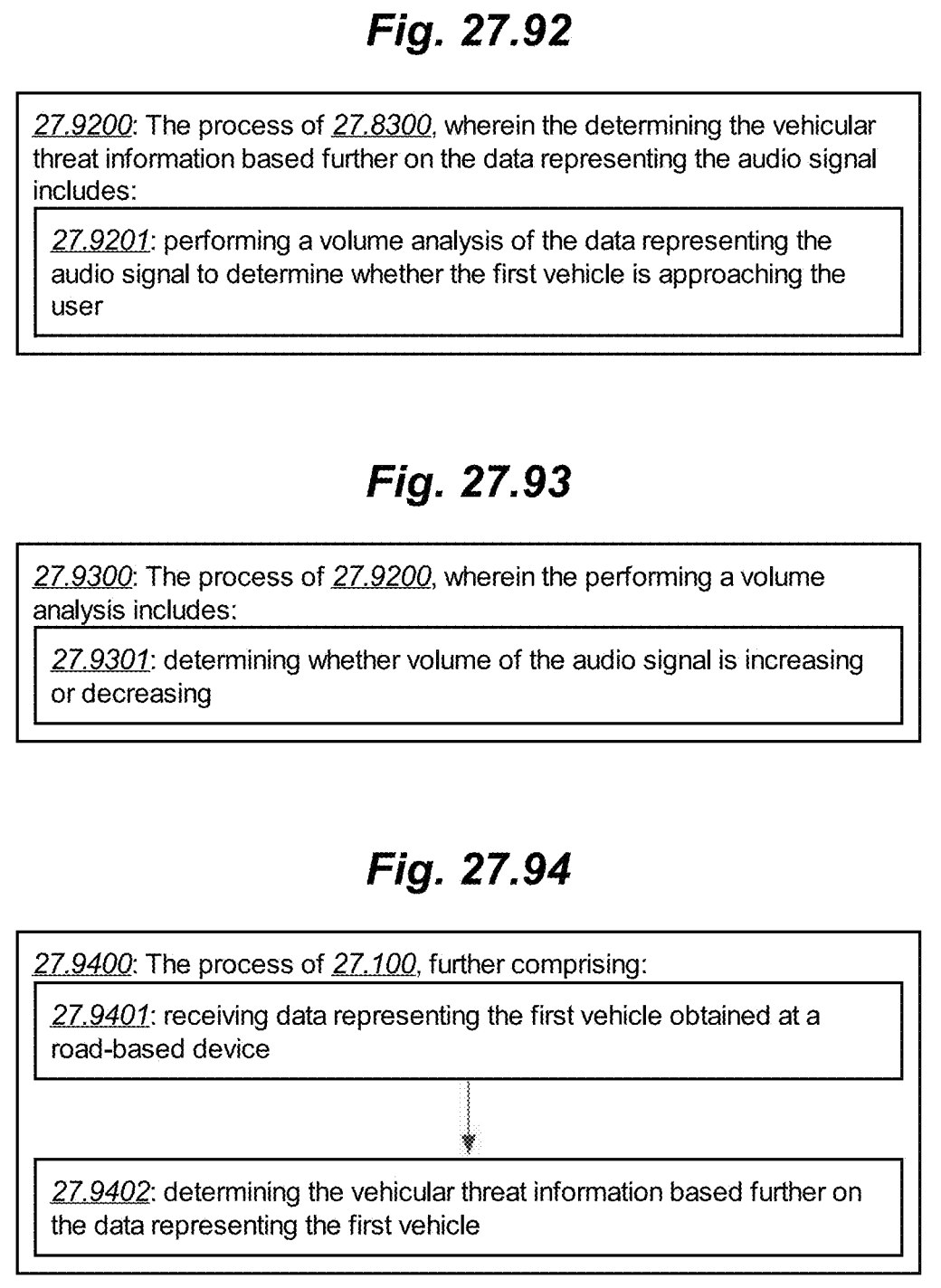

27.9200: The process of 27.8300, wherein the determining the vehicular threat information based further on the data representing the audio signal includes:

27.9201: performing a volume analysis of the data representing the audio signal to determine whether the first vehicle is approaching the user

Fig. 27.93

27.9300: The process of 27.9200, wherein the performing a volume analysis includes:

27.9301: determining whether volume of the audio signal is increasing or decreasing

Fig. 27.94

27.9400: The process of 27.100, further comprising:

27.9401: receiving data representing the first vehicle obtained at a road-based device 27.9402: determining the vehicular threat information based further on the data representing the first vehicle

*Fig. 27.95*

27.9500: The process of 27.9400, wherein the receiving data representing the first vehicle obtained at a road-based device includes:

27.9501: receiving the data from a sensor deployed at an intersection

*Fig. 27.96*

27.9600: The process of 27.9400, wherein the receiving data representing the first vehicle obtained at a road-based device includes:

27.9601: receiving an image of the first vehicle from a camera deployed at an intersection

*Fig. 27.97*

27.9700: The process of 27.9400, wherein the receiving data representing the first vehicle obtained at a road-based device includes:

27.9701: receiving ranging data from a range sensor deployed at an intersection, the ranging data representing a distance between the first vehicle and the intersection

Fig. 27.98

27.9800: The process of 27.9400, wherein the receiving data representing the first vehicle obtained at a road-based device includes:

27.9801: receiving data from an induction loop deployed in a road surface, the induction loop configured to detect the presence and/or velocity of the first vehicle

Fig. 27.99

27.9900: The process of 27.9400, wherein the determining the vehicular threat information based further on the data representing the first vehicle includes:

27.9901: identifying the first vehicle in an image obtained from the road-based sensor

Fig. 27.100

27.10000: The process of 27.9400, wherein the determining the vehicular threat information based further on the data representing the first vehicle includes:

27.10001: determining a trajectory of the first vehicle based on multiple images obtained from the road-based device

Fig. 27.101

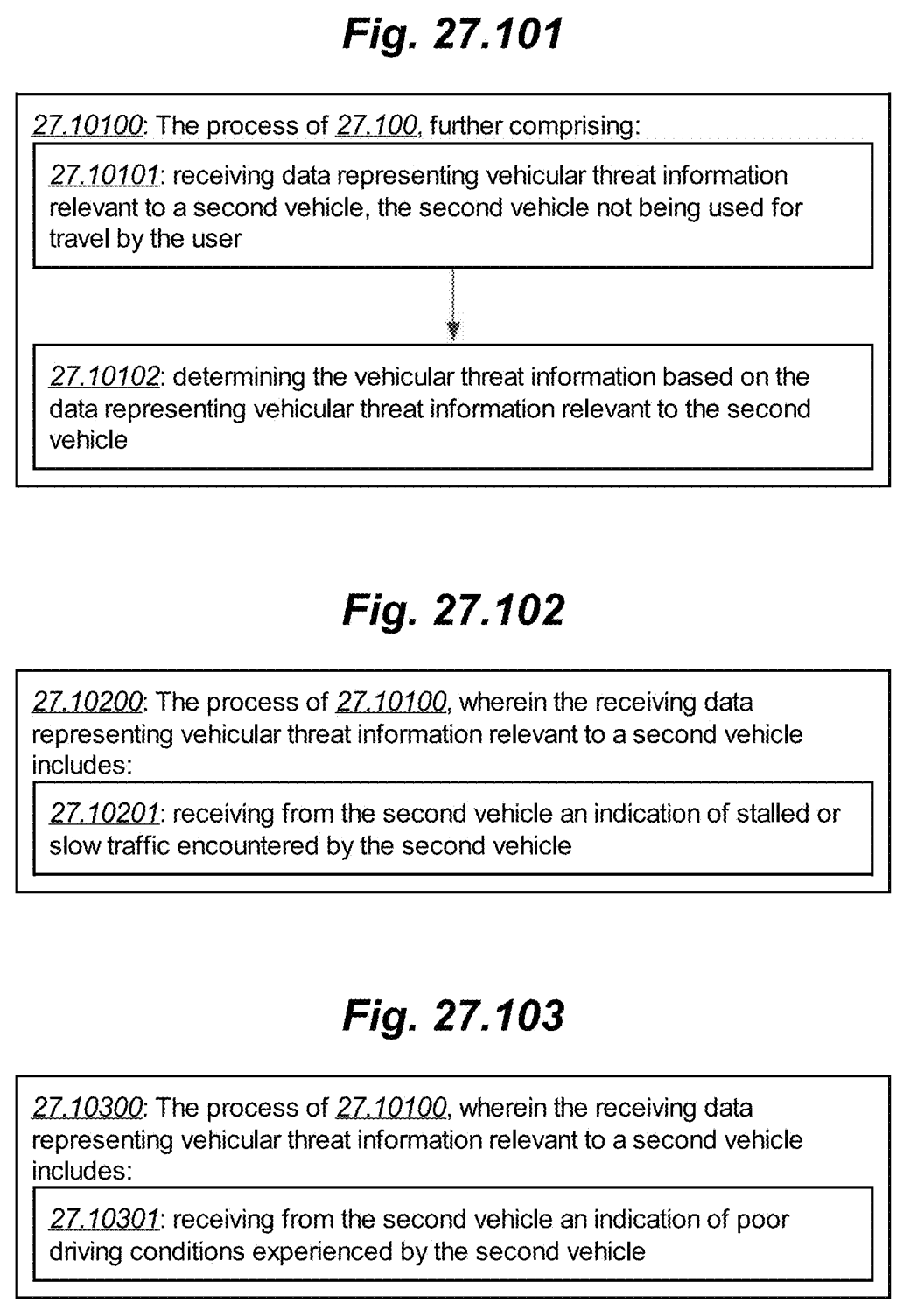

27.10100: The process of 27.100, further comprising:

27.10101: receiving data representing vehicular threat information relevant to a second vehicle, the second vehicle not being used for travel by the user

↓

27.10102: determining the vehicular threat information based on the data representing vehicular threat information relevant to the second vehicle

Fig. 27.102

27.10200: The process of 27.10100, wherein the receiving data representing vehicular threat information relevant to a second vehicle includes:

27.10201: receiving from the second vehicle an indication of stalled or slow traffic encountered by the second vehicle

Fig. 27.103

27.10300: The process of 27.10100, wherein the receiving data representing vehicular threat information relevant to a second vehicle includes:

27.10301: receiving from the second vehicle an indication of poor driving conditions experienced by the second vehicle

*Fig. 27.104*

*27.10400*: The process of *27.10100*, wherein the receiving data representing vehicular threat information relevant to a second vehicle includes:

> *27.10401*: receiving from the second vehicle an indication that the first vehicle is driving erratically

*Fig. 27.105*

*27.10500*: The process of *27.10100*, wherein the receiving data representing vehicular threat information relevant to a second vehicle includes:

> *27.10501*: receiving from the second vehicle an image of the first vehicle

*Fig. 27.106*

*27.10600*: The process of *27.100*, further comprising:

> *27.10601*: transmitting the vehicular threat information to a second vehicle

Fig. 27.107

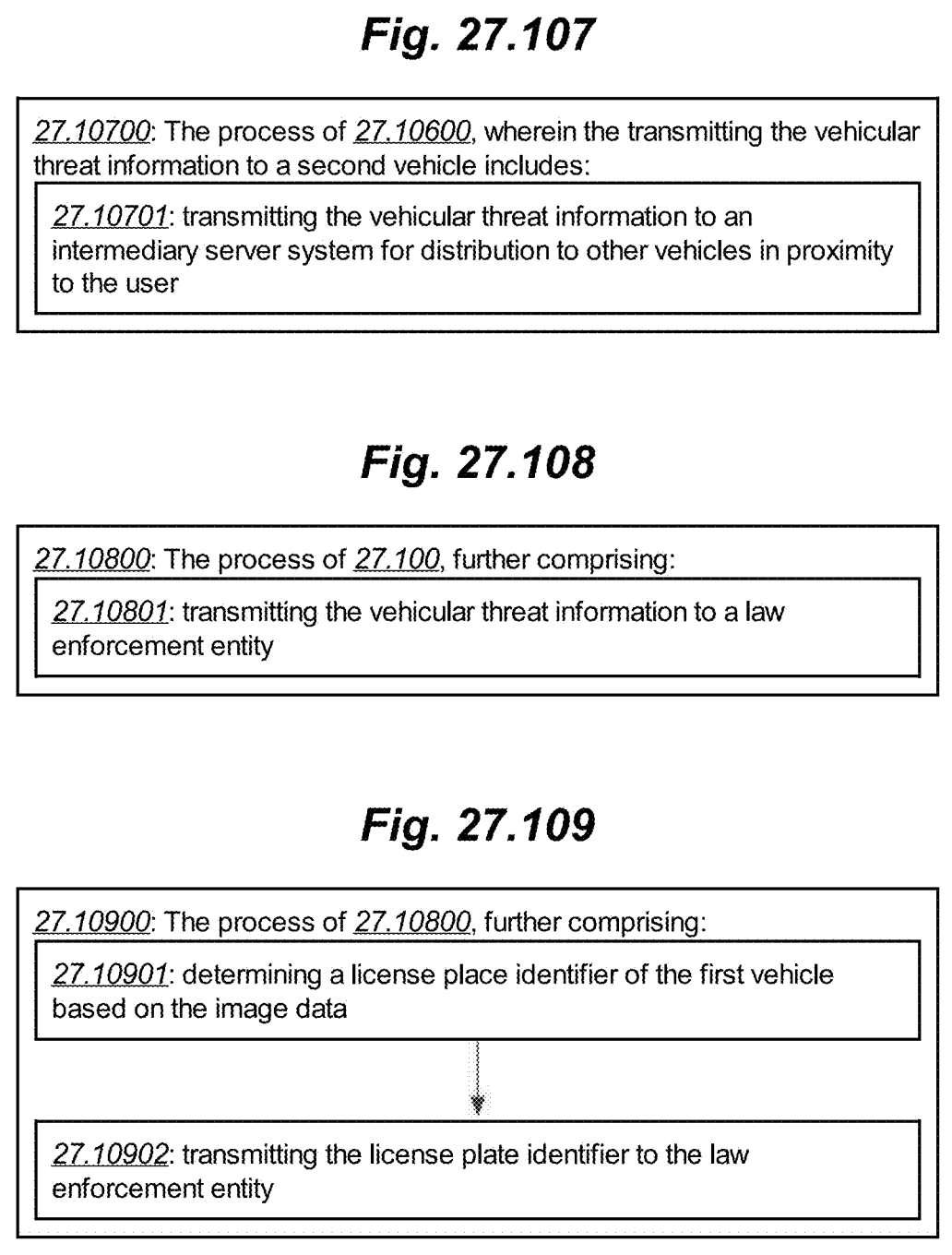

27.10700: The process of 27.10600, wherein the transmitting the vehicular threat information to a second vehicle includes:

27.10701: transmitting the vehicular threat information to an intermediary server system for distribution to other vehicles in proximity to the user

Fig. 27.108

27.10800: The process of 27.100, further comprising:

27.10801: transmitting the vehicular threat information to a law enforcement entity

Fig. 27.109

27.10900: The process of 27.10800, further comprising:

27.10901: determining a license place identifier of the first vehicle based on the image data

↓

27.10902: transmitting the license plate identifier to the law enforcement entity Fig. 27.110
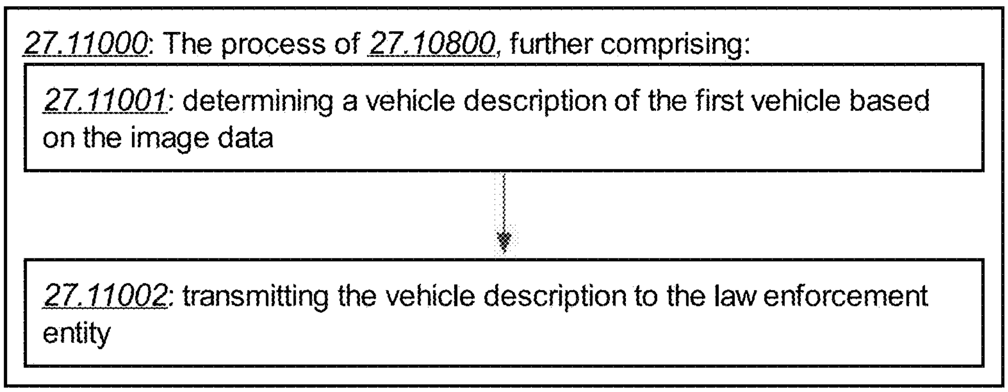
Fig. 27.111
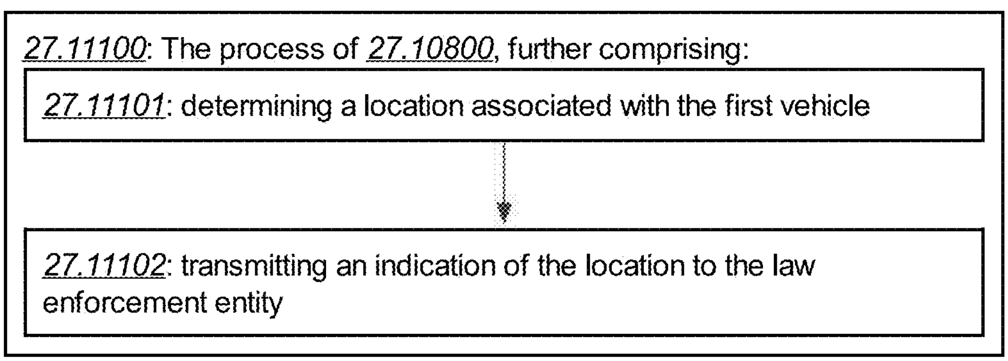

Fig. 27.112
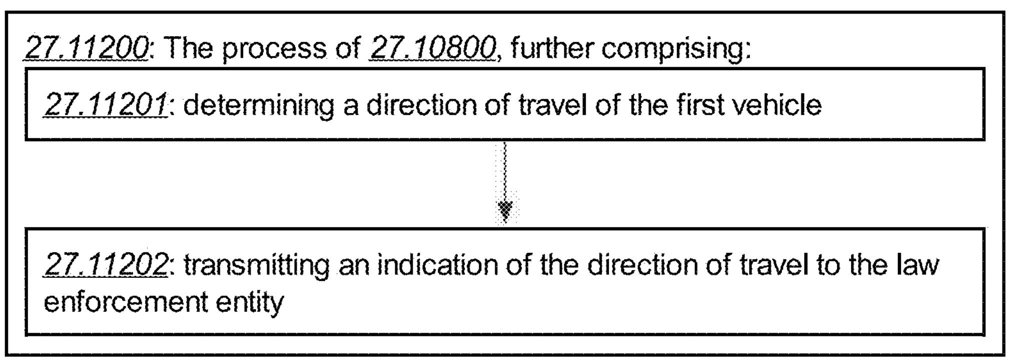

Fig. 31.1

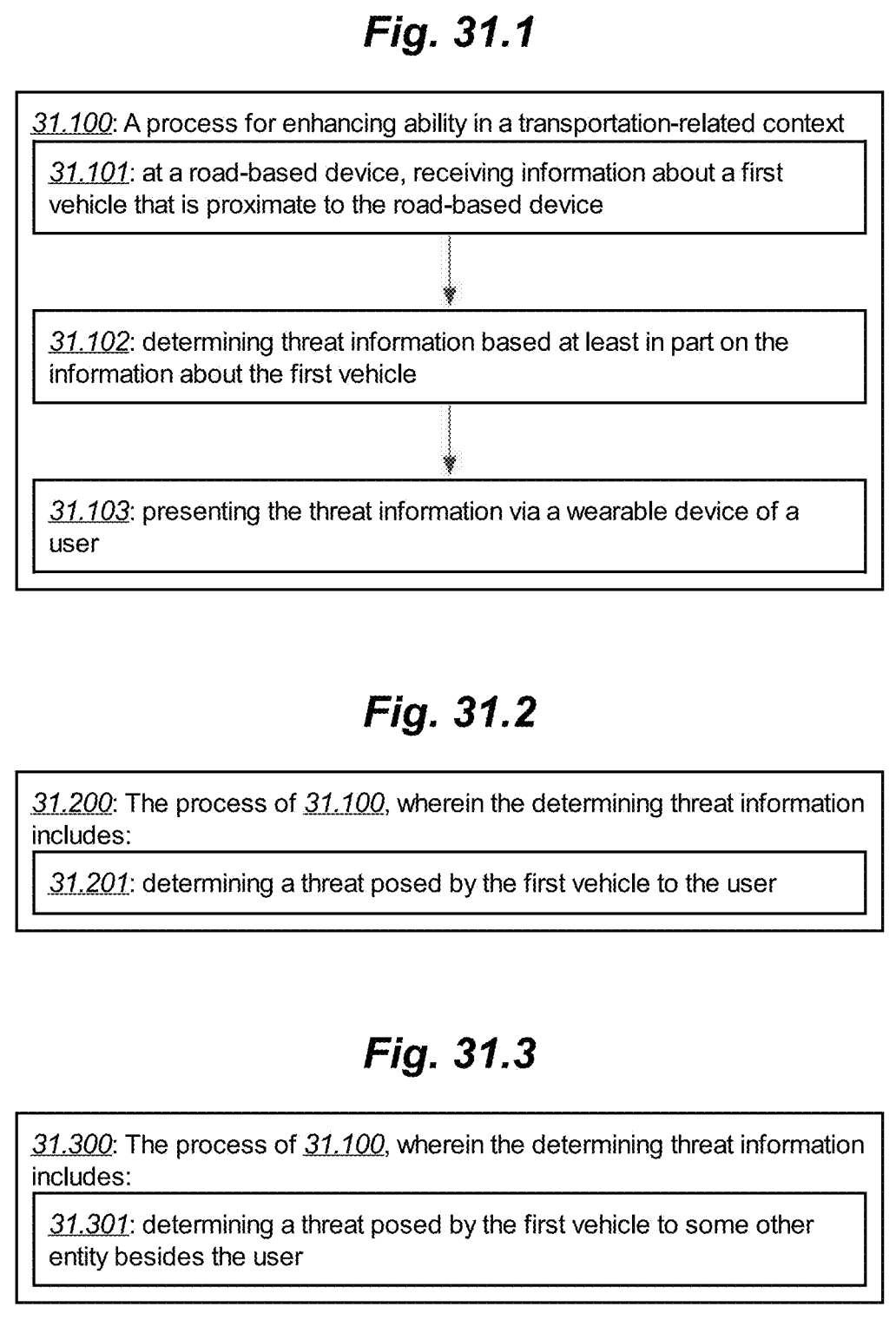

31.100: A process for enhancing ability in a transportation-related context 31.101: at a road-based device, receiving information about a first vehicle that is proximate to the road-based device 31.102: determining threat information based at least in part on the information about the first vehicle 31.103: presenting the threat information via a wearable device of a user

Fig. 31.2

31.200: The process of 31.100, wherein the determining threat information includes:

31.201: determining a threat posed by the first vehicle to the user

Fig. 31.3

31.300: The process of 31.100, wherein the determining threat information includes:

31.301: determining a threat posed by the first vehicle to some other entity besides the user

Fig. 31.4

31.400: The process of 31.100, wherein the determining threat information includes:

31.401: determining a threat posed by a vehicle occupied by the user to the first vehicle

Fig. 31.5

31.500: The process of 31.100, wherein the determining threat information includes:

31.501: determining a threat posed by a vehicle occupied by the user to some other entity besides the first vehicle

Fig. 31.6

31.600: The process of 31.100, wherein the determining threat information includes:

31.601: determining a likelihood that the first vehicle will collide with some other object

Fig. 31.7

31.700: The process of 31.600, wherein the determining a likelihood that the first vehicle will collide with some other object includes:

31.701: determining a likelihood that the first vehicle will collide with the user

Fig. 31.8

31.800: The process of 31.600, wherein the determining a likelihood that the first vehicle will collide with some other object includes:

31.801: determining that the likelihood that the first vehicle will collide with some other object is greater than a threshold

Fig. 31.9

31.900: The process of 31.100, wherein the determining threat information includes:

31.901: determining that the first vehicle is driving erratically

*Fig. 31.10*

<u>*31.1000*</u>: The process of <u>*31.100*</u>, wherein the determining threat information includes:

<u>*31.1001*</u>: determining that the first vehicle is driving with excessive speed

*Fig. 31.11*

<u>*31.1100*</u>: The process of <u>*31.1000*</u>, wherein the determining that the first vehicle is driving with excessive speed includes:

<u>*31.1101*</u>: determining that the first vehicle is traveling more than a threshold percentage faster than an average speed of traffic on a road segment

*Fig. 31.12*

<u>*31.1200*</u>: The process of <u>*31.1000*</u>, wherein the determining that the first vehicle is driving with excessive speed includes:

<u>*31.1201*</u>: determining that the first vehicle is traveling at a speed that is more than a threshold number of standard deviations over an average speed of traffic on a road segment

*Fig. 31.13*

31.1300: The process of 31.100, wherein the road-based device is a sensor attached to a structure proximate to the first vehicle

*Fig. 31.14*

31.1400: The process of 31.1300, wherein the structure proximate to the first vehicle is one of a utility pole, a traffic control signal support, and/or a building

*Fig. 31.15*

31.1500: The process of 31.1300, wherein the receiving information about a first vehicle includes:

31.1501: receiving an image of the first vehicle from a camera deployed at an intersection

*Fig. 31.16*

31.1600: The process of 31.1300, wherein the receiving information about a first vehicle includes:

31.1601: receiving ranging data from a range sensor deployed at an intersection, the ranging data representing a distance between the first vehicle and the intersection

Fig. 31.17

_31.1700_: The process of _31.1300_, wherein the road-based device includes a camera

Fig. 31.18

_31.1800_: The process of _31.1300_, wherein the road-based device includes a microphone

Fig. 31.19

_31.1900_: The process of _31.1300_, wherein the road-based device includes a radar-based speed sensor

Fig. 31.20

_31.2000_: The process of _31.1300_, wherein the road-based device includes a light detection and ranging-based speed sensor

Fig. 31.21

31.2100: The process of 31.1300, wherein the road-based device includes a range sensor

Fig. 31.22

31.2200: The process of 31.1300, wherein the road-based device includes a receiver operable to receive motion-related information transmitted from the first vehicle, the motion-related information including at least one of a position of the first vehicle, a velocity of the first vehicle, and/or a trajectory of the first vehicle

Fig. 31.23

31.2300: The process of 31.100, wherein the road-based device is embedded in a roadway being traveled over by the first vehicle

Fig. 31.24

31.2400: The process of 31.2300, wherein the road-based device includes one or more induction loops embedded in the roadway, the one or more induction loops configured to detect the presence and/or velocity of the first vehicle

*Fig. 31.25*

31.2500: The process of 31.2400, wherein the receiving information about a first vehicle includes:

31.2501: receiving motion-related information from the induction loop, the motion-related information including at least one of a position of the first vehicle, a velocity of the first vehicle, and/or a trajectory of the first vehicle

*Fig. 31.26*

31.2600: The process of 31.100, wherein the receiving information about a first vehicle includes:

31.2601: receiving the information about the first vehicle from a sensor attached to the first vehicle

*Fig. 31.27*

31.2700: The process of 31.100, wherein the receiving information about a first vehicle includes:

31.2701: receiving the information about the first vehicle from a sensor attached to a second vehicle

Fig. 31.28

31.2800: The process of 31.2700, wherein the second vehicle is an aerial vehicle

Fig. 31.29

31.2900: The process of 31.2700, wherein the second vehicle is a satellite

Fig. 31.30

31.3000: The process of 31.100, wherein the receiving information about a first vehicle includes:

31.3001: receiving the information about the first vehicle from a sensor attached to a vehicle that is occupied by the user

Fig. 31.31

31.3100: The process of 31.100, wherein the receiving information about a first vehicle includes:

31.3101: receiving the information about the first vehicle from a sensor attached to a vehicle that is operating autonomously

Fig. 31.32

31.3200: The process of 31.100, wherein the receiving information about a first vehicle includes:

31.3201: receiving the information about the first vehicle from a sensor of the wearable device

Fig. 31.33

31.3300: The process of 31.100, further comprising:

31.3301: receiving motion-related information about the first vehicle and/or other objects moving about a roadway

Fig. 31.34

31.3400: The process of 31.3300, wherein the receiving motion-related information includes:

31.3401: receiving position information from a position sensor of the first vehicle

Fig. 31.35

31.3500: The process of 31.3300, wherein the receiving motion-related information includes:

31.3501: receiving velocity information from a velocity sensor of the first vehicle

Fig. 31.36

31.3600: The process of 31.3300, wherein the determining threat information includes:

31.3601: determining the threat information based on the motion-related information about the first vehicle

Fig. 31.37

31.3700: The process of 31.3600, wherein the determining the threat information based on the motion-related information about the first vehicle includes:

31.3701: determining the threat information based on information about position, velocity, and/or acceleration of the user obtained from sensors in the wearable device

Fig. 31.38

31.3800: The process of 31.3600, wherein the determining the threat information based on the motion-related information about the first vehicle includes:

31.3801: determining the threat information based on information about position, velocity, and/or acceleration of the user obtained from devices in a vehicle of the user

Fig. 31.39

31.3900: The process of 31.3600, wherein the determining the threat information based on the motion-related information about the first vehicle includes:

31.3901: determining the threat information based on information about position, velocity, and/or acceleration of the first vehicle obtained from devices of the first vehicle

Fig. 31.40

31.4000: The process of 31.100, wherein the receiving information about a first vehicle includes:

31.4001: receiving image data from a camera, the image data representing an image of the first vehicle

*Fig. 31.41*

| |
|---|
| _31.4100_: The process of _31.4000_, wherein the receiving image data from a camera includes: |
| _31.4101_: receiving an image from a camera that is attached to one of a road-side structure, the first vehicle, a second vehicle, a vehicle occupied by the user, or the wearable device |

*Fig. 31.42*

| |
|---|
| _31.4200_: The process of _31.4000_, wherein the receiving image data from a camera includes: |
| _31.4201_: receiving video data that includes multiple images of the first vehicle taken at different times |

Fig. 31.43

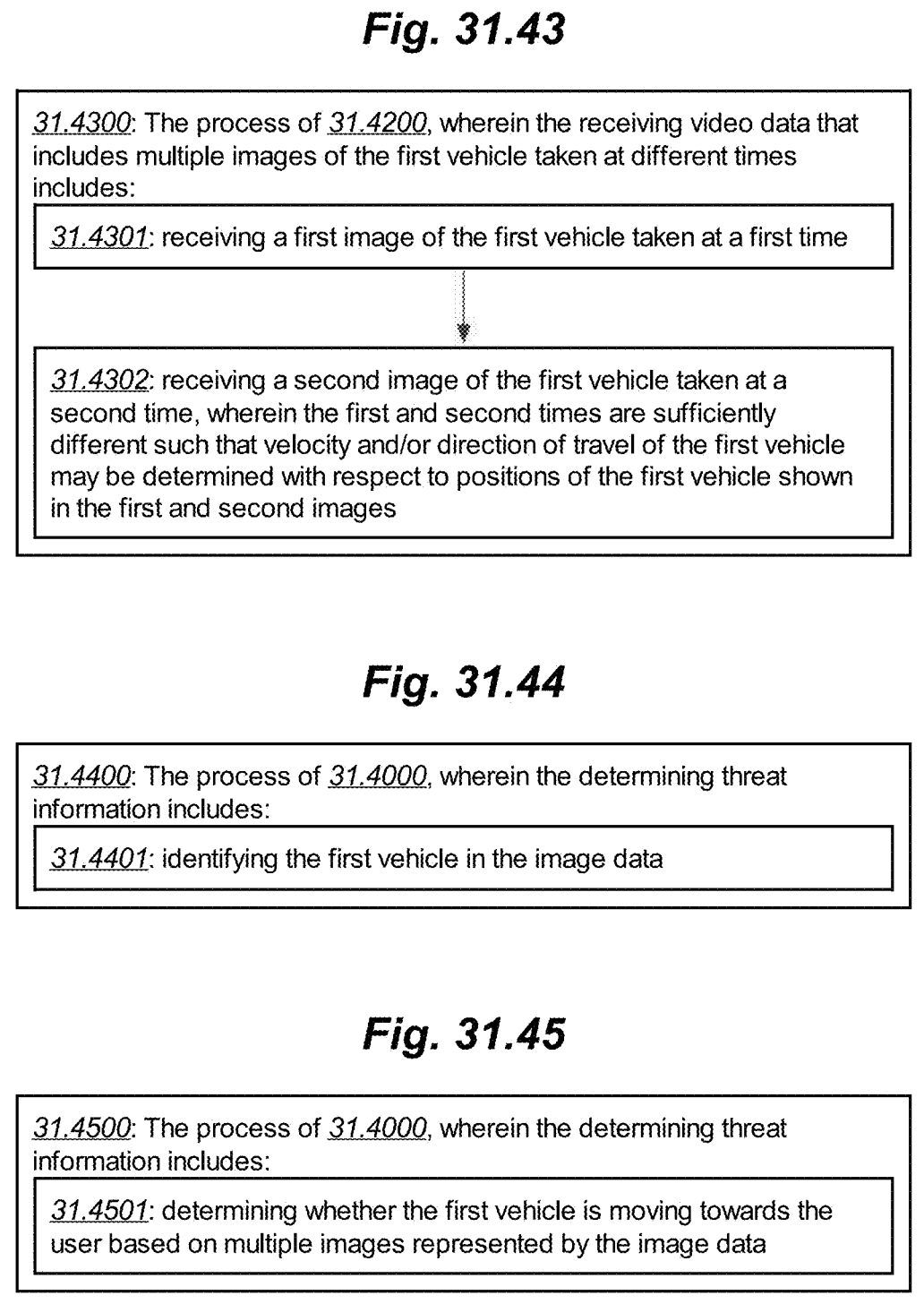

31.4300: The process of 31.4200, wherein the receiving video data that includes multiple images of the first vehicle taken at different times includes:

31.4301: receiving a first image of the first vehicle taken at a first time 31.4302: receiving a second image of the first vehicle taken at a second time, wherein the first and second times are sufficiently different such that velocity and/or direction of travel of the first vehicle may be determined with respect to positions of the first vehicle shown in the first and second images

Fig. 31.44

31.4400: The process of 31.4000, wherein the determining threat information includes:

31.4401: identifying the first vehicle in the image data

Fig. 31.45

31.4500: The process of 31.4000, wherein the determining threat information includes:

31.4501: determining whether the first vehicle is moving towards the user based on multiple images represented by the image data

Fig. 31.46

31.4600: The process of 31.4000, wherein the determining threat information includes:

31.4601: determining motion-related information about the first vehicle, based on one or more images of the first vehicle

Fig. 31.47

31.4700: The process of 31.4600, wherein the determining motion-related information about the first vehicle includes:

31.4701: determining the motion-related information with respect to timestamps associated with the one or more images

Fig. 31.48

31.4800: The process of 31.4600, wherein the determining motion-related information about the first vehicle includes:

31.4801: determining a position of the first vehicle

Fig. 31.49

31.4900: The process of 31.4600, wherein the determining motion-related information about the first vehicle includes:

31.4901: determining a velocity of the first vehicle

Fig. 31.50

31.5000: The process of 31.4900, wherein the determining a velocity of the first vehicle includes:

31.5001: determining the velocity with respect to a fixed frame of reference

Fig. 31.51

31.5100: The process of 31.4900, wherein the determining a velocity of the first vehicle includes:

31.5101: determining the velocity with respect to a frame of reference of the user

Fig. 31.52

31.5200: The process of 31.4600, wherein the determining motion-related information about the first vehicle includes:

31.5201: determining a direction of travel of the first vehicle

Fig. 31.53

31.5300: The process of 31.4600, wherein the determining motion-related information about the first vehicle includes:

31.5301: determining acceleration of the first vehicle

Fig. 31.54

31.5400: The process of 31.4600, wherein the determining motion-related information about the first vehicle includes:

31.5401: determining mass of the first vehicle

Fig. 31.55

31.5500: The process of 31.4000, wherein the determining threat information includes:

31.5501: identifying objects other than the first vehicle in the image data

Fig. 31.56

31.5600: The process of 31.4000, wherein the determining threat information includes:

31.5601: determining driving conditions based on the image data

Fig. 31.57

31.5700: The process of 31.100, wherein the receiving information about a first vehicle includes:

31.5701: receiving data representing an audio signal emitted or reflected by the first vehicle

Fig. 31.58

31.5800: The process of 31.5700, wherein the receiving data representing an audio signal emitted or reflected by the first vehicle includes:

31.5801: receiving data obtained at a microphone array that includes multiple microphones

Fig. 31.59

31.5900: The process of 31.5800, wherein the receiving data obtained at a microphone array includes:

31.5901: receiving data obtained at a microphone array, the microphone array coupled to a road-side structure

Fig. 31.60

31.6000: The process of 31.5700, wherein the determining threat information includes:

31.6001: determining the threat information based on the data representing the audio signal

Fig. 31.61

31.6100: The process of 31.6000, wherein the determining the threat information based on the data representing the audio signal includes:

31.6101: performing acoustic source localization to determine a position of the first vehicle based on multiple audio signals received via multiple microphones

*Fig. 31.62*

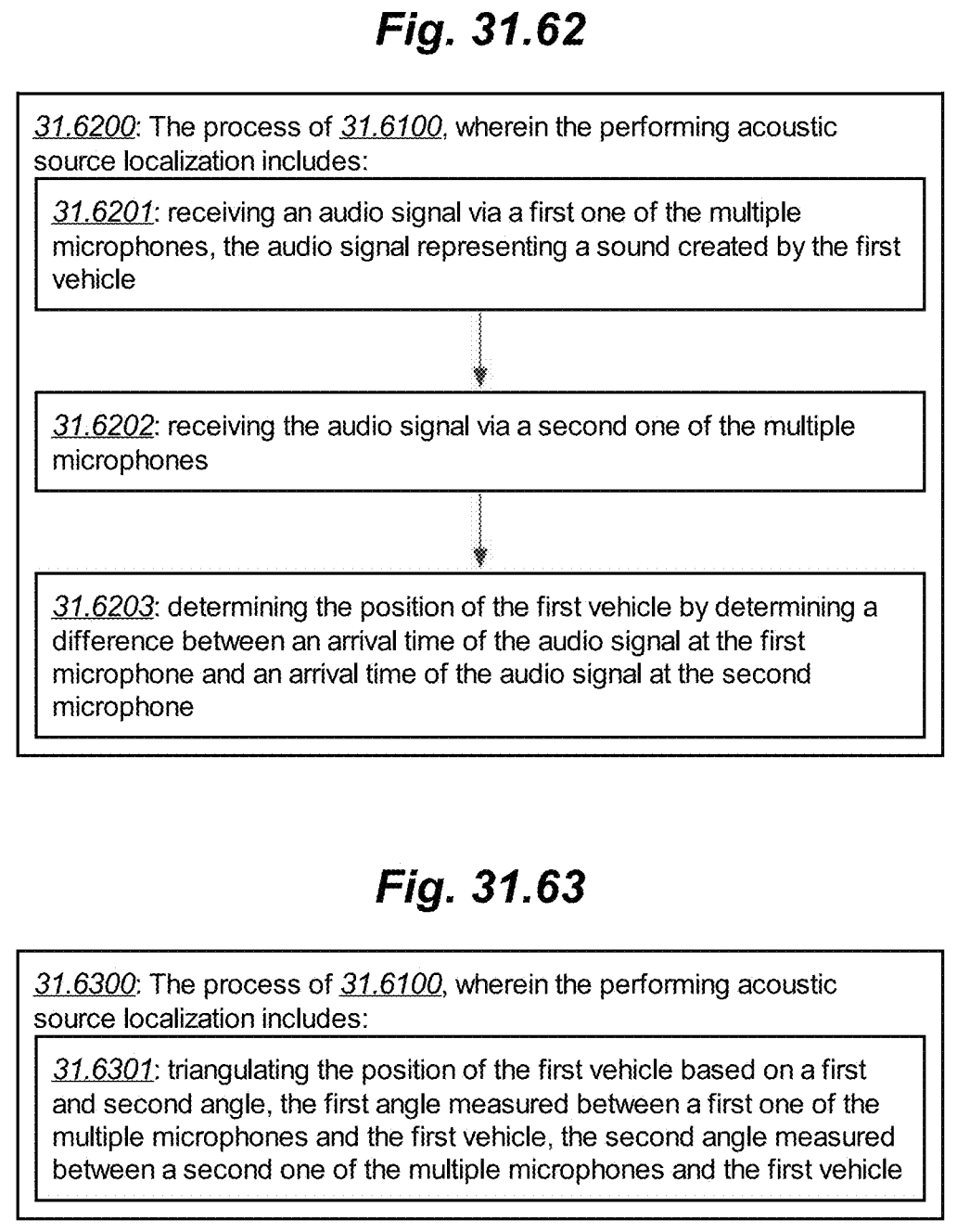

31.6200: The process of 31.6100, wherein the performing acoustic source localization includes:

31.6201: receiving an audio signal via a first one of the multiple microphones, the audio signal representing a sound created by the first vehicle

↓

31.6202: receiving the audio signal via a second one of the multiple microphones

↓

31.6203: determining the position of the first vehicle by determining a difference between an arrival time of the audio signal at the first microphone and an arrival time of the audio signal at the second microphone

*Fig. 31.63*

31.6300: The process of 31.6100, wherein the performing acoustic source localization includes:

31.6301: triangulating the position of the first vehicle based on a first and second angle, the first angle measured between a first one of the multiple microphones and the first vehicle, the second angle measured between a second one of the multiple microphones and the first vehicle

*Fig. 31.64*

31.6400: The process of 31.6000, wherein the determining the threat information based on the data representing the audio signal includes:

31.6401: performing a Doppler analysis of the data representing the audio signal to determine whether the first vehicle is approaching the user

*Fig. 31.65*

31.6500: The process of 31.6400, wherein the performing a Doppler analysis includes:

31.6501: determining whether frequency of the audio signal is increasing or decreasing

*Fig. 31.66*

31.6600: The process of 31.6000, wherein the determining the threat information based on the data representing the audio signal includes:

31.6601: performing a volume analysis of the data representing the audio signal to determine whether the first vehicle is approaching the user

Fig. 31.67

<u>31.6700</u>: The process of <u>31.6600</u>, wherein the performing a volume analysis includes:

<u>31.6701</u>: determining whether volume of the audio signal is increasing or decreasing

Fig. 31.68

<u>31.6800</u>: The process of <u>31.100</u>, wherein the determining threat information includes:

<u>31.6801</u>: determining threat information that is not related to the first vehicle

Fig. 31.69

<u>31.6900</u>: The process of <u>31.6800</u>, wherein the determining threat information that is not related to the first vehicle includes:

<u>31.6901</u>: receiving and processing information about objects and/or conditions aside from the first vehicle

Fig. 31.70

31.7000: The process of 31.6900, wherein the receiving and processing information about objects and/or conditions aside from the first vehicle includes:

31.7001: receiving information about at least one of a stationary object, a pedestrian, and/or an animal

Fig. 31.71

31.7100: The process of 31.6800, wherein the determining threat information that is not related to the first vehicle includes:

31.7101: processing the information about the first vehicle to determine the threat information that is not related to the first vehicle

Fig. 31.72

31.7200: The process of 31.6800, wherein the determining threat information that is not related to the first vehicle includes:

31.7201: processing information other than the information about the first vehicle to determine the threat information that is not related to the first vehicle

Fig. 31.73

31.7300: The process of 31.6800, wherein the determining threat information that is not related to the first vehicle includes:

31.7301: determining that poor driving conditions exist

Fig. 31.74

31.7400: The process of 31.7300, wherein the determining that poor driving conditions exist includes:

31.7401: determining that adverse weather conditions exist

Fig. 31.75

31.7500: The process of 31.7300, wherein the determining that poor driving conditions exist includes:

31.7501: determining that a road construction project is present in proximity to the user

Fig. 31.76

31.7600: The process of 31.6800, wherein the determining threat information that is not related to the first vehicle includes:

31.7601: determining that a limited visibility condition exists

Fig. 31.77

31.7700: The process of 31.6800, wherein the determining threat information that is not related to the first vehicle includes:

31.7701: determining that there is slow traffic in proximity to the user

Fig. 31.78

31.7800: The process of 31.7700, wherein the determining that there is slow traffic in proximity to the user includes:

31.7801: receiving information from a traffic information system regarding traffic congestion on a road traveled by the user

Fig. 31.79

31.7900: The process of 31.7700, wherein the determining that there is slow traffic in proximity to the user includes:

31.7901: determining that one or more vehicles are traveling slower than an average or posted speed for a road traveled by the user

*Fig. 31.80*

31.8000: The process of 31.6800, wherein the determining threat information that is not related to the first vehicle includes:

31.8001: determining that poor surface conditions exist on a roadway traveled by the user

*Fig. 31.81*

31.8100: The process of 31.6800, wherein the determining threat information that is not related to the first vehicle includes:

31.8101: determining that there is a pedestrian in proximity to the user

*Fig. 31.82*

31.8200: The process of 31.6800, wherein the determining threat information that is not related to the first vehicle includes:

31.8201: determining that there is an accident in proximity to the user

*Fig. 31.83*

31.8300: The process of 31.6800, wherein the determining threat information that is not related to the first vehicle includes:

31.8301: determining that there is an animal in proximity to the user

Fig. 31.84

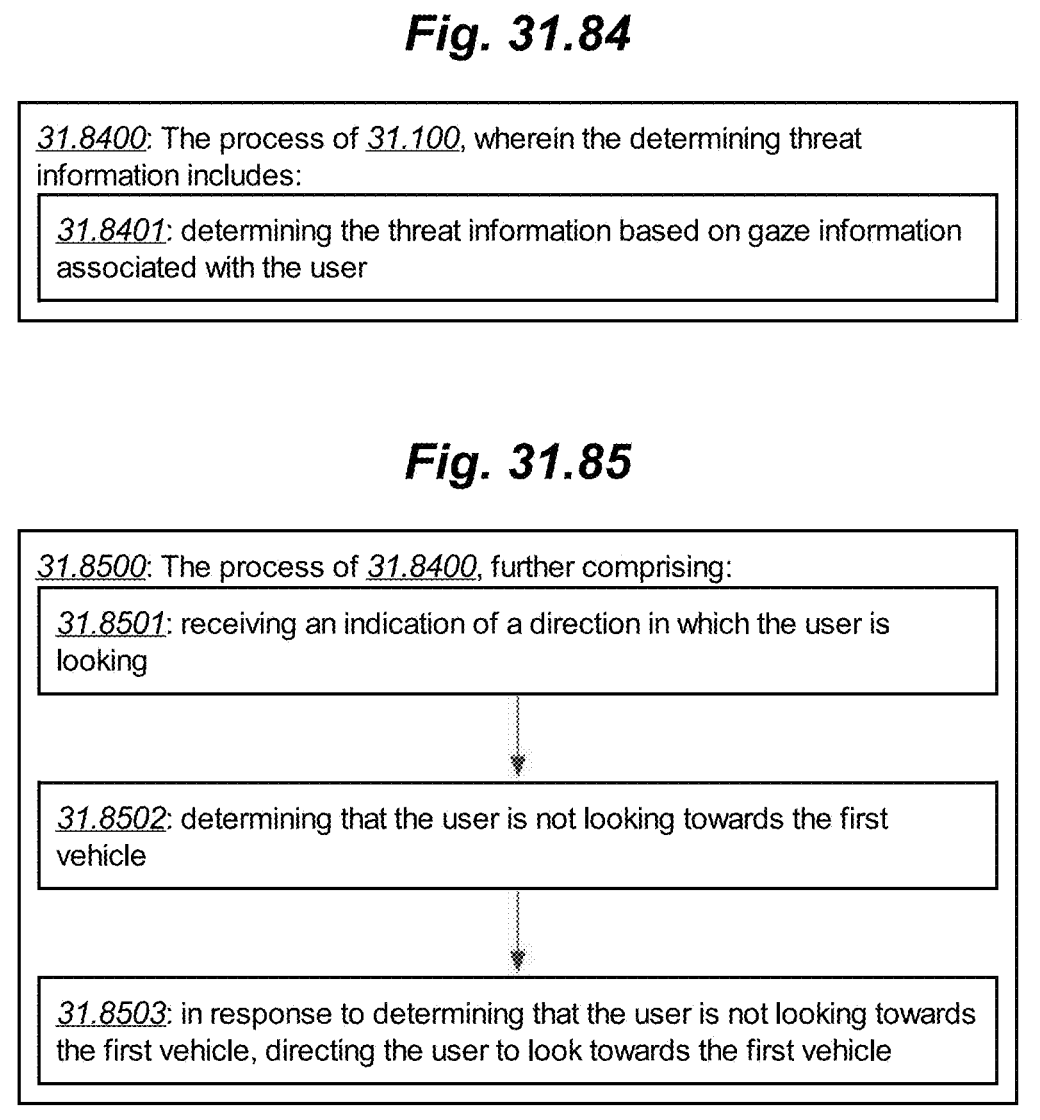

31.8400: The process of 31.100, wherein the determining threat information includes:

31.8401: determining the threat information based on gaze information associated with the user

Fig. 31.85

31.8500: The process of 31.8400, further comprising:

31.8501: receiving an indication of a direction in which the user is looking

↓

31.8502: determining that the user is not looking towards the first vehicle

↓

31.8503: in response to determining that the user is not looking towards the first vehicle, directing the user to look towards the first vehicle

Fig. 31.86

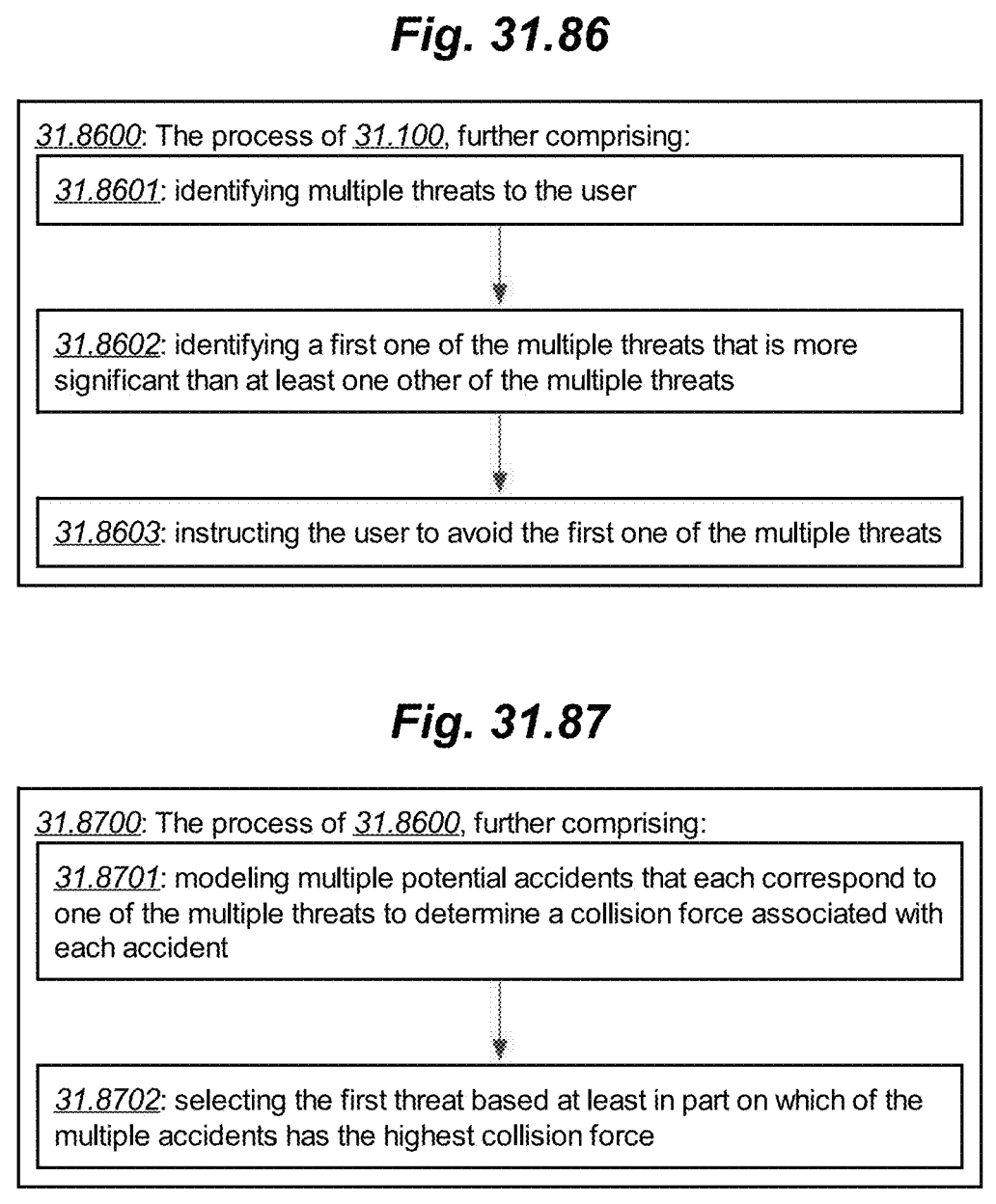

31.8600: The process of 31.100, further comprising:

31.8601: identifying multiple threats to the user 31.8602: identifying a first one of the multiple threats that is more significant than at least one other of the multiple threats 31.8603: instructing the user to avoid the first one of the multiple threats

Fig. 31.87

31.8700: The process of 31.8600, further comprising:

31.8701: modeling multiple potential accidents that each correspond to one of the multiple threats to determine a collision force associated with each accident 31.8702: selecting the first threat based at least in part on which of the multiple accidents has the highest collision force

Fig. 31.88

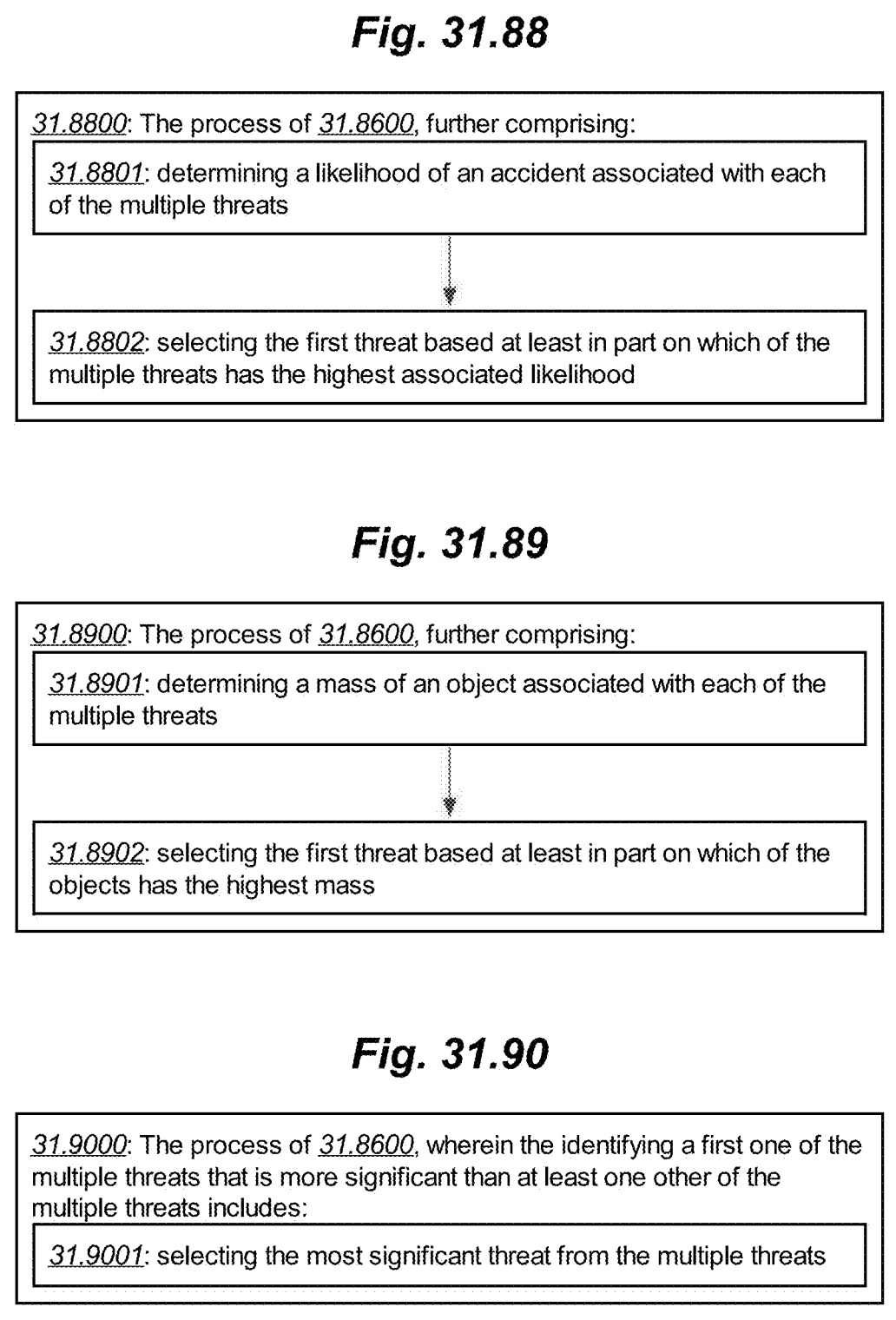

31.8800: The process of 31.8600, further comprising:

31.8801: determining a likelihood of an accident associated with each of the multiple threats 31.8802: selecting the first threat based at least in part on which of the multiple threats has the highest associated likelihood

Fig. 31.89

31.8900: The process of 31.8600, further comprising:

31.8901: determining a mass of an object associated with each of the multiple threats 31.8902: selecting the first threat based at least in part on which of the objects has the highest mass

Fig. 31.90

31.9000: The process of 31.8600, wherein the identifying a first one of the multiple threats that is more significant than at least one other of the multiple threats includes:

31.9001: selecting the most significant threat from the multiple threats

Fig. 31.91

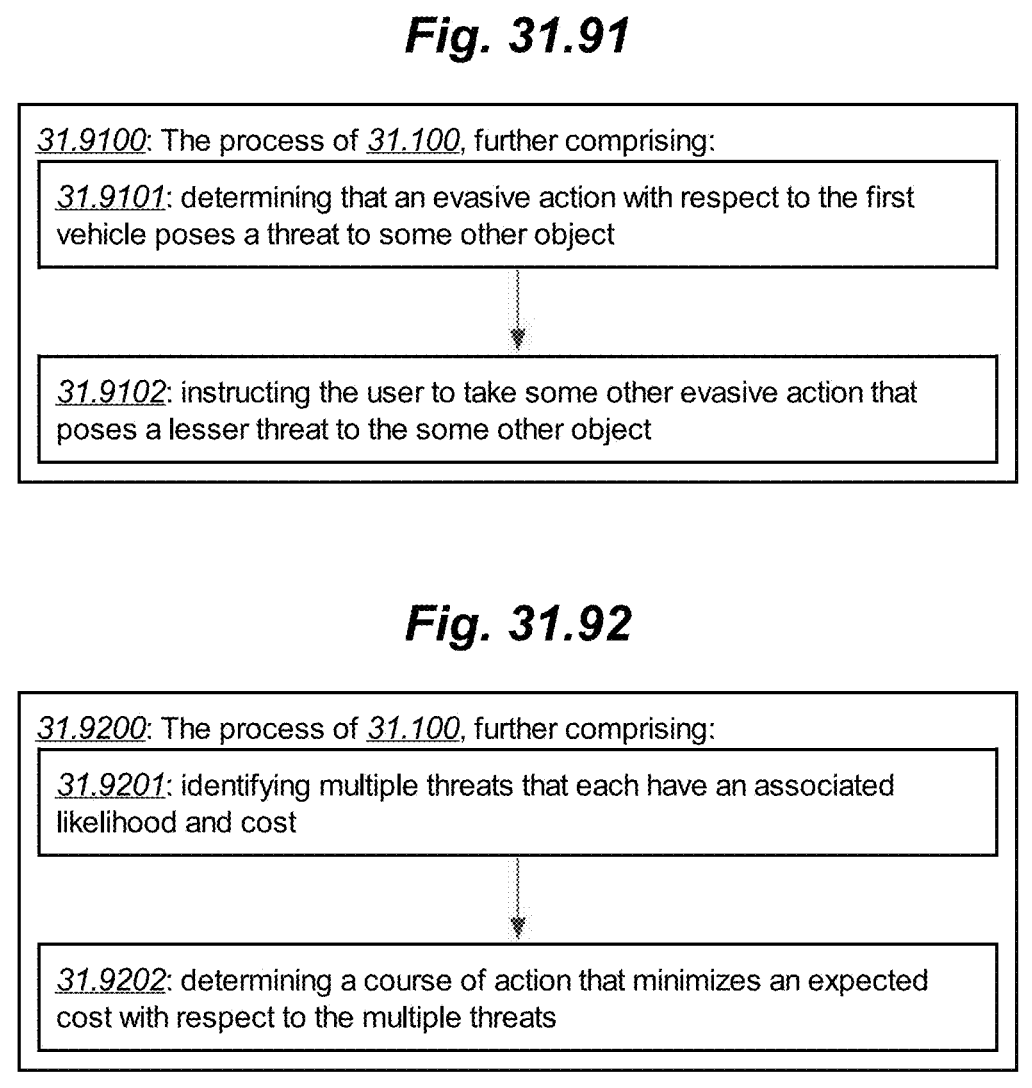

31.9100: The process of 31.100, further comprising:

31.9101: determining that an evasive action with respect to the first vehicle poses a threat to some other object

↓

31.9102: instructing the user to take some other evasive action that poses a lesser threat to the some other object

Fig. 31.92

31.9200: The process of 31.100, further comprising:

31.9201: identifying multiple threats that each have an associated likelihood and cost

↓

31.9202: determining a course of action that minimizes an expected cost with respect to the multiple threats

*Fig. 31.93*

31.9300: The process of 31.9200, wherein the cost is based on one or more of a cost of damage to a vehicle, a cost of injury or death of a human, a cost of injury or death of an animal, a cost of damage to a structure, a cost of emotional distress, and/or cost to a business or person based on negative publicity associated with an accident

*Fig. 31.94*

31.9400: The process of 31.9200, wherein the identifying multiple threats includes:

31.9401: identifying multiple threats that are each related to different persons or things

*Fig. 31.95*

31.9500: The process of 31.9200, wherein the identifying multiple threats includes:

31.9501: identifying multiple threats that are each related to the user

*Fig. 31.96*

31.9600: The process of 31.9200, wherein the determining a course of action that minimizes an expected cost includes:

31.9601: minimizing expected costs to the user posed by the multiple threats

*Fig. 31.97*

31.9700: The process of 31.9200, wherein the determining a course of action that minimizes an expected cost includes:

31.9701: minimizing overall expected costs posed by the multiple threats, the overall expected costs being a sum of expected costs borne by the user and other persons/things

*Fig. 31.98*

31.9800: The process of 31.100, wherein the presenting the threat information includes:

31.9801: presenting the threat information via an audio output device of the wearable device

Fig. 31.99

31.9900: The process of 31.100, wherein the presenting the threat information includes:

31.9901: presenting the threat information via a visual display device of the wearable device

Fig. 31.100

31.10000: The process of 31.9900, wherein the presenting the threat information via a visual display device includes:

31.10001: displaying an indicator that instructs the user to look towards the first vehicle

Fig. 31.101

31.10100: The process of 31.9900, wherein the presenting the threat information via a visual display device includes:

31.10101: displaying an indicator that instructs the user to accelerate, decelerate, and/or turn

Fig. 31.102

31.10200: The process of 31.100, wherein the presenting the threat information includes:

31.10201: directing the user to accelerate

Fig. 31.103

31.10300: The process of 31.100, wherein the presenting the threat information includes:

31.10301: directing the user to decelerate

Fig. 31.104

31.10400: The process of 31.100, wherein the presenting the threat information includes:

31.10401: directing the user to turn

Fig. 31.105

31.10500: The process of 31.100, wherein the presenting the threat information includes:

31.10501: directing the user not to turn

*Fig. 31.106*

<u>*31.10600*</u>: The process of <u>*31.100*</u>, further comprising:

<u>*31.10601*</u>: transmitting to the first vehicle a warning based on the threat information

*Fig. 31.107*

<u>*31.10700*</u>: The process of <u>*31.100*</u>, further comprising:

<u>*31.10701*</u>: presenting the threat information via an output device of a vehicle of the user, the output device including a visual display and/or an audio speaker

*Fig. 31.108*

<u>*31.10800*</u>: The process of <u>*31.100*</u>, wherein the wearable device is a helmet worn by the user

*Fig. 31.109*

<u>*31.10900*</u>: The process of <u>*31.100*</u>, wherein the wearable device is goggles worn by the user

Fig. 31.110

_31.11000_: The process of _31.100_, wherein the wearable device is eyeglasses worn by the user

Fig. 31.111

_31.11100_: The process of _31.100_, wherein the presenting the threat information includes:

_31.11101_: presenting the threat information via goggles worn by the user

Fig. 31.112

_31.11200_: The process of _31.100_, wherein the presenting the threat information includes:

_31.11201_: presenting the threat information via a helmet worn by the user

Fig. 31.113

_31.11300_: The process of _31.100_, wherein the presenting the threat information includes:

_31.11301_: presenting the threat information via a hat worn by the user

Fig. 31.114

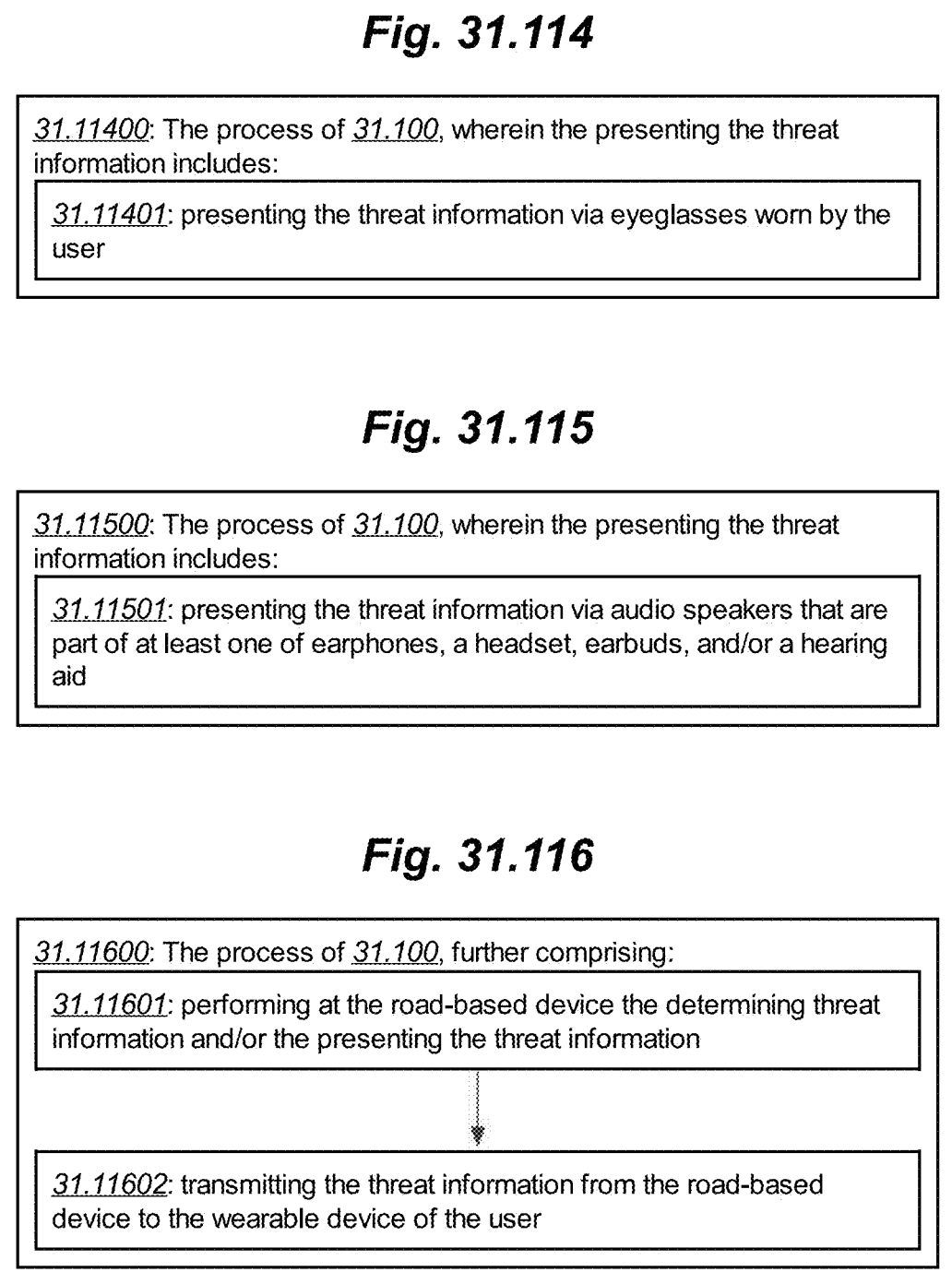

31.11400: The process of 31.100, wherein the presenting the threat information includes:

31.11401: presenting the threat information via eyeglasses worn by the user

Fig. 31.115

31.11500: The process of 31.100, wherein the presenting the threat information includes:

31.11501: presenting the threat information via audio speakers that are part of at least one of earphones, a headset, earbuds, and/or a hearing aid

Fig. 31.116

31.11600: The process of 31.100, further comprising:

31.11601: performing at the road-based device the determining threat information and/or the presenting the threat information

↓

31.11602: transmitting the threat information from the road-based device to the wearable device of the user

Fig. 31.117

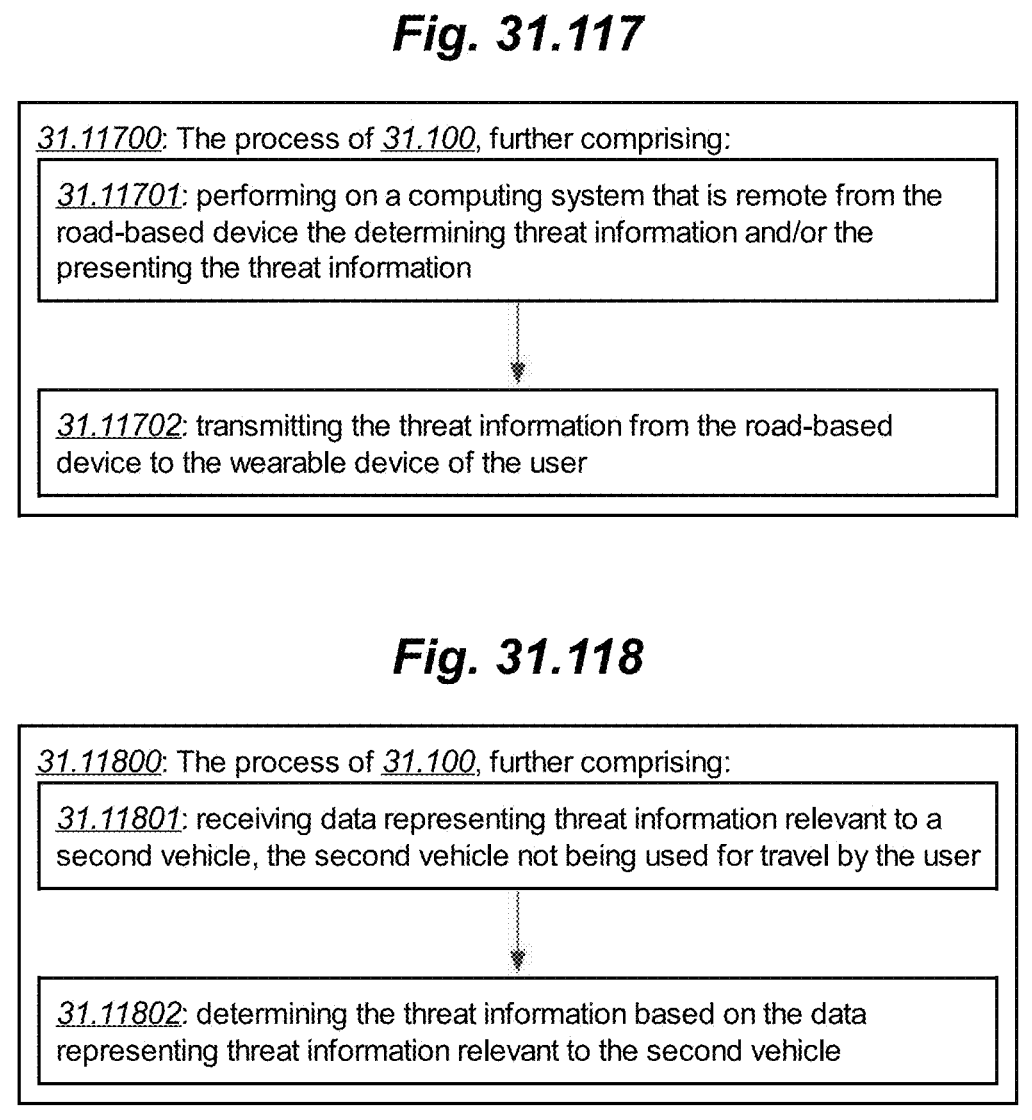

31.11700: The process of 31.100, further comprising:

31.11701: performing on a computing system that is remote from the road-based device the determining threat information and/or the presenting the threat information 31.11702: transmitting the threat information from the road-based device to the wearable device of the user

Fig. 31.118

31.11800: The process of 31.100, further comprising:

31.11801: receiving data representing threat information relevant to a second vehicle, the second vehicle not being used for travel by the user 31.11802: determining the threat information based on the data representing threat information relevant to the second vehicle

Fig. 31.119

31.11900: The process of 31.11800, wherein the receiving data representing threat information relevant to a second vehicle includes:

31.11901: receiving from the second vehicle an indication of stalled or slow traffic encountered by the second vehicle

Fig. 31.120

31.12000: The process of 31.11800, wherein the receiving data representing threat information relevant to a second vehicle includes:

31.12001: receiving from the second vehicle an indication of poor driving conditions experienced by the second vehicle

Fig. 31.121

31.12100: The process of 31.11800, wherein the receiving data representing threat information relevant to a second vehicle includes:

31.12101: receiving from the second vehicle an indication that the first vehicle is driving erratically

Fig. 31.122

31.12200: The process of 31.11800, wherein the receiving data representing threat information relevant to a second vehicle includes:

31.12201: receiving from the second vehicle an image of the first vehicle

Fig. 31.123

31.12300: The process of 31.100, further comprising:

31.12301: transmitting the threat information to a second vehicle

Fig. 31.124

31.12400: The process of 31.12300, wherein the transmitting the threat information to a second vehicle includes:

31.12401: transmitting the threat information to an intermediary server system for distribution to other vehicles in proximity to the user

Fig. 31.125

31.12500: The process of 31.100, further comprising:

31.12501: transmitting the threat information to a second road-based device situated along a projected course of travel of the first vehicle

*Fig. 31.126*

*31.12600*: The process of *31.12500*, further comprising:

*31.12601*: causing the second road-based device to warn drivers that the first vehicle is driving erratically

*Fig. 31.127*

*31.12700*: The process of *31.12500*, further comprising:

*31.12701*: causing the second road-based device to control a traffic control signal to inhibit a collision involving the first vehicle

*Fig. 31.128*

*31.12800*: The process of *31.100*, further comprising:

*31.12801*: transmitting the threat information to a law enforcement entity

*Fig. 31.129*
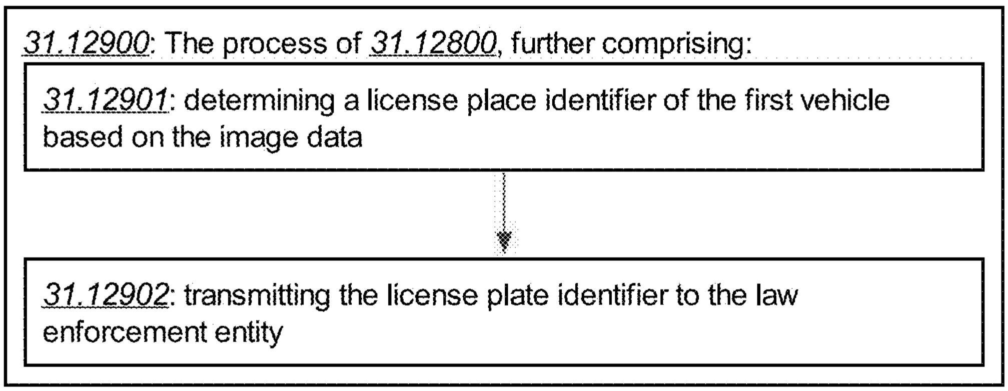
*Fig. 31.130*
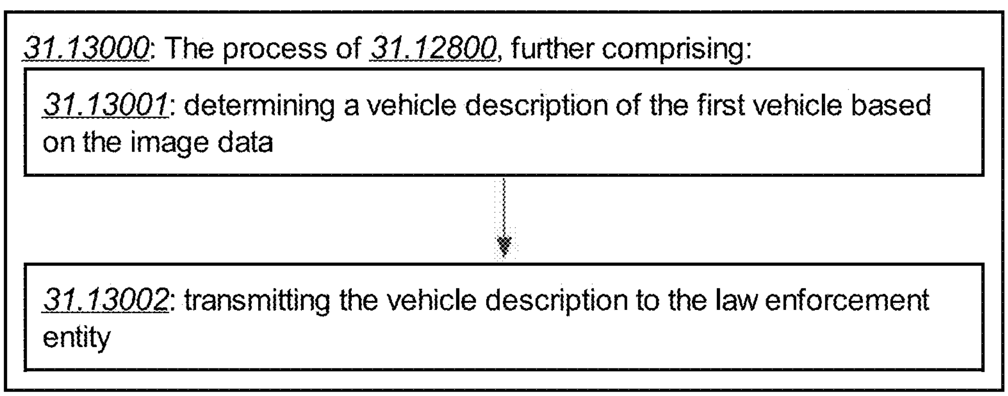

Fig. 31.131
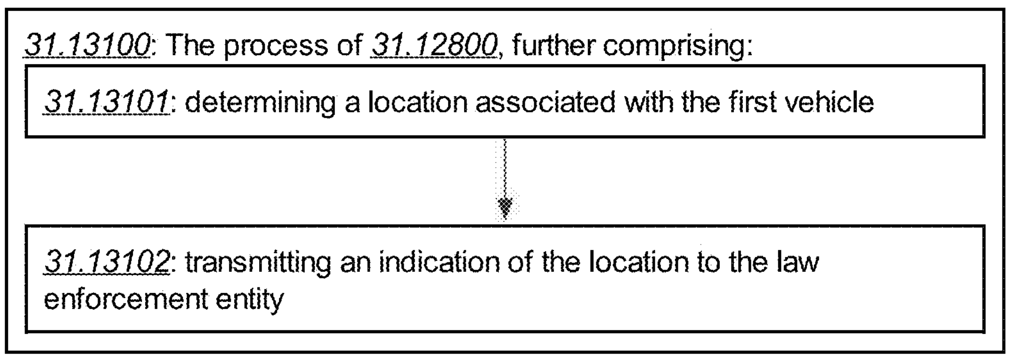
Fig. 31.132
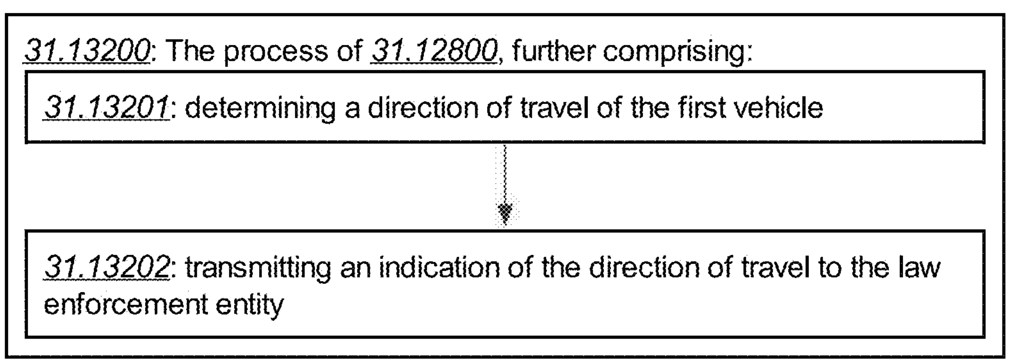

Fig. 35.1

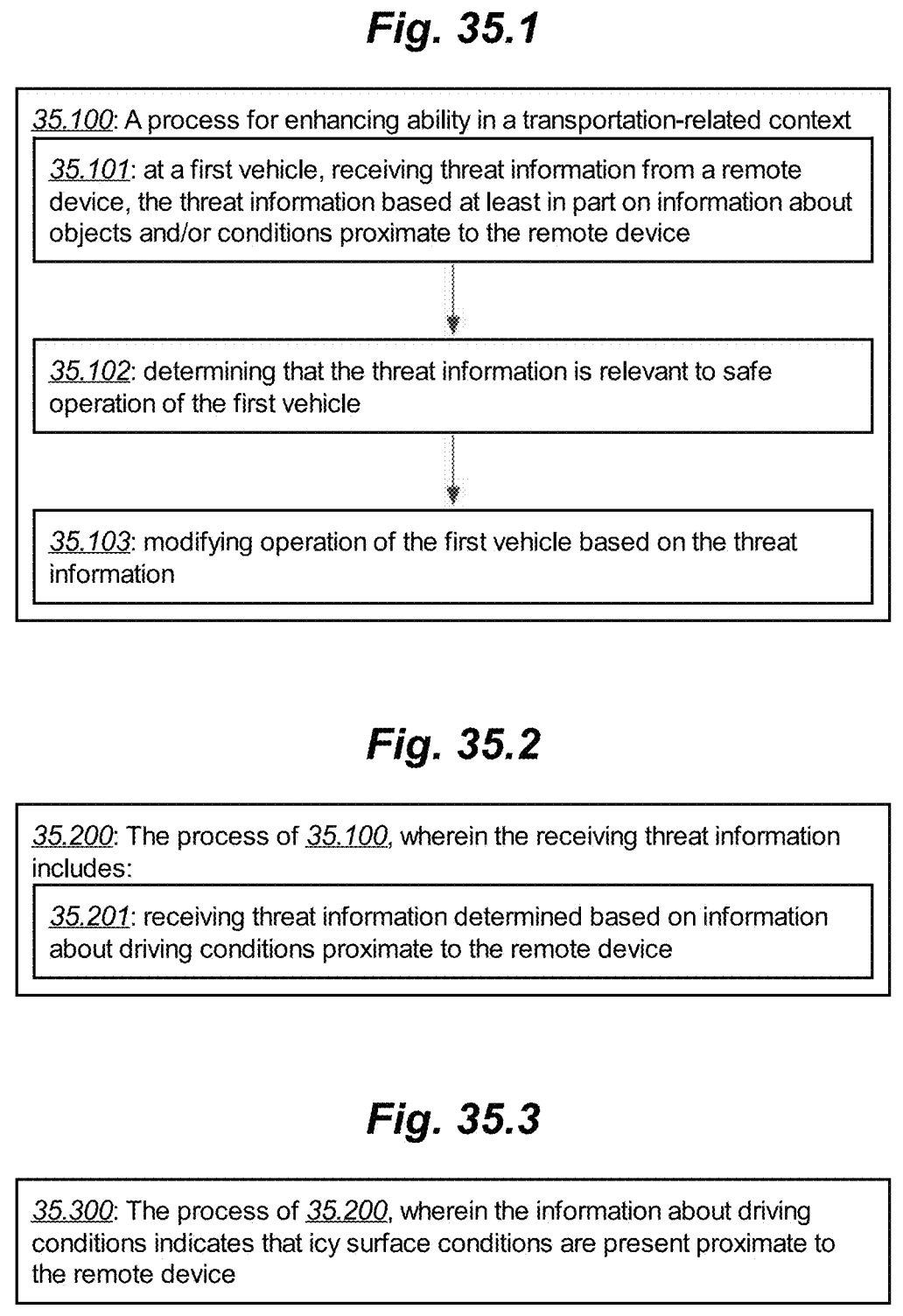

35.100: A process for enhancing ability in a transportation-related context 35.101: at a first vehicle, receiving threat information from a remote device, the threat information based at least in part on information about objects and/or conditions proximate to the remote device

↓

35.102: determining that the threat information is relevant to safe operation of the first vehicle

↓

35.103: modifying operation of the first vehicle based on the threat information

Fig. 35.2

35.200: The process of 35.100, wherein the receiving threat information includes:

35.201: receiving threat information determined based on information about driving conditions proximate to the remote device

Fig. 35.3

35.300: The process of 35.200, wherein the information about driving conditions indicates that icy surface conditions are present proximate to the remote device

*Fig. 35.4*

*35.400*: The process of *35.200*, wherein the information about driving conditions indicates that wet surface conditions are present proximate to the remote device

*Fig. 35.5*

*35.500*: The process of *35.200*, wherein the information about driving conditions indicates that oily surface conditions are present proximate to the remote device

*Fig. 35.6*

*35.600*: The process of *35.200*, wherein the information about driving conditions indicates that a limited visibility condition is present proximate to the remote device

*Fig. 35.7*

*35.700*: The process of *35.200*, wherein the information about driving conditions indicates that there is an accident proximate to the remote device

*Fig. 35.8*

35.800: The process of 35.100, wherein the receiving threat information includes:

35.801: receiving threat information determined based on information about a second vehicle proximate to the remote device

*Fig. 35.9*

35.900: The process of 35.800, wherein the information about a second vehicle indicates that the second vehicle is driving erratically

*Fig. 35.10*

35.1000: The process of 35.800, wherein the information about a second vehicle indicates that the second vehicle is driving with excessive speed

*Fig. 35.11*

35.1100: The process of 35.800, wherein the information about a second vehicle indicates that the second vehicle is driving too slowly

*Fig. 35.12*

*35.1200*: The process of *35.100*, wherein the receiving threat information includes:

*35.1201*: receiving threat information determined based on information about a pedestrian proximate to the remote device

*Fig. 35.13*

*35.1300*: The process of *35.1200*, wherein the information about a pedestrian indicates that a pedestrian is present in a roadway proximate to the remote device

*Fig. 35.14*

*35.1400*: The process of *35.100*, wherein the receiving threat information includes:

*35.1401*: receiving threat information determined based on information about an object in a roadway proximate to the remote device

Fig. 35.15

35.1500: The process of 35.100, wherein the receiving threat information includes:

35.1501: receiving threat information determined at a second vehicle with respect to information about objects and/or conditions received at the second vehicle

Fig. 35.16

35.1600: The process of 35.1500, wherein the receiving threat information determined at a second vehicle includes:

35.1601: receiving threat information determined by a wearable device of an occupant of the second vehicle

Fig. 35.17

35.1700: The process of 35.1500, wherein the receiving threat information determined at a second vehicle includes:

35.1701: receiving threat information determined by a computing device installed in the second vehicle

Fig. 35.18

35.1800: The process of 35.1500, wherein the receiving threat information determined at a second vehicle includes:

35.1801: receiving motion-related information from a sensor attached to the second vehicle

Fig. 35.19

35.1900: The process of 35.1800, wherein the receiving motion-related information includes:

35.1901: receiving position information from a position sensor of the second vehicle

Fig. 35.20

35.2000: The process of 35.1800, wherein the receiving motion-related information includes:

35.2001: receiving velocity information from a velocity sensor of the second vehicle

Fig. 35.21

35.2100: The process of 35.100, wherein the receiving threat information includes:

35.2101: receiving threat information determined by a road-based device with respect to information about objects and/or conditions received at the road-based device

Fig. 35.22

35.2200: The process of 35.2100, wherein the receiving threat information determined by a road-based device includes:

35.2201: receiving threat information determined by a road-based computing device configured to receive the information about objects and/or conditions from vehicles proximate to the road-based computing device

Fig. 35.23

35.2300: The process of 35.2100, wherein the receiving threat information determined by a road-based device includes:

35.2301: receiving threat information determined by a road-based computing device configured to receive the information about objects and/or conditions from road-based sensors

Fig. 35.24

35.2400: The process of 35.2100, wherein the road-based device is a sensor attached to a structure proximate to the first vehicle

Fig. 35.25

35.2500: The process of 35.2400, wherein the structure proximate to the first vehicle is one of a utility pole, a traffic control signal support, a building, a street light, a tunnel wall, a bridge, an overpass, a flyover, a communication tower, a traffic kiosk, an advertisement structure, a roadside sign, an information/regulatory display, and/or a vehicle toll reader

Fig. 35.26

35.2600: The process of 35.2400, wherein the receiving threat information determined by a road-based device includes:

35.2601: receiving an image of a second vehicle from a camera deployed at an intersection

Fig. 35.27

35.2700: The process of 35.2400, wherein the receiving threat information determined by a road-based device includes:

35.2701: receiving ranging data from a range sensor deployed at an intersection, the ranging data representing a distance between a second vehicle and the intersection

Fig. 35.28

35.2800: The process of 35.2400, wherein the road-based device includes a camera

Fig. 35.29

35.2900: The process of 35.2400, wherein the road-based device includes a microphone

Fig. 35.30

35.3000: The process of 35.2400, wherein the road-based device includes a radar gun

Fig. 35.31

35.3100: The process of 35.2400, wherein the road-based device includes a range sensor

Fig. 35.32

35.3200: The process of 35.2400, wherein the road-based device includes a receiver operable to receive motion-related information transmitted from a second vehicle, the motion-related information including at least one of a position of the second vehicle, a velocity of the second vehicle, and/or a trajectory of the second vehicle

Fig. 35.33

35.3300: The process of 35.2100, wherein the road-based device is embedded in a roadway

Fig. 35.34

35.3400: The process of 35.3300, wherein the road-based device includes an induction loop embedded in the roadway, the induction loop configured to detect the presence and/or velocity of a second vehicle

Fig. 35.35

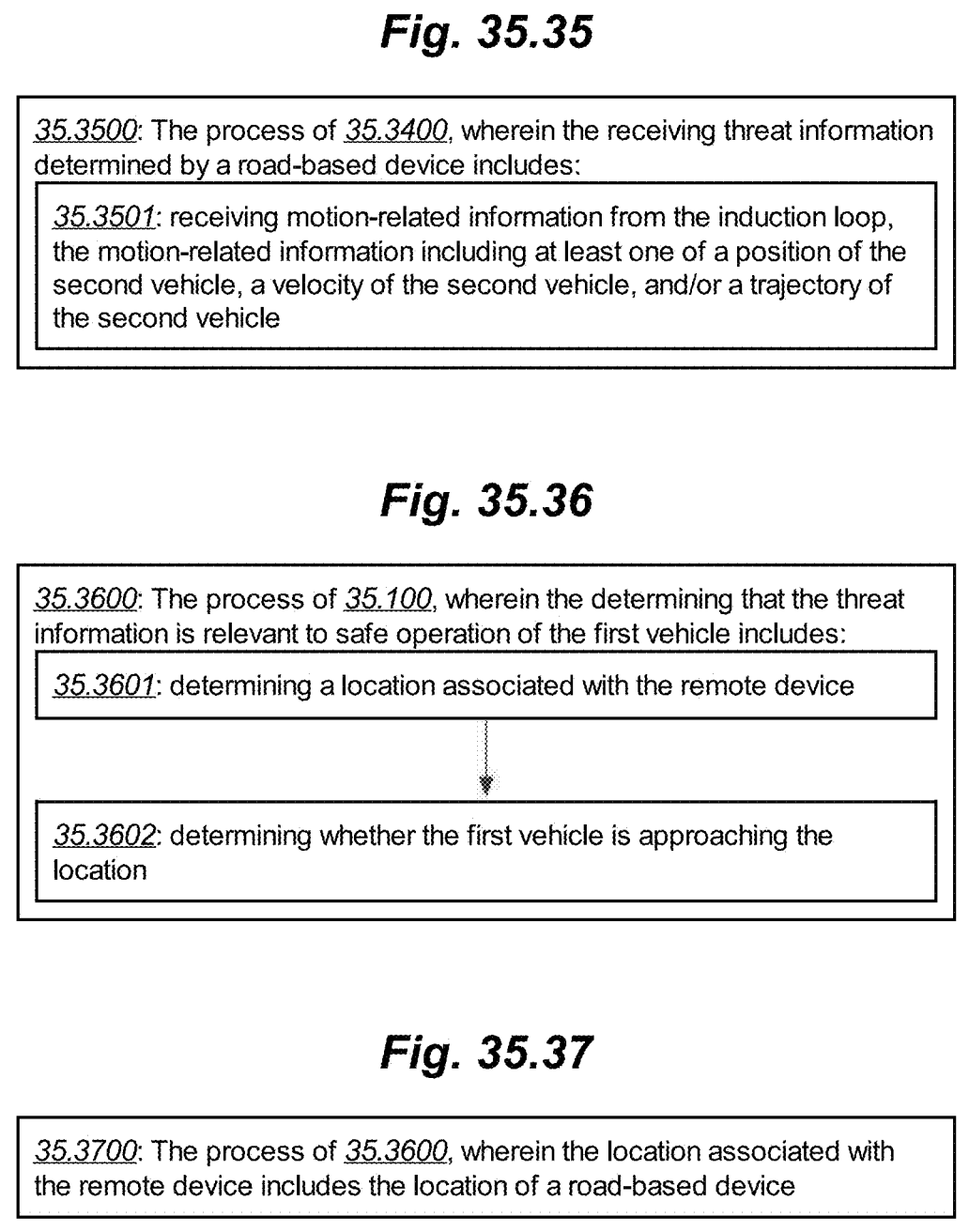

35.3500: The process of 35.3400, wherein the receiving threat information determined by a road-based device includes:

35.3501: receiving motion-related information from the induction loop, the motion-related information including at least one of a position of the second vehicle, a velocity of the second vehicle, and/or a trajectory of the second vehicle

Fig. 35.36

35.3600: The process of 35.100, wherein the determining that the threat information is relevant to safe operation of the first vehicle includes:

35.3601: determining a location associated with the remote device 35.3602: determining whether the first vehicle is approaching the location

Fig. 35.37

35.3700: The process of 35.3600, wherein the location associated with the remote device includes the location of a road-based device

Fig. 35.38

35.3800: The process of 35.3600, wherein the location associated with the remote device includes a location of a second vehicle that includes the remote device

Fig. 35.39

35.3900: The process of 35.3600, wherein the determining whether the first vehicle is approaching the location includes:

35.3901: determining whether the first vehicle is within a threshold distance from the location associated with the remote device

Fig. 35.40

35.4000: The process of 35.3600, wherein the determining whether the first vehicle is approaching the location includes:

35.4001: determining whether the first vehicle is moving on trajectory that intersects the location associated with the remote device

*Fig. 35.41*

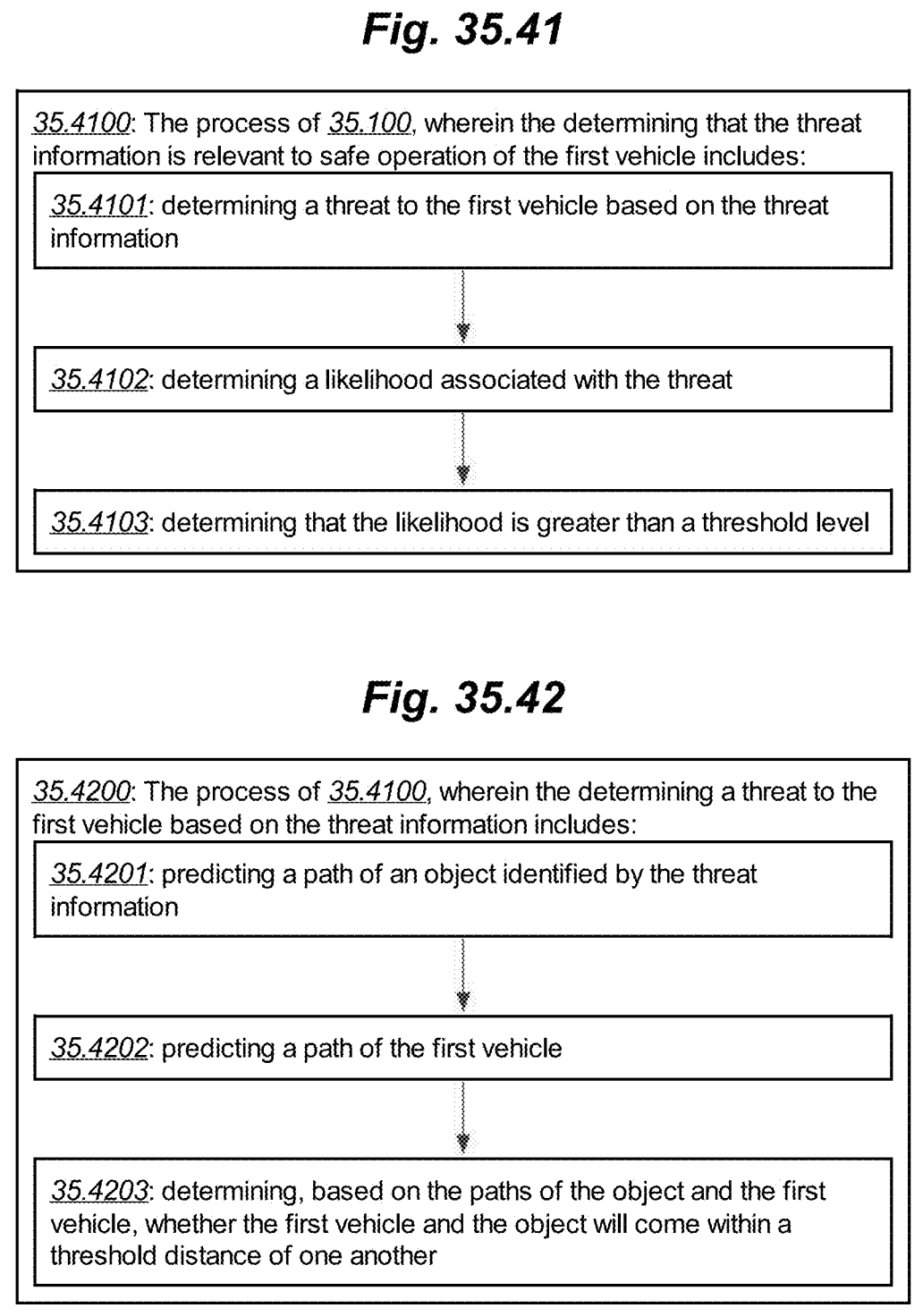

*35.4100*: The process of *35.100*, wherein the determining that the threat information is relevant to safe operation of the first vehicle includes:

*35.4101*: determining a threat to the first vehicle based on the threat information

↓

*35.4102*: determining a likelihood associated with the threat

↓

*35.4103*: determining that the likelihood is greater than a threshold level

*Fig. 35.42*

*35.4200*: The process of *35.4100*, wherein the determining a threat to the first vehicle based on the threat information includes:

*35.4201*: predicting a path of an object identified by the threat information

↓

*35.4202*: predicting a path of the first vehicle

↓

*35.4203*: determining, based on the paths of the object and the first vehicle, whether the first vehicle and the object will come within a threshold distance of one another

*Fig. 35.43*

35.4300: The process of 35.4100, wherein the determining a likelihood associated with the threat includes:

35.4301: determining a likelihood that the first vehicle will collide with a second vehicle identified by the threat information

*Fig. 35.44*

35.4400: The process of 35.4100, wherein the determining a likelihood associated with the threat includes:

35.4401: determining a likelihood that the first vehicle will collide with a pedestrian identified by the threat information

*Fig. 35.45*

35.4500: The process of 35.4100, wherein the determining a likelihood associated with the threat includes:

35.4501: determining a likelihood that the first vehicle will collide with an animal identified by the threat information

Fig. 35.46

35.4600: The process of 35.4100, wherein the determining a likelihood associated with the threat includes:

35.4601: determining a likelihood that surface conditions identified by the threat information will cause an operator to lose control of the first vehicle

Fig. 35.47

35.4700: The process of 35.100, wherein the determining that the threat information is relevant to safe operation of the first vehicle includes:

35.4701: determining that the threat information is relevant based on gaze information associated with an operator of the first vehicle

Fig. 35.48

35.4800: The process of 35.4700, further comprising:

35.4801: determining that the operator has not looked at the road for more than a threshold amount of time

Fig. 35.49

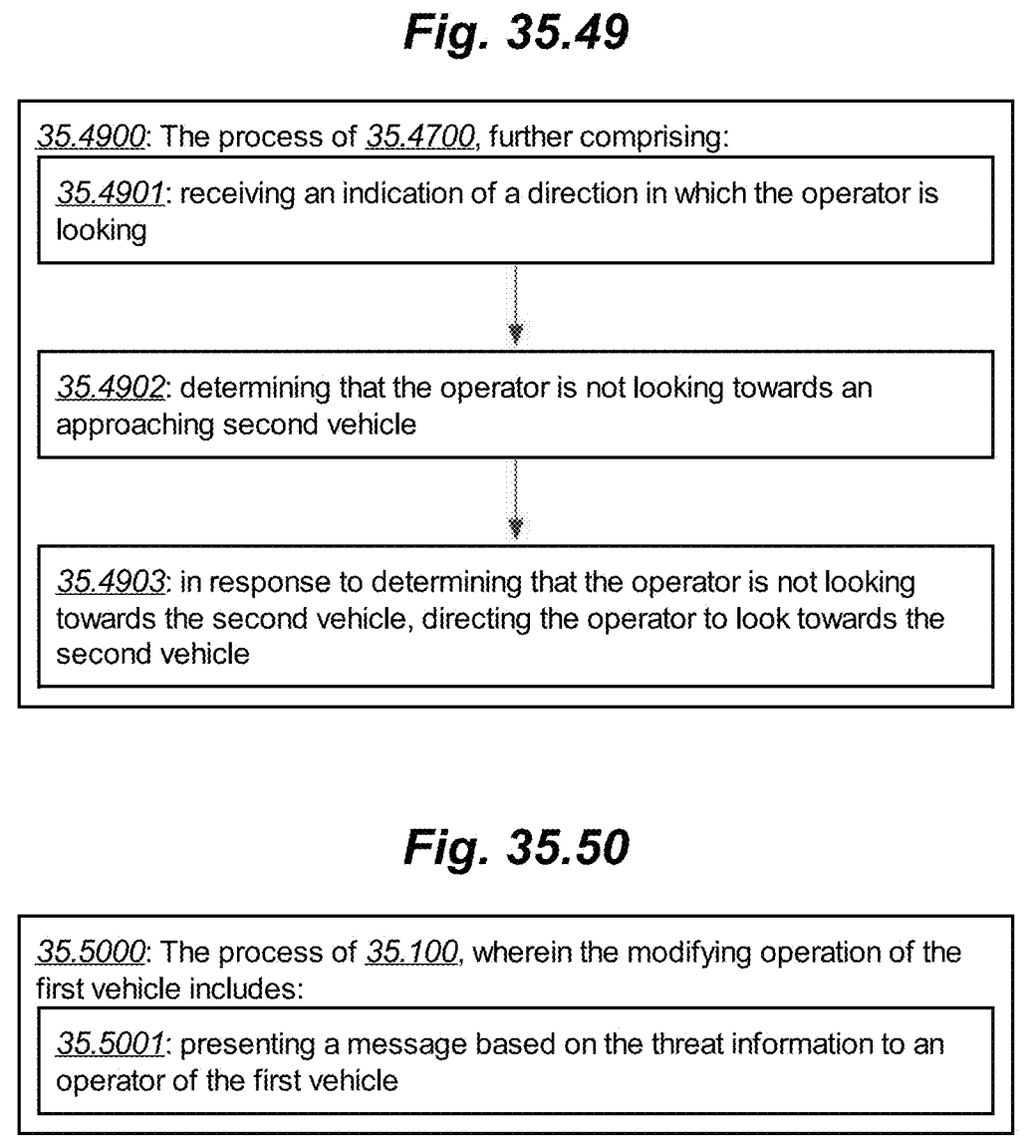

35.4900: The process of 35.4700, further comprising:

35.4901: receiving an indication of a direction in which the operator is looking

↓

35.4902: determining that the operator is not looking towards an approaching second vehicle

↓

35.4903: in response to determining that the operator is not looking towards the second vehicle, directing the operator to look towards the second vehicle

Fig. 35.50

35.5000: The process of 35.100, wherein the modifying operation of the first vehicle includes:

35.5001: presenting a message based on the threat information to an operator of the first vehicle

Fig. 35.51

35.5100: The process of 35.5000, wherein the presenting a message based on the threat information to an operator of the first vehicle includes:

35.5101: presenting a warning to the operator

Fig. 35.52

35.5200: The process of 35.5000, wherein the presenting a message based on the threat information to an operator of the first vehicle includes:

35.5201: presenting an instruction to the operator

Fig. 35.53

35.5300: The process of 35.5000, wherein the presenting a message based on the threat information to an operator of the first vehicle includes:

35.5301: directing the operator to accelerate or decelerate

Fig. 35.54

35.5400: The process of 35.5000, wherein the presenting a message based on the threat information to an operator of the first vehicle includes:

35.5401: directing the operator to turn or not to turn

Fig. 35.55

35.5500: The process of 35.5000, wherein the presenting a message based on the threat information to an operator of the first vehicle includes:

35.5501: presenting the message via an audio output device

Fig. 35.56

35.5600: The process of 35.5500, wherein the audio output device is a speaker of a wearable device of the operator

Fig. 35.57

35.5700: The process of 35.5500, wherein the audio output device is a speaker of an audio system of the first vehicle

Fig. 35.58

35.5800: The process of 35.5500, wherein the audio output device is a speaker of a mobile computing device present within the first vehicle

Fig. 35.59

35.5900: The process of 35.5000, wherein the presenting a message based on the threat information to an operator of the first vehicle includes:

35.5901: presenting the message via a visual display device

Fig. 35.60

35.6000: The process of 35.5900, wherein the visual display device is a display of a wearable device of the operator

Fig. 35.61

35.6100: The process of 35.5900, wherein the visual display device is a display of the first vehicle

Fig. 35.62

35.6200: The process of 35.5900, wherein the presenting a message based on the threat information to an operator of the first vehicle includes:

35.6201: displaying an indicator that instructs the operator to look towards an oncoming vehicle identified by the threat information

Fig. 35.63

35.6300: The process of 35.5900, wherein the presenting a message based on the threat information to an operator of the first vehicle includes:

35.6301: displaying an indicator that instructs the operator to accelerate, decelerate, and/or turn

Fig. 35.64

35.6400: The process of 35.5000, wherein the presenting a message based on the threat information to an operator of the first vehicle includes:

35.6401: providing tactile feedback to the user

Fig. 35.65

35.6500: The process of 35.6400, wherein the providing tactile feedback to the user includes:

35.6501: causing a steering device, seat, and/or pedal of the first vehicle to vibrate

Fig. 35.66

35.6600: The process of 35.100, wherein the modifying operation of the first vehicle includes:

35.6601: controlling the first vehicle

Fig. 35.67

35.6700: The process of 35.6600, wherein the controlling the first vehicle includes:

35.6701: decreasing speed of the first vehicle by applying brakes of the first vehicle and/or by reducing output of an engine of the first vehicle

Fig. 35.68

35.6800: The process of 35.6600, wherein the controlling the first vehicle includes:

35.6801: increasing speed of the first vehicle by releasing brakes of the first vehicle and/or by increasing output of an engine of the first vehicle

Fig. 35.69

*35.6900*: The process of *35.6600*, wherein the controlling the first vehicle includes:

*35.6901*: changing direction of the first vehicle

Fig. 35.70

*35.7000*: The process of *35.100*, wherein the receiving threat information includes:

*35.7001*: receiving threat information determined based on image data

Fig. 35.71

*35.7100*: The process of *35.7000*, wherein the receiving threat information determined based on image data includes:

*35.7101*: receiving threat information determined based on image data received from a camera that is attached to at least one of: a road-side structure, a wearable device of a pedestrian, or a second vehicle

Fig. 35.72

35.7200: The process of 35.7000, wherein the receiving threat information determined based on image data includes:

35.7201: receiving threat information determined based on image data that includes multiple images of a second vehicle taken at different times

Fig. 35.73

35.7300: The process of 35.7000, wherein the receiving threat information determined based on image data includes:

35.7301: receiving threat information that includes motion-related information about a second vehicle based on one or more images of the second vehicle, the motion-related information including at least one of a position, velocity, acceleration, and/or mass of the second vehicle

Fig. 35.74

35.7400: The process of 35.7000, wherein the receiving threat information determined based on image data includes:

35.7401: receiving threat information that identifies objects other than vehicles in the image data

Fig. 35.75

35.7500: The process of 35.7000, wherein the receiving threat information determined based on image data includes:

35.7501: receiving threat information that includes driving conditions information based on the image data

Fig. 35.76

35.7600: The process of 35.100, wherein the receiving threat information includes:

35.7601: receiving threat information determined based on audio data representing an audio signal emitted or reflected by an object

Fig. 35.77

35.7700: The process of 35.7600, wherein the receiving threat information determined based on audio data includes:

35.7701: receiving threat information determined based on audio data obtained at a microphone array that includes multiple microphones

Fig. 35.78

35.7800: The process of 35.7700, wherein the receiving threat information determined based on audio data obtained at a microphone array includes:

35.7801: receiving threat information determined based on audio data obtained at a microphone array, the microphone array coupled to a road-side structure

Fig. 35.79

35.7900: The process of 35.7600, wherein the receiving threat information determined based on audio data includes:

35.7901: receiving threat information determined based on acoustic source localization performed to determine a position of the object based on multiple audio signals received via multiple microphones

*Fig. 35.80*

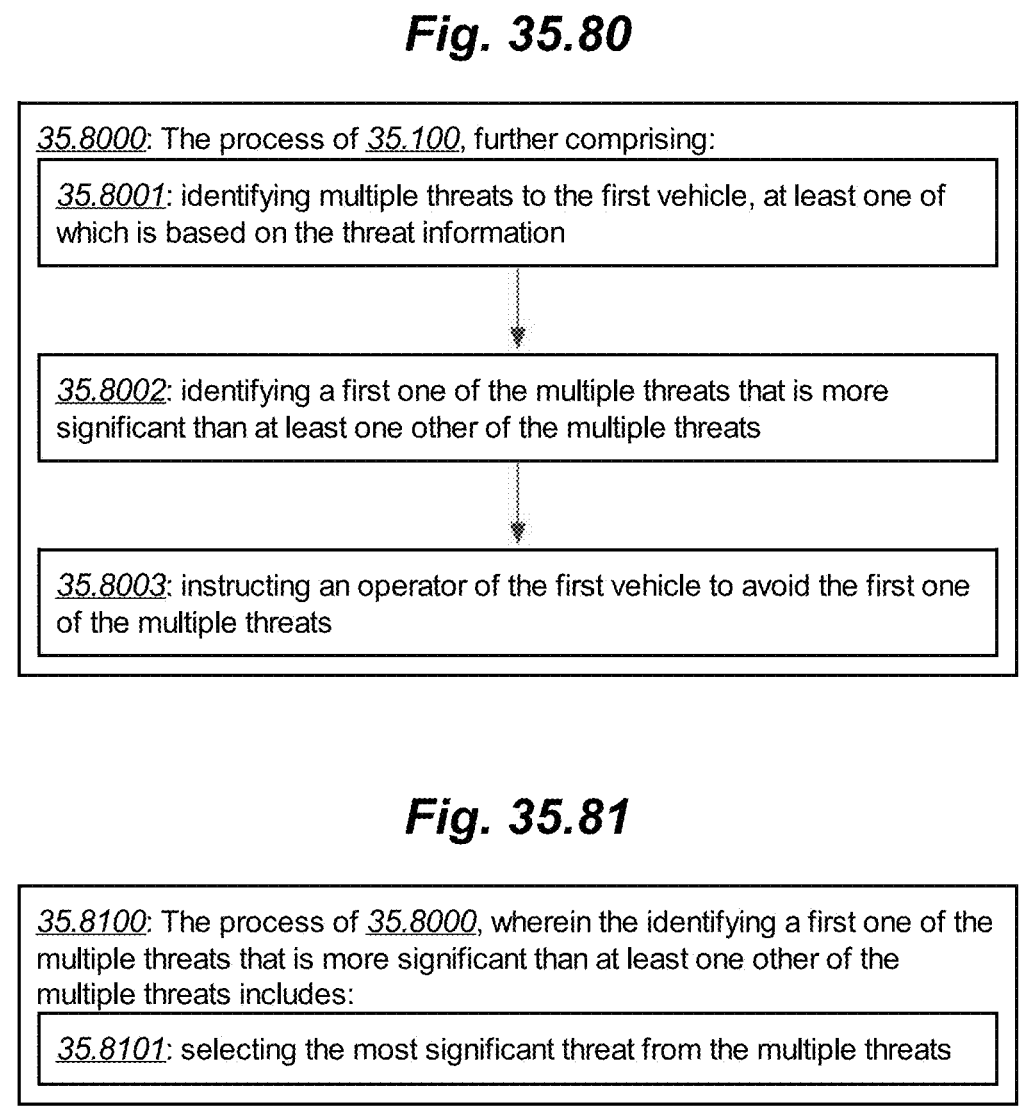

*35.8000*: The process of *35.100*, further comprising:

*35.8001*: identifying multiple threats to the first vehicle, at least one of which is based on the threat information

↓

*35.8002*: identifying a first one of the multiple threats that is more significant than at least one other of the multiple threats

↓

*35.8003*: instructing an operator of the first vehicle to avoid the first one of the multiple threats

*Fig. 35.81*

*35.8100*: The process of *35.8000*, wherein the identifying a first one of the multiple threats that is more significant than at least one other of the multiple threats includes:

*35.8101*: selecting the most significant threat from the multiple threats

*Fig. 35.82*

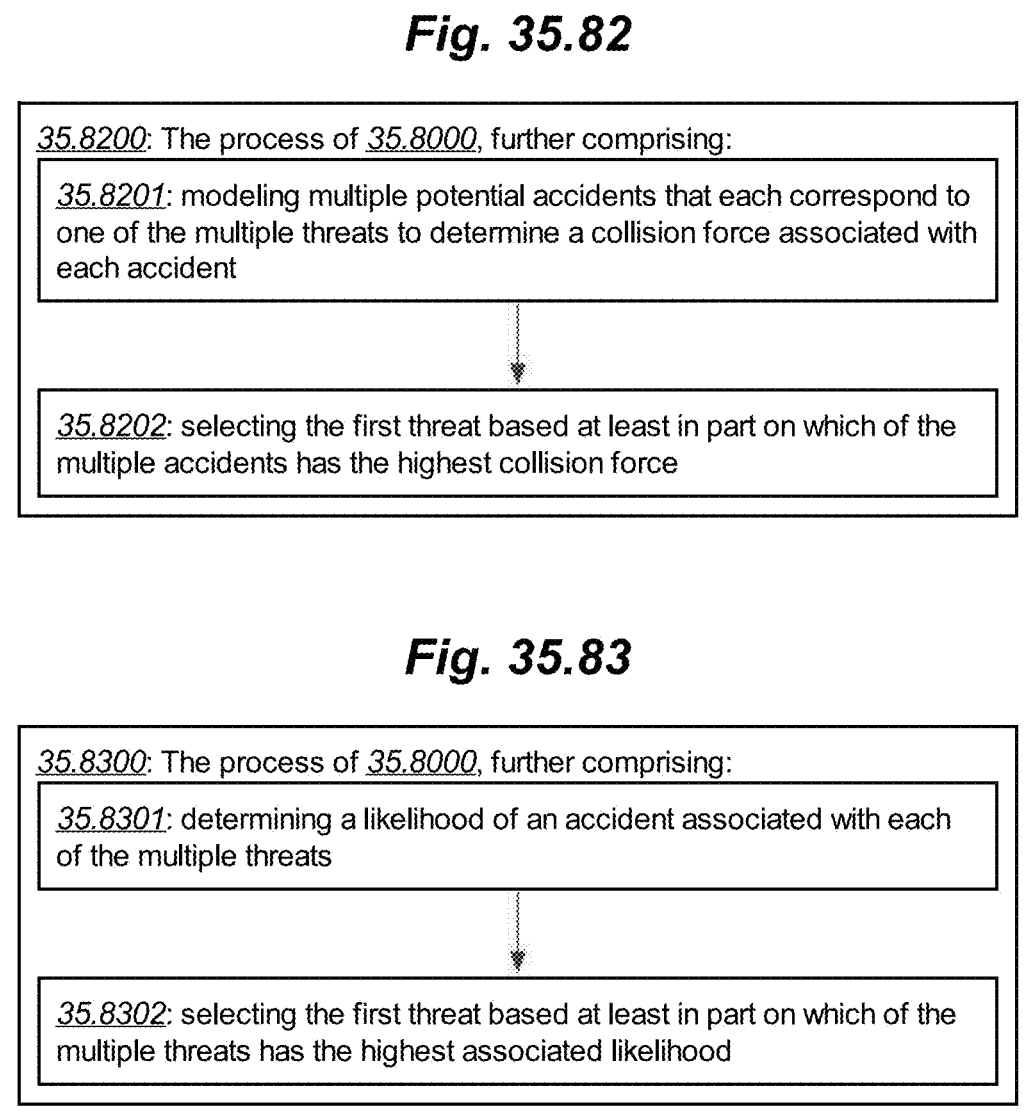

35.8200: The process of 35.8000, further comprising:

35.8201: modeling multiple potential accidents that each correspond to one of the multiple threats to determine a collision force associated with each accident

↓

35.8202: selecting the first threat based at least in part on which of the multiple accidents has the highest collision force

*Fig. 35.83*

35.8300: The process of 35.8000, further comprising:

35.8301: determining a likelihood of an accident associated with each of the multiple threats

↓

35.8302: selecting the first threat based at least in part on which of the multiple threats has the highest associated likelihood

*Fig. 35.84*

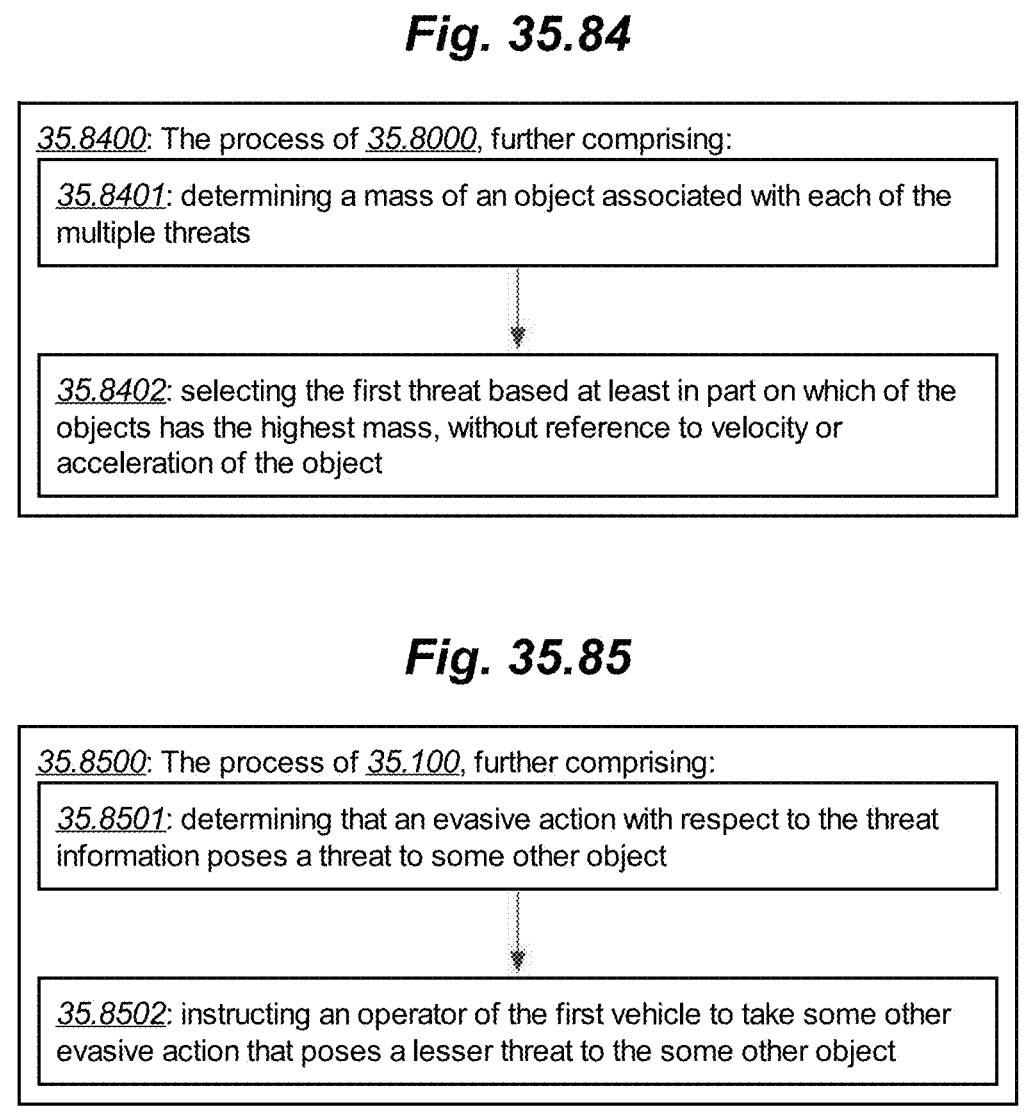

*35.8400*: The process of *35.8000*, further comprising:

*35.8401*: determining a mass of an object associated with each of the multiple threats

↓

*35.8402*: selecting the first threat based at least in part on which of the objects has the highest mass, without reference to velocity or acceleration of the object

*Fig. 35.85*

*35.8500*: The process of *35.100*, further comprising:

*35.8501*: determining that an evasive action with respect to the threat information poses a threat to some other object

↓

*35.8502*: instructing an operator of the first vehicle to take some other evasive action that poses a lesser threat to the some other object

*Fig. 35.86*

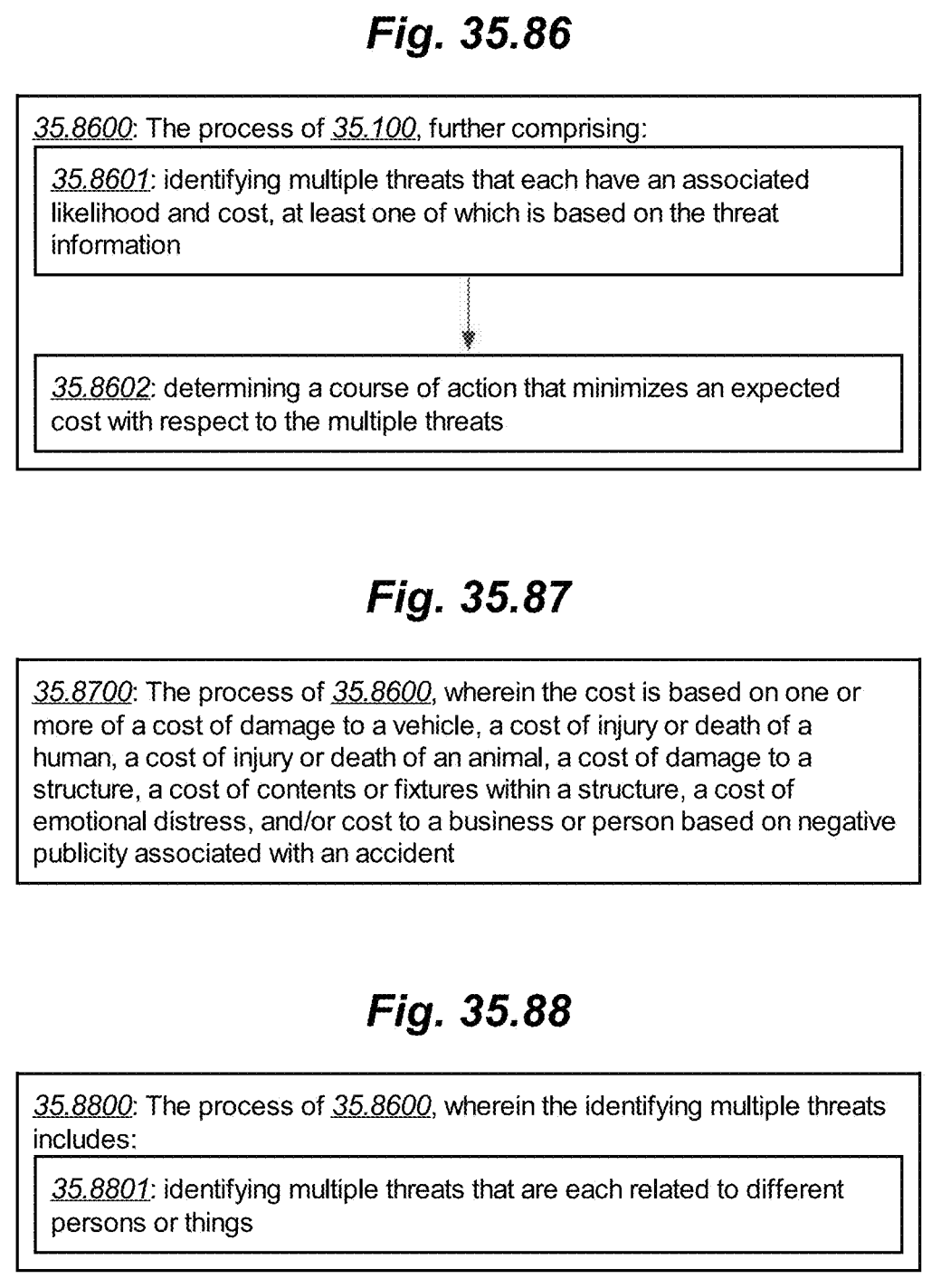

35.8600: The process of 35.100, further comprising:

35.8601: identifying multiple threats that each have an associated likelihood and cost, at least one of which is based on the threat information

↓

35.8602: determining a course of action that minimizes an expected cost with respect to the multiple threats

*Fig. 35.87*

35.8700: The process of 35.8600, wherein the cost is based on one or more of a cost of damage to a vehicle, a cost of injury or death of a human, a cost of injury or death of an animal, a cost of damage to a structure, a cost of contents or fixtures within a structure, a cost of emotional distress, and/or cost to a business or person based on negative publicity associated with an accident

*Fig. 35.88*

35.8800: The process of 35.8600, wherein the identifying multiple threats includes:

35.8801: identifying multiple threats that are each related to different persons or things

Fig. 35.89

35.8900: The process of 35.8600, wherein the identifying multiple threats includes:

35.8901: identifying multiple threats that are each related to the first vehicle and/or an operator thereof

Fig. 35.90

35.9000: The process of 35.8600, wherein the determining a course of action that minimizes an expected cost includes:

35.9001: minimizing expected costs to the operator of the first vehicle posed by the multiple threats

Fig. 35.91

35.9100: The process of 35.8600, wherein the determining a course of action that minimizes an expected cost includes:

35.9101: minimizing overall expected costs posed by the multiple threats, the overall expected costs being a sum of expected costs borne by an operator of the first vehicle and other persons/things

*Fig. 35.92*

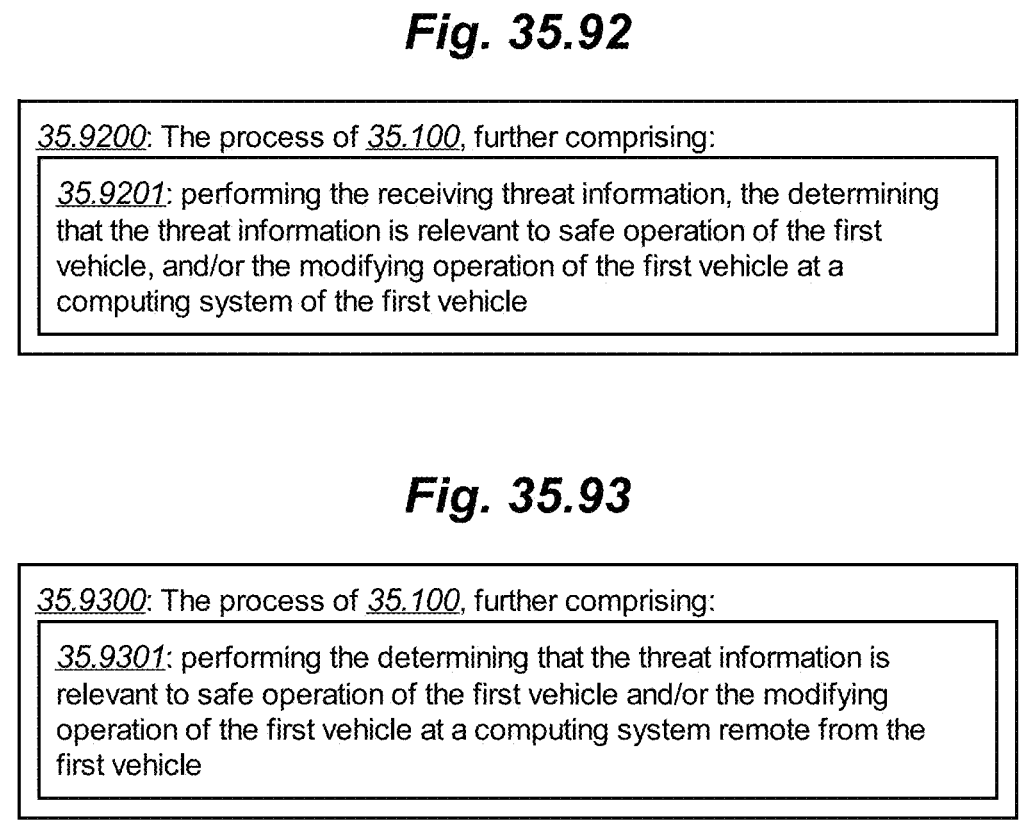

35.9200: The process of 35.100, further comprising:

35.9201: performing the receiving threat information, the determining that the threat information is relevant to safe operation of the first vehicle, and/or the modifying operation of the first vehicle at a computing system of the first vehicle

*Fig. 35.93*

35.9300: The process of 35.100, further comprising:

35.9301: performing the determining that the threat information is relevant to safe operation of the first vehicle and/or the modifying operation of the first vehicle at a computing system remote from the first vehicle

ABILITY ENHANCEMENT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part and is entitled to the filing date of U.S. patent application Ser. No. 13/434,475, entitled PRESENTATION OF SHARED THREAT INFORMATION IN A TRANSPORTATION-RELATED CONTEXT, filed 29 Mar. 2012, which is incorporated herein by reference in its entirety.

For purposes of the USPTO extra-statutory requirements, U.S. patent application Ser. No. 13/434,475 constitutes a continuation-in-part and is entitled to the filing date of U.S. patent application Ser. No. 13/309,248, entitled AUDIBLE ASSISTANCE, filed 1 Dec. 2011, which is incorporated herein by reference in its entirety.

For purposes of the USPTO extra-statutory requirements, U.S. patent application Ser. No. 13/434,475 constitutes a continuation-in-part and is entitled to the filing date of U.S. patent application Ser. No. 13/324,232, entitled VISUAL PRESENTATION OF SPEAKER-RELATED INFORMATION, filed 13 Dec. 2011, which is incorporated herein by reference in its entirety.

For purposes of the USPTO extra-statutory requirements, U.S. patent application Ser. No. 13/434,475 constitutes a continuation-in-part and is entitled to the filing date of U.S. patent application Ser. No. 13/340,143, entitled LANGUAGE TRANSLATION BASED ON SPEAKER-RELATED INFORMATION, filed 29 Dec. 2011, which is incorporated herein by reference in its entirety.

For purposes of the USPTO extra-statutory requirements, U.S. patent application Ser. No. 13/434,475 constitutes a continuation-in-part and is entitled to the filing date of U.S. patent application Ser. No. 13/356,419, entitled ENHANCED VOICE CONFERENCING, filed 23 Jan. 2012, which is incorporated herein by reference in its entirety.

For purposes of the USPTO extra-statutory requirements, U.S. patent application Ser. No. 13/434,475 constitutes a continuation-in-part and is entitled to the filing date of U.S. patent application Ser. No. 13/362,823, entitled VEHICULAR THREAT DETECTION BASED ON AUDIO SIGNALS, filed 31 Jan. 2012, which is incorporated herein by reference in its entirety.

For purposes of the USPTO extra-statutory requirements, U.S. patent application Ser. No. 13/434,475 constitutes a continuation-in-part and is entitled to the filing date of U.S. patent application Ser. No. 13/397,289, entitled ENHANCED VOICE CONFERENCING WITH HISTORY, filed 15 Feb. 2012, which is incorporated herein by reference in its entirety.

For purposes of the USPTO extra-statutory requirements, U.S. patent application Ser. No. 13/434,475 constitutes a continuation-in-part and is entitled to the filing date of U.S. patent application Ser. No. 13/407,570, entitled VEHICULAR THREAT DETECTION BASED ON IMAGE ANALYSIS, filed 28 Feb. 2012, which is incorporated herein by reference in its entirety.

For purposes of the USPTO extra-statutory requirements, U.S. patent application Ser. No. 13/434,475 constitutes a continuation-in-part and is entitled to the filing date of U.S. patent application Ser. No. 13/425,210, entitled DETERMINING THREATS BASED ON INFORMATION FROM ROAD-BASED DEVICES IN A TRANSPORTATION-RELATED CONTEXT, filed 20 Mar. 2012, which is incorporated herein by reference in its entirety.

TECHNICAL FIELD

The present disclosure relates to methods, techniques, and systems for ability enhancement and, more particularly, to methods, techniques, and systems for ability enhancement in a transportation-related context by sharing threat information between devices and/or vehicles present on a roadway or in other assistance related contexts such as to provide speaker related information, language translation, or enhanced voice conferencing.

TABLE OF CONTENTS

| | | |
|---|---|---|
| I. | AUDIBLE ASSISTANCE | 10 |
| | A. Audible Assistance Facilitator System Overview | 11 |
| | B. Example Processes | 17 |
| | C. Example Computing System Implementation | 46 |
| II. | VISUAL PRESENTATION OF SPEAKER-RELATED INFORMATION | 50 |
| | A. Ability Enhancement Facilitator System Overview | 51 |
| | B. Example Processes | 59 |
| | C. Example Computing System Implementation | 85 |
| III. | LANGUAGE TRANSLATION BASED ON SPEAKER-RELATED INFORMATION | 90 |
| | A. Ability Enhancement Facilitator System Overview | 92 |
| | B. Example Processes | 102 |
| | C. Example Computing System Implementation | 131 |
| IV. | ENHANCED VOICE CONFERENCING | 135 |
| | A. Ability Enhancement Facilitator System Overview | 137 |
| | B. Example Processes | 148 |
| | C. Example Computing System Implementation | 189 |

-continued

TABLE OF CONTENTS

| | | |
|---|---|---|
| V. | VEHICULAR THREAT DETECTION BASED ON AUDIO SIGNALS | 194 |
| | A. Ability Enhancement Facilitator System Overview | 196 |
| | B. Example Processes | 205 |
| | C. Example Computing System Implementation | 230 |
| VI. | ENHANCED VOICE CONFERENCING WITH HISTORY | 235 |
| | A. Ability Enhancement Facilitator System Overview | 237 |
| | B. Example Processes | 252 |
| | C. Example Computing System Implementation | 291 |
| VII. | VEHICULAR THREAT DETECTION BASED ON IMAGE ANALYSIS | 295 |
| | A. Ability Enhancement Facilitator System Overview | 298 |
| | B. Example Processes | 310 |
| | C. Example Computing System Implementation | 349 |
| VIII. | DETERMINING THREATS BASED ON INFORMATION FROM ROAD-BASED DEVICES IN A TRANSPORTATION-RELATED CONTEXT | 354 |
| | A. Ability Enhancement Facilitator System Overview | 357 |
| | B. Example Processes | 371 |
| | C. Example Computing System Implementation | 416 |
| IX. | PRESENTATION OF SHARED THREAT INFORMATION IN A TRANSPORTATION-RELATED CONTEXT | 420 |
| | A. Ability Enhancement Facilitator System Overview | 425 |
| | B. Example Processes | 439 |
| | C. Example Computing System Implementation | 471 |

BACKGROUND

Human abilities such as hearing, vision, memory, foreign or native language comprehension, and the like may be limited for various reasons. For example, as people age, various abilities such as hearing, vision, or memory, may decline or otherwise become compromised. In some countries, as the population in general ages, such declines may become more common and widespread. In addition, young people are increasingly listening to music through headphones, which may also result in hearing loss at earlier ages.

In addition, limits on human abilities may be exposed by factors other than aging, injury, or overuse. As one example, the world population is faced with an ever increasing amount of information to review, remember, and/or integrate. Managing increasing amounts of information becomes increasingly difficult in the face of limited or declining abilities such as hearing, vision, and memory.

These problems may be further exacerbated and even result in serious health risks in a transportation-related context, as distracted and/or ability impaired drivers are more prone to be involved in accidents. For example, many drivers are increasingly distracted from the task of driving by an onslaught of information from cellular phones, smart phones, media players, navigation systems, and the like. In addition, an aging population in some regions may yield an increasing number or share of drivers who are vision and/or hearing impaired.

As another example, as the world becomes increasingly virtually and physically connected (e.g., due to improved communication and cheaper travel), people are more frequently encountering others who speak different languages. In addition, the communication technologies that support an interconnected, global economy may further expose limited human abilities. For example, it may be difficult for a user to determine who is speaking during a conference call. Even if the user is able to identify the speaker, it may still be difficult for the user to recall or access related information about the speaker and/or topics discussed during the call. Also, it may be difficult for a user to recall all of the events or information discussed during the course of a conference call or other type of conversation.

Current approaches to addressing limits on human abilities may suffer from various drawbacks. For example, there may be a social stigma connected with wearing hearing aids, corrective lenses, or similar devices. In addition, hearing aids typically perform only limited functions, such as amplifying or modulating sounds for a hearer. Furthermore, legal regimes that attempt to prohibit the use of telephones or media devices while driving may not be effective due to enforcement difficulties, declining law enforcement budgets, and the like. Nor do such regimes address a great number of other sources of distraction or impairment, such as other passengers, car radios, blinding sunlight, darkness, or the like.

As another example, current approaches to foreign language translation, such as phrase books or time-intensive language acquisition, are typically inefficient and/or unwieldy. Furthermore, existing communication technologies are not well integrated with one another, making it difficult to access information via a first device that is relevant to a conversation occurring via a second device. Also, manual note taking during the course of a conference call or other conversation may be intrusive, distracting, and/or ineffective. For example, a note-taker may not be able to accurately capture everything that was said and/or meeting notes may not be well integrated with other information sources or items that are related to the subject matter of the conference call.

BRIEF DESCRIPTION OF THE DRAWINGS

FIGS. 3.1-3.78 are example flow diagrams of audible assistance processes performed by example embodiments.

FIGS. 7.1-7.81 are example flow diagrams of ability enhancement processes performed by example embodiments.

FIGS. 11.1-11.80 are example flow diagrams of ability enhancement processes performed by example embodiments.

FIGS. 15.1-15.108 are example flow diagrams of ability enhancement processes performed by example embodiments.

FIGS. 19.1-19.70 are example flow diagrams of ability enhancement processes performed by example embodiments.

FIGS. 23.1-23.94 are example flow diagrams of ability enhancement processes performed by example embodiments.

FIGS. 27.1-27.112 are example flow diagrams of ability enhancement processes performed by example embodiments.

FIGS. 31.1-31.132 are example flow diagrams of ability enhancement processes performed by example embodiments.

FIGS. 35.1-35.93 are example flow diagrams of ability enhancement processes performed by example embodiments.

DETAILED DESCRIPTION

I. Audible Assistance

Embodiments described herein provide enhanced computer- and network-based methods and systems for sensory augmentation and, more particularly, providing audible assistance to a user via a hearing device. Example embodiments provide an Audible Assistance Facilitator System ("AAFS"). The AAFS may augment, enhance, or improve the senses (e.g., hearing) and other faculties (e.g., memory) of a user, such as by assisting a user with the recall of names, events, communications, documents, or other information related to a speaker with whom the user is conversing. For example, when the user engages a speaker in conversation, the AAFS may "listen" to the speaker in order to identify the speaker and/or determine other speaker-related information, such as events or communications relating to the speaker and/or the user. Then, the AAFS may inform the user of the determined information, such as by "speaking" the information into an earpiece or other audio output device. The user can hear the information provided by the AAFS and advantageously use that information to avoid embarrassment (e.g., due to an inability to recall the speaker's name), engage in a more productive conversation (e.g., by quickly accessing information about events, deadlines, or communications related to the speaker), or the like.

In some embodiments, the AAFS is configured to receive data that represents an utterance of a speaker and that is obtained at or about a hearing device associated with a user. The AAFS may then identify the speaker based at least in part on the received data, such as by performing speaker recognition and/or speech recognition with the received data. The AAFS may then determine speaker-related information associated with the identified speaker, such as an identifier (e.g., name or title) of the speaker, an information item (e.g., a document, event, communication) that references the speaker, or the like. Then, the AAFS may inform the user of the determined speaker-related information by, for example, outputting audio (e.g., via text-to-speech processing) of the speaker-related information via the hearing device.

A. Audible Assistance Facilitator System Overview

Figure 1A:
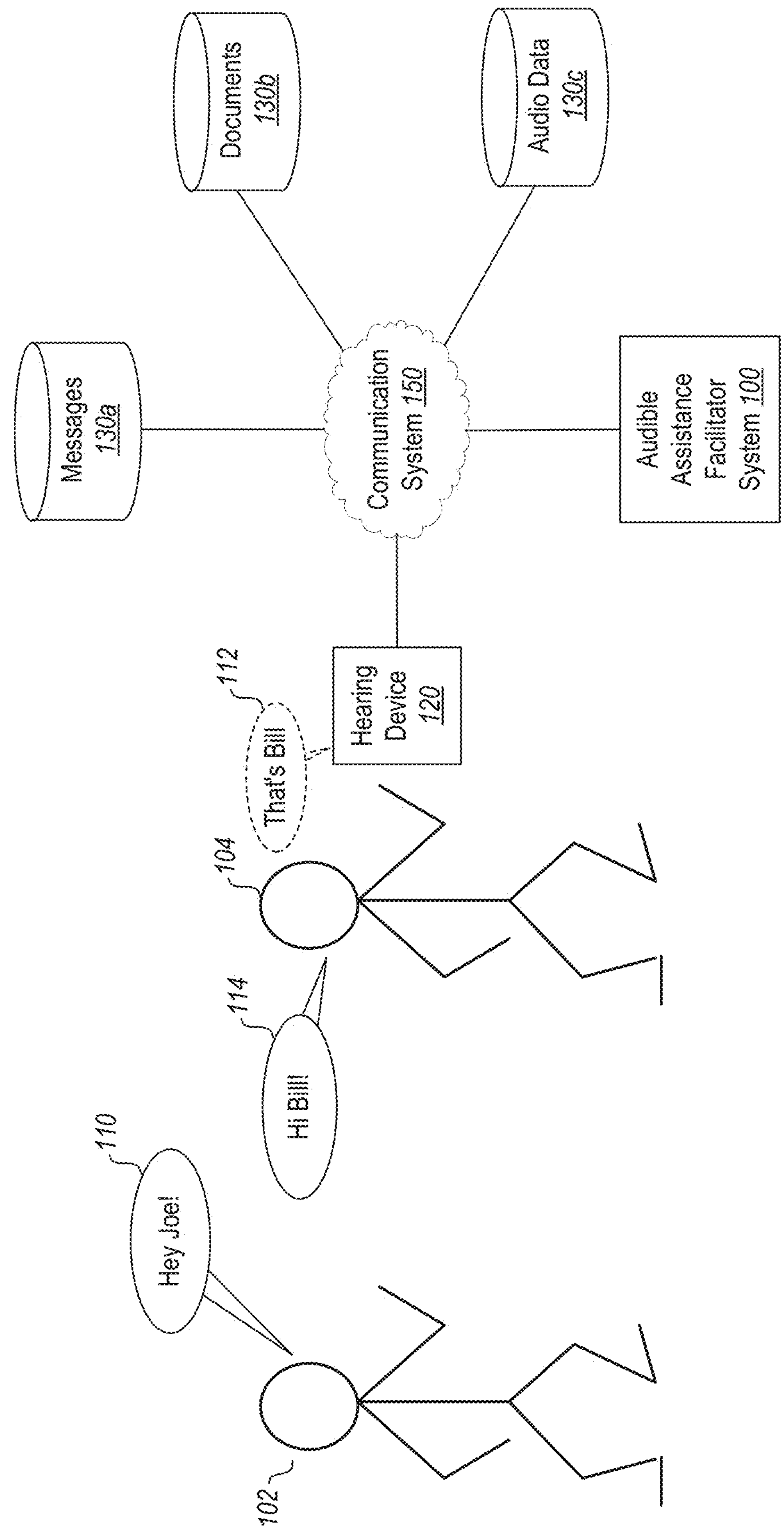
FIG. 1A is an example block diagram of an audible assistance facilitator system according to an example embodiment.

FIG. 1A is an example block diagram of an audible assistance facilitator system according to an example embodiment. In particular, FIG. 1A shows a user 104 who is engaging in a conversation with a speaker 102. The user 102 is being assisted, via a hearing device 120, by an Audible Assistance Facilitator System ("AAFS") 100. The AAFS 100 and the hearing device 120 are communicatively coupled to one another via a communication system 150. The AAFS 100 is also communicatively coupled to speaker-related information sources 130, including a messages 130*a*, documents 130*b*, and audio data 130*c*. The AAFS 100 uses the information in the information sources 130, in conjunction with data received from the hearing device 120, to determine speaker-related information associated with the speaker 102.

In the scenario illustrated in FIG. 1A, the conversation between the speaker 102 and the user 104 is in its initial moments. The speaker 102 has recognized the user 104 and makes an utterance 110 by speaking the words "Hey Joe!" The user 104, however, either does not recognize the speaker 102 or cannot recall his name. As will be discussed further below, the AAFS 100, in concert with the hearing device 120, will notify the user 104 of the identity of the speaker 102, so that the user 104 may avoid the potential embarrassment of not knowing the speaker's name.

The hearing device 120 receives a speech signal that represents the utterance 110, such as by receiving a digital representation of an audio signal received by a microphone of the hearing device 120. The hearing device 120 then transmits data representing the speech signal to the AAFS 100. Transmitting the data representing the speech signal may include transmitting audio samples (e.g., raw audio data), compressed audio data, speech vectors (e.g., mel frequency cepstral coefficients), and/or any other data that may be used to represent an audio signal.

The AAFS 100 then identifies the speaker based on the received data representing the speech signal. In some embodiments, identifying the speaker may include performing speaker recognition, such as by generating a "voice print" from the received data and comparing the generated voice print to previously obtained voice prints. For example, the generated voice print may be compared to multiple voice prints that are stored as audio data 130*c* and that each correspond to a speaker, in order to determine a speaker who has a voice that most closely matches the voice of the speaker 102. The voice prints stored as audio data 130*c* may be generated based on various sources of data, including data corresponding to speakers previously identified by the AAFS 100, voice mail messages, speaker enrollment data, or the like.

In some embodiments, identifying the speaker may include performing speech recognition, such as by automatically converting the received data representing the speech signal into text. The text of the speaker's utterance may then be used to identify the speaker. In particular, the text may identify one or more entities such as information items (e.g., communications, documents), events (e.g., meetings, deadlines), persons, or the like, that may be used by the AAFS 100 to identify the speaker. The information items may be accessed with reference to the messages 130*a* and/or documents 130*b*. As one example, the speaker's utterance 110 may identify an email message that was sent only to the speaker 102 and the user 104 (e.g., "That sure was a nasty email Bob sent us"). As another example, the speaker's utterance 110 may identify a meeting or other event to which both the speaker 102 and the user 104 are invited.

Note that in some cases, the text of the speaker's utterance 110 may not definitively identify the speaker 102, such as because a communication was sent to a recipients in addition to the speaker 102 and the user 104. However, in such cases the text may still be used by the AAFS 100 to narrow the set of potential speakers, and may be combined with (or used to improve) other techniques for speaker identification, including speaker recognition as discussed above.

The AAFS 100 then determines speaker-related information associated with the speaker 102. The speaker-related information may be a name or other identifier of the speaker. The speaker-related information may also or instead be other information about or related to the speaker, such as an organization of the speaker, an information item that references the speaker, an event involving the speaker, or the like. The speaker-related information may be determined with reference to the messages 130*a*, documents 130*b*, and/or audio data 130*c*. For example, having determined the identity of the speaker 102, the AAFS 100 may search for emails and/or documents that are stored as messages 130*a* and/or documents 103*b* and that reference (e.g., are sent to, are authored by, are named in) the speaker 102. Other types of speaker-related information is contemplated, including social networking information, such as personal or professional relationship graphs represented by a social networking service, messages or status updates sent within a social network, or the like. Social networking information may also be derived from other sources, including email lists, contact lists, communication patterns (e.g., frequent recipients of emails), or the like.

The AAFS 100 then informs the user 104 of the determined speaker-related information via the hearing device 120. Informing the user may include "speaking" the information, such as by converting textual information into audio via text-to-speech processing (e.g., speech synthesis), and then presenting the audio via a speaker (e.g., earphone, earpiece, earbud) of the hearing device 120. In the illustrated scenario, the AAFS 100 causes the hearing device 120 to make an utterance 112 by playing audio of the words "That's Bill" via a speaker (not shown) of the hearing device 120. Once the user 104 hears the utterance 112 from the hearing device 120, the user 104 responds to the speaker's original utterance 110 by with a response utterance 114 by speaking the words "Hi Bill!" As the speaker 102 and the user 104 continue to speak, the AAFS 100 may monitor the conversation and continue to determine and present speaker-related information to the user 102.

Figure 1B:
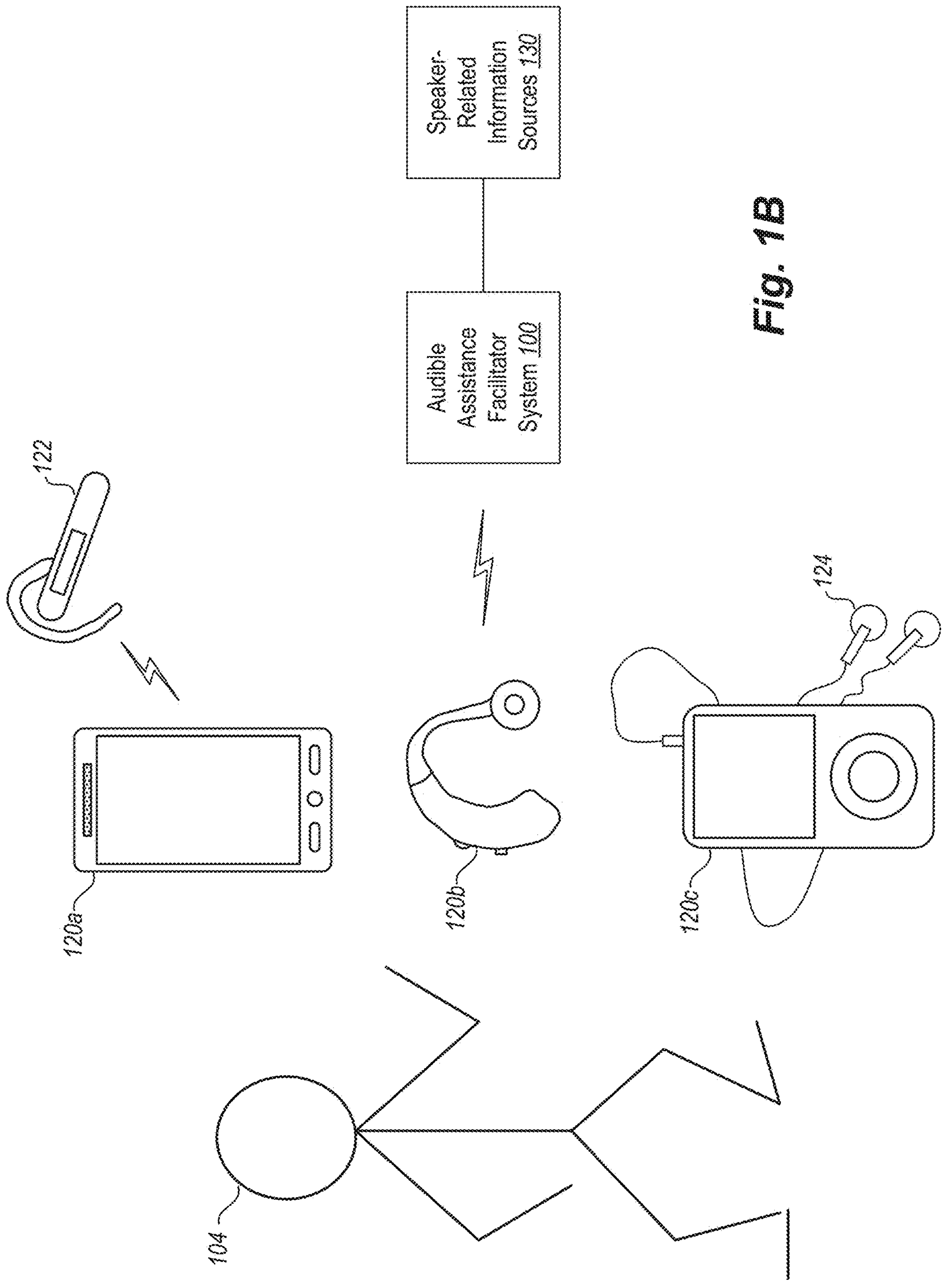
FIG. 1B is an example block diagram illustrating various hearing devices according to example embodiments.

FIG. 1B is an example block diagram illustrating various hearing devices according to example embodiments. In particular, FIG. 1B illustrates an AAFS 100 in wireless communication with example hearing devices 120*a*-120*c*. Hearing device 120*a* is a smart phone in communication with a wireless (e.g., Bluetooth) earpiece 122. Hearing device 120*b* is a hearing aid device. Hearing device 120*c* is a personal media player with attached "earbud" earphones.

Each of the illustrated hearing devices 120 includes or may be communicatively coupled to a microphone operable to receive a speech signal from a speaker. As described above, the hearing device 120 may then convert the speech signal into data representing the speech signal, and then forward the data to the AAFS 100.

Each of the illustrated hearing devices 120 includes or may be communicatively coupled to a speaker operable to generate and output audio signals that may be perceived by the user 104. As described above, the AAFS 100 may present information to the user 104 via the hearing device 120, for example by converting a textual representation of a name or other speaker-related information into an audio representation, and then causing that audio representation to be output via a speaker of the hearing device 120.

Note that although the AAFS 100 is shown as being separate from a hearing device 120, some or all of the functions of the AAFS 100 may be performed within or by the hearing device 120 itself. For example, the smart phone hearing device 120*a* and/or the media device hearing device 120*c* may have sufficient processing power to perform all or some functions of the AAFS 100, including speaker identification (e.g., speaker recognition, speech recognition), determining speaker-related information, presenting the determined information (e.g., by way of text-to-speech processing), or the like. In some embodiments, the hearing device 120 includes logic to determine where to perform various processing tasks, so as to advantageously distribute processing between available resources, including that of the hearing device 120, other nearby devices (e.g., a laptop or other computing device of the user 104 and/or the speaker 102), remote devices (e.g., "cloud-based" processing and/or storage), and the like.

Other types of hearing devices are contemplated. For example, a land-line telephone may be configured to operate as a hearing device, so that the AAFS 100 can identify speakers who are engaged in a conference call. As another example, a hearing device may be or be part of a desktop computer, laptop computer, PDA, tablet computer, or the like.

Figure 2:
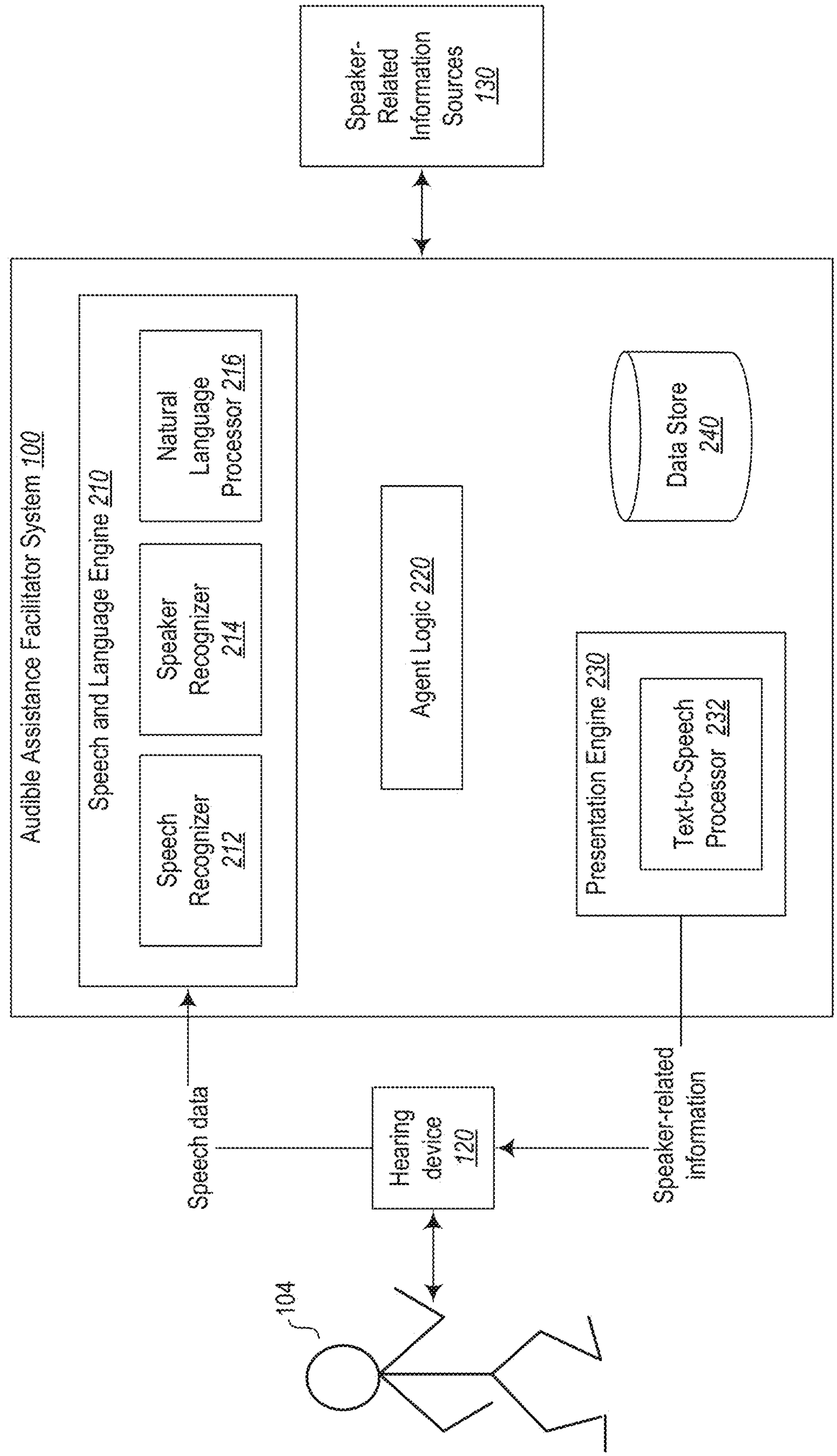
FIG. 2 is an example functional block diagram of an example audible assistance facilitator system according to an example embodiment.

FIG. 2 is an example functional block diagram of an example audible assistance facilitator system according to an example embodiment. In the illustrated embodiment of FIG. 2, the AAFS 100 includes a speech and language engine 210, agent logic 220, a presentation engine 230, and a data store 240.

The speech and language engine 210 includes a speech recognizer 212, a speaker recognizer 214, and a natural language processor 216. The speech recognizer 212 transforms speech audio data received from the hearing device 120 into textual representation of an utterance represented by the speech audio data. In some embodiments, the performance of the speech recognizer 212 may be improved or augmented by use of a language model (e.g., representing likelihoods of transitions between words, such as based on n-grams) or speech model (e.g., representing acoustic properties of a speaker's voice) that is tailored to or based on an identified speaker. For example, once a speaker has been identified, the speech recognizer 212 may use a language model that was previously generated based on a corpus of communications and other information items authored by the identified speaker. A speaker-specific language model may be generated based on a corpus of documents and/or messages authored by a speaker. Speaker-specific speech models may be used to account for accents or channel properties (e.g., due to environmental factors or communication equipment) that are specific to a particular speaker, and may be generated based on a corpus of recorded speech from the speaker.

The speaker recognizer 214 identifies the speaker based on acoustic properties of the speaker's voice, as reflected by the speech data received from the hearing device 120. The speaker recognizer 214 may compare a speaker voice print to previously generated and recorded voice prints stored in the data store 240 in order to find a best or likely match. Voice prints or other signal properties may be determined with reference to voice mail messages, voice chat data, or some other corpus of speech data.

The natural language processor 216 processes text generated by the speech recognizer 212 and/or located in information items obtained from the speaker-related information sources 130. In doing so, the natural language processor 216 may identify relationships, events, or entities (e.g., people, places, things) that may facilitate speaker identification and/or other functions of the AAFS 100. For example, the natural language processor 216 may process status updates posted by the user 104 on a social networking service, to determine that the user 104 recently attended a conference in a particular city, and this fact may be used to identify a speaker and/or determine other speaker-related information.

The agent logic 220 implements the core intelligence of the AAFS 100. The agent logic 220 may include a reasoning engine (e.g., a rules engine, decision trees, Bayesian inference engine) that combines information from multiple sources to identify speakers and/or determine speaker-related information. For example, the agent logic 220 may combine spoken text from the speech recognizer 212, a set of potentially matching speakers from the speaker recognizer 214, and information items from the information sources 130, in order to determine the most likely identity of the current speaker.

The presentation engine 230 includes a text-to-speech processor 232. The agent logic 220 may use or invoke the text-to-speech processor 232 in order to convert textual speaker-related information into audio output suitable for presentation via the hearing device 120.

Note that although speaker identification is herein sometimes described as including the positive identification of a single speaker, it may instead or also include determining likelihoods that each of one or more persons is the current speaker. For example, the speaker recognizer 214 may provide to the agent logic 220 indications of multiple candidate speakers, each having a corresponding likelihood. The agent logic 220 may then select the most likely candidate based on the likelihoods alone or in combination with other information, such as that provided by the speech recognizer 212, natural language processor 216, speaker-related information sources 130, or the like. In some cases, such as when there are a small number of reasonably likely candidate speakers, the agent logic 220 may inform the user 104 of the identities all of the candidate speakers (as opposed to a single speaker) candidate speaker, as such information may be sufficient to trigger the user's recall.

B. Example Processes

FIGS. 3.1-3.78 are example flow diagrams of audible assistance processes performed by example embodiments.

FIG. 3.1 is an example flow diagram of example logic for providing audible assistance via a hearing device. The illustrated logic may be performed, for example, by a hearing device 120 and/or one or more components of the AAFS 100 described with respect to FIG. 2. More particularly, FIG. 3.1 illustrates a process 3.100 that includes operations performed by or at the following block(s).

At block 3.101, the process performs receiving data representing a speech signal obtained at a hearing device associated with a user, the speech signal representing an utterance of a speaker.

At block 3.102, the process performs identifying the speaker based on the data representing the speech signal.

At block 3.103, the process performs determining speaker-related information associated with the identified speaker.

At block 3.104, the process performs informing the user of the speaker-related information via the hearing device.

FIG. 3.2 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.2 illustrates a process 3.200 that includes the process 3.100, wherein the informing the user of the speaker-related information via the hearing device includes operations performed by or at one or more of the following block(s).

At block 3.201, the process performs informing the user of an identifier of the speaker. In some embodiments, the identifier of the speaker may be or include a given name, surname (e.g., last name, family name), nickname, title, job description, or other type of identifier of or associated with the speaker.

FIG. 3.3 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.3 illustrates a process 3.300 that includes the process 3.100, wherein the informing the user of the speaker-related information via the hearing device includes operations performed by or at one or more of the following block(s).

At block 3.301, the process performs informing the user of information aside from identifying information related to the speaker. In some embodiments, information aside from identifying information may include information that is not a name or other identifier (e.g., job title) associated with the speaker. For example, the process may tell the user about an event or communication associated with or related to the speaker.

FIG. 3.4 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.4 illustrates a process 3.400 that includes the process 3.100, wherein the informing the user of the speaker-related information via the hearing device includes operations performed by or at one or more of the following block(s).

At block 3.401, the process performs informing the user of an organization to which the speaker belongs. In some embodiments, informing the user of an organization may include notifying the user of a business, group, school, club, team, company, or other formal or informal organization with which the speaker is affiliated.

FIG. 3.5 is an example flow diagram of example logic illustrating an example embodiment of process 3.400 of FIG. 3.4. The illustrated logic may be performed, for example, by a hearing device 120 and/or one or more components of the AAFS 100 described with respect to FIG. 2. More particularly, FIG. 3.5 illustrates a process 3.500 that includes the process 3.400, wherein the informing the user of an organization includes operations performed by or at one or more of the following block(s).

At block 3.501, the process performs informing the user of a company associated with the speaker. Companies may include profit or non-profit entities, regardless of organizational structure (e.g., corporation, partnerships, sole proprietorship).

FIG. 3.6 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.6 illustrates a process 3.600 that includes the process 3.100, wherein the informing the user of the speaker-related information via the hearing device includes operations performed by or at one or more of the following block(s).

At block 3.601, the process performs informing the user of a previously transmitted communication referencing the speaker. Various forms of communication are contemplated, including textual (e.g., emails, text messages, chats), audio (e.g., voice messages), video, or the like. In some embodiments, a communication can include content in multiple forms, such as text and audio, such as when an email includes a voice attachment.

FIG. 3.7 is an example flow diagram of example logic illustrating an example embodiment of process 3.600 of FIG. 3.6. The illustrated logic may be performed, for example, by a hearing device 120 and/or one or more components of the AAFS 100 described with respect to FIG. 2. More particularly, FIG. 3.7 illustrates a process 3.700 that includes the process 3.600, wherein the informing the user of a previously transmitted communication includes operations performed by or at one or more of the following block(s).

At block 3.701, the process performs informing the user of an email transmitted between the speaker and the user. An email transmitted between the speaker and the user may include an email sent from the speaker to the user, or vice versa.

FIG. 3.8 is an example flow diagram of example logic illustrating an example embodiment of process 3.600 of FIG. 3.6. The illustrated logic may be performed, for example, by a hearing device 120 and/or one or more components of the AAFS 100 described with respect to FIG. 2. More particularly, FIG. 3.8 illustrates a process 3.800 that includes the process 3.600, wherein the informing the user of a previously transmitted communication includes operations performed by or at one or more of the following block(s).

At block 3.801, the process performs informing the user of a text message transmitted between the speaker and the user. Text messages may include short messages according to various protocols, including SMS, MMS, and the like.

FIG. 3.9 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.9 illustrates a process 3.900 that includes the process 3.100, wherein the informing the user of the speaker-related information via the hearing device includes operations performed by or at one or more of the following block(s).

At block 3.901, the process performs informing the user of an event involving the user and the speaker. An event may be any occurrence that involves or involved the user and the speaker, such as a meeting (e.g., social or professional meeting or gathering) attended by the user and the speaker, an upcoming deadline (e.g., for a project), or the like.

FIG. 3.10 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.10 illustrates a process 3.1000 that includes the process 3.900, wherein the informing the user of an event includes operations performed by or at one or more of the following block(s).

At block 3.1001, the process performs informing the user of a previously occurring event.

FIG. 3.11 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.11 illustrates a process 3.1100 that includes the process 3.900, wherein the informing the user of an event includes operations performed by or at one or more of the following block(s).

At block 3.1101, the process performs informing the user of a future event.

FIG. 3.12 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.12 illustrates a process 3.1200 that includes the process 3.900, wherein the informing the user of an event includes operations performed by or at one or more of the following block(s).

At block 3.1201, the process performs informing the user of a project.

FIG. 3.13 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.13 illustrates a process 3.1300 that includes the process 3.900, wherein the informing the user of an event includes operations performed by or at one or more of the following block(s).

At block 3.1301, the process performs informing the user of a meeting.

FIG. 3.14 is an example flow diagram of example logic illustrating an example embodiment of process 3.900 of FIG. 3.9. The illustrated logic may be performed, for example, by a hearing device 120 and/or one or more components of the AAFS 100 described with respect to FIG. 2. More particularly, FIG. 3.14 illustrates a process 3.1400 that includes the process 3.900, wherein the informing the user of an event includes operations performed by or at one or more of the following block(s).

At block 3.1401, the process performs informing the user of a deadline.

FIG. 3.15 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.15 illustrates a process 3.1500 that includes the process 3.100, wherein the determining speaker-related information includes operations performed by or at one or more of the following block(s).

At block 3.1501, the process performs accessing information items associated with the speaker. In some embodiments, accessing information items associated with the speaker may include retrieving files, documents, data records, or the like from various sources, such as local or remote storage devices, including cloud-based servers, and the like. In some embodiments, accessing information items may also or instead include scanning, searching, indexing, or otherwise processing information items to find ones that include, name, mention, or otherwise reference the speaker.

FIG. 3.16 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.16 illustrates a process 3.1600 that includes the process 3.1500, wherein the accessing information items associated with the speaker includes operations performed by or at one or more of the following block(s).

At block 3.1601, the process performs searching for information items that reference the speaker. In some embodiments, searching may include formulating a search query to provide to a document management system or any other data/document store that provides a search interface.

FIG. 3.17 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.17 illustrates a process 3.1700 that includes the process 3.1500, wherein the accessing information items associated with the speaker includes operations performed by or at one or more of the following block(s).

At block 3.1701, the process performs searching stored emails to find emails that reference the speaker. In some embodiments, emails that reference the speaker may include emails sent from the speaker, emails sent to the speaker, emails that name or otherwise identify the speaker in the body of an email, or the like.

FIG. 3.18 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.18 illustrates a process 3.1800 that includes the process 3.1500, wherein the accessing information items associated with the speaker includes operations performed by or at one or more of the following block(s).

At block 3.1801, the process performs searching stored text messages to find text messages that reference the speaker. In some embodiments, text messages that reference the speaker include messages sent to/from the speaker, messages that name or otherwise identify the speaker in a message body, or the like.

FIG. 3.19 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.19 illustrates a process 3.1900 that includes the process 3.1500, wherein the accessing information items associated with the speaker includes operations performed by or at one or more of the following block(s).

At block 3.1901, the process performs accessing a social networking service to find messages or status updates that reference the speaker. In some embodiments, accessing a social networking service may include searching for postings, status updates, personal messages, or the like that have been posted by, posted to, or otherwise reference the speaker. Example social networking services include Facebook, Twitter, Google Plus, and the like. Access to a social networking service may be obtained via an API or similar interface that provides access to social networking data related to the user and/or the speaker.

FIG. 3.20 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.20 illustrates a process 3.2000 that includes the process 3.1500, wherein the accessing information items associated with the speaker includes operations performed by or at one or more of the following block(s).

At block 3.2001, the process performs accessing a calendar to find information about appointments with the speaker. In some embodiments, accessing a calendar may include searching a private or shared calendar to locate a meeting or other appointment with the speaker, and providing such information to the user via the hearing device.

FIG. 3.21 is an example flow diagram of example logic illustrating an example embodiment of process 3.1500 of FIG. 3.15. The illustrated logic may be performed, for example, by a hearing device 120 and/or one or more components of the AAFS 100 described with respect to FIG. 2. More particularly, FIG. 3.21 illustrates a process 3.2100 that includes the process 3.1500, wherein the accessing information items associated with the speaker includes operations performed by or at one or more of the following block(s).

At block 3.2101, the process performs accessing a document store to find documents that reference the speaker. In some embodiments, documents that reference the speaker include those that are authored at least in part by the speaker, those that name or otherwise identify the speaker in a document body, or the like. Accessing the document store may include accessing a local or remote storage device/system, accessing a document management system, accessing a source control system, or the like.

FIG. 3.22 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.22 illustrates a process 3.2200 that includes the process 3.100, wherein the identifying the speaker includes operations performed by or at one or more of the following block(s).

At block 3.2201, the process performs performing voice identification based on the received data to identify the speaker. In some embodiments, voice identification may include generating a voice print, voice model, or other biometric feature set that characterizes the voice of the speaker, and then comparing the generated voice print to previously generated voice prints.

FIG. 3.23 is an example flow diagram of example logic illustrating an example embodiment of process 3.2200 of FIG. 3.22. The illustrated logic may be performed, for example, by a hearing device 120 and/or one or more components of the AAFS 100 described with respect to FIG. 2. More particularly, FIG. 3.23 illustrates a process 3.2300 that includes the process 3.2200, wherein the performing voice identification includes operations performed by or at one or more of the following block(s).

At block 3.2301, the process performs comparing properties of the speech signal with properties of previously recorded speech signals from multiple distinct speakers. In some embodiments, the process accesses voice prints associated with multiple speakers, and determines a best match against the speech signal.

FIG. 3.24 is an example flow diagram of example logic illustrating an example embodiment of process 3.2300 of FIG. 3.23. The illustrated logic may be performed, for example, by a hearing device 120 and/or one or more components of the AAFS 100 described with respect to FIG. 2. More particularly, FIG. 3.24 illustrates a process 3.2400 that includes the process 3.2300, and which further includes operations performed by or at the following block(s).

At block 3.2401, the process performs processing voice messages from the multiple distinct speakers to generate voice print data for each of the multiple distinct speakers. Given a telephone voice message, the process may associate generated voice print data for the voice message with one or more (direct or indirect) identifiers corresponding with the message. For example, the message may have a sender telephone number associated with it, and the process can use that sender telephone number to do a reverse directory lookup (e.g., in a public directory, in a personal contact list) to determine the name of the voice message speaker.

FIG. 3.25 is an example flow diagram of example logic illustrating an example embodiment of process 3.2200 of FIG. 3.22. The illustrated logic may be performed, for example, by a hearing device 120 and/or one or more components of the AAFS 100 described with respect to FIG. 2. More particularly, FIG. 3.25 illustrates a process 3.2500 that includes the process 3.2200, wherein the performing voice identification includes operations performed by or at one or more of the following block(s).

At block 3.2501, the process performs processing telephone voice messages stored by a voice mail service. In some embodiments, the process analyzes voice messages to generate voice prints/models for multiple speakers.

FIG. 3.26 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.26 illustrates a process 3.2600 that includes the process 3.100, wherein the identifying the speaker includes operations performed by or at one or more of the following block(s).

At block 3.2601, the process performs performing speech recognition to convert the received data into text data. For example, the process may convert the received data into a sequence of words that are (or are likely to be) the words uttered by the speaker.

At block 3.2602, the process performs identifying the speaker based on the text data. Given text data (e.g., words spoken by the speaker), the process may search for information items that include the text data, and then identify the speaker based on those information items, as discussed further below.

FIG. 3.27 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.27 illustrates a process 3.2700 that includes the process 3.2600, wherein the identifying the speaker based on the text data includes operations performed by or at one or more of the following block(s).

At block 3.2701, the process performs finding a document that references the speaker and that includes one or more words in the text data. In some embodiments, the process may search for and find a document or other item that includes words spoken by speaker. Then, the process can infer that the speaker is the author of the document, a recipient of the document, a person described in the document, or the like.

FIG. 3.28 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.28 illustrates a process 3.2800 that includes the process 3.2600, wherein the performing speech recognition includes operations performed by or at one or more of the following block(s).

At block 3.2801, the process performs performing speech recognition based on cepstral coefficients that represent the speech signal. In other embodiments, other types of features or information may be also or instead used to perform speech recognition, including language models, dialect models, or the like.

FIG. 3.29 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.29 illustrates a process 3.2900 that includes the process 3.2600, wherein the performing speech recognition includes operations performed by or at one or more of the following block(s).

At block 3.2901, the process performs performing hidden Markov model-based speech recognition. Other approaches or techniques for speech recognition may include neural networks, stochastic modeling, or the like.

FIG. 3.30 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.30 illustrates a process 3.3000 that includes the process 3.2600, and which further includes operations performed by or at the following block(s).

At block 3.3001, the process performs retrieving information items that reference the text data. The process may here retrieve or otherwise obtain documents, calendar events, messages, or the like, that include, contain, or otherwise reference some portion of the text data.

At block 3.3002, the process performs informing the user of the retrieved information items.

FIG. 3.31 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.31 illustrates a process 3.3100 that includes the process 3.2600, and which further includes operations performed by or at the following block(s).

At block 3.3101, the process performs converting the text data into audio data that represents a voice of a different speaker. In some embodiments, the process may perform this conversion by performing text-to-speech processing to read the text data in a different voice.

At block 3.3102, the process performs causing the audio data to be played through the hearing device.

FIG. 3.32 is an example flow diagram of example logic illustrating an example embodiment of process 3.2600 of FIG. 3.26. The illustrated logic may be performed, for example, by a hearing device 120 and/or one or more components of the AAFS 100 described with respect to FIG. 2. More particularly, FIG. 3.32 illustrates a process 3.3200 that includes the process 3.2600, wherein the performing speech recognition includes operations performed by or at one or more of the following block(s).

At block 3.3201, the process performs performing speech recognition based at least in part on a language model associated with the speaker. A language model may be used to improve or enhance speech recognition. For example, the language model may represent word transition likelihoods (e.g., by way of n-grams) that can be advantageously employed to enhance speech recognition. Furthermore, such a language model may be speaker specific, in that it may be based on communications or other information generated by the speaker.

FIG. 3.33 is an example flow diagram of example logic illustrating an example embodiment of process 3.3200 of FIG. 3.32. The illustrated logic may be performed, for example, by a hearing device 120 and/or one or more components of the AAFS 100 described with respect to FIG. 2. More particularly, FIG. 3.33 illustrates a process 3.3300 that includes the process 3.3200, wherein the performing speech recognition based at least in part on a language model associated with the speaker includes operations performed by or at one or more of the following block(s).

At block 3.3301, the process performs generating the language model based on communications generated by the speaker. In some embodiments, the process mines or otherwise processes emails, text messages, voice messages, and the like to generate a language model that is specific or otherwise tailored to the speaker.

FIG. 3.34 is an example flow diagram of example logic illustrating an example embodiment of process 3.3300 of FIG. 3.33. The illustrated logic may be performed, for example, by a hearing device 120 and/or one or more components of the AAFS 100 described with respect to FIG. 2. More particularly, FIG. 3.34 illustrates a process 3.3400 that includes the process 3.3300, wherein the generating the language model based on communications generated by the speaker includes operations performed by or at one or more of the following block(s).

At block 3.3401, the process performs generating the language model based on emails transmitted by the speaker.

FIG. 3.35 is an example flow diagram of example logic illustrating an example embodiment of process 3.3300 of FIG. 3.33. The illustrated logic may be performed, for example, by a hearing device 120 and/or one or more components of the AAFS 100 described with respect to FIG. 2. More particularly, FIG. 3.35 illustrates a process 3.3500 that includes the process 3.3300, wherein the generating the language model based on communications generated by the speaker includes operations performed by or at one or more of the following block(s).

At block 3.3501, the process performs generating the language model based on documents authored by the speaker.

FIG. 3.36 is an example flow diagram of example logic illustrating an example embodiment of process 3.3300 of FIG. 3.33. The illustrated logic may be performed, for example, by a hearing device 120 and/or one or more components of the AAFS 100 described with respect to FIG. 2. More particularly, FIG. 3.36 illustrates a process 3.3600 that includes the process 3.3300, wherein the generating the language model based on communications generated by the speaker includes operations performed by or at one or more of the following block(s).

At block 3.3601, the process performs generating the language model based on social network messages transmitted by the speaker.

FIG. 3.37 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.37 illustrates a process 3.3700 that includes the process 3.100, and which further includes operations performed by or at the following block(s).

At block 3.3701, the process performs receiving data representing a speech signal that represents an utterance of the user. A microphone on or about the hearing device may capture this data. The microphone may be the same or different from one used to capture speech data from the speaker.

At block 3.3702, the process performs identifying the speaker based on the data representing a speech signal that represents an utterance of the user. Identifying the speaker in this manner may include performing speech recognition on the user's utterance, and then processing the resulting text data to locate a name. This identification can then be utilized to retrieve information items or other speaker-related information that may be useful to present to the user.

FIG. 3.38 is an example flow diagram of example logic illustrating an example embodiment of process 3.3700 of FIG. 3.37. The illustrated logic may be performed, for example, by a hearing device 120 and/or one or more components of the AAFS 100 described with respect to FIG. 2. More particularly, FIG. 3.38 illustrates a process 3.3800 that includes the process 3.3700, wherein the identifying the speaker based on the data representing a speech signal that represents an utterance of the user includes operations performed by or at one or more of the following block(s).

At block 3.3801, the process performs determining whether the utterance of the user includes a name of the speaker.

FIG. 3.39 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.39 illustrates a process 3.3900 that includes the process 3.100, wherein the identifying the speaker includes operations performed by or at one or more of the following block(s).

At block 3.3901, the process performs receiving context information related to the user. Context information may generally include information about the setting, location, occupation, communication, workflow, or other event or factor that is present at, about, or with respect to the user.

At block 3.3902, the process performs identifying the speaker, based on the context information. Context information may be used to improve or enhance speaker identification, such as by determining or narrowing a set of potential speakers based on the current location of the user FIG. 3.40 is an example flow diagram of example logic illustrating an example embodiment of process 3.3900 of FIG. 3.39. The illustrated logic may be performed, for example, by a hearing device 120 and/or one or more components of the AAFS 100 described with respect to FIG. 2. More particularly, FIG. 3.40 illustrates a process 3.4000 that includes the process 3.3900, wherein the receiving context information related to the user includes operations performed by or at one or more of the following block(s).

At block 3.4001, the process performs receiving an indication of a location of the user.

At block 3.4002, the process performs determining a plurality of persons with whom the user commonly interacts at the location. For example, if the indicated location is a workplace, the process may generate a list of co-workers, thereby reducing or simplifying the problem of speaker identification.

FIG. 3.41 is an example flow diagram of example logic illustrating an example embodiment of process 3.4000 of FIG. 3.40. The illustrated logic may be performed, for example, by a hearing device 120 and/or one or more components of the AAFS 100 described with respect to FIG. 2. More particularly, FIG. 3.41 illustrates a process 3.4100 that includes the process 3.4000, wherein the receiving an indication of a location of the user includes operations performed by or at one or more of the following block(s).

At block 3.4101, the process performs receiving a GPS location from a mobile device of the user.

FIG. 3.42 is an example flow diagram of example logic illustrating an example embodiment of process 3.4000 of FIG. 3.40. The illustrated logic may be performed, for example, by a hearing device 120 and/or one or more components of the AAFS 100 described with respect to FIG. 2. More particularly, FIG. 3.42 illustrates a process 3.4200 that includes the process 3.4000, wherein the receiving an indication of a location of the user includes operations performed by or at one or more of the following block(s).

At block 3.4201, the process performs receiving a network identifier that is associated with the location. The network identifier may be, for example, a service set identifier ("SSID") of a wireless network with which the user is currently associated.

FIG. 3.43 is an example flow diagram of example logic illustrating an example embodiment of process 3.4000 of FIG. 3.40. The illustrated logic may be performed, for example, by a hearing device 120 and/or one or more components of the AAFS 100 described with respect to FIG. 2. More particularly, FIG. 3.43 illustrates a process 3.4300 that includes the process 3.4000, wherein the receiving an indication of a location of the user includes operations performed by or at one or more of the following block(s).

At block 3.4301, the process performs receiving an indication that the user is at a workplace. For example, the process may translate a coordinate-based location (e.g., GPS coordinates) to a particular workplace by performing a map lookup or other mechanism.

FIG. 3.44 is an example flow diagram of example logic illustrating an example embodiment of process 3.4000 of FIG. 3.40. The illustrated logic may be performed, for example, by a hearing device 120 and/or one or more components of the AAFS 100 described with respect to FIG. 2. More particularly, FIG. 3.44 illustrates a process 3.4400 that includes the process 3.4000, wherein the receiving an indication of a location of the user includes operations performed by or at one or more of the following block(s).

At block 3.4401, the process performs receiving an indication that the user is at a residence.

FIG. 3.45 is an example flow diagram of example logic illustrating an example embodiment of process 3.3900 of FIG. 3.39. The illustrated logic may be performed, for example, by a hearing device 120 and/or one or more components of the AAFS 100 described with respect to FIG. 2. More particularly, FIG. 3.45 illustrates a process 3.4500 that includes the process 3.3900, wherein the receiving context information related to the user includes operations performed by or at one or more of the following block(s).

At block 3.4501, the process performs receiving information about a communication that references the speaker. As noted, context information may include communications. In this case, the process may exploit such communications to improve speaker identification or other operations.

FIG. 3.46 is an example flow diagram of example logic illustrating an example embodiment of process 3.4500 of FIG. 3.45. The illustrated logic may be performed, for example, by a hearing device 120 and/or one or more components of the AAFS 100 described with respect to FIG. 2. More particularly, FIG. 3.46 illustrates a process 3.4600 that includes the process 3.4500, wherein the receiving information about a communication that references the speaker includes operations performed by or at one or more of the following block(s).

At block 3.4601, the process performs receiving information about a message that references the speaker.

FIG. 3.47 is an example flow diagram of example logic illustrating an example embodiment of process 3.4500 of FIG. 3.45. The illustrated logic may be performed, for example, by a hearing device 120 and/or one or more components of the AAFS 100 described with respect to FIG. 2. More particularly, FIG. 3.47 illustrates a process 3.4700 that includes the process 3.4500, wherein the receiving information about a communication that references the speaker includes operations performed by or at one or more of the following block(s).

At block 3.4701, the process performs receiving information about a document that references the speaker.

FIG. 3.48 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.48 illustrates a process 3.4800 that includes the process 3.100, and which further includes operations performed by or at the following block(s).

At block 3.4801, the process performs receiving data representing an ongoing conversation amongst multiple speakers. In some embodiments, the process is operable to identify multiple distinct speakers, such as when a group is meeting via a conference call.

At block 3.4802, the process performs identifying the multiple speakers based on the data representing the ongoing conversation.

At block 3.4803, the process performs as each of the multiple speakers takes a turn speaking during the ongoing conversation, informing the user of a name or other speaker-related information associated with the speaker. In this manner, the process may, in substantially real time, provide the user with indications of a current speaker, even though such a speaker may not be visible or even previously known to the user.

FIG. 3.49 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.49 illustrates a process 3.4900 that includes the process 3.100, and which further includes operations performed by or at the following block(s).

At block 3.4901, the process performs developing a corpus of speaker data by recording speech from a plurality of speakers.

At block 3.4902, the process performs identifying the speaker based at least in part on the corpus of speaker data. Over time, the process may gather and record speech obtained during its operation, and then use that speech as part of a corpus that is used during future operation. In this manner, the process may improve its performance by utilizing actual, environmental speech data, possibly along with feedback received from the user, as discussed below.

FIG. 3.50 is an example flow diagram of example logic illustrating an example embodiment of process 3.4900 of FIG. 3.49. The illustrated logic may be performed, for example, by a hearing device 120 and/or one or more components of the AAFS 100 described with respect to FIG. 2. More particularly, FIG. 3.50 illustrates a process 3.5000 that includes the process 3.4900, and which further includes operations performed by or at the following block(s).

At block 3.5001, the process performs generating a speech model associated with each of the plurality of speakers, based on the recorded speech. The generated speech model may include voice print data that can be used for speaker identification, a language model that may be used for speech recognition purposes, a noise model that may be used to improve operation in speaker-specific noisy environments.

FIG. 3.51 is an example flow diagram of example logic illustrating an example embodiment of process 3.4900 of FIG. 3.49. The illustrated logic may be performed, for example, by a hearing device 120 and/or one or more components of the AAFS 100 described with respect to FIG. 2. More particularly, FIG. 3.51 illustrates a process 3.5100 that includes the process 3.4900, and which further includes operations performed by or at the following block(s).

At block 3.5101, the process performs receiving feedback regarding accuracy of the speaker-related information. During or after providing speaker-related information to the user, the user may provide feedback regarding its accuracy. This feedback may then be used to train a speech processor (e.g., a speaker identification module, a speech recognition module). Feedback may be provided in various ways, such as by processing positive/negative utterances from the speaker (e.g., "That is not my name"), receiving a positive/negative utterance from the user (e.g., "I am sorry."), receiving a keyboard/button event that indicates a correct or incorrect identification.

At block 3.5102, the process performs training a speech processor based at least in part on the received feedback.

FIG. 3.52 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.52 illustrates a process 3.5200 that includes the process 3.100, wherein the informing the user of the speaker-related information via the hearing device includes operations performed by or at one or more of the following block(s).

At block 3.5201, the process performs transmitting the speaker-related information to a hearing device configured to amplify speech for the user. In some embodiments, the hearing device may be a hearing aid or similar device that is configured to amplify or otherwise modulate audio signals for the user.

FIG. 3.53 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.53 illustrates a process 3.5300 that includes the process 3.100, wherein the informing the user of the speaker-related information via the hearing device includes operations performed by or at one or more of the following block(s).

At block 3.5301, the process performs transmitting the speaker-related information to the hearing device from a computing system that is remote from the hearing device. In some embodiments, at least some of the processing performed remote from the hearing device, such that the speaker-related information is transmitted to the hearing device.

FIG. 3.54 is an example flow diagram of example logic illustrating an example embodiment of process 3.5300 of FIG. 3.53. The illustrated logic may be performed, for example, by a hearing device 120 and/or one or more components of the AAFS 100 described with respect to FIG. 2. More particularly, FIG. 3.54 illustrates a process 3.5400 that includes the process 3.5300, wherein the transmitting the speaker-related information to the hearing device from a computing system includes operations performed by or at one or more of the following block(s).

At block 3.5401, the process performs transmitting the speaker-related information from a mobile device that is operated by the user and that is in communication with the hearing device. For example, the hearing device may be a headset or earpiece that communicates with a mobile device (e.g., smart phone) operated by the user.

FIG. 3.55 is an example flow diagram of example logic illustrating an example embodiment of process 3.5400 of FIG. 3.54. The illustrated logic may be performed, for example, by a hearing device 120 and/or one or more components of the AAFS 100 described with respect to FIG. 2. More particularly, FIG. 3.55 illustrates a process 3.5500 that includes the process 3.5400, wherein the transmitting the speaker-related information from a mobile device includes operations performed by or at one or more of the following block(s).

At block 3.5501, the process performs wirelessly transmitting the speaker-related information from the mobile device to the hearing device. Various protocols may be used, including Bluetooth, infrared, WiFi, or the like.

FIG. 3.56 is an example flow diagram of example logic illustrating an example embodiment of process 3.5400 of FIG. 3.54. The illustrated logic may be performed, for example, by a hearing device 120 and/or one or more components of the AAFS 100 described with respect to FIG. 2. More particularly, FIG. 3.56 illustrates a process 3.5600 that includes the process 3.5400, wherein the transmitting the speaker-related information from a mobile device includes operations performed by or at one or more of the following block(s).

At block 3.5601, the process performs transmitting the speaker-related information from a smart phone to the hearing device.

FIG. 3.57 is an example flow diagram of example logic illustrating an example embodiment of process 3.5400 of FIG. 3.54. The illustrated logic may be performed, for example, by a hearing device 120 and/or one or more components of the AAFS 100 described with respect to FIG. 2. More particularly, FIG. 3.57 illustrates a process 3.5700 that includes the process 3.5400, wherein the transmitting the speaker-related information from a mobile device includes operations performed by or at one or more of the following block(s).

At block 3.5701, the process performs transmitting the speaker-related information from a portable media player to the hearing device.

FIG. 3.58 is an example flow diagram of example logic illustrating an example embodiment of process 3.5300 of FIG. 3.53. The illustrated logic may be performed, for example, by a hearing device 120 and/or one or more components of the AAFS 100 described with respect to FIG. 2. More particularly, FIG. 3.58 illustrates a process 3.5800 that includes the process 3.5300, wherein the transmitting the speaker-related information to the hearing device from a computing system includes operations performed by or at one or more of the following block(s).

At block 3.5801, the process performs transmitting the speaker-related information from a server system. In some embodiments, some portion of the processing is performed on a server system that may be remote from the hearing device.

FIG. 3.59 is an example flow diagram of example logic illustrating an example embodiment of process 3.5800 of FIG. 3.58. The illustrated logic may be performed, for example, by a hearing device 120 and/or one or more components of the AAFS 100 described with respect to FIG. 2. More particularly, FIG. 3.59 illustrates a process 3.5900 that includes the process 3.5800, wherein the transmitting the speaker-related information from a server system includes operations performed by or at one or more of the following block(s).

At block 3.5901, the process performs transmitting the speaker-related information from a server system that resides in a data center.

FIG. 3.60 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.60 illustrates a process 3.6000 that includes the process 3.100, wherein the informing the user of the speaker-related information via the hearing device includes operations performed by or at one or more of the following block(s).

At block 3.6001, the process performs transmitting the speaker-related information to earphones in communication with a mobile device that is operating as the hearing device.

FIG. 3.61 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.61 illustrates a process 3.6100 that includes the process 3.100, wherein the informing the user of the speaker-related information via the hearing device includes operations performed by or at one or more of the following block(s).

At block 3.6101, the process performs transmitting the speaker-related information to earbuds in communication with a mobile device that is operating as the hearing device.

FIG. 3.62 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.62 illustrates a process 3.6200 that includes the process 3.100, wherein the informing the user of the speaker-related information via the hearing device includes operations performed by or at one or more of the following block(s).

At block 3.6201, the process performs transmitting the speaker-related information to a headset in communication with a mobile device that is operating as the hearing device.

FIG. 3.63 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.63 illustrates a process 3.6300 that includes the process 3.100, wherein the informing the user of the speaker-related information via the hearing device includes operations performed by or at one or more of the following block(s).

At block 3.6301, the process performs transmitting the speaker-related information to a pillow speaker in communication with a mobile device that is operating as the hearing device.

FIG. 3.64 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.64 illustrates a process 3.6400 that includes the process 3.100, wherein the identifying the speaker includes operations performed by or at one or more of the following block(s).

At block 3.6401, the process performs identifying the speaker, performed on a mobile device that is operated by the user. As noted, In some embodiments a mobile device such as a smart phone may have sufficient processing power to perform a portion of the process, such as identifying the speaker.

FIG. 3.65 is an example flow diagram of example logic illustrating an example embodiment of process 3.6400 of FIG. 3.64. The illustrated logic may be performed, for example, by a hearing device 120 and/or one or more components of the AAFS 100 described with respect to FIG. 2. More particularly, FIG. 3.65 illustrates a process 3.6500 that includes the process 3.6400, wherein the identifying the speaker includes operations performed by or at one or more of the following block(s).

At block 3.6501, the process performs identifying the speaker, performed on a smart phone that is operated by the user.

FIG. 3.66 is an example flow diagram of example logic illustrating an example embodiment of process 3.6400 of FIG. 3.64. The illustrated logic may be performed, for example, by a hearing device 120 and/or one or more components of the AAFS 100 described with respect to FIG. 2. More particularly, FIG. 3.66 illustrates a process 3.6600 that includes the process 3.6400, wherein the identifying the speaker includes operations performed by or at one or more of the following block(s).

At block 3.6601, the process performs identifying the speaker, performed on a media device that is operated by the user.

FIG. 3.67 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.67 illustrates a process 3.6700 that includes the process 3.100, wherein the determining speaker-related information includes operations performed by or at one or more of the following block(s).

At block 3.6701, the process performs determining speaker-related information, performed on a mobile device that is operated by the user.

FIG. 3.68 is an example flow diagram of example logic illustrating an example embodiment of process 3.6700 of FIG. 3.67. The illustrated logic may be performed, for example, by a hearing device 120 and/or one or more components of the AAFS 100 described with respect to FIG. 2. More particularly, FIG. 3.68 illustrates a process 3.6800 that includes the process 3.6700, wherein the determining speaker-related information includes operations performed by or at one or more of the following block(s).

At block 3.6801, the process performs determining speaker-related information, performed on a smart phone that is operated by the user.

FIG. 3.69 is an example flow diagram of example logic illustrating an example embodiment of process 3.6700 of FIG. 3.67. The illustrated logic may be performed, for example, by a hearing device 120 and/or one or more components of the AAFS 100 described with respect to FIG. 2. More particularly, FIG. 3.69 illustrates a process 3.6900 that includes the process 3.6700, wherein the determining speaker-related information includes operations performed by or at one or more of the following block(s).

At block 3.6901, the process performs determining speaker-related information, performed on a media device that is operated by the user.

FIG. 3.70 is an example flow diagram of example logic illustrating an example embodiment of process 3.100 of FIG. 3.1. The illustrated logic may be performed, for example, by a hearing device 120 and/or one or more components of the AAFS 100 described with respect to FIG. 2. More particularly, FIG. 3.70 illustrates a process 3.7000 that includes the process 3.100, and which further includes operations performed by or at the following block(s).

At block 3.7001, the process performs determining whether or not the user can name the speaker.

At block 3.7002, the process performs when it is determined that the user cannot name the speaker, informing the user of the speaker-related information via the hearing device. In some embodiments, the process only informs the user of the speaker-related information upon determining that the speaker does not appear to be able to name the speaker.

FIG. 3.71 is an example flow diagram of example logic illustrating an example embodiment of process 3.7000 of FIG. 3.70. The illustrated logic may be performed, for example, by a hearing device 120 and/or one or more components of the AAFS 100 described with respect to FIG. 2. More particularly, FIG. 3.71 illustrates a process 3.7100 that includes the process 3.7000, wherein the determining whether or not the user can name the speaker includes operations performed by or at one or more of the following block(s).

At block 3.7101, the process performs determining whether the user has named the speaker. In some embodiments, the process listens to the user to determine whether the user has named the speaker.

FIG. 3.72 is an example flow diagram of example logic illustrating an example embodiment of process 3.7100 of FIG. 3.71. The illustrated logic may be performed, for example, by a hearing device 120 and/or one or more components of the AAFS 100 described with respect to FIG. 2. More particularly, FIG. 3.72 illustrates a process 3.7200 that includes the process 3.7100, wherein the determining whether the user has named the speaker includes operations performed by or at one or more of the following block(s).

At block 3.7201, the process performs determining whether the speaker has uttered a given name or surname of the speaker.

FIG. 3.73 is an example flow diagram of example logic illustrating an example embodiment of process 3.7100 of FIG. 3.71. The illustrated logic may be performed, for example, by a hearing device 120 and/or one or more components of the AAFS 100 described with respect to FIG. 2. More particularly, FIG. 3.73 illustrates a process 3.7300 that includes the process 3.7100, wherein the determining whether the user has named the speaker includes operations performed by or at one or more of the following block(s).

At block 3.7301, the process performs determining whether the speaker has uttered a nickname of the speaker.

FIG. 3.74 is an example flow diagram of example logic illustrating an example embodiment of process 3.7100 of FIG. 3.71. The illustrated logic may be performed, for example, by a hearing device 120 and/or one or more components of the AAFS 100 described with respect to FIG. 2. More particularly, FIG. 3.74 illustrates a process 3.7400 that includes the process 3.7100, wherein the determining whether the user has named the speaker includes operations performed by or at one or more of the following block(s).

At block 3.7401, the process performs determining whether the speaker has uttered a name of a relationship between the user and the speaker. In some embodiments, the user need not utter the name of the speaker, but instead may utter other information (e.g., a relationship) that may be used by the process to determine that user knows or can name the speaker.

FIG. 3.75 is an example flow diagram of example logic illustrating an example embodiment of process 3.7000 of FIG. 3.70. The illustrated logic may be performed, for example, by a hearing device 120 and/or one or more components of the AAFS 100 described with respect to FIG. 2. More particularly, FIG. 3.75 illustrates a process 3.7500 that includes the process 3.7000, wherein the determining whether or not the user can name the speaker includes operations performed by or at one or more of the following block(s).

At block 3.7501, the process performs determining whether the user has uttered information that is related to both the speaker and the user.

FIG. 3.76 is an example flow diagram of example logic illustrating an example embodiment of process 3.7100 of FIG. 3.71. The illustrated logic may be performed, for example, by a hearing device 120 and/or one or more components of the AAFS 100 described with respect to FIG. 2. More particularly, FIG. 3.76 illustrates a process 3.7600 that includes the process 3.7100, wherein the determining whether the user has named the speaker includes operations performed by or at one or more of the following block(s).

At block 3.7601, the process performs determining whether the user has named a person, place, thing, or event that the speaker and the user have in common. For example, the user may mention a visit to the home town of the speaker, a vacation to a place familiar to the speaker, or the like.

FIG. 3.77 is an example flow diagram of example logic illustrating an example embodiment of process 3.7000 of FIG. 3.70. The illustrated logic may be performed, for example, by a hearing device 120 and/or one or more components of the AAFS 100 described with respect to FIG. 2. More particularly, FIG. 3.77 illustrates a process 3.7700 that includes the process 3.7000, wherein the determining whether or not the user can name the speaker includes operations performed by or at one or more of the following block(s).

At block 3.7701, the process performs performing speech recognition to convert an utterance of the user into text data.

At block 3.7702, the process performs determining whether or not the user can name the speaker based at least in part on the text data.

FIG. 3.78 is an example flow diagram of example logic illustrating an example embodiment of process 3.7000 of FIG. 3.70. The illustrated logic may be performed, for example, by a hearing device 120 and/or one or more components of the AAFS 100 described with respect to FIG. 2. More particularly, FIG. 3.78 illustrates a process 3.7800 that includes the process 3.7000, wherein the determining whether or not the user can name the speaker includes operations performed by or at one or more of the following block(s).

At block 3.7801, the process performs when the user does not name the speaker within a predetermined time interval, determining that the user cannot name the speaker. In some embodiments, the process waits for a time period before jumping in to provide the speaker-related information.

C. Example Computing System Implementation

Figure 4:
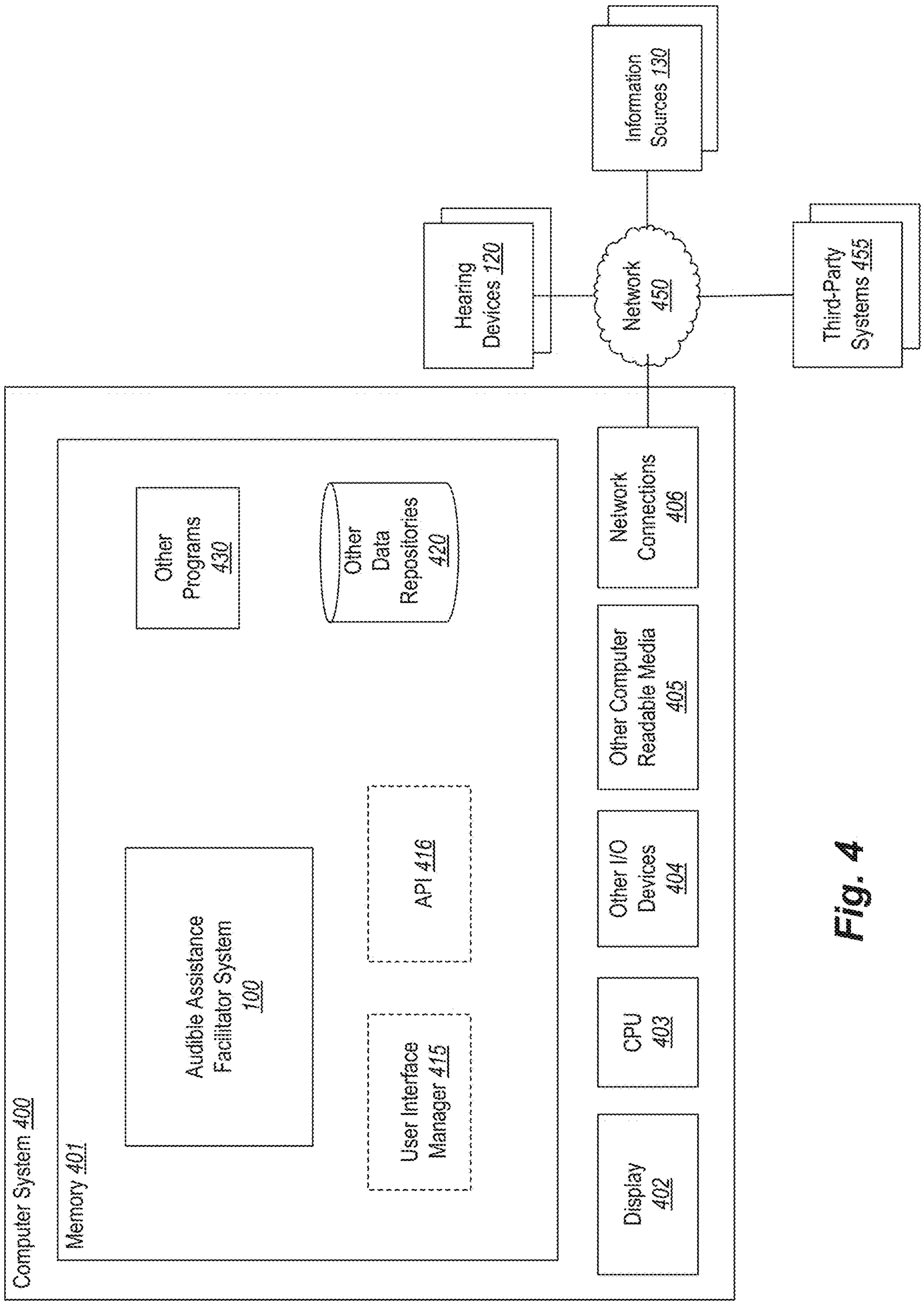
FIG. 4 is an example block diagram of an example computing system for implementing an audible assistance facilitator system according to an example embodiment.

FIG. 4 is an example block diagram of an example computing system for implementing an audible assistance facilitator system according to an example embodiment. In particular, FIG. 4 shows a computing system 400 that may be utilized to implement an AAFS 100.

Note that one or more general purpose or special purpose computing systems/devices may be used to implement the AAFS 100. In addition, the computing system 400 may comprise one or more distinct computing systems/devices and may span distributed locations. Furthermore, each block shown may represent one or more such blocks as appropriate to a specific embodiment or may be combined with other blocks. Also, the AAFS 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The AAFS 100 is shown residing in memory 401. In other embodiments, some portion of the contents, some or all of the components of the AAFS 100 may be stored on and/or transmitted over the other computer-readable media 405. The components of the AAFS 100 preferably execute on one or more CPUs 403 and recommend content items, as described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

The AAFS 100 interacts via the network 450 with hearing devices 120, speaker-related information sources 130, and third-party systems/applications 455. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 455 may include any systems that provide data to, or utilize data from, the AAFS 100, including Web browsers, e-commerce sites, calendar applications, email systems, social networking services, and the like.

The AAFS 100 is shown executing in the memory 401 of the computing system 400. Also included in the memory are a user interface manager 415 and an application program interface ("API") 416. The user interface manager 415 and the API 416 are drawn in dashed lines to indicate that in other embodiments, functions performed by one or more of these components may be performed externally to the AAFS 100.

The UI manager 415 provides a view and a controller that facilitate user interaction with the AAFS 100 and its various components. For example, the UI manager 415 may provide interactive access to the AAFS 100, such that users can configure the operation of the AAFS 100, such as by providing the AAFS 100 credentials to access various sources of speaker-related information, including social networking services, email systems, document stores, or the like. In some embodiments, access to the functionality of the UI manager 415 may be provided via a Web server, possibly executing as one of the other programs 430. In such embodiments, a user operating a Web browser executing on one of the third-party systems 455 can interact with the AAFS 100 via the UI manager 415.

The API 416 provides programmatic access to one or more functions of the AAFS 100. For example, the API 416 may provide a programmatic interface to one or more functions of the AAFS 100 that may be invoked by one of the other programs 430 or some other module. In this manner, the API 416 facilitates the development of third-party software, such as user interfaces, plug-ins, adapters (e.g., for integrating functions of the AAFS 100 into Web applications), and the like.

In addition, the API 416 may be in at least some embodiments invoked or otherwise accessed via remote entities, such as code executing on one of the hearing devices 120, information sources 130, and/or one of the third-party systems/applications 455, to access various functions of the AAFS 100. For example, an information source 130 may push speaker-related information (e.g., emails, documents, calendar events) to the AAFS 100 via the API 416. The API 416 may also be configured to provide management widgets (e.g., code modules) that can be integrated into the third-party applications 455 and that are configured to interact with the AAFS 100 to make at least some of the described functionality available within the context of other applications (e.g., mobile apps).

In an example embodiment, components/modules of the AAFS 100 are implemented using standard programming techniques. For example, the AAFS 100 may be implemented as a "native" executable running on the CPU 403, along with one or more static or dynamic libraries. In other embodiments, the AAFS 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AAFS 100, such as in the data store 417, can be available by standard mechanisms such as through C, C++, C #, and Java APIs; libraries for accessing files, databases, or other data repositories; through scripting languages such as XML; or through Web servers, FTP servers, or other types of servers providing access to stored data. The data store 417 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AAFS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

II. Visual Presentation of Speaker-Related Information

Embodiments described herein provide enhanced computer- and network-based methods and systems for ability enhancement and, more particularly, determining and presenting speaker-related information based on speaker utterances received by, for example, a hearing device. Example embodiments provide an Ability Enhancement Facilitator System ("AEFS"). The AEFS may augment, enhance, or improve the senses (e.g., hearing), faculties (e.g., memory), and/or other abilities of a user, such as by assisting a user with the recall of names, events, communications, documents, or other information related to a speaker with whom the user is conversing. For example, when the user engages a speaker in conversation, the AEFS may "listen" to the speaker in order to identify the speaker and/or determine other speaker-related information, such as events or communications relating to the speaker and/or the user. Then, the AEFS may inform the user of the determined information, such as by visually presenting the information on a display screen or other visual output device. The user can then read the information provided by the AEFS and advantageously use that information to avoid embarrassment (e.g., due to an inability to recall the speaker's name), engage in a more productive conversation (e.g., by quickly accessing information about events, deadlines, or communications related to the speaker), or the like.

In some embodiments, the AEFS is configured to receive data that represents an utterance of a speaker and that is obtained at or about a hearing device associated with a user. The hearing device may be or include any device that is used by the user to hear sounds, including a hearing aid, a personal media device/player, a telephone, or the like. The AEFS may then identify the speaker based at least in part on the received data, such as by performing speaker recognition and/or speech recognition with the received data. The AEFS may then determine speaker-related information associated with the identified speaker, such as an identifier (e.g., name or title) of the speaker, an information item (e.g., a document, event, communication) that references the speaker, or the like. Then, the AEFS may inform the user of the determined speaker-related information by, for example, visually presenting the speaker-related information via a visual display device. In some embodiments, the visual display device may be part of the hearing device, such as a screen on a personal media player. In some embodiments, the visual display device may be separate from the hearing device. For example, the visual display device may be a screen on a laptop computer whilst the hearing device is a hearing aid worn by the user.

A. Ability Enhancement Facilitator System Overview

Figure 5A:
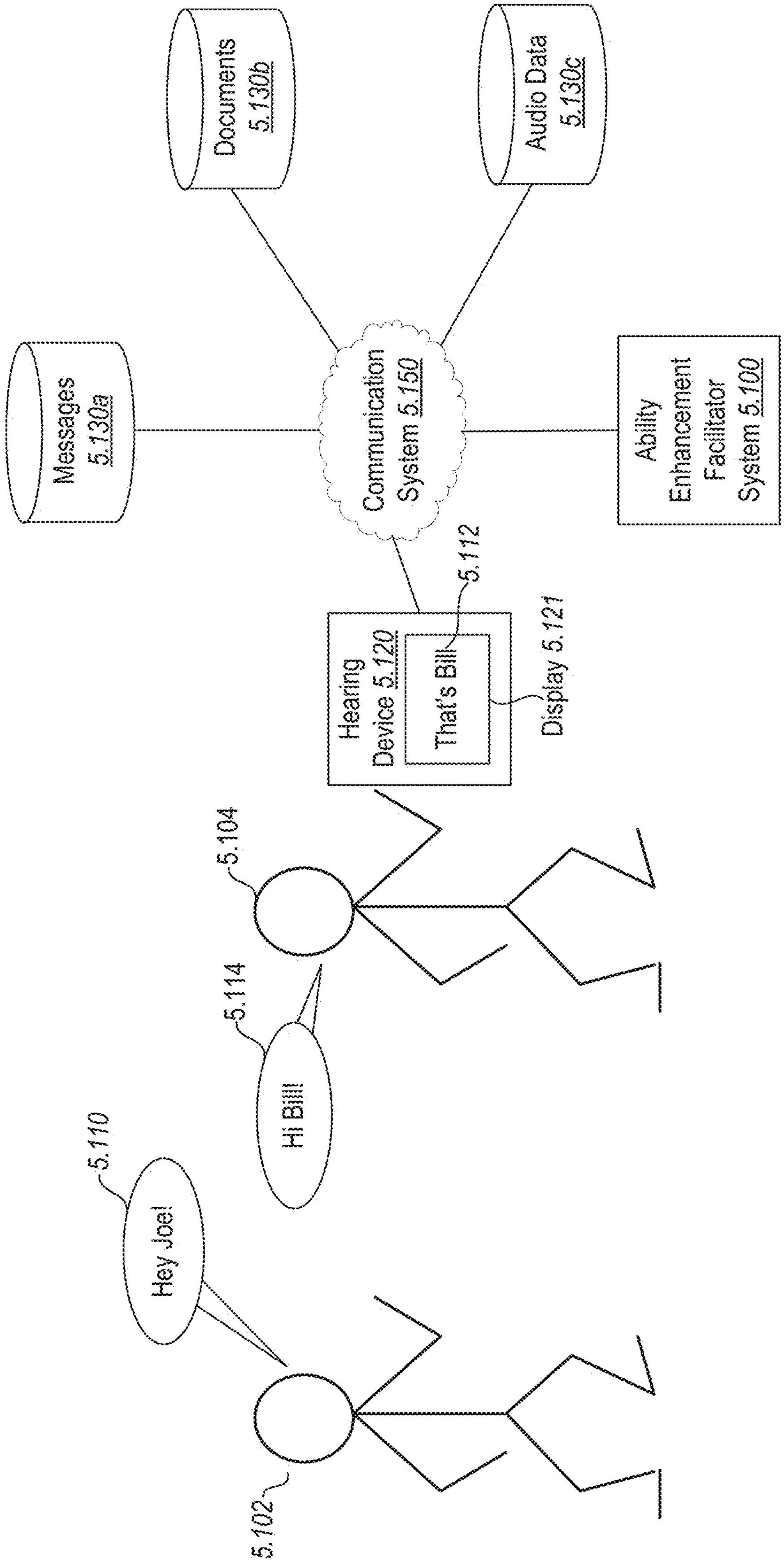
FIG. 5A is an example block diagram of an ability enhancement facilitator system according to an example embodiment.

FIG. 5A is an example block diagram of an ability enhancement facilitator system according to an example embodiment. In particular, FIG. 5A shows a user 5.104 who is engaging in a conversation with a speaker 5.102. Abilities of the user 5.102 are being enhanced, via a hearing device 5.120, by an Ability Enhancement Facilitator System ("AEFS") 5.100. The hearing device 5.120 includes a display 5.121 configured to present text and/or graphics. The AEFS 5.100 and the hearing device 5.120 are communicatively coupled to one another via a communication system 5.150. The AEFS 5.100 is also communicatively coupled to speaker-related information sources 5.130, including a messages 5.130*a*, documents 5.130*b*, and audio data 5.130*c*. The AEFS 5.100 uses the information in the information sources 5.130, in conjunction with data received from the hearing device 5.120, to determine speaker-related information associated with the speaker 5.102.

In the scenario illustrated in FIG. 5A, the conversation between the speaker 5.102 and the user 5.104 is in its initial moments. The speaker 5.102 has recognized the user 5.104 and makes an utterance 5.110 by speaking the words "Hey Joe!" The user 5.104, however, either does not recognize the speaker 5.102 or cannot recall his name. As will be discussed further below, the AEFS 5.100, in concert with the hearing device 5.120, will notify the user 5.104 of the identity of the speaker 5.102 via the display 5.121, so that the user 5.104 may avoid the potential embarrassment of not knowing the name of the speaker 5.102.

The hearing device 5.120 receives a speech signal that represents the utterance 5.110, such as by receiving a digital representation of an audio signal received by a microphone of the hearing device 5.120. The hearing device 5.120 then transmits data representing the speech signal to the AEFS 5.100. Transmitting the data representing the speech signal may include transmitting audio samples (e.g., raw audio data), compressed audio data, speech vectors (e.g., mel frequency cepstral coefficients), and/or any other data that may be used to represent an audio signal.

The AEFS 5.100 then identifies the speaker based on the received data representing the speech signal. In some embodiments, identifying the speaker may include performing speaker recognition, such as by generating a "voice print" from the received data and comparing the generated voice print to previously obtained voice prints. For example, the generated voice print may be compared to multiple voice prints that are stored as audio data 5.130*c* and that each correspond to a speaker, in order to determine a speaker who has a voice that most closely matches the voice of the speaker 5.102. The voice prints stored as audio data 5.130*c* may be generated based on various sources of data, including data corresponding to speakers previously identified by the AEFS 5.100, voice mail messages, speaker enrollment data, or the like.

In some embodiments, identifying the speaker may include performing speech recognition, such as by automatically converting the received data representing the speech signal into text. The text of the speaker's utterance may then be used to identify the speaker. In particular, the text may identify one or more entities such as information items (e.g., communications, documents), events (e.g., meetings, deadlines), persons, or the like, that may be used by the AEFS 5.100 to identify the speaker. The information items may be accessed with reference to the messages 5.130*a* and/or documents 5.130*b*. As one example, the speaker's utterance 5.110 may identify an email message that was sent to the speaker 5.102 and the user 5.104 (e.g., "That sure was a nasty email Bob sent us"). As another example, the speaker's utterance 5.110 may identify a meeting or other event to which both the speaker 5.102 and the user 5.104 are invited.

Note that in some cases, the text of the speaker's utterance 5.110 may not definitively identify the speaker 5.102, such as because a communication was sent to a recipients in addition to the speaker 5.102 and the user 5.104. However, in such cases the text may still be used by the AEFS 5.100 to narrow the set of potential speakers, and may be combined with (or used to improve) other techniques for speaker identification, including speaker recognition as discussed above.

The AEFS 5.100 then determines speaker-related information associated with the speaker 5.102. The speaker-related information may be a name or other identifier of the speaker. The speaker-related information may also or instead be other information about or related to the speaker, such as an organization of the speaker, an information item that references the speaker, an event involving the speaker, or the like. The speaker-related information may be determined with reference to the messages 5.130*a*, documents 5.130*b*, and/or audio data 5.130*c*. For example, having determined the identity of the speaker 5.102, the AEFS 5.100 may search for emails and/or documents that are stored as messages 5.130*a* and/or documents 5.103*b* and that reference (e.g., are sent to, are authored by, are named in) the speaker 5.102.

Other types of speaker-related information is contemplated, including social networking information, such as personal or professional relationship graphs represented by a social networking service, messages or status updates sent within a social network, or the like. Social networking information may also be derived from other sources, including email lists, contact lists, communication patterns (e.g., frequent recipients of emails), or the like.

The AEFS 5.100 then informs the user 5.104 of the determined speaker-related information. Informing the user may include visually presenting the information, such as on the display 5.121 of hearing device 5.120. In the illustrated example, the AEFS 5.100 causes a message 5.112 that includes the text "That's Bill" to be displayed on the display 5.121. Upon reading the message 5.112 and thereby learning the identity of the speaker 5.102, the user 5.104 responds to the speaker's original utterance 5.110 by with a response utterance 5.114 by speaking the words "Hi Bill!" As the speaker 5.102 and the user 5.104 continue to speak, the AEFS 5.100 may monitor the conversation and continue to determine and present speaker-related information to the user 5.102.

Figure 5B:
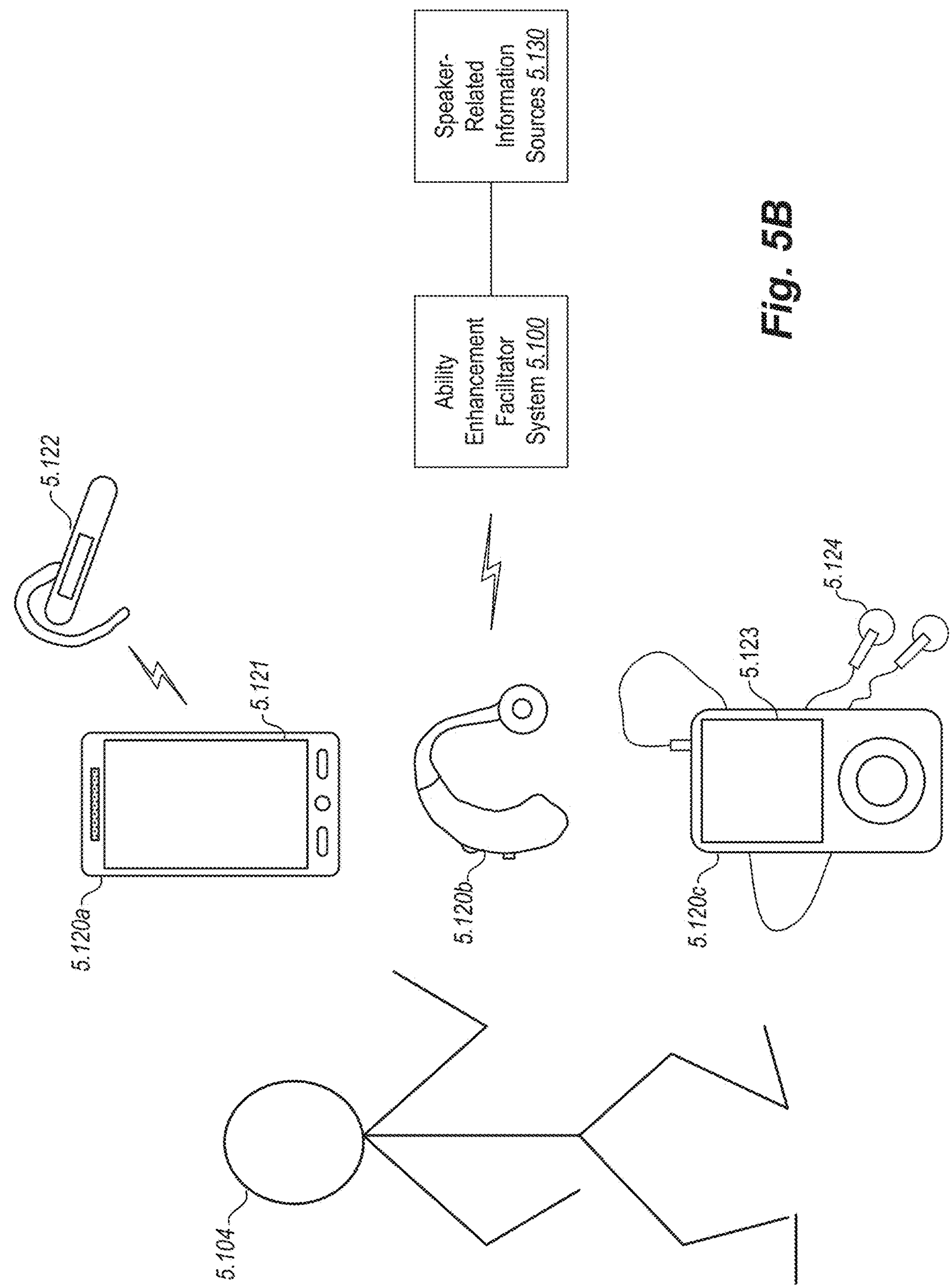
FIG. 5B is an example block diagram illustrating various hearing devices according to example embodiments.

FIG. 5B is an example block diagram illustrating various hearing devices according to example embodiments. In particular, FIG. 5B illustrates an AEFS 5.100 in wireless communication with example hearing devices 5.120*a*-120*c*. Hearing device 5.120*a* is a smart phone in communication with a wireless (e.g., Bluetooth) earpiece 5.122. Hearing device 5.120*a* includes a display 5.121. Hearing device 5.120*b* is a hearing aid device. Hearing device 5.120*c* is a personal media player that includes a display 5.123 and attached "earbud" earphones 5.124. Each of the illustrated hearing devices 5.120 includes or may be communicatively coupled to a microphone operable to receive a speech signal from a speaker. As described above, the hearing device 5.120 may then convert the speech signal into data representing the speech signal, and then forward the data to the AEFS 5.100.

The AEFS 5.100 may cause speaker-related information to be displayed in various ways or places. In some embodiments, the AEFS 5.100 may use a display of a hearing device as a target for displaying speaker-related information. For example, the AEFS 5.100 may display speaker-related information on the display 5.121 of the smart phone 5.120*a*. When the hearing device does not have its own display, such as hearing aid device 5.120*b*, the AEFS 5.100 may display speaker-related information on some other destination display that is accessible to the user 5.104. For example, when the hearing aid device 5.120*b* is the hearing device and the user also has the personal media player 5.120*c* in his possession, the AEFS 5.100 may elect to display speaker-related information upon the display 5.123 of the personal media player 5.120*c*.

The AEFS 5.100 may determine a destination display for speaker-related information. In some embodiments, determining a destination display may include selecting from one of multiple possible destination displays based on whether a display is capable of displaying all of the speaker-related information. For example, if the user 5.104 is proximate to a first display that is capable of displaying only text and a second display capable of displaying graphics, the AEFS 5.100 may select the second display when the speaker-related information includes graphics content (e.g., an image). In some embodiments, determining a destination display may include selecting from one of multiple possible destination displays based on the size of each display. For example, a small LCD display (such as may be found on a mobile phone) may be suitable for displaying speaker-related information that is just a few characters (e.g., a name) but not be suitable for displaying an entire email message or large document. Note that the AEFS 5.100 may select between multiple potential target displays even when the hearing device itself includes its own display.

Determining a destination display may be based on other or additional factors. In some embodiments, the AEFS 5.100 may use user preferences that have been inferred (e.g., based on current or prior interactions with the user 5.104) and/or explicitly provided by the user. For example, the AEFS 5.100 may determine to present an email or other speaker-related information onto the display 5.121 of the smart phone 5.120*a* based on the fact that the user 5.104 is currently interacting with the smart phone 5.120*a*.

In some embodiments, the AEFS 5.100 may also use audio signals to interact with the user 5.104. In particular, each of the illustrated hearing devices 5.120 may include or be communicatively coupled to a speaker operable to generate and output audio signals that may be perceived by the user 5.104. The AEFS 5.100 may audibly notify, via a speaker of a hearing device 5.120, the user 5.104 to view speaker-related information displayed on the hearing device 5.120. For example, the AEFS 5.100 may cause a tone (e.g., beep, chime) to be played via the earphones 5.124 of the personal media player hearing device 5.120*c*. Such a tone may then be recognized by the user 5.104, who will in response attend to information displayed on the display 5.123. Such audible notification may be used to identify a display that is being used as a current display, such as when multiple displays are being used. For example, different first and second tones may be used to direct the user's attention to a desktop display and a smart phone display, respectively. In some embodiments, audible notification may include playing synthesized speech (e.g., from text-to-speech processing) telling the user 5.104 to view speaker-related information on a particular display device (e.g., "Recent email on your smart phone").

Note that although the AEFS 5.100 is shown as being separate from a hearing device 5.120, some or all of the functions of the AEFS 5.100 may be performed within or by the hearing device 5.120 itself. For example, the smart phone hearing device 5.120*a* and/or the media player hearing device 5.120*c* may have sufficient processing power to perform all or some functions of the AEFS 5.100, including speaker identification (e.g., speaker recognition, speech recognition), determining speaker-related information, presenting the determined information, or the like. In some embodiments, the hearing device 5.120 includes logic to determine where to perform various processing tasks, so as to advantageously distribute processing between available resources, including that of the hearing device 5.120, other nearby devices (e.g., a laptop or other computing device of the user 5.104 and/or the speaker 5.102), remote devices (e.g., "cloud-based" processing and/or storage), and the like.

Other types of hearing devices are contemplated. For example, a land-line telephone may be configured to operate as a hearing device, so that the AEFS 5.100 can determine speaker-related information about speakers who are engaged in a conference call. As another example, a hearing device may be or be part of a desktop computer, laptop computer, PDA, tablet computer, or the like.

Figure 6:
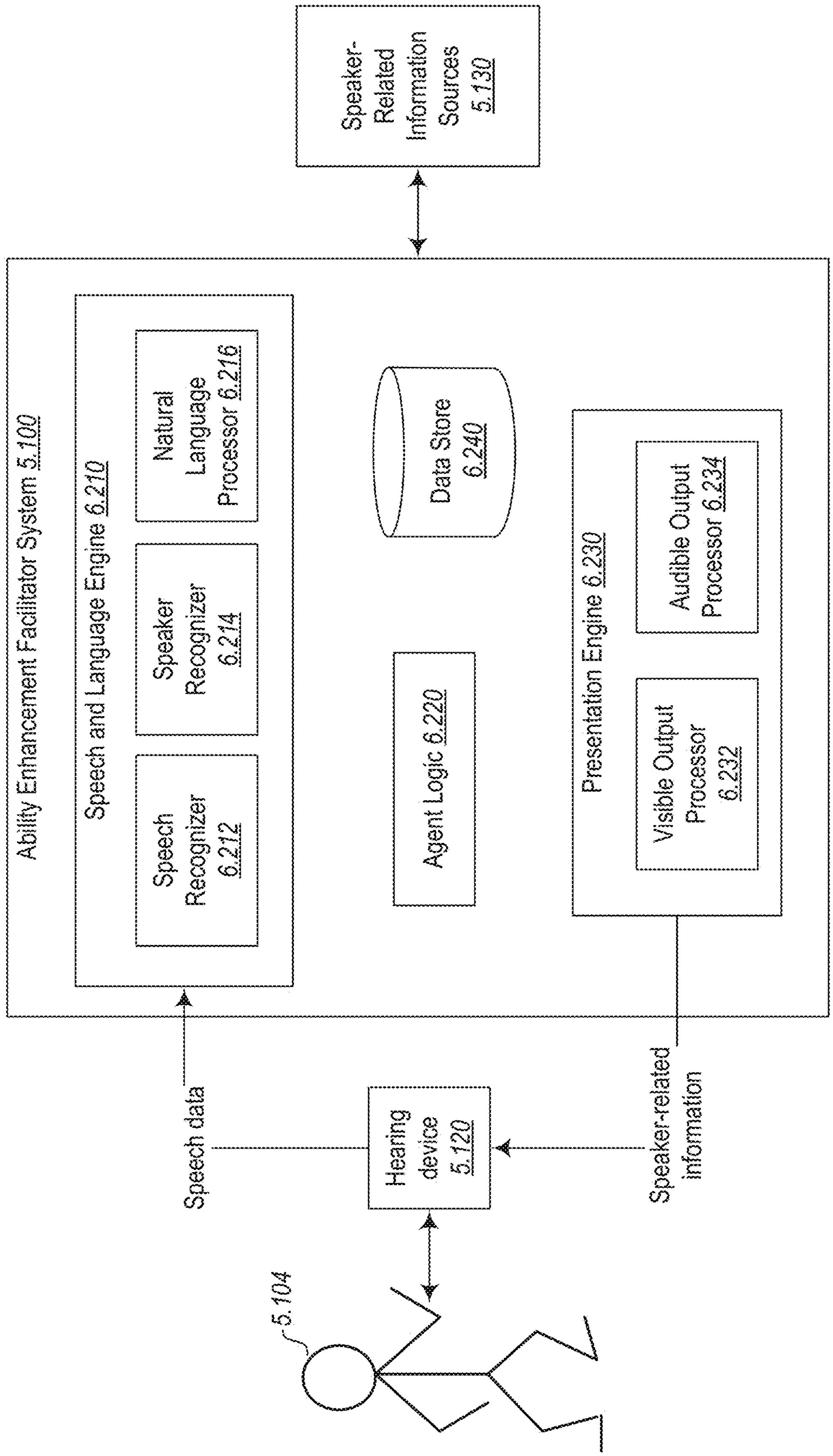
FIG. 6 is an example functional block diagram of an example ability enhancement facilitator system according to an example embodiment.

FIG. 6 is an example functional block diagram of an example ability enhancement facilitator system according to an example embodiment. In the illustrated embodiment of FIG. 6, the AEFS 5.100 includes a speech and language engine 6.210, agent logic 6.220, a presentation engine 6.230, and a data store 6.240.

The speech and language engine 6.210 includes a speech recognizer 6.212, a speaker recognizer 6.214, and a natural language processor 6.216. The speech recognizer 6.212 transforms speech audio data received from the hearing device 5.120 into textual representation of an utterance represented by the speech audio data. In some embodiments, the performance of the speech recognizer 6.212 may be improved or augmented by use of a language model (e.g., representing likelihoods of transitions between words, such as based on n-grams) or speech model (e.g., representing acoustic properties of a speaker's voice) that is tailored to or based on an identified speaker. For example, once a speaker has been identified, the speech recognizer 6.212 may use a language model that was previously generated based on a corpus of communications and other information items authored by the identified speaker. A speaker-specific language model may be generated based on a corpus of documents and/or messages authored by a speaker. Speaker-specific speech models may be used to account for accents or channel properties (e.g., due to environmental factors or communication equipment) that are specific to a particular speaker, and may be generated based on a corpus of recorded speech from the speaker.

The speaker recognizer 6.214 identifies the speaker based on acoustic properties of the speaker's voice, as reflected by the speech data received from the hearing device 5.120. The speaker recognizer 6.214 may compare a speaker voice print to previously generated and recorded voice prints stored in the data store 6.240 in order to find a best or likely match. Voice prints or other signal properties may be determined with reference to voice mail messages, voice chat data, or some other corpus of speech data.

The natural language processor 6.216 processes text generated by the speech recognizer 6.212 and/or located in information items obtained from the speaker-related information sources 5.130. In doing so, the natural language processor 6.216 may identify relationships, events, or entities (e.g., people, places, things) that may facilitate speaker identification and/or other functions of the AEFS 5.100. For example, the natural language processor 6.216 may process status updates posted by the user 5.104 on a social networking service, to determine that the user 5.104 recently attended a conference in a particular city, and this fact may be used to identify a speaker and/or determine other speaker-related information.

The agent logic 6.220 implements the core intelligence of the AEFS 5.100. The agent logic 6.220 may include a reasoning engine (e.g., a rules engine, decision trees, Bayesian inference engine) that combines information from multiple sources to identify speakers and/or determine speaker-related information. For example, the agent logic 6.220 may combine spoken text from the speech recognizer 6.212, a set of potentially matching speakers from the speaker recognizer 6.214, and information items from the information sources 5.130, in order to determine the most likely identity of the current speaker.

The presentation engine 6.230 includes a visible output processor 6.232 and an audible output processor 6.234. The visible output processor 6.232 may prepare, format, and/or cause speaker-related information to be displayed on a display device, such as a display of the hearing device 5.120 or some other display (e.g., a desktop or laptop display in proximity to the user 5.104). The agent logic 6.220 may use or invoke the visible output processor 6.232 to prepare and display speaker-related information, such as by formatting or otherwise modifying the speaker-related information to fit on a particular type or size of display. The audible output processor 6.234 may include or use other components for generating audible output, such as tones, sounds, voices, or the like. In some embodiments, the agent logic 6.220 may use or invoke the audible output processor 6.234 in order to convert textual speaker-related information into audio output suitable for presentation via the hearing device 5.120, for example by employing a text-to-speech processor.

Note that although speaker identification is herein sometimes described as including the positive identification of a single speaker, it may instead or also include determining likelihoods that each of one or more persons is the current speaker. For example, the speaker recognizer 6.214 may provide to the agent logic 6.220 indications of multiple candidate speakers, each having a corresponding likelihood. The agent logic 6.220 may then select the most likely candidate based on the likelihoods alone or in combination with other information, such as that provided by the speech recognizer 6.212, natural language processor 6.216, speaker-related information sources 5.130, or the like. In some cases, such as when there are a small number of reasonably likely candidate speakers, the agent logic 6.220 may inform the user 5.104 of the identities all of the candidate speakers (as opposed to a single speaker) candidate speaker, as such information may be sufficient to trigger the user's recall.

B. Example Processes

FIGS. 7.1-7.81 are example flow diagrams of ability enhancement processes performed by example embodiments.

FIG. 7.1 is an example flow diagram of example logic for ability enhancement. The illustrated logic in this and the following flow diagrams may be performed by, for example, a hearing device 5.120 and/or one or more components of the AEFS 5.100 described with respect to FIG. 6, above. More particularly, FIG. 7.1 illustrates a process 7.100 that includes operations performed by or at the following block(s).

At block 7.101, the process performs receiving data representing a speech signal obtained at a hearing device associated with a user, the speech signal representing an utterance of a speaker. The received data may be or represent the speech signal itself (e.g., audio samples) and/or higher-order information (e.g., frequency coefficients). The data may be received by or at the hearing device 5.120 and/or the AEFS 5.100.

At block 7.102, the process performs identifying the speaker based on the data representing the speech signal. Identifying the speaker may be based on signal properties of the speech signal (e.g., a voice print) and/or on the content of the utterance, such as a name, event, entity, or information item that was mentioned by the speaker and that can be used to infer the identity of the speaker.

At block 7.103, the process performs determining speaker-related information associated with the identified speaker. The speaker-related information may include identifiers of the speaker (e.g., names, titles) and/or related information, including information items that reference the speaker, such as documents, emails, calendar events, or the like.

At block 7.104, the process performs visually presenting the speaker-related information to the user. The speaker-related information may be presented on a display of the hearing device (if it has one) or on some other display, such as a laptop or desktop display that is proximately located to the user.

FIG. 7.2 is an example flow diagram of example logic illustrating an example embodiment of process 7.100 of FIG. 7.1. More particularly, FIG. 7.2 illustrates a process 7.200 that includes the process 7.100, wherein the visually presenting the speaker-related information includes operations performed by or at one or more of the following block(s).

At block 7.201, the process performs presenting the speaker-related information on a display of the hearing device. In some embodiments, the hearing device may include a display. For example, where the hearing device is a smart phone or media player/device, the hearing device may include a display that provides a suitable medium for presenting the name or other identifier of the speaker.

FIG. 7.3 is an example flow diagram of example logic illustrating an example embodiment of process 7.100 of FIG. 7.1. More particularly, FIG. 7.3 illustrates a process 7.300 that includes the process 7.100, wherein the visually presenting the speaker-related information includes operations performed by or at one or more of the following block(s).

At block 7.301, the process performs presenting the speaker-related information on a display of a computing device that is distinct from the hearing device. In some embodiments, the hearing device may not itself include a display. For example, where the hearing device is an office phone, the process may elect to present the speaker-related information on a display of a nearby computing device, such as a desktop or laptop computer in the vicinity of the phone.

FIG. 7.4 is an example flow diagram of example logic illustrating an example embodiment of process 7.100 of FIG. 7.1. More particularly, FIG. 7.4 illustrates a process 7.400 that includes the process 7.100, wherein the visually presenting the speaker-related information includes operations performed by or at one or more of the following block(s).

At block 7.401, the process performs determining a display to serve as a destination for the speaker-related information. In some embodiments, there may be multiple displays available as possible destinations for the speaker-related information. For example, in an office setting, where the hearing device is an office phone, the office phone may include a small LCD display suitable for displaying a few characters or at most a few lines of text. However, there will typically be additional devices in the vicinity of the hearing device, such as a desktop/laptop computer, a smart phone, a PDA, or the like. The process may determine to use one or more of these other display devices, possibly based on the type of the speaker-related information being displayed.

FIG. 7.5 is an example flow diagram of example logic illustrating an example embodiment of process 7.400 of FIG. 7.4. More particularly, FIG. 7.5 illustrates a process 7.500 that includes the process 7.400, wherein the determining a display includes operations performed by or at one or more of the following block(s).

At block 7.501, the process performs selecting from one of multiple displays, based at least in part on whether each of the multiple displays is capable of displaying all of the speaker-related information. In some embodiments, the process determines whether all of the speaker-related information can be displayed on a given display. For example, where the display is a small alphanumeric display on an office phone, the process may determine that the display is not capable of displaying a large amount of speaker-related information.

FIG. 7.6 is an example flow diagram of example logic illustrating an example embodiment of process 7.400 of FIG. 7.4. More particularly, FIG. 7.6 illustrates a process 7.600 that includes the process 7.400, wherein the determining a display includes operations performed by or at one or more of the following block(s).

At block 7.601, the process performs selecting from one of multiple displays, based at least in part on a size of each of the multiple displays. In some embodiments, the process considers the size (e.g., the number of characters or pixels that can be displayed) of each display.

FIG. 7.7 is an example flow diagram of example logic illustrating an example embodiment of process 7.400 of FIG. 7.4. More particularly, FIG. 7.7 illustrates a process 7.700 that includes the process 7.400, wherein the determining a display includes operations performed by or at one or more of the following block(s).

At block 7.701, the process performs selecting from one of multiple displays, based at least in part on whether each of the multiple displays is suitable for displaying the speaker-related information, the speaker-related information being at least one of text information, a communication, a document, an image, and/or a calendar event. In some embodiments, the process considers the type of the speaker-related information. For example, whereas a small alphanumeric display on an office phone may be suitable for displaying the name of the speaker, it would not be suitable for displaying an email message sent by the speaker.

FIG. 7.8 is an example flow diagram of example logic illustrating an example embodiment of process 7.100 of FIG. 7.1. More particularly, FIG. 7.8 illustrates a process 7.800 that includes the process 7.100, and which further includes operations performed by or at the following block(s).

At block 7.801, the process performs audibly notifying the user to view the speaker-related information on a display device.

FIG. 7.9 is an example flow diagram of example logic illustrating an example embodiment of process 7.800 of FIG. 7.8. More particularly, FIG. 7.9 illustrates a process 7.900 that includes the process 7.800, wherein the audibly notifying the user includes operations performed by or at one or more of the following block(s).

At block 7.901, the process performs playing a tone via an audio speaker of the hearing device. The tone may include a beep, chime, or other type of notification.

FIG. 7.10 is an example flow diagram of example logic illustrating an example embodiment of process 7.800 of FIG. 7.8. More particularly, FIG. 7.10 illustrates a process 7.1000 that includes the process 7.800, wherein the audibly notifying the user includes operations performed by or at one or more of the following block(s).

At block 7.1001, the process performs playing synthesized speech via an audio speaker of the hearing device, the synthesized speech telling the user to view the display device. In some embodiments, the process may perform text-to-speech processing to generate audio of a textual message or notification, and this audio may then be played or otherwise output to the user via the hearing device.

FIG. 7.11 is an example flow diagram of example logic illustrating an example embodiment of process 7.800 of FIG. 7.8. More particularly, FIG. 7.11 illustrates a process 7.1100 that includes the process 7.800, wherein the audibly notifying the user includes operations performed by or at one or more of the following block(s).

At block 7.1101, the process performs telling the user that at least one of a document, a calendar event, and/or a communication is available for viewing on the display device. Telling the user about a document or other speaker-related information may include playing synthesized speech that includes an utterance to that effect.

FIG. 7.12 is an example flow diagram of example logic illustrating an example embodiment of process 7.800 of FIG. 7.8. More particularly, FIG. 7.12 illustrates a process 7.1200 that includes the process 7.800, wherein the audibly notifying the user includes operations performed by or at one or more of the following block(s).

At block 7.1201, the process performs audibly notifying the user in a manner that is not audible to the speaker. For example, a tone or verbal message may be output via an earpiece speaker, such that other parties to the conversation (including the speaker) do not hear the notification. As another example, a tone or other notification may be into the earpiece of a telephone, such as when the process is performing its functions within the context of a telephonic conference call.

FIG. 7.13 is an example flow diagram of example logic illustrating an example embodiment of process 7.100 of FIG. 7.1. More particularly, FIG. 7.13 illustrates a process 7.1300 that includes the process 7.100, wherein the visually presenting the speaker-related information includes operations performed by or at one or more of the following block(s).

At block 7.1301, the process performs informing the user of an identifier of the speaker. In some embodiments, the identifier of the speaker may be or include a given name, surname (e.g., last name, family name), nickname, title, job description, or other type of identifier of or associated with the speaker.

FIG. 7.14 is an example flow diagram of example logic illustrating an example embodiment of process 7.100 of FIG. 7.1. More particularly, FIG. 7.14 illustrates a process 7.1400 that includes the process 7.100, wherein the visually presenting the speaker-related information includes operations performed by or at one or more of the following block(s).

At block 7.1401, the process performs informing the user of information aside from identifying information related to the speaker. In some embodiments, information aside from identifying information may include information that is not a name or other identifier (e.g., job title) associated with the speaker. For example, the process may tell the user about an event or communication associated with or related to the speaker.

FIG. 7.15 is an example flow diagram of example logic illustrating an example embodiment of process 7.100 of FIG. 7.1. More particularly, FIG. 7.15 illustrates a process 7.1500 that includes the process 7.100, wherein the visually presenting the speaker-related information includes operations performed by or at one or more of the following block(s).

At block 7.1501, the process performs informing the user of an organization to which the speaker belongs. In some embodiments, informing the user of an organization may include notifying the user of a business, group, school, club, team, company, or other formal or informal organization with which the speaker is affiliated.

FIG. 7.16 is an example flow diagram of example logic illustrating an example embodiment of process 7.1500 of FIG. 7.15. More particularly, FIG. 7.16 illustrates a process 7.1600 that includes the process 7.1500, wherein the informing the user of an organization includes operations performed by or at one or more of the following block(s).

At block 7.1601, the process performs informing the user of a company associated with the speaker. Companies may include profit or non-profit entities, regardless of organizational structure (e.g., corporation, partnerships, sole proprietorship).

FIG. 7.17 is an example flow diagram of example logic illustrating an example embodiment of process 7.100 of FIG. 7.1. More particularly, FIG. 7.17 illustrates a process 7.1700 that includes the process 7.100, wherein the visually presenting the speaker-related information includes operations performed by or at one or more of the following block(s).

At block 7.1701, the process performs informing the user of a previously transmitted communication referencing the speaker. Various forms of communication are contemplated, including textual (e.g., emails, text messages, chats), audio (e.g., voice messages), video, or the like. In some embodiments, a communication can include content in multiple forms, such as text and audio, such as when an email includes a voice attachment.

FIG. 7.18 is an example flow diagram of example logic illustrating an example embodiment of process 7.1700 of FIG. 7.17. More particularly, FIG. 7.18 illustrates a process 7.1800 that includes the process 7.1700, wherein the informing the user of a previously transmitted communication includes operations performed by or at one or more of the following block(s).

At block 7.1801, the process performs informing the user of an email transmitted between the speaker and the user. An email transmitted between the speaker and the user may include an email sent from the speaker to the user, or vice versa.

FIG. 7.19 is an example flow diagram of example logic illustrating an example embodiment of process 7.1700 of FIG. 7.17. More particularly, FIG. 7.19 illustrates a process 7.1900 that includes the process 7.1700, wherein the informing the user of a previously transmitted communication includes operations performed by or at one or more of the following block(s).

At block 7.1901, the process performs informing the user of a text message transmitted between the speaker and the user. Text messages may include short messages according to various protocols, including SMS, MMS, and the like.

FIG. 7.20 is an example flow diagram of example logic illustrating an example embodiment of process 7.100 of FIG. 7.1. More particularly, FIG. 7.20 illustrates a process 7.2000 that includes the process 7.100, wherein the visually presenting the speaker-related information includes operations performed by or at one or more of the following block(s).

At block 7.2001, the process performs informing the user of an event involving the user and the speaker. An event may be any occurrence that involves or involved the user and the speaker, such as a meeting (e.g., social or professional meeting or gathering) attended by the user and the speaker, an upcoming deadline (e.g., for a project), or the like.

FIG. 7.21 is an example flow diagram of example logic illustrating an example embodiment of process 7.2000 of FIG. 7.20. More particularly, FIG. 7.21 illustrates a process 7.2100 that includes the process 7.2000, wherein the informing the user of an event includes operations performed by or at one or more of the following block(s).

At block 7.2101, the process performs informing the user of a previously occurring event and/or a future event.

FIG. 7.22 is an example flow diagram of example logic illustrating an example embodiment of process 7.2000 of FIG. 7.20. More particularly, FIG. 7.22 illustrates a process 7.2200 that includes the process 7.2000, wherein the informing the user of an event includes operations performed by or at one or more of the following block(s).

At block 7.2201, the process performs informing the user of at least one of a project, a meeting, and/or a deadline.

FIG. 7.23 is an example flow diagram of example logic illustrating an example embodiment of process 7.100 of FIG. 7.1. More particularly, FIG. 7.23 illustrates a process 7.2300 that includes the process 7.100, wherein the determining speaker-related information includes operations performed by or at one or more of the following block(s).

At block 7.2301, the process performs accessing information items associated with the speaker. In some embodiments, accessing information items associated with the speaker may include retrieving files, documents, data records, or the like from various sources, such as local or remote storage devices, including cloud-based servers, and the like. In some embodiments, accessing information items may also or instead include scanning, searching, indexing, or otherwise processing information items to find ones that include, name, mention, or otherwise reference the speaker.

FIG. 7.24 is an example flow diagram of example logic illustrating an example embodiment of process 7.2300 of FIG. 7.23. More particularly, FIG. 7.24 illustrates a process 7.2400 that includes the process 7.2300, wherein the accessing information items associated with the speaker includes operations performed by or at one or more of the following block(s).

At block 7.2401, the process performs searching for information items that reference the speaker. In some embodiments, searching may include formulating a search query to provide to a document management system or any other data/document store that provides a search interface.

FIG. 7.25 is an example flow diagram of example logic illustrating an example embodiment of process 7.2300 of FIG. 7.23. More particularly, FIG. 7.25 illustrates a process 7.2500 that includes the process 7.2300, wherein the accessing information items associated with the speaker includes operations performed by or at one or more of the following block(s).

At block 7.2501, the process performs searching stored emails to find emails that reference the speaker. In some embodiments, emails that reference the speaker may include emails sent from the speaker, emails sent to the speaker, emails that name or otherwise identify the speaker in the body of an email, or the like.

FIG. 7.26 is an example flow diagram of example logic illustrating an example embodiment of process 7.2300 of FIG. 7.23. More particularly, FIG. 7.26 illustrates a process 7.2600 that includes the process 7.2300, wherein the accessing information items associated with the speaker includes operations performed by or at one or more of the following block(s).

At block 7.2601, the process performs searching stored text messages to find text messages that reference the speaker. In some embodiments, text messages that reference the speaker include messages sent to/from the speaker, messages that name or otherwise identify the speaker in a message body, or the like.

FIG. 7.27 is an example flow diagram of example logic illustrating an example embodiment of process 7.2300 of FIG. 7.23. More particularly, FIG. 7.27 illustrates a process 7.2700 that includes the process 7.2300, wherein the accessing information items associated with the speaker includes operations performed by or at one or more of the following block(s).

At block 7.2701, the process performs accessing a social networking service to find messages or status updates that reference the speaker. In some embodiments, accessing a social networking service may include searching for postings, status updates, personal messages, or the like that have been posted by, posted to, or otherwise reference the speaker. Example social networking services include Facebook, Twitter, Google Plus, and the like. Access to a social networking service may be obtained via an API or similar interface that provides access to social networking data related to the user and/or the speaker.

FIG. 7.28 is an example flow diagram of example logic illustrating an example embodiment of process 7.2300 of FIG. 7.23. More particularly, FIG. 7.28 illustrates a process 7.2800 that includes the process 7.2300, wherein the accessing information items associated with the speaker includes operations performed by or at one or more of the following block(s).

At block 7.2801, the process performs accessing a calendar to find information about appointments with the speaker. In some embodiments, accessing a calendar may include searching a private or shared calendar to locate a meeting or other appointment with the speaker, and providing such information to the user via the hearing device.

FIG. 7.29 is an example flow diagram of example logic illustrating an example embodiment of process 7.2300 of FIG. 7.23. More particularly, FIG. 7.29 illustrates a process 7.2900 that includes the process 7.2300, wherein the accessing information items associated with the speaker includes operations performed by or at one or more of the following block(s).

At block 7.2901, the process performs accessing a document store to find documents that reference the speaker. In some embodiments, documents that reference the speaker include those that are authored at least in part by the speaker, those that name or otherwise identify the speaker in a document body, or the like. Accessing the document store may include accessing a local or remote storage device/system, accessing a document management system, accessing a source control system, or the like.

FIG. 7.30 is an example flow diagram of example logic illustrating an example embodiment of process 7.100 of FIG. 7.1. More particularly, FIG. 7.30 illustrates a process 7.3000 that includes the process 7.100, wherein the identifying the speaker includes operations performed by or at one or more of the following block(s).

At block 7.3001, the process performs performing voice identification based on the received data to identify the speaker. In some embodiments, voice identification may include generating a voice print, voice model, or other biometric feature set that characterizes the voice of the speaker, and then comparing the generated voice print to previously generated voice prints.

FIG. 7.31 is an example flow diagram of example logic illustrating an example embodiment of process 7.3000 of FIG. 7.30. More particularly, FIG. 7.31 illustrates a process 7.3100 that includes the process 7.3000, wherein the performing voice identification includes operations performed by or at one or more of the following block(s).

At block 7.3101, the process performs comparing properties of the speech signal with properties of previously recorded speech signals from multiple distinct speakers. In some embodiments, the process accesses voice prints associated with multiple speakers, and determines a best match against the speech signal.

FIG. 7.32 is an example flow diagram of example logic illustrating an example embodiment of process 7.3100 of FIG. 7.31. More particularly, FIG. 7.32 illustrates a process 7.3200 that includes the process 7.3100, and which further includes operations performed by or at the following block(s).

At block 7.3201, the process performs processing voice messages from the multiple distinct speakers to generate voice print data for each of the multiple distinct speakers. Given a telephone voice message, the process may associate generated voice print data for the voice message with one or more (direct or indirect) identifiers corresponding with the message. For example, the message may have a sender telephone number associated with it, and the process can use that sender telephone number to do a reverse directory lookup (e.g., in a public directory, in a personal contact list) to determine the name of the voice message speaker.

FIG. 7.33 is an example flow diagram of example logic illustrating an example embodiment of process 7.3000 of FIG. 7.30. More particularly, FIG. 7.33 illustrates a process 7.3300 that includes the process 7.3000, wherein the performing voice identification includes operations performed by or at one or more of the following block(s).

At block 7.3301, the process performs processing telephone voice messages stored by a voice mail service. In some embodiments, the process analyzes voice messages to generate voice prints/models for multiple speakers.

FIG. 7.34 is an example flow diagram of example logic illustrating an example embodiment of process 7.100 of FIG. 7.1. More particularly, FIG. 7.34 illustrates a process 7.3400 that includes the process 7.100, wherein the identifying the speaker includes operations performed by or at one or more of the following block(s).

At block 7.3401, the process performs performing speech recognition to convert the received data into text data. For example, the process may convert the received data into a sequence of words that are (or are likely to be) the words uttered by the speaker.

At block 7.3402, the process performs identifying the speaker based on the text data. Given text data (e.g., words spoken by the speaker), the process may search for information items that include the text data, and then identify the speaker based on those information items, as discussed further below.

FIG. 7.35 is an example flow diagram of example logic illustrating an example embodiment of process 7.3400 of FIG. 7.34. More particularly, FIG. 7.35 illustrates a process 7.3500 that includes the process 7.3400, wherein the identifying the speaker based on the text data includes operations performed by or at one or more of the following block(s).

At block 7.3501, the process performs finding a document that references the speaker and that includes one or more words in the text data. In some embodiments, the process may search for and find a document or other item that includes words spoken by speaker. Then, the process can infer that the speaker is the author of the document, a recipient of the document, a person described in the document, or the like.

FIG. 7.36 is an example flow diagram of example logic illustrating an example embodiment of process 7.3400 of FIG. 7.34. More particularly, FIG. 7.36 illustrates a process 7.3600 that includes the process 7.3400, wherein the performing speech recognition includes operations performed by or at one or more of the following block(s).

At block 7.3601, the process performs performing speech recognition based on cepstral coefficients that represent the speech signal. In other embodiments, other types of features or information may be also or instead used to perform speech recognition, including language models, dialect models, or the like.

FIG. 7.37 is an example flow diagram of example logic illustrating an example embodiment of process 7.3400 of FIG. 7.34. More particularly, FIG. 7.37 illustrates a process 7.3700 that includes the process 7.3400, wherein the performing speech recognition includes operations performed by or at one or more of the following block(s).

At block 7.3701, the process performs performing hidden Markov model-based speech recognition. Other approaches or techniques for speech recognition may include neural networks, stochastic modeling, or the like.

FIG. 7.38 is an example flow diagram of example logic illustrating an example embodiment of process 7.3400 of FIG. 7.34. More particularly, FIG. 7.38 illustrates a process 7.3800 that includes the process 7.3400, and which further includes operations performed by or at the following block(s).

At block 7.3801, the process performs retrieving information items that reference the text data. The process may here retrieve or otherwise obtain documents, calendar events, messages, or the like, that include, contain, or otherwise reference some portion of the text data.

At block 7.3802, the process performs informing the user of the retrieved information items.

FIG. 7.39 is an example flow diagram of example logic illustrating an example embodiment of process 7.3400 of FIG. 7.34. More particularly, FIG. 7.39 illustrates a process 7.3900 that includes the process 7.3400, and which further includes operations performed by or at the following block(s).

At block 7.3901, the process performs converting the text data into audio data that represents a voice of a different speaker. In some embodiments, the process may perform this conversion by performing text-to-speech processing to read the text data in a different voice.

At block 7.3902, the process performs causing the audio data to be played through the hearing device.

FIG. 7.40 is an example flow diagram of example logic illustrating an example embodiment of process 7.3400 of FIG. 7.34. More particularly, FIG. 7.40 illustrates a process 7.4000 that includes the process 7.3400, wherein the performing speech recognition includes operations performed by or at one or more of the following block(s).

At block 7.4001, the process performs performing speech recognition based at least in part on a language model associated with the speaker. A language model may be used to improve or enhance speech recognition. For example, the language model may represent word transition likelihoods (e.g., by way of n-grams) that can be advantageously employed to enhance speech recognition. Furthermore, such a language model may be speaker specific, in that it may be based on communications or other information generated by the speaker.

FIG. 7.41 is an example flow diagram of example logic illustrating an example embodiment of process 7.4000 of FIG. 7.40. More particularly, FIG. 7.41 illustrates a process 7.4100 that includes the process 7.4000, wherein the performing speech recognition based at least in part on a language model associated with the speaker includes operations performed by or at one or more of the following block(s).

At block 7.4101, the process performs generating the language model based on communications generated by the speaker. In some embodiments, the process mines or otherwise processes emails, text messages, voice messages, and the like to generate a language model that is specific or otherwise tailored to the speaker.

FIG. 7.42 is an example flow diagram of example logic illustrating an example embodiment of process 7.4100 of FIG. 7.41. More particularly, FIG. 7.42 illustrates a process 7.4200 that includes the process 7.4100, wherein the generating the language model based on communications generated by the speaker includes operations performed by or at one or more of the following block(s).

At block 7.4201, the process performs generating the language model based on emails transmitted by the speaker.

FIG. 7.43 is an example flow diagram of example logic illustrating an example embodiment of process 7.4100 of FIG. 7.41. More particularly, FIG. 7.43 illustrates a process 7.4300 that includes the process 7.4100, wherein the generating the language model based on communications generated by the speaker includes operations performed by or at one or more of the following block(s).

At block 7.4301, the process performs generating the language model based on documents authored by the speaker.

FIG. 7.44 is an example flow diagram of example logic illustrating an example embodiment of process 7.4100 of FIG. 7.41. More particularly, FIG. 7.44 illustrates a process 7.4400 that includes the process 7.4100, wherein the generating the language model based on communications generated by the speaker includes operations performed by or at one or more of the following block(s).

At block 7.4401, the process performs generating the language model based on social network messages transmitted by the speaker.

FIG. 7.45 is an example flow diagram of example logic illustrating an example embodiment of process 7.100 of FIG. 7.1. More particularly, FIG. 7.45 illustrates a process 7.4500 that includes the process 7.100, and which further includes operations performed by or at the following block(s).

At block 7.4501, the process performs receiving data representing a speech signal that represents an utterance of the user. A microphone on or about the hearing device may capture this data. The microphone may be the same or different from one used to capture speech data from the speaker.

At block 7.4502, the process performs identifying the speaker based on the data representing a speech signal that represents an utterance of the user. Identifying the speaker in this manner may include performing speech recognition on the user's utterance, and then processing the resulting text data to locate a name. This identification can then be utilized to retrieve information items or other speaker-related information that may be useful to present to the user.

FIG. 7.46 is an example flow diagram of example logic illustrating an example embodiment of process 7.4500 of FIG. 7.45. More particularly, FIG. 7.46 illustrates a process 7.4600 that includes the process 7.4500, wherein the identifying the speaker based on the data representing a speech signal that represents an utterance of the user includes operations performed by or at one or more of the following block(s).

At block 7.4601, the process performs determining whether the utterance of the user includes a name of the speaker.

FIG. 7.47 is an example flow diagram of example logic illustrating an example embodiment of process 7.100 of FIG. 7.1. More particularly, FIG. 7.47 illustrates a process 7.4700 that includes the process 7.100, wherein the identifying the speaker includes operations performed by or at one or more of the following block(s).

At block 7.4701, the process performs receiving context information related to the user. Context information may generally include information about the setting, location, occupation, communication, workflow, or other event or factor that is present at, about, or with respect to the user.

At block 7.4702, the process performs identifying the speaker, based on the context information. Context information may be used to improve or enhance speaker identification, such as by determining or narrowing a set of potential speakers based on the current location of the user FIG. 7.48 is an example flow diagram of example logic illustrating an example embodiment of process 7.4700 of FIG. 7.47. More particularly, FIG. 7.48 illustrates a process 7.4800 that includes the process 7.4700, wherein the receiving context information related to the user includes operations performed by or at one or more of the following block(s).

At block 7.4801, the process performs receiving an indication of a location of the user.

At block 7.4802, the process performs determining a plurality of persons with whom the user commonly interacts at the location. For example, if the indicated location is a workplace, the process may generate a list of co-workers, thereby reducing or simplifying the problem of speaker identification.

FIG. 7.49 is an example flow diagram of example logic illustrating an example embodiment of process 7.4800 of FIG. 7.48. More particularly, FIG. 7.49 illustrates a process 7.4900 that includes the process 7.4800, wherein the receiving an indication of a location of the user includes operations performed by or at one or more of the following block(s).

At block 7.4901, the process performs receiving a GPS location from a mobile device of the user.

FIG. 7.50 is an example flow diagram of example logic illustrating an example embodiment of process 7.4800 of FIG. 7.48. More particularly, FIG. 7.50 illustrates a process 7.5000 that includes the process 7.4800, wherein the receiving an indication of a location of the user includes operations performed by or at one or more of the following block(s).

At block 7.5001, the process performs receiving a network identifier that is associated with the location. The network identifier may be, for example, a service set identifier ("SSID") of a wireless network with which the user is currently associated.

FIG. 7.51 is an example flow diagram of example logic illustrating an example embodiment of process 7.4800 of FIG. 7.48. More particularly, FIG. 7.51 illustrates a process 7.5100 that includes the process 7.4800, wherein the receiving an indication of a location of the user includes operations performed by or at one or more of the following block(s).

At block 7.5101, the process performs receiving an indication that the user is at a workplace. For example, the process may translate a coordinate-based location (e.g., GPS coordinates) to a particular workplace by performing a map lookup or other mechanism.

FIG. 7.52 is an example flow diagram of example logic illustrating an example embodiment of process 7.4800 of FIG. 7.48. More particularly, FIG. 7.52 illustrates a process 7.5200 that includes the process 7.4800, wherein the receiving an indication of a location of the user includes operations performed by or at one or more of the following block(s).

At block 7.5201, the process performs receiving an indication that the user is at a residence.

FIG. 7.53 is an example flow diagram of example logic illustrating an example embodiment of process 7.4700 of FIG. 7.47. More particularly, FIG. 7.53 illustrates a process 7.5300 that includes the process 7.4700, wherein the receiving context information related to the user includes operations performed by or at one or more of the following block(s).

At block 7.5301, the process performs receiving information about a communication that references the speaker. As noted, context information may include communications. In this case, the process may exploit such communications to improve speaker identification or other operations.

FIG. 7.54 is an example flow diagram of example logic illustrating an example embodiment of process 7.5300 of FIG. 7.53. More particularly, FIG. 7.54 illustrates a process 7.5400 that includes the process 7.5300, wherein the receiving information about a communication that references the speaker includes operations performed by or at one or more of the following block(s).

At block 7.5401, the process performs receiving information about a message and/or a document that references the speaker.

FIG. 7.55 is an example flow diagram of example logic illustrating an example embodiment of process 7.100 of FIG. 7.1. More particularly, FIG. 7.55 illustrates a process 7.5500 that includes the process 7.100, and which further includes operations performed by or at the following block(s).

At block 7.5501, the process performs receiving data representing an ongoing conversation amongst multiple speakers. In some embodiments, the process is operable to identify multiple distinct speakers, such as when a group is meeting via a conference call.

At block 7.5502, the process performs identifying the multiple speakers based on the data representing the ongoing conversation.

At block 7.5503, the process performs as each of the multiple speakers takes a turn speaking during the ongoing conversation, informing the user of a name or other speaker-related information associated with the speaker. In this manner, the process may, in substantially real time, provide the user with indications of a current speaker, even though such a speaker may not be visible or even previously known to the user.

FIG. 7.56 is an example flow diagram of example logic illustrating an example embodiment of process 7.5500 of FIG. 7.55. More particularly, FIG. 7.56 illustrates a process 7.5600 that includes the process 7.5500, wherein the receiving data representing an ongoing conversation amongst multiple speakers includes operations performed by or at one or more of the following block(s).

At block 7.5601, the process performs receiving audio data from a telephonic conference call, the received audio data representing utterances made by at least one of the multiple speakers.

FIG. 7.57 is an example flow diagram of example logic illustrating an example embodiment of process 7.5500 of FIG. 7.55. More particularly, FIG. 7.57 illustrates a process 7.5700 that includes the process 7.5500, and which further includes operations performed by or at the following block(s).

At block 7.5701, the process performs presenting, while a current speaker is speaking, speaker-related information on a display device of the user, the displayed speaker-related information identifying the current speaker. For example, as the user engages in a conference call from his office, the process may present the name or other information about the current speaker on a display of a desktop computer in the office of the user.

FIG. 7.58 is an example flow diagram of example logic illustrating an example embodiment of process 7.100 of FIG. 7.1. More particularly, FIG. 7.58 illustrates a process 7.5800 that includes the process 7.100, and which further includes operations performed by or at the following block(s).

At block 7.5801, the process performs developing a corpus of speaker data by recording speech from a plurality of speakers.

At block 7.5802, the process performs identifying the speaker based at least in part on the corpus of speaker data. Over time, the process may gather and record speech obtained during its operation, and then use that speech as part of a corpus that is used during future operation. In this manner, the process may improve its performance by utilizing actual, environmental speech data, possibly along with feedback received from the user, as discussed below.

FIG. 7.59 is an example flow diagram of example logic illustrating an example embodiment of process 7.5800 of FIG. 7.58. More particularly, FIG. 7.59 illustrates a process 7.5900 that includes the process 7.5800, and which further includes operations performed by or at the following block(s).

At block 7.5901, the process performs generating a speech model associated with each of the plurality of speakers, based on the recorded speech. The generated speech model may include voice print data that can be used for speaker identification, a language model that may be used for speech recognition purposes, a noise model that may be used to improve operation in speaker-specific noisy environments.

FIG. 7.60 is an example flow diagram of example logic illustrating an example embodiment of process 7.5800 of FIG. 7.58. More particularly, FIG. 7.60 illustrates a process 7.6000 that includes the process 7.5800, and which further includes operations performed by or at the following block(s).

At block 7.6001, the process performs receiving feedback regarding accuracy of the speaker-related information. During or after providing speaker-related information to the user, the user may provide feedback regarding its accuracy. This feedback may then be used to train a speech processor (e.g., a speaker identification module, a speech recognition module). Feedback may be provided in various ways, such as by processing positive/negative utterances from the speaker (e.g., "That is not my name"), receiving a positive/negative utterance from the user (e.g., "I am sorry."), receiving a keyboard/button event that indicates a correct or incorrect identification.

At block 7.6002, the process performs training a speech processor based at least in part on the received feedback.

FIG. 7.61 is an example flow diagram of example logic illustrating an example embodiment of process 7.100 of FIG. 7.1. More particularly, FIG. 7.61 illustrates a process 7.6100 that includes the process 7.100, wherein the visually presenting the speaker-related information includes operations performed by or at one or more of the following block(s).

At block 7.6101, the process performs transmitting the speaker-related information from a first device to a second device having a display. In some embodiments, at least some of the processing may be performed on distinct devices, resulting in a transmission of speaker-related information from one device to the device having the display.

FIG. 7.62 is an example flow diagram of example logic illustrating an example embodiment of process 7.6100 of FIG. 7.61. More particularly, FIG. 7.62 illustrates a process 7.6200 that includes the process 7.6100, wherein the transmitting the speaker-related information from a first device to a second device includes operations performed by or at one or more of the following block(s).

At block 7.6201, the process performs wirelessly transmitting the speaker-related information. Various protocols may be used, including Bluetooth, infrared, WiFi, or the like.

FIG. 7.63 is an example flow diagram of example logic illustrating an example embodiment of process 7.6100 of FIG. 7.61. More particularly, FIG. 7.63 illustrates a process 7.6300 that includes the process 7.6100, wherein the transmitting the speaker-related information from a first device to a second device includes operations performed by or at one or more of the following block(s).

At block 7.6301, the process performs transmitting the speaker-related information from a smart phone or portable media player to the second device. For example a smart phone may forward the speaker-related information to a desktop computing system for display on an associated monitor.

FIG. 7.64 is an example flow diagram of example logic illustrating an example embodiment of process 7.6100 of FIG. 7.61. More particularly, FIG. 7.64 illustrates a process 7.6400 that includes the process 7.6100, wherein the transmitting the speaker-related information from a first device to a second device includes operations performed by or at one or more of the following block(s).

At block 7.6401, the process performs transmitting the speaker-related information from a server system to the second device. In some embodiments, some portion of the processing is performed on a server system that may be remote from the hearing device.

FIG. 7.65 is an example flow diagram of example logic illustrating an example embodiment of process 7.6400 of FIG. 7.64. More particularly, FIG. 7.65 illustrates a process 7.6500 that includes the process 7.6400, wherein the transmitting the speaker-related information from a server system includes operations performed by or at one or more of the following block(s).

At block 7.6501, the process performs transmitting the speaker-related information from a server system that resides in a data center.

FIG. 7.66 is an example flow diagram of example logic illustrating an example embodiment of process 7.6400 of FIG. 7.64. More particularly, FIG. 7.66 illustrates a process 7.6600 that includes the process 7.6400, wherein the transmitting the speaker-related information from a server system includes operations performed by or at one or more of the following block(s).

At block 7.6601, the process performs transmitting the speaker-related information from a server system to a desktop computer of the user.

FIG. 7.67 is an example flow diagram of example logic illustrating an example embodiment of process 7.6400 of FIG. 7.64. More particularly, FIG. 7.67 illustrates a process 7.6700 that includes the process 7.6400, wherein the transmitting the speaker-related information from a server system includes operations performed by or at one or more of the following block(s).

At block 7.6701, the process performs transmitting the speaker-related information from a server system to a mobile device of the user.

FIG. 7.68 is an example flow diagram of example logic illustrating an example embodiment of process 7.100 of FIG. 7.1. More particularly, FIG. 7.68 illustrates a process 7.6800 that includes the process 7.100, and which further includes operations performed by or at the following block(s).

At block 7.6801, the process performs performing the receiving data representing a speech signal, the identifying the speaker, and/or the determining speaker-related information on a mobile device that is operated by the user. As noted, In some embodiments a mobile device such as a smart phone or media player may have sufficient processing power to perform a portion of the process, such as identifying the speaker, determining the speaker-related information, or the like.

FIG. 7.69 is an example flow diagram of example logic illustrating an example embodiment of process 7.6800 of FIG. 7.68. More particularly, FIG. 7.69 illustrates a process 7.6900 that includes the process 7.6800, wherein the identifying the speaker includes operations performed by or at one or more of the following block(s).

At block 7.6901, the process performs identifying the speaker, performed on a smart phone or a media player that is operated by the user.

FIG. 7.70 is an example flow diagram of example logic illustrating an example embodiment of process 7.100 of FIG. 7.1. More particularly, FIG. 7.70 illustrates a process 7.7000 that includes the process 7.100, and which further includes operations performed by or at the following block(s).

At block 7.7001, the process performs performing the receiving data representing a speech signal, the identifying the speaker, and/or the determining speaker-related information on a desktop computer that is operated by the user. For example, in an office setting, the user's desktop computer may be configured to perform some or all of the process.

FIG. 7.71 is an example flow diagram of example logic illustrating an example embodiment of process 7.100 of FIG. 7.1. More particularly, FIG. 7.71 illustrates a process 7.7100 that includes the process 7.100, and which further includes operations performed by or at the following block(s).

At block 7.7101, the process performs determining to perform at least some of identifying the speaker or determining speaker-related information on another computing device that has available processing capacity. In some embodiments, the process may determine to offload some of its processing to another computing device or system.

FIG. 7.72 is an example flow diagram of example logic illustrating an example embodiment of process 7.7100 of FIG. 7.71. More particularly, FIG. 7.72 illustrates a process 7.7200 that includes the process 7.7100, and which further includes operations performed by or at the following block(s).

At block 7.7201, the process performs receiving at least some of speaker-related information from the another computing device. The process may receive the speaker-related information or a portion thereof from the other computing device.

FIG. 7.73 is an example flow diagram of example logic illustrating an example embodiment of process 7.100 of FIG. 7.1. More particularly, FIG. 7.73 illustrates a process 7.7300 that includes the process 7.100, and which further includes operations performed by or at the following block(s).

At block 7.7301, the process performs determining whether or not the user can name the speaker.

At block 7.7302, the process performs when it is determined that the user cannot name the speaker, visually presenting the speaker-related information. In some embodiments, the process only informs the user of the speaker-related information upon determining that the speaker does not appear to be able to name the speaker.

FIG. 7.74 is an example flow diagram of example logic illustrating an example embodiment of process 7.7300 of FIG. 7.73. More particularly, FIG. 7.74 illustrates a process 7.7400 that includes the process 7.7300, wherein the determining whether or not the user can name the speaker includes operations performed by or at one or more of the following block(s).

At block 7.7401, the process performs determining whether the user has named the speaker. In some embodiments, the process listens to the user to determine whether the user has named the speaker.

FIG. 7.75 is an example flow diagram of example logic illustrating an example embodiment of process 7.7400 of FIG. 7.74. More particularly, FIG. 7.75 illustrates a process 7.7500 that includes the process 7.7400, wherein the determining whether the user has named the speaker includes operations performed by or at one or more of the following block(s).

At block 7.7501, the process performs determining whether the speaker has uttered a given name or surname of the speaker.

FIG. 7.76 is an example flow diagram of example logic illustrating an example embodiment of process 7.7400 of FIG. 7.74. More particularly, FIG. 7.76 illustrates a process 7.7600 that includes the process 7.7400, wherein the determining whether the user has named the speaker includes operations performed by or at one or more of the following block(s).

At block 7.7601, the process performs determining whether the speaker has uttered a nickname of the speaker.

FIG. 7.77 is an example flow diagram of example logic illustrating an example embodiment of process 7.7400 of FIG. 7.74. More particularly, FIG. 7.77 illustrates a process 7.7700 that includes the process 7.7400, wherein the determining whether the user has named the speaker includes operations performed by or at one or more of the following block(s).

At block 7.7701, the process performs determining whether the speaker has uttered a name of a relationship between the user and the speaker. In some embodiments, the user need not utter the name of the speaker, but instead may utter other information (e.g., a relationship) that may be used by the process to determine that user knows or can name the speaker.

FIG. 7.78 is an example flow diagram of example logic illustrating an example embodiment of process 7.7300 of FIG. 7.73. More particularly, FIG. 7.78 illustrates a process 7.7800 that includes the process 7.7300, wherein the determining whether or not the user can name the speaker includes operations performed by or at one or more of the following block(s).

At block 7.7801, the process performs determining whether the user has uttered information that is related to both the speaker and the user.

FIG. 7.79 is an example flow diagram of example logic illustrating an example embodiment of process 7.7400 of FIG. 7.74. More particularly, FIG. 7.79 illustrates a process 7.7900 that includes the process 7.7400, wherein the determining whether the user has named the speaker includes operations performed by or at one or more of the following block(s).

At block 7.7901, the process performs determining whether the user has named a person, place, thing, or event that the speaker and the user have in common. For example, the user may mention a visit to the home town of the speaker, a vacation to a place familiar to the speaker, or the like FIG. 7.80 is an example flow diagram of example logic illustrating an example embodiment of process 7.7300 of FIG. 7.73. More particularly, FIG. 7.80 illustrates a process 7.8000 that includes the process 7.7300, wherein the determining whether or not the user can name the speaker includes operations performed by or at one or more of the following block(s).

At block 7.8001, the process performs performing speech recognition to convert an utterance of the user into text data.

At block 7.8002, the process performs determining whether or not the user can name the speaker based at least in part on the text data.

FIG. 7.81 is an example flow diagram of example logic illustrating an example embodiment of process 7.7300 of FIG. 7.73. More particularly, FIG. 7.81 illustrates a process 7.8100 that includes the process 7.7300, wherein the determining whether or not the user can name the speaker includes operations performed by or at one or more of the following block(s).

At block 7.8101, the process performs when the user does not name the speaker within a predetermined time interval, determining that the user cannot name the speaker. In some embodiments, the process waits for a time period before jumping in to provide the speaker-related information.

C. Example Computing System Implementation

Figure 8:
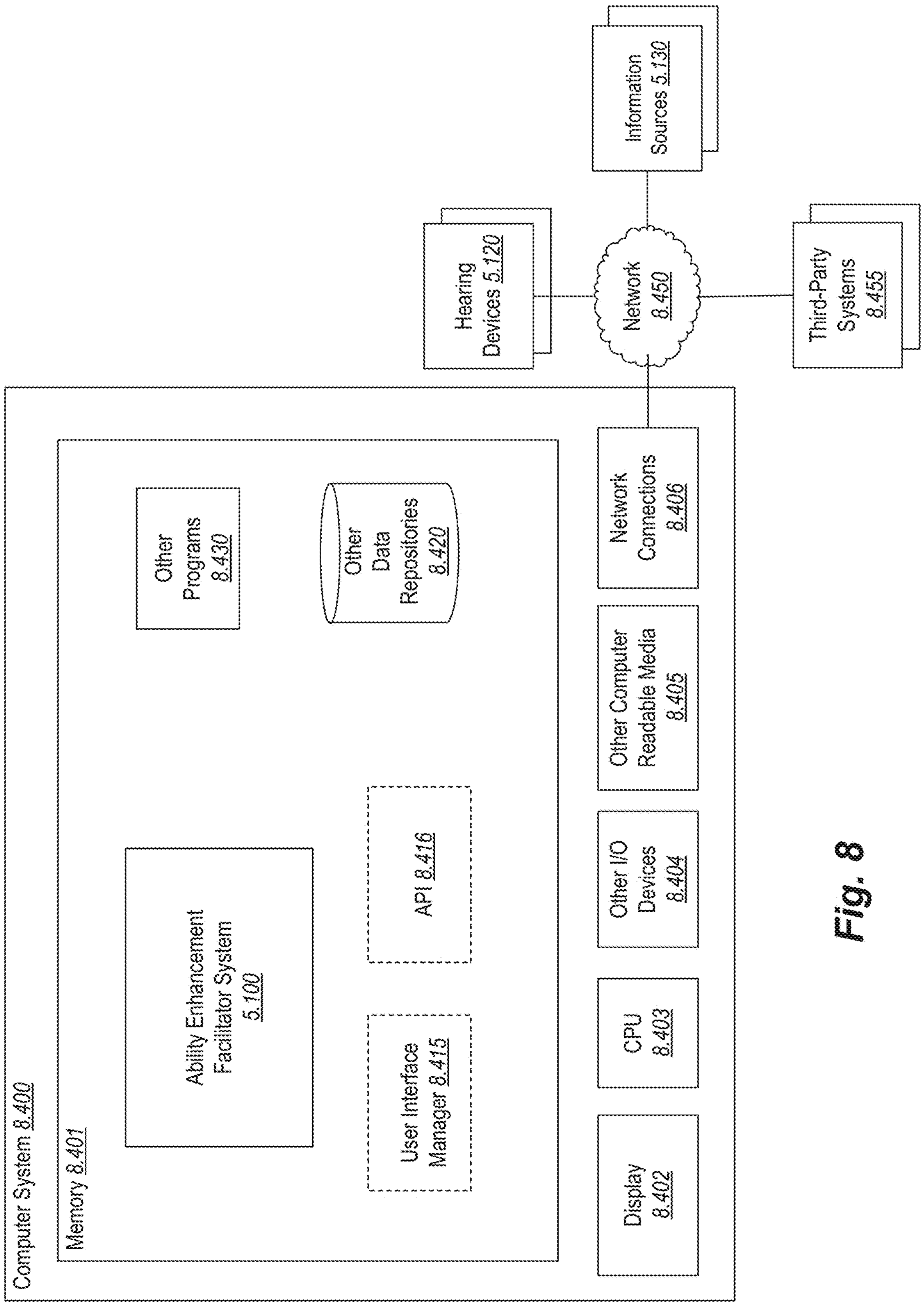
FIG. 8 is an example block diagram of an example computing system for implementing an ability enhancement facilitator system according to an example embodiment.

FIG. 8 is an example block diagram of an example computing system for implementing an ability enhancement facilitator system according to an example embodiment. In particular, FIG. 8 shows a computing system 8.400 that may be utilized to implement an AEFS 5.100.

Note that one or more general purpose or special purpose computing systems/devices may be used to implement the AEFS 5.100. In addition, the computing system 8.400 may comprise one or more distinct computing systems/devices and may span distributed locations. Furthermore, each block shown may represent one or more such blocks as appropriate to a specific embodiment or may be combined with other blocks. Also, the AEFS 5.100 may be implemented in software, hardware, firmware, or in some combination to achieve the capabilities described herein.

In the embodiment shown, computing system 8.400 comprises a computer memory ("memory") 8.401, a display 8.402, one or more Central Processing Units ("CPU") 8.403, Input/Output devices 8.404 (e.g., keyboard, mouse, CRT or LCD display, and the like), other computer-readable media 8.405, and network connections 8.406. The AEFS 5.100 is shown residing in memory 8.401. In other embodiments, some portion of the contents, some or all of the components of the AEFS 5.100 may be stored on and/or transmitted over the other computer-readable media 8.405. The components of the AEFS 5.100 preferably execute on one or more CPUs 8.403 and recommend content items, as described herein. Other code or programs 8.430 (e.g., an administrative interface, a Web server, and the like) and potentially other data repositories, such as data repository 8.420, also reside in the memory 8.401, and preferably execute on one or more CPUs 8.403. Of note, one or more of the components in FIG. 8 may not be present in any specific implementation. For example, some embodiments may not provide other computer readable media 8.405 or a display 8.402.

The AEFS 5.100 interacts via the network 8.450 with hearing devices 5.120, speaker-related information sources 5.130, and third-party systems/applications 8.455. The network 8.450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 8.455 may include any systems that provide data to, or utilize data from, the AEFS 5.100, including Web browsers, e-commerce sites, calendar applications, email systems, social networking services, and the like.

The AEFS 5.100 is shown executing in the memory 8.401 of the computing system 8.400. Also included in the memory are a user interface manager 8.415 and an application program interface ("API") 8.416. The user interface manager 8.415 and the API 8.416 are drawn in dashed lines to indicate that in other embodiments, functions performed by one or more of these components may be performed externally to the AEFS 5.100.

The UI manager 8.415 provides a view and a controller that facilitate user interaction with the AEFS 5.100 and its various components. For example, the UI manager 8.415 may provide interactive access to the AEFS 5.100, such that users can configure the operation of the AEFS 5.100, such as by providing the AEFS 5.100 credentials to access various sources of speaker-related information, including social networking services, email systems, document stores, or the like. In some embodiments, access to the functionality of the UI manager 8.415 may be provided via a Web server, possibly executing as one of the other programs 8.430. In such embodiments, a user operating a Web browser executing on one of the third-party systems 8.455 can interact with the AEFS 5.100 via the UI manager 8.415.

The API 8.416 provides programmatic access to one or more functions of the AEFS 5.100. For example, the API 8.416 may provide a programmatic interface to one or more functions of the AEFS 5.100 that may be invoked by one of the other programs 8.430 or some other module. In this manner, the API 8.416 facilitates the development of third-party software, such as user interfaces, plug-ins, adapters (e.g., for integrating functions of the AEFS 5.100 into Web applications), and the like.

In addition, the API 8.416 may be in at least some embodiments invoked or otherwise accessed via remote entities, such as code executing on one of the hearing devices 5.120, information sources 5.130, and/or one of the third-party systems/applications 8.455, to access various functions of the AEFS 5.100. For example, an information source 5.130 may push speaker-related information (e.g., emails, documents, calendar events) to the AEFS 5.100 via the API 8.416. The API 8.416 may also be configured to provide management widgets (e.g., code modules) that can be integrated into the third-party applications 8.455 and that are configured to interact with the AEFS 5.100 to make at least some of the described functionality available within the context of other applications (e.g., mobile apps).

In an example embodiment, components/modules of the AEFS 5.100 are implemented using standard programming techniques. For example, the AEFS 5.100 may be implemented as a "native" executable running on the CPU 8.403, along with one or more static or dynamic libraries. In other embodiments, the AEFS 5.100 may be implemented as instructions processed by a virtual machine that executes as one of the other programs 8.430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs.

Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 5.100, such as in the data store 8.417, can be available by standard mechanisms such as through C, C++, C #, and Java APIs; libraries for accessing files, databases, or other data repositories; through scripting languages such as XML; or through Web servers, FTP servers, or other types of servers providing access to stored data. The data store 8.417 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 5.100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

III. Language Translation Based on Speaker-Related Information

Embodiments described herein provide enhanced computer- and network-based methods and systems for ability enhancement and, more particularly, for language translation enhanced by using speaker-related information determined at least in part on speaker utterances. Example embodiments provide an Ability Enhancement Facilitator System ("AEFS"). The AEFS may augment, enhance, or improve the senses (e.g., hearing), faculties (e.g., memory, language comprehension), and/or other abilities of a user, such as by performing automatic language translation from a first language used by a speaker to a second language that is familiar to a user. For example, when a user engages a speaker in conversation, the AEFS may "listen" to the speaker in order to determine speaker-related information, such as demographic information about the speaker (e.g., gender, language, country/region of origin), identifying information about the speaker (e.g., name, title), and/or events/communications relating to the speaker and/or the user. Then, the AEFS may use the determined information to augment, improve, enhance, adapt, or otherwise configure the operation of automatic language translation performed on foreign language utterances of the speaker. As the speaker generates utterances in the foreign language, the AEFS may translate the utterances into a representation (e.g., a message in textual format) in a second language that is familiar to the user. The AEFS can then present the representation in the second language to the user, allowing the user to engage in a more productive conversation with the speaker.

In some embodiments, the AEFS is configured to receive data that represents an utterance of a speaker in a first language and that is obtained at or about a hearing device associated with a user. The hearing device may be or include any device that is used by the user to hear sounds, including a hearing aid, a personal media device/player, a telephone, or the like. The AEFS may then determine speaker-related information associated with the speaker, based at least in part on the received data, such as by performing speaker recognition and/or speech recognition with the received data. The speaker-related information may be or include demographic information about the speaker (e.g., gender, country/region of origin, language(s) spoken by the speaker), identifying information about the speaker (e.g., name or title), and/or information items that reference the speaker (e.g., a document, event, communication).

Then, the AEFS may translate the utterance in the first language into a message in a second language, based at least in part on the speaker-related information. The message in the second language is at least an approximate translation of the utterance in the first language. Such a translation process may include some combination of speech recognition, natural language processing, machine translation, or the like. Upon performing the translation, the AEFS may present the message in the second language to the user. The message in the second language may be presented visually, such as via a visual display of a computing system/device that is accessible to the user. The message in the second language may also or instead be presented audibly, such as by "speaking" the message in the second language via speech synthesis through a hearing aid, audio speaker, or other audio output device accessible to the user. The presentation of the message in the second language may occur via the same or a different device than the hearing device that obtained the initial utterance.

A. Ability Enhancement Facilitator System Overview

Figure 9A:
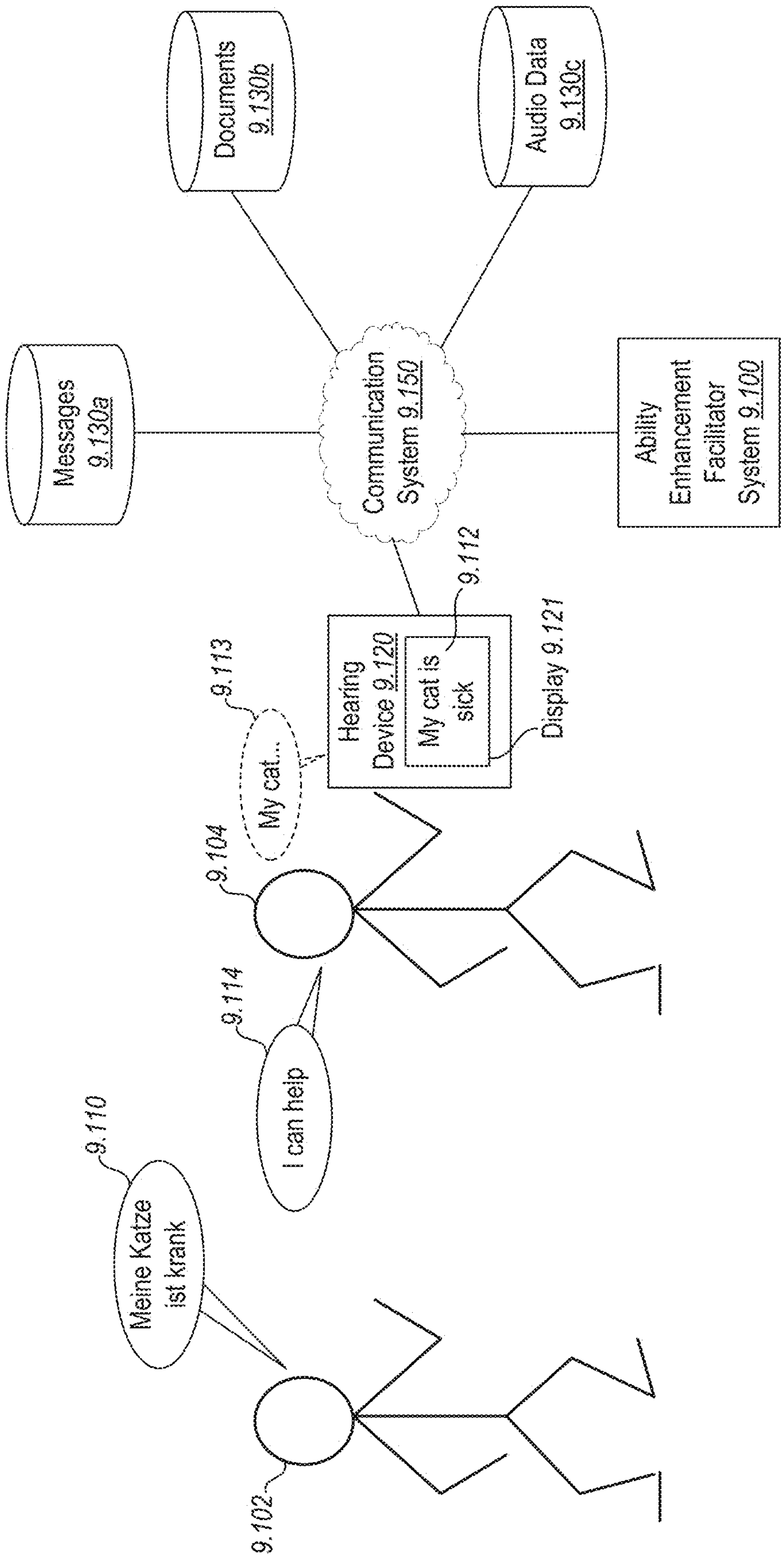
FIG. 9A is an example block diagram of an ability enhancement facilitator system according to an example embodiment.

FIG. 9A is an example block diagram of an ability enhancement facilitator system according to an example embodiment. In particular, FIG. 9A shows a user 9.104 who is engaging in a conversation with a speaker 9.102. Abilities of the user 9.104 are being enhanced, via a hearing device 9.120, by an Ability Enhancement Facilitator System ("AEFS") 9.100. The hearing device 9.120 includes a display 9.121 that is configured to present text and/or graphics. The hearing device 9.120 also includes a speaker (not shown) that is configured to present audio output. The AEFS 9.100 and the hearing device 9.120 are communicatively coupled to one another via a communication system 9.150. The AEFS 9.100 is also communicatively coupled to speaker-related information sources 9.130, including messages 9.130*a*, documents 9.130*b*, and audio data 9.130*c*. The AEFS 9.100 uses the information in the information sources 9.130, in conjunction with data received from the hearing device 9.120, to determine speaker-related information associated with the speaker 9.102.

In the scenario illustrated in FIG. 9A, the conversation between the speaker 9.102 and the user 9.104 is in its initial moments. The speaker 9.102 has made an utterance 9.110 in a first language (German, in this example) by speaking the words "Meine Katze ist krank." The user 9.104, however, has no or limited German language abilities. As will be discussed further below, the AEFS 9.100, in concert with the hearing device 9.120, translates the received utterance 9.110 for the user 9.104, so that the user 9.104 can assist or otherwise usefully engage the speaker 9.102.

The hearing device 9.120 receives a speech signal that represents the utterance 9.110, such as by receiving a digital representation of an audio signal received by a microphone of the hearing device 9.120. The hearing device 9.120 then transmits data representing the speech signal to the AEFS 9.100. Transmitting the data representing the speech signal may include transmitting audio samples (e.g., raw audio data), compressed audio data, speech vectors (e.g., mel frequency cepstral coefficients), and/or any other data that may be used to represent an audio signal.

The AEFS 9.100 then determines speaker-related information associated with the speaker 9.102. Initially, the AEFS 9.100 may determine speaker-related information by automatically determining the language that is being used by the speaker 9.102. Determining the language may be based on signal processing techniques that identify signal characteristics unique to particular languages. Determining the language may also or instead be performed by simultaneous or concurrent application of multiple speech recognizers that are each configured to recognize speech in a corresponding language, and then choosing the language corresponding to the recognizer that produces the result having the highest confidence level. Determining the language may also or instead be based on contextual factors, such as GPS information indicating that the user 9.104 is in Germany, Austria, or some other reason where German is commonly spoken.

In some embodiments, determining speaker-related information may include identifying the speaker 9.102 based on the received data representing the speech signal. Identifying the speaker 9.102 may include performing speaker recognition, such as by generating a "voice print" from the received data and comparing the generated voice print to previously obtained voice prints. For example, the generated voice print may be compared to multiple voice prints that are stored as audio data 9.130*c* and that each correspond to a speaker, in order to determine a speaker who has a voice that most closely matches the voice of the speaker 9.102. The voice prints stored as audio data 9.130*c* may be generated based on various sources of data, including data corresponding to speakers previously identified by the AEFS 9.100, voice mail messages, speaker enrollment data, or the like.

In some embodiments, identifying the speaker 9.102 may include performing speech recognition, such as by automatically converting the received data representing the speech signal into text. The text of the speaker's utterance 9.110 may then be used to identify the speaker. In particular, the text may identify one or more entities such as information items (e.g., communications, documents), events (e.g., meetings, deadlines), persons, or the like, that may be used by the AEFS 9.100 to identify the speaker. The information items may be accessed with reference to the messages 9.130*a* and/or documents 9.130*b*. As one example, the speaker's utterance 9.110 may identify an email message that was sent to the speaker 9.102 and the user 9.104 (e.g., "That sure was a nasty email Bob sent us"). As another example, the speaker's utterance 9.110 may identify a meeting or other event to which both the speaker 9.102 and the user 9.104 are invited.

Note that in some cases, the speaker's utterance 9.110 may not definitively identify the speaker 9.102, such as because the user 9.104 may only have just met the speaker 9.102 (e.g., if the user is traveling). In other cases, a definitive identification may not be obtained because a communication being used to identify the speaker was sent to recipients in addition to the speaker 9.102 and the user 9.104, leaving some ambiguity as to the actual identity of the speaker. However, in such cases, a preliminary identification of multiple candidate speakers may still be used by the AEFS 9.100 to narrow the set of potential speakers, and may be combined with (or used to improve) other techniques for speaker identification, including speaker recognition as discussed above. In addition, even if the speaker 9.102 is unknown to the user 9.104 the AEFS 9.100 may still determine useful demographic or other speaker-related information that may be fruitfully employed for speech recognition purposes.

Note also that speaker-related information need not definitively identify the speaker. In particular, it may also or instead be or include other information about or related to the speaker, such as demographic information including the gender of the speaker 9.102, his country or region of origin, the language(s) spoken by the speaker 9.102, or the like. Speaker-related information may include an organization that includes the speaker (along with possibly other persons, such as a company or firm), an information item that references the speaker (and possibly other persons), an event involving the speaker, or the like. The speaker-related information may generally be determined with reference to the messages 9.130*a*, documents 9.130*b*, and/or audio data 9.130*c*. For example, having determined the identity of the speaker 9.102, the AEFS 9.100 may search for emails and/or documents that are stored as messages 9.130*a* and/or documents 9.103*b* and that reference (e.g., are sent to, are authored by, are named in) the speaker 9.102.

Other types of speaker-related information are contemplated, including social networking information, such as personal or professional relationship graphs represented by a social networking service, messages or status updates sent within a social network, or the like. Social networking information may also be derived from other sources, including email lists, contact lists, communication patterns (e.g., frequent recipients of emails), or the like.

Having determined speaker-related information, the AEFS 9.100 then translates the utterance 9.110 in German into an utterance in a second language. In this example, the second language is the preferred language of the user 9.104, English. In some embodiments, the AEFS 9.100 translates the utterance 9.110 by first performing speech recognition to translate the utterance 9.110 into a textual representation that includes a sequence of German words. Then, the AEFS 9.100 may translate the German text into a message including English text, using machine translation techniques. Speech recognition and/or machine translation may be modified, enhanced, and/or otherwise adapted based on the speaker-related information. For example, a speech recognizer may use speech or language models tailored to the speaker's gender, accent/dialect (e.g., determined based on country/region of origin), social class, or the like. As another example, a lexicon that is specific to the speaker 9.102 may be used during speech recognition and/or language translation. Such a lexicon may be determined based on prior communications of the speaker 9.102, profession of the speaker (e.g., engineer, attorney, doctor), or the like.

Once the AEFS 9.100 has translated the initial utterance 9.110 into a message in English, the AEFS 9.100 can present the English message to the user 9.104. Various techniques are contemplated. In one approach, the AEFS 9.100 causes the hearing device 9.120 (or some other device accessible to the user) to visually display the message as message 9.112 on the display 9.121. In the illustrated example, the AEFS 9.100 causes a message 9.112 that includes the text "My cat is sick" (which is the English translation of "Meine Katze ist krank") to be displayed on the display 9.121. Upon reading the message 9.112 and thereby learning about the condition of the speaker's cat, the user 9.104 responds to the speaker's original utterance 9.110 by with a response utterance 9.114 by speaking the words "I can help." The speaker 9.102 may either understand English or himself have access to the AEFS 9.100 so that the speaker 9.102 and the user 9.104 can have a productive conversation. As the speaker 9.102 and the user 9.104 continue to converse, the AEFS 9.100 may monitor the conversation and continue to provide translations to the user 9.104 (and possibly the speaker 9.102).

In another approach, the AEFS 9.100 causes the hearing device 9.120 (or some other device) to "speak" or "tell" the user 9.104 the message in English. Presenting a message in this manner may include converting a textual representation of the message into audio via text-to-speech processing (e.g., speech synthesis), and then presenting the audio via an audio speaker (e.g., earphone, earpiece, earbud) of the hearing device 9.120. In the illustrated scenario, the AEFS 9.100 causes the hearing device 9.120 to make an utterance 9.113 by playing audio of the words "My cat is sick" via a speaker (not shown) of the hearing device 9.120.

Figure 9B:
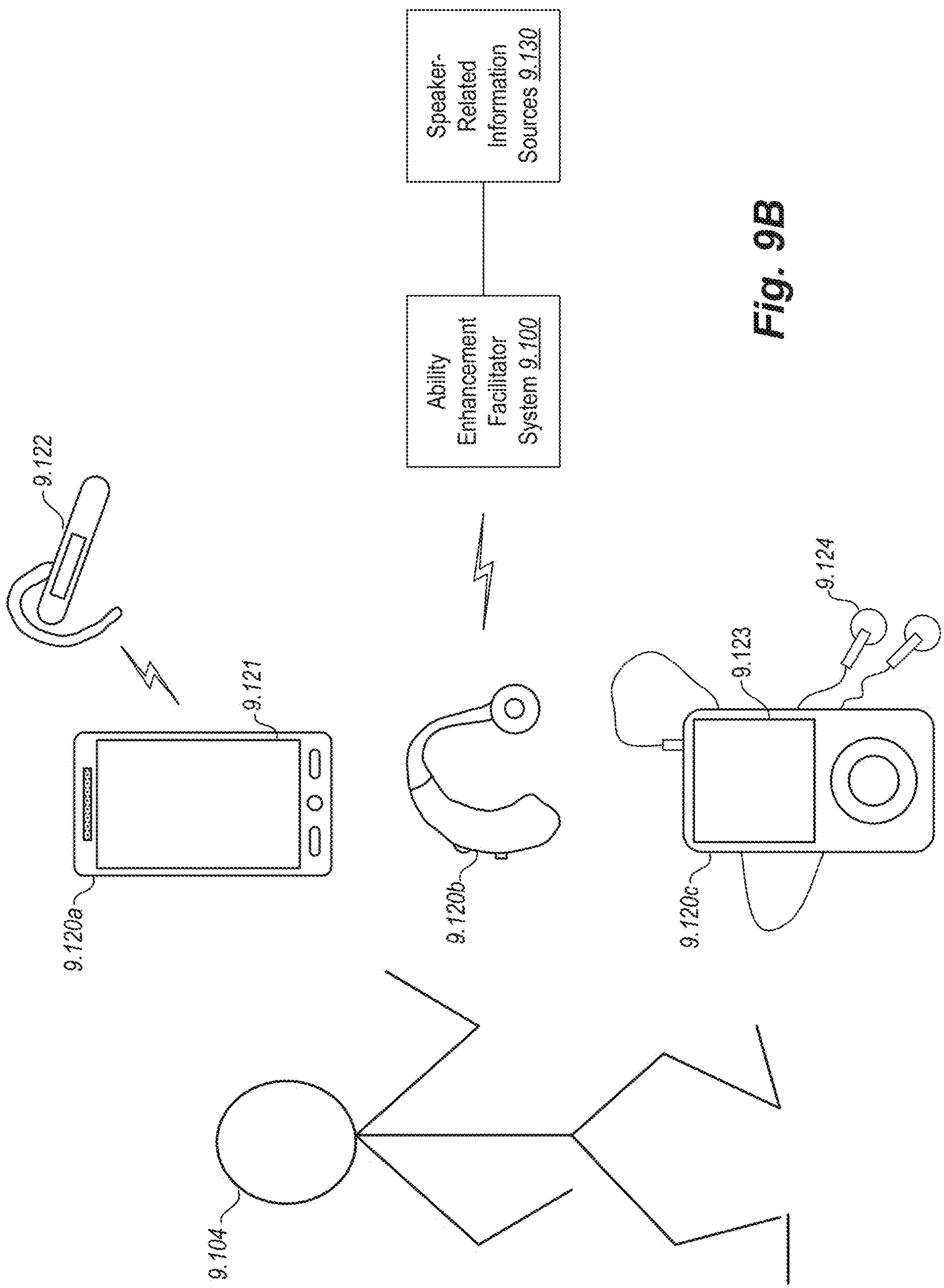
FIG. 9B is an example block diagram illustrating various hearing devices according to example embodiments.

FIG. 9B is an example block diagram illustrating various hearing devices according to example embodiments. In particular, FIG. 9B illustrates an AEFS 9.100 in wireless communication with example hearing devices 9.120*a*-9.120*c*. Hearing device 9.120*a* is a smart phone in communication with a wireless (e.g., Bluetooth) earpiece 9.122. Hearing device 9.120*a* includes a display 9.121. Hearing device 9.120*b* is a hearing aid device. Hearing device 9.120*c* is a personal media player that includes a display 9.123 and attached "earbud" earphones 9.124. Each of the illustrated hearing devices 9.120 includes or may be communicatively coupled to a microphone operable to receive a speech signal from a speaker. As described above, the hearing device 9.120 may then convert the speech signal into data representing the speech signal, and then forward the data to the AEFS 9.100.

As an initial matter, note that the AEFS 9.100 may use output devices of a hearing device or other devices to present translations as well as other information, such as speaker-related information that may generally assist the user 9.104 in interacting with the speaker 9.102. For example, in addition to providing translations, the AEFS 9.100 may present speaker-related information about the speaker 9.102, such as his name, title, communications that reference or are related to the speaker, and the like.

For audio output, each of the illustrated hearing devices 9.120 may include or be communicatively coupled to an audio speaker operable to generate and output audio signals that may be perceived by the user 9.104. As discussed above, the AEFS 9.100 may use such a speaker to provide translations to the user 9.104. The AEFS 9.100 may also or instead audibly notify, via a speaker of a hearing device 9.120, the user 9.104 to view a translation or other information displayed on the hearing device 9.120. For example, the AEFS 9.100 may cause a tone (e.g., beep, chime) to be played via the earphones 9.124 of the personal media player hearing device 9.120*c*. Such a tone may then be recognized by the user 9.104, who will in response attend to information displayed on the display 9.123. Such audible notification may be used to identify a display that is being used as a current display, such as when multiple displays are being used. For example, different first and second tones may be used to direct the user's attention to a desktop display and a smart phone display, respectively. In some embodiments, audible notification may include playing synthesized speech (e.g., from text-to-speech processing) telling the user 9.104 to view speaker-related information on a particular display device (e.g., "Recent email on your smart phone").

The AEFS 9.100 may generally cause translations and/or speaker-related information to be presented on various destination output devices. In some embodiments, the AEFS 9.100 may use a display of a hearing device as a target for displaying a translation or other information. For example, the AEFS 9.100 may display a translation or speaker-related information on the display 9.121 of the smart phone 9.120*a*. On the other hand, when the hearing device does not have its own display, such as hearing aid device 9.120*b*, the AEFS 9.100 may display speaker-related information on some other destination display that is accessible to the user 9.104. For example, when the hearing aid device 9.120*b* is the hearing device and the user also has the personal media player 9.120*c* in his possession, the AEFS 9.100 may elect to display speaker-related information upon the display 9.123 of the personal media player 9.120*c*.

The AEFS 9.100 may determine a destination output device for a translation, speaker-related information, or other information. In some embodiments, determining a destination output device may include selecting from one of multiple possible destination displays based on whether a display is capable of displaying all of the information. For example, if the environment is noisy, the AEFS may elect to visually display a translation rather than play it through a speaker. As another example, if the user 9.104 is proximate to a first display that is capable of displaying only text and a second display capable of displaying graphics, the AEFS 9.100 may select the second display when the presented information includes graphics content (e.g., an image). In some embodiments, determining a destination display may include selecting from one of multiple possible destination displays based on the size of each display. For example, a small LCD display (such as may be found on a mobile phone) may be suitable for displaying a message that is just a few characters (e.g., a name or greeting) but not be suitable for displaying longer message or large document. Note that the AEFS 9.100 may select between multiple potential target output devices even when the hearing device itself includes its own display and/or speaker.

Determining a destination output device may be based on other or additional factors. In some embodiments, the AEFS 9.100 may use user preferences that have been inferred (e.g., based on current or prior interactions with the user 9.104) and/or explicitly provided by the user. For example, the AEFS 9.100 may determine to present a translation, an email, or other speaker-related information onto the display 9.121 of the smart phone 9.120*a* based on the fact that the user 9.104 is currently interacting with the smart phone 9.120*a*.

Note that although the AEFS 9.100 is shown as being separate from a hearing device 9.120, some or all of the functions of the AEFS 9.100 may be performed within or by the hearing device 9.120 itself. For example, the smart phone hearing device 9.120*a* and/or the media player hearing device 9.120*c* may have sufficient processing power to perform all or some functions of the AEFS 9.100, including one or more of speaker identification, determining speaker-related information, speaker recognition, speech recognition, language translation, presenting information, or the like. In some embodiments, the hearing device 9.120 includes logic to determine where to perform various processing tasks, so as to advantageously distribute processing between available resources, including that of the hearing device 9.120, other nearby devices (e.g., a laptop or other computing device of the user 9.104 and/or the speaker 9.102), remote devices (e.g., "cloud-based" processing and/or storage), and the like.

Other types of hearing devices are contemplated. For example, a land-line telephone may be configured to operate as a hearing device, so that the AEFS 9.100 can translate utterances from speakers who are engaged in a conference call. As another example, a hearing device may be or be part of a desktop computer, laptop computer, PDA, tablet computer, or the like.

Figure 10:
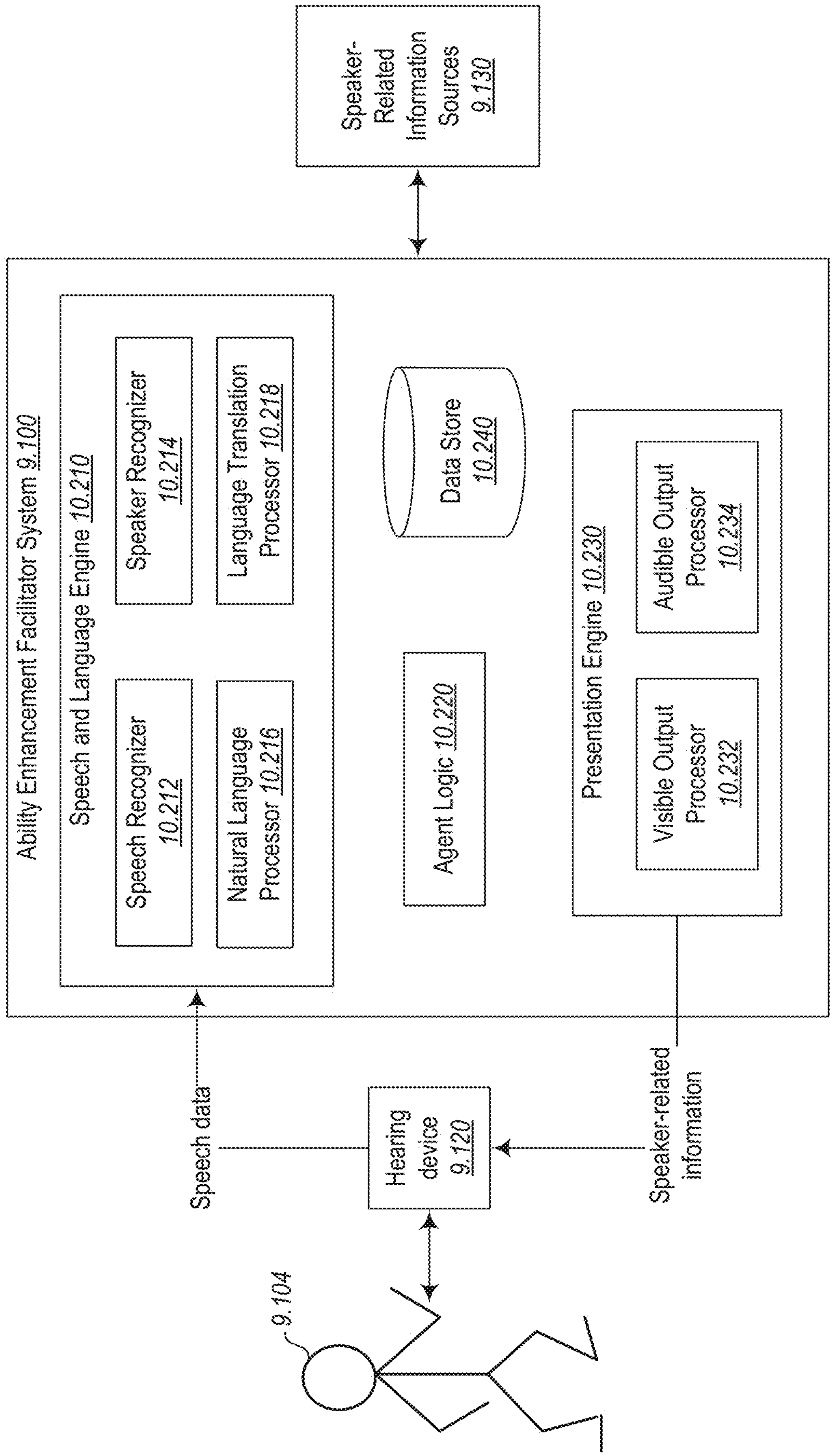
FIG. 10 is an example functional block diagram of an example ability enhancement facilitator system according to an example embodiment.

FIG. 10 is an example functional block diagram of an example ability enhancement facilitator system according to an example embodiment. In the illustrated embodiment of FIG. 10, the AEFS 9.100 includes a speech and language engine 10.210, agent logic 10.220, a presentation engine 10.230, and a data store 10.240.

The speech and language engine 10.210 includes a speech recognizer 10.212, a speaker recognizer 10.214, a natural language processor 10.216, and a language translation processor 10.218. The speech recognizer 10.212 transforms speech audio data received from the hearing device 9.120 into textual representation of an utterance represented by the speech audio data. In some embodiments, the performance of the speech recognizer 10.212 may be improved or augmented by use of a language model (e.g., representing likelihoods of transitions between words, such as based on n-grams) or speech model (e.g., representing acoustic properties of a speaker's voice) that is tailored to or based on an identified speaker. For example, once a speaker has been identified, the speech recognizer 10.212 may use a language model that was previously generated based on a corpus of communications and other information items authored by the identified speaker. A speaker-specific language model may be generated based on a corpus of documents and/or messages authored by a speaker. Speaker-specific speech models may be used to account for accents or channel properties (e.g., due to environmental factors or communication equipment) that are specific to a particular speaker, and may be generated based on a corpus of recorded speech from the speaker. In some embodiments, multiple speech recognizers are present, each one configured to recognize speech in a different language.

The speaker recognizer 10.214 identifies the speaker based on acoustic properties of the speaker's voice, as reflected by the speech data received from the hearing device 9.120. The speaker recognizer 10.214 may compare a speaker voice print to previously generated and recorded voice prints stored in the data store 10.240 in order to find a best or likely match. Voice prints or other signal properties may be determined with reference to voice mail messages, voice chat data, or some other corpus of speech data.

The natural language processor 10.216 processes text generated by the speech recognizer 10.212 and/or located in information items obtained from the speaker-related information sources 9.130. In doing so, the natural language processor 10.216 may identify relationships, events, or entities (e.g., people, places, things) that may facilitate speaker identification, language translation, and/or other functions of the AEFS 9.100. For example, the natural language processor 10.216 may process status updates posted by the user 9.104 on a social networking service, to determine that the user 9.104 recently attended a conference in a particular city, and this fact may be used to identify a speaker and/or determine other speaker-related information, which may in turn be used for language translation or other functions.

The language translation processor 10.218 translates from one language to another, for example, by converting text in a first language to text in a second language. The text input to the language translation processor 10.218 may be obtained from, for example, the speech recognizer 10.212 and/or the natural language processor 10.216. The language translation processor 10.218 may use speaker-related information to improve or adapt its performance. For example, the language translation processor 10.218 may use a lexicon or vocabulary that is tailored to the speaker, such as may be based on the speaker's country/region of origin, the speaker's social class, the speaker's profession, or the like.

The agent logic 10.220 implements the core intelligence of the AEFS 9.100. The agent logic 10.220 may include a reasoning engine (e.g., a rules engine, decision trees, Bayesian inference engine) that combines information from multiple sources to identify speakers, determine speaker-related information, and/or perform translations. For example, the agent logic 10.220 may combine spoken text from the speech recognizer 10.212, a set of potentially matching (candidate) speakers from the speaker recognizer 10.214, and information items from the information sources 9.130, in order to determine a most likely identity of the current speaker. As another example, the agent logic 10.220 may identify the language spoken by the speaker by analyzing the output of multiple speech recognizers that are each configured to recognize speech in a different language, to identify the language of the speech recognizer that returns the highest confidence result as the spoken language.

The presentation engine 10.230 includes a visible output processor 10.232 and an audible output processor 10.234. The visible output processor 10.232 may prepare, format, and/or cause information to be displayed on a display device, such as a display of the hearing device 9.120 or some other display (e.g., a desktop or laptop display in proximity to the user 9.104). The agent logic 10.220 may use or invoke the visible output processor 10.232 to prepare and display information, such as by formatting or otherwise modifying a translation or some speaker-related information to fit on a particular type or size of display. The audible output processor 10.234 may include or use other components for generating audible output, such as tones, sounds, voices, or the like. In some embodiments, the agent logic 10.220 may use or invoke the audible output processor 10.234 in order to convert a textual message (e.g., a translation or speaker-related information) into audio output suitable for presentation via the hearing device 9.120, for example by employing a text-to-speech processor.

Note that although speaker identification and/or determining speaker-related information is herein sometimes described as including the positive identification of a single speaker, it may instead or also include determining likelihoods that each of one or more persons is the current speaker. For example, the speaker recognizer 10.214 may provide to the agent logic 10.220 indications of multiple candidate speakers, each having a corresponding likelihood or confidence level. The agent logic 10.220 may then select the most likely candidate based on the likelihoods alone or in combination with other information, such as that provided by the speech recognizer 10.212, natural language processor 10.216, speaker-related information sources 9.130, or the like. In some cases, such as when there are a small number of reasonably likely candidate speakers, the agent logic 10.220 may inform the user 9.104 of the identities all of the candidate speakers (as opposed to a single speaker) candidate speaker, as such information may be sufficient to trigger the user's recall and enable the user to make a selection that informs the agent logic 10.220 of the speaker's identity.

B. Example Processes

FIGS. 11.1-11.80 are example flow diagrams of ability enhancement processes performed by example embodiments.

FIG. 11.1 is an example flow diagram of example logic for ability enhancement. The illustrated logic in this and the following flow diagrams may be performed by, for example, a hearing device 9.120 and/or one or more components of the AEFS 9.100 described with respect to FIG. 10, above. More particularly, FIG. 11.1 illustrates a process 11.100 that includes operations performed by or at the following block(s).

At block 11.101, the process performs receiving data representing a speech signal obtained at a hearing device associated with a user, the speech signal representing an utterance of a speaker in a first language. The received data may be or represent the speech signal itself (e.g., audio samples) and/or higher-order information (e.g., frequency coefficients). The data may be received by or at the hearing device 9.120 and/or the AEFS 9.100.

At block 11.102, the process performs determining speaker-related information associated with the speaker, based on the data representing the speech signal. The speaker-related information may include demographic information about the speaker, including gender, language spoken, country of origin, region of origin, or the like. The speaker-related information may also or instead include identifiers of the speaker (e.g., names, titles) and/or related information, such as documents, emails, calendar events, or the like. The speaker-related information may be determined based on signal properties of the speech signal (e.g., a voice print) and/or on the content of the utterance, such as a name, event, entity, or information item that was mentioned by the speaker.

At block 11.103, the process performs translating the utterance in the first language into a message in a second language, based on the speaker-related information. The utterance may be translated by first performing speech recognition on the data representing the speech signal to convert the utterance into textual form. Then, the text of the utterance may be translated into the second language using a natural language processing and/or machine translation techniques. The speaker-related information may be used to improve, enhance, or otherwise modify the process of machine translation. For example, based on the identity of the speaker, the process may use a language or speech model that is tailored to the speaker in order to improve a machine translation process. As another example, the process may use one or more information items that reference the speaker to improve machine translation, such as by disambiguating references in the utterance of the speaker.

At block 11.104, the process performs presenting the message in the second language. The message may be presented in various ways including using audible output (e.g., via text-to-speech processing of the message) and/or using visible output of the message (e.g., via a display screen of the hearing device or some other device that is accessible to the user).

FIG. 11.2 is an example flow diagram of example logic illustrating an example embodiment of process 11.100 of FIG. 11.1. More particularly, FIG. 11.2 illustrates a process 11.200 that includes the process 11.100, wherein the determining speaker-related information includes operations performed by or at one or more of the following block(s).

At block 11.201, the process performs determining the first language. In some embodiments, the process may determine or identify the first language, possibly prior to performing language translation. For example, the process may determine that the speaker is speaking in German, so that it can configure a speech recognizer to recognize German language utterances.

FIG. 11.3 is an example flow diagram of example logic illustrating an example embodiment of process 11.200 of FIG. 11.2. More particularly, FIG. 11.3 illustrates a process 11.300 that includes the process 11.200, wherein the determining the first language includes operations performed by or at one or more of the following block(s).

At block 11.301, the process performs concurrently processing the received data with multiple speech recognizers that are each configured to recognize speech in a different corresponding language. For example, the process may utilize speech recognizers for German, French, English, Chinese, Spanish, and the like, to attempt to recognize the speaker's utterance.

At block 11.302, the process performs selecting as the first language the language corresponding to a speech recognizer of the multiple speech recognizers that produces a result that has a higher confidence level than other of the multiple speech recognizers. Typically, a speech recognizer may provide a confidence level corresponding with each recognition result. The process can exploit this confidence level to determine the most likely language being spoken by the speaker, such as by taking the result with the highest confidence level, if one exists.

FIG. 11.4 is an example flow diagram of example logic illustrating an example embodiment of process 11.200 of FIG. 11.2. More particularly, FIG. 11.4 illustrates a process 11.400 that includes the process 11.200, wherein the determining the first language includes operations performed by or at one or more of the following block(s).

At block 11.401, the process performs identifying signal characteristics in the received data that are correlated with the first language. In some embodiments, the process may exploit signal properties or characteristics that are highly correlated with particular languages. For example, spoken German may include phonemes that are unique to or at least more common in German than in other languages.

FIG. 11.5 is an example flow diagram of example logic illustrating an example embodiment of process 11.200 of FIG. 11.2. More particularly, FIG. 11.5 illustrates a process 11.500 that includes the process 11.200, wherein the determining the first language includes operations performed by or at one or more of the following block(s).

At block 11.501, the process performs receiving an indication of a current location of the user. The current location may be based on a GPS coordinate provided by the hearing device 9.120 or some other device. The current location may be determined based on other context information, such as a network identifier, travel documents, or the like.

At block 11.502, the process performs determining one or more languages that are commonly spoken at the current location. The process may reference a knowledge base or other information that associates locations with common languages.

At block 11.503, the process performs selecting one of the one or more languages as the first language.

FIG. 11.6 is an example flow diagram of example logic illustrating an example embodiment of process 11.200 of FIG. 11.2. More particularly, FIG. 11.6 illustrates a process 11.600 that includes the process 11.200, wherein the determining the first language includes operations performed by or at one or more of the following block(s).

At block 11.601, the process performs presenting indications of multiple languages to the user. In some embodiments, the process may ask the user to choose the language of the speaker. For example, the process may not be able to determine the language itself, or the process may have determined multiple equally likely candidate languages. In such circumstances, the process may prompt or otherwise request that the user indicate the language of the speaker.

At block 11.602, the process performs receiving from the user an indication of one of the multiple languages. The user may identify the language in various ways, such as via a spoken command, a gesture, a user interface input, or the like.

FIG. 11.7 is an example flow diagram of example logic illustrating an example embodiment of process 11.200 of FIG. 11.2. More particularly, FIG. 11.7 illustrates a process 11.700 that includes the process 11.200, and which further includes operations performed by or at the following block(s).

At block 11.701, the process performs selecting a speech recognizer configured to recognize speech in the first language. Once the process has determined the language of the speaker, it may select or configure a speech recognizer or other component (e.g., machine translation engine) to process the first language.

FIG. 11.8 is an example flow diagram of example logic illustrating an example embodiment of process 11.100 of FIG. 11.1. More particularly, FIG. 11.8 illustrates a process 11.800 that includes the process 11.100, wherein the translating the utterance in the first language into a message in a second language includes operations performed by or at one or more of the following block(s).

At block 11.801, the process performs performing speech recognition, based on the speaker-related information, on the data representing the speech signal to convert the utterance in the first language into text representing the utterance in the first language. The speech recognition process may be improved, augmented, or otherwise adapted based on the speaker-related information. In one example, information about vocabulary frequently used by the speaker may be used to improve the performance of a speech recognizer.

At block 11.802, the process performs translating, based on the speaker-related information, the text representing the utterance in the first language into text representing the message in the second language. Translating from a first to a second language may also be improved, augmented, or otherwise adapted based on the speaker-related information. For example, when such a translation includes natural language processing to determine syntactic or semantic information about an utterance, such natural language processing may be improved with information about the speaker, such as idioms, expressions, or other language constructs frequently employed or otherwise correlated with the speaker.

FIG. 11.9 is an example flow diagram of example logic illustrating an example embodiment of process 11.800 of FIG. 11.8. More particularly, FIG. 11.9 illustrates a process 11.900 that includes the process 11.800, wherein the presenting the message in the second language includes operations performed by or at one or more of the following block(s).

At block 11.901, the process performs performing speech synthesis to convert the text representing the utterance in the second language into audio data representing the message in the second language.

At block 11.902, the process performs causing the audio data representing the message in the second language to be played to the user. The message may be played, for example, via an audio speaker of the hearing device 9.120.

FIG. 11.10 is an example flow diagram of example logic illustrating an example embodiment of process 11.800 of FIG. 11.8. More particularly, FIG. 11.10 illustrates a process 11.1000 that includes the process 11.800, wherein the performing speech recognition includes operations performed by or at one or more of the following block(s).

At block 11.1001, the process performs performing speech recognition based on cepstral coefficients that represent the speech signal. In other embodiments, other types of features or information may be also or instead used to perform speech recognition, including language models, dialect models, or the like.

FIG. 11.11 is an example flow diagram of example logic illustrating an example embodiment of process 11.800 of FIG. 11.8. More particularly, FIG. 11.11 illustrates a process 11.1100 that includes the process 11.800, wherein the performing speech recognition includes operations performed by or at one or more of the following block(s).

At block 11.1101, the process performs performing hidden Markov model-based speech recognition. Other approaches or techniques for speech recognition may include neural networks, stochastic modeling, or the like.

FIG. 11.12 is an example flow diagram of example logic illustrating an example embodiment of process 11.100 of FIG. 11.1. More particularly, FIG. 11.12 illustrates a process 11.1200 that includes the process 11.100, wherein the translating the utterance in the first language into a message in a second language includes operations performed by or at one or more of the following block(s).

At block 11.1201, the process performs translating the utterance based on speaker-related information including an identity of the speaker. The identity of the speaker may be used in various ways, such as to determine a speaker-specific vocabulary to use during speech recognition, natural language processing, machine translation, or the like.

FIG. 11.13 is an example flow diagram of example logic illustrating an example embodiment of process 11.100 of FIG. 11.1. More particularly, FIG. 11.13 illustrates a process 11.1300 that includes the process 11.100, wherein the translating the utterance in the first language into a message in a second language includes operations performed by or at one or more of the following block(s).

At block 11.1301, the process performs translating the utterance based on speaker-related information including a language model that is specific to the speaker. A speaker-specific language model may include or otherwise identify frequent words or patterns of words (e.g., n-grams) based on prior communications or other information about the speaker. Such a language model may be based on communications or other information generated by or about the speaker. Such a language model may be employed in the course of speech recognition, natural language processing, machine translation, or the like. Note that the language model need not be unique to the speaker, but may instead be specific to a class, type, or group of speakers that includes the speaker. For example, the language model may be tailored for speakers in a particular industry, from a particular region, or the like.

FIG. 11.14 is an example flow diagram of example logic illustrating an example embodiment of process 11.1300 of FIG. 11.13. More particularly, FIG. 11.14 illustrates a process 11.1400 that includes the process 11.1300, wherein the translating the utterance based on speaker-related information including a language model that is specific to the speaker includes operations performed by or at one or more of the following block(s).

At block 11.1401, the process performs translating the utterance based on a language model that is tailored to a group of people of which the speaker is a member. As noted, the language model need not be unique to the speaker. In some embodiments, the language model may be tuned to particular social classes, ethnic groups, countries, languages, or the like with which the speaker may be associated.

FIG. 11.15 is an example flow diagram of example logic illustrating an example embodiment of process 11.1300 of FIG. 11.13. More particularly, FIG. 11.15 illustrates a process 11.1500 that includes the process 11.1300, wherein the translating the utterance based on speaker-related information including a language model that is specific to the speaker includes operations performed by or at one or more of the following block(s).

At block 11.1501, the process performs generating the language model based on communications generated by the speaker. In some embodiments, the process mines or otherwise processes emails, text messages, voice messages, and the like to generate a language model that is specific or otherwise tailored to the speaker.

FIG. 11.16 is an example flow diagram of example logic illustrating an example embodiment of process 11.1500 of FIG. 11.15. More particularly, FIG. 11.16 illustrates a process 11.1600 that includes the process 11.1500, wherein the generating the language model based on communications generated by the speaker includes operations performed by or at one or more of the following block(s).

At block 11.1601, the process performs generating the language model based on emails transmitted by the speaker. In some embodiments, a corpus of emails may be processed to determine n-grams that represent likelihoods of various word transitions.

FIG. 11.17 is an example flow diagram of example logic illustrating an example embodiment of process 11.1500 of FIG. 11.15. More particularly, FIG. 11.17 illustrates a process 11.1700 that includes the process 11.1500, wherein the generating the language model based on communications generated by the speaker includes operations performed by or at one or more of the following block(s).

At block 11.1701, the process performs generating the language model based on documents authored by the speaker. In some embodiments, a corpus of documents may be processed to determine n-grams that represent likelihoods of various word transitions.

FIG. 11.18 is an example flow diagram of example logic illustrating an example embodiment of process 11.1500 of FIG. 11.15. More particularly, FIG. 11.18 illustrates a process 11.1800 that includes the process 11.1500, wherein the generating the language model based on communications generated by the speaker includes operations performed by or at one or more of the following block(s).

At block 11.1801, the process performs generating the language model based on social network messages transmitted by the speaker.

FIG. 11.19 is an example flow diagram of example logic illustrating an example embodiment of process 11.100 of FIG. 11.1. More particularly, FIG. 11.19 illustrates a process 11.1900 that includes the process 11.100, wherein the translating the utterance in the first language into a message in a second language includes operations performed by or at one or more of the following block(s).

At block 11.1901, the process performs translating the utterance based on speaker-related information including a speech model that is tailored to the speaker. A speech model tailored to the speaker (e.g., representing properties of the speech signal of the user) may be used to adapt or improve the performance of a speech recognizer. Note that the speech model need not be unique to the speaker, but may instead be specific to a class, type, or group of speakers that includes the speaker. For example, the speech model may be tailored for male speakers, female speakers, speakers from a particular country or region (e.g., to account for accents), or the like.

FIG. 11.20 is an example flow diagram of example logic illustrating an example embodiment of process 11.1900 of FIG. 11.19. More particularly, FIG. 11.20 illustrates a process 11.2000 that includes the process 11.1900, wherein the translating the utterance based on speaker-related information including a speech model that is tailored to the speaker includes operations performed by or at one or more of the following block(s).

At block 11.2001, the process performs translating the utterance based on a speech model that is tailored to a group of people of which the speaker is a member. As noted, the speech model need not be unique to the speaker. In some embodiments, the speech model may be tuned to particular genders, social classes, ethnic groups, countries, languages, or the like with which the speaker may be associated.

FIG. 11.21 is an example flow diagram of example logic illustrating an example embodiment of process 11.100 of FIG. 11.1. More particularly, FIG. 11.21 illustrates a process 11.2100 that includes the process 11.100, wherein the translating the utterance in the first language into a message in a second language includes operations performed by or at one or more of the following block(s).

At block 11.2101, the process performs translating the utterance based on speaker-related information including an information item that references the speaker. The information item may include a document, a message, a calendar event, a social networking relation, or the like. Various forms of information items are contemplated, including textual (e.g., emails, text messages, chats), audio (e.g., voice messages), video, or the like. In some embodiments, an information item may include content in multiple forms, such as text and audio, such as when an email includes a voice attachment.

FIG. 11.22 is an example flow diagram of example logic illustrating an example embodiment of process 11.100 of FIG. 11.1. More particularly, FIG. 11.22 illustrates a process 11.2200 that includes the process 11.100, wherein the translating the utterance in the first language into a message in a second language includes operations performed by or at one or more of the following block(s).

At block 11.2201, the process performs translating the utterance based on speaker-related information including a document that references the speaker. The document may be, for example, a report authored by the speaker.

FIG. 11.23 is an example flow diagram of example logic illustrating an example embodiment of process 11.100 of FIG. 11.1. More particularly, FIG. 11.23 illustrates a process 11.2300 that includes the process 11.100, wherein the translating the utterance in the first language into a message in a second language includes operations performed by or at one or more of the following block(s).

At block 11.2301, the process performs translating the utterance based on speaker-related information including a message that references the speaker. The message may be an email, text message, social network status update or other communication that is sent by the speaker, sent to the speaker, or references the speaker in some other way.

FIG. 11.24 is an example flow diagram of example logic illustrating an example embodiment of process 11.100 of FIG. 11.1. More particularly, FIG. 11.24 illustrates a process 11.2400 that includes the process 11.100, wherein the translating the utterance in the first language into a message in a second language includes operations performed by or at one or more of the following block(s).

At block 11.2401, the process performs translating the utterance based on speaker-related information including a calendar event that references the speaker. The calendar event may represent a past or future event to which the speaker was invited. An event may be any occurrence that involves or involved the user and/or the speaker, such as a meeting (e.g., social or professional meeting or gathering) attended by the user and the speaker, an upcoming deadline (e.g., for a project), or the like.

FIG. 11.25 is an example flow diagram of example logic illustrating an example embodiment of process 11.100 of FIG. 11.1. More particularly, FIG. 11.25 illustrates a process 11.2500 that includes the process 11.100, wherein the translating the utterance in the first language into a message in a second language includes operations performed by or at one or more of the following block(s).

At block 11.2501, the process performs translating the utterance based on speaker-related information including an indication of gender of the speaker. Information about the gender of the speaker may be used to customize or otherwise adapt a speech or language model that may be used during machine translation.

FIG. 11.26 is an example flow diagram of example logic illustrating an example embodiment of process 11.100 of FIG. 11.1. More particularly, FIG. 11.26 illustrates a process 11.2600 that includes the process 11.100, wherein the translating the utterance in the first language into a message in a second language includes operations performed by or at one or more of the following block(s).

At block 11.2601, the process performs translating the utterance based on speaker-related information including an organization to which the speaker belongs. The process may exploit an understanding of an organization to which the speaker belongs when performing natural language processing on the utterance. For example, the identity of a company that employs the speaker can be used to determine the meaning of industry-specific vocabulary in the utterance of the speaker. The organization may include a business, company (e.g., profit or non-profit), group, school, club, team, company, or other formal or informal organization with which the speaker is affiliated.

FIG. 11.27 is an example flow diagram of example logic illustrating an example embodiment of process 11.100 of FIG. 11.1. More particularly, FIG. 11.27 illustrates a process 11.2700 that includes the process 11.100, wherein the determining speaker-related information includes operations performed by or at one or more of the following block(s).

At block 11.2701, the process performs performing speech recognition to convert the received data into text data. For example, the process may convert the received data into a sequence of words that are (or are likely to be) the words uttered by the speaker.

At block 11.2702, the process performs determining the speaker-related information based on the text data. Given text data (e.g., words spoken by the speaker), the process may search for information items that include the text data, and then identify the speaker or determine other speaker-related information based on those information items, as discussed further below.

FIG. 11.28 is an example flow diagram of example logic illustrating an example embodiment of process 11.2700 of FIG. 11.27. More particularly, FIG. 11.28 illustrates a process 11.2800 that includes the process 11.2700, wherein the determining the speaker-related information based on the text data includes operations performed by or at one or more of the following block(s).

At block 11.2801, the process performs finding a document that references the speaker and that includes one or more words in the text data. In some embodiments, the process may search for and find a document or other item that includes words spoken by speaker. Then, the process can infer that the speaker is the author of the document, a recipient of the document, a person described in the document, or the like.

FIG. 11.29 is an example flow diagram of example logic illustrating an example embodiment of process 11.2700 of FIG. 11.27. More particularly, FIG. 11.29 illustrates a process 11.2900 that includes the process 11.2700, and which further includes operations performed by or at the following block(s).

At block 11.2901, the process performs retrieving information items that reference the text data. The process may here retrieve or otherwise obtain documents, calendar events, messages, or the like, that include, contain, or otherwise reference some portion of the text data.

FIG. 11.30 is an example flow diagram of example logic illustrating an example embodiment of process 11.100 of FIG. 11.1. More particularly, FIG. 11.30 illustrates a process 11.3000 that includes the process 11.100, wherein the determining speaker-related information includes operations performed by or at one or more of the following block(s).

At block 11.3001, the process performs accessing information items associated with the speaker. In some embodiments, accessing information items associated with the speaker may include retrieving files, documents, data records, or the like from various sources, such as local or remote storage devices, including cloud-based servers, and the like. In some embodiments, accessing information items may also or instead include scanning, searching, indexing, or otherwise processing information items to find ones that include, name, mention, or otherwise reference the speaker.

FIG. 11.31 is an example flow diagram of example logic illustrating an example embodiment of process 11.3000 of FIG. 11.30. More particularly, FIG. 11.31 illustrates a process 11.3100 that includes the process 11.3000, wherein the accessing information items associated with the speaker includes operations performed by or at one or more of the following block(s).

At block 11.3101, the process performs searching for information items that reference the speaker. In some embodiments, searching may include formulating a search query to provide to a document management system or any other data/document store that provides a search interface.

FIG. 11.32 is an example flow diagram of example logic illustrating an example embodiment of process 11.3000 of FIG. 11.30. More particularly, FIG. 11.32 illustrates a process 11.3200 that includes the process 11.3000, wherein the accessing information items associated with the speaker includes operations performed by or at one or more of the following block(s).

At block 11.3201, the process performs searching stored emails to find emails that reference the speaker. In some embodiments, emails that reference the speaker may include emails sent from the speaker, emails sent to the speaker, emails that name or otherwise identify the speaker in the body of an email, or the like.

FIG. 11.33 is an example flow diagram of example logic illustrating an example embodiment of process 11.3000 of FIG. 11.30. More particularly, FIG. 11.33 illustrates a process 11.3300 that includes the process 11.3000, wherein the accessing information items associated with the speaker includes operations performed by or at one or more of the following block(s).

At block 11.3301, the process performs searching stored text messages to find text messages that reference the speaker. In some embodiments, text messages that reference the speaker include messages sent to/from the speaker, messages that name or otherwise identify the speaker in a message body, or the like.

FIG. 11.34 is an example flow diagram of example logic illustrating an example embodiment of process 11.3000 of FIG. 11.30. More particularly, FIG. 11.34 illustrates a process 11.3400 that includes the process 11.3000, wherein the accessing information items associated with the speaker includes operations performed by or at one or more of the following block(s).

At block 11.3401, the process performs accessing a social networking service to find messages or status updates that reference the speaker. In some embodiments, accessing a social networking service may include searching for postings, status updates, personal messages, or the like that have been posted by, posted to, or otherwise reference the speaker. Example social networking services include Facebook, Twitter, Google Plus, and the like. Access to a social networking service may be obtained via an API or similar interface that provides access to social networking data related to the user and/or the speaker.

FIG. 11.35 is an example flow diagram of example logic illustrating an example embodiment of process 11.3000 of FIG. 11.30. More particularly, FIG. 11.35 illustrates a process 11.3500 that includes the process 11.3000, wherein the accessing information items associated with the speaker includes operations performed by or at one or more of the following block(s).

At block 11.3501, the process performs accessing a calendar to find information about appointments with the speaker. In some embodiments, accessing a calendar may include searching a private or shared calendar to locate a meeting or other appointment with the speaker, and providing such information to the user via the hearing device.

FIG. 11.36 is an example flow diagram of example logic illustrating an example embodiment of process 11.3000 of FIG. 11.30. More particularly, FIG. 11.36 illustrates a process 11.3600 that includes the process 11.3000, wherein the accessing information items associated with the speaker includes operations performed by or at one or more of the following block(s).

At block 11.3601, the process performs accessing a document store to find documents that reference the speaker. In some embodiments, documents that reference the speaker include those that are authored at least in part by the speaker, those that name or otherwise identify the speaker in a document body, or the like. Accessing the document store may include accessing a local or remote storage device/system, accessing a document management system, accessing a source control system, or the like.

FIG. 11.37 is an example flow diagram of example logic illustrating an example embodiment of process 11.100 of FIG. 11.1. More particularly, FIG. 11.37 illustrates a process 11.3700 that includes the process 11.100, wherein the determining speaker-related information includes operations performed by or at one or more of the following block(s).

At block 11.3701, the process performs performing voice identification based on the received data to identify the speaker. In some embodiments, voice identification may include generating a voice print, voice model, or other biometric feature set that characterizes the voice of the speaker, and then comparing the generated voice print to previously generated voice prints.

FIG. 11.38 is an example flow diagram of example logic illustrating an example embodiment of process 11.3700 of FIG. 11.37. More particularly, FIG. 11.38 illustrates a process 11.3800 that includes the process 11.3700, wherein the performing voice identification includes operations performed by or at one or more of the following block(s).

At block 11.3801, the process performs comparing properties of the speech signal with properties of previously recorded speech signals from multiple distinct speakers. In some embodiments, the process accesses voice prints associated with multiple speakers, and determines a best match against the speech signal.

FIG. 11.39 is an example flow diagram of example logic illustrating an example embodiment of process 11.3800 of FIG. 11.38. More particularly, FIG. 11.39 illustrates a process 11.3900 that includes the process 11.3800, and which further includes operations performed by or at the following block(s).

At block 11.3901, the process performs processing voice messages from the multiple distinct speakers to generate voice print data for each of the multiple distinct speakers. Given a telephone voice message, the process may associate generated voice print data for the voice message with one or more (direct or indirect) identifiers corresponding with the message. For example, the message may have a sender telephone number associated with it, and the process can use that sender telephone number to do a reverse directory lookup (e.g., in a public directory, in a personal contact list) to determine the name of the voice message speaker.

FIG. 11.40 is an example flow diagram of example logic illustrating an example embodiment of process 11.3700 of FIG. 11.37. More particularly, FIG. 11.40 illustrates a process 11.4000 that includes the process 11.3700, wherein the performing voice identification includes operations performed by or at one or more of the following block(s).

At block 11.4001, the process performs processing telephone voice messages stored by a voice mail service. In some embodiments, the process analyzes voice messages to generate voice prints/models for multiple speakers.

FIG. 11.41 is an example flow diagram of example logic illustrating an example embodiment of process 11.3700 of FIG. 11.37. More particularly, FIG. 11.41 illustrates a process 11.4100 that includes the process 11.3700, and which further includes operations performed by or at the following block(s).

At block 11.4101, the process performs determining that the speaker cannot be identified. In some embodiments, the process may determine that the speaker cannot be identified, for example because the speaker has not been previously identified, enrolled, or otherwise encountered. In some cases, the process may be unable to identify the speaker due to signal quality, environmental conditions, or the like.

FIG. 11.42 is an example flow diagram of example logic illustrating an example embodiment of process 11.4100 of FIG. 11.41. More particularly, FIG. 11.42 illustrates a process 11.4200 that includes the process 11.4100, and which further includes operations performed by or at the following block(s).

At block 11.4201, the process performs when it is determined that the speaker cannot be identified, storing the received data for system training. In some embodiments, the received data may be stored when the speaker cannot be identified, so that the system can be trained or otherwise configured to identify the speaker at a later time.

FIG. 11.43 is an example flow diagram of example logic illustrating an example embodiment of process 11.4100 of FIG. 11.41. More particularly, FIG. 11.43 illustrates a process 11.4300 that includes the process 11.4100, and which further includes operations performed by or at the following block(s).

At block 11.4301, the process performs when it is determined that the speaker cannot be identified, notifying the user. In some embodiments, the user may be notified that the process cannot identify the speaker, such as by playing a tone, voice feedback, or displaying a message. The user may in response manually identify the speaker or otherwise provide speaker-related information (e.g., the language spoken by the speaker) so that the process can perform translation or other functions.

FIG. 11.44 is an example flow diagram of example logic illustrating an example embodiment of process 11.100 of FIG. 11.1. More particularly, FIG. 11.44 illustrates a process 11.4400 that includes the process 11.100, and which further includes operations performed by or at the following block(s).

At block 11.4401, the process performs receiving data representing a speech signal that represents an utterance of the user. A microphone on or about the hearing device may capture this data. The microphone may be the same or different from one used to capture speech data from the speaker.

At block 11.4402, the process performs determining the speaker-related information based on the data representing a speech signal that represents an utterance of the user. Identifying the speaker in this manner may include performing speech recognition on the user's utterance, and then processing the resulting text data to locate a name. This identification can then be utilized to retrieve information items or other speaker-related information that may be useful to present to the user.

FIG. 11.45 is an example flow diagram of example logic illustrating an example embodiment of process 11.4400 of FIG. 11.44. More particularly, FIG. 11.45 illustrates a process 11.4500 that includes the process 11.4400, wherein the determining the speaker-related information based on the data representing a speech signal that represents an utterance of the user includes operations performed by or at one or more of the following block(s).

At block 11.4501, the process performs determining whether the utterance of the user includes a name of the speaker.

FIG. 11.46 is an example flow diagram of example logic illustrating an example embodiment of process 11.100 of FIG. 11.1. More particularly, FIG. 11.46 illustrates a process 11.4600 that includes the process 11.100, wherein the determining speaker-related information includes operations performed by or at one or more of the following block(s).

At block 11.4601, the process performs receiving context information related to the user. Context information may generally include information about the setting, location, occupation, communication, workflow, or other event or factor that is present at, about, or with respect to the user.

At block 11.4602, the process performs determining speaker-related information, based on the context information. Context information may be used to improve or enhance speaker identification, such as by determining or narrowing a set of potential speakers based on the current location of the user.

FIG. 11.47 is an example flow diagram of example logic illustrating an example embodiment of process 11.4600 of FIG. 11.46. More particularly, FIG. 11.47 illustrates a process 11.4700 that includes the process 11.4600, wherein the receiving context information related to the user includes operations performed by or at one or more of the following block(s).

At block 11.4701, the process performs receiving an indication of a location of the user.

At block 11.4702, the process performs determining a plurality of persons with whom the user commonly interacts at the location. For example, if the indicated location is a workplace, the process may generate a list of co-workers, thereby reducing or simplifying the problem of speaker identification.

FIG. 11.48 is an example flow diagram of example logic illustrating an example embodiment of process 11.4700 of FIG. 11.47. More particularly, FIG. 11.48 illustrates a process 11.4800 that includes the process 11.4700, wherein the receiving an indication of a location of the user includes operations performed by or at one or more of the following block(s).

At block 11.4801, the process performs receiving a GPS location from a mobile device of the user.

FIG. 11.49 is an example flow diagram of example logic illustrating an example embodiment of process 11.4700 of FIG. 11.47. More particularly, FIG. 11.49 illustrates a process 11.4900 that includes the process 11.4700, wherein the receiving an indication of a location of the user includes operations performed by or at one or more of the following block(s).

At block 11.4901, the process performs receiving a network identifier that is associated with the location. The network identifier may be, for example, a service set identifier ("SSID") of a wireless network with which the user is currently associated.

FIG. 11.50 is an example flow diagram of example logic illustrating an example embodiment of process 11.4700 of FIG. 11.47. More particularly, FIG. 11.50 illustrates a process 11.5000 that includes the process 11.4700, wherein the receiving an indication of a location of the user includes operations performed by or at one or more of the following block(s).

At block 11.5001, the process performs receiving an indication that the user is at a workplace or a residence. For example, the process may translate a coordinate-based location (e.g., GPS coordinates) to a particular workplace by performing a map lookup or other mechanism.

FIG. 11.51 is an example flow diagram of example logic illustrating an example embodiment of process 11.4600 of FIG. 11.46. More particularly, FIG. 11.51 illustrates a process 11.5100 that includes the process 11.4600, wherein the receiving context information related to the user includes operations performed by or at one or more of the following block(s).

At block 11.5101, the process performs receiving information about a communication that references the speaker. As noted, context information may include communications. In this case, the process may exploit such communications to improve speaker identification or other operations.

FIG. 11.52 is an example flow diagram of example logic illustrating an example embodiment of process 11.5100 of FIG. 11.51. More particularly, FIG. 11.52 illustrates a process 11.5200 that includes the process 11.5100, wherein the receiving information about a communication that references the speaker includes operations performed by or at one or more of the following block(s).

At block 11.5201, the process performs receiving information about a message and/or a document that references the speaker.

FIG. 11.53 is an example flow diagram of example logic illustrating an example embodiment of process 11.100 of FIG. 11.1. More particularly, FIG. 11.53 illustrates a process 11.5300 that includes the process 11.100, wherein the determining speaker-related information includes operations performed by or at one or more of the following block(s).

At block 11.5301, the process performs identifying a plurality of candidate speakers. In some embodiments, more than one candidate speaker may be identified, such as by a voice identification process that returns multiple candidate speakers along with associated likelihoods and/or due to ambiguity or uncertainty regarding who is speaking.

At block 11.5302, the process performs presenting indications of the plurality of candidate speakers. The process may display or tell the user about the candidate speakers so that the user can select which one (if any) is the actual speaker.

FIG. 11.54 is an example flow diagram of example logic illustrating an example embodiment of process 11.5300 of FIG. 11.53. More particularly, FIG. 11.54 illustrates a process 11.5400 that includes the process 11.5300, and which further includes operations performed by or at the following block(s).

At block 11.5401, the process performs receiving from the user a selection of one of the plurality of candidate speakers that is the speaker. The user may indicate, such as via a user interface input, a gesture, a spoken command, or the like, which of the plurality of candidate speakers is the actual speaker.

At block 11.5402, the process performs determining the speaker-related information based on the selection received from the user.

FIG. 11.55 is an example flow diagram of example logic illustrating an example embodiment of process 11.5300 of FIG. 11.53. More particularly, FIG. 11.55 illustrates a process 11.5500 that includes the process 11.5300, and which further includes operations performed by or at the following block(s).

At block 11.5501, the process performs receiving from the user an indication that none of the plurality of candidate speakers are the speaker. The user may indicate, such as via a user interface input, a gesture, a spoken command, or the like, that he does not recognize any of the candidate speakers as the actual speaker.

At block 11.5502, the process performs training a speaker identification system based on the received indication. The received indication may in turn be used to train or otherwise improve performance of a speaker identification or recognition system.

FIG. 11.56 is an example flow diagram of example logic illustrating an example embodiment of process 11.5300 of FIG. 11.53. More particularly, FIG. 11.56 illustrates a process 11.5600 that includes the process 11.5300, and which further includes operations performed by or at the following block(s).

At block 11.5601, the process performs training a speaker identification system based on a selection regarding the plurality of candidate speakers received from a user. An selection regarding which speaker is the actual speaker (or that the actual speaker is not recognized amongst the candidate speakers) may be used to train or otherwise improve performance of a speaker identification or recognition system.

FIG. 11.57 is an example flow diagram of example logic illustrating an example embodiment of process 11.100 of FIG. 11.1. More particularly, FIG. 11.57 illustrates a process 11.5700 that includes the process 11.100, and which further includes operations performed by or at the following block(s).

At block 11.5701, the process performs developing a corpus of speaker data by recording speech from a plurality of speakers.

At block 11.5702, the process performs determining the speaker-related information and/or translating the utterance based at least in part on the corpus of speaker data. Over time, the process may gather and record speech obtained during its operation, and then use that speech as part of a corpus that is used during future operation. In this manner, the process may improve its performance by utilizing actual, environmental speech data, possibly along with feedback received from the user, as discussed below.

FIG. 11.58 is an example flow diagram of example logic illustrating an example embodiment of process 11.5700 of FIG. 11.57. More particularly, FIG. 11.58 illustrates a process 11.5800 that includes the process 11.5700, and which further includes operations performed by or at the following block(s).

At block 11.5801, the process performs generating a speech model associated with each of the plurality of speakers, based on the recorded speech. The generated speech model may include voice print data that can be used for speaker identification, a language model that may be used for speech recognition purposes, a noise model that may be used to improve operation in speaker-specific noisy environments.

FIG. 11.59 is an example flow diagram of example logic illustrating an example embodiment of process 11.5700 of FIG. 11.57. More particularly, FIG. 11.59 illustrates a process 11.5900 that includes the process 11.5700, and which further includes operations performed by or at the following block(s).

At block 11.5901, the process performs receiving feedback regarding accuracy of the speaker-related information. During or after providing speaker-related information to the user, the user may provide feedback regarding its accuracy. This feedback may then be used to train a speech processor (e.g., a speaker identification module, a speech recognition module). Feedback may be provided in various ways, such as by processing positive/negative utterances from the speaker (e.g., "That is not my name"), receiving a positive/negative utterance from the user (e.g., "I am sorry."), receiving a keyboard/button event that indicates a correct or incorrect identification.

At block 11.5902, the process performs training a speech processor based at least in part on the received feedback.

FIG. 11.60 is an example flow diagram of example logic illustrating an example embodiment of process 11.100 of FIG. 11.1. More particularly, FIG. 11.60 illustrates a process 11.6000 that includes the process 11.100, wherein the presenting the message in the second language includes operations performed by or at one or more of the following block(s).

At block 11.6001, the process performs transmitting the message in the second language from a first device to a second device. In some embodiments, at least some of the processing may be performed on distinct devices, resulting in a transmission of the translated utterance from one device to another device.

FIG. 11.61 is an example flow diagram of example logic illustrating an example embodiment of process 11.6000 of FIG. 11.60. More particularly, FIG. 11.61 illustrates a process 11.6100 that includes the process 11.6000, wherein the transmitting the message in the second language from a first device to a second device includes operations performed by or at one or more of the following block(s).

At block 11.6101, the process performs wirelessly transmitting the message in the second language. Various protocols may be used, including Bluetooth, infrared, WiFi, or the like.

FIG. 11.62 is an example flow diagram of example logic illustrating an example embodiment of process 11.6000 of FIG. 11.60. More particularly, FIG. 11.62 illustrates a process 11.6200 that includes the process 11.6000, wherein the transmitting the message in the second language from a first device to a second device includes operations performed by or at one or more of the following block(s).

At block 11.6201, the process performs transmitting the message in the second language from a smart phone or portable media device to the second device. For example a smart phone may forward the translated utterance to a desktop computing system for display on an associated monitor.

FIG. 11.63 is an example flow diagram of example logic illustrating an example embodiment of process 11.6000 of FIG. 11.60. More particularly, FIG. 11.63 illustrates a process 11.6300 that includes the process 11.6000, wherein the transmitting the message in the second language from a first device to a second device includes operations performed by or at one or more of the following block(s).

At block 11.6301, the process performs transmitting the message in the second language from a server system to the second device. In some embodiments, some portion of the processing is performed on a server system that may be remote from the hearing device or the second device.

FIG. 11.64 is an example flow diagram of example logic illustrating an example embodiment of process 11.6300 of FIG. 11.63. More particularly, FIG. 11.64 illustrates a process 11.6400 that includes the process 11.6300, wherein the transmitting the message in the second language from a server system includes operations performed by or at one or more of the following block(s).

At block 11.6401, the process performs transmitting the message in the second language from a server system that resides in a data center.

FIG. 11.65 is an example flow diagram of example logic illustrating an example embodiment of process 11.6300 of FIG. 11.63. More particularly, FIG. 11.65 illustrates a process 11.6500 that includes the process 11.6300, wherein the transmitting the message in the second language from a server system includes operations performed by or at one or more of the following block(s).

At block 11.6501, the process performs transmitting the message in the second language from a server system to a desktop computer of the user.

FIG. 11.66 is an example flow diagram of example logic illustrating an example embodiment of process 11.6300 of FIG. 11.63. More particularly, FIG. 11.66 illustrates a process 11.6600 that includes the process 11.6300, wherein the transmitting the message in the second language from a server system includes operations performed by or at one or more of the following block(s).

At block 11.6601, the process performs transmitting the message in the second language from a server system to a mobile device of the user.

FIG. 11.67 is an example flow diagram of example logic illustrating an example embodiment of process 11.100 of FIG. 11.1. More particularly, FIG. 11.67 illustrates a process 11.6700 that includes the process 11.100, and which further includes operations performed by or at the following block(s).

At block 11.6701, the process performs performing the receiving data representing a speech signal, the determining speaker-related information, the translating the utterance in the first language into a message in a second language, and/or the presenting the message in the second language on a mobile device that is operated by the user. As noted, In some embodiments a mobile device such as a smart phone or media player may have sufficient processing power to perform a portion of the process, such as identifying the speaker, determining the speaker-related information, or the like.

FIG. 11.68 is an example flow diagram of example logic illustrating an example embodiment of process 11.100 of FIG. 11.1. More particularly, FIG. 11.68 illustrates a process 11.6800 that includes the process 11.100, and which further includes operations performed by or at the following block(s).

At block 11.6801, the process performs performing the receiving data representing a speech signal, the determining speaker-related information, the translating the utterance in the first language into a message in a second language, and/or the presenting the message in the second language on a desktop computer that is operated by the user. For example, in an office setting, the user's desktop computer may be configured to perform some or all of the process.

FIG. 11.69 is an example flow diagram of example logic illustrating an example embodiment of process 11.100 of FIG. 11.1. More particularly, FIG. 11.69 illustrates a process 11.6900 that includes the process 11.100, and which further includes operations performed by or at the following block(s).

At block 11.6901, the process performs determining to perform at least some of determining speaker-related information or translating the utterance in the first language into a message in a second language on another computing device that has available processing capacity. In some embodiments, the process may determine to offload some of its processing to another computing device or system.

FIG. 11.70 is an example flow diagram of example logic illustrating an example embodiment of process 11.6900 of FIG. 11.69. More particularly, FIG. 11.70 illustrates a process 11.7000 that includes the process 11.6900, and which further includes operations performed by or at the following block(s).

At block 11.7001, the process performs receiving at least some of speaker-related information from the another computing device. The process may receive the speaker-related information or a portion thereof from the other computing device.

FIG. 11.71 is an example flow diagram of example logic illustrating an example embodiment of process 11.100 of FIG. 11.1. More particularly, FIG. 11.71 illustrates a process 11.7100 that includes the process 11.100, and which further includes operations performed by or at the following block(s).

At block 11.7101, the process performs informing the user of the speaker-related information. The process may also inform the user of the speaker-related information, so that the user can utilize the information in his conversation with the speaker, or for other reasons.

FIG. 11.72 is an example flow diagram of example logic illustrating an example embodiment of process 11.7100 of FIG. 11.71. More particularly, FIG. 11.72 illustrates a process 11.7200 that includes the process 11.7100, and which further includes operations performed by or at the following block(s).

At block 11.7201, the process performs receiving feedback from the user regarding correctness of the speaker-related information. The speaker may notify the process when the speaker-related information is incorrect or inaccurate, such as when the process has misidentified the speaker's language or name.

At block 11.7202, the process performs refining the speaker-related information based on the received feedback. The received feedback may be used to train or otherwise improve the performance of the AEFS.

FIG. 11.73 is an example flow diagram of example logic illustrating an example embodiment of process 11.7200 of FIG. 11.72. More particularly, FIG. 11.73 illustrates a process 11.7300 that includes the process 11.7200, wherein the refining the speaker-related information based on the received feedback includes operations performed by or at one or more of the following block(s).

At block 11.7301, the process performs presenting speaker-related information corresponding to each of multiple likely speakers.

At block 11.7302, the process performs receiving from the user an indication that the speaker is one of the multiple likely speakers.

FIG. 11.74 is an example flow diagram of example logic illustrating an example embodiment of process 11.7100 of FIG. 11.71. More particularly, FIG. 11.74 illustrates a process 11.7400 that includes the process 11.7100, wherein the informing the user of the speaker-related information includes operations performed by or at one or more of the following block(s).

At block 11.7401, the process performs presenting the speaker-related information on a display of the hearing device. In some embodiments, the hearing device may include a display. For example, where the hearing device is a smart phone or media device, the hearing device may include a display that provides a suitable medium for presenting the name or other identifier of the speaker.

FIG. 11.75 is an example flow diagram of example logic illustrating an example embodiment of process 11.7100 of FIG. 11.71. More particularly, FIG. 11.75 illustrates a process 11.7500 that includes the process 11.7100, wherein the informing the user of the speaker-related information includes operations performed by or at one or more of the following block(s).

At block 11.7501, the process performs presenting the speaker-related information on a display of a computing device that is distinct from the hearing device. In some embodiments, the hearing device may not itself include a display. For example, where the hearing device is a office phone, the process may elect to present the speaker-related information on a display of a nearby computing device, such as a desktop or laptop computer in the vicinity of the phone.

FIG. 11.76 is an example flow diagram of example logic illustrating an example embodiment of process 11.7100 of FIG. 11.71. More particularly, FIG. 11.76 illustrates a process 11.7600 that includes the process 11.7100, wherein the informing the user of the speaker-related information includes operations performed by or at one or more of the following block(s).

At block 11.7601, the process performs audibly informing the user to view the speaker-related information on a display device.

FIG. 11.77 is an example flow diagram of example logic illustrating an example embodiment of process 11.7600 of FIG. 11.76. More particularly, FIG. 11.77 illustrates a process 11.7700 that includes the process 11.7600, wherein the audibly informing the user includes operations performed by or at one or more of the following block(s).

At block 11.7701, the process performs playing a tone via an audio speaker of the hearing device. The tone may include a beep, chime, or other type of notification.

FIG. 11.78 is an example flow diagram of example logic illustrating an example embodiment of process 11.7600 of FIG. 11.76. More particularly, FIG. 11.78 illustrates a process 11.7800 that includes the process 11.7600, wherein the audibly informing the user includes operations performed by or at one or more of the following block(s).

At block 11.7801, the process performs playing synthesized speech via an audio speaker of the hearing device, the synthesized speech telling the user to view the display device. In some embodiments, the process may perform text-to-speech processing to generate audio of a textual message or notification, and this audio may then be played or otherwise output to the user via the hearing device.

FIG. 11.79 is an example flow diagram of example logic illustrating an example embodiment of process 11.7600 of FIG. 11.76. More particularly, FIG. 11.79 illustrates a process 11.7900 that includes the process 11.7600, wherein the audibly informing the user includes operations performed by or at one or more of the following block(s).

At block 11.7901, the process performs telling the user that at least one of a document, a calendar event, and/or a communication is available for viewing on the display device. Telling the user about a document or other speaker-related information may include playing synthesized speech that includes an utterance to that effect.

FIG. 11.80 is an example flow diagram of example logic illustrating an example embodiment of process 11.7600 of FIG. 11.76. More particularly, FIG. 11.80 illustrates a process 11.8000 that includes the process 11.7600, wherein the audibly informing the user includes operations performed by or at one or more of the following block(s).

At block 11.8001, the process performs audibly informing the user in a manner that is not audible to the speaker. For example, a tone or verbal message may be output via an earpiece speaker, such that other parties to the conversation (including the speaker) do not hear the notification. As another example, a tone or other notification may be into the earpiece of a telephone, such as when the process is performing its functions within the context of a telephonic conference call.

C. Example Computing System Implementation

Figure 12:
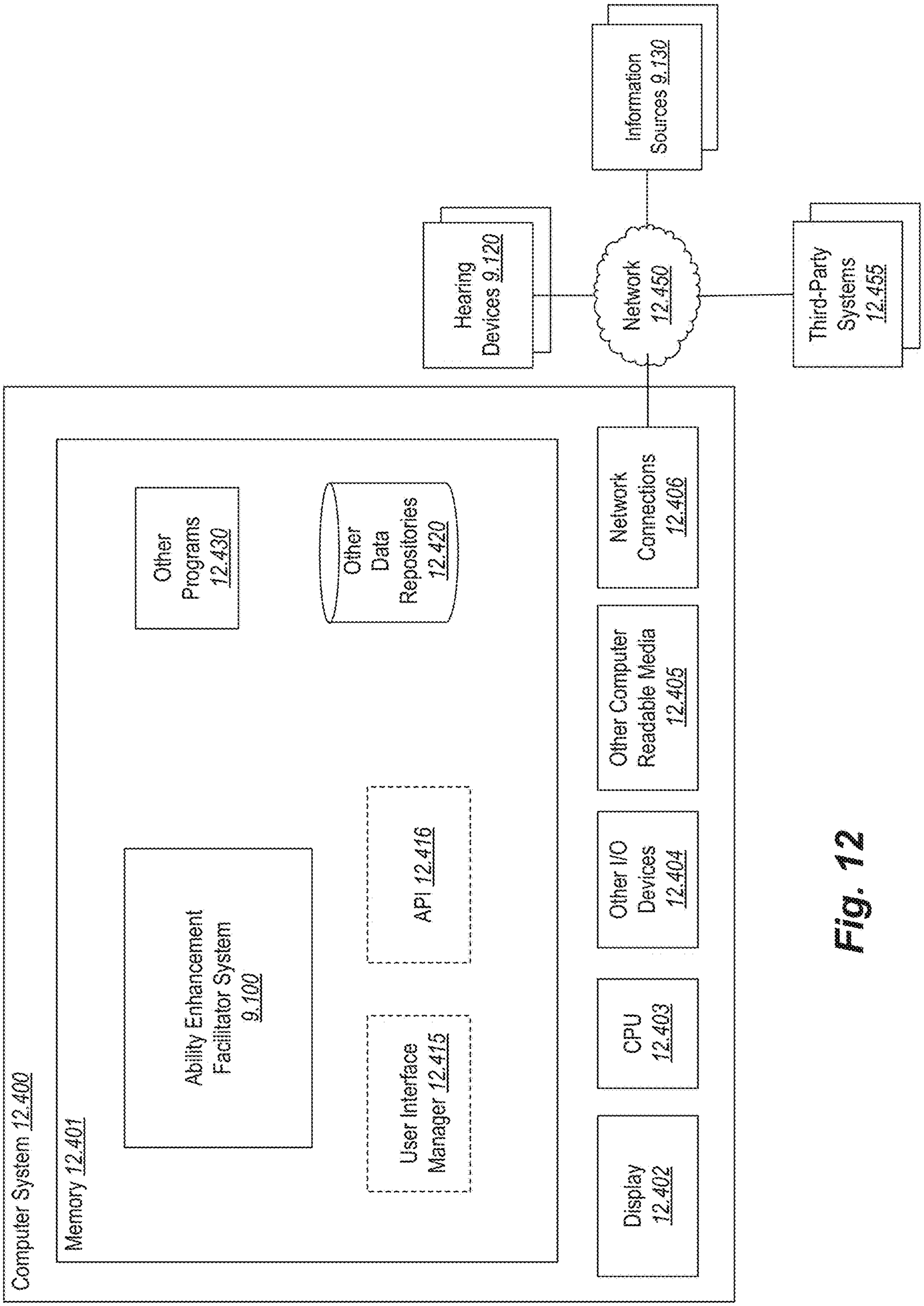
FIG. 12 is an example block diagram of an example computing system for implementing an ability enhancement facilitator system according to an example embodiment.

FIG. 12 is an example block diagram of an example computing system for implementing an ability enhancement facilitator system according to an example embodiment. In particular, FIG. 12 shows a computing system 12.400 that may be utilized to implement an AEFS 9.100.

Note that one or more general purpose or special purpose computing systems/devices may be used to implement the AEFS 9.100. In addition, the computing system 12.400 may comprise one or more distinct computing systems/devices and may span distributed locations. Furthermore, each block shown may represent one or more such blocks as appropriate to a specific embodiment or may be combined with other blocks. Also, the AEFS 9.100 may be implemented in software, hardware, firmware, or in some combination to achieve the capabilities described herein.

In the embodiment shown, computing system 12.400 comprises a computer memory ("memory") 12.401, a display 12.402, one or more Central Processing Units ("CPU") 12.403, Input/Output devices 12.404 (e.g., keyboard, mouse, CRT or LCD display, and the like), other computer-readable media 12.405, and network connections 12.406. The AEFS 9.100 is shown residing in memory 12.401. In other embodiments, some portion of the contents, some or all of the components of the AEFS 9.100 may be stored on and/or transmitted over the other computer-readable media 12.405. The components of the AEFS 9.100 preferably execute on one or more CPUs 12.403 and recommend content items, as described herein. Other code or programs 12.430 (e.g., an administrative interface, a Web server, and the like) and potentially other data repositories, such as data repository 12.420, also reside in the memory 12.401, and preferably execute on one or more CPUs 12.403. Of note, one or more of the components in FIG. 12 may not be present in any specific implementation. For example, some embodiments may not provide other computer readable media 12.405 or a display 12.402.

The AEFS 9.100 interacts via the network 12.450 with hearing devices 9.120, speaker-related information sources 9.130, and third-party systems/applications 12.455. The network 12.450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 12.455 may include any systems that provide data to, or utilize data from, the AEFS 9.100, including Web browsers, e-commerce sites, calendar applications, email systems, social networking services, and the like.

The AEFS 9.100 is shown executing in the memory 12.401 of the computing system 12.400. Also included in the memory are a user interface manager 12.415 and an application program interface ("API") 12.416. The user interface manager 12.415 and the API 12.416 are drawn in dashed lines to indicate that in other embodiments, functions performed by one or more of these components may be performed externally to the AEFS 9.100.

The UI manager 12.415 provides a view and a controller that facilitate user interaction with the AEFS 9.100 and its various components. For example, the UI manager 12.415 may provide interactive access to the AEFS 9.100, such that users can configure the operation of the AEFS 9.100, such as by providing the AEFS 9.100 credentials to access various sources of speaker-related information, including social networking services, email systems, document stores, or the like. In some embodiments, access to the functionality of the UI manager 12.415 may be provided via a Web server, possibly executing as one of the other programs 12.430. In such embodiments, a user operating a Web browser executing on one of the third-party systems 12.455 can interact with the AEFS 9.100 via the UI manager 12.415.

The API 12.416 provides programmatic access to one or more functions of the AEFS 9.100. For example, the API 12.416 may provide a programmatic interface to one or more functions of the AEFS 9.100 that may be invoked by one of the other programs 12.430 or some other module. In this manner, the API 12.416 facilitates the development of third-party software, such as user interfaces, plug-ins, adapters (e.g., for integrating functions of the AEFS 9.100 into Web applications), and the like.

In addition, the API 12.416 may be in at least some embodiments invoked or otherwise accessed via remote entities, such as code executing on one of the hearing devices 9.120, information sources 9.130, and/or one of the third-party systems/applications 12.455, to access various functions of the AEFS 9.100. For example, an information source 9.130 may push speaker-related information (e.g., emails, documents, calendar events) to the AEFS 9.100 via the API 12.416. The API 12.416 may also be configured to provide management widgets (e.g., code modules) that can be integrated into the third-party applications 12.455 and that are configured to interact with the AEFS 9.100 to make at least some of the described functionality available within the context of other applications (e.g., mobile apps).

In an example embodiment, components/modules of the AEFS 9.100 are implemented using standard programming techniques. For example, the AEFS 9.100 may be implemented as a "native" executable running on the CPU 12.403, along with one or more static or dynamic libraries. In other embodiments, the AEFS 9.100 may be implemented as instructions processed by a virtual machine that executes as one of the other programs 12.430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 9.100, such as in the data store 12.420 (or 10.240), can be available by standard mechanisms such as through C, C++, C #, and Java APIs; libraries for accessing files, databases, or other data repositories; through scripting languages such as XML; or through Web servers, FTP servers, or other types of servers providing access to stored data. The data store 12.420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 9.100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

IV. Enhanced Voice Conferencing

Embodiments described herein provide enhanced computer- and network-based methods and systems for enhanced voice conferencing and, more particularly, for voice conferencing enhanced by presenting speaker-related information determined at least in part on speaker utterances. Example embodiments provide an Ability Enhancement Facilitator System ("AEFS"). The AEFS may augment, enhance, or improve the senses (e.g., hearing), faculties (e.g., memory, language comprehension), and/or other abilities of a user, such as by determining and presenting speaker-related information to participants in a conference call. For example, when multiple speakers engage in a voice conference (e.g., a telephone conference), the AEFS may "listen" to the voice conference in order to determine speaker-related information, such as identifying information (e.g., name, title) about the current speaker (or some other speaker) and/or events/communications relating to the current speaker and/or to the subject matter of the conference call generally. Then, the AEFS may inform a user (typically one of the participants in the voice conference) of the determined information, such as by presenting the information via a conferencing device (e.g., smart phone, laptop, desktop telephone) associated with the user. The user can then receive the information (e.g., by reading or hearing it via the conferencing device) provided by the AEFS and advantageously use that information to avoid embarrassment (e.g., due to an inability to identify the speaker), engage in a more productive conversation (e.g., by quickly accessing information about events, deadlines, or communications related to the speaker), or the like.

In some embodiments, the AEFS is configured to receive data that represents speech signals from a voice conference amongst multiple speakers. The multiple speakers may be remotely located from one another, such as by being in different rooms within a building, by being in different buildings within a site or campus, by being in different cities, or the like. Typically, the multiple speakers are each using a conferencing device, such as a land-line telephone, cell phone, smart phone, computer, or the like, to communicate with one another. The AEFS may obtain the data that represents the speech signals from one or more of the conferencing devices and/or from some intermediary point, such as a conference call facility, chat system, videoconferencing system, PBX, or the like. The AEFS may then determine voice conference-related information, including speaker-related information associated with the one or more of the speakers. Determining speaker-related information may include identifying the speaker based at least in part on the received data, such as by performing speaker recognition and/or speech recognition with the received data. Determining speaker-related information may also or instead include determining an identifier (e.g., name or title) of the speaker, an information item (e.g., a document, event, communication) that references the speaker, or the like. Then, the AEFS may inform a user of the determined speaker-related information by, for example, visually presenting the speaker-related information via a display screen of a conferencing device associated with the user. In other embodiments, some other display may be used, such as a screen on a laptop computer that is being used by the user while the user is engaged in the voice conference via a telephone. In some embodiments, the AEFS may inform the user in an audible manner, such as by "speaking" the determined speaker-related information via an audio speaker of the conferencing device.

In some embodiments, the AEFS may perform other services, including translating utterances made by speakers in a voice conference, so that a multi-lingual voice conference may be facilitated even when some speakers do not understand the language used by other speakers. In such cases, the determined speaker-related information may be used to enhance or augment language translation and/or related processes, including speech recognition, natural language processing, and the like.

A. Ability Enhancement Facilitator System Overview

Figure 13A:
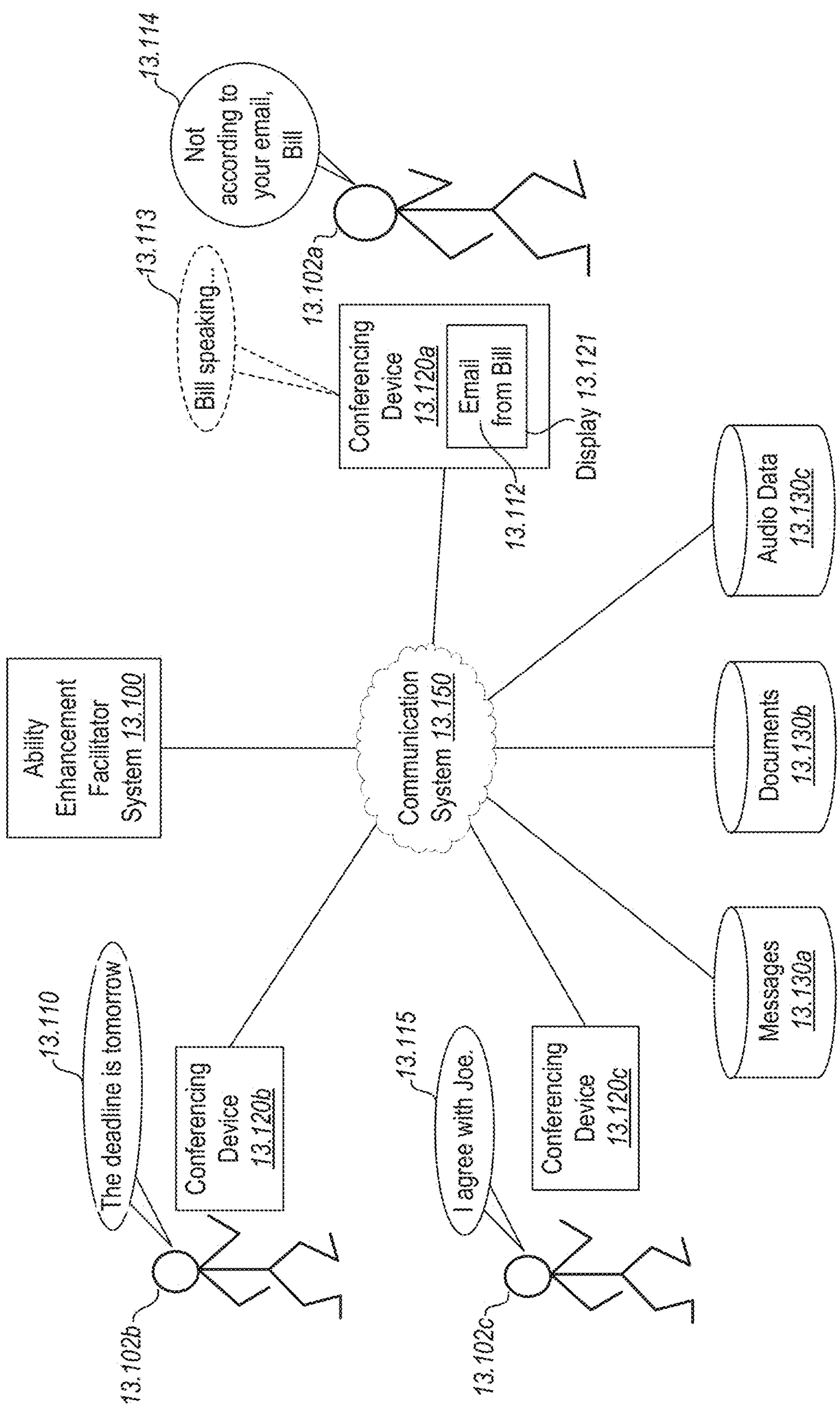
FIG. 13A is an example block diagram of an ability enhancement facilitator system according to an example embodiment.

FIG. 13A is an example block diagram of an ability enhancement facilitator system according to an example embodiment. In particular, FIG. 13A shows multiple speakers 13.102*a*-102*c* engaging in a voice conference with one another. In particular, a first speaker 13.102*a* (who may also be referred to as a "user") is engaging in a voice conference with speakers 13.102*b* and 13.102*c*. Abilities of the speaker 13.102*a* are being enhanced, via a conferencing device 13.120*a*, by an Ability Enhancement Facilitator System ("AEFS") 13.100. The conferencing device 13.120*a* includes a display 13.121 that is configured to present text and/or graphics. The conferencing device 13.120*a* also includes an audio speaker (not shown) that is configured to present audio output. Speakers 13.102*b* and 13.102*c* are each respectively using a conferencing device 13.120*b* and 13.120*c* to engage in the voice conference with each other and speaker 13.102*a* via a communication system 13.150.

The AEFS 13.100 and the conferencing devices 13.120 are communicatively coupled to one another via the communication system 13.150. The AEFS 13.100 is also communicatively coupled to speaker-related information sources 130, including messages 13.130*a*, documents 13.130*b*, and audio data 13.130*c*. The AEFS 13.100 uses the information in the information sources 13.130, in conjunction with data received from the conferencing devices 13.120, to determine information related to the voice conference, including speaker-related information associated with the speakers 13.102.

In the scenario illustrated in FIG. 13A, the voice conference among the speakers 13.102 is under way. For this example, participants in the voice conference are attempting to determine the date of a particular deadline for a project. The speaker 13.102*b* believes that the deadline is tomorrow, and has made an utterance 13.110 by speaking the words "The deadline is tomorrow." The speaker 13.102*a* may have a notion or belief that the speaker 13.102*b* is incorrect, but may not be able to support such an assertion. As will be discussed further below, the AEFS 13.100 will assist user 13.102*a* in determining that the deadline is actually next week, not tomorrow.

The AEFS 13.100 receives data representing a speech signal that represents the utterance 13.110, such as by receiving a digital representation of an audio signal transmitted by conferencing device 13.120*b*. The data representing the speech signal may include audio samples (e.g., raw audio data), compressed audio data, speech vectors (e.g., mel frequency cepstral coefficients), and/or any other data that may be used to represent an audio signal. The AEFS 13.100 may receive the data in various ways, including from one or more of the conferencing devices or from some intermediate system (e.g., a voice conferencing system that is facilitating the conference between the conferencing devices 13.120).

The AEFS 13.100 then determines speaker-related information associated with the speaker 13.102*b*. Determining speaker-related information may include identifying the speaker 13.102*b* based on the received data representing the speech signal. In some embodiments, identifying the speaker may include performing speaker recognition, such as by generating a "voice print" from the received data and comparing the generated voice print to previously obtained voice prints. For example, the generated voice print may be compared to multiple voice prints that are stored as audio data 13.130*c* and that each correspond to a speaker, in order to determine a speaker who has a voice that most closely matches the voice of the speaker 13.102*b*. The voice prints stored as audio data 13.130*c* may be generated based on various sources of data, including data corresponding to speakers previously identified by the AEFS 13.100, voice mail messages, speaker enrollment data, or the like.

In some embodiments, identifying the speaker 13.102*b* may include performing speech recognition, such as by automatically converting the received data representing the speech signal into text. The text of the speaker's utterance may then be used to identify the speaker 13.102*b*. In particular, the text may identify one or more entities such as information items (e.g., communications, documents), events (e.g., meetings, deadlines), persons, or the like, that may be used by the AEFS 13.100 to identify the speaker 13.102*b*. The information items may be accessed with reference to the messages 13.130*a* and/or documents 13.130*b*. As one example, the speaker's utterance 13.110 may identify an email message that was sent to the speaker 13.102*b* and possibly others (e.g., "That sure was a nasty email Bob sent"). As another example, the speaker's utterance 13.110 may identify a meeting or other event to which the speaker 13.102*b* and possibly others are invited.

Note that in some cases, the text of the speaker's utterance 13.110 may not definitively identify the speaker 13.102*b*, such as because the speaker 13.102*b* has not previously met or communicated with other participants in the voice conference or because a communication was sent to recipients in addition to the speaker 13.102*b*. In such cases, there may be some ambiguity as to the identity of the speaker 13.102*b*. However, in such cases, a preliminary identification of multiple candidate speakers may still be used by the AEFS 13.100 to narrow the set of potential speakers, and may be combined with (or used to improve) other techniques, including speaker recognition as discussed above. In addition, even if the speaker 13.102 is unknown to the user 13.102*a* the AEFS 13.100 may still determine useful demographic or other speaker-related information that may be fruitfully employed for speech recognition or other purposes.

Note also that speaker-related information need not definitively identify the speaker. In particular, it may also or instead be or include other information about or related to the speaker, such as demographic information including the gender of the speaker 13.102, his country or region of origin, the language(s) spoken by the speaker 13.102, or the like. Speaker-related information may include an organization that includes the speaker (along with possibly other persons, such as a company or firm), an information item that references the speaker (and possibly other persons), an event involving the speaker, or the like. The speaker-related information may generally be determined with reference to the messages 13.130*a*, documents 13.130*b*, and/or audio data

13.130*c*. For example, having determined the identity of the speaker 13.102, the AEFS 13.100 may search for emails and/or documents that are stored as messages 13.130*a* and/or documents 13.103*b* and that reference (e.g., are sent to, are authored by, are named in) the speaker 13.102.

Other types of speaker-related information is contemplated, including social networking information, such as personal or professional relationship graphs represented by a social networking service, messages or status updates sent within a social network, or the like. Social networking information may also be derived from other sources, including email lists, contact lists, communication patterns (e.g., frequent recipients of emails), or the like.

The AEFS 13.100 then informs the user (speaker 13.102*a*) of the determined speaker-related information. Informing the user may include audibly presenting the information to the user via an audio speaker of the conferencing device 13.120*a*. In this example, the conferencing device 13.120*a* tells the user, such as by playing audio via an earpiece or in another manner that cannot be detected by the other participants in the voice conference, that speaker 13.102*b* is currently speaking. In particular, the conferencing device 13.120*a* plays audio that includes the utterance "Bill speaking" to the user.

Informing the user of the determined speaker-related information may also or instead include visually presenting the information, such as via the display 13.121 or audio speaker of conferencing device 13.120*a*. In the illustrated example, the AEFS 13.100 causes a message 13.112 that includes text of an email from Bill (speaker 13.102*b*) to be displayed on the display 13.121. In this example, the displayed email includes a statement from Bill (speaker 13.102*b*) that sets the project deadline to next week, not tomorrow. Upon reading the message 13.112 and thereby learning the actual project deadline, the speaker 13.102*a* responds to the original utterance 13.110 of speaker 13.102*b* (Bill) with a response utterance 13.114 that includes the words "Not according to your email, Bill." In the illustrated example, speaker 13.102*c*, upon hearing the utterance 13.114, responds with an utterance 13.115 that includes the words "I agree with Joe," indicating his agreement with speaker 13.102*a*.

As the speakers 13.102*a*-102*c* continue to engage in the voice conference, the AEFS 13.100 may monitor the conversation and continue to determine and present speaker-related information at least to the speaker 13.102*a*. Another example function that may be performed by the AEFS 13.100 includes presenting, as each of the multiple speakers takes a turn speaking during the voice conference, information about the identity of the current speaker. For example, in response to the onset of an utterance of a speaker, the AEFS 13.100 may display the name of the speaker on the display 13.121, so that the user is always informed as to who is speaking.

The AEFS 13.100 may perform other services, including translating utterances made by speakers in the voice conference, so that a multi-lingual voice conference may be conducted even between participants who do not understand all of the languages being spoken. Translating utterances may initially include determining speaker-related information by automatically determining the language that is being used by a current speaker. Determining the language may be based on signal processing techniques that identify signal characteristics unique to particular languages. Determining the language may also or instead be performed by simultaneous or concurrent application of multiple speech recognizers that are each configured to recognize speech in a corresponding language, and then choosing the language corresponding to the recognizer that produces the result having the highest confidence level. Determining the language may also or instead be based on contextual factors, such as GPS information indicating that the current speaker is in Germany, Austria, or some other region where German is commonly spoken.

Having determined speaker-related information, the AEFS 13.100 may then translate an utterance in a first language into an utterance in a second language. In some embodiments, the AEFS 13.100 translates an utterance by first performing speech recognition to translate the utterance into a textual representation that includes a sequence of words in the first language. Then, the AEFS 13.100 may translate the text in the first language into a message in a second language, using machine translation techniques. Speech recognition and/or machine translation may be modified, enhanced, and/or otherwise adapted based on the speaker-related information. For example, a speech recognizer may use speech or language models tailored to the speaker's gender, accent/dialect (e.g., determined based on country/region of origin), social class, or the like. As another example, a lexicon that is specific to the speaker may be used during speech recognition and/or language translation. Such a lexicon may be determined based on prior communications of the speaker, profession of the speaker (e.g., engineer, attorney, doctor), or the like.

Once the AEFS 13.100 has translated an utterance in a first language into a message in a second language, the AEFS 13.100 can present the message in the second language. Various techniques are contemplated. In one approach, the AEFS 13.100 causes the conferencing device 13.120*a* (or some other device accessible to the user) to visually display the message on the display 13.121. In another approach, the AEFS 13.100 causes the conferencing device 13.120*a* (or some other device) to "speak" or "tell" the user/speaker 13.102*a* the message in the second language. Presenting a message in this manner may include converting a textual representation of the message into audio via text-to-speech processing (e.g., speech synthesis), and then presenting the audio via an audio speaker (e.g., earphone, earpiece, earbud) of the conferencing device 13.120*a*.

Figure 13B:
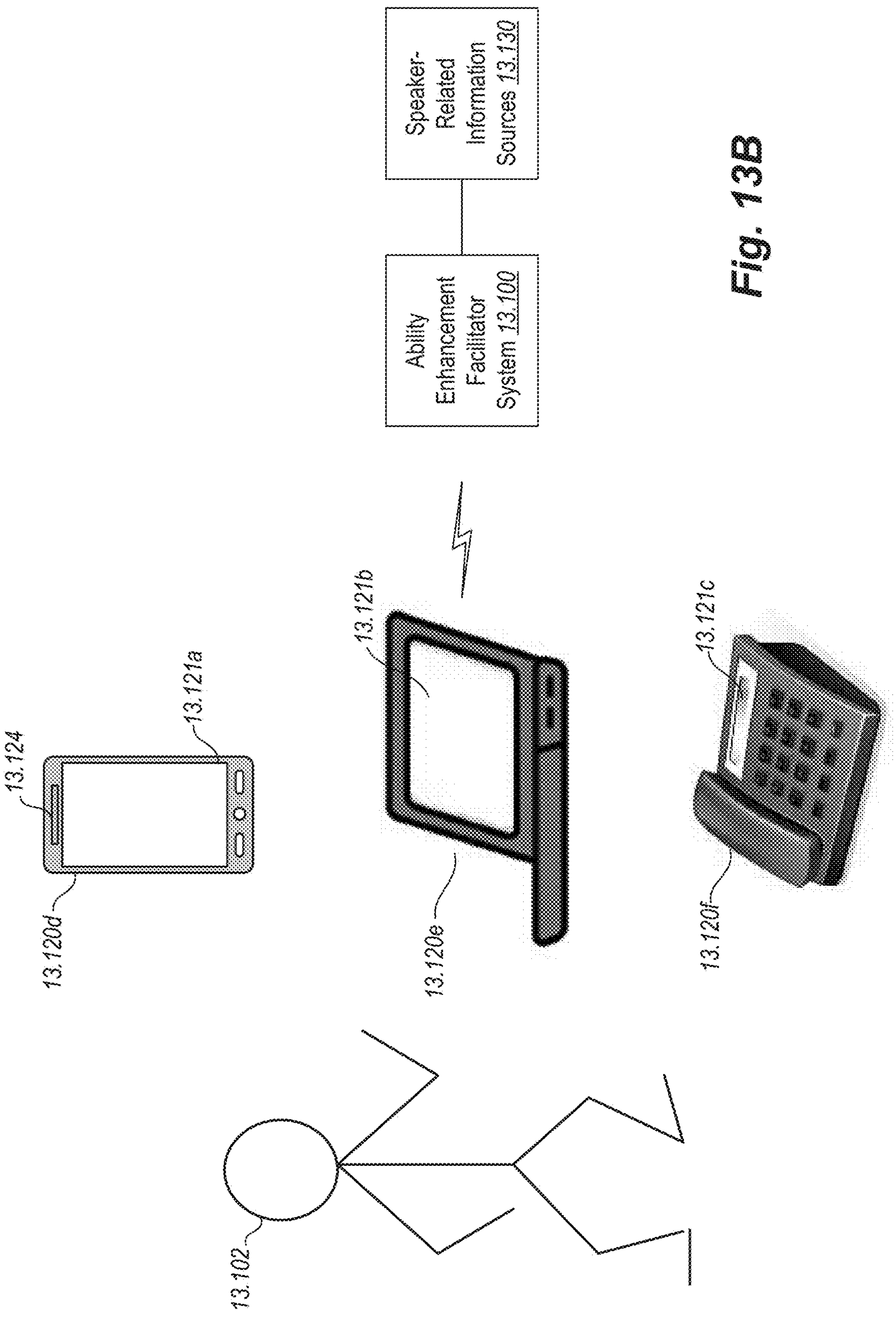
FIG. 13B is an example block diagram illustrating various conferencing devices according to example embodiments.

FIG. 13B is an example block diagram illustrating various conferencing devices according to example embodiments. In particular, FIG. 13B illustrates an AEFS 13.100 in communication with example conferencing devices 13.120*d*-120*f*. Conferencing device 13.120*d* is a smart phone that includes a display 13.121*a* and an audio speaker 13.124. Conferencing device 13.120*e* is a laptop computer that includes a display 13.121*b*. Conferencing device 13.120*f* is an office telephone that includes a display 13.121*c*. Each of the illustrated conferencing devices 13.120 includes or may be communicatively coupled to a microphone operable to receive a speech signal from a speaker. As described above, the conferencing device 13.120 may then convert the speech signal into data representing the speech signal, and then forward the data to the AEFS 13.100.

As an initial matter, note that the AEFS 13.100 may use output devices of a conferencing device or other devices to present information to a user, such as speaker-related information that may generally assist the user in engaging in a voice conference with other participants. For example, the AEFS 13.100 may present speaker-related information about a current speaker, such as his name, title, communications that reference or are related to the speaker, and the like.

For audio output, each of the illustrated conferencing devices 13.120 may include or be communicatively coupled to an audio speaker operable to generate and output audio signals that may be perceived by the user 13.102. As discussed above, the AEFS 13.100 may use such a speaker to provide speaker-related information to the user 13.102. The AEFS 13.100 may also or instead audibly notify, via a speaker of a conferencing device 13.120, the user 13.102 to view speaker-related information displayed on the conferencing device 13.120. For example, the AEFS 13.100 may cause a tone (e.g., beep, chime) to be played via the earpiece of the telephone 13.120*f*. Such a tone may then be recognized by the user 13.102, who will in response attend to information displayed on the display 13.121*c*. Such audible notification may be used to identify a display that is being used as a current display, such as when multiple displays are being used. For example, different first and second tones may be used to direct the user's attention to the smart phone display 13.121*a* and laptop display 13.121*b*, respectively. In some embodiments, audible notification may include playing synthesized speech (e.g., from text-to-speech processing) telling the user 13.102 to view speaker-related information on a particular display device (e.g., "Recent email on your smart phone").

The AEFS 13.100 may generally cause speaker-related information (or other information including translations) to be presented on various destination output devices. In some embodiments, the AEFS 13.100 may use a display of a conferencing device as a target for displaying information. For example, the AEFS 13.100 may display speaker-related information on the display 13.121*a* of the smart phone 13.120*d*. On the other hand, when the conferencing device does not have its own display or if the display is not suitable for displaying the determined information, the AEFS 13.100 may display speaker-related information on some other destination display that is accessible to the user 13.102. For example, when the telephone 13.120*f* is the conferencing device and the user also has the laptop computer 13.120*e* in his possession, the AEFS 13.100 may elect to display an email or other substantial document upon the display 13.121*b* of the laptop computer 13.120*e*.

The AEFS 13.100 may determine a destination output device for a translation, speaker-related information, or other information. In some embodiments, determining a destination output device may include selecting from one of multiple possible destination displays based on whether a display is capable of displaying all of the information. For example, if the environment is noisy, the AEFS may elect to visually display a translation rather than play it through a speaker. As another example, if the user 13.102 is proximate to a first display that is capable of displaying only text and a second display capable of displaying graphics, the AEFS 13.100 may select the second display when the presented information includes graphics content (e.g., an image). In some embodiments, determining a destination display may include selecting from one of multiple possible destination displays based on the size of each display. For example, a small LCD display (such as may be found on a mobile phone or telephone 13.120*f*) may be suitable for displaying a message that is just a few characters (e.g., a name or greeting) but not be suitable for displaying longer message or large document. Note that the AEFS 13.100 may select among multiple potential target output devices even when the conferencing device itself includes its own display and/or speaker.

Determining a destination output device may be based on other or additional factors. In some embodiments, the AEFS 13.100 may use user preferences that have been inferred (e.g., based on current or prior interactions with the user 13.102) and/or explicitly provided by the user. For example, the AEFS 13.100 may determine to present a translation, an email, or other speaker-related information onto the display 13.121*a* of the smart phone 13.120*d* based on the fact that the user 13.102 is currently interacting with the smart phone 13.120*d*.

Note that although the AEFS 13.100 is shown as being separate from a conferencing device 13.120, some or all of the functions of the AEFS 13.100 may be performed within or by the conferencing device 13.120 itself. For example, the smart phone conferencing device 13.120*d* and/or the laptop computer conferencing device 13.120*e* may have sufficient processing power to perform all or some functions of the AEFS 13.100, including one or more of speaker identification, determining speaker-related information, speaker recognition, speech recognition, language translation, presenting information, or the like. In some embodiments, the conferencing device 13.120 includes logic to determine where to perform various processing tasks, so as to advantageously distribute processing between available resources, including that of the conferencing device 13.120, other nearby devices (e.g., a laptop or other computing device of the user 13.102), remote devices (e.g., "cloud-based" processing and/or storage), and the like.

Other types of conferencing devices and/or organizations are contemplated. In some embodiments, the conferencing device may be a "thin" device, in that it may serve primarily as an output device for the AEFS 13.100. For example, an analog telephone may still serve as a conferencing device, with the AEFS 13.100 presenting speaker-related information via the earpiece of the telephone. As another example, a conferencing device may be or be part of a desktop computer, PDA, tablet computer, or the like.

Figure 14:
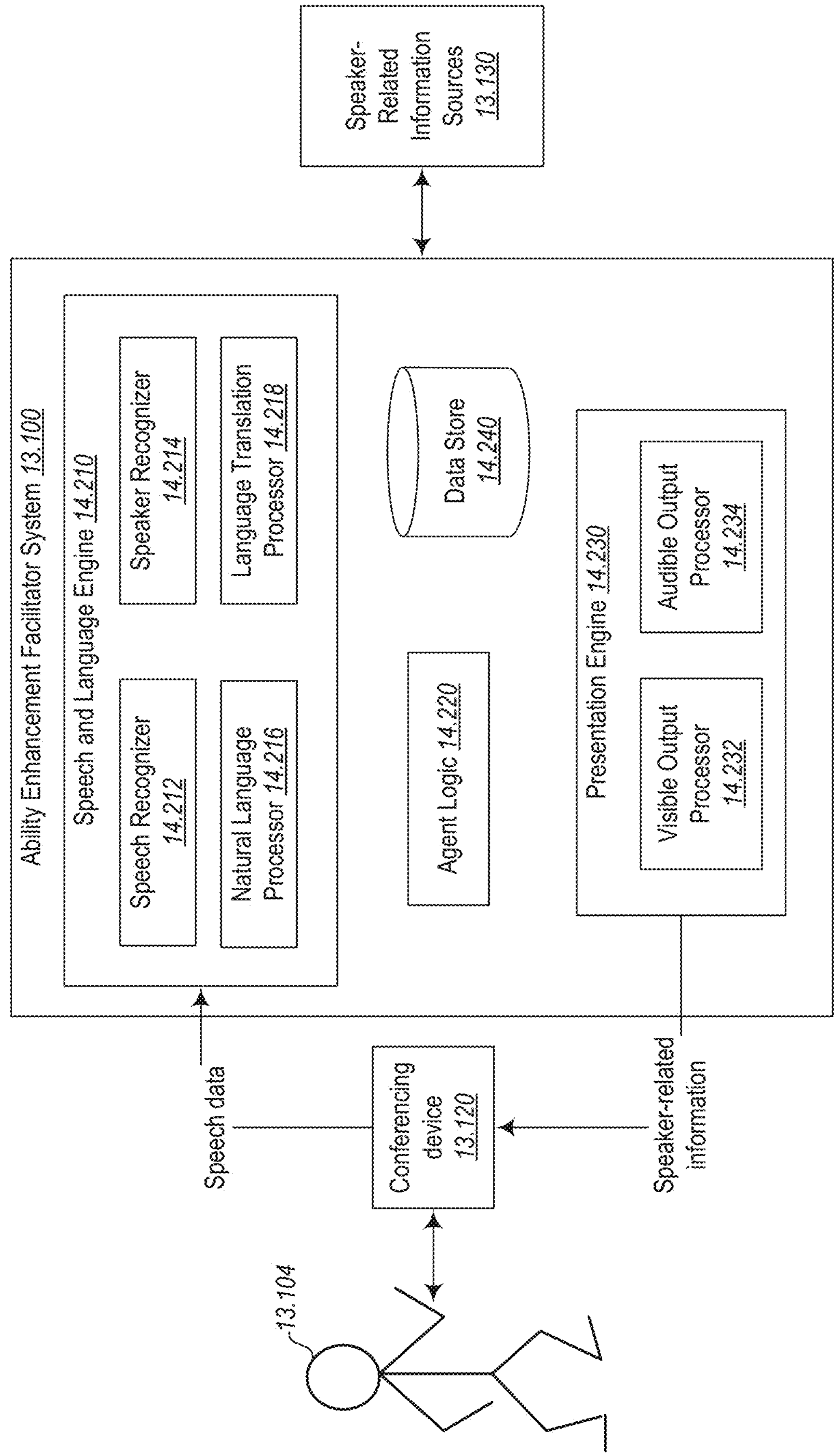
FIG. 14 is an example functional block diagram of an example ability enhancement facilitator system according to an example embodiment.

FIG. 14 is an example functional block diagram of an example ability enhancement facilitator system according to an example embodiment. In the illustrated embodiment of FIG. 14, the AEFS 13.100 includes a speech and language engine 14.210, agent logic 14.220, a presentation engine 14.230, and a data store 14.240.

The speech and language engine 14.210 includes a speech recognizer 14.212, a speaker recognizer 14.214, a natural language processor 14.216, and a language translation processor 14.218. The speech recognizer 14.212 transforms speech audio data received (e.g., from the conferencing device 13.120) into textual representation of an utterance represented by the speech audio data. In some embodiments, the performance of the speech recognizer 14.212 may be improved or augmented by use of a language model (e.g., representing likelihoods of transitions between words, such as based on n-grams) or speech model (e.g., representing acoustic properties of a speaker's voice) that is tailored to or based on an identified speaker. For example, once a speaker has been identified, the speech recognizer 14.212 may use a language model that was previously generated based on a corpus of communications and other information items authored by the identified speaker. A speaker-specific language model may be generated based on a corpus of documents and/or messages authored by a speaker. Speaker-specific speech models may be used to account for accents or channel properties (e.g., due to environmental factors or communication equipment) that are specific to a particular speaker, and may be generated based on a corpus of recorded speech from the speaker. In some embodiments, multiple speech recognizers are present, each one configured to recognize speech in a different language.

The speaker recognizer 14.214 identifies the speaker based on acoustic properties of the speaker's voice, as reflected by the speech data received from the conferencing device 13.120. The speaker recognizer 14.214 may compare a speaker voice print to previously generated and recorded voice prints stored in the data store 14.240 in order to find a best or likely match. Voice prints or other signal properties may be determined with reference to voice mail messages, voice chat data, or some other corpus of speech data.

The natural language processor 14.216 processes text generated by the speech recognizer 14.212 and/or located in information items obtained from the speaker-related information sources 13.130. In doing so, the natural language processor 14.216 may identify relationships, events, or entities (e.g., people, places, things) that may facilitate speaker identification, language translation, and/or other functions of the AEFS 13.100. For example, the natural language processor 14.216 may process status updates posted by the user 13.102*a* on a social networking service, to determine that the user 13.102*a* recently attended a conference in a particular city, and this fact may be used to identify a speaker and/or determine other speaker-related information, which may in turn be used for language translation or other functions.

The language translation processor 14.218 translates from one language to another, for example, by converting text in a first language to text in a second language. The text input to the language translation processor 14.218 may be obtained from, for example, the speech recognizer 14.212 and/or the natural language processor 14.216. The language translation processor 14.218 may use speaker-related information to improve or adapt its performance. For example, the language translation processor 14.218 may use a lexicon or vocabulary that is tailored to the speaker, such as may be based on the speaker's country/region of origin, the speaker's social class, the speaker's profession, or the like.

The agent logic 14.220 implements the core intelligence of the AEFS 13.100. The agent logic 14.220 may include a reasoning engine (e.g., a rules engine, decision trees, Bayesian inference engine) that combines information from multiple sources to identify speakers, determine speaker-related information, and the like. For example, the agent logic 14.220 may combine spoken text from the speech recognizer 14.212, a set of potentially matching (candidate) speakers from the speaker recognizer 14.214, and information items from the information sources 13.130, in order to determine a most likely identity of the current speaker. As another example, the agent logic 14.220 may identify the language spoken by the speaker by analyzing the output of multiple speech recognizers that are each configured to recognize speech in a different language, to identify the language of the speech recognizer that returns the highest confidence result as the spoken language.

The presentation engine 14.230 includes a visible output processor 14.232 and an audible output processor 14.234. The visible output processor 14.232 may prepare, format, and/or cause information to be displayed on a display device, such as a display of the conferencing device 13.120 or some other display (e.g., a desktop or laptop display in proximity to the user 13.102*a*). The agent logic 14.220 may use or invoke the visible output processor 14.232 to prepare and display information, such as by formatting or otherwise modifying a translation or some speaker-related information to fit on a particular type or size of display. The audible output processor 14.234 may include or use other components for generating audible output, such as tones, sounds, voices, or the like. In some embodiments, the agent logic 14.220 may use or invoke the audible output processor 14.234 in order to convert a textual message (e.g., including or referencing speaker-related information) into audio output suitable for presentation via the conferencing device 13.120, for example by employing a text-to-speech processor.

Note that although speaker identification and/or determining speaker-related information is herein sometimes described as including the positive identification of a single speaker, it may instead or also include determining likelihoods that each of one or more persons is the current speaker. For example, the speaker recognizer 14.214 may provide to the agent logic 14.220 indications of multiple candidate speakers, each having a corresponding likelihood or confidence level. The agent logic 14.220 may then select the most likely candidate based on the likelihoods alone or in combination with other information, such as that provided by the speech recognizer 14.212, natural language processor 14.216, speaker-related information sources 13.130, or the like. In some cases, such as when there are a small number of reasonably likely candidate speakers, the agent logic 14.220 may inform the user 13.102*a* of the identities all of the candidate speakers (as opposed to a single speaker) candidate speaker, as such information may be sufficient to trigger the user's recall and enable the user to make a selection that informs the agent logic 14.220 of the speaker's identity.

Note that in some embodiments, one or more of the illustrated components, or components of different types, may be included or excluded. For example, in one embodiment, the AEFS 13.100 does not include the language translation processor 14.218.

B. Example Processes

FIGS. 15.1-15.108 are example flow diagrams of ability enhancement processes performed by example embodiments.

FIG. 15.1 is an example flow diagram of example logic for ability enhancement. The illustrated logic in this and the following flow diagrams may be performed by, for example, a conferencing device 13.120 and/or one or more components of the AEFS 13.100 described with respect to FIG. 14, above. More particularly, FIG. 15.1 illustrates a process 15.100 that includes operations performed by or at the following block(s).

At block 15.101, the process performs receiving data representing speech signals from a voice conference amongst multiple speakers, wherein the multiple speakers include at least three speakers. The voice conference may be, for example, taking place between multiple speakers who are engaged in a conference call. The received data may be or represent one or more speech signals (e.g., audio samples) and/or higher-order information (e.g., frequency coefficients). The data may be received by or at the conferencing device 13.120 and/or the AEFS 13.100.

At block 15.102, the process performs determining speaker-related information associated with each of the multiple speakers, based on the data representing speech signals from the voice conference. The speaker-related information may include identifiers of a speaker (e.g., names, titles) and/or related information, such as documents, emails, calendar events, or the like. The speaker-related information may also or instead include demographic information about a speaker, including gender, language spoken, country of origin, region of origin, or the like. The speaker-related information may be determined based on signal properties of speech signals (e.g., a voice print) and/or on the semantic content of the speech signal, such as a name, event, entity, or information item that was mentioned by a speaker.

At block 15.103, the process performs presenting the speaker-related information via a conferencing device associated with a user. The speaker-related information may be presented on a display of the conferencing device (if it has one) or on some other display, such as a laptop or desktop display that is proximately located to the user. The speaker-related information may be presented in an audible and/or visible manner.

FIG. 15.2 is an example flow diagram of example logic illustrating an example embodiment of process 15.100 of FIG. 15.1. More particularly, FIG. 15.2 illustrates a process 15.200 that includes the process 15.100, wherein the receiving data representing speech signals from a voice conference amongst multiple speakers includes operations performed by or at one or more of the following block(s).

At block 15.201, the process performs receiving data representing speech signals from a voice conference amongst multiple speakers, wherein the multiple speakers are remotely located from one another. In some embodiments, the multiple speakers are remotely located from one another. Two speakers may be remotely located from one another even though they are in the same building or at the same site (e.g., campus, cluster of buildings), such as when the speakers are in different rooms, cubicles, or other locations within the site or building. In other cases, two speakers may be remotely located from one another by being in different cities, states, regions, or the like.

FIG. 15.3 is an example flow diagram of example logic illustrating an example embodiment of process 15.100 of FIG. 15.1. More particularly, FIG. 15.3 illustrates a process 15.300 that includes the process 15.100, wherein the presenting the speaker-related information includes operations performed by or at one or more of the following block(s).

At block 15.301, the process performs as each of the multiple speakers takes a turn speaking during the voice conference, presenting speaker-related information associated with the speaker. The process may, in substantially real time, provide the user speaker-related information associated a current speaker, such as a name of the speaker, a message sent by the speaker, or the like. The presented information may be updated throughout the voice conference based on the identity of the current speaker. For example, the process may present the three most recent emails sent by the current speaker.

FIG. 15.4 is an example flow diagram of example logic illustrating an example embodiment of process 15.300 of FIG. 15.3. More particularly, FIG. 15.4 illustrates a process 15.400 that includes the process 15.300, wherein the receiving data representing speech signals from a voice conference amongst multiple speakers includes operations performed by or at one or more of the following block(s).

At block 15.401, the process performs in response to one of the speakers beginning to speak during the voice conference, presenting the speaker-related information associated with the speaker. In some embodiments, the onset of speech may trigger the display or update of speaker-related information. The onset of speech may be detected in various ways, including via endpoint detection and/or frequency analysis.

FIG. 15.5 is an example flow diagram of example logic illustrating an example embodiment of process 15.100 of FIG. 15.1. More particularly, FIG. 15.5 illustrates a process 15.500 that includes the process 15.100, wherein the presenting the speaker-related information includes operations performed by or at one or more of the following block(s).

At block 15.501, the process performs presenting the speaker-related information during a telephone conference call amongst the multiple speakers. In some embodiments, the process operates to facilitate a telephone conference, even some or all of the speakers are using POTS (plain old telephone service) telephones.

FIG. 15.6 is an example flow diagram of example logic illustrating an example embodiment of process 15.100 of FIG. 15.1. More particularly, FIG. 15.6 illustrates a process 15.600 that includes the process 15.100, and which further includes operations performed by or at the following block(s).

At block 15.601, the process performs presenting, while a current speaker is speaking, speaker-related information on a display device of the user, the displayed speaker-related information identifying the current speaker. For example, as the user engages in a conference call from his office, the process may present the name or other information about the current speaker on a display of a desktop computer in the office of the user.

FIG. 15.7 is an example flow diagram of example logic illustrating an example embodiment of process 15.100 of FIG. 15.1. More particularly, FIG. 15.7 illustrates a process 15.700 that includes the process 15.100, wherein the receiving data representing speech signals from a voice conference amongst multiple speakers includes operations performed by or at one or more of the following block(s).

At block 15.701, the process performs receiving audio data from a telephone conference call that includes the multiple speakers, the received audio data representing utterances made by at least one of the multiple speakers. In some embodiments, the process may function in the context of a telephone conference, such as by receiving audio data from a system that facilitates the telephone conference, including a physical or virtual PBX (private branch exchange), a voice over IP conference system, or the like.

FIG. 15.8 is an example flow diagram of example logic illustrating an example embodiment of process 15.100 of FIG. 15.1. More particularly, FIG. 15.8 illustrates a process 15.800 that includes the process 15.100, wherein the receiving data representing speech signals from a voice conference amongst multiple speakers includes operations performed by or at one or more of the following block(s).

At block 15.801, the process performs receiving audio data from an online audio chat that includes the multiple speakers, the received audio data representing utterances made by at least one of the multiple speakers. In some embodiments, the process may function in the context of an online audio chat, such as may be supported by an online meeting system.

FIG. 15.9 is an example flow diagram of example logic illustrating an example embodiment of process 15.100 of FIG. 15.1. More particularly, FIG. 15.9 illustrates a process 15.900 that includes the process 15.100, wherein the receiving data representing speech signals from a voice conference amongst multiple speakers includes operations performed by or at one or more of the following block(s).

At block 15.901, the process performs receiving audio data from a video conference that includes the multiple speakers, the received audio data representing utterances made by at least one of the multiple speakers. In some embodiments, the process may function in the context of a video conference, such as may be facilitated by a dedicated system, a community of video enabled computing devices communicating via the Internet, or the like.

FIG. 15.10 is an example flow diagram of example logic illustrating an example embodiment of process 15.100 of FIG. 15.1. More particularly, FIG. 15.10 illustrates a process 15.1000 that includes the process 15.100, wherein the receiving data representing speech signals from a voice conference amongst multiple speakers includes operations performed by or at one or more of the following block(s).

At block 15.1001, the process performs receiving data representing speech signals from the at least three speakers, the data obtained at the conferencing device. In some embodiments, the process may obtain data from a conferencing device itself. In other cases, the process may obtain the data from an intermediary source or location.

FIG. 15.11 is an example flow diagram of example logic illustrating an example embodiment of process 15.100 of FIG. 15.1. More particularly, FIG. 15.11 illustrates a process 15.1100 that includes the process 15.100, and which further includes operations performed by or at the following block(s).

At block 15.1101, the process performs determining which one of the multiple speakers is speaking during a time interval. The process may determine which one of the speakers is currently speaking, even if the identity of the current speaker is not known. Various approaches may be employed, including detecting the source of a speech signal, performing voice identification, or the like.

FIG. 15.12 is an example flow diagram of example logic illustrating an example embodiment of process 15.1100 of FIG. 15.11. More particularly, FIG. 15.12 illustrates a process 15.1200 that includes the process 15.1100, wherein the determining which one of the multiple speakers is speaking during a time interval includes operations performed by or at one or more of the following block(s).

At block 15.1201, the process performs associating a first portion of the received data with a first one of the multiple speakers. The process may correspond, bind, link, or similarly associate a portion of the received data with a speaker. Such an association may then be used for further processing, such as voice identification, speech recognition, or the like.

FIG. 15.13 is an example flow diagram of example logic illustrating an example embodiment of process 15.1200 of FIG. 15.12. More particularly, FIG. 15.13 illustrates a process 15.1300 that includes the process 15.1200, wherein the associating a first portion of the received data with a first one of the multiple speakers includes operations performed by or at one or more of the following block(s).

At block 15.1301, the process performs receiving the first portion of the received data along with an identifier associated with the first speaker. In some embodiments, the process may receive data along with an identifier, such as an IP address (e.g., in a voice over IP conferencing system).

FIG. 15.14 is an example flow diagram of example logic illustrating an example embodiment of process 15.1300 of FIG. 15.13. More particularly, FIG. 15.14 illustrates a process 15.1400 that includes the process 15.1300, wherein the receiving the first portion of the received data along with an identifier associated with the first speaker includes operations performed by or at one or more of the following block(s).

At block 15.1401, the process performs receiving a network identifier associated with the first speaker.

FIG. 15.15 is an example flow diagram of example logic illustrating an example embodiment of process 15.1300 of FIG. 15.13. More particularly, FIG. 15.15 illustrates a process 15.1500 that includes the process 15.1300, wherein the receiving the first portion of the received data along with an identifier associated with the first speaker includes operations performed by or at one or more of the following block(s).

At block 15.1501, the process performs receiving from a conferencing system the identifier associated with the first speaker, the conferencing system configured to facilitate a conference call among the multiple speakers. Some conferencing systems may provide an identifier (e.g., telephone number) of a current speaker by detecting which telephone line or other circuit (virtual or physical) has an active signal.

FIG. 15.16 is an example flow diagram of example logic illustrating an example embodiment of process 15.1200 of FIG. 15.12. More particularly, FIG. 15.16 illustrates a process 15.1600 that includes the process 15.1200, wherein the associating a first portion of the received data with a first one of the multiple speakers includes operations performed by or at one or more of the following block(s).

At block 15.1601, the process performs selecting the first portion based on the first portion representing only speech from the one speaker and no other of the multiple speakers. The process may select a portion of the received data based on whether or not the received data includes speech from only one, or more than one speaker (e.g., when multiple speakers are talking over each other).

FIG. 15.17 is an example flow diagram of example logic illustrating an example embodiment of process 15.1100 of FIG. 15.11. More particularly, FIG. 15.17 illustrates a process 15.1700 that includes the process 15.1100, and which further includes operations performed by or at the following block(s).

At block 15.1701, the process performs determining that two or more of the multiple speakers are speaking concurrently. The process may determine the multiple speakers are talking at the same time, and take action accordingly. For example, the process may elect not to attempt to identify any speaker, or instead identify all of the speakers who are talking out of turn.

FIG. 15.18 is an example flow diagram of example logic illustrating an example embodiment of process 15.1100 of FIG. 15.11. More particularly, FIG. 15.18 illustrates a process 15.1800 that includes the process 15.1100, wherein the determining which one of the multiple speakers is speaking during a time interval includes operations performed by or at one or more of the following block(s).

At block 15.1801, the process performs performing voice identification to select which one of multiple previously analyzed voices is a best match for the one speaker who is speaking during the time interval. As noted, voice identification may be employed to determine the current speaker.

FIG. 15.19 is an example flow diagram of example logic illustrating an example embodiment of process 15.1100 of FIG. 15.11. More particularly, FIG. 15.19 illustrates a process 15.1900 that includes the process 15.1100, wherein the determining which one of the multiple speakers is speaking during a time interval includes operations performed by or at one or more of the following block(s).

At block 15.1901, the process performs performing voice identification based on the received data to identify one of the multiple speakers. In some embodiments, voice identification may include generating a voice print, voice model, or other biometric feature set that characterizes the voice of the speaker, and then comparing the generated voice print to previously generated voice prints.

FIG. 15.20 is an example flow diagram of example logic illustrating an example embodiment of process 15.1900 of FIG. 15.19. More particularly, FIG. 15.20 illustrates a process 15.2000 that includes the process 15.1900, wherein the performing voice identification includes operations performed by or at one or more of the following block(s).

At block 15.2001, the process performs comparing properties of the speech signal with properties of previously recorded speech signals from multiple persons. In some embodiments, the process accesses voice prints associated with multiple persons, and determines a best match against the speech signal.

FIG. 15.21 is an example flow diagram of example logic illustrating an example embodiment of process 15.2000 of FIG. 15.20. More particularly, FIG. 15.21 illustrates a process 15.2100 that includes the process 15.2000, and which further includes operations performed by or at the following block(s).

At block 15.2101, the process performs processing voice messages from the multiple persons to generate voice print data for each of the multiple persons. Given a telephone voice message, the process may associate generated voice print data for the voice message with one or more (direct or indirect) identifiers corresponding with the message. For example, the message may have a sender telephone number associated with it, and the process can use that sender telephone number to do a reverse directory lookup (e.g., in a public directory, in a personal contact list) to determine the name of the voice message speaker.

FIG. 15.22 is an example flow diagram of example logic illustrating an example embodiment of process 15.1900 of FIG. 15.19. More particularly, FIG. 15.22 illustrates a process 15.2200 that includes the process 15.1900, wherein the performing voice identification includes operations performed by or at one or more of the following block(s).

At block 15.2201, the process performs processing telephone voice messages stored by a voice mail service. In some embodiments, the process analyzes voice messages to generate voice prints/models for multiple persons.

FIG. 15.23 is an example flow diagram of example logic illustrating an example embodiment of process 15.1100 of FIG. 15.11. More particularly, FIG. 15.23 illustrates a process 15.2300 that includes the process 15.1100, wherein the determining which one of the multiple speakers is speaking during a time interval includes operations performed by or at one or more of the following block(s).

At block 15.2301, the process performs performing speech recognition to convert the received data into text data. For example, the process may convert the received data into a sequence of words that are (or are likely to be) the words uttered by a speaker.

At block 15.2302, the process performs identifying one of the multiple speakers based on the text data. Given text data (e.g., words spoken by a speaker), the process may search for information items that include the text data, and then identify the one speaker based on those information items, as discussed further below.

FIG. 15.24 is an example flow diagram of example logic illustrating an example embodiment of process 15.2300 of FIG. 15.23. More particularly, FIG. 15.24 illustrates a process 15.2400 that includes the process 15.2300, wherein the identifying one of the multiple speakers based on the text data includes operations performed by or at one or more of the following block(s).

At block 15.2401, the process performs finding an information item that references the one speaker and that includes one or more words in the text data. In some embodiments, the process may search for and find a document or other item (e.g., email, text message, status update) that includes words spoken by one speaker. Then, the process can infer that the one speaker is the author of the document, a recipient of the document, a person described in the document, or the like.

FIG. 15.25 is an example flow diagram of example logic illustrating an example embodiment of process 15.2300 of FIG. 15.23. More particularly, FIG. 15.25 illustrates a process 15.2500 that includes the process 15.2300, wherein the performing speech recognition includes operations performed by or at one or more of the following block(s).

At block 15.2501, the process performs performing speech recognition based on cepstral coefficients that represent the speech signal. In other embodiments, other types of features or information may be also or instead used to perform speech recognition, including language models, dialect models, or the like.

FIG. 15.26 is an example flow diagram of example logic illustrating an example embodiment of process 15.2300 of FIG. 15.23. More particularly, FIG. 15.26 illustrates a process 15.2600 that includes the process 15.2300, wherein the performing speech recognition includes operations performed by or at one or more of the following block(s).

At block 15.2601, the process performs performing hidden Markov model-based speech recognition. Other approaches or techniques for speech recognition may include neural networks, stochastic modeling, or the like.

FIG. 15.27 is an example flow diagram of example logic illustrating an example embodiment of process 15.2300 of FIG. 15.23. More particularly, FIG. 15.27 illustrates a process 15.2700 that includes the process 15.2300, and which further includes operations performed by or at the following block(s).

At block 15.2701, the process performs retrieving information items that reference the text data. The process may here retrieve or otherwise obtain documents, calendar events, messages, or the like, that include, contain, or otherwise reference some portion of the text data.

At block 15.2702, the process performs informing the user of the retrieved information items.

FIG. 15.28 is an example flow diagram of example logic illustrating an example embodiment of process 15.2300 of FIG. 15.23. More particularly, FIG. 15.28 illustrates a process 15.2800 that includes the process 15.2300, wherein the performing speech recognition includes operations performed by or at one or more of the following block(s).

At block 15.2801, the process performs performing speech recognition based at least in part on a language model associated with the one speaker. A language model may be used to improve or enhance speech recognition. For example, the language model may represent word transition likelihoods (e.g., by way of n-grams) that can be advantageously employed to enhance speech recognition. Furthermore, such a language model may be speaker specific, in that it may be based on communications or other information generated by the one speaker.

FIG. 15.29 is an example flow diagram of example logic illustrating an example embodiment of process 15.2800 of FIG. 15.28. More particularly, FIG. 15.29 illustrates a process 15.2900 that includes the process 15.2800, wherein the performing speech recognition based at least in part on a language model associated with the one speaker includes operations performed by or at one or more of the following block(s).

At block 15.2901, the process performs generating the language model based on information items generated by the one speaker, the information items including at least one of emails transmitted by the one speaker, documents authored by the one speaker, and/or social network messages transmitted by the one speaker. In some embodiments, the process mines or otherwise processes emails, text messages, voice messages, and the like to generate a language model that is specific or otherwise tailored to the one speaker.

FIG. 15.30 is an example flow diagram of example logic illustrating an example embodiment of process 15.2800 of FIG. 15.28. More particularly, FIG. 15.30 illustrates a process 15.3000 that includes the process 15.2800, wherein the performing speech recognition based at least in part on a language model associated with the one speaker includes operations performed by or at one or more of the following block(s).

At block 15.3001, the process performs generating the language model based on information items generated by or referencing any of the multiple speakers, the information items including emails, documents, and/or social network messages. In some embodiments, the process mines or otherwise processes emails, text messages, voice messages, and the like generated by or referencing any of the multiple speakers to generate a language model that is tailored to the current conversation.

FIG. 15.31 is an example flow diagram of example logic illustrating an example embodiment of process 15.1100 of FIG. 15.11. More particularly, FIG. 15.31 illustrates a process 15.3100 that includes the process 15.1100, and which further includes operations performed by or at the following block(s).

At block 15.3101, the process performs receiving data representing a speech signal that represents an utterance of the user. A microphone on or about the conferencing device may capture this data. The microphone may be the same or different from one used to capture speech data from the conversation.

At block 15.3102, the process performs identifying one of the multiple speakers based on the data representing a speech signal that represents an utterance of the user. Identifying the one speaker in this manner may include performing speech recognition on the user's utterance, and then processing the resulting text data to locate a name. This identification can then be utilized to retrieve information items or other speaker-related information that may be useful to present to the user.

FIG. 15.32 is an example flow diagram of example logic illustrating an example embodiment of process 15.3100 of FIG. 15.31. More particularly, FIG. 15.32 illustrates a process 15.3200 that includes the process 15.3100, wherein the identifying one of the multiple speakers based on the data representing a speech signal that represents an utterance of the user includes operations performed by or at one or more of the following block(s).

At block 15.3201, the process performs determining whether the utterance of the user includes a name of the one speaker.

FIG. 15.33 is an example flow diagram of example logic illustrating an example embodiment of process 15.100 of FIG. 15.1. More particularly, FIG. 15.33 illustrates a process 15.3300 that includes the process 15.100, wherein the determining speaker-related information includes operations performed by or at one or more of the following block(s).

At block 15.3301, the process performs receiving context information related to the user. Context information may generally include information about the setting, location, occupation, communication, workflow, or other event or factor that is present at, about, or with respect to the user.

At block 15.3302, the process performs determining speaker-related information, based on the context information. Context information may be used to determine speaker-related information, such as by determining or narrowing a set of potential speakers based on the current location of the user FIG. 15.34 is an example flow diagram of example logic illustrating an example embodiment of process 15.3300 of FIG. 15.33. More particularly, FIG. 15.34 illustrates a process 15.3400 that includes the process 15.3300, wherein the receiving context information related to the user includes operations performed by or at one or more of the following block(s).

At block 15.3401, the process performs receiving an indication of a location of the user.

At block 15.3402, the process performs determining a plurality of persons with whom the user commonly interacts at the location. For example, if the indicated location is a workplace, the process may generate a list of co-workers, thereby reducing or simplifying the problem of speaker identification.

FIG. 15.35 is an example flow diagram of example logic illustrating an example embodiment of process 15.3400 of FIG. 15.34. More particularly, FIG. 15.35 illustrates a process 15.3500 that includes the process 15.3400, wherein the receiving an indication of a location of the user includes operations performed by or at one or more of the following block(s).

At block 15.3501, the process performs receiving a GPS location from a mobile device of the user.

FIG. 15.36 is an example flow diagram of example logic illustrating an example embodiment of process 15.3400 of FIG. 15.34. More particularly, FIG. 15.36 illustrates a process 15.3600 that includes the process 15.3400, wherein the receiving an indication of a location of the user includes operations performed by or at one or more of the following block(s).

At block 15.3601, the process performs receiving a network identifier that is associated with the location. The network identifier may be, for example, a service set identifier ("SSID") of a wireless network with which the user is currently associated.

FIG. 15.37 is an example flow diagram of example logic illustrating an example embodiment of process 15.3400 of FIG. 15.34. More particularly, FIG. 15.37 illustrates a process 15.3700 that includes the process 15.3400, wherein the receiving an indication of a location of the user includes operations performed by or at one or more of the following block(s).

At block 15.3701, the process performs receiving an indication that the user is at a workplace or a residence. For example, the process may translate a coordinate-based location (e.g., GPS coordinates) to a particular workplace by performing a map lookup or other mechanism.

FIG. 15.38 is an example flow diagram of example logic illustrating an example embodiment of process 15.3300 of FIG. 15.33. More particularly, FIG. 15.38 illustrates a process 15.3800 that includes the process 15.3300, wherein the receiving context information related to the user includes operations performed by or at one or more of the following block(s).

At block 15.3801, the process performs receiving information about an information item that references one of the multiple speakers. As noted, context information may include information items, such as documents, messages, calendar events, or the like. In this case, the process may exploit such information items to improve speaker identification or other operations.

FIG. 15.39 is an example flow diagram of example logic illustrating an example embodiment of process 15.1100 of FIG. 15.11. More particularly, FIG. 15.39 illustrates a process 15.3900 that includes the process 15.1100, and which further includes operations performed by or at the following block(s).

At block 15.3901, the process performs developing a corpus of speaker data by recording speech from multiple persons.

At block 15.3902, the process performs identifying one of the multiple speakers based at least in part on the corpus of speaker data. Over time, the process may gather and record speech obtained during its operation, and then use that speech as part of a corpus that is used during future operation. In this manner, the process may improve its performance by utilizing actual, environmental speech data, possibly along with feedback received from the user, as discussed below.

FIG. 15.40 is an example flow diagram of example logic illustrating an example embodiment of process 15.3900 of FIG. 15.39. More particularly, FIG. 15.40 illustrates a process 15.4000 that includes the process 15.3900, and which further includes operations performed by or at the following block(s).

At block 15.4001, the process performs generating a speech model associated with each of the multiple persons, based on the recorded speech. The generated speech model may include voice print data that can be used for speaker identification, a language model that may be used for speech recognition purposes, a noise model that may be used to improve operation in speaker-specific noisy environments.

FIG. 15.41 is an example flow diagram of example logic illustrating an example embodiment of process 15.3900 of FIG. 15.39. More particularly, FIG. 15.41 illustrates a process 15.4100 that includes the process 15.3900, and which further includes operations performed by or at the following block(s).

At block 15.4101, the process performs receiving feedback regarding accuracy of the speaker-related information. During or after providing speaker-related information to the user, the user may provide feedback regarding its accuracy. This feedback may then be used to train a speech processor (e.g., a speaker identification module, a speech recognition module). Feedback may be provided in various ways, such as by processing positive/negative utterances from a speaker (e.g., "That is not my name"), receiving a positive/negative utterance from the user (e.g., "I am sorry."), receiving a keyboard/button event that indicates a correct or incorrect identification.

At block 15.4102, the process performs training a speech processor based at least in part on the received feedback.

FIG. 15.42 is an example flow diagram of example logic illustrating an example embodiment of process 15.100 of FIG. 15.1. More particularly, FIG. 15.42 illustrates a process 15.4200 that includes the process 15.100, wherein the presenting the speaker-related information includes operations performed by or at one or more of the following block(s).

At block 15.4201, the process performs presenting the speaker-related information on a display of the conferencing device. In some embodiments, the conferencing device may include a display. For example, where the conferencing device is a smart phone or laptop computer, the conferencing device may include a display that provides a suitable medium for presenting the name or other identifier of the speaker.

FIG. 15.43 is an example flow diagram of example logic illustrating an example embodiment of process 15.100 of FIG. 15.1. More particularly, FIG. 15.43 illustrates a process 15.4300 that includes the process 15.100, wherein the presenting the speaker-related information includes operations performed by or at one or more of the following block(s).

At block 15.4301, the process performs presenting the speaker-related information on a display of a computing device that is distinct from the conferencing device. In some embodiments, the conferencing device may not itself include a display. For example, where the conferencing device is an office phone, the process may elect to present the speaker-related information on a display of a nearby computing device, such as a desktop or laptop computer in the vicinity of the phone.

FIG. 15.44 is an example flow diagram of example logic illustrating an example embodiment of process 15.100 of FIG. 15.1. More particularly, FIG. 15.44 illustrates a process 15.4400 that includes the process 15.100, wherein the presenting the speaker-related information includes operations performed by or at one or more of the following block(s).

At block 15.4401, the process performs determining a display to serve as a presentation device for the speaker-related information. In some embodiments, there may be multiple displays available as possible destinations for the speaker-related information. For example, in an office setting, where the conferencing device is an office phone, the office phone may include a small LCD display suitable for displaying a few characters or at most a few lines of text. However, there will typically be additional devices in the vicinity of the conferencing device, such as a desktop/laptop computer, a smart phone, a PDA, or the like. The process may determine to use one or more of these other display devices, possibly based on the type of the speaker-related information being displayed.

FIG. 15.45 is an example flow diagram of example logic illustrating an example embodiment of process 15.4400 of FIG. 15.44. More particularly, FIG. 15.45 illustrates a process 15.4500 that includes the process 15.4400, wherein the determining a display includes operations performed by or at one or more of the following block(s).

At block 15.4501, the process performs selecting one display from multiple displays, based at least in part on whether each of the multiple displays is capable of displaying all of the speaker-related information. In some embodiments, the process determines whether all of the speaker-related information can be displayed on a given display. For example, where the display is a small alphanumeric display on an office phone, the process may determine that the display is not capable of displaying a large amount of speaker-related information.

FIG. 15.46 is an example flow diagram of example logic illustrating an example embodiment of process 15.4400 of FIG. 15.44. More particularly, FIG. 15.46 illustrates a process 15.4600 that includes the process 15.4400, wherein the determining a display includes operations performed by or at one or more of the following block(s).

At block 15.4601, the process performs selecting one display from multiple displays, based at least in part on a size of each of the multiple displays. In some embodiments, the process considers the size (e.g., the number of characters or pixels that can be displayed) of each display.

FIG. 15.47 is an example flow diagram of example logic illustrating an example embodiment of process 15.4400 of FIG. 15.44. More particularly, FIG. 15.47 illustrates a process 15.4700 that includes the process 15.4400, wherein the determining a display includes operations performed by or at one or more of the following block(s).

At block 15.4701, the process performs selecting one display from multiple displays, based at least in part on whether each of the multiple displays is suitable for displaying the speaker-related information, the speaker-related information being at least one of text information, a communication, a document, an image, and/or a calendar event. In some embodiments, the process considers the type of the speaker-related information. For example, whereas a small alphanumeric display on an office phone may be suitable for displaying the name of the speaker, it would not be suitable for displaying an email message sent by the speaker.

FIG. 15.48 is an example flow diagram of example logic illustrating an example embodiment of process 15.100 of FIG. 15.1. More particularly, FIG. 15.48 illustrates a process 15.4800 that includes the process 15.100, and which further includes operations performed by or at the following block(s).

At block 15.4801, the process performs audibly notifying the user to view the speaker-related information on a display device. In some embodiments, notifying the user may include playing a tone, such as a beep, chime, or other type of notification. In some embodiments, notifying the user may include playing synthesized speech telling the user to view the display device. For example, the process may perform text-to-speech processing to generate audio of a textual message or notification, and this audio may then be played or otherwise output to the user via the conferencing device. In some embodiments, notifying the user may telling the user that a document, calendar event, communication, or the like is available for viewing on the display device. Telling the user about a document or other speaker-related information may include playing synthesized speech that includes an utterance to that effect. In some embodiments, the process may notify the user in a manner that is not audible to at least some of the multiple speakers. For example, a tone or verbal message may be output via an earpiece speaker, such that other parties to the conversation do not hear the notification. As another example, a tone or other notification may be into the earpiece of a telephone, such as when the process is performing its functions within the context of a telephonic conference call.

FIG. 15.49 is an example flow diagram of example logic illustrating an example embodiment of process 15.100 of FIG. 15.1. More particularly, FIG. 15.49 illustrates a process 15.4900 that includes the process 15.100, wherein the presenting the speaker-related information includes operations performed by or at one or more of the following block(s).

At block 15.4901, the process performs informing the user of an identifier of each of the multiple speakers. In some embodiments, the identifier of each of the speakers may be or include a given name, surname (e.g., last name, family name), nickname, title, job description, or other type of identifier of or associated with the speaker.

FIG. 15.50 is an example flow diagram of example logic illustrating an example embodiment of process 15.100 of FIG. 15.1. More particularly, FIG. 15.50 illustrates a process 15.5000 that includes the process 15.100, wherein the presenting the speaker-related information includes operations performed by or at one or more of the following block(s).

At block 15.5001, the process performs informing the user of information aside from identifying information related to the multiple speakers. In some embodiments, information aside from identifying information may include information that is not a name or other identifier (e.g., job title) associated with the speaker. For example, the process may tell the user about an event or communication associated with or related to the speaker.

FIG. 15.51 is an example flow diagram of example logic illustrating an example embodiment of process 15.100 of FIG. 15.1. More particularly, FIG. 15.51 illustrates a process 15.5100 that includes the process 15.100, wherein the presenting the speaker-related information includes operations performed by or at one or more of the following block(s).

At block 15.5101, the process performs informing the user of an organization to which each of the multiple speakers belongs. In some embodiments, informing the user of an organization may include notifying the user of a business, group, school, club, team, company, or other formal or informal organization with which a speaker is affiliated. Companies may include profit or non-profit entities, regardless of organizational structure (e.g., corporation, partnerships, sole proprietorship).

FIG. 15.52 is an example flow diagram of example logic illustrating an example embodiment of process 15.100 of FIG. 15.1. More particularly, FIG. 15.52 illustrates a process 15.5200 that includes the process 15.100, wherein the presenting the speaker-related information includes operations performed by or at one or more of the following block(s).

At block 15.5201, the process performs informing the user of a previously transmitted communication referencing one of the multiple speakers. Various forms of communication are contemplated, including textual (e.g., emails, text messages, chats), audio (e.g., voice messages), video, or the like. In some embodiments, a communication can include content in multiple forms, such as text and audio, such as when an email includes a voice attachment.

FIG. 15.53 is an example flow diagram of example logic illustrating an example embodiment of process 15.5200 of FIG. 15.52. More particularly, FIG. 15.53 illustrates a process 15.5300 that includes the process 15.5200, wherein the informing the user of a previously transmitted communication includes operations performed by or at one or more of the following block(s).

At block 15.5301, the process performs informing the user of at least one of: an email transmitted between the one speaker and the user and/or a text message transmitted between the one speaker and the user. An email transmitted between the one speaker and the user may include an email sent from the one speaker to the user, or vice versa. Text messages may include short messages according to various protocols, including SMS, MMS, and the like.

FIG. 15.54 is an example flow diagram of example logic illustrating an example embodiment of process 15.100 of FIG. 15.1. More particularly, FIG. 15.54 illustrates a process 15.5400 that includes the process 15.100, wherein the presenting the speaker-related information includes operations performed by or at one or more of the following block(s).

At block 15.5401, the process performs informing the user of an event involving the user and one of the multiple speakers. An event may be any occurrence that involves or involved the user and a speaker, such as a meeting (e.g., social or professional meeting or gathering) attended by the user and the speaker, an upcoming deadline (e.g., for a project), or the like.

FIG. 15.55 is an example flow diagram of example logic illustrating an example embodiment of process 15.5400 of FIG. 15.54. More particularly, FIG. 15.55 illustrates a process 15.5500 that includes the process 15.5400, wherein the informing the user of an event includes operations performed by or at one or more of the following block(s).

At block 15.5501, the process performs informing the user of a previously occurring event and/or a future event that is at least one of a project, a meeting, and/or a deadline.

FIG. 15.56 is an example flow diagram of example logic illustrating an example embodiment of process 15.100 of FIG. 15.1. More particularly, FIG. 15.56 illustrates a process 15.5600 that includes the process 15.100, wherein the determining speaker-related information includes operations performed by or at one or more of the following block(s).

At block 15.5601, the process performs accessing information items associated with one of the multiple speakers. In some embodiments, accessing information items associated with one of the multiple speakers may include retrieving files, documents, data records, or the like from various sources, such as local or remote storage devices, cloud-based servers, and the like. In some embodiments, accessing information items may also or instead include scanning, searching, indexing, or otherwise processing information items to find ones that include, name, mention, or otherwise reference a speaker.

FIG. 15.57 is an example flow diagram of example logic illustrating an example embodiment of process 15.5600 of FIG. 15.56. More particularly, FIG. 15.57 illustrates a process 15.5700 that includes the process 15.5600, wherein the accessing information items associated with one of the multiple speakers includes operations performed by or at one or more of the following block(s).

At block 15.5701, the process performs searching for information items that reference the one speaker, the information items including at least one of a document, an email, and/or a text message. In some embodiments, searching may include formulating a search query to provide to a document management system or any other data/document store that provides a search interface. In some embodiments, emails or text messages that reference the one speaker may include messages sent from the one speaker, messages sent to the one speaker, messages that name or otherwise identify the one speaker in the body of the message, or the like.

FIG. 15.58 is an example flow diagram of example logic illustrating an example embodiment of process 15.5600 of FIG. 15.56. More particularly, FIG. 15.58 illustrates a process 15.5800 that includes the process 15.5600, wherein the accessing information items associated with one of the multiple speakers includes operations performed by or at one or more of the following block(s).

At block 15.5801, the process performs accessing a social networking service to find messages or status updates that reference the one speaker. In some embodiments, accessing a social networking service may include searching for postings, status updates, personal messages, or the like that have been posted by, posted to, or otherwise reference the one speaker. Example social networking services include Facebook, Twitter, Google Plus, and the like. Access to a social networking service may be obtained via an API or similar interface that provides access to social networking data related to the user and/or the one speaker.

FIG. 15.59 is an example flow diagram of example logic illustrating an example embodiment of process 15.5600 of FIG. 15.56. More particularly, FIG. 15.59 illustrates a process 15.5900 that includes the process 15.5600, wherein the accessing information items associated with one of the multiple speakers includes operations performed by or at one or more of the following block(s).

At block 15.5901, the process performs accessing a calendar to find information about appointments with the one speaker. In some embodiments, accessing a calendar may include searching a private or shared calendar to locate a meeting or other appointment with the one speaker, and providing such information to the user via the conferencing device.

FIG. 15.60 is an example flow diagram of example logic illustrating an example embodiment of process 15.5600 of FIG. 15.56. More particularly, FIG. 15.60 illustrates a process 15.6000 that includes the process 15.5600, wherein the accessing information items associated with one of the multiple speakers includes operations performed by or at one or more of the following block(s).

At block 15.6001, the process performs accessing a document store to find documents that reference the one speaker. In some embodiments, documents that reference the one speaker include those that are authored at least in part by the one speaker, those that name or otherwise identify the speaker in a document body, or the like. Accessing the document store may include accessing a local or remote storage device/system, accessing a document management system, accessing a source control system, or the like.

FIG. 15.61 is an example flow diagram of example logic illustrating an example embodiment of process 15.100 of FIG. 15.1. More particularly, FIG. 15.61 illustrates a process 15.6100 that includes the process 15.100, wherein the presenting the speaker-related information includes operations performed by or at one or more of the following block(s).

At block 15.6101, the process performs transmitting the speaker-related information from a first device to a second device having a display. In some embodiments, at least some of the processing may be performed on distinct devices, resulting in a transmission of speaker-related information from one device to another device, for example from a desktop computer to the conferencing device.

FIG. 15.62 is an example flow diagram of example logic illustrating an example embodiment of process 15.6100 of FIG. 15.61. More particularly, FIG. 15.62 illustrates a process 15.6200 that includes the process 15.6100, wherein the transmitting the speaker-related information from a first device to a second device includes operations performed by or at one or more of the following block(s).

At block 15.6201, the process performs wirelessly transmitting the speaker-related information. Various protocols may be used, including Bluetooth, infrared, WiFi, or the like.

FIG. 15.63 is an example flow diagram of example logic illustrating an example embodiment of process 15.6100 of FIG. 15.61. More particularly, FIG. 15.63 illustrates a process 15.6300 that includes the process 15.6100, wherein the transmitting the speaker-related information from a first device to a second device includes operations performed by or at one or more of the following block(s).

At block 15.6301, the process performs transmitting the speaker-related information from a smart phone to the second device. For example a smart phone may forward the speaker-related information to a desktop computing system for display on an associated monitor.

FIG. 15.64 is an example flow diagram of example logic illustrating an example embodiment of process 15.6100 of FIG. 15.61. More particularly, FIG. 15.64 illustrates a process 15.6400 that includes the process 15.6100, wherein the transmitting the speaker-related information from a first device to a second device includes operations performed by or at one or more of the following block(s).

At block 15.6401, the process performs transmitting the speaker-related information from a server system to the second device. In some embodiments, some portion of the processing is performed on a server system that may be remote from the conferencing device.

FIG. 15.65 is an example flow diagram of example logic illustrating an example embodiment of process 15.6400 of FIG. 15.64. More particularly, FIG. 15.65 illustrates a process 15.6500 that includes the process 15.6400, wherein the transmitting the speaker-related information from a server system includes operations performed by or at one or more of the following block(s).

At block 15.6501, the process performs transmitting the speaker-related information from a server system that resides in a data center.

FIG. 15.66 is an example flow diagram of example logic illustrating an example embodiment of process 15.6400 of FIG. 15.64. More particularly, FIG. 15.66 illustrates a process 15.6600 that includes the process 15.6400, wherein the transmitting the speaker-related information from a server system includes operations performed by or at one or more of the following block(s).

At block 15.6601, the process performs transmitting the speaker-related information from a server system to a desktop computer, a laptop computer, a mobile device, or a desktop telephone of the user.

FIG. 15.67 is an example flow diagram of example logic illustrating an example embodiment of process 15.100 of FIG. 15.1. More particularly, FIG. 15.67 illustrates a process 15.6700 that includes the process 15.100, and which further includes operations performed by or at the following block(s).

At block 15.6701, the process performs performing the receiving data representing speech signals from a voice conference amongst multiple speakers, the determining speaker-related information, and/or the presenting the speaker-related information on a mobile device that is operated by the user. As noted, In some embodiments a computer or mobile device such as a smart phone may have sufficient processing power to perform a portion of the process, such as identifying a speaker, determining the speaker-related information, or the like.

FIG. 15.68 is an example flow diagram of example logic illustrating an example embodiment of process 15.6700 of FIG. 15.67. More particularly, FIG. 15.68 illustrates a process 15.6800 that includes the process 15.6700, wherein the determining speaker-related information includes operations performed by or at one or more of the following block(s).

At block 15.6801, the process performs determining speaker-related information, performed on a smart phone or a media player that is operated by the user.

FIG. 15.69 is an example flow diagram of example logic illustrating an example embodiment of process 15.100 of FIG. 15.1. More particularly, FIG. 15.69 illustrates a process 15.6900 that includes the process 15.100, and which further includes operations performed by or at the following block(s).

At block 15.6901, the process performs performing the receiving data representing speech signals from a voice conference amongst multiple speakers, the determining speaker-related information, and/or the presenting the speaker-related information on a desktop computer that is operated by the user. For example, in an office setting, the user's desktop computer may be configured to perform some or all of the process.

FIG. 15.70 is an example flow diagram of example logic illustrating an example embodiment of process 15.100 of FIG. 15.1. More particularly, FIG. 15.70 illustrates a process 15.7000 that includes the process 15.100, and which further includes operations performed by or at the following block(s).

At block 15.7001, the process performs determining to perform at least some of determining speaker-related information or presenting the speaker-related information on another computing device that has available processing capacity. In some embodiments, the process may determine to offload some of its processing to another computing device or system.

FIG. 15.71 is an example flow diagram of example logic illustrating an example embodiment of process 15.7000 of FIG. 15.70. More particularly, FIG. 15.71 illustrates a process 15.7100 that includes the process 15.7000, and which further includes operations performed by or at the following block(s).

At block 15.7101, the process performs receiving at least some of speaker-related information from the another computing device. The process may receive the speaker-related information or a portion thereof from the other computing device.

FIG. 15.72 is an example flow diagram of example logic illustrating an example embodiment of process 15.100 of FIG. 15.1. More particularly, FIG. 15.72 illustrates a process 15.7200 that includes the process 15.100, and which further includes operations performed by or at the following block(s).

At block 15.7201, the process performs determining whether or not the user can name one of the multiple speakers.

At block 15.7202, the process performs when it is determined that the user cannot name the one speaker, presenting the speaker-related information. In some embodiments, the process only informs the user of the speaker-related information upon determining that the user does not appear to be able to name a particular speaker.

FIG. 15.73 is an example flow diagram of example logic illustrating an example embodiment of process 15.7200 of FIG. 15.72. More particularly, FIG. 15.73 illustrates a process 15.7300 that includes the process 15.7200, wherein the determining whether or not the user can name one of the multiple speakers includes operations performed by or at one or more of the following block(s).

At block 15.7301, the process performs determining whether the user has named the one speaker. In some embodiments, the process listens to the user to determine whether the user has named the speaker.

FIG. 15.74 is an example flow diagram of example logic illustrating an example embodiment of process 15.7300 of FIG. 15.73. More particularly, FIG. 15.74 illustrates a process 15.7400 that includes the process 15.7300, wherein the determining whether the user has named the one speaker includes operations performed by or at one or more of the following block(s).

At block 15.7401, the process performs determining whether the user has uttered a given name, surname, or nickname of the one speaker.

FIG. 15.75 is an example flow diagram of example logic illustrating an example embodiment of process 15.7300 of FIG. 15.73. More particularly, FIG. 15.75 illustrates a process 15.7500 that includes the process 15.7300, wherein the determining whether the user has named the one speaker includes operations performed by or at one or more of the following block(s).

At block 15.7501, the process performs determining whether the user has uttered a name of a relationship between the user and the one speaker. In some embodiments, the user need not utter the name of the speaker, but instead may utter other information (e.g., a relationship) that may be used by the process to determine that user knows or can name the speaker.

FIG. 15.76 is an example flow diagram of example logic illustrating an example embodiment of process 15.7200 of FIG. 15.72. More particularly, FIG. 15.76 illustrates a process 15.7600 that includes the process 15.7200, wherein the determining whether or not the user can name one of the multiple speakers includes operations performed by or at one or more of the following block(s).

At block 15.7601, the process performs determining whether the user has uttered information that is related to both the one speaker and the user.

FIG. 15.77 is an example flow diagram of example logic illustrating an example embodiment of process 15.7300 of FIG. 15.73. More particularly, FIG. 15.77 illustrates a process 15.7700 that includes the process 15.7300, wherein the determining whether the user has named the one speaker includes operations performed by or at one or more of the following block(s).

At block 15.7701, the process performs determining whether the user has named a person, place, thing, or event that the one speaker and the user have in common. For example, the user may mention a visit to the home town of the speaker, a vacation to a place familiar to the speaker, or the like FIG. 15.78 is an example flow diagram of example logic illustrating an example embodiment of process 15.7200 of FIG. 15.72. More particularly, FIG. 15.78 illustrates a process 15.7800 that includes the process 15.7200, wherein the determining whether or not the user can name one of the multiple speakers includes operations performed by or at one or more of the following block(s).

At block 15.7801, the process performs performing speech recognition to convert an utterance of the user into text data. The process may perform speech recognition on utterances of the user, and then examine the resulting text to determine whether the user has uttered a name or other information about the speaker.

At block 15.7802, the process performs determining whether or not the user can name one of the multiple speakers based at least in part on the text data.

FIG. 15.79 is an example flow diagram of example logic illustrating an example embodiment of process 15.7200 of FIG. 15.72. More particularly, FIG. 15.79 illustrates a process 15.7900 that includes the process 15.7200, wherein the determining whether or not the user can name one of the multiple speakers includes operations performed by or at one or more of the following block(s).

At block 15.7901, the process performs when the user does not name the one speaker within a predetermined time interval, determining that the user cannot name the one speaker. In some embodiments, the process waits for a time period before jumping in to provide the speaker-related information.

FIG. 15.80 is an example flow diagram of example logic illustrating an example embodiment of process 15.100 of FIG. 15.1. More particularly, FIG. 15.80 illustrates a process 15.8000 that includes the process 15.100, and which further includes operations performed by or at the following block(s).

At block 15.8001, the process performs translating an utterance of one of the multiple speakers in a first language into a message in a second language, based on the speaker-related information. In some embodiments, the process may also perform language translation, such that a voice conference may be held between speakers of different languages. In some embodiments, the utterance may be translated by first performing speech recognition on the data representing the speech signal to convert the utterance into textual form. Then, the text of the utterance may be translated into the second language using a natural language processing and/or machine translation techniques. The speaker-related information may be used to improve, enhance, or otherwise modify the process of machine translation. For example, based on the identity of the one speaker, the process may use a language or speech model that is tailored to the one speaker in order to improve a machine translation process. As another example, the process may use one or more information items that reference the one speaker to improve machine translation, such as by disambiguating references in the utterance of the one speaker.

At block 15.8002, the process performs presenting the message in the second language. The message may be presented in various ways including using audible output (e.g., via text-to-speech processing of the message) and/or using visible output of the message (e.g., via a display screen of the conferencing device or some other device that is accessible to the user).

FIG. 15.81 is an example flow diagram of example logic illustrating an example embodiment of process 15.8000 of FIG. 15.80. More particularly, FIG. 15.81 illustrates a process 15.8100 that includes the process 15.8000, wherein the determining speaker-related information includes operations performed by or at one or more of the following block(s).

At block 15.8101, the process performs determining the first language. In some embodiments, the process may determine or identify the first language, possibly prior to performing language translation. For example, the process may determine that the one speaker is speaking in German, so that it can configure a speech recognizer to recognize German language utterances.

FIG. 15.82 is an example flow diagram of example logic illustrating an example embodiment of process 15.8100 of FIG. 15.81. More particularly, FIG. 15.82 illustrates a process 15.8200 that includes the process 15.8100, wherein the determining the first language includes operations performed by or at one or more of the following block(s).

At block 15.8201, the process performs concurrently processing the received data with multiple speech recognizers that are each configured to recognize speech in a different corresponding language. For example, the process may utilize speech recognizers for German, French, English, Chinese, Spanish, and the like, to attempt to recognize the speaker's utterance.

At block 15.8202, the process performs selecting as the first language the language corresponding to a speech recognizer of the multiple speech recognizers that produces a result that has a higher confidence level than other of the multiple speech recognizers. Typically, a speech recognizer may provide a confidence level corresponding with each recognition result. The process can exploit this confidence level to determine the most likely language being spoken by the one speaker, such as by taking the result with the highest confidence level, if one exists.

FIG. 15.83 is an example flow diagram of example logic illustrating an example embodiment of process 15.8100 of FIG. 15.81. More particularly, FIG. 15.83 illustrates a process 15.8300 that includes the process 15.8100, wherein the determining the first language includes operations performed by or at one or more of the following block(s).

At block 15.8301, the process performs identifying signal characteristics in the received data that are correlated with the first language. In some embodiments, the process may exploit signal properties or characteristics that are highly correlated with particular languages. For example, spoken German may include phonemes that are unique to or at least more common in German than in other languages.

FIG. 15.84 is an example flow diagram of example logic illustrating an example embodiment of process 15.8100 of FIG. 15.81. More particularly, FIG. 15.84 illustrates a process 15.8400 that includes the process 15.8100, wherein the determining the first language includes operations performed by or at one or more of the following block(s).

At block 15.8401, the process performs receiving an indication of a current location of the user. The current location may be based on a GPS coordinate provided by the conferencing device or some other device. The current location may be determined based on other context information, such as a network identifier, travel documents, or the like.

At block 15.8402, the process performs determining one or more languages that are commonly spoken at the current location. The process may reference a knowledge base or other information that associates locations with common languages.

At block 15.8403, the process performs selecting one of the one or more languages as the first language.

FIG. 15.85 is an example flow diagram of example logic illustrating an example embodiment of process 15.8100 of FIG. 15.81. More particularly, FIG. 15.85 illustrates a process 15.8500 that includes the process 15.8100, wherein the determining the first language includes operations performed by or at one or more of the following block(s).

At block 15.8501, the process performs presenting indications of multiple languages to the user. In some embodiments, the process may ask the user to choose the language of the one speaker. For example, the process may not be able to determine the language itself, or the process may have determined multiple equally likely candidate languages. In such circumstances, the process may prompt or otherwise request that the user indicate the language of the one speaker.

At block 15.8502, the process performs receiving from the user an indication of one of the multiple languages. The user may identify the language in various ways, such as via a spoken command, a gesture, a user interface input, or the like.

FIG. 15.86 is an example flow diagram of example logic illustrating an example embodiment of process 15.8100 of FIG. 15.81. More particularly, FIG. 15.86 illustrates a process 15.8600 that includes the process 15.8100, and which further includes operations performed by or at the following block(s).

At block 15.8601, the process performs selecting a speech recognizer configured to recognize speech in the first language. Once the process has determined the language of the one speaker, it may select or configure a speech recognizer or other component (e.g., machine translation engine) to process the first language.

FIG. 15.87 is an example flow diagram of example logic illustrating an example embodiment of process 15.8000 of FIG. 15.80. More particularly, FIG. 15.87 illustrates a process 15.8700 that includes the process 15.8000, wherein the translating an utterance of one of the multiple speakers in a first language into a message in a second language includes operations performed by or at one or more of the following block(s).

At block 15.8701, the process performs performing speech recognition, based on the speaker-related information, on the data representing the speech signal to convert the utterance in the first language into text representing the utterance in the first language. The speech recognition process may be improved, augmented, or otherwise adapted based on the speaker-related information. In one example, information about vocabulary frequently used by the one speaker may be used to improve the performance of a speech recognizer.

At block 15.8702, the process performs translating, based on the speaker-related information, the text representing the utterance in the first language into text representing the message in the second language. Translating from a first to a second language may also be improved, augmented, or otherwise adapted based on the speaker-related information. For example, when such a translation includes natural language processing to determine syntactic or semantic information about an utterance, such natural language processing may be improved with information about the one speaker, such as idioms, expressions, or other language constructs frequently employed or otherwise correlated with the one speaker.

FIG. 15.88 is an example flow diagram of example logic illustrating an example embodiment of process 15.8700 of FIG. 15.87. More particularly, FIG. 15.88 illustrates a process 15.8800 that includes the process 15.8700, and which further includes operations performed by or at the following block(s).

At block 15.8801, the process performs performing speech synthesis to convert the text representing the utterance in the second language into audio data representing the message in the second language.

At block 15.8802, the process performs causing the audio data representing the message in the second language to be played to the user. The message may be played, for example, via an audio speaker of the conferencing device.

FIG. 15.89 is an example flow diagram of example logic illustrating an example embodiment of process 15.8700 of FIG. 15.87. More particularly, FIG. 15.89 illustrates a process 15.8900 that includes the process 15.8700, wherein the performing speech recognition includes operations performed by or at one or more of the following block(s).

At block 15.8901, the process performs performing speech recognition based on cepstral coefficients that represent the speech signal. In other embodiments, other types of features or information may be also or instead used to perform speech recognition, including language models, dialect models, or the like.

FIG. 15.90 is an example flow diagram of example logic illustrating an example embodiment of process 15.8700 of FIG. 15.87. More particularly, FIG. 15.90 illustrates a process 15.9000 that includes the process 15.8700, wherein the performing speech recognition includes operations performed by or at one or more of the following block(s).

At block 15.9001, the process performs performing hidden Markov model-based speech recognition. Other approaches or techniques for speech recognition may include neural networks, stochastic modeling, or the like.

FIG. 15.91 is an example flow diagram of example logic illustrating an example embodiment of process 15.8000 of FIG. 15.80. More particularly, FIG. 15.91 illustrates a process 15.9100 that includes the process 15.8000, wherein the translating an utterance of one of the multiple speakers in a first language into a message in a second language includes operations performed by or at one or more of the following block(s).

At block 15.9101, the process performs translating the utterance based on speaker-related information including an identity of the one speaker. The identity of the one speaker may be used in various ways, such as to determine a speaker-specific vocabulary to use during speech recognition, natural language processing, machine translation, or the like.

FIG. 15.92 is an example flow diagram of example logic illustrating an example embodiment of process 15.8000 of FIG. 15.80. More particularly, FIG. 15.92 illustrates a process 15.9200 that includes the process 15.8000, wherein the translating an utterance of one of the multiple speakers in a first language into a message in a second language includes operations performed by or at one or more of the following block(s).

At block 15.9201, the process performs translating the utterance based on speaker-related information including a language model that is specific to the one speaker. A speaker-specific language model may include or otherwise identify frequent words or patterns of words (e.g., n-grams) based on prior communications or other information about the one speaker. Such a language model may be based on communications or other information generated by or about the one speaker. Such a language model may be employed in the course of speech recognition, natural language processing, machine translation, or the like. Note that the language model need not be unique to the one speaker, but may instead be specific to a class, type, or group of speakers that includes the one speaker. For example, the language model may be tailored for speakers in a particular industry, from a particular region, or the like.

FIG. 15.93 is an example flow diagram of example logic illustrating an example embodiment of process 15.9200 of FIG. 15.92. More particularly, FIG. 15.93 illustrates a process 15.9300 that includes the process 15.9200, wherein the translating the utterance based on speaker-related information including a language model that is specific to the one speaker includes operations performed by or at one or more of the following block(s).

At block 15.9301, the process performs translating the utterance based on a language model that is tailored to a group of people of which the one speaker is a member. As noted, the language model need not be unique to the one speaker. In some embodiments, the language model may be tuned to particular social classes, ethnic groups, countries, languages, or the like with which the one speaker may be associated.

FIG. 15.94 is an example flow diagram of example logic illustrating an example embodiment of process 15.9200 of FIG. 15.92. More particularly, FIG. 15.94 illustrates a process 15.9400 that includes the process 15.9200, wherein the translating the utterance based on speaker-related information including a language model that is specific to the one speaker includes operations performed by or at one or more of the following block(s).

At block 15.9401, the process performs generating the language model based on information items generated by the one speaker, the information items including at least one of emails transmitted by the one speaker, documents authored by the one speaker, and/or social network messages transmitted by the one speaker. In some embodiments, the process mines or otherwise processes emails, text messages, voice messages, social network messages, and the like to generate a language model that is specific or otherwise tailored to the one speaker.

FIG. 15.95 is an example flow diagram of example logic illustrating an example embodiment of process 15.8000 of FIG. 15.80. More particularly, FIG. 15.95 illustrates a process 15.9500 that includes the process 15.8000, wherein the translating an utterance of one of the multiple speakers in a first language into a message in a second language includes operations performed by or at one or more of the following block(s).

At block 15.9501, the process performs translating the utterance based on speaker-related information including a language model tailored to the voice conference. A language model tailored to the voice conference may include or otherwise identify frequent words or patterns of words (e.g., n-grams) based on prior communications or other information about any one or more of the speakers in the voice conference. Such a language model may be based on communications or other information generated by or about the speakers in the voice conference. Such a language model may be employed in the course of speech recognition, natural language processing, machine translation, or the like.

FIG. 15.96 is an example flow diagram of example logic illustrating an example embodiment of process 15.9500 of FIG. 15.95. More particularly, FIG. 15.96 illustrates a process 15.9600 that includes the process 15.9500, wherein the translating the utterance based on speaker-related information including a language model tailored to the voice conference includes operations performed by or at one or more of the following block(s).

At block 15.9601, the process performs generating the language model based on information items by or about any of the multiple speakers, the information items including at least one of emails, documents, and/or social network messages. In some embodiments, the process mines or otherwise processes emails, text messages, voice messages, social network messages, and the like to generate a language model that is tailored to the voice conference.

FIG. 15.97 is an example flow diagram of example logic illustrating an example embodiment of process 15.8000 of FIG. 15.80. More particularly, FIG. 15.97 illustrates a process 15.9700 that includes the process 15.8000, wherein the translating an utterance of one of the multiple speakers in a first language into a message in a second language includes operations performed by or at one or more of the following block(s).

At block 15.9701, the process performs translating the utterance based on speaker-related information including a speech model that is tailored to the one speaker. A speech model tailored to the one speaker (e.g., representing properties of the speech signal of the user) may be used to adapt or improve the performance of a speech recognizer. Note that the speech model need not be unique to the one speaker, but may instead be specific to a class, type, or group of speakers that includes the one speaker. For example, the speech model may be tailored for male speakers, female speakers, speakers from a particular country or region (e.g., to account for accents), or the like.

FIG. 15.98 is an example flow diagram of example logic illustrating an example embodiment of process 15.9700 of FIG. 15.97. More particularly, FIG. 15.98 illustrates a process 15.9800 that includes the process 15.9700, wherein the translating the utterance based on speaker-related information including a speech model that is tailored to the one speaker includes operations performed by or at one or more of the following block(s).

At block 15.9801, the process performs translating the utterance based on a speech model that is tailored to a group of people of which the one speaker is a member. As noted, the speech model need not be unique to the one speaker. In some embodiments, the speech model may be tuned to particular genders, social classes, ethnic groups, countries, languages, or the like with which the one speaker may be associated.

FIG. 15.99 is an example flow diagram of example logic illustrating an example embodiment of process 15.8000 of FIG. 15.80. More particularly, FIG. 15.99 illustrates a process 15.9900 that includes the process 15.8000, wherein the translating an utterance of one of the multiple speakers in a first language into a message in a second language includes operations performed by or at one or more of the following block(s).

At block 15.9901, the process performs translating the utterance based on speaker-related information including an information item that references the one speaker. The information item may include a document, a message, a calendar event, a social networking relation, or the like. Various forms of information items are contemplated, including textual (e.g., emails, text messages, chats), audio (e.g., voice messages), video, or the like. In some embodiments, an information item may include content in multiple forms, such as text and audio, such as when an email includes a voice attachment.

FIG. 15.100 is an example flow diagram of example logic illustrating an example embodiment of process 15.8000 of FIG. 15.80. More particularly, FIG. 15.100 illustrates a process 15.10000 that includes the process 15.8000, wherein the translating an utterance of one of the multiple speakers in a first language into a message in a second language includes operations performed by or at one or more of the following block(s).

At block 15.10001, the process performs translating the utterance based on speaker-related information including at least one of a document that references the one speaker, a message that references the one speaker, a calendar event that references the one speaker, an indication of gender of the one speaker, and/or an organization to which the one speaker belongs. A document may be, for example, a report authored by the one speaker. A message may be an email, text message, social network status update or other communication that is sent by the one speaker, sent to the one speaker, or references the one speaker in some other way. A calendar event may represent a past or future event to which the one speaker was invited. An event may be any occurrence that involves or involved the user and/or the one speaker, such as a meeting (e.g., social or professional meeting or gathering) attended by the user and the one speaker, an upcoming deadline (e.g., for a project), or the like. Information about the gender of the one speaker may be used to customize or otherwise adapt a speech or language model that may be used during machine translation. The process may exploit an understanding of an organization to which the one speaker belongs when performing natural language processing on the utterance. For example, the identity of a company that employs the one speaker can be used to determine the meaning of industry-specific vocabulary in the utterance of the one speaker. The organization may include a business, company (e.g., profit or non-profit), group, school, club, team, company, or other formal or informal organization with which the one speaker is affiliated.

FIG. 15.101 is an example flow diagram of example logic illustrating an example embodiment of process 15.100 of FIG. 15.1. More particularly, FIG. 15.101 illustrates a process 15.10100 that includes the process 15.100, and which further includes operations performed by or at the following block(s).

At block 15.10101, the process performs recording history information about the voice conference. In some embodiments, the process may record the voice conference and related information, so that such information can be played back at a later time, such as for reference purposes, for a participant who joins the conference late, or the like.

At block 15.10102, the process performs presenting the history information about the voice conference. Presenting the history information may include playing back audio, displaying a transcript, presenting indications topics of conversation, or the like.

FIG. 15.102 is an example flow diagram of example logic illustrating an example embodiment of process 15.10100 of FIG. 15.101. More particularly, FIG. 15.102 illustrates a process 15.10200 that includes the process 15.10100, wherein the presenting the history information about the voice conference includes operations performed by or at one or more of the following block(s).

At block 15.10201, the process performs presenting the history information to a new participant in the voice conference, the new participant having joined the voice conference while the voice conference was already in progress. In some embodiments, the process may play back history information to a late arrival to the voice conference, so that the new participant may catch up with the conversation without needing to interrupt the proceedings.

FIG. 15.103 is an example flow diagram of example logic illustrating an example embodiment of process 15.10100 of FIG. 15.101. More particularly, FIG. 15.103 illustrates a process 15.10300 that includes the process 15.10100, wherein the presenting the history information about the voice conference includes operations performed by or at one or more of the following block(s).

At block 15.10301, the process performs presenting the history information to a participant in the voice conference, the participant having rejoined the voice conference after having left the voice conference for a period of time. In some embodiments, the process may play back history information to a participant who leaves and then rejoins the conference, for example when a participant temporarily leaves to visit the restroom, obtain some food, or attend to some other matter.

FIG. 15.104 is an example flow diagram of example logic illustrating an example embodiment of process 15.10100 of FIG. 15.101. More particularly, FIG. 15.104 illustrates a process 15.10400 that includes the process 15.10100, wherein the presenting the history information about the voice conference includes operations performed by or at one or more of the following block(s).

At block 15.10401, the process performs presenting at least one of a transcription of utterances made by speakers during the voice conference, indications of topics discussed during the voice conference, and/or indications of information items related to subject matter of the voice conference. The process may present various types of information about the voice conference, including a transcription (e.g., text of what was said and by whom), topics discussed (e.g., based on terms frequently used by speakers during the conference), relevant information items (e.g., emails, documents, plans, agreements mentioned by one or more speakers), or the like.

FIG. 15.105 is an example flow diagram of example logic illustrating an example embodiment of process 15.10100 of FIG. 15.101. More particularly, FIG. 15.105 illustrates a process 15.10500 that includes the process 15.10100, wherein the recording history information about the voice conference includes operations performed by or at one or more of the following block(s).

At block 15.10501, the process performs recording the data representing speech signals from the voice conference. The process may record speech, and then use such recordings for later playback, as a source for transcription, or for other purposes.

FIG. 15.106 is an example flow diagram of example logic illustrating an example embodiment of process 15.10100 of FIG. 15.101. More particularly, FIG. 15.106 illustrates a process 15.10600 that includes the process 15.10100, wherein the recording history information about the voice conference includes operations performed by or at one or more of the following block(s).

At block 15.10601, the process performs recording a transcription of utterances made by speakers during the voice conference. If the process performs speech recognition as discussed herein, it may record the results of such speech recognition as a transcription of the voice conference.

FIG. 15.107 is an example flow diagram of example logic illustrating an example embodiment of process 15.10100 of FIG. 15.101. More particularly, FIG. 15.107 illustrates a process 15.10700 that includes the process 15.10100, wherein the recording history information about the voice conference includes operations performed by or at one or more of the following block(s).

At block 15.10701, the process performs recording indications of topics discussed during the voice conference. Topics of conversation may be identified in various ways. For example, the process may track entities or terms that are commonly mentioned during the course of the voice conference. As another example, the process may attempt to identify agenda items which are typically discussed early in the voice conference. The process may also or instead refer to messages or other information items that are related to the voice conference, such as by analyzing email headers (e.g., subject lines) of email messages sent between participants in the voice conference.

FIG. 15.108 is an example flow diagram of example logic illustrating an example embodiment of process 15.10100 of FIG. 15.101. More particularly, FIG. 15.108 illustrates a process 15.10800 that includes the process 15.10100, wherein the recording history information about the voice conference includes operations performed by or at one or more of the following block(s).

At block 15.10801, the process performs recording indications of information items related to subject matter of the voice conference. The process may track information items that are mentioned during the voice conference or otherwise related to participants in the voice conference, such as emails sent between participants in the voice conference.

C. Example Computing System Implementation

Figure 16:
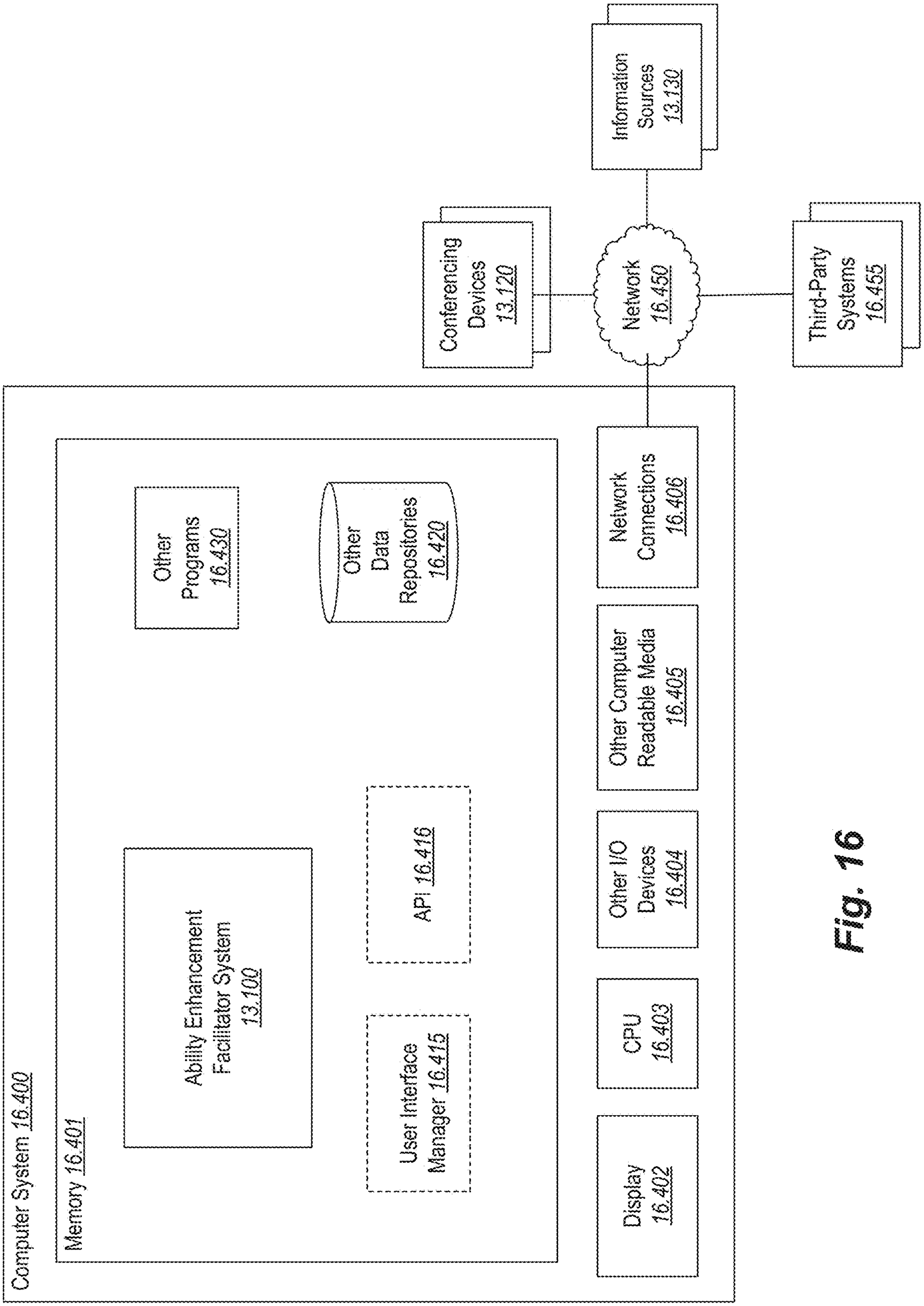
FIG. 16 is an example block diagram of an example computing system for implementing an ability enhancement facilitator system according to an example embodiment.

FIG. 16 is an example block diagram of an example computing system for implementing an ability enhancement facilitator system according to an example embodiment. In particular, FIG. 16 shows a computing system 16.400 that may be utilized to implement an AEFS 13.100.

Note that one or more general purpose or special purpose computing systems/devices may be used to implement the AEFS 13.100. In addition, the computing system 16.400 may comprise one or more distinct computing systems/devices and may span distributed locations. Furthermore, each block shown may represent one or more such blocks as appropriate to a specific embodiment or may be combined with other blocks. Also, the AEFS 13.100 may be implemented in software, hardware, firmware, or in some combination to achieve the capabilities described herein.

In the embodiment shown, computing system 16.400 comprises a computer memory ("memory") 16.401, a display 16.402, one or more Central Processing Units ("CPU") 16.403, Input/Output devices 16.404 (e.g., keyboard, mouse, CRT or LCD display, and the like), other computer-readable media 16.405, and network connections 16.406. The AEFS 13.100 is shown residing in memory 16.401. In other embodiments, some portion of the contents, some or all of the components of the AEFS 13.100 may be stored on and/or transmitted over the other computer-readable media 16.405. The components of the AEFS 13.100 preferably execute on one or more CPUs 16.403 and facilitate ability enhancement, as described herein. Other code or programs 16.430 (e.g., an administrative interface, a Web server, and the like) and potentially other data repositories, such as data repository 16.420, also reside in the memory 16.401, and preferably execute on one or more CPUs 16.403. Of note, one or more of the components in FIG. 16 may not be present in any specific implementation. For example, some embodiments may not provide other computer readable media 16.405 or a display 16.402.

The AEFS 13.100 interacts via the network 16.450 with conferencing devices 13.120, speaker-related information sources 13.130, and third-party systems/applications 16.455. The network 16.450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 16.455 may include any systems that provide data to, or utilize data from, the AEFS 13.100, including Web browsers, e-commerce sites, calendar applications, email systems, social networking services, and the like.

The AEFS 13.100 is shown executing in the memory 16.401 of the computing system 16.400. Also included in the memory are a user interface manager 16.415 and an application program interface ("API") 16.416. The user interface manager 16.415 and the API 16.416 are drawn in dashed lines to indicate that in other embodiments, functions performed by one or more of these components may be performed externally to the AEFS 13.100.

The UI manager 16.415 provides a view and a controller that facilitate user interaction with the AEFS 13.100 and its various components. For example, the UI manager 16.415 may provide interactive access to the AEFS 13.100, such that users can configure the operation of the AEFS 13.100, such as by providing the AEFS 13.100 credentials to access various sources of speaker-related information, including social networking services, email systems, document stores, or the like. In some embodiments, access to the functionality of the UI manager 16.415 may be provided via a Web server, possibly executing as one of the other programs 16.430. In such embodiments, a user operating a Web browser executing on one of the third-party systems 16.455 can interact with the AEFS 13.100 via the UI manager 16.415.

The API 16.416 provides programmatic access to one or more functions of the AEFS 13.100. For example, the API 16.416 may provide a programmatic interface to one or more functions of the AEFS 13.100 that may be invoked by one of the other programs 16.430 or some other module. In this manner, the API 16.416 facilitates the development of third-party software, such as user interfaces, plug-ins, adapters (e.g., for integrating functions of the AEFS 13.100 into Web applications), and the like.

In addition, the API 16.416 may be in at least some embodiments invoked or otherwise accessed via remote entities, such as code executing on one of the conferencing devices 13.120, information sources 13.130, and/or one of the third-party systems/applications 16.455, to access various functions of the AEFS 13.100. For example, an information source 13.130 may push speaker-related information (e.g., emails, documents, calendar events) to the AEFS 13.100 via the API 16.416. The API 16.416 may also be configured to provide management widgets (e.g., code modules) that can be integrated into the third-party applications 16.455 and that are configured to interact with the AEFS 13.100 to make at least some of the described functionality available within the context of other applications (e.g., mobile apps).

In an example embodiment, components/modules of the AEFS 13.100 are implemented using standard programming techniques. For example, the AEFS 13.100 may be implemented as a "native" executable running on the CPU 16.403, along with one or more static or dynamic libraries. In other embodiments, the AEFS 13.100 may be implemented as instructions processed by a virtual machine that executes as one of the other programs 16.430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 13.100, such as in the data store 16.420 (or 14.240), can be available by standard mechanisms such as through C, C++, C #, and Java APIs; libraries for accessing files, databases, or other data repositories; through scripting languages such as XML; or through Web servers, FTP servers, or other types of servers providing access to stored data. The data store 16.420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 13.100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

V. Vehicular Threat Detection Based on Audio Signals

Embodiments described herein provide enhanced computer- and network-based methods and systems for ability enhancement and, more particularly, for enhancing a user's ability to operate or function in a transportation-related context (e.g., as a pedestrian or vehicle operator) by performing vehicular threat detection based at least in part on analyzing audio signals emitted by other vehicles present in a roadway or other context. Example embodiments provide an Ability Enhancement Facilitator System ("AEFS"). Embodiments of the AEFS may augment, enhance, or improve the senses (e.g., hearing), faculties (e.g., memory, language comprehension), and/or other abilities (e.g., driving, riding a bike, walking/running) of a user.

In some embodiments, the AEFS is configured to identify threats posed by vehicles to a user of a roadway, and to provide information about such threats to the user so that he may take evasive action. Identifying threats may include analyzing audio data, such as sounds emitted by a vehicle in order to determine whether the user and the vehicle may be on a collision course. Other types and sources of data may also or instead be utilized, including video data, range information, conditions information (e.g., weather, temperature, time of day), or the like. The user may be a pedestrian (e.g., a walker, a jogger), an operator of a motorized (e.g., car, motorcycle, moped, scooter) or non-motorized vehicle (e.g., bicycle, pedicab, rickshaw), a vehicle passenger, or the like. In some embodiments, the user wears a wearable device (e.g., a helmet, goggles, eyeglasses, hat) that is configured to at least present determined vehicular threat information to the user.

In some embodiments, the AEFS is configured to receive data representing an audio signal emitted by a first vehicle. The audio signal is typically obtained in proximity to a user, who may be a pedestrian or traveling in a vehicle as an operator or a passenger. In some embodiments, the audio signal is obtained by one or more microphones coupled to the user's vehicle and/or a wearable device of the user, such as a helmet, goggles, a hat, a media player, or the like.

Then, the AEFS determines vehicular threat information based at least in part on the data representing the audio signal. In some embodiments, the AEFS may analyze the received data in order to determine whether the first vehicle represents a threat to the user, such as because the first vehicle and the user may be on a collision course. The audio data may be analyzed in various ways, including by performing audio analysis, frequency analysis (e.g., Doppler analysis), acoustic localization, or the like. Other sources of information may also or instead be used, including information received from the first vehicle, a vehicle of the user, other vehicles, in-situ sensors and devices (e.g., traffic cameras, range sensors, induction coils), traffic information systems, weather information systems, and the like.

Next, the AEFS informs the user of the determined vehicular threat information via a wearable device of the user. Typically, the user's wearable device (e.g., a helmet) will include one or more output devices, such as audio speakers, visual display devices (e.g., warning lights, screens, heads-up displays), haptic devices, and the like. The AEFS may present the vehicular threat information via one or more of these output devices. For example, the AEFS may visually display or speak the words "Car on left." As another example, the AEFS may visually display a leftward pointing arrow on a heads-up screen displayed on a face screen of the user's helmet. Presenting the vehicular threat information may also or instead include presenting a recommended course of action (e.g., to slow down, to speed up, to turn) to mitigate the determined vehicular threat.

A. Ability Enhancement Facilitator System Overview

Figure 17A:
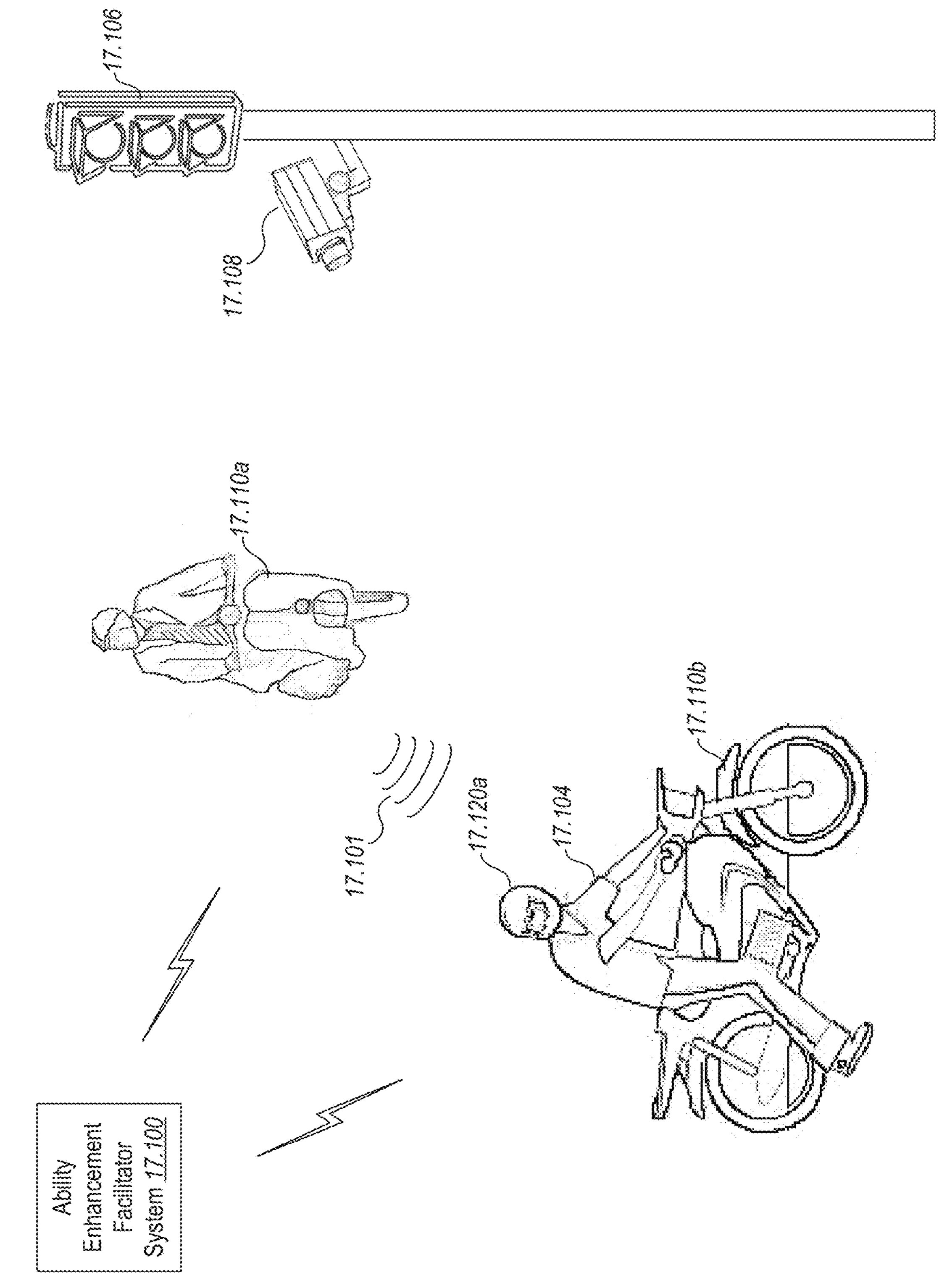
FIGS. 17A and 17B are various views of an example ability enhancement scenario according to an example embodiment.
Figure 17B:
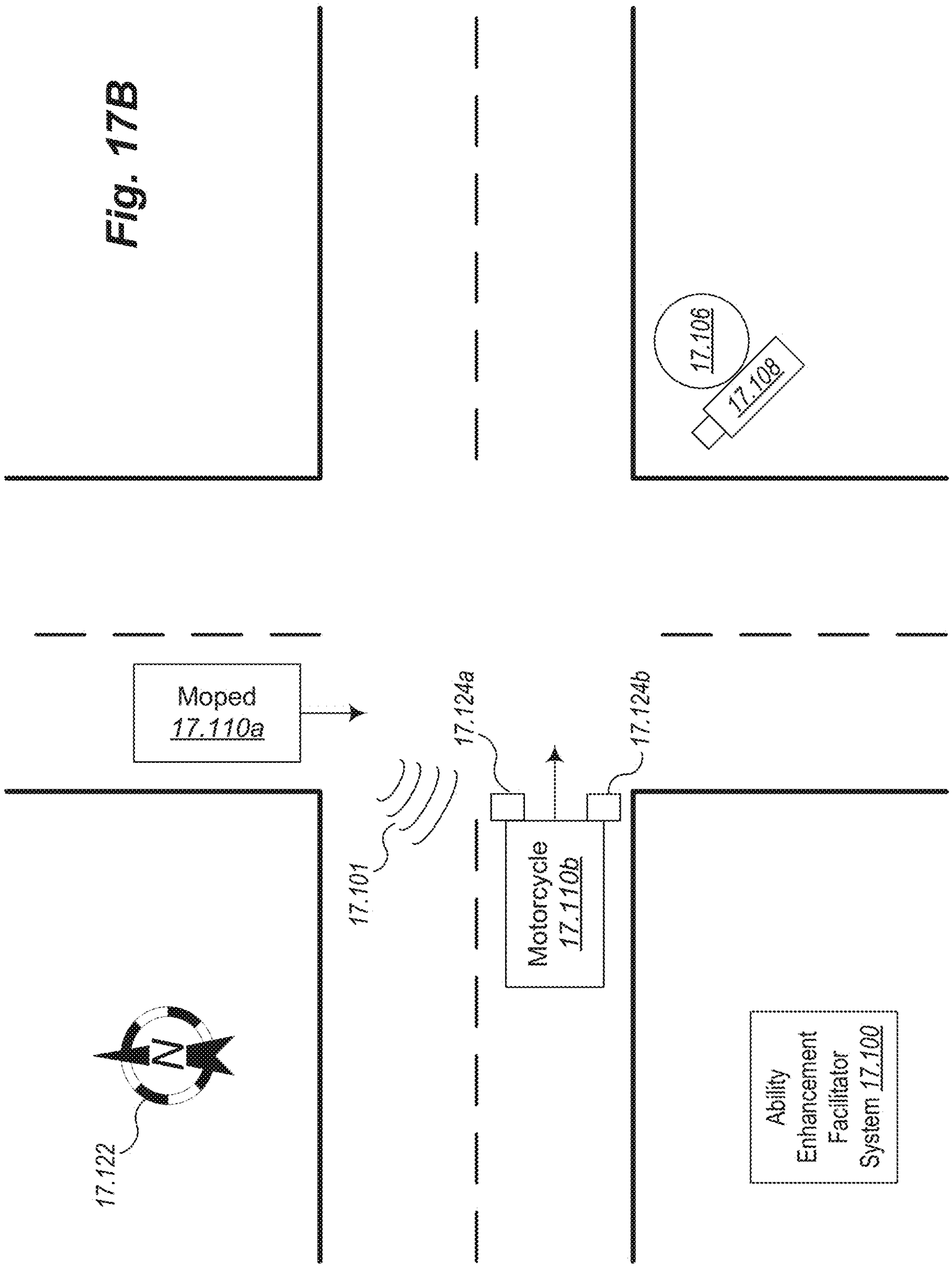

FIGS. 17A and 17B are various views of an example ability enhancement scenario according to an example embodiment. More particularly, FIGS. 17A and 17B respectively are perspective and top views of a traffic scenario which may result in a collision between two vehicles.

FIG. 17A is a perspective view of an example traffic scenario according to an example embodiment. The illustrated scenario includes two vehicles 17.110*a* (a moped) and 17.110*b* (a motorcycle). The motorcycle 17.110*b* is being ridden by a user 17.104 who is wearing a wearable device 17.120*a* (a helmet). An Ability Enhancement Facilitator System ("AEFS") 17.100 is enhancing the ability of the user 17.104 to operate his vehicle 17.110*b* via the wearable device 17.120*a*. The example scenario also includes a traffic signal 17.106 upon which is mounted a camera 17.108.

In this example, the moped 17.110*a* is driving towards the motorcycle 17.110*b* from a side street, at approximately a right angle with respect to the path of travel of the motorcycle 17.110*b*. The traffic signal 17.106 has just turned from red to green for the motorcycle 17.110*b*, and the user 17.104 is beginning to drive the motorcycle 17.110 into the intersection controlled by the traffic signal 17.106. The user 17.104 is assuming that the moped 17.110*a* will stop, because cross traffic will have a red light. However, in this example, the moped 17.110*a* may not stop in a timely manner, for one or more reasons, such as because the operator of the moped 17.110*a* has not seen the red light, because the moped 17.110*a* is moving at an excessive rate, because the operator of the moped 17.110*a* is impaired, because the surface conditions of the roadway are icy or slick, or the like. As will be discussed further below, the AEFS 17.100 will determine that the moped 17.110*a* and the motorcycle 17.110*b* are likely on a collision course, and inform the user 17.104 of this threat via the helmet 17.120*a*, so that the user may take evasive action to avoid a possible collision with the moped 17.110*a*.

The moped 17.110 emits an audio signal 17.101 (e.g., a sound wave emitted from its engine) which travels in advance of the moped 17.110*a*. The audio signal 17.101 is received by a microphone (not shown) on the helmet 17.120*a* and/or the motorcycle 17.110*b*. In some embodiments, a computing and communication device within the helmet 17.120*a* samples the audio signal 17.101 and transmits the samples to the AEFS 17.100. In other embodiments, other forms of data may be used to represent the audio signal 17.101, including frequency coefficients, compressed audio, or the like.

The AEFS 17.100 determines vehicular threat information by analyzing the received data that represents the audio signal 17.101. The AEFS 17.100 may use one or more audio analysis techniques to determine the vehicular threat information. In one embodiment, the AEFS 17.100 performs a Doppler analysis (e.g., by determining whether the frequency of the audio signal is increasing or decreasing) to determine that the object that is emitting the audio signal is approaching (and possibly at what rate) the user 17.104. In some embodiments, the AEFS 17.100 may determine the type of vehicle (e.g., a heavy truck, a passenger vehicle, a motorcycle, a moped) by analyzing the received data to identify an audio signature that is correlated with a particular engine type or size. For example, a lower frequency engine sound may be correlated with a larger vehicle size, and a higher frequency engine sound may be correlated with a smaller vehicle size.

In one embodiment, the AEFS 17.100 performs acoustic source localization to determine information about the trajectory of the moped 17.110*a*, including one or more of position, direction of travel, speed, acceleration, or the like. Acoustic source localization may include receiving data representing the audio signal 17.101 as measured by two or more microphones. For example, the helmet 17.120*a* may include four microphones (e.g., front, right, rear, and left) that each receive the audio signal 17.101. These microphones may be directional, such that they can be used to provide directional information (e.g., an angle between the helmet and the audio source). Such directional information may then be used by the AEFS 17.100 to triangulate the position of the moped 17.110*a*. As another example, the AEFS 17.100 may measure differences between the arrival time of the audio signal 17.101 at multiple distinct microphones on the helmet 17.120*a* or other location. The difference in arrival time, together with information about the distance between the microphones, can be used by the AEFS 17.100 to determine distances between each of the microphones and the audio source, such as the moped 17.110*a*. Distances between the microphones and the audio source can then be used to determine one or more locations at which the audio source may be located.

Determining vehicular threat information may also include obtaining information such as the position, trajectory, and speed of the user 17.104, such as by receiving data representing such information from sensors, devices, and/or systems on board the motorcycle 17.110*b* and/or the helmet 17.120*a*. Such sources of information may include a speedometer, a geo-location system (e.g., GPS system), an accelerometer, or the like. Once the AEFS 17.100 has determined and/or obtained information such as the position, trajectory, and speed of the moped 17.110*a* and the user 17.104, the AEFS 17.100 may determine whether the moped 17.110*a* and the user 17.104 are likely to collide with one another. For example, the AEFS 17.100 may model the expected trajectories of the moped 17.110*a* and user 17.104 to determine whether they intersect at or about the same point in time.

The AEFS 17.100 may then present the determined vehicular threat information (e.g., that the moped 17.110*a* represents a hazard) to the user 17.104 via the helmet 17.120*a*. Presenting the vehicular threat information may include transmitting the information to the helmet 17.120*a*, where it is received and presented to the user. In one embodiment, the helmet 17.120*a* includes audio speakers that may be used to output an audio signal (e.g., an alarm or voice message) warning the user 17.104. In other embodiments, the helmet 17.120*a* includes a visual display, such as a heads-up display presented upon a face screen of the helmet 17.120*a*, which can be used to present a text message (e.g., "Look left") or an icon (e.g., a red arrow pointing left).

The AEFS 17.100 may also use information received from in-situ sensors and/or devices. For example, the AEFS 17.100 may use information received from a camera 17.108 that is mounted on the traffic signal 17.106 that controls the illustrated intersection. The AEFS 17.100 may receive image data that represents the moped 17.110*a* and/or the motorcycle 17.110*b*. The AEFS 17.100 may perform image recognition to determine the type and/or position of a vehicle that is approaching the intersection. The AEFS 17.100 may also or instead analyze multiple images (e.g., from a video signal) to determine the velocity of a vehicle. Other types of sensors or devices installed in or about a roadway may also or instead by used, including range sensors, speed sensors (e.g., radar guns), induction coils (e.g., mounted in the roadbed), temperature sensors, weather gauges, or the like.

FIG. 17B is a top view of the traffic scenario described with respect to FIG. 17A, above. FIG. 17B includes a legend 17.122 that indicates the compass directions. In this example, moped 17.110*a* is traveling southbound and is about to enter the intersection. Motorcycle 17.110*b* is traveling eastbound and is also about to enter the intersection. Also shown are the audio signal 17.101, the traffic signal 17.106, and the camera 17.108.

As noted above, the AEFS 17.100 may utilize data that represents an audio signal as detected by multiple different microphones. In the example of FIG. 17B, the motorcycle 17.110*b* includes two microphones 17.124*a* and 17.124*b*, respectively mounted at the front left and front right of the motorcycle 17.110*b*. As one example, the audio signal 17.101 may be perceived differently by the two microphones. For example, if the strength of the audio signal 17.101 is stronger as measured at microphone 17.124*a* than at microphone 17.124*b*, the AEFS 17.100 may infer that the signal is originating from the driver's left of the motorcycle 17.110*b*, and thus that a vehicle is approaching from that direction. As another example, as the strength of an audio signal is known to decay with distance, and assuming an initial level (e.g., based on an average signal level of a vehicle engine) the AEFS 17.100 may determine a distance (or distance interval) between one or more of the microphones and the signal source.

The AEFS 17.100 may model vehicles and other objects, such as by representing their positions, speeds, acceleration, and other information. Such a model may then be used to determine whether objects are likely to collide. Note that the model may be probabilistic. For example the AEFS 17.100 may represent an object's position in space as a region that includes multiple positions that each have a corresponding likelihood that that the object is at that position. As another example, the AEFS 17.100 may represent the velocity of an object as a range of likely values, a probability distribution, or the like.

Figure 17C:
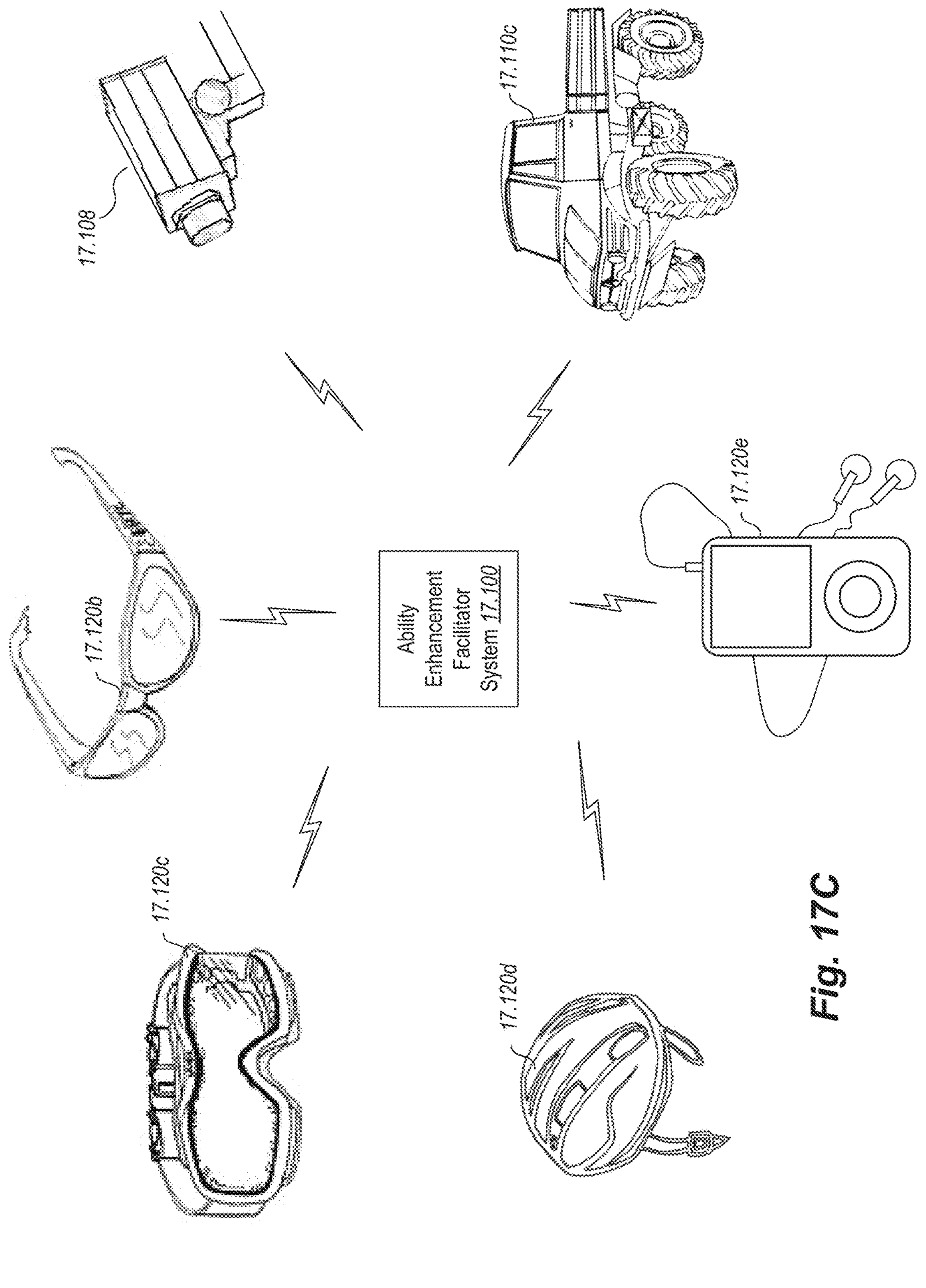
FIG. 17C is an example block diagram illustrating various devices in communication with an ability enhancement facilitator system according to example embodiments.

FIG. 17C is an example block diagram illustrating various devices in communication with an ability enhancement facilitator system according to example embodiments. In particular, FIG. 17C illustrates an AEFS 17.100 in communication with a variety of wearable devices 17.120*b*-120*e*, a camera 17.108, and a vehicle 17.110*c*.

The AEFS 17.100 may interact with various types of wearable devices 17.120, including a motorcycle helmet 17.120*a* (FIG. 17A), eyeglasses 17.120*b*, goggles 17.120*c*, a bicycle helmet 17.120*d*, a personal media device 17.120*e*, or the like. Wearable devices 17.120 may include any device modified to have sufficient computing and communication capability to interact with the AEFS 17.100, such as by presenting vehicular threat information received from the AEFS 17.100, providing data (e.g., audio data) for analysis to the AEFS 17.100, or the like.

In some embodiments, a wearable device may perform some or all of the functions of the AEFS 17.100, even though the AEFS 17.100 is depicted as separate in these examples. Some devices may have minimal processing power and thus perform only some of the functions. For example, the eyeglasses 17.120*b* may receive vehicular threat information from a remote AEFS 17.100, and display it on a heads-up display displayed on the inside of the lenses of the eyeglasses 17.120*b*. Other wearable devices may have sufficient processing power to perform more of the functions of the AEFS 17.100. For example, the personal media device 17.120*e* may have considerable processing power and as such be configured to perform acoustic source localization, collision detection analysis, or other more computational expensive functions.

Note that the wearable devices 17.120 may act in concert with one another or with other entities to perform functions of the AEFS 17.100. For example, the eyeglasses 17.120*b* may include a display mechanism that receives and displays vehicular threat information determined by the personal media device 17.120*e*. As another example, the goggles 17.120*c* may include a display mechanism that receives and displays vehicular threat information determined by a computing device in the helmet 17.120*a* or 17.120*d*. In a further example, one of the wearable devices 17.120 may receive and process audio data received by microphones mounted on the vehicle 17.110*c*.

The AEFS 17.100 may also or instead interact with vehicles 17.110 and/or computing devices installed thereon. As noted, a vehicle 17.110 may have one or more sensors or devices that may operate as (direct or indirect) sources of information for the AEFS 17.100. The vehicle 17.110*c*, for example, may include a speedometer, an accelerometer, one or more microphones, one or more range sensors, or the like. Data obtained by, at, or from such devices of vehicle 17.110*c* may be forwarded to the AEFS 17.100, possibly by a wearable device 17.120 of an operator of the vehicle 17.110*c*.

In some embodiments, the vehicle 17.110*c* may itself have or use an AEFS, and be configured to transmit warnings or other vehicular threat information to others. For example, an AEFS of the vehicle 17.110*c* may have determined that the moped 17.110*a* was driving with excessive speed just prior to the scenario depicted in FIG. 17B. The AEFS of the vehicle 17.110*c* may then share this information, such as with the AEFS 17.100. The AEFS 17.100 may accordingly receive and exploit this information when determining that the moped 17.110*a* poses a threat to the motorcycle 17.110*b*.

The AEFS 17.100 may also or instead interact with sensors and other devices that are installed on, in, or about roads or in other transportation related contexts, such as parking garages, racetracks, or the like. In this example, the AEFS 17.100 interacts with the camera 17.108 to obtain images of vehicles, pedestrians, or other objects present in a roadway. Other types of sensors or devices may include range sensors, infrared sensors, induction coils, radar guns, temperature gauges, precipitation gauges, or the like.

The AEFS 17.100 may further interact with information systems that are not shown in FIG. 17C. For example, the AEFS 17.100 may receive information from traffic information systems that are used to report traffic accidents, road conditions, construction delays, and other information about road conditions. The AEFS 17.100 may receive information from weather systems that provide information about current weather conditions. The AEFS 17.100 may receive and exploit statistical information, such as that drivers in particular regions are more aggressive, that red light violations are more frequent at particular intersections, that drivers are more likely to be intoxicated at particular times of day or year, or the like.

Note that in some embodiments, at least some of the described techniques may be performed without the utilization of any wearable devices 17.120. For example, a vehicle 17.110 may itself include the necessary computation, input, and output devices to perform functions of the AEFS 17.100. For example, the AEFS 17.100 may present vehicular threat information on output devices of a vehicle 17.110, such as a radio speaker, dashboard warning light, heads-up display, or the like. As another example, a computing device on a vehicle 17.110 may itself determine the vehicular threat information.

Figure 18:
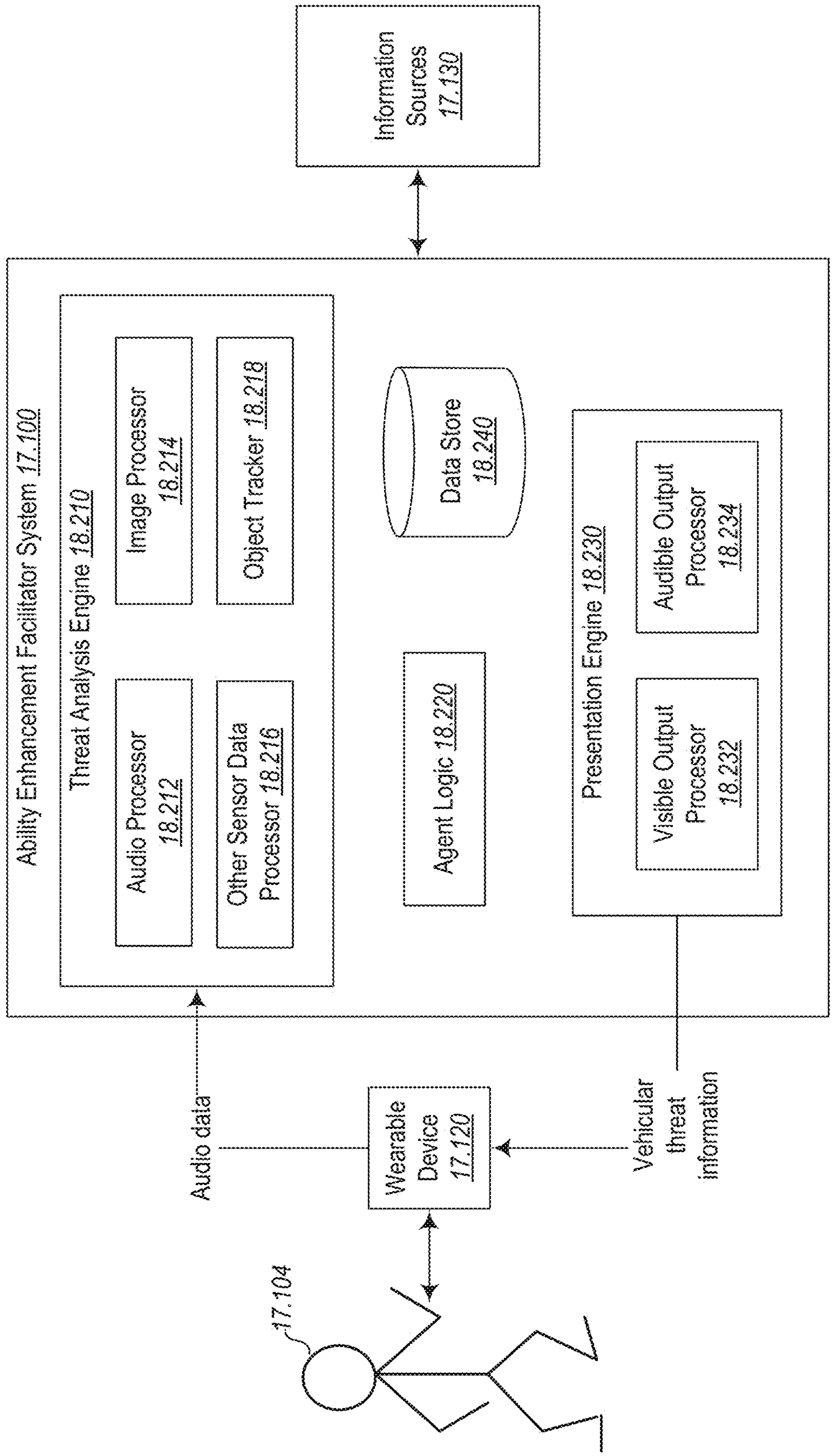
FIG. 18 is an example functional block diagram of an example ability enhancement facilitator system according to an example embodiment.

FIG. 18 is an example functional block diagram of an example ability enhancement facilitator system according to an example embodiment. In the illustrated embodiment of FIG. 18, the AEFS 17.100 includes a threat analysis engine 18.210, agent logic 18.220, a presentation engine 18.230, and a data store 18.240. The AEFS 17.100 is shown interacting with a wearable device 17.120 and information sources 17.130. The information sources 17.130 include any sensors, devices, systems, or the like that provide information to the AEFS 17.100, including but not limited to vehicle-based devices (e.g., speedometers), in-situ devices (e.g., road-side cameras), and information systems (e.g., traffic systems).

The threat analysis engine 18.210 includes an audio processor 18.212, an image processor 18.214, other sensor data processors 18.216, and an object tracker 18.218. In the illustrated example, the audio processor 18.212 processes audio data received from the wearable device 17.120. As noted, such data may be received from other sources as well or instead, including directly from a vehicle-mounted microphone, or the like. The audio processor 18.212 may perform various types of signal processing, including audio level analysis, frequency analysis, acoustic source localization, or the like. Based on such signal processing, the audio processor 18.212 may determine strength, direction of audio signals, audio source distance, audio source type, or the like. Outputs of the audio processor 18.212 (e.g., that an object is approaching from a particular angle) may be provided to the object tracker 18.218 and/or stored in the data store 18.240.

The image processor 18.214 receives and processes image data that may be received from sources such as the wearable device 17.120 and/or information sources 17.130. For example, the image processor 18.214 may receive image data from a camera of the wearable device 17.120, and perform object recognition to determine the type and/or position of a vehicle that is approaching the user 17.104. As another example, the image processor 18.214 may receive a video signal (e.g., a sequence of images) and process them to determine the type, position, and/or velocity of a vehicle that is approaching the user 17.104. Outputs of the image processor 18.214 (e.g., position and velocity information, vehicle type information) may be provided to the object tracker 18.218 and/or stored in the data store 18.240.

The other sensor data processor 18.216 receives and processes data received from other sensors or sources. For example, the other sensor data processor 18.216 may receive and/or determine information about the position and/or movements of the user and/or one or more vehicles, such as based on GPS systems, speedometers, accelerometers, or other devices. As another example, the other sensor data processor 18.216 may receive and process conditions information (e.g., temperature, precipitation) from the information sources 17.130 and determine that road conditions are currently icy. Outputs of the other sensor data processor 18.216 (e.g., that the user is moving at 5 miles per hour) may be provided to the object tracker 18.218 and/or stored in the data store 18.240.

The object tracker 18.218 manages a geospatial object model that includes information about objects known to the AEFS 17.100. The object tracker 18.218 receives and merges information about object types, positions, velocity, acceleration, direction of travel, and the like, from one or more of the processors 18.212, 18.214, 18.216, and/or other sources. Based on such information, the object tracker 18.218 may identify the presence of objects as well as their likely positions, paths, and the like. The object tracker 18.218 may continually update this model as new information becomes available and/or as time passes (e.g., by plotting a likely current position of an object based on its last measured position and trajectory). The object tracker 18.218 may also maintain confidence levels corresponding to elements of the geo-spatial model, such as a likelihood that a vehicle is at a particular position or moving at a particular velocity, that a particular object is a vehicle and not a pedestrian, or the like.

The agent logic 18.220 implements the core intelligence of the AEFS 17.100. The agent logic 18.220 may include a reasoning engine (e.g., a rules engine, decision trees, Bayesian inference engine) that combines information from multiple sources to determine vehicular threat information. For example, the agent logic 18.220 may combine information from the object tracker 18.218, such as that there is a determined likelihood of a collision at an intersection, with information from one of the information sources 17.130, such as that the intersection is the scene of common red-light violations, and decide that the likelihood of a collision is high enough to transmit a warning to the user 17.104. As another example, the agent logic 18.220 may, in the face of multiple distinct threats to the user, determine which threat is the most significant and cause the user to avoid the more significant threat, such as by not directing the user 17.104 to slam on the brakes when a bicycle is approaching from the side but a truck is approaching from the rear, because being rear-ended by the truck would have more serious consequences than being hit from the side by the bicycle.

The presentation engine 18.230 includes a visible output processor 18.232 and an audible output processor 18.234. The visible output processor 18.232 may prepare, format, and/or cause information to be displayed on a display device, such as a display of the wearable device 17.120 or some other display (e.g., a heads-up display of a vehicle 17.110 being driven by the user 17.104). The agent logic 18.220 may use or invoke the visible output processor 18.232 to prepare and display information, such as by formatting or otherwise modifying vehicular threat information to fit on a particular type or size of display. The audible output processor 18.234 may include or use other components for generating audible output, such as tones, sounds, voices, or the like. In some embodiments, the agent logic 18.220 may use or invoke the audible output processor 18.234 in order to convert a textual message (e.g., a warning message, a threat identification) into audio output suitable for presentation via the wearable device 17.120, for example by employing a text-to-speech processor.

Note that one or more of the illustrated components/modules may not be present in some embodiments. For example, in embodiments that do not perform image or video processing, the AEFS 17.100 may not include an image processor 18.214. As another example, in embodiments that do not perform audio output, the AEFS 17.100 may not include an audible output processor 18.234.

Note also that the AEFS 17.100 may act in service of multiple users 17.104. In some embodiments, the AEFS 17.100 may determine vehicular threat information concurrently for multiple distinct users. Such embodiments may further facilitate the sharing of vehicular threat information. For example, vehicular threat information determined as between two vehicles may be relevant and thus shared with a third vehicle that is in proximity to the other two vehicles.

B. Example Processes

FIGS. 19.1-19.70 are example flow diagrams of ability enhancement processes performed by example embodiments.

FIG. 19.1 is an example flow diagram of example logic for enhancing ability in a transportation-related context. The illustrated logic in this and the following flow diagrams may be performed by, for example, one or more components of the AEFS 17.100 described with respect to FIG. 18, above. As noted, one or more functions of the AEFS 17.100 may be performed at various locations, including at the wearable device, in a vehicle of a user, in some other vehicle, in an in-situ road-side computing system, or the like. More particularly, FIG. 19.1 illustrates a process 19.100 that includes operations performed by or at the following block(s).

At block 19.101, the process performs receiving data representing an audio signal obtained in proximity to a user, the audio signal emitted by a first vehicle. The data representing the audio signal may be raw audio samples, compressed audio data, frequency coefficients, or the like. The data representing the audio signal may represent the sound made by the first vehicle, such as from its engine, a horn, tires, or any other source of sound. The data representing the audio signal may include sounds from other sources, including other vehicles, pedestrians, or the like. The audio signal may be obtained at or about a user who is a pedestrian or who is in a vehicle that is not the first vehicle, either as the operator or a passenger.

At block 19.102, the process performs determining vehicular threat information based at least in part on the data representing the audio signal. Vehicular threat information may be determined in various ways, including by analyzing the data representing the audio signal to determine whether it indicates that the first vehicle is approaching the user. Analyzing the data may be based on various techniques, including analyzing audio levels, frequency shifts (e.g., the Doppler Effect), acoustic source localization, or the like.

At block 19.103, the process performs presenting the vehicular threat information via a wearable device of the user. The determined threat information may be presented in various ways, such as by presenting an audible or visible warning or other indication that the first vehicle is approaching the user. Different types of wearable devices are contemplated, including helmets, eyeglasses, goggles, hats, and the like. In other embodiments, the vehicular threat information may also or instead be presented in other ways, such as via an output device on a vehicle of the user, in-situ output devices (e.g., traffic signs, road-side speakers), or the like.

FIG. 19.2 is an example flow diagram of example logic illustrating an example embodiment of process 19.100 of FIG. 19.1. More particularly, FIG. 19.2 illustrates a process 19.200 that includes the process 19.100, wherein the receiving data representing an audio signal includes operations performed by or at one or more of the following block(s).

At block 19.201, the process performs receiving data obtained at a microphone array that includes multiple microphones. In some embodiments, a microphone array having two or more microphones is employed to receive audio signals. Differences between the received audio signals may be utilized to perform acoustic source localization or other functions, as discussed further herein.

FIG. 19.3 is an example flow diagram of example logic illustrating an example embodiment of process 19.200 of FIG. 19.2. More particularly, FIG. 19.3 illustrates a process 19.300 that includes the process 19.200, wherein the receiving data obtained at a microphone array includes operations performed by or at one or more of the following block(s).

At block 19.301, the process performs receiving data obtained at a microphone array, the microphone array coupled to a vehicle of the user. In some embodiments, such as when the user is operating or otherwise traveling in a vehicle of his own (that is not the same as the first vehicle), the microphone array may be coupled or attached to the user's vehicle, such as by having a microphone located at each of the four corners of the user's vehicle.

FIG. 19.4 is an example flow diagram of example logic illustrating an example embodiment of process 19.200 of FIG. 19.2. More particularly, FIG. 19.4 illustrates a process 19.400 that includes the process 19.200, wherein the receiving data obtained at a microphone array includes operations performed by or at one or more of the following block(s).

At block 19.401, the process performs receiving data obtained at a microphone array, the microphone array coupled to the wearable device. For example, if the wearable device is a helmet, then a first microphone may be located on the left side of the helmet while a second microphone may be located on the right side of the helmet.

FIG. 19.5 is an example flow diagram of example logic illustrating an example embodiment of process 19.100 of FIG. 19.1. More particularly, FIG. 19.5 illustrates a process 19.500 that includes the process 19.100, wherein the determining vehicular threat information includes operations performed by or at one or more of the following block(s).

At block 19.501, the process performs determining a position of the first vehicle. The position of the first vehicle may be expressed absolutely, such as via a GPS coordinate or similar representation, or relatively, such as with respect to the position of the user (e.g., 20 meters away from the first user). In addition, the position of the first vehicle may be represented as a point or collection of points (e.g., a region, arc, or line).

FIG. 19.6 is an example flow diagram of example logic illustrating an example embodiment of process 19.100 of FIG. 19.1. More particularly, FIG. 19.6 illustrates a process 19.600 that includes the process 19.100, wherein the determining vehicular threat information includes operations performed by or at one or more of the following block(s).

At block 19.601, the process performs determining a velocity of the first vehicle. The process may determine the velocity of the first vehicle in absolute or relative terms (e.g., with respect to the velocity of the user). The velocity may be expressed or represented as a magnitude (e.g., 10 meters per second), a vector (e.g., having a magnitude and a direction), or the like.

FIG. 19.7 is an example flow diagram of example logic illustrating an example embodiment of process 19.100 of FIG. 19.1. More particularly, FIG. 19.7 illustrates a process 19.700 that includes the process 19.100, wherein the determining vehicular threat information includes operations performed by or at one or more of the following block(s).

At block 19.701, the process performs determining a direction of travel of the first vehicle. The process may determine a direction in which the first vehicle is traveling, such as with respect to the user and/or some absolute coordinate system.

FIG. 19.8 is an example flow diagram of example logic illustrating an example embodiment of process 19.100 of FIG. 19.1. More particularly, FIG. 19.8 illustrates a process 19.800 that includes the process 19.100, wherein the determining vehicular threat information includes operations performed by or at one or more of the following block(s).

At block 19.801, the process performs determining whether the first vehicle is approaching the user. Determining whether the first vehicle is approaching the user may include determining information about the movements of the user and the first vehicle, including position, direction of travel, velocity, acceleration, and the like. Based on such information, the process may determine whether the courses of the user and the first vehicle will (or are likely to) intersect one another.

FIG. 19.9 is an example flow diagram of example logic illustrating an example embodiment of process 19.100 of FIG. 19.1. More particularly, FIG. 19.9 illustrates a process 19.900 that includes the process 19.100, wherein the determining vehicular threat information includes operations performed by or at one or more of the following block(s).

At block 19.901, the process performs performing acoustic source localization to determine a position of the first vehicle based on multiple audio signals received via multiple microphones. The process may determine a position of the first vehicle by analyzing audio signals received via multiple distinct microphones. For example, engine noise of the first vehicle may have different characteristics (e.g., in volume, in time of arrival, in frequency) as received by different microphones. Differences between the audio signal measured at different microphones may be exploited to determine one or more positions (e.g., points, arcs, lines, regions) at which the first vehicle may be located.

FIG. 19.10 is an example flow diagram of example logic illustrating an example embodiment of process 19.900 of FIG. 19.9. More particularly, FIG. 19.10 illustrates a process 19.1000 that includes the process 19.900, wherein the performing acoustic source localization includes operations performed by or at one or more of the following block(s).

At block 19.1001, the process performs receiving an audio signal via a first one of the multiple microphones, the audio signal representing a sound created by the first vehicle. In one approach, at least two microphones are employed. By measuring differences in the arrival time of an audio signal at the two microphones, the position of the first vehicle may be determined. The determined position may be a point, a line, an area, or the like.

At block 19.1002, the process performs receiving the audio signal via a second one of the multiple microphones.

At block 19.1003, the process performs determining the position of the first vehicle by determining a difference between an arrival time of the audio signal at the first microphone and an arrival time of the audio signal at the second microphone. In some embodiments, given information about the distance between the two microphones and the speed of sound, the process may determine the respective distances between each of the two microphones and the first vehicle. Given these two distances (along with the distance between the microphones), the process can solve for the one or more positions at which the first vehicle may be located.

FIG. 19.11 is an example flow diagram of example logic illustrating an example embodiment of process 19.900 of FIG. 19.9. More particularly, FIG. 19.11 illustrates a process 19.1100 that includes the process 19.900, wherein the performing acoustic source localization includes operations performed by or at one or more of the following block(s).

At block 19.1101, the process performs triangulating the position of the first vehicle based on a first and second angle, the first angle measured between a first one of the multiple microphones and the first vehicle, the second angle measured between a second one of the multiple microphones and the first vehicle. In some embodiments, the microphones may be directional, in that they may be used to determine the direction from which the sound is coming. Given such information, the process may use triangulation techniques to determine the position of the first vehicle.

FIG. 19.12 is an example flow diagram of example logic illustrating an example embodiment of process 19.100 of FIG. 19.1. More particularly, FIG. 19.12 illustrates a process 19.1200 that includes the process 19.100, wherein the determining vehicular threat information includes operations performed by or at one or more of the following block(s).

At block 19.1201, the process performs performing a Doppler analysis of the data representing the audio signal to determine whether the first vehicle is approaching the user. The process may analyze whether the frequency of the audio signal is shifting in order to determine whether the first vehicle is approaching or departing the position of the user. For example, if the frequency is shifting higher, the first vehicle may be determined to be approaching the user. Note that the determination is typically made from the frame of reference of the user (who may be moving or not). Thus, the first vehicle may be determined to be approaching the user when, as viewed from a fixed frame of reference, the user is approaching the first vehicle (e.g., a moving user traveling towards a stationary vehicle) or the first vehicle is approaching the user (e.g., a moving vehicle approaching a stationary user). In other embodiments, other frames of reference may be employed, such as a fixed frame, a frame associated with the first vehicle, or the like.

FIG. 19.13 is an example flow diagram of example logic illustrating an example embodiment of process 19.1200 of FIG. 19.12. More particularly, FIG. 19.13 illustrates a process 19.1300 that includes the process 19.1200, wherein the performing a Doppler analysis includes operations performed by or at one or more of the following block(s).

At block 19.1301, the process performs determining whether frequency of the audio signal is increasing or decreasing.

FIG. 19.14 is an example flow diagram of example logic illustrating an example embodiment of process 19.100 of FIG. 19.1. More particularly, FIG. 19.14 illustrates a process 19.1400 that includes the process 19.100, wherein the determining vehicular threat information includes operations performed by or at one or more of the following block(s).

At block 19.1401, the process performs performing a volume analysis of the data representing the audio signal to determine whether the first vehicle is approaching the user. The process may analyze whether the volume (e.g., amplitude) of the audio signal is shifting in order to determine whether the first vehicle is approaching or departing the position of the user. An increasing volume may indicate that the first vehicle is approaching the user. As noted, different embodiments may use different frames of reference when making this determination.

FIG. 19.15 is an example flow diagram of example logic illustrating an example embodiment of process 19.1400 of FIG. 19.14. More particularly, FIG. 19.15 illustrates a process 19.1500 that includes the process 19.1400, wherein the performing a volume analysis includes operations performed by or at one or more of the following block(s).

At block 19.1501, the process performs determining whether volume of the audio signal is increasing or decreasing.

FIG. 19.16 is an example flow diagram of example logic illustrating an example embodiment of process 19.100 of FIG. 19.1. More particularly, FIG. 19.16 illustrates a process 19.1600 that includes the process 19.100, wherein the determining vehicular threat information includes operations performed by or at one or more of the following block(s).

At block 19.1601, the process performs determining the vehicular threat information based on gaze information associated with the user. In some embodiments, the process may consider the direction in which the user is looking when determining the vehicular threat information. For example, the vehicular threat information may depend on whether the user is or is not looking at the first vehicle, as discussed further below.

FIG. 19.17 is an example flow diagram of example logic illustrating an example embodiment of process 19.1600 of FIG. 19.16. More particularly, FIG. 19.17 illustrates a process 19.1700 that includes the process 19.1600, and which further includes operations performed by or at the following block(s).

At block 19.1701, the process performs receiving an indication of a direction in which the user is looking. In some embodiments, an orientation sensor such as a gyroscope or accelerometer may be employed to determine the orientation of the user's head, face, or other body part. In some embodiments, a camera or other image sensing device may track the orientation of the user's eyes.

At block 19.1702, the process performs determining that the user is not looking towards the first vehicle. As noted, the process may track the position of the first vehicle. Given this information, coupled with information about the direction of the user's gaze, the process may determine whether or not the user is (or likely is) looking in the direction of the first vehicle.

At block 19.1703, the process performs in response to determining that the user is not looking towards the first vehicle, directing the user to look towards the first vehicle. When it is determined that the user is not looking at the first vehicle, the process may warn or otherwise direct the user to look in that direction, such as by saying or otherwise presenting "Look right!", "Car on your left," or similar message.

FIG. 19.18 is an example flow diagram of example logic illustrating an example embodiment of process 19.100 of FIG. 19.1. More particularly, FIG. 19.18 illustrates a process 19.1800 that includes the process 19.100, and which further includes operations performed by or at the following block(s).

At block 19.1801, the process performs identifying multiple threats to the user. The process may in some cases identify multiple potential threats, such as one car approaching the user from behind and another car approaching the user from the left. In some cases, one or more of the multiple threats may themselves arise if or when the user takes evasive action to avoid some other threat. For example, the process may determine that a bus traveling behind the user will become a threat if the user responds to a bike approaching from his side by slamming on the brakes.

At block 19.1802, the process performs identifying a first one of the multiple threats that is more significant than at least one other of the multiple threats. The process may rank, order, or otherwise evaluate the relative significance or risk presented by each of the identified threats. For example, the process may determine that a truck approaching from the right is a bigger risk than a bicycle approaching from behind. On the other hand, if the truck is moving very slowly (thus leaving more time for the truck and/or the user to avoid it) compared to the bicycle, the process may instead determine that the bicycle is the bigger risk.

At block 19.1803, the process performs causing the user to avoid the first one of the multiple threats. The process may so cause the user to avoid the more significant threat by warning the user of the more significant threat. In some embodiments, the process may instead or in addition display a ranking of the multiple threats. In some embodiments, the process may so cause the user by not informing the user of the less significant threat.

FIG. 19.19 is an example flow diagram of example logic illustrating an example embodiment of process 19.100 of FIG. 19.1. More particularly, FIG. 19.19 illustrates a process 19.1900 that includes the process 19.100, and which further includes operations performed by or at the following block(s).

At block 19.1901, the process performs determining vehicular threat information related to factors other than ones related to the first vehicle. The process may consider a variety of other factors or information in addition to those related to the first vehicle, such as road conditions, the presence or absence of other vehicles, or the like.

FIG. 19.20 is an example flow diagram of example logic illustrating an example embodiment of process 19.1900 of FIG. 19.19. More particularly, FIG. 19.20 illustrates a process 19.2000 that includes the process 19.1900, wherein the determining vehicular threat information related to factors other than ones related to the first vehicle includes operations performed by or at one or more of the following block(s).

At block 19.2001, the process performs determining that poor driving conditions exist. Poor driving conditions may include or be based on weather information (e.g., snow, rain, ice, temperature), time information (e.g., night or day), lighting information (e.g., a light sensor indicating that the user is traveling towards the setting sun), or the like.

FIG. 19.21 is an example flow diagram of example logic illustrating an example embodiment of process 19.1900 of FIG. 19.19. More particularly, FIG. 19.21 illustrates a process 19.2100 that includes the process 19.1900, wherein the determining vehicular threat information related to factors other than ones related to the first vehicle includes operations performed by or at one or more of the following block(s).

At block 19.2101, the process performs determining that a limited visibility condition exists. Limited visibility may be due to the time of day (e.g., at dusk, dawn, or night), weather (e.g., fog, rain), or the like.

FIG. 19.22 is an example flow diagram of example logic illustrating an example embodiment of process 19.1900 of FIG. 19.19. More particularly, FIG. 19.22 illustrates a process 19.2200 that includes the process 19.1900, wherein the determining vehicular threat information related to factors other than ones related to the first vehicle includes operations performed by or at one or more of the following block(s).

At block 19.2201, the process performs determining that there is stalled or slow traffic in proximity to the user. The process may receive and integrate information from traffic information systems (e.g., that report accidents), other vehicles (e.g., that are reporting their speeds), or the like.

FIG. 19.23 is an example flow diagram of example logic illustrating an example embodiment of process 19.1900 of FIG. 19.19. More particularly, FIG. 19.23 illustrates a process 19.2300 that includes the process 19.1900, wherein the determining vehicular threat information related to factors other than ones related to the first vehicle includes operations performed by or at one or more of the following block(s).

At block 19.2301, the process performs determining that poor surface conditions exist on a roadway traveled by the user. Poor surface conditions may be due to weather (e.g., ice, snow, rain), temperature, surface type (e.g., gravel road), foreign materials (e.g., oil), or the like.

FIG. 19.24 is an example flow diagram of example logic illustrating an example embodiment of process 19.1900 of FIG. 19.19. More particularly, FIG. 19.24 illustrates a process 19.2400 that includes the process 19.1900, wherein the determining vehicular threat information related to factors other than ones related to the first vehicle includes operations performed by or at one or more of the following block(s).

At block 19.2401, the process performs determining that there is a pedestrian in proximity to the user. The presence of pedestrians may be determined in various ways. In some embodiments pedestrians may wear devices that transmit their location and/or presence. In other embodiments, pedestrians may be detected based on their heat signature, such as by an infrared sensor on the wearable device, user vehicle, or the like.

FIG. 19.25 is an example flow diagram of example logic illustrating an example embodiment of process 19.1900 of FIG. 19.19. More particularly, FIG. 19.25 illustrates a process 19.2500 that includes the process 19.1900, wherein the determining vehicular threat information related to factors other than ones related to the first vehicle includes operations performed by or at one or more of the following block(s).

At block 19.2501, the process performs determining that there is an accident in proximity to the user. Accidents may be identified based on traffic information systems that report accidents, vehicle-based systems that transmit when collisions have occurred, or the like.

FIG. 19.26 is an example flow diagram of example logic illustrating an example embodiment of process 19.1900 of FIG. 19.19. More particularly, FIG. 19.26 illustrates a process 19.2600 that includes the process 19.1900, wherein the determining vehicular threat information related to factors other than ones related to the first vehicle includes operations performed by or at one or more of the following block(s).

At block 19.2601, the process performs determining that there is an animal in proximity to the user. The presence of an animal may be determined as discussed with respect to pedestrians, above.

FIG. 19.27 is an example flow diagram of example logic illustrating an example embodiment of process 19.100 of FIG. 19.1. More particularly, FIG. 19.27 illustrates a process 19.2700 that includes the process 19.100, wherein the determining vehicular threat information includes operations performed by or at one or more of the following block(s).

At block 19.2701, the process performs determining the vehicular threat information based on kinematic information. The process may consider a variety of kinematic information received from various sources, such as the wearable device, a vehicle of the user, the first vehicle, or the like. The kinematic information may include information about the position, velocity, acceleration, or the like of the user and/or the first vehicle.

FIG. 19.28 is an example flow diagram of example logic illustrating an example embodiment of process 19.2700 of FIG. 19.27. More particularly, FIG. 19.28 illustrates a process 19.2800 that includes the process 19.2700, wherein the determining the vehicular threat information based on kinematic information includes operations performed by or at one or more of the following block(s).

At block 19.2801, the process performs determining the vehicular threat information based on information about position, velocity, and/or acceleration of the user obtained from sensors in the wearable device. The wearable device may include position sensors (e.g., GPS), accelerometers, or other devices configured to provide kinematic information about the user to the process.

FIG. 19.29 is an example flow diagram of example logic illustrating an example embodiment of process 19.2700 of FIG. 19.27. More particularly, FIG. 19.29 illustrates a process 19.2900 that includes the process 19.2700, wherein the determining the vehicular threat information based on kinematic information includes operations performed by or at one or more of the following block(s).

At block 19.2901, the process performs determining the vehicular threat information based on information about position, velocity, and/or acceleration of the user obtained from devices in a vehicle of the user. A vehicle occupied or operated by the user may include position sensors (e.g., GPS), accelerometers, speedometers, or other devices configured to provide kinematic information about the user to the process.

FIG. 19.30 is an example flow diagram of example logic illustrating an example embodiment of process 19.2700 of FIG. 19.27. More particularly, FIG. 19.30 illustrates a process 19.3000 that includes the process 19.2700, wherein the determining the vehicular threat information based on kinematic information includes operations performed by or at one or more of the following block(s).

At block 19.3001, the process performs determining the vehicular threat information based on information about position, velocity, and/or acceleration of the first vehicle. The first vehicle may include position sensors (e.g., GPS), accelerometers, speedometers, or other devices configured to provide kinematic information about the user to the process. In other embodiments, kinematic information may be obtained from other sources, such as a radar gun deployed at the side of a road, from other vehicles, or the like.

FIG. 19.31 is an example flow diagram of example logic illustrating an example embodiment of process 19.100 of FIG. 19.1. More particularly, FIG. 19.31 illustrates a process 19.3100 that includes the process 19.100, wherein the presenting the vehicular threat information includes operations performed by or at one or more of the following block(s).

At block 19.3101, the process performs presenting the vehicular threat information via an audio output device of the wearable device. The process may play an alarm, bell, chime, voice message, or the like that warns or otherwise informs the user of the vehicular threat information. The wearable device may include audio speakers operable to output audio signals, including as part of a set of earphones, earbuds, a headset, a helmet, or the like.

FIG. 19.32 is an example flow diagram of example logic illustrating an example embodiment of process 19.100 of FIG. 19.1. More particularly, FIG. 19.32 illustrates a process 19.3200 that includes the process 19.100, wherein the presenting the vehicular threat information includes operations performed by or at one or more of the following block(s).

At block 19.3201, the process performs presenting the vehicular threat information via a visual display device of the wearable device. In some embodiments, the wearable device includes a display screen or other mechanism for presenting visual information. For example, when the wearable device is a helmet, a face shield of the helmet may be used as a type of heads-up display for presenting the vehicular threat information.

FIG. 19.33 is an example flow diagram of example logic illustrating an example embodiment of process 19.3200 of FIG. 19.32. More particularly, FIG. 19.33 illustrates a process 19.3300 that includes the process 19.3200, wherein the presenting the vehicular threat information via a visual display device includes operations performed by or at one or more of the following block(s).

At block 19.3301, the process performs displaying an indicator that instructs the user to look towards the first vehicle. The displayed indicator may be textual (e.g., "Look right!"), iconic (e.g., an arrow), or the like.

FIG. 19.34 is an example flow diagram of example logic illustrating an example embodiment of process 19.3200 of FIG. 19.32. More particularly, FIG. 19.34 illustrates a process 19.3400 that includes the process 19.3200, wherein the presenting the vehicular threat information via a visual display device includes operations performed by or at one or more of the following block(s).

At block 19.3401, the process performs displaying an indicator that instructs the user to accelerate, decelerate, and/or turn. An example indicator may be or include the text "Speed up," "slow down," "turn left," or similar language.

FIG. 19.35 is an example flow diagram of example logic illustrating an example embodiment of process 19.100 of FIG. 19.1. More particularly, FIG. 19.35 illustrates a process 19.3500 that includes the process 19.100, wherein the presenting the vehicular threat information includes operations performed by or at one or more of the following block(s).

At block 19.3501, the process performs directing the user to accelerate.

FIG. 19.36 is an example flow diagram of example logic illustrating an example embodiment of process 19.100 of FIG. 19.1. More particularly, FIG. 19.36 illustrates a process 19.3600 that includes the process 19.100, wherein the presenting the vehicular threat information includes operations performed by or at one or more of the following block(s).

At block 19.3601, the process performs directing the user to decelerate.

FIG. 19.37 is an example flow diagram of example logic illustrating an example embodiment of process 19.100 of FIG. 19.1. More particularly, FIG. 19.37 illustrates a process 19.3700 that includes the process 19.100, wherein the presenting the vehicular threat information includes operations performed by or at one or more of the following block(s).

At block 19.3701, the process performs directing the user to turn.

FIG. 19.38 is an example flow diagram of example logic illustrating an example embodiment of process 19.100 of FIG. 19.1. More particularly, FIG. 19.38 illustrates a process 19.3800 that includes the process 19.100, and which further includes operations performed by or at the following block(s).

At block 19.3801, the process performs transmitting to the first vehicle a warning based on the vehicular threat information. The process may send or otherwise transmit a warning or other message to the first vehicle that instructs the operator of the first vehicle to take evasive action. The instruction to the first vehicle may be complimentary to any instructions given to the user, such that if both instructions are followed, the risk of collision decreases. In this manner, the process may help avoid a situation in which the user and the operator of the first vehicle take actions that actually increase the risk of collision, such as may occur when the user and the first vehicle are approaching head but do not turn away from one another.

FIG. 19.39 is an example flow diagram of example logic illustrating an example embodiment of process 19.100 of FIG. 19.1. More particularly, FIG. 19.39 illustrates a process 19.3900 that includes the process 19.100, and which further includes operations performed by or at the following block(s).

At block 19.3901, the process performs presenting the vehicular threat information via an output device of a vehicle of the user, the output device including a visual display and/or an audio speaker. In some embodiments, the process may use other devices to output the vehicular threat information, such as output devices of a vehicle of the user, including a car stereo, dashboard display, or the like.

FIG. 19.40 is an example flow diagram of example logic illustrating an example embodiment of process 19.100 of FIG. 19.1. More particularly, FIG. 19.40 illustrates a process 19.4000 that includes the process 19.100, wherein the wearable device is a helmet worn by the user. Various types of helmets are contemplated, including motorcycle helmets, bicycle helmets, and the like.

FIG. 19.41 is an example flow diagram of example logic illustrating an example embodiment of process 19.100 of FIG. 19.1. More particularly, FIG. 19.41 illustrates a process 19.4100 that includes the process 19.100, wherein the wearable device is goggles worn by the user.

FIG. 19.42 is an example flow diagram of example logic illustrating an example embodiment of process 19.100 of FIG. 19.1. More particularly, FIG. 19.42 illustrates a process 19.4200 that includes the process 19.100, wherein the wearable device is eyeglasses worn by the user.

FIG. 19.43 is an example flow diagram of example logic illustrating an example embodiment of process 19.100 of FIG. 19.1. More particularly, FIG. 19.43 illustrates a process 19.4300 that includes the process 19.100, wherein the presenting the vehicular threat information includes operations performed by or at one or more of the following block(s).

At block 19.4301, the process performs presenting the vehicular threat information via goggles worn by the user. The goggles may include a small display, an audio speaker, or haptic output device, or the like.

FIG. 19.44 is an example flow diagram of example logic illustrating an example embodiment of process 19.100 of FIG. 19.1. More particularly, FIG. 19.44 illustrates a process 19.4400 that includes the process 19.100, wherein the presenting the vehicular threat information includes operations performed by or at one or more of the following block(s).

At block 19.4401, the process performs presenting the vehicular threat information via a helmet worn by the user. The helmet may include an audio speaker or visual output device, such as a display that presents information on the inside of the face screen of the helmet. Other output devices, including haptic devices, are contemplated.

FIG. 19.45 is an example flow diagram of example logic illustrating an example embodiment of process 19.100 of FIG. 19.1. More particularly, FIG. 19.45 illustrates a process 19.4500 that includes the process 19.100, wherein the presenting the vehicular threat information includes operations performed by or at one or more of the following block(s).

At block 19.4501, the process performs presenting the vehicular threat information via a hat worn by the user. The hat may include an audio speaker or similar output device.

FIG. 19.46 is an example flow diagram of example logic illustrating an example embodiment of process 19.100 of FIG. 19.1. More particularly, FIG. 19.46 illustrates a process 19.4600 that includes the process 19.100, wherein the presenting the vehicular threat information includes operations performed by or at one or more of the following block(s).

At block 19.4601, the process performs presenting the vehicular threat information via eyeglasses worn by the user. The eyeglasses may include a small display, an audio speaker, or haptic output device, or the like.

FIG. 19.47 is an example flow diagram of example logic illustrating an example embodiment of process 19.100 of FIG. 19.1. More particularly, FIG. 19.47 illustrates a process 19.4700 that includes the process 19.100, wherein the presenting the vehicular threat information includes operations performed by or at one or more of the following block(s).

At block 19.4701, the process performs presenting the vehicular threat information via audio speakers that are part of at least one of earphones, a headset, earbuds, and/or a hearing aid. The audio speakers may be integrated into the wearable device. In other embodiments, other audio speakers (e.g., of a car stereo) may be employed instead or in addition.

FIG. 19.48 is an example flow diagram of example logic illustrating an example embodiment of process 19.100 of FIG. 19.1. More particularly, FIG. 19.48 illustrates a process 19.4800 that includes the process 19.100, and which further includes operations performed by or at the following block(s).

At block 19.4801, the process performs performing the receiving data representing an audio signal, the determining vehicular threat information, and/or the presenting the vehicular threat information on a computing device in the wearable device of the user. In some embodiments, a computing device of or in the wearable device may be responsible for performing one or more of the operations of the process. For example, a computing device situated within a helmet worn by the user may receive and analyze audio data to determine and present the vehicular threat information to the user.

FIG. 19.49 is an example flow diagram of example logic illustrating an example embodiment of process 19.100 of FIG. 19.1. More particularly, FIG. 19.49 illustrates a process 19.4900 that includes the process 19.100, and which further includes operations performed by or at the following block(s).

At block 19.4901, the process performs performing the receiving data representing an audio signal, the determining vehicular threat information, and/or the presenting the vehicular threat information on a road-side computing system. In some embodiments, an in-situ computing system may be responsible for performing one or more of the operations of the process. For example, a computing system situated at or about a street intersection may receive and analyze audio signals of vehicles that are entering or nearing the intersection. Such an architecture may be beneficial when the wearable device is a "thin" device that does not have sufficient processing power to, for example, determine whether the first vehicle is approaching the user.

At block 19.4902, the process performs transmitting the vehicular threat information from the road-side computing system to the wearable device of the user. For example, when the road-side computing system determines that two vehicles may be on a collision course, the computing system can transmit vehicular threat information to the wearable device so that the user can take evasive action and avoid a possible accident.

FIG. 19.50 is an example flow diagram of example logic illustrating an example embodiment of process 19.100 of FIG. 19.1. More particularly, FIG. 19.50 illustrates a process 19.5000 that includes the process 19.100, and which further includes operations performed by or at the following block(s).

At block 19.5001, the process performs performing the receiving data representing an audio signal, the determining vehicular threat information, and/or the presenting the vehicular threat information on a computing system in the first vehicle. In some embodiments, a computing system in the first vehicle performs one or more of the operations of the process. Such an architecture may be beneficial when the wearable device is a "thin" device that does not have sufficient processing power to, for example, determine whether the first vehicle is approaching the user.

At block 19.5002, the process performs transmitting the vehicular threat information from the computing system to the wearable device of the user.

FIG. 19.51 is an example flow diagram of example logic illustrating an example embodiment of process 19.100 of FIG. 19.1. More particularly, FIG. 19.51 illustrates a process 19.5100 that includes the process 19.100, and which further includes operations performed by or at the following block(s).

At block 19.5101, the process performs performing the receiving data representing an audio signal, the determining vehicular threat information, and/or the presenting the vehicular threat information on a computing system in a second vehicle, wherein the user is not traveling in the second vehicle. In some embodiments, other vehicles that are not carrying the user and are not the same as the first user may perform one or more of the operations of the process. In general, computing systems/devices situated in or at multiple vehicles, wearable devices, or fixed stations in a roadway may each perform operations related to determining vehicular threat information, which may then be shared with other users and devices to improve traffic flow, avoid collisions, and generally enhance the abilities of users of the roadway.

At block 19.5102, the process performs transmitting the vehicular threat information from the computing system to the wearable device of the user.

FIG. 19.52 is an example flow diagram of example logic illustrating an example embodiment of process 19.100 of FIG. 19.1. More particularly, FIG. 19.52 illustrates a process

19.5200 that includes the process 19.100, and which further includes operations performed by or at the following block(s).

At block 19.5201, the process performs receiving data representing a visual signal that represents the first vehicle. In some embodiments, the process may also consider video data, such as by performing image processing to identify vehicles or other hazards, to determine whether collisions may occur, and the like. The video data may be obtained from various sources, including the wearable device, a vehicle, a road-side camera, or the like.

At block 19.5202, the process performs determining the vehicular threat information based further on the data representing the visual signal. For example, the process may determine that a car is approaching by analyzing an image taken from a camera that is part of the wearable device.

FIG. 19.53 is an example flow diagram of example logic illustrating an example embodiment of process 19.5200 of FIG. 19.52. More particularly, FIG. 19.53 illustrates a process 19.5300 that includes the process 19.5200, wherein the receiving data representing a visual signal includes operations performed by or at one or more of the following block(s).

At block 19.5301, the process performs receiving an image of the first vehicle obtained by a camera of a vehicle operated by the user. The user's vehicle may include one or more cameras that may capture views to the front, sides, and/or rear of the vehicle, and provide these images to the process for image processing or other analysis.

FIG. 19.54 is an example flow diagram of example logic illustrating an example embodiment of process 19.5200 of FIG. 19.52. More particularly, FIG. 19.54 illustrates a process 19.5400 that includes the process 19.5200, wherein the receiving data representing a visual signal includes operations performed by or at one or more of the following block(s).

At block 19.5401, the process performs receiving an image of the first vehicle obtained by a camera of the wearable device. For example, where the wearable device is a helmet, the helmet may include one or more helmet cameras that may capture views to the front, sides, and/or rear of the helmet.

FIG. 19.55 is an example flow diagram of example logic illustrating an example embodiment of process 19.5200 of FIG. 19.52. More particularly, FIG. 19.55 illustrates a process 19.5500 that includes the process 19.5200, wherein the determining the vehicular threat information based further on the data representing the visual signal includes operations performed by or at one or more of the following block(s).

At block 19.5501, the process performs identifying the first vehicle in an image represented by the data representing a visual signal. Image processing techniques may be employed to identify the presence of a vehicle, its type (e.g., car or truck), its size, or other information.

FIG. 19.56 is an example flow diagram of example logic illustrating an example embodiment of process 19.5200 of FIG. 19.52. More particularly, FIG. 19.56 illustrates a process 19.5600 that includes the process 19.5200, wherein the determining the vehicular threat information based further on the data representing the visual signal includes operations performed by or at one or more of the following block(s).

At block 19.5601, the process performs determining whether the first vehicle is moving towards the user based on multiple images represented by the data representing the visual signal. In some embodiments, a video feed or other sequence of images may be analyzed to determine the relative motion of the first vehicle. For example, if the first vehicle appears to be becoming larger over a sequence of images, then it is likely that the first vehicle is moving towards the user.

FIG. 19.57 is an example flow diagram of example logic illustrating an example embodiment of process 19.100 of FIG. 19.1. More particularly, FIG. 19.57 illustrates a process 19.5700 that includes the process 19.100, and which further includes operations performed by or at the following block(s).

At block 19.5701, the process performs receiving data representing the first vehicle obtained at a road-based device. In some embodiments, the process may also consider data received from devices that are located in or about the roadway traveled by the user. Such devices may include cameras, loop coils, motion sensors, and the like.

At block 19.5702, the process performs determining the vehicular threat information based further on the data representing the first vehicle. For example, the process may determine that a car is approaching the user by analyzing an image taken from a camera that is mounted on or near a traffic signal over an intersection.

FIG. 19.58 is an example flow diagram of example logic illustrating an example embodiment of process 19.5700 of FIG. 19.57. More particularly, FIG. 19.58 illustrates a process 19.5800 that includes the process 19.5700, wherein the receiving data representing the first vehicle obtained at a road-based device includes operations performed by or at one or more of the following block(s).

At block 19.5801, the process performs receiving the data from a sensor deployed at an intersection. Various types of sensors are contemplated, including cameras, range sensors (e.g., sonar, LIDAR, IR-based), magnetic coils, audio sensors, or the like.

FIG. 19.59 is an example flow diagram of example logic illustrating an example embodiment of process 19.5700 of FIG. 19.57. More particularly, FIG. 19.59 illustrates a process 19.5900 that includes the process 19.5700, wherein the receiving data representing the first vehicle obtained at a road-based device includes operations performed by or at one or more of the following block(s).

At block 19.5901, the process performs receiving an image of the first vehicle from a camera deployed at an intersection. For example, the process may receive images from a camera that is fixed to a traffic light or other signal at an intersection.

FIG. 19.60 is an example flow diagram of example logic illustrating an example embodiment of process 19.5700 of FIG. 19.57. More particularly, FIG. 19.60 illustrates a process 19.6000 that includes the process 19.5700, wherein the receiving data representing the first vehicle obtained at a road-based device includes operations performed by or at one or more of the following block(s).

At block 19.6001, the process performs receiving ranging data from a range sensor deployed at an intersection, the ranging data representing a distance between the first vehicle and the intersection. For example, the process may receive a distance (e.g., 75 meters) measured between some known point in the intersection (e.g., the position of the range sensor) and an oncoming vehicle.

FIG. 19.61 is an example flow diagram of example logic illustrating an example embodiment of process 19.5700 of FIG. 19.57. More particularly, FIG. 19.61 illustrates a process 19.6100 that includes the process 19.5700, wherein the receiving data representing the first vehicle obtained at a road-based device includes operations performed by or at one or more of the following block(s).

At block 19.6101, the process performs receiving data from an induction loop deployed in a road surface, the induction loop configured to detect the presence and/or velocity of the first vehicle. Induction loops may be embedded in the roadway and configured to detect the presence of vehicles passing over them. Some types of loops and/or processing may be employed to detect other information, including velocity, vehicle size, and the like.

FIG. 19.62 is an example flow diagram of example logic illustrating an example embodiment of process 19.5700 of FIG. 19.57. More particularly, FIG. 19.62 illustrates a process 19.6200 that includes the process 19.5700, wherein the determining the vehicular threat information based further on the data representing the first vehicle includes operations performed by or at one or more of the following block(s).

At block 19.6201, the process performs identifying the first vehicle in an image obtained from the road-based sensor. Image processing techniques may be employed to identify the presence of a vehicle, its type (e.g., car or truck), its size, or other information.

FIG. 19.63 is an example flow diagram of example logic illustrating an example embodiment of process 19.5700 of FIG. 19.57. More particularly, FIG. 19.63 illustrates a process 19.6300 that includes the process 19.5700, wherein the determining the vehicular threat information based further on the data representing the first vehicle includes operations performed by or at one or more of the following block(s).

At block 19.6301, the process performs determining a trajectory of the first vehicle based on multiple images obtained from the road-based device. In some embodiments, a video feed or other sequence of images may be analyzed to determine the position, speed, and/or direction of travel of the first vehicle.

FIG. 19.64 is an example flow diagram of example logic illustrating an example embodiment of process 19.100 of FIG. 19.1. More particularly, FIG. 19.64 illustrates a process 19.6400 that includes the process 19.100, and which further includes operations performed by or at the following block(s).

At block 19.6401, the process performs receiving data representing vehicular threat information relevant to a second vehicle, the second vehicle not being used for travel by user. As noted, vehicular threat information may in some embodiments be shared amongst vehicles and entities present in a roadway. For example, a vehicle that is traveling just ahead of the user may determine that it is threatened by the first vehicle. This information may be shared with the user so that the user can also take evasive action, such as by slowing down or changing course.

At block 19.6402, the process performs determining the vehicular threat information based on the data representing vehicular threat information relevant to the second vehicle. Having received vehicular threat information from the second vehicle, the process may determine that it is also relevant to the user, and then accordingly present it to the user.

FIG. 19.65 is an example flow diagram of example logic illustrating an example embodiment of process 19.6400 of FIG. 19.64. More particularly, FIG. 19.65 illustrates a process 19.6500 that includes the process 19.6400, wherein the receiving data representing vehicular threat information relevant to a second vehicle includes operations performed by or at one or more of the following block(s).

At block 19.6501, the process performs receiving from the second vehicle an indication of stalled or slow traffic encountered by the second vehicle. Various types of threat information relevant to the second vehicle may be provided to the process, such as that there is stalled or slow traffic ahead of the second vehicle.

FIG. 19.66 is an example flow diagram of example logic illustrating an example embodiment of process 19.6400 of FIG. 19.64. More particularly, FIG. 19.66 illustrates a process 19.6600 that includes the process 19.6400, wherein the receiving data representing vehicular threat information relevant to a second vehicle includes operations performed by or at one or more of the following block(s).

At block 19.6601, the process performs receiving from the second vehicle an indication of poor driving conditions experienced by the second vehicle. The second vehicle may share the fact that it is experiencing poor driving conditions, such as an icy or wet roadway.

FIG. 19.67 is an example flow diagram of example logic illustrating an example embodiment of process 19.6400 of FIG. 19.64. More particularly, FIG. 19.67 illustrates a process 19.6700 that includes the process 19.6400, wherein the receiving data representing vehicular threat information relevant to a second vehicle includes operations performed by or at one or more of the following block(s).

At block 19.6701, the process performs receiving from the second vehicle an indication that the first vehicle is driving erratically. The second vehicle may share a determination that the first vehicle is driving erratically, such as by swerving, driving with excessive speed, driving too slow, or the like.

FIG. 19.68 is an example flow diagram of example logic illustrating an example embodiment of process 19.6400 of FIG. 19.64. More particularly, FIG. 19.68 illustrates a process 19.6800 that includes the process 19.6400, wherein the receiving data representing vehicular threat information relevant to a second vehicle includes operations performed by or at one or more of the following block(s).

At block 19.6801, the process performs receiving from the second vehicle an image of the first vehicle. The second vehicle may include one or more cameras, and may share images obtained via those cameras with other entities.

FIG. 19.69 is an example flow diagram of example logic illustrating an example embodiment of process 19.100 of FIG. 19.1. More particularly, FIG. 19.69 illustrates a process 19.6900 that includes the process 19.100, and which further includes operations performed by or at the following block(s).

At block 19.6901, the process performs transmitting the vehicular threat information to a second vehicle. As noted, vehicular threat information may in some embodiments be shared amongst vehicles and entities present in a roadway. In this example, the vehicular threat information is transmitted to a second vehicle (e.g., one following behind the user), so that the second vehicle may benefit from the determined vehicular threat information as well.

FIG. 19.70 is an example flow diagram of example logic illustrating an example embodiment of process 19.6900 of FIG. 19.69. More particularly, FIG. 19.70 illustrates a process 19.7000 that includes the process 19.6900, wherein the transmitting the vehicular threat information to a second vehicle includes operations performed by or at one or more of the following block(s).

At block 19.7001, the process performs transmitting the vehicular threat information to an intermediary server system for distribution to other vehicles in proximity to the user. In some embodiments, intermediary systems may operate as relays for sharing the vehicular threat information with other vehicles and users of a roadway.

C. Example Computing System Implementation

Figure 20:
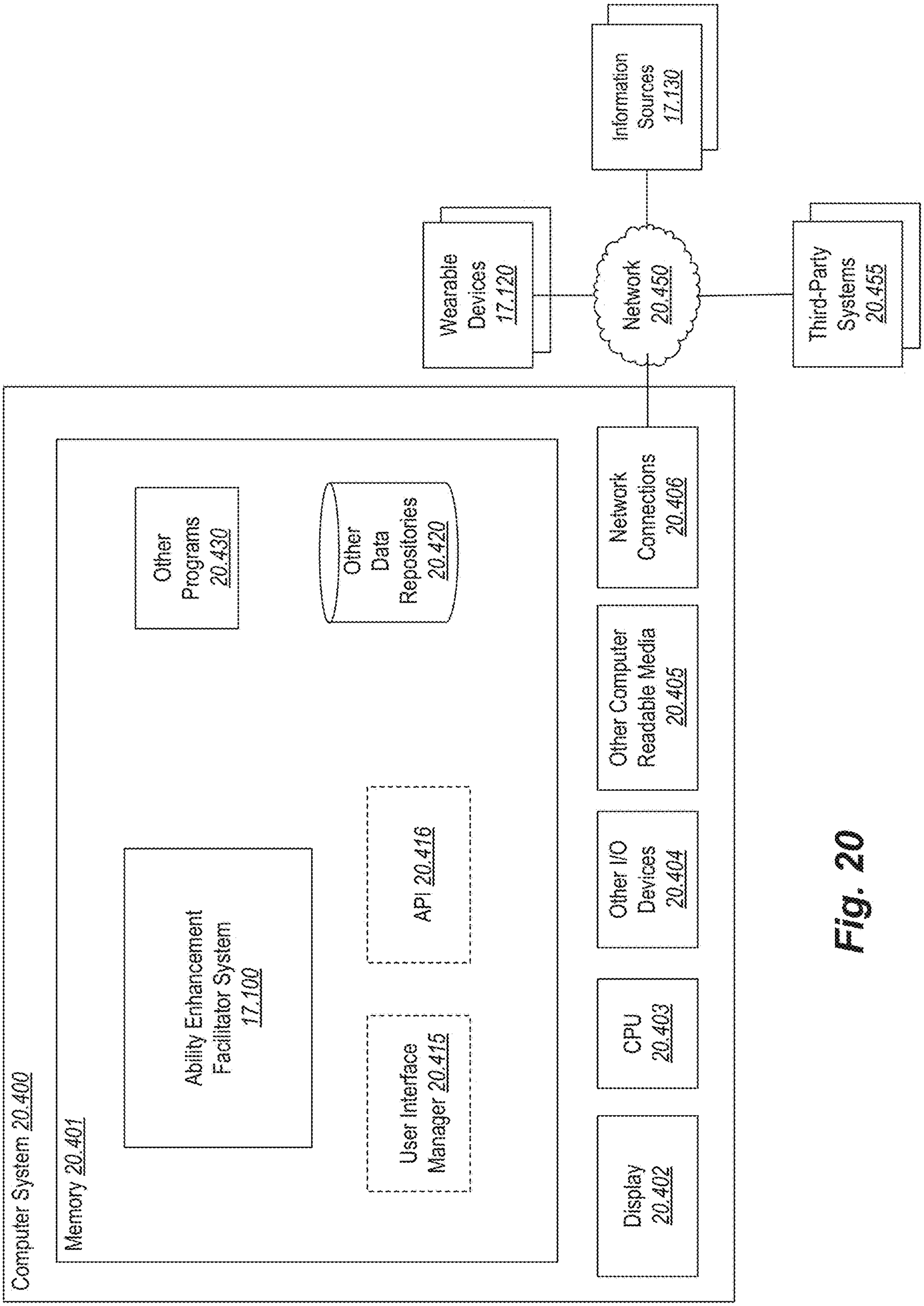
FIG. 20 is an example block diagram of an example computing system for implementing an ability enhancement facilitator system according to an example embodiment.

FIG. 20 is an example block diagram of an example computing system for implementing an ability enhancement facilitator system according to an example embodiment. In particular, FIG. 20 shows a computing system 20.400 that may be utilized to implement an AEFS 17.100.

Note that one or more general purpose or special purpose computing systems/devices may be used to implement the AEFS 17.100. In addition, the computing system 20.400 may comprise one or more distinct computing systems/devices and may span distributed locations. Furthermore, each block shown may represent one or more such blocks as appropriate to a specific embodiment or may be combined with other blocks. Also, the AEFS 17.100 may be implemented in software, hardware, firmware, or in some combination to achieve the capabilities described herein.

In the embodiment shown, computing system 20.400 comprises a computer memory ("memory") 20.401, a display 20.402, one or more Central Processing Units ("CPU") 20.403, Input/Output devices 20.404 (e.g., keyboard, mouse, CRT or LCD display, and the like), other computer-readable media 20.405, and network connections 20.406. The AEFS 17.100 is shown residing in memory 20.401. In other embodiments, some portion of the contents, some or all of the components of the AEFS 17.100 may be stored on and/or transmitted over the other computer-readable media 20.405. The components of the AEFS 17.100 preferably execute on one or more CPUs 20.403 and implement techniques described herein. Other code or programs 20.430 (e.g., an administrative interface, a Web server, and the like) and potentially other data repositories, such as data repository 20.420, also reside in the memory 20.401, and preferably execute on one or more CPUs 20.403. Of note, one or more of the components in FIG. 20 may not be present in any specific implementation. For example, some embodiments may not provide other computer readable media 20.405 or a display 20.402.

The AEFS 17.100 interacts via the network 20.450 with wearable devices 17.120, information sources 17.130, and third-party systems/applications 20.455. The network 20.450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 20.455 may include any systems that provide data to, or utilize data from, the AEFS 17.100, including Web browsers, vehicle-based client systems, traffic tracking, monitoring, or prediction systems, and the like.

The AEFS 17.100 is shown executing in the memory 20.401 of the computing system 20.400. Also included in the memory are a user interface manager 20.415 and an application program interface ("API") 20.416. The user interface manager 20.415 and the API 20.416 are drawn in dashed lines to indicate that in other embodiments, functions performed by one or more of these components may be performed externally to the AEFS 17.100.

The UI manager 20.415 provides a view and a controller that facilitate user interaction with the AEFS 17.100 and its various components. For example, the UI manager 20.415 may provide interactive access to the AEFS 17.100, such that users can configure the operation of the AEFS 17.100, such as by providing the AEFS 17.100 with information about common routes traveled, vehicle types used, driving patterns, or the like. The UI manager 20.415 may also manage and/or implement various output abstractions, such that the AEFS 17.100 can cause vehicular threat information to be displayed on different media, devices, or systems. In some embodiments, access to the functionality of the UI manager 20.415 may be provided via a Web server, possibly executing as one of the other programs 20.430. In such embodiments, a user operating a Web browser executing on one of the third-party systems 20.455 can interact with the AEFS 17.100 via the UI manager 20.415.

The API 20.416 provides programmatic access to one or more functions of the AEFS 17.100. For example, the API 20.416 may provide a programmatic interface to one or more functions of the AEFS 17.100 that may be invoked by one of the other programs 20.430 or some other module. In this manner, the API 20.416 facilitates the development of third-party software, such as user interfaces, plug-ins, adapters (e.g., for integrating functions of the AEFS 17.100 into vehicle-based client systems or devices), and the like.

In addition, the API 20.416 may be in at least some embodiments invoked or otherwise accessed via remote entities, such as code executing on one of the wearable devices 17.120, information sources 17.130, and/or one of the third-party systems/applications 20.455, to access various functions of the AEFS 17.100. For example, an information source 17.130 such as a radar gun installed at an intersection may push kinematic information (e.g., velocity) about vehicles to the AEFS 17.100 via the API 20.416. As another example, a weather information system may push current conditions information (e.g., temperature, precipitation) to the AEFS 17.100 via the API 20.416. The API 20.416 may also be configured to provide management widgets (e.g., code modules) that can be integrated into the third-party applications 20.455 and that are configured to interact with the AEFS 17.100 to make at least some of the described functionality available within the context of other applications (e.g., mobile apps).

In an example embodiment, components/modules of the AEFS 17.100 are implemented using standard programming techniques. For example, the AEFS 17.100 may be implemented as a "native" executable running on the CPU 20.403, along with one or more static or dynamic libraries. In other embodiments, the AEFS 17.100 may be implemented as instructions processed by a virtual machine that executes as one of the other programs 20.430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 17.100, such as in the data store 20.420 (or 18.240), can be available by standard mechanisms such as through C, C++, C #, and Java APIs; libraries for accessing files, databases, or other data repositories; through scripting languages such as XML; or through Web servers, FTP servers, or other types of servers providing access to stored data. The data store 20.420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 17.100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

VI. Enhanced Voice Conferencing with History

Embodiments described herein provide enhanced computer- and network-based methods and systems for enhanced voice conferencing and, more particularly, for recording and presenting voice conference history information based on speaker-related information determined from speaker utterances and/or other sources. Example embodiments provide an Ability Enhancement Facilitator System ("AEFS"). The AEFS may augment, enhance, or improve the senses (e.g., hearing), faculties (e.g., memory, language comprehension), and/or other abilities of a user, such as by recording and presenting voice conference history based on speaker-related information related to participants in a voice conference (e.g., conference call, face-to-face meeting). For example, when multiple speakers engage in a voice conference (e.g., a telephone conference), the AEFS may "listen" to the voice conference in order to determine speaker-related information, such as identifying information (e.g., name, title) about the current speaker (or some other speaker) and/or events/communications relating to the current speaker and/or to the subject matter of the conference call generally. Then, the AEFS may record voice conference history information based on the determined speaker-related information. The recorded conference history information may include transcriptions of utterances made by users, indications of topics discussed during the voice conference, information items (e.g., email messages, calendar events, documents) related to the voice conference, or the like. Next, the AEFS may inform a user (typically one of the participants in the voice conference) of the recorded conference history information, such as by presenting the information via a conferencing device (e.g., smart phone, laptop, desktop telephone) associated with the user. The user can then receive the information (e.g., by reading or hearing it via the conferencing device) provided by the AEFS and advantageously use that information to avoid embarrassment (e.g., due to having joined the voice conference late and thus having missed some of its contents), engage in a more productive conversation (e.g., by quickly accessing information about events, deadlines, or communications discussed during the voice conference), or the like.

In some embodiments, the AEFS is configured to receive data that represents speech signals from a voice conference amongst multiple speakers. The multiple speakers may be remotely located from one another, such as by being in different rooms within a building, by being in different buildings within a site or campus, by being in different cities, or the like. Typically, the multiple speakers are each using a conferencing device, such as a land-line telephone, cell phone, smart phone, computer, or the like, to communicate with one another. In some cases, such as when the multiple speakers are together in one room, the speakers may not be using a conferencing device to communicate with one another, but at least one of the speakers may have a conferencing device (e.g., a smart phone or personal media player/device that records conference history information as described.

The AEFS may obtain the data that represents the speech signals from one or more of the conferencing devices and/or from some intermediary point, such as a conference call facility, chat system, videoconferencing system, PBX, or the like. The AEFS may then determine voice conference-related information, including speaker-related information associated with the one or more of the speakers. Determining speaker-related information may include identifying the speaker based at least in part on the received data, such as by performing speaker recognition and/or speech recognition with the received data. Determining speaker-related information may also or instead include determining an identifier (e.g., name or title) of the speaker, content of the speaker's utterance, an information item (e.g., a document, event, communication) that references the speaker, or the like. Next, the AEFS records conference history information based on the determined speaker-related information. In some embodiments, recording conference history information may include generating a timeline, log, history, or other structure that associates speaker-related information with a timestamp or other time indicator. Then, the AEFS may inform a user of the conference history information by, for example, visually presenting the conference history information via a display screen of a conferencing device associated with the user. In other embodiments, some other display may be used, such as a screen on a laptop computer that is being used by the user while the user is engaged in the voice conference via a telephone. In some embodiments, the AEFS may inform the user in an audible manner, such as by "speaking" the conference-history information via an audio speaker of the conferencing device.

In some embodiments, the AEFS may perform other services, including translating utterances made by speakers in a voice conference, so that a multi-lingual voice conference may be facilitated even when some speakers do not understand the language used by other speakers. In such cases, the determined speaker-related information may be used to enhance or augment language translation and/or related processes, including speech recognition, natural language processing, and the like. In addition, the conference history information may be recorded in one or more languages, so that it can be presented in a native language of each of one or more users.

A. Ability Enhancement Facilitator System Overview

Figure 21A:
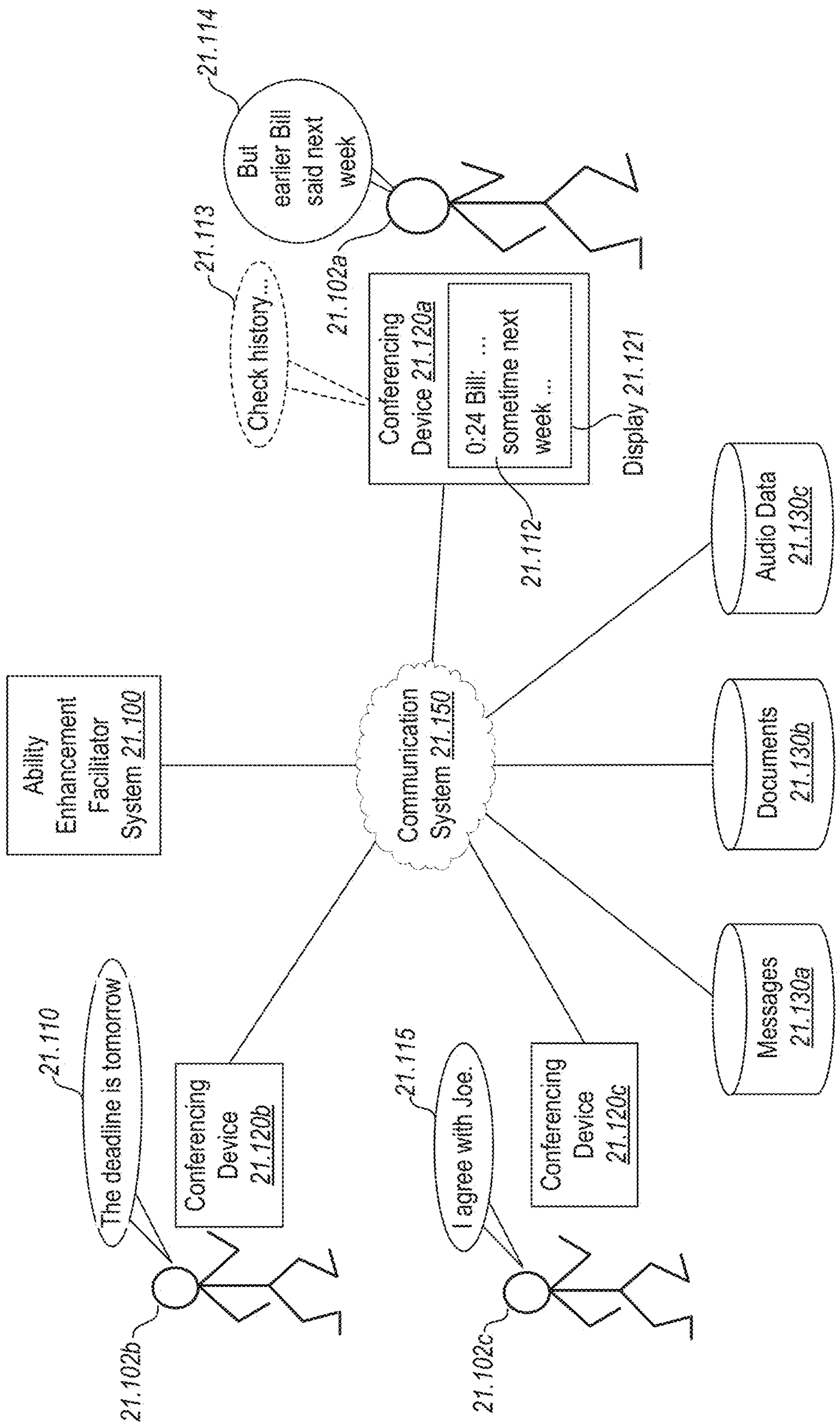
FIG. 21A is an example block diagram of an ability enhancement facilitator system according to an example embodiment.

FIG. 21A is an example block diagram of an ability enhancement facilitator system according to an example embodiment. In particular, FIG. 21A shows multiple speakers 21.102*a*-21.102*c* (collectively also referred to as "participants") engaging in a voice conference with one another. In particular, a first speaker 21.102*a* (who may also be referred to as a "user" or a "participant") is engaging in a voice conference with speakers 21.102*b* and 21.102*c*. Abilities of the speaker 21.102*a* are being enhanced, via a conferencing device 21.120*a*, by an Ability Enhancement Facilitator System ("AEFS") 21.100. The conferencing device 21.120*a* includes a display 21.121 that is configured to present text and/or graphics. The conferencing device 21.120*a* also includes an audio speaker (not shown) that is configured to present audio output. Speakers 21.102*b* and 21.102*c* are each respectively using a conferencing device 21.120*b* and 21.120*c* to engage in the voice conference with each other and speaker 21.102*a* via a communication system 21.150.

The AEFS 21.100 and the conferencing devices 21.120 are communicatively coupled to one another via the communication system 21.150. The AEFS 21.100 is also communicatively coupled to speaker-related information sources 21.130, including messages 21.130*a*, documents 21.130*b*, and audio data 21.130*c*. The AEFS 21.100 uses the information in the information sources 21.130, in conjunction with data received from the conferencing devices 21.120, to determine information related to the voice conference, including speaker-related information associated with the speakers 21.102.

In the scenario illustrated in FIG. 21A, the voice conference among the participants 21.102 is under way. For this example, the participants 21.102 in the voice conference are attempting to determine the date of a particular deadline for a project. The speaker 21.102*b* asserts that the deadline is tomorrow, and has made an utterance 21.110 by speaking the words "The deadline is tomorrow." However, this assertion is counter to a statement that the speaker 21.102*b* made earlier in the voice conference. The speaker 21.102*a* may have a notion or belief that the speaker 21.102*b* is contradicting himself, but may not be able to support such an assertion without additional evidence or information. Alternatively, the speaker 21.102*a* may have joined the voice conference once it was already in progress, and thus have missed the portion of the voice conference when the deadline was initially discussed. As will be discussed further below, the AEFS 21.100 will inform the speaker 21.102*a* of the relevant voice conference history information, such that the speaker 21.102*a* can request that the speaker 21.102*b* be held to his earlier statement setting the deadline next week rather than tomorrow.

The AEFS 21.100 receives data representing a speech signal that represents the utterance 21.110, such as by receiving a digital representation of an audio signal transmitted by conferencing device 21.120*b*. The data representing the speech signal may include audio samples (e.g., raw audio data), compressed audio data, speech vectors (e.g., mel frequency cepstral coefficients), and/or any other data that may be used to represent an audio signal. The AEFS 21.100 may receive the data in various ways, including from one or more of the conferencing devices or from some intermediate system (e.g., a voice conferencing system that is facilitating the conference between the conferencing devices 21.120).

The AEFS 21.100 then determines speaker-related information associated with the speaker 21.102*b*. Determining speaker-related information may include identifying the speaker 21.102*b* based on the received data representing the speech signal. In some embodiments, identifying the speaker may include performing speaker recognition, such as by generating a "voice print" from the received data and comparing the generated voice print to previously obtained voice prints. For example, the generated voice print may be compared to multiple voice prints that are stored as audio data 21.130*c* and that each correspond to a speaker, in order to determine a speaker who has a voice that most closely matches the voice of the speaker 21.102*b*. The voice prints stored as audio data 21.130*c* may be generated based on various sources of data, including data corresponding to speakers previously identified by the AEFS 21.100, voice mail messages, speaker enrollment data, or the like.

In some embodiments, identifying the speaker 21.102*b* may include performing speech recognition, such as by automatically converting the received data representing the speech signal into text. The text of the speaker's utterance may then be used to identify the speaker 21.102*b*. In particular, the text may identify one or more entities such as information items (e.g., communications, documents), events (e.g., meetings, deadlines), persons, or the like, that may be used by the AEFS 21.100 to identify the speaker 21.102*b*. The information items may be accessed with reference to the messages 21.130*a* and/or documents 21.130*b*. As one example, the speaker's utterance 21.110 may identify an email message that was sent to the speaker 21.102*b* and possibly others (e.g., "That sure was a nasty email Bob sent"). As another example, the speaker's utterance 21.110 may identify a meeting or other event to which the speaker 21.102*b* and possibly others are invited.

Note that in some cases, the text of the speaker's utterance 21.110 may not definitively identify the speaker 21.102*b*, such as because the speaker 21.102*b* has not previously met or communicated with other participants in the voice conference or because a communication was sent to recipients in addition to the speaker 21.102*b*. In such cases, there may be some ambiguity as to the identity of the speaker 21.102*b*. However, in such cases, a preliminary identification of multiple candidate speakers may still be used by the AEFS 21.100 to narrow the set of potential speakers, and may be combined with (or used to improve) other techniques, including speaker recognition, speech recognition, language translation, or the like. In addition, even if the speaker 21.102 is unknown to the user 21.102*a* the AEFS 21.100 may still determine useful demographic or other speaker-related information that may be fruitfully employed for speech recognition or other purposes.

Note also that speaker-related information need not definitively identify the speaker. In particular, it may also or instead be or include other information about or related to the speaker, such as demographic information including the gender of the speaker 21.102, his country or region of origin, the language(s) spoken by the speaker 21.102, or the like. Speaker-related information may include an organization that includes the speaker (along with possibly other persons, such as a company or firm), an information item that references the speaker (and possibly other persons), an event involving the speaker, or the like. The speaker-related information may generally be determined with reference to the messages 21.130*a*, documents 21.130*b*, and/or audio data 21.130*c*. For example, having determined the identity of the speaker 21.102, the AEFS 21.100 may search for emails and/or documents that are stored as messages 21.130*a* and/or documents 21.103*b* and that reference (e.g., are sent to, are authored by, are named in) the speaker 21.102.

Other types of speaker-related information is contemplated, including social networking information, such as personal or professional relationship graphs represented by a social networking service, messages or status updates sent within a social network, or the like. Social networking information may also be derived from other sources, including email lists, contact lists, communication patterns (e.g., frequent recipients of emails), or the like.

The AEFS 21.100 then determines and/or records (e.g., stores, saves) conference history information based on the determined speaker-related information. For example, the AEFS 21.100 may associate a timestamp with speaker-related information, such a transcription of an utterance (e.g., generated by a speech recognition process), an indication of an information item referenced by a speaker (e.g., a message, a document, a calendar event), topics discussed during the voice conference, or the like. The conference history information may be recorded locally to the AEFS 21.100, on conferencing devices 21.120, or other locations, such as cloud-based storage systems.

The AEFS 21.100 then informs the user (speaker 21.102*a*) of at least some of the conference history information. Informing the user may include audibly presenting the information to the user via an audio speaker of the conferencing device 21.120*a*. In this example, the conferencing device 21.120*a* tells the user 21.102*a*, such as by playing audio via an earpiece or in another manner that cannot be detected by the other participants in the voice conference, to check the conference history presented by conferencing device 21.120*a*. In particular, the conferencing device 21.120*a* plays audio that includes the utterance 21.113 "Check history" to the user. The AEFS 21.100 may cause the conferencing device 21.120*a* to play such a notification because, for example, it has automatically searched the conference history and determined that the topic of the deadline has been previously discussed during the voice conference.

Informing the user of the conference history information may also or instead include visually presenting the information, such as via the display 21.121 of the conferencing device 21.120*a*. In the illustrated example, the AEFS 21.100 causes a message 21.112 that includes a portion of a transcript of the voice conference to be displayed on the display 21.121. In this example, the displayed transcript includes a statement from Bill (speaker 21.102*b*) that sets the project deadline to next week, not tomorrow. Upon reading the message 21.112 and thereby learning of the previously established project deadline, the speaker 21.102*a* responds to the original utterance 21.110 of speaker 21.102*b* (Bill) with a response utterance 21.114 that includes the words "But earlier Bill said next week," referring to the earlier statement of speaker 21.102*b* that is counter to the deadline expressed by his current utterance 21.110. In the illustrated example, speaker 21.102*c*, upon hearing the utterance 21.114, responds with an utterance 21.115 that includes the words "I agree with Joe," indicating his agreement with speaker 21.102*a*.

As the speakers 21.102*a*-102*c* continue to engage in the voice conference, the AEFS 21.100 may monitor the conversation and continue to record and present conference history information based on speaker-related information at least for the speaker 21.102*a*. Another example function that may be performed by the AEFS 21.100 includes concurrently presenting speaker-related information as it is determined, such as by presenting, as each of the multiple speakers takes a turn speaking during the voice conference, information about the identity of the current speaker. For example, in response to the onset of an utterance of a speaker, the AEFS 21.100 may display the name of the speaker on the display 21.121, so that the user is always informed as to who is speaking.

The AEFS 21.100 may perform other services, including translating utterances made by speakers in the voice conference, so that a multi-lingual voice conference may be conducted even between participants who do not understand all of the languages being spoken. Translating utterances may initially include determining speaker-related information by automatically determining the language that is being used by a current speaker. Determining the language may be based on signal processing techniques that identify signal characteristics unique to particular languages. Determining the language may also or instead be performed by simultaneous or concurrent application of multiple speech recognizers that are each configured to recognize speech in a corresponding language, and then choosing the language corresponding to the recognizer that produces the result having the highest confidence level. Determining the language may also or instead be based on contextual factors, such as GPS information indicating that the current speaker is in Germany, Austria, or some other region where German is commonly spoken.

Having determined speaker-related information, the AEFS 21.100 may then translate an utterance in a first language into an utterance in a second language. In some embodiments, the AEFS 21.100 translates an utterance by first performing speech recognition to translate the utterance into a textual representation that includes a sequence of words in the first language. Then, the AEFS 21.100 may translate the text in the first language into a message in a second language, using machine translation techniques. Speech recognition and/or machine translation may be modified, enhanced, and/or otherwise adapted based on the speaker-related information. For example, a speech recognizer may use speech or language models tailored to the speaker's gender, accent/dialect (e.g., determined based on country/region of origin), social class, or the like. As another example, a lexicon that is specific to the speaker may be used during speech recognition and/or language translation. Such a lexicon may be determined based on prior communications of the speaker, profession of the speaker (e.g., engineer, attorney, doctor), or the like.

Once the AEFS 21.100 has translated an utterance in a first language into a message in a second language, the AEFS 21.100 can present the message in the second language. Various techniques are contemplated. In one approach, the AEFS 21.100 causes the conferencing device 21.120*a* (or some other device accessible to the user) to visually display the message on the display 21.121. In another approach, the AEFS 21.100 causes the conferencing device 21.120*a* (or some other device) to "speak" or "tell" the user/speaker 21.102*a* the message in the second language. Presenting a message in this manner may include converting a textual representation of the message into audio via text-to-speech processing (e.g., speech synthesis), and then presenting the audio via an audio speaker (e.g., earphone, earpiece, earbud) of the conferencing device 21.120*a*.

At least some of the techniques described above with respect to translation may be applied in the context of generating and recording conference history information. For example, speech recognition and natural language processing may be employed by the AEFS 21.100 to transcribe user utterances, determine topics of conversation, identify information items referenced by speakers, and the like.

Figure 21B:
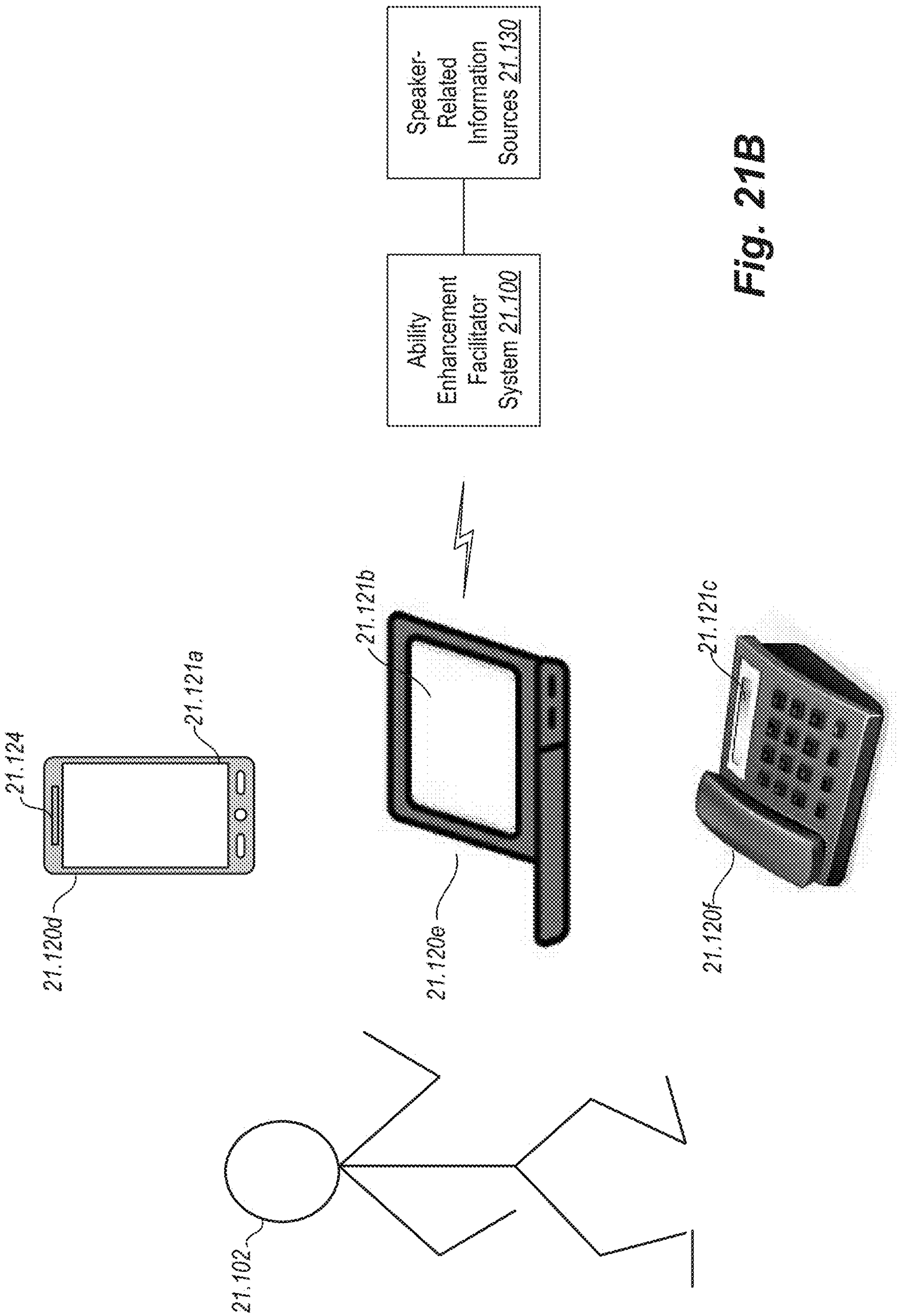
FIG. 21B is an example block diagram illustrating various conferencing devices according to example embodiments.

FIG. 21B is an example block diagram illustrating various conferencing devices according to example embodiments. In particular, FIG. 21B illustrates an AEFS 21.100 in communication with example conferencing devices 21.120*d*-120*f*. Conferencing device 21.120*d* is a smart phone that includes a display 21.121*a* and an audio speaker 21.124. Conferencing device 21.120*e* is a laptop computer that includes a display 21.121*b*. Conferencing device 21.120*f* is an office telephone that includes a display 21.121*c*. Each of the illustrated conferencing devices 21.120 includes or may be communicatively coupled to a microphone operable to receive a speech signal from a speaker. As described above, the conferencing device 21.120 may then convert the speech signal into data representing the speech signal, and then forward the data to the AEFS 21.100.

As an initial matter, note that the AEFS 21.100 may use output devices of a conferencing device or other devices to present information to a user, such as speaker-related information and/or conference history information that may generally assist the user in engaging in a voice conference with other participants. For example, the AEFS 21.100 may present speaker-related information about a current or previous speaker, such as his name, title, communications that reference or are related to the speaker, and the like.

For audio output, each of the illustrated conferencing devices 21.120 may include or be communicatively coupled to an audio speaker operable to generate and output audio signals that may be perceived by the user 21.102. As discussed above, the AEFS 21.100 may use such a speaker to provide speaker-related information and/or conference history information to the user 21.102. The AEFS 21.100 may also or instead audibly notify, via a speaker of a conferencing device 21.120, the user 21.102 to view information displayed on the conferencing device 21.120. For example, the AEFS 21.100 may cause a tone (e.g., beep, chime) to be played via the earpiece of the telephone 21.120*f*. Such a tone may then be recognized by the user 21.102, who will in response attend to information displayed on the display 21.121*c*. Such audible notification may be used to identify a display that is being used as a current display, such as when multiple displays are being used. For example, different first and second tones may be used to direct the user's attention to the smart phone display 21.121*a* and laptop display 21.121*b*, respectively. In some embodiments, audible notification may include playing synthesized speech (e.g., from text-to-speech processing) telling the user 21.102 to view speaker-related information and/or conference history information on a particular display device (e.g., "See email on your smart phone").

The AEFS 21.100 may generally cause information (e.g., speaker-related information, conference history information, translations) to be presented on various destination output devices. In some embodiments, the AEFS 21.100 may use a display of a conferencing device as a target for displaying information. For example, the AEFS 21.100 may display information on the display 21.121*a* of the smart phone 21.120*d*. On the other hand, when the conferencing device does not have its own display or if the display is not suitable for displaying the determined information, the AEFS 21.100 may display information on some other destination display that is accessible to the user 21.102. For example, when the telephone 21.120*f* is the conferencing device and the user also has the laptop computer 21.120*e* in his possession, the AEFS 21.100 may elect to display an email or other substantial document upon the display 21.121*b* of the laptop computer 21.120*e*. Thus, as a general matter, a conferencing device may be any device with which a person may participate in a voice conference, by speaking, listening, seeing, or other interaction modality.

The AEFS 21.100 may determine a destination output device for conference history information, speaker-related information, translations, or other information. In some embodiments, determining a destination output device may include selecting from one of multiple possible destination displays based on whether a display is capable of displaying all of the information. For example, if the environment is noisy, the AEFS may elect to visually display a transcription or a translation rather than play it through a speaker. As another example, if the user 21.102 is proximate to a first display that is capable of displaying only text and a second display capable of displaying graphics, the AEFS 21.100 may select the second display when the presented information includes graphics content (e.g., an image). In some embodiments, determining a destination display may include selecting from one of multiple possible destination displays based on the size of each display. For example, a small LCD display (such as may be found on a mobile phone or telephone 21.120*f*) may be suitable for displaying a message that is just a few characters (e.g., a name or greeting) but not be suitable for displaying longer message or large document. Note that the AEFS 21.100 may select among multiple potential target output devices even when the conferencing device itself includes its own display and/or speaker.

Determining a destination output device may be based on other or additional factors. In some embodiments, the AEFS 21.100 may use user preferences that have been inferred (e.g., based on current or prior interactions with the user 21.102) and/or explicitly provided by the user. For example, the AEFS 21.100 may determine to present a transcription, translation, an email, or other speaker-related information onto the display 21.121*a* of the smart phone 21.120*d* based on the fact that the user 21.102 is currently interacting with the smart phone 21.120*d*.

Note that although the AEFS 21.100 is shown as being separate from a conferencing device 21.120, some or all of the functions of the AEFS 21.100 may be performed within or by the conferencing device 21.120 itself. For example, the smart phone conferencing device 21.120*d* and/or the laptop computer conferencing device 21.120*e* may have sufficient processing power to perform all or some functions of the AEFS 21.100, including one or more of speaker identification, determining speaker-related information, speaker recognition, speech recognition, generating and recording conference history information, language translation, presenting information, or the like. In some embodiments, the conferencing device 21.120 includes logic to determine where to perform various processing tasks, so as to advantageously distribute processing between available resources, including that of the conferencing device 21.120, other nearby devices (e.g., a laptop or other computing device of the user 21.102), remote devices (e.g., "cloud-based" processing and/or storage), and the like.

Other types of conferencing devices and/or organizations are contemplated. In some embodiments, the conferencing device may be a "thin" device, in that it may serve primarily as an output device for the AEFS 21.100. For example, an analog telephone may still serve as a conferencing device, with the AEFS 21.100 presenting speaker or history information via the earpiece of the telephone. As another example, a conferencing device may be or be part of a desktop computer, PDA, tablet computer, or the like.

Figure 21C:
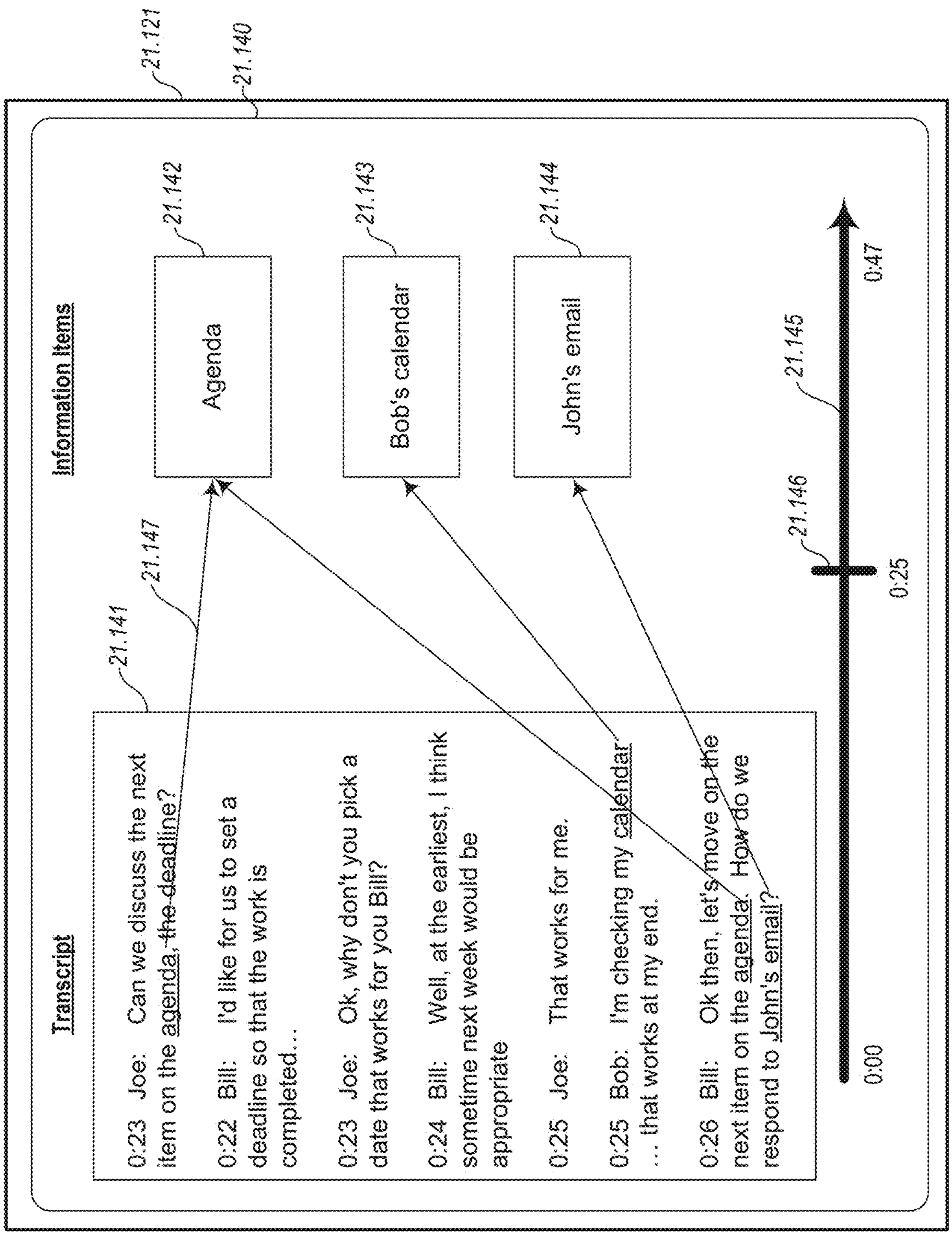
FIG. 21C is an example block diagram of an example user interface screen according to an example embodiment.

FIG. 21C is an example block diagram of an example user interface screen according to an example embodiment. In particular, FIG. 21C depicts a display 21.121 of a conferencing device or other computing device that is presenting a user interface 21.140 with which a user can interact to access (e.g., view, browse, read, skim) conference history information from a voice conference, such as the one described with respect to FIG. 21A.

The illustrated user interface 21.140 includes a transcript 21.141, information items 21.142-144, and a timeline control 21.145. The timeline control 21.145 includes a slider 21.146 that can be manipulated by the user (e.g., by dragging to the left or the right) to specify a time during the voice conference. In this example, the user has positioned the slider at 0:25, indicating a moment in time that is 25 minutes from the beginning of the voice conference.

In response to a time selection via the timeline control 21.145, the AEFS dynamically updates the information presented via the user interface 21.140. In this example, the transcript 21.141 is updated to present transcriptions of utterances from about the 25 minute mark of the voice conference. Each of the transcribed utterances includes a timestamp, a speaker identifier, and text. For example, the first displayed utterance was made at 23 minutes into the voice conference by speaker Joe and reads "Can we discuss the next item on the agenda, the deadline?" At 24 minutes into the voice conference, speaker Bill indicates that the deadline should be next week, stating "Well, at the earliest, I think sometime next week would be appropriate." At 25 minutes into the voice conference, speakers Joe and Bob agree by respectively uttering "That works for me" and "I'm checking my calendar . . . that works at my end."

The user interface 21.140 also presents information items that are related to the conference history information. In this example, the AEFS has identified and displayed three information items, including an agenda 21.142, a calendar 21.143, and an email 21.144. The user interface 21.140 may display the information items themselves (e.g., their content) and/or indications thereof (e.g., titles, icons, buttons) that may be used to access their contents. Each of the displayed information items was discussed or mentioned at or about the time specified via the timeline control 21.145. For example, at 23 and 26 minutes into the voice conference, speakers Joe and Bill each mentioned an "agenda." In the illustrated embodiment, the AEFS determines that the term "agenda" referred to a document, an indication of which is displayed as agenda 21.142. Note also that term "agenda" is highlighted in the transcript 21.141, such as via underlining. Note also that a link 21.147 is displayed that associates the term "agenda" in the transcript 21.141 with the agenda 21.142. As further examples, the terms "calendar" and "John's email" are respectively linked to the calendar 21.143 and the email 21.144.

Note that in some embodiments the time period within a conference history that is presented by the user interface 21.140 may be selected or updated automatically. For example, as a voice conference is in progress, the conference history will typically grow (as new items or transcriptions are added to the history). The user interface 21.140 may be configured to by default automatically display history information from a time window extending back a few minutes (e.g., one, two, five, ten) from the current time. In such situations, the user interface 21.140 may present a "rolling" display of the transcript 21.141 and associated information items.

As another example, when the AEFS identifies a topic of conversation, it may automatically update the user interface 21.140 to present conference history information relevant to that topic. For instance, in the example of FIG. 21A, the AEFS may determine that the speaker 21.102*b* (Bill) is referring to the deadline. In response, the AEFS may update the user interface 21.140 to present conference history information from any previous discussion(s) of that topic during the voice conference.

Figure 22:
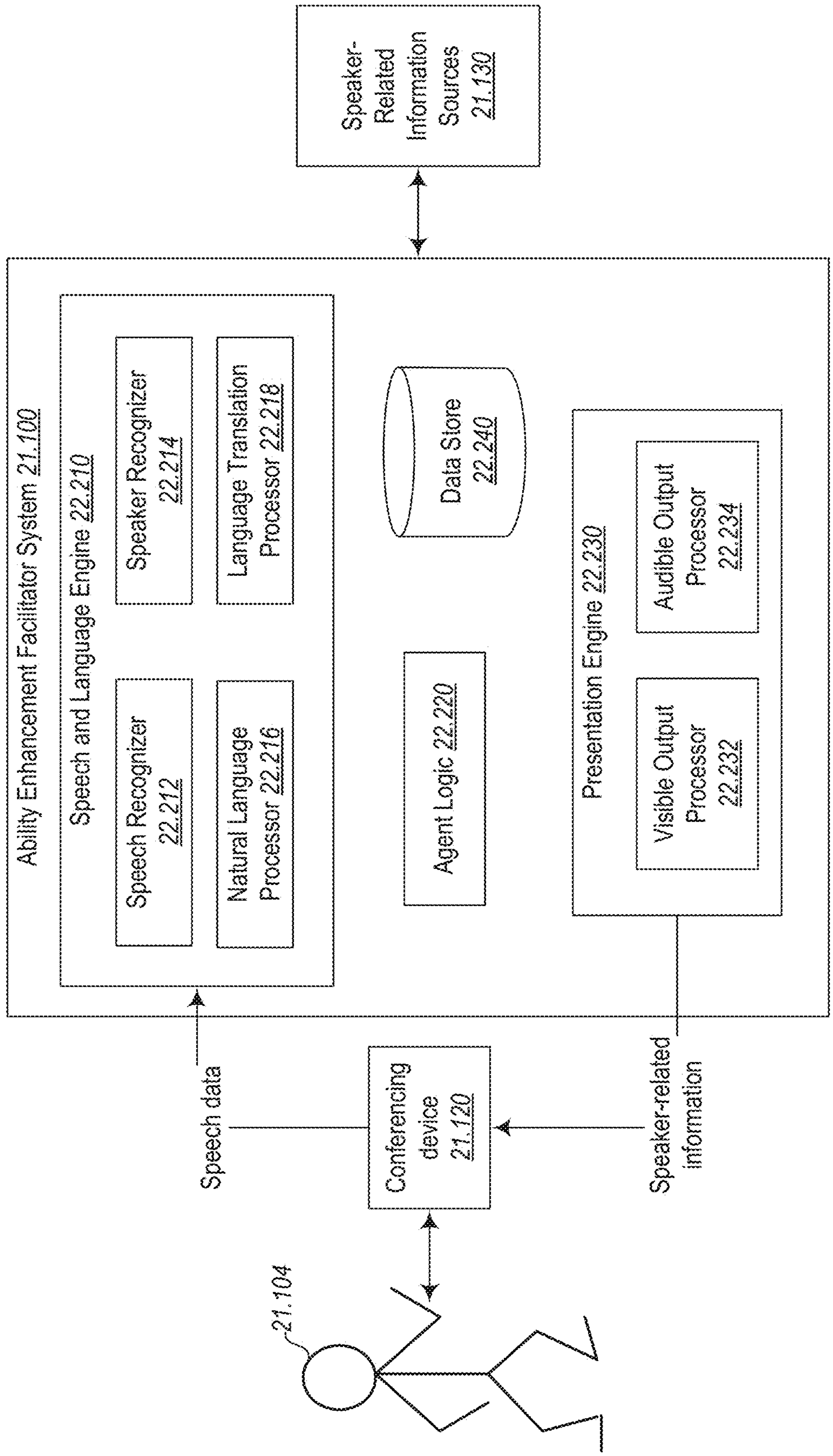
FIG. 22 is an example functional block diagram of an example ability enhancement facilitator system according to an example embodiment.

FIG. 22 is an example functional block diagram of an example ability enhancement facilitator system according to an example embodiment. In the illustrated embodiment of FIG. 22, the AEFS 21.100 includes a speech and language engine 22.210, agent logic 22.220, a presentation engine 22.230, and a data store 22.240.

The speech and language engine 22.210 includes a speech recognizer 22.212, a speaker recognizer 22.214, a natural language processor 22.216, and a language translation processor 22.218. The speech recognizer 22.212 transforms speech audio data received (e.g., from the conferencing device 21.120) into textual representation of an utterance represented by the speech audio data. In some embodiments, the performance of the speech recognizer 22.212 may be improved or augmented by use of a language model (e.g., representing likelihoods of transitions between words, such as based on n-grams) or speech model (e.g., representing acoustic properties of a speaker's voice) that is tailored to or based on an identified speaker. For example, once a speaker has been identified, the speech recognizer 22.212 may use a language model that was previously generated based on a corpus of communications and other information items authored by the identified speaker. A speaker-specific language model may be generated based on a corpus of documents and/or messages authored by a speaker. Speaker-specific speech models may be used to account for accents or channel properties (e.g., due to environmental factors or communication equipment) that are specific to a particular speaker, and may be generated based on a corpus of recorded speech from the speaker. In some embodiments, multiple speech recognizers are present, each one configured to recognize speech in a different language.

The speaker recognizer 22.214 identifies the speaker based on acoustic properties of the speaker's voice, as reflected by the speech data received from the conferencing device 21.120. The speaker recognizer 22.214 may compare a speaker voice print to previously generated and recorded voice prints stored in the data store 22.240 in order to find a best or likely match. Voice prints or other signal properties may be determined with reference to voice mail messages, voice chat data, or some other corpus of speech data.

The natural language processor 22.216 processes text generated by the speech recognizer 22.212 and/or located in information items obtained from the speaker-related information sources 21.130. In doing so, the natural language processor 22.216 may identify relationships, events, or entities (e.g., people, places, things) that may facilitate speaker identification, language translation, and/or other functions of the AEFS 21.100. For example, the natural language processor 22.216 may process status updates posted by the user 21.102*a* on a social networking service, to determine that the user 21.102*a* recently attended a conference in a particular city, and this fact may be used to identify a speaker and/or determine other speaker-related information, which may in turn be used for language translation or other functions.

In some embodiments, the natural language processor 22.216 may determine topics or subjects discussed during the course of a conference call or other conversation. Information/text processing techniques or metrics may be used to identify key terms or concepts from text obtained from a user utterances. For example, the natural language processor 22.216 may generate a term vector that associates text terms with frequency information including absolute counts, term frequency-inverse document frequency scores, or the like. The frequency information can then be used to identify important terms or concepts in the user's speech, such as by selecting those having a high score (e.g., above a certain threshold). Other text processing and/or machine learning techniques may be used to classify or otherwise determine concepts related to user utterances, including Bayesian classification, clustering, decision trees, and the like.

The language translation processor 22.218 translates from one language to another, for example, by converting text in a first language to text in a second language. The text input to the language translation processor 22.218 may be obtained from, for example, the speech recognizer 22.212 and/or the natural language processor 22.216. The language translation processor 22.218 may use speaker-related information to improve or adapt its performance. For example, the language translation processor 22.218 may use a lexicon or vocabulary that is tailored to the speaker, such as may be based on the speaker's country/region of origin, the speaker's social class, the speaker's profession, or the like.

The agent logic 22.220 implements the core intelligence of the AEFS 21.100. The agent logic 22.220 may include a reasoning engine (e.g., a rules engine, decision trees, Bayesian inference engine) that combines information from multiple sources to identify speakers, determine speaker-related information, generate voice conference history information, and the like. For example, the agent logic 22.220 may combine spoken text from the speech recognizer 22.212, a set of potentially matching (candidate) speakers from the speaker recognizer 22.214, and information items from the information sources 21.130, in order to determine a most likely identity of the current speaker. As another example, the agent logic 22.220 may be configured to search or otherwise analyze conference history information to identify recurring topics, information items, or the like. As a further example, the agent logic 22.220 may identify the language spoken by the speaker by analyzing the output of multiple speech recognizers that are each configured to recognize speech in a different language, to identify the language of the speech recognizer that returns the highest confidence result as the spoken language.

The presentation engine 22.230 includes a visible output processor 22.232 and an audible output processor 22.234. The visible output processor 22.232 may prepare, format, and/or cause information to be displayed on a display device, such as a display of the conferencing device 21.120 or some other display (e.g., a desktop or laptop display in proximity to the user 21.102*a*). The agent logic 22.220 may use or invoke the visible output processor 22.232 to prepare and display information, such as by formatting or otherwise modifying a transcription, translation, or some speaker-related information to fit on a particular type or size of display. The audible output processor 22.234 may include or use other components for generating audible output, such as tones, sounds, voices, or the like. In some embodiments, the agent logic 22.220 may use or invoke the audible output processor 22.234 in order to convert a textual message (e.g., including or referencing speaker-related information) into audio output suitable for presentation via the conferencing device 21.120, for example by employing a text-to-speech processor.

Note that although speaker identification and/or determining speaker-related information is herein sometimes described as including the positive identification of a single speaker, it may instead or also include determining likelihoods that each of one or more persons is the current speaker. For example, the speaker recognizer 22.214 may provide to the agent logic 22.220 indications of multiple candidate speakers, each having a corresponding likelihood or confidence level. The agent logic 22.220 may then select the most likely candidate based on the likelihoods alone or in combination with other information, such as that provided by the speech recognizer 22.212, natural language processor 22.216, speaker-related information sources 21.130, or the like. In some cases, such as when there are a small number of reasonably likely candidate speakers, the agent logic 22.220 may inform the user 21.102*a* of the identities all of the candidate speakers (as opposed to a single speaker) candidate speaker, as such information may be sufficient to trigger the user's recall and enable the user to make a selection that informs the agent logic 22.220 of the speaker's identity.

Note that in some embodiments, one or more of the illustrated components, or components of different types, may be included or excluded. For example, in one embodiment, the AEFS 21.100 does not include the language translation processor 22.218.

B. Example Processes

FIGS. 23.1-23.94 are example flow diagrams of ability enhancement processes performed by example embodiments.

FIG. 23.1 is an example flow diagram of example logic for ability enhancement. The illustrated logic in this and the following flow diagrams may be performed by, for example, a conferencing device 21.120 and/or one or more components of the AEFS 21.100 described with respect to FIG. 21, above. More particularly, FIG. 23.1 illustrates a process 23.100 that includes operations performed by or at the following block(s).

At block 23.101, the process performs receiving data representing speech signals from a voice conference amongst multiple speakers. The voice conference may be, for example, taking place between multiple speakers who are engaged in a conference call. The received data may be or represent one or more speech signals (e.g., audio samples) and/or higher-order information (e.g., frequency coefficients). In some embodiments, the process may receive data from a face-to-face conference amongst the speakers. The data may be received by or at the conferencing device 21.120 and/or the AEFS 21.100.

At block 23.102, the process performs determining speaker-related information associated with the multiple speakers, based on the data representing speech signals from the voice conference. The speaker-related information may include identifiers of a speaker (e.g., names, titles) and/or related information, such as documents, emails, calendar events, or the like. The speaker-related information may also or instead include demographic information about a speaker, including gender, language spoken, country of origin, region of origin, or the like. The speaker-related information may be determined based on signal properties of speech signals (e.g., a voice print) and/or on the semantic content of the speech signal, such as a name, event, entity, or information item that was mentioned by a speaker.

At block 23.103, the process performs recording conference history information based on the speaker-related information. In some embodiments, the process may record the voice conference and related information, so that such information can be played back at a later time, such as for reference purposes, for a participant who joins the conference late, or the like. The conference history information may associate timestamps or other time indicators with information from the voice conference, including speaker identifiers, transcriptions of speaker utterances, indications of discussion topics, mentioned information items, or the like.

At block 23.104, the process performs presenting at least some of the conference history information to a user. Presenting the conference history information may include playing back audio, displaying a transcript, presenting indications topics of conversation, or the like. In some embodiments, the conference history information may be presented on a display of a conferencing device (if it has one) or on some other display, such as a laptop or desktop display that is proximately located to the user. The conference history information may be presented in an audible and/or visible manner.

FIG. 23.2 is an example flow diagram of example logic illustrating an example embodiment of process 23.100 of FIG. 23.1. More particularly, FIG. 23.2 illustrates a process 23.200 that includes the process 23.100, wherein the recording conference history information based on the speaker-related information includes operations performed by or at one or more of the following block(s).

At block 23.201, the process performs recording a transcription of utterances made by speakers during the voice conference. If the process performs speech recognition as discussed herein, it may record the results of such speech recognition as a transcription of the voice conference.

FIG. 23.3 is an example flow diagram of example logic illustrating an example embodiment of process 23.200 of FIG. 23.2. More particularly, FIG. 23.3 illustrates a process 23.300 that includes the process 23.200, wherein the recording a transcription includes operations performed by or at one or more of the following block(s).

At block 23.301, the process performs performing speech recognition to convert data representing a speech signal from one of the multiple speakers into text. In some embodiments, the process performs automatic speech recognition to convert audio data into text. Various approaches may be employed, including using hidden Markov models ("HMM"), neural networks, or the like. The data representing the speech signal may be frequency coefficients, such as mel-frequency coefficients or a similar representation adapted for automatic speech recognition.

At block 23.302, the process performs storing the text in association with an indicator of the one speaker. The text may be stored in a data store (e.g., disk, database, file) of the AEFS, a conferencing device, or some other system, such as a cloud-based storage system.

FIG. 23.4 is an example flow diagram of example logic illustrating an example embodiment of process 23.100 of FIG. 23.1. More particularly, FIG. 23.4 illustrates a process 23.400 that includes the process 23.100, wherein the recording conference history information based on the speaker-related information includes operations performed by or at one or more of the following block(s).

At block 23.401, the process performs recording indications of topics discussed during the voice conference. Topics of conversation may be identified in various ways. For example, the process may track entities or terms that are commonly mentioned during the course of the voice conference. Various text processing techniques or metrics may be applied to identify key terms or concepts, such as term frequencies, inverse document frequencies, and the like. As another example, the process may attempt to identify agenda items which are typically discussed early in the voice conference. The process may also or instead refer to messages or other information items that are related to the voice conference, such as by analyzing email headers (e.g., subject lines) of email messages sent between participants in the voice conference.

FIG. 23.5 is an example flow diagram of example logic illustrating an example embodiment of process 23.400 of FIG. 23.4. More particularly, FIG. 23.5 illustrates a process 23.500 that includes the process 23.400, wherein the recording indications of topics discussed during the voice conference includes operations performed by or at one or more of the following block(s).

At block 23.501, the process performs performing speech recognition to convert the data representing speech signals into text. As noted, some embodiments perform speech recognition to convert audio data into text data.

At block 23.502, the process performs analyzing the text to identify frequently used terms or phrases. In some embodiments, the process maintains a term vector or other structure with respect to a transcript (or window or portion thereof) of the voice conference. The term vector may associate terms with information about corresponding frequency, such as term counts, term frequency, document frequency, inverse document frequency, or the like. The text may be processed in other ways as well, such as by stemming, stop word filtering, or the like.

At block 23.503, the process performs determining the topics discussed during the voice conference based on the frequently used terms or phrases. Terms having a high information retrieval metric value, such as term frequency or TF-IDF (term frequency-inverse document frequency), may be identified as topics of conversation. Other information processing techniques may be employed instead or in addition, such as Bayesian classification, decision trees, or the like.

FIG. 23.6 is an example flow diagram of example logic illustrating an example embodiment of process 23.100 of FIG. 23.1. More particularly, FIG. 23.6 illustrates a process 23.600 that includes the process 23.100, wherein the recording conference history information based on the speaker-related information includes operations performed by or at one or more of the following block(s).

At block 23.601, the process performs recording indications of information items related to subject matter of the voice conference. The process may track information items that are mentioned during the voice conference or otherwise related to participants in the voice conference, such as emails sent between participants in the voice conference.

FIG. 23.7 is an example flow diagram of example logic illustrating an example embodiment of process 23.600 of FIG. 23.6. More particularly, FIG. 23.7 illustrates a process 23.700 that includes the process 23.600, wherein the recording indications of information items related to subject matter of the voice conference includes operations performed by or at one or more of the following block(s).

At block 23.701, the process performs performing speech recognition to convert the data representing speech signals into text. As noted, some embodiments perform speech recognition to convert audio data into text data.

At block 23.702, the process performs analyzing the text to identify information items mentioned by the speakers. The process may use terms from the text to perform searches against a document store, email database, search index, or the like, in order to locate information items (e.g., messages, documents) that include one or more of those text terms as content or metadata (e.g., author, title, date). The process may also or instead attempt to identify information about information items, such as author, date, or title, based on the text. For example, from the text "I sent an email to John last week" the process may determine that an email message was sent to a user named John during the last week, and then use that information to narrow a search for such an email message.

FIG. 23.8 is an example flow diagram of example logic illustrating an example embodiment of process 23.100 of FIG. 23.1. More particularly, FIG. 23.8 illustrates a process 23.800 that includes the process 23.100, wherein the recording conference history information based on the speaker-related information includes operations performed by or at one or more of the following block(s).

At block 23.801, the process performs recording the data representing speech signals from the voice conference. The process may record speech, and then use such recordings for later playback, as a source for transcription, or for other purposes. The data may be recorded in various ways and/or formats, including in compressed formats.

FIG. 23.9 is an example flow diagram of example logic illustrating an example embodiment of process 23.100 of FIG. 23.1. More particularly, FIG. 23.9 illustrates a process 23.900 that includes the process 23.100, wherein the recording conference history information based on the speaker-related information includes operations performed by or at one or more of the following block(s).

At block 23.901, the process performs as each of the multiple speakers takes a turn speaking during the voice conference, recording speaker-related information associated with the speaker. The process may, in substantially real time, record speaker-related information associated a current speaker, such as a name of the speaker, a message sent by the speaker, a document drafted by the speaker, or the like.

FIG. 23.10 is an example flow diagram of example logic illustrating an example embodiment of process 23.100 of FIG. 23.1. More particularly, FIG. 23.10 illustrates a process 23.1000 that includes the process 23.100, wherein the recording conference history information based on the speaker-related information includes operations performed by or at one or more of the following block(s).

At block 23.1001, the process performs recording conference history information based on the speaker-related information during a telephone conference call amongst the multiple speakers. In some embodiments, the process operates to record information about a telephone conference, even when some or all of the speakers are using POTS (plain old telephone service) telephones.

FIG. 23.11 is an example flow diagram of example logic illustrating an example embodiment of process 23.100 of FIG. 23.1. More particularly, FIG. 23.11 illustrates a process 23.1100 that includes the process 23.100, wherein the presenting at least some of the conference history information includes operations performed by or at one or more of the following block(s).

At block 23.1101, the process performs presenting the conference history information to a new participant in the voice conference, the new participant having joined the voice conference while the voice conference was already in progress. In some embodiments, the process may play back history information to a late arrival to the voice conference, so that the new participant may catch up with the conversation without needing to interrupt the proceedings.

FIG. 23.12 is an example flow diagram of example logic illustrating an example embodiment of process 23.100 of FIG. 23.1. More particularly, FIG. 23.12 illustrates a process 23.1200 that includes the process 23.100, wherein the presenting at least some of the conference history information includes operations performed by or at one or more of the following block(s).

At block 23.1201, the process performs presenting the conference history information to a participant in the voice conference, the participant having rejoined the voice conference after having not participated in the voice conference for a period of time. In some embodiments, the process may play back history information to a participant who leaves and then rejoins the conference, for example when a participant temporarily leaves to visit the restroom, obtain some food, or attend to some other matter.

FIG. 23.13 is an example flow diagram of example logic illustrating an example embodiment of process 23.1200 of FIG. 23.12. More particularly, FIG. 23.13 illustrates a process 23.1300 that includes the process 23.1200, wherein the participant rejoins the voice conference after at least one of: pausing the voice conference, muting the voice conference, holding the voice conference, voluntarily leaving the voice conference, and/or involuntarily leaving the voice conference. The participant may rejoin the voice conference for various reasons, such as because he has voluntarily left the voice conference (e.g., to attend to another matter), involuntarily left the voice conference (e.g., because the call was dropped), or the like.

FIG. 23.14 is an example flow diagram of example logic illustrating an example embodiment of process 23.100 of FIG. 23.1. More particularly, FIG. 23.14 illustrates a process 23.1400 that includes the process 23.100, wherein the presenting at least some of the conference history information includes operations performed by or at one or more of the following block(s).

At block 23.1401, the process performs presenting the conference history information to a user after conclusion of the voice conference. The process may record the conference history information such that it can be presented at a later date, such as for reference purposes, for legal analysis (e.g., as a deposition), or the like.

FIG. 23.15 is an example flow diagram of example logic illustrating an example embodiment of process 23.100 of FIG. 23.1. More particularly, FIG. 23.15 illustrates a process 23.1500 that includes the process 23.100, wherein the presenting at least some of the conference history information includes operations performed by or at one or more of the following block(s).

At block 23.1501, the process performs providing a user interface configured to access the conference history information by scrolling through a temporal record of the voice conference. As discussed with reference to FIG. 21C, some embodiments provide a user interface and associated controls for scrolling through the conference history information. Such an interface may include a timeline control, VCR-style controls (e.g., with buttons for forward, reverse, pause), touchscreen controls (e.g., swipe left and right), or the like for manipulating or traversing the conference history information. Other controls are contemplated, including a search interface for searching a transcript of the voice conference.

FIG. 23.16 is an example flow diagram of example logic illustrating an example embodiment of process 23.100 of FIG. 23.1. More particularly, FIG. 23.16 illustrates a process 23.1600 that includes the process 23.100, wherein the presenting at least some of the conference history information includes operations performed by or at one or more of the following block(s).

At block 23.1601, the process performs presenting a transcription of utterances made by speakers during the voice conference. The process may present text of what was said (and by whom) during the voice conference. The process may also mark or associate utterances with timestamps or other time indicators.

FIG. 23.17 is an example flow diagram of example logic illustrating an example embodiment of process 23.100 of FIG. 23.1. More particularly, FIG. 23.17 illustrates a process 23.1700 that includes the process 23.100, wherein the presenting at least some of the conference history information includes operations performed by or at one or more of the following block(s).

At block 23.1701, the process performs presenting indications of topics discussed during the voice conference. The process may present indications of topics discussed, such as may be determined based on terms used by speakers during the conference, as discussed above.

FIG. 23.18 is an example flow diagram of example logic illustrating an example embodiment of process 23.100 of FIG. 23.1. More particularly, FIG. 23.18 illustrates a process 23.1800 that includes the process 23.100, wherein the presenting at least some of the conference history information includes operations performed by or at one or more of the following block(s).

At block 23.1801, the process performs presenting indications of information items related to subject matter of the voice conference. The process may present relevant information items, such as emails, documents, plans, agreements, or the like mentioned or referenced by one or more speakers. In some embodiments, the information items may be related to the content of the discussion, such as because they include common key terms, even if the information items have not been directly referenced by any speaker.

FIG. 23.19 is an example flow diagram of example logic illustrating an example embodiment of process 23.100 of FIG. 23.1. More particularly, FIG. 23.19 illustrates a process 23.1900 that includes the process 23.100, wherein the presenting at least some of the conference history information includes operations performed by or at one or more of the following block(s).

At block 23.1901, the process performs presenting, while a current speaker is speaking, conference history information on a display device of the user, the displayed conference history information providing information related to previous statements made by the current speaker. For example, as the user engages in a conference call from his office, the process may present information related to statements made at an earlier time during the current voice conference or some previous voice conference.

FIG. 23.20 is an example flow diagram of example logic illustrating an example embodiment of process 23.100 of FIG. 23.1. More particularly, FIG. 23.20 illustrates a process 23.2000 that includes the process 23.100, and which further includes operations performed by or at the following block(s).

At block 23.2001, the process performs performing voice identification based on the data representing the speech signals from the voice conference. In some embodiments, voice identification may include generating a voice print, voice model, or other biometric feature set that characterizes the voice of the speaker, and then comparing the generated voice print to previously generated voice prints.

FIG. 23.21 is an example flow diagram of example logic illustrating an example embodiment of process 23.2000 of FIG. 23.20. More particularly, FIG. 23.21 illustrates a process 23.2100 that includes the process 23.2000, wherein the performing voice identification includes operations performed by or at one or more of the following block(s).

At block 23.2101, the process performs in a conference call system, matching a portion of the data representing the speech signals with an identity of one of the multiple speakers, based on a communication channel that is associated with the one speaker and over which the portion of the data is transmitted. In some embodiments, a conference call system includes or accesses multiple distant communication channels (e.g., phone lines, sockets, pipes) that each transmit data from one of the multiple speakers. In such a situation, the conference call system can match the identity of a speaker with audio data transmitted over that speaker's communication channel.

FIG. 23.22 is an example flow diagram of example logic illustrating an example embodiment of process 23.2000 of FIG. 23.20. More particularly, FIG. 23.22 illustrates a process 23.2200 that includes the process 23.2000, wherein the performing voice identification includes operations performed by or at one or more of the following block(s).

At block 23.2201, the process performs comparing properties of the speech signal with properties of previously recorded speech signals from multiple persons. In some embodiments, the process accesses voice prints associated with multiple persons, and determines a best match against the speech signal.

FIG. 23.23 is an example flow diagram of example logic illustrating an example embodiment of process 23.2200 of FIG. 23.22. More particularly, FIG. 23.23 illustrates a process 23.2300 that includes the process 23.2200, and which further includes operations performed by or at the following block(s).

At block 23.2301, the process performs processing voice messages from the multiple persons to generate voice print data for each of the multiple persons. Given a telephone voice message, the process may associate generated voice print data for the voice message with one or more (direct or indirect) identifiers corresponding with the message. For example, the message may have a sender telephone number associated with it, and the process can use that sender telephone number to do a reverse directory lookup (e.g., in a public directory, in a personal contact list) to determine the name of the voice message speaker.

FIG. 23.24 is an example flow diagram of example logic illustrating an example embodiment of process 23.2300 of FIG. 23.23. More particularly, FIG. 23.24 illustrates a process 23.2400 that includes the process 23.2300, wherein the processing voice messages includes operations performed by or at one or more of the following block(s).

At block 23.2401, the process performs processing telephone voice messages stored by a voice mail service. In some embodiments, the process analyzes voice messages to generate voice prints/models for multiple persons.

FIG. 23.25 is an example flow diagram of example logic illustrating an example embodiment of process 23.100 of FIG. 23.1. More particularly, FIG. 23.25 illustrates a process 23.2500 that includes the process 23.100, and which further includes operations performed by or at the following block(s).

At block 23.2501, the process performs performing speech recognition to convert the data representing speech signals into text data. For example, the process may convert the received data into a sequence of words that are (or are likely to be) the words uttered by a speaker. Speech recognition may be performed by way of hidden Markov model-based systems, neural networks, stochastic modeling, or the like. In some embodiments, the speech recognition may be based on cepstral coefficients that represent the speech signal.

FIG. 23.26 is an example flow diagram of example logic illustrating an example embodiment of process 23.2500 of FIG. 23.25. More particularly, FIG. 23.26 illustrates a process 23.2600 that includes the process 23.2500, wherein the determining speaker-related information associated with the multiple speakers includes operations performed by or at one or more of the following block(s).

At block 23.2601, the process performs finding an information item that references the one speaker and/or that includes one or more words in the text data. In some embodiments, the process may search for and find a document or other item (e.g., email, text message, status update) that includes words spoken by one speaker. Then, the process can infer that the one speaker is the author of the document, a recipient of the document, a person described in the document, or the like.

FIG. 23.27 is an example flow diagram of example logic illustrating an example embodiment of process 23.2500 of FIG. 23.25. More particularly, FIG. 23.27 illustrates a process 23.2700 that includes the process 23.2500, and which further includes operations performed by or at the following block(s).

At block 23.2701, the process performs retrieving information items that reference the text data. The process may here retrieve or otherwise obtain documents, calendar events, messages, or the like, that include, contain, or otherwise reference some portion of the text data.

At block 23.2702, the process performs informing the user of the retrieved information items. The information item itself, or an indication thereof (e.g., a title, a link), may be displayed.

FIG. 23.28 is an example flow diagram of example logic illustrating an example embodiment of process 23.2500 of FIG. 23.25. More particularly, FIG. 23.28 illustrates a process 23.2800 that includes the process 23.2500, wherein the performing speech recognition includes operations performed by or at one or more of the following block(s).

At block 23.2801, the process performs performing speech recognition based at least in part on a language model associated with the one speaker. A language model may be used to improve or enhance speech recognition. For example, the language model may represent word transition likelihoods (e.g., by way of n-grams) that can be advantageously employed to enhance speech recognition. Furthermore, such a language model may be speaker specific, in that it may be based on communications or other information generated by the one speaker.

FIG. 23.29 is an example flow diagram of example logic illustrating an example embodiment of process 23.2800 of FIG. 23.28. More particularly, FIG. 23.29 illustrates a process 23.2900 that includes the process 23.2800, wherein the performing speech recognition based at least in part on a language model associated with the one speaker includes operations performed by or at one or more of the following block(s).

At block 23.2901, the process performs generating the language model based on information items generated by the one speaker, the information items including at least one of emails transmitted by the one speaker, documents authored by the one speaker, and/or social network messages transmitted by the one speaker. In some embodiments, the process mines or otherwise processes emails, text messages, voice messages, and the like to generate a language model that is specific or otherwise tailored to the one speaker.

FIG. 23.30 is an example flow diagram of example logic illustrating an example embodiment of process 23.2800 of FIG. 23.28. More particularly, FIG. 23.30 illustrates a process 23.3000 that includes the process 23.2800, wherein the performing speech recognition based at least in part on a language model associated with the one speaker includes operations performed by or at one or more of the following block(s).

At block 23.3001, the process performs generating the language model based on information items generated by or referencing any of the multiple speakers, the information items including emails, documents, and/or social network messages. In some embodiments, the process mines or otherwise processes emails, text messages, voice messages, and the like generated by or referencing any of the multiple speakers to generate a language model that is tailored to the current conversation.

FIG. 23.31 is an example flow diagram of example logic illustrating an example embodiment of process 23.100 of FIG. 23.1. More particularly, FIG. 23.31 illustrates a process 23.3100 that includes the process 23.100, wherein the determining speaker-related information associated with the multiple speakers includes operations performed by or at one or more of the following block(s).

At block 23.3101, the process performs determining which one of the multiple speakers is speaking during a time interval. The process may determine which one of the speakers is currently speaking, even if the identity of the current speaker is not known. Various approaches may be employed, including detecting the source of a speech signal, performing voice identification, or the like.

FIG. 23.32 is an example flow diagram of example logic illustrating an example embodiment of process 23.3100 of FIG. 23.31. More particularly, FIG. 23.32 illustrates a process 23.3200 that includes the process 23.3100, wherein the determining which one of the multiple speakers is speaking during a time interval includes operations performed by or at one or more of the following block(s).

At block 23.3201, the process performs associating a first portion of the received data with a first one of the multiple speakers. The process may correspond, bind, link, or otherwise associate a portion of the received data with a speaker. Such an association may then be used for further processing, such as voice identification, speech recognition, or the like.

FIG. 23.33 is an example flow diagram of example logic illustrating an example embodiment of process 23.3200 of FIG. 23.32. More particularly, FIG. 23.33 illustrates a process 23.3300 that includes the process 23.3200, wherein the associating a first portion of the received data with a first one of the multiple speakers includes operations performed by or at one or more of the following block(s).

At block 23.3301, the process performs receiving the first portion of the received data along with an identifier associated with the first speaker. In some embodiments, the process may receive data along with an identifier, such as an IP address (e.g., in a voice over IP conferencing system). Some conferencing systems may provide an identifier (e.g., telephone number) of a current speaker by detecting which telephone line or other circuit (virtual or physical) has an active signal.

FIG. 23.34 is an example flow diagram of example logic illustrating an example embodiment of process 23.3200 of FIG. 23.32. More particularly, FIG. 23.34 illustrates a process 23.3400 that includes the process 23.3200, wherein the associating a first portion of the received data with a first one of the multiple speakers includes operations performed by or at one or more of the following block(s).

At block 23.3401, the process performs selecting the first portion based on the first portion representing only speech from the one speaker and no other of the multiple speakers. The process may select a portion of the received data based on whether or not the received data includes speech from only one, or more than one speaker (e.g., when multiple speakers are talking over each other).

FIG. 23.35 is an example flow diagram of example logic illustrating an example embodiment of process 23.3100 of FIG. 23.31. More particularly, FIG. 23.35 illustrates a process 23.3500 that includes the process 23.3100, and which further includes operations performed by or at the following block(s).

At block 23.3501, the process performs determining that two or more of the multiple speakers are speaking concurrently. The process may determine the multiple speakers are talking at the same time, and take action accordingly. For example, the process may elect not to attempt to identify any speaker, or instead identify all of the speakers who are talking out of turn.

FIG. 23.36 is an example flow diagram of example logic illustrating an example embodiment of process 23.3100 of FIG. 23.31. More particularly, FIG. 23.36 illustrates a process 23.3600 that includes the process 23.3100, wherein the determining which one of the multiple speakers is speaking during a time interval includes operations performed by or at one or more of the following block(s).

At block 23.3601, the process performs performing voice identification to select which one of multiple previously analyzed voices is a best match for the one speaker who is speaking during the time interval. As noted above, voice identification may be employed to determine the current speaker.

FIG. 23.37 is an example flow diagram of example logic illustrating an example embodiment of process 23.3100 of FIG. 23.31. More particularly, FIG. 23.37 illustrates a process 23.3700 that includes the process 23.3100, wherein the determining which one of the multiple speakers is speaking during a time interval includes operations performed by or at one or more of the following block(s).

At block 23.3701, the process performs performing speech recognition to convert the received data into text data. For example, the process may convert the received data into a sequence of words that are (or are likely to be) the words uttered by a speaker. Speech recognition may be performed by way of hidden Markov model-based systems, neural networks, stochastic modeling, or the like. In some embodiments, the speech recognition may be based on cepstral coefficients that represent the speech signal.

At block 23.3702, the process performs identifying one of the multiple speakers based on the text data. Given text data (e.g., words spoken by a speaker), the process may search for information items that include the text data, and then identify the one speaker based on those information items.

FIG. 23.38 is an example flow diagram of example logic illustrating an example embodiment of process 23.3700 of FIG. 23.37. More particularly, FIG. 23.38 illustrates a process 23.3800 that includes the process 23.3700, wherein the identifying one of the multiple speakers based on the text data includes operations performed by or at one or more of the following block(s).

At block 23.3801, the process performs finding an information item that references the one speaker and that includes one or more words in the text data. In some embodiments, the process may search for and find a document or other item (e.g., email, text message, status update) that includes words spoken by one speaker. Then, the process can infer that the one speaker is the author of the document, a recipient of the document, a person described in the document, or the like.

FIG. 23.39 is an example flow diagram of example logic illustrating an example embodiment of process 23.100 of FIG. 23.1. More particularly, FIG. 23.39 illustrates a process 23.3900 that includes the process 23.100, wherein the determining speaker-related information associated with the multiple speakers includes operations performed by or at one or more of the following block(s).

At block 23.3901, the process performs developing a corpus of speaker data by recording speech from multiple persons. Over time, the process may gather and record speech obtained during its operation and/or from the operation of other systems (e.g., voice mail systems, chat systems).

At block 23.3902, the process performs determining the speaker-related information based at least in part on the corpus of speaker data. The process may use the speaker data in the corpus to improve its performance by utilizing actual, environmental speech data, possibly along with feedback received from the user, as discussed below.

FIG. 23.40 is an example flow diagram of example logic illustrating an example embodiment of process 23.3900 of FIG. 23.39. More particularly, FIG. 23.40 illustrates a process 23.4000 that includes the process 23.3900, and which further includes operations performed by or at the following block(s).

At block 23.4001, the process performs generating a speech model associated with each of the multiple persons, based on the recorded speech. The generated speech model may include voice print data that can be used for speaker identification, a language model that may be used for speech recognition purposes, a noise model that may be used to improve operation in speaker-specific noisy environments.

FIG. 23.41 is an example flow diagram of example logic illustrating an example embodiment of process 23.3900 of FIG. 23.39. More particularly, FIG. 23.41 illustrates a process 23.4100 that includes the process 23.3900, and which further includes operations performed by or at the following block(s).

At block 23.4101, the process performs receiving feedback regarding accuracy of the conference history information. During or after providing conference history information to the user, the user may provide feedback regarding its accuracy. This feedback may then be used to train a speech processor (e.g., a speaker identification module, a speech recognition module).

At block 23.4102, the process performs training a speech processor based at least in part on the received feedback.

FIG. 23.42 is an example flow diagram of example logic illustrating an example embodiment of process 23.100 of FIG. 23.1. More particularly, FIG. 23.42 illustrates a process 23.4200 that includes the process 23.100, wherein the determining speaker-related information associated with the multiple speakers includes operations performed by or at one or more of the following block(s).

At block 23.4201, the process performs receiving context information related to the user and/or one of the multiple speakers. Context information may generally include information about the setting, location, occupation, communication, workflow, or other event or factor that is present at, about, or with respect to the user and/or one or more of the speakers.

At block 23.4202, the process performs determining speaker-related information associated with the multiple speakers, based on the context information. Context information may be used to determine speaker-related information, such as by determining or narrowing a set of potential speakers based on the current location of a user and/or a speaker.

FIG. 23.43 is an example flow diagram of example logic illustrating an example embodiment of process 23.4200 of FIG. 23.42. More particularly, FIG. 23.43 illustrates a process 23.4300 that includes the process 23.4200, wherein the receiving context information includes operations performed by or at one or more of the following block(s).

At block 23.4301, the process performs receiving an indication of a location of the user or the one speaker.

At block 23.4302, the process performs determining a plurality of persons with whom the user or the one speaker commonly interacts at the location. For example, if the indicated location is a workplace, the process may generate a list of co-workers, thereby reducing or simplifying the problem of speaker identification.

FIG. 23.44 is an example flow diagram of example logic illustrating an example embodiment of process 23.4300 of FIG. 23.43. More particularly, FIG. 23.44 illustrates a process 23.4400 that includes the process 23.4300, wherein the receiving an indication of a location of the user or the one speaker includes operations performed by or at one or more of the following block(s).

At block 23.4401, the process performs receiving at least one of a GPS location from a mobile device of the user or the one speaker, a network identifier that is associated with the location, an indication that the user or the one speaker is at a workplace, an indication that the user or the one speaker is at a residence, an information item that references the user or the one speaker, an information item that references the location of the user or the one speaker. A network identifier may be, for example, a service set identifier ("SSID") of a wireless network with which the user is currently associated. In some embodiments, the process may translate a coordinate-based location (e.g., GPS coordinates) to a particular location (e.g., residence or workplace) by performing a map lookup.

FIG. 23.45 is an example flow diagram of example logic illustrating an example embodiment of process 23.100 of FIG. 23.1. More particularly, FIG. 23.45 illustrates a process 23.4500 that includes the process 23.100, wherein the presenting at least some of the conference history information includes operations performed by or at one or more of the following block(s).

At block 23.4501, the process performs presenting the conference history information on a display of a conferencing device of the user. In some embodiments, the conferencing device may include a display. For example, where the conferencing device is a smart phone or laptop computer, the conferencing device may include a display that provides a suitable medium for presenting the name or other identifier of the speaker.

FIG. 23.46 is an example flow diagram of example logic illustrating an example embodiment of process 23.100 of FIG. 23.1. More particularly, FIG. 23.46 illustrates a process 23.4600 that includes the process 23.100, wherein the presenting at least some of the conference history information includes operations performed by or at one or more of the following block(s).

At block 23.4601, the process performs presenting the conference history information on a display of a computing device that is distinct from a conferencing device of the user. In some embodiments, the conferencing device may not itself include any display or a display suitable for presenting conference history information. For example, where the conferencing device is an office phone, the process may elect to present the speaker-related information on a display of a nearby computing device, such as a desktop or laptop computer in the vicinity of the phone.

FIG. 23.47 is an example flow diagram of example logic illustrating an example embodiment of process 23.100 of FIG. 23.1. More particularly, FIG. 23.47 illustrates a process 23.4700 that includes the process 23.100, wherein the presenting at least some of the conference history information includes operations performed by or at one or more of the following block(s).

At block 23.4701, the process performs determining a display to serve as a presentation device for the conference history information. In some embodiments, there may be multiple displays available as possible destinations for the conference history information. For example, in an office setting, where the conferencing device is an office phone, the office phone may include a small LCD display suitable for displaying a few characters or at most a few lines of text. However, there will typically be additional devices in the vicinity of the conferencing device, such as a desktop/laptop computer, a smart phone, a PDA, or the like. The process may determine to use one or more of these other display devices, possibly based on the type of the conference history information being displayed.

FIG. 23.48 is an example flow diagram of example logic illustrating an example embodiment of process 23.4700 of FIG. 23.47. More particularly, FIG. 23.48 illustrates a process 23.4800 that includes the process 23.4700, wherein the determining a display includes operations performed by or at one or more of the following block(s).

At block 23.4801, the process performs selecting one display from multiple displays, based on at least one of: whether each of the multiple displays is capable of displaying all of the conference history information, the size of each of the multiple displays, and/or whether each of the multiple displays is suitable for displaying the conference history information. In some embodiments, the process determines whether all of the conference history information can be displayed on a given display. For example, where the display is a small alphanumeric display on an office phone, the process may determine that the display is not capable of displaying a large amount of conference history information. In some embodiments, the process considers the size (e.g., the number of characters or pixels that can be displayed) of each display. In some embodiments, the process considers the type of the conference history information. For example, whereas a small alphanumeric display on an office phone may be suitable for displaying the name of the speaker, it would not be suitable for displaying an email message sent by the speaker.

FIG. 23.49 is an example flow diagram of example logic illustrating an example embodiment of process 23.100 of FIG. 23.1. More particularly, FIG. 23.49 illustrates a process 23.4900 that includes the process 23.100, and which further includes operations performed by or at the following block(s).

At block 23.4901, the process performs audibly notifying the user to view the conference history information on a display device. In some embodiments, notifying the user may include playing a tone, such as a beep, chime, or other type of notification. In some embodiments, notifying the user may include playing synthesized speech telling the user to view the display device. For example, the process may perform text-to-speech processing to generate audio of a textual message or notification, and this audio may then be played or otherwise output to the user via the conferencing device. In some embodiments, notifying the user may telling the user that a document, calendar event, communication, or the like is available for viewing on the display device. Telling the user about a document or other speaker-related information may include playing synthesized speech that includes an utterance to that effect. In some embodiments, the process may notify the user in a manner that is not audible to at least some of the multiple speakers. For example, a tone or verbal message may be output via an earpiece speaker, such that other parties to the conversation do not hear the notification. As another example, a tone or other notification may be into the earpiece of a telephone, such as when the process is performing its functions within the context of a telephonic conference call.

FIG. 23.50 is an example flow diagram of example logic illustrating an example embodiment of process 23.100 of FIG. 23.1. More particularly, FIG. 23.50 illustrates a process 23.5000 that includes the process 23.100, wherein the presenting at least some of the conference history information includes operations performed by or at one or more of the following block(s).

At block 23.5001, the process performs informing the user of an identifier of each of the multiple speakers. In some embodiments, the identifier of each of the speakers may be or include a given name, surname (e.g., last name, family name), nickname, title, job description, or other type of identifier of or associated with the speaker.

FIG. 23.51 is an example flow diagram of example logic illustrating an example embodiment of process 23.100 of FIG. 23.1. More particularly, FIG. 23.51 illustrates a process 23.5100 that includes the process 23.100, wherein the presenting at least some of the conference history information includes operations performed by or at one or more of the following block(s).

At block 23.5101, the process performs informing the user of information aside from identifying information related to the multiple speakers. In some embodiments, information aside from identifying information may include information that is not a name or other identifier (e.g., job title) associated with the speaker. For example, the process may tell the user about an event or communication associated with or related to the speaker.

FIG. 23.52 is an example flow diagram of example logic illustrating an example embodiment of process 23.100 of FIG. 23.1. More particularly, FIG. 23.52 illustrates a process 23.5200 that includes the process 23.100, wherein the presenting at least some of the conference history information includes operations performed by or at one or more of the following block(s).

At block 23.5201, the process performs informing the user of an identifier of a speaker along with a transcription of a previous utterance made by the speaker. As shown in FIG. 21C, a transcript may include a speaker's name displayed next to an utterance from that speaker.

FIG. 23.53 is an example flow diagram of example logic illustrating an example embodiment of process 23.100 of FIG. 23.1. More particularly, FIG. 23.53 illustrates a process 23.5300 that includes the process 23.100, wherein the presenting at least some of the conference history information includes operations performed by or at one or more of the following block(s).

At block 23.5301, the process performs informing the user of an organization to which each of the multiple speakers belongs. In some embodiments, informing the user of an organization may include notifying the user of a business, group, school, club, team, company, or other formal or informal organization with which a speaker is affiliated. Companies may include profit or non-profit entities, regardless of organizational structure (e.g., corporation, partnerships, sole proprietorship).

FIG. 23.54 is an example flow diagram of example logic illustrating an example embodiment of process 23.100 of FIG. 23.1. More particularly, FIG. 23.54 illustrates a process 23.5400 that includes the process 23.100, wherein the presenting at least some of the conference history information includes operations performed by or at one or more of the following block(s).

At block 23.5401, the process performs informing the user of a previously transmitted communication referencing one of the multiple speakers. Various forms of communication are contemplated, including textual (e.g., emails, text messages, chats), audio (e.g., voice messages), video, or the like. In some embodiments, a communication can include content in multiple forms, such as text and audio, such as when an email includes a voice attachment.

FIG. 23.55 is an example flow diagram of example logic illustrating an example embodiment of process 23.5400 of FIG. 23.54. More particularly, FIG. 23.55 illustrates a process 23.5500 that includes the process 23.5400, wherein the presenting at least some of the conference history information includes operations performed by or at one or more of the following block(s).

At block 23.5501, the process performs informing the user of at least one of: an email transmitted between the one speaker and the user and/or a text message transmitted between the one speaker and the user. An email transmitted between the one speaker and the user may include an email sent from the one speaker to the user, or vice versa. Text messages may include short messages according to various protocols, including SMS, MMS, and the like.

FIG. 23.56 is an example flow diagram of example logic illustrating an example embodiment of process 23.100 of FIG. 23.1. More particularly, FIG. 23.56 illustrates a process 23.5600 that includes the process 23.100, wherein the presenting at least some of the conference history information includes operations performed by or at one or more of the following block(s).

At block 23.5601, the process performs informing the user of an event involving the user and one of the multiple speakers. An event may be any occurrence that involves or involved the user and a speaker, such as a meeting (e.g., social or professional meeting or gathering) attended by the user and the speaker, an upcoming deadline (e.g., for a project), or the like.

FIG. 23.57 is an example flow diagram of example logic illustrating an example embodiment of process 23.5600 of FIG. 23.56. More particularly, FIG. 23.57 illustrates a process 23.5700 that includes the process 23.5600, wherein the presenting at least some of the conference history information includes operations performed by or at one or more of the following block(s).

At block 23.5701, the process performs informing the user of a previously occurring event and/or a future event that is at least one of a project, a meeting, and/or a deadline.

FIG. 23.58 is an example flow diagram of example logic illustrating an example embodiment of process 23.100 of FIG. 23.1. More particularly, FIG. 23.58 illustrates a process 23.5800 that includes the process 23.100, wherein the determining speaker-related information associated with the multiple speakers includes operations performed by or at one or more of the following block(s).

At block 23.5801, the process performs accessing information items associated with one of the multiple speakers. In some embodiments, accessing information items associated with one of the multiple speakers may include retrieving files, documents, data records, or the like from various sources, such as local or remote storage devices, cloud-based servers, and the like. In some embodiments, accessing information items may also or instead include scanning, searching, indexing, or otherwise processing information items to find ones that include, name, mention, or otherwise reference a speaker.

FIG. 23.59 is an example flow diagram of example logic illustrating an example embodiment of process 23.5800 of FIG. 23.58. More particularly, FIG. 23.59 illustrates a process 23.5900 that includes the process 23.5800, wherein the accessing information items associated with one of the multiple speakers includes operations performed by or at one or more of the following block(s).

At block 23.5901, the process performs searching for information items that reference the one speaker, the information items including at least one of a document, an email, and/or a text message. In some embodiments, searching may include formulating a search query to provide to a document management system or any other data/document store that provides a search interface. In some embodiments, emails or text messages that reference the one speaker may include messages sent from the one speaker, messages sent to the one speaker, messages that name or otherwise identify the one speaker in the body of the message, or the like.

FIG. 23.60 is an example flow diagram of example logic illustrating an example embodiment of process 23.5800 of FIG. 23.58. More particularly, FIG. 23.60 illustrates a process 23.6000 that includes the process 23.5800, wherein the accessing information items associated with one of the multiple speakers includes operations performed by or at one or more of the following block(s).

At block 23.6001, the process performs accessing a social networking service to find messages or status updates that reference the one speaker. In some embodiments, accessing a social networking service may include searching for postings, status updates, personal messages, or the like that have been posted by, posted to, or otherwise reference the one speaker. Example social networking services include Facebook, Twitter, Google Plus, and the like. Access to a social networking service may be obtained via an API or similar interface that provides access to social networking data related to the user and/or the one speaker.

FIG. 23.61 is an example flow diagram of example logic illustrating an example embodiment of process 23.5800 of FIG. 23.58. More particularly, FIG. 23.61 illustrates a process 23.6100 that includes the process 23.5800, wherein the accessing information items associated with one of the multiple speakers includes operations performed by or at one or more of the following block(s).

At block 23.6101, the process performs accessing a calendar to find information about appointments with the one speaker. In some embodiments, accessing a calendar may include searching a private or shared calendar to locate a meeting or other appointment with the one speaker, and providing such information to the user via the conferencing device.

FIG. 23.62 is an example flow diagram of example logic illustrating an example embodiment of process 23.5800 of FIG. 23.58. More particularly, FIG. 23.62 illustrates a process 23.6200 that includes the process 23.5800, wherein the accessing information items associated with one of the multiple speakers includes operations performed by or at one or more of the following block(s).

At block 23.6201, the process performs accessing a document store to find documents that reference the one speaker. In some embodiments, documents that reference the one speaker include those that are authored at least in part by the one speaker, those that name or otherwise identify the speaker in a document body, or the like. Accessing the document store may include accessing a local or remote storage device/system, accessing a document management system, accessing a source control system, or the like.

FIG. 23.63 is an example flow diagram of example logic illustrating an example embodiment of process 23.100 of FIG. 23.1. More particularly, FIG. 23.63 illustrates a process 23.6300 that includes the process 23.100, wherein the receiving data representing speech signals from a voice conference amongst multiple speakers includes operations performed by or at one or more of the following block(s).

At block 23.6301, the process performs receiving audio data from at least one of a telephone, a conference call, an online audio chat, a video conference, and/or a face-to-face conference that includes the multiple speakers, the received audio data representing utterances made by at least one of the multiple speakers. In some embodiments, the process may function in the context of a telephone conference, such as by receiving audio data from a system that facilitates the telephone conference, including a physical or virtual PBX (private branch exchange), a voice over IP conference system, or the like. The process may also or instead function in the context of an online audio chat, a video conference, or a face-to-face conversation.

FIG. 23.64 is an example flow diagram of example logic illustrating an example embodiment of process 23.100 of FIG. 23.1. More particularly, FIG. 23.64 illustrates a process 23.6400 that includes the process 23.100, wherein the receiving data representing speech signals from a voice conference amongst multiple speakers includes operations performed by or at one or more of the following block(s).

At block 23.6401, the process performs receiving data representing speech signals from a voice conference amongst multiple speakers, wherein the multiple speakers are remotely located from one another. In some embodiments, the multiple speakers are remotely located from one another. Two speakers may be remotely located from one another even though they are in the same building or at the same site (e.g., campus, cluster of buildings), such as when the speakers are in different rooms, cubicles, or other locations within the site or building. In other cases, two speakers may be remotely located from one another by being in different cities, states, regions, or the like.

FIG. 23.65 is an example flow diagram of example logic illustrating an example embodiment of process 23.100 of FIG. 23.1. More particularly, FIG. 23.65 illustrates a process 23.6500 that includes the process 23.100, wherein the presenting at least some of the conference history information includes operations performed by or at one or more of the following block(s).

At block 23.6501, the process performs transmitting the conference history information from a first device to a second device having a display. In some embodiments, at least some of the processing may be performed on distinct devices, resulting in a transmission of conference history information from one device to another device, for example from a desktop computer or a cloud-based server to a conferencing device.

FIG. 23.66 is an example flow diagram of example logic illustrating an example embodiment of process 23.6500 of FIG. 23.65. More particularly, FIG. 23.66 illustrates a process 23.6600 that includes the process 23.6500, wherein the transmitting the conference history information from a first device to a second device includes operations performed by or at one or more of the following block(s).

At block 23.6601, the process performs wirelessly transmitting the conference history information. Various protocols may be used, including Bluetooth, infrared, WiFi, or the like.

FIG. 23.67 is an example flow diagram of example logic illustrating an example embodiment of process 23.6500 of FIG. 23.65. More particularly, FIG. 23.67 illustrates a process 23.6700 that includes the process 23.6500, wherein the transmitting the conference history information from a first device to a second device includes operations performed by or at one or more of the following block(s).

At block 23.6701, the process performs transmitting the conference history information from a smart phone to the second device. For example a smart phone may forward the conference history information to a desktop computing system for display on an associated monitor.

FIG. 23.68 is an example flow diagram of example logic illustrating an example embodiment of process 23.6500 of FIG. 23.65. More particularly, FIG. 23.68 illustrates a process 23.6800 that includes the process 23.6500, wherein the transmitting the conference history information from a first device to a second device includes operations performed by or at one or more of the following block(s).

At block 23.6801, the process performs transmitting the conference history information from a server system to the second device. In some embodiments, some portion of the processing is performed on a server system that may be remote from the conferencing device.

FIG. 23.69 is an example flow diagram of example logic illustrating an example embodiment of process 23.6800 of FIG. 23.68. More particularly, FIG. 23.69 illustrates a process 23.6900 that includes the process 23.6800, wherein the transmitting the conference history information from a server system includes operations performed by or at one or more of the following block(s).

At block 23.6901, the process performs transmitting the conference history information from a server system that resides in a data center.

FIG. 23.70 is an example flow diagram of example logic illustrating an example embodiment of process 23.6800 of FIG. 23.68. More particularly, FIG. 23.70 illustrates a process 23.7000 that includes the process 23.6800, wherein the transmitting the conference history information from a server system includes operations performed by or at one or more of the following block(s).

At block 23.7001, the process performs transmitting the conference history information from a server system to a desktop computer, a laptop computer, a mobile device, or a desktop telephone of the user.

FIG. 23.71 is an example flow diagram of example logic illustrating an example embodiment of process 23.100 of FIG. 23.1. More particularly, FIG. 23.71 illustrates a process 23.7100 that includes the process 23.100, and which further includes operations performed by or at the following block(s).

At block 23.7101, the process performs performing the receiving data representing speech signals from a voice conference amongst multiple speakers, the determining speaker-related information associated with the multiple speakers, the recording conference history information based on the speaker-related information, and/or the presenting at least some of the conference history information on a mobile device that is operated by the user. As noted, In some embodiments a computer or mobile device such as a smart phone may have sufficient processing power to perform a portion of the process, such as identifying a speaker, determining the conference history information, or the like.

FIG. 23.72 is an example flow diagram of example logic illustrating an example embodiment of process 23.7100 of FIG. 23.71. More particularly, FIG. 23.72 illustrates a process 23.7200 that includes the process 23.7100, wherein the determining speaker-related information associated with the multiple speakers includes operations performed by or at one or more of the following block(s).

At block 23.7201, the process performs determining speaker-related information associated with the multiple speakers, performed on a smart phone or a media player that is operated by the user.

FIG. 23.73 is an example flow diagram of example logic illustrating an example embodiment of process 23.100 of FIG. 23.1. More particularly, FIG. 23.73 illustrates a process 23.7300 that includes the process 23.100, and which further includes operations performed by or at the following block(s).

At block 23.7301, the process performs performing the receiving data representing speech signals from a voice conference amongst multiple speakers, the determining speaker-related information associated with the multiple speakers, the recording conference history information based on the speaker-related information, and/or the presenting at least some of the conference history information on a general purpose computing device that is operated by the user. For example, in an office setting, a general purpose computing device (e.g., the user's desktop computer, laptop computer) may be configured to perform some or all of the process.

FIG. 23.74 is an example flow diagram of example logic illustrating an example embodiment of process 23.100 of FIG. 23.1. More particularly, FIG. 23.74 illustrates a process 23.7400 that includes the process 23.100, and which further includes operations performed by or at the following block(s).

At block 23.7401, the process performs performing one or more of the receiving data representing speech signals from a voice conference amongst multiple speakers, the determining speaker-related information associated with the multiple speakers, the recording conference history information based on the speaker-related information, and/or the presenting at least some of the conference history information on each of multiple computing systems, wherein each of the multiple systems is associated with one of the multiple speakers. In some embodiments, each of the multiple speakers has his own computing system that performs one or more operations of the method.

FIG. 23.75 is an example flow diagram of example logic illustrating an example embodiment of process 23.100 of FIG. 23.1. More particularly, FIG. 23.75 illustrates a process 23.7500 that includes the process 23.100, and which further includes operations performed by or at the following block(s).

At block 23.7501, the process performs performing one or more of the receiving data representing speech signals from a voice conference amongst multiple speakers, the determining speaker-related information associated with the multiple speakers, the recording conference history information based on the speaker-related information, and/or the presenting at least some of the conference history information within a conference call provider system. In some embodiments, a conference call provider system performs one or more of the operations of the method. For example, a Internet-based conference call system may receive audio data from participants in a voice conference, and perform various processing tasks, including speech recognition, recording conference history information, and the like.

FIG. 23.76 is an example flow diagram of example logic illustrating an example embodiment of process 23.100 of FIG. 23.1. More particularly, FIG. 23.76 illustrates a process 23.7600 that includes the process 23.100, and which further includes operations performed by or at the following block(s).

At block 23.7601, the process performs determining to perform at least some of the receiving data representing speech signals from a voice conference amongst multiple speakers, the determining speaker-related information associated with the multiple speakers, the recording conference history information based on the speaker-related information, and/or the presenting at least some of the conference history information on another computing device that has available processing capacity. In some embodiments, the process may determine to offload some of its processing to another computing device or system.

FIG. 23.77 is an example flow diagram of example logic illustrating an example embodiment of process 23.7600 of FIG. 23.76. More particularly, FIG. 23.77 illustrates a process 23.7700 that includes the process 23.7600, and which further includes operations performed by or at the following block(s).

At block 23.7701, the process performs receiving at least some of speaker-related information or the conference history information from the another computing device. The process may receive the speaker-related information or the conference history information or a portion thereof from the other computing device.

FIG. 23.78 is an example flow diagram of example logic illustrating an example embodiment of process 23.100 of FIG. 23.1. More particularly, FIG. 23.78 illustrates a process 23.7800 that includes the process 23.100, and which further includes operations performed by or at the following block(s).

At block 23.7801, the process performs selecting a portion of the conference history information based on capabilities of a device operated by the user. In some embodiments, the process selects a portion of the recorded conference history information based on device capabilities, such as processing power, memory, display capabilities, or the like.

At block 23.7802, the process performs transmitting the selected portion for presentation on the device operated by the user. The process may then transmit just the selected portion to the device. For example, if a user is using a mobile phone having limited memory, the process may elect not to transmit previously recorded audio to the mobile phone and instead only transmit the text transcription of the voice conference. As another example, if the mobile phone has a limited display, the process may only send information items that can be readily presented on the display.

FIG. 23.79 is an example flow diagram of example logic illustrating an example embodiment of process 23.100 of FIG. 23.1. More particularly, FIG. 23.79 illustrates a process 23.7900 that includes the process 23.100, and which further includes operations performed by or at the following block(s).

At block 23.7901, the process performs performing speech recognition to convert an utterance of one of the multiple speakers into text, the speech recognition performed at a mobile device of the one speaker. In some embodiments, a mobile device (e.g., a cell phone, smart phone) of a speaker may perform speech recognition on the speaker's utterances. As discussed below, the results of the speech recognition may then be transmitted to some remote system or device.

At block 23.7902, the process performs transmitting the text along with an audio representation of the utterance and an identifier of the speaker to a remote conferencing device and/or a conference call system. After having performed the speech recognition, the mobile device may transmit the obtained text along with an identifier of the speaker and the audio representation of the speaker's utterance to a remote system or device. In this manner, the speech recognition load may be distributed among multiple distributed communication devices used by the speakers in the voice conference.

FIG. 23.80 is an example flow diagram of example logic illustrating an example embodiment of process 23.100 of FIG. 23.1. More particularly, FIG. 23.80 illustrates a process 23.8000 that includes the process 23.100, and which further includes operations performed by or at the following block(s).

At block 23.8001, the process performs translating an utterance of one of the multiple speakers in a first language into a message in a second language, based on the speaker-related information. In some embodiments, the process may also perform language translation, such that a voice conference may be held between speakers of different languages. In some embodiments, the utterance may be translated by first performing speech recognition on the data representing the speech signal to convert the utterance into textual form. Then, the text of the utterance may be translated into the second language using a natural language processing and/or machine translation techniques. The speaker-related information may be used to improve, enhance, or otherwise modify the process of machine translation. For example, based on the identity of the one speaker, the process may use a language or speech model that is tailored to the one speaker in order to improve a machine translation process. As another example, the process may use one or more information items that reference the one speaker to improve machine translation, such as by disambiguating references in the utterance of the one speaker.

At block 23.8002, the process performs recording the message in the second language as part of the conference history information. The message may be recorded as part of the conference history information for later presentation. The conference history information may of course be presented in various ways including using audible output (e.g., via text-to-speech processing of the message) and/or using visible output of the message (e.g., via a display screen of the conferencing device or some other device that is accessible to the user).

FIG. 23.81 is an example flow diagram of example logic illustrating an example embodiment of process 23.8000 of FIG. 23.80. More particularly, FIG. 23.81 illustrates a process 23.8100 that includes the process 23.8000, and which further includes operations performed by or at the following block(s).

At block 23.8101, the process performs determining the first language. In some embodiments, the process may determine or identify the first language, possibly prior to performing language translation. For example, the process may determine that the one speaker is speaking in German, so that it can configure a speech recognizer to recognize German language utterances. In some embodiments, determining the first language may include concurrently processing the received data with multiple speech recognizers that are each configured to recognize speech in a different corresponding language (e.g., German, French, Spanish). Then, the process may select as the first language the language corresponding to a speech recognizer of the multiple speech recognizers that produces a result that has a higher confidence level than other of the multiple speech recognizers. In some embodiments, determining the language may be based on one or more of signal characteristics that are correlated with the first language, the location of the user or the speaker, user inputs, or the like.

FIG. 23.82 is an example flow diagram of example logic illustrating an example embodiment of process 23.8000 of FIG. 23.80. More particularly, FIG. 23.82 illustrates a process 23.8200 that includes the process 23.8000, wherein the translating an utterance of one of the multiple speakers in a first language into a message in a second language includes operations performed by or at one or more of the following block(s).

At block 23.8201, the process performs performing speech recognition, based on the speaker-related information, on the data representing the speech signal to convert the utterance in the first language into text representing the utterance in the first language. The speech recognition process may be improved, augmented, or otherwise adapted based on the speaker-related information. In one example, information about vocabulary frequently used by the one speaker may be used to improve the performance of a speech recognizer.

At block 23.8202, the process performs translating, based on the speaker-related information, the text representing the utterance in the first language into text representing the message in the second language. Translating from a first to a second language may also be improved, augmented, or otherwise adapted based on the speaker-related information. For example, when such a translation includes natural language processing to determine syntactic or semantic information about an utterance, such natural language processing may be improved with information about the one speaker, such as idioms, expressions, or other language constructs frequently employed or otherwise correlated with the one speaker.

FIG. 23.83 is an example flow diagram of example logic illustrating an example embodiment of process 23.8200 of FIG. 23.82. More particularly, FIG. 23.83 illustrates a process 23.8300 that includes the process 23.8200, and which further includes operations performed by or at the following block(s).

At block 23.8301, the process performs performing speech synthesis to convert the text representing the utterance in the second language into audio data representing the message in the second language.

At block 23.8302, the process performs causing the audio data representing the message in the second language to be played to the user. The message may be played, for example, via an audio speaker of the conferencing device.

FIG. 23.84 is an example flow diagram of example logic illustrating an example embodiment of process 23.8000 of FIG. 23.80. More particularly, FIG. 23.84 illustrates a process 23.8400 that includes the process 23.8000, wherein the translating an utterance of one of the multiple speakers in a first language into a message in a second language includes operations performed by or at one or more of the following block(s).

At block 23.8401, the process performs translating the utterance based on speaker-related information including a language model that is adapted to the one speaker. A speaker-adapted language model may include or otherwise identify frequent words or patterns of words (e.g., n-grams) based on prior communications or other information about the one speaker. Such a language model may be based on communications or other information generated by or about the one speaker. Such a language model may be employed in the course of speech recognition, natural language processing, machine translation, or the like. Note that the language model need not be unique to the one speaker, but may instead be specific to a class, type, or group of speakers that includes the one speaker. For example, the language model may be tailored for speakers in a particular industry, from a particular region, or the like.

FIG. 23.85 is an example flow diagram of example logic illustrating an example embodiment of process 23.8000 of FIG. 23.80. More particularly, FIG. 23.85 illustrates a process 23.8500 that includes the process 23.8000, wherein the translating an utterance of one of the multiple speakers in a first language into a message in a second language includes operations performed by or at one or more of the following block(s).

At block 23.8501, the process performs translating the utterance based on speaker-related information including a language model adapted to the voice conference. A language model adapted to the voice conference may include or otherwise identify frequent words or patterns of words (e.g., n-grams) based on prior communications or other information about any one or more of the speakers in the voice conference. Such a language model may be based on communications or other information generated by or about the speakers in the voice conference. Such a language model may be employed in the course of speech recognition, natural language processing, machine translation, or the like.

FIG. 23.86 is an example flow diagram of example logic illustrating an example embodiment of process 23.8500 of FIG. 23.85. More particularly, FIG. 23.86 illustrates a process 23.8600 that includes the process 23.8500, wherein the translating the utterance based on speaker-related information including a language model adapted to the voice conference includes operations performed by or at one or more of the following block(s).

At block 23.8601, the process performs generating the language model based on information items by or about any of the multiple speakers, the information items including at least one of emails, documents, and/or social network messages. In some embodiments, the process mines or otherwise processes emails, text messages, voice messages, social network messages, and the like to generate a language model that is tailored to the voice conference.

FIG. 23.87 is an example flow diagram of example logic illustrating an example embodiment of process 23.8000 of FIG. 23.80. More particularly, FIG. 23.87 illustrates a process 23.8700 that includes the process 23.8000, wherein the translating an utterance of one of the multiple speakers in a first language into a message in a second language includes operations performed by or at one or more of the following block(s).

At block 23.8701, the process performs translating the utterance based on speaker-related information including a language model developed with respect to a corpus of related content. In some embodiments, the process may use language models developed with respect to a corpus of related content, such as may be obtained from past voice conferences, academic conferences, documentaries, or the like. For example, if the current voice conference is about a particular technical subject, the process may refer to a language model from a prior academic conference directed to the same technical subject. Such a language model may be based on an analysis of academic papers and/or transcriptions from the academic conference.

FIG. 23.88 is an example flow diagram of example logic illustrating an example embodiment of process 23.8700 of FIG. 23.87. More particularly, FIG. 23.88 illustrates a process 23.8800 that includes the process 23.8700, wherein the corpus of related content is obtained from at least one of a voice conference, an academic conference, a media program, an academic journal, and/or a Web site. For example, the process generate a language model based on papers presented at an academic conference, information presented as part of a documentary or other program, the content of an academic journal, content of a Web site or page that is devoted or directed to particular subject matter (e.g., a Wikipedia page), or the like.

FIG. 23.89 is an example flow diagram of example logic illustrating an example embodiment of process 23.100 of FIG. 23.1. More particularly, FIG. 23.89 illustrates a process 23.8900 that includes the process 23.100, wherein the receiving data representing speech signals from a voice conference amongst multiple speakers includes operations performed by or at one or more of the following block(s).

At block 23.8901, the process performs receiving digital samples of an audio wave captured by a microphone. In some embodiments, the microphone may be a microphone of a conferencing device operated by a speaker. The samples may be raw audio samples or in some compressed format.

FIG. 23.90 is an example flow diagram of example logic illustrating an example embodiment of process 23.100 of FIG. 23.1. More particularly, FIG. 23.90 illustrates a process 23.9000 that includes the process 23.100, wherein the receiving data representing speech signals from a voice conference amongst multiple speakers includes operations performed by or at one or more of the following block(s).

At block 23.9001, the process performs receiving a recorded voice samples from a storage device. In some embodiments, the process receives audio data from a storage device, such as a magnetic disk, a memory, or the like. The audio data may be stored or buffered on the storage device.

FIG. 23.91 is an example flow diagram of example logic illustrating an example embodiment of process 23.100 of FIG. 23.1. More particularly, FIG. 23.91 illustrates a process 23.9100 that includes the process 23.100, wherein the user is one of the multiple speakers. In some embodiments, the user may be a participant in the voice conference, in that the user is also one of the multiple speakers.

FIG. 23.92 is an example flow diagram of example logic illustrating an example embodiment of process 23.100 of FIG. 23.1. More particularly, FIG. 23.92 illustrates a process 23.9200 that includes the process 23.100, wherein the user is not one of the multiple speakers. In some embodiments, the user may not be one of the speakers, such as because the user is observing the voice conference, or because the user is viewing a recording of a previously captured voice conference.

FIG. 23.93 is an example flow diagram of example logic illustrating an example embodiment of process 23.100 of FIG. 23.1. More particularly, FIG. 23.93 illustrates a process 23.9300 that includes the process 23.100, wherein the speaker is not a human. In some embodiments, the speaker may not be a human, but rather an automated device or system, such as a screen reader, an artificial intelligence system, a voice browser, or the like.

FIG. 23.94 is an example flow diagram of example logic illustrating an example embodiment of process 23.100 of FIG. 23.1. More particularly, FIG. 23.94 illustrates a process 23.9400 that includes the process 23.100, and which further includes operations performed by or at the following block(s).

At block 23.9401, the process performs determining to perform one or more of archiving, indexing, searching, removing, redacting, duplicating, or deleting some of the conference history information based on a data retention policy. In some embodiments, the process may determine to perform various operations in accordance with a data retention policy. For example, an organization may elect to record conference history information for all conference calls for a specified time period. In such cases, the process may be configured to automatically delete conference history information after a specified time interval (e.g., one year, six months). As another example, the process may redact the names or other identifiers of speakers in the conference history information associated with a conference call.

C. Example Computing System Implementation

Figure 24:
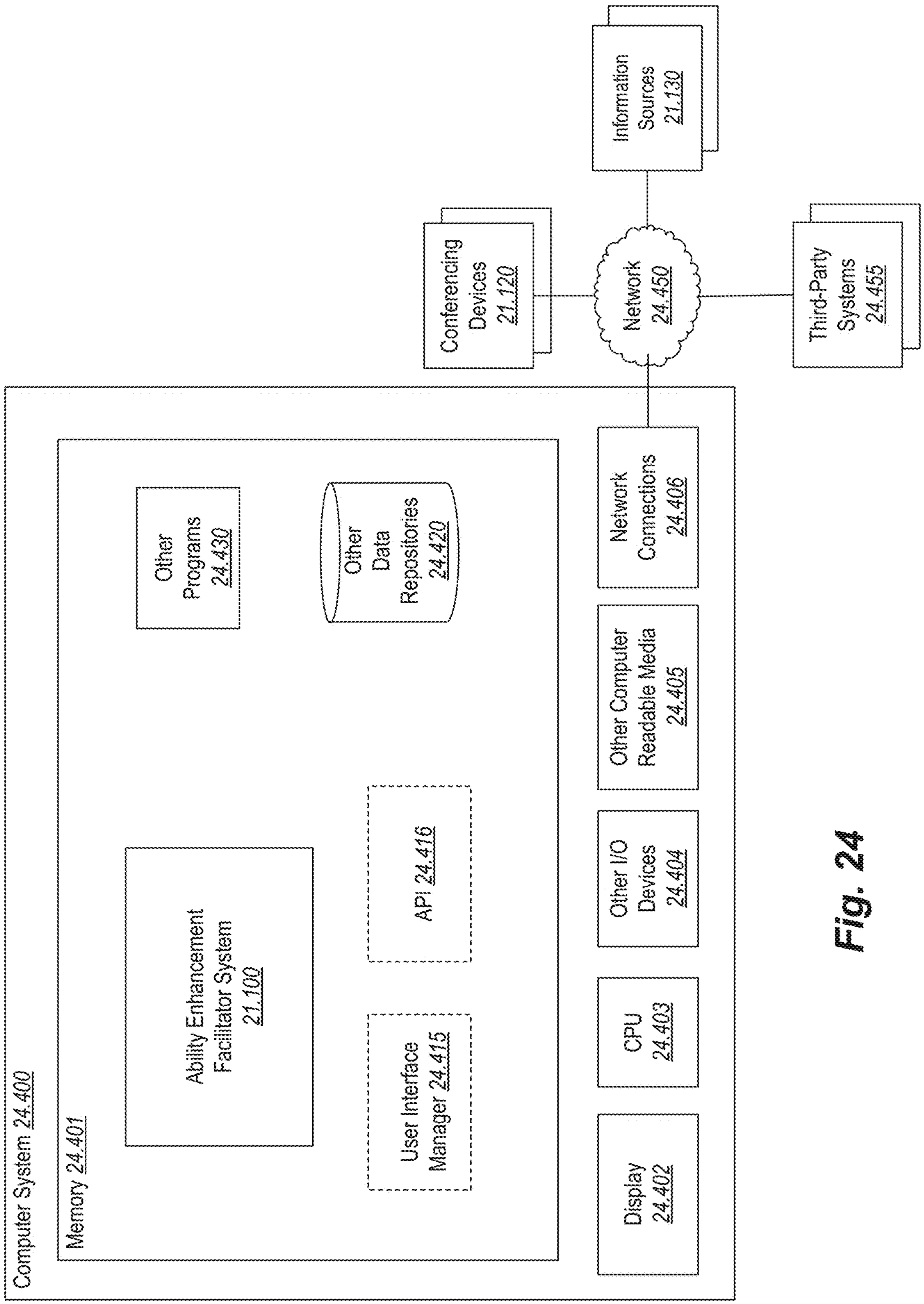
FIG. 24 is an example block diagram of an example computing system for implementing an ability enhancement facilitator system according to an example embodiment.

FIG. 24 is an example block diagram of an example computing system for implementing an ability enhancement facilitator system according to an example embodiment. In particular, FIG. 24 shows a computing system 24.400 that may be utilized to implement an AEFS 21.100.

Note that one or more general purpose or special purpose computing systems/devices may be used to implement the AEFS 21.100. In addition, the computing system 24.400 may comprise one or more distinct computing systems/devices and may span distributed locations. Furthermore, each block shown may represent one or more such blocks as appropriate to a specific embodiment or may be combined with other blocks. Also, the AEFS 21.100 may be implemented in software, hardware, firmware, or in some combination to achieve the capabilities described herein.

In the embodiment shown, computing system 24.400 comprises a computer memory ("memory") 24.401, a display 24.402, one or more Central Processing Units ("CPU") 24.403, Input/Output devices 24.404 (e.g., keyboard, mouse, CRT or LCD display, and the like), other computer-readable media 24.405, and network connections 24.406. The AEFS 21.100 is shown residing in memory 24.401. In other embodiments, some portion of the contents, some or all of the components of the AEFS 21.100 may be stored on and/or transmitted over the other computer-readable media 24.405. The components of the AEFS 21.100 preferably execute on one or more CPUs 24.403 and facilitate ability enhancement, as described herein. Other code or programs 24.430 (e.g., an administrative interface, a Web server, and the like) and potentially other data repositories, such as data repository 24.420, also reside in the memory 24.401, and preferably execute on one or more CPUs 24.403. Of note, one or more of the components in FIG. 24 may not be present in any specific implementation. For example, some embodiments may not provide other computer readable media 24.405 or a display 24.402.

The AEFS 21.100 interacts via the network 24.450 with conferencing devices 21.120, speaker-related information sources 21.130, and third-party systems/applications 24.455. The network 24.450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 24.455 may include any systems that provide data to, or utilize data from, the AEFS 21.100, including Web browsers, e-commerce sites, calendar applications, email systems, social networking services, and the like.

The AEFS 21.100 is shown executing in the memory 24.401 of the computing system 24.400. Also included in the memory are a user interface manager 24.415 and an application program interface ("API") 24.416. The user interface manager 24.415 and the API 24.416 are drawn in dashed lines to indicate that in other embodiments, functions performed by one or more of these components may be performed externally to the AEFS 21.100.

The UI manager 24.415 provides a view and a controller that facilitate user interaction with the AEFS 21.100 and its various components. For example, the UI manager 24.415 may provide interactive access to the AEFS 21.100, such that users can configure the operation of the AEFS 21.100, such as by providing the AEFS 21.100 credentials to access various sources of speaker-related information, including social networking services, email systems, document stores, or the like. In some embodiments, access to the functionality of the UI manager 24.415 may be provided via a Web server, possibly executing as one of the other programs 24.430. In such embodiments, a user operating a Web browser executing on one of the third-party systems 24.455 can interact with the AEFS 21.100 via the UI manager 24.415.

The API 24.416 provides programmatic access to one or more functions of the AEFS 21.100. For example, the API 24.416 may provide a programmatic interface to one or more functions of the AEFS 21.100 that may be invoked by one of the other programs 24.430 or some other module. In this manner, the API 24.416 facilitates the development of third-party software, such as user interfaces, plug-ins, adapters (e.g., for integrating functions of the AEFS 21.100 into Web applications), and the like.

In addition, the API 24.416 may be in at least some embodiments invoked or otherwise accessed via remote entities, such as code executing on one of the conferencing devices 21.120, information sources 21.130, and/or one of the third-party systems/applications 24.455, to access various functions of the AEFS 21.100. For example, an information source 21.130 may push speaker-related information (e.g., emails, documents, calendar events) to the AEFS 21.100 via the API 24.416. The API 24.416 may also be configured to provide management widgets (e.g., code modules) that can be integrated into the third-party applications 24.455 and that are configured to interact with the AEFS 21.100 to make at least some of the described functionality available within the context of other applications (e.g., mobile apps).

In an example embodiment, components/modules of the AEFS 21.100 are implemented using standard programming techniques. For example, the AEFS 21.100 may be implemented as a "native" executable running on the CPU 24.403, along with one or more static or dynamic libraries. In other embodiments, the AEFS 21.100 may be implemented as instructions processed by a virtual machine that executes as one of the other programs 24.430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 21.100, such as in the data store 24.420 (or 22.240), can be available by standard mechanisms such as through C, C++, C #, and Java APIs; libraries for accessing files, databases, or other data repositories; through scripting languages such as XML; or through Web servers, FTP servers, or other types of servers providing access to stored data. The data store 24.420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 21.100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

VII. Vehicular Threat Detection Based on Image Analysis

Embodiments described herein provide enhanced computer- and network-based methods and systems for ability enhancement and, more particularly, for enhancing a user's ability to operate or function in a transportation-related context (e.g., as a pedestrian or vehicle operator) by performing vehicular threat detection based at least in part on analyzing image data that represents vehicles and other objects present in a roadway or other context. Example embodiments provide an Ability Enhancement Facilitator System ("AEFS"). Embodiments of the AEFS may augment, enhance, or improve the senses (e.g., hearing), faculties (e.g., memory, language comprehension), and/or other abilities (e.g., driving, riding a bike, walking/running) of a user.

In some embodiments, the AEFS is configured to identify threats (e.g., posed by vehicles to a user of a roadway, posed by a user to vehicles or other users of a roadway), and to provide information about such threats to the user so that he may take evasive action. Identifying threats may include analyzing information about a vehicle that is present in the roadway in order to determine whether the user and the vehicle may be on a collision course. The analyzed information may include or be represented by image data (e.g., pictures or video of a roadway and its surrounding environment), audio data (e.g., sounds reflected from or emitted by a vehicle), range information (e.g., provided by a sonar or infrared range sensor), conditions information (e.g., weather, temperature, time of day), or the like. The user may be a pedestrian (e.g., a walker, a jogger), an operator of a motorized (e.g., car, motorcycle, moped, scooter) or non-motorized vehicle (e.g., bicycle, pedicab, rickshaw), a vehicle passenger, or the like. In some embodiments, the vehicle may be operating autonomously. In some embodiments, the user wears a wearable device (e.g., a helmet, goggles, eyeglasses, hat) that is configured to at least present determined vehicular threat information to the user.

In some embodiments, the AEFS is configured to receive image data, at least some of which represents and image of a first vehicle. The image data may be obtained from various sources, including a camera of a wearable device of a user, a camera on a vehicle of the user, an in-situ road-side camera, a camera on some other vehicle, or the like. The image data may represent electromagnetic signals of various types or in various ranges, including visual signals (e.g., signals having a wavelength in the range of about 390-750 nm), infrared signals (e.g., signals having a wavelength in the range of about 750 nm-300 micrometers), or the like.

Then, the AEFS determines vehicular threat information based at least in part on the image data. In some embodiments, the AEFS may analyze the received image data in order to identify the first vehicle and/or to determine whether the first vehicle represents a threat to the user, such as because the first vehicle and the user may be on a collision course. The image data may be analyzed in various ways, including by identifying objects (e.g., to recognize that a vehicle or some other object is shown in the image data), determining motion-related information (e.g., position, velocity, acceleration, mass) about objects, or the like.

Next, the AEFS informs the user of the determined vehicular threat information via a wearable device of the user. Typically, the user's wearable device (e.g., a helmet) will include one or more output devices, such as audio speakers, visual display devices (e.g., warning lights, screens, heads-up displays), haptic devices, and the like. The AEFS may present the vehicular threat information via one or more of these output devices. For example, the AEFS may visually display or speak the words "Car on left." As another example, the AEFS may visually display a leftward pointing arrow on a heads-up screen displayed on a face screen of the user's helmet. Presenting the vehicular threat information may also or instead include presenting a recommended course of action (e.g., to slow down, to speed up, to turn) to mitigate the determined vehicular threat.

The AEFS may use other or additional sources or types of information. For example, in some embodiments, the AEFS is configured to receive data representing an audio signal emitted by a first vehicle. The audio signal is typically obtained in proximity to a user, who may be a pedestrian or traveling in a vehicle as an operator or a passenger. In some embodiments, the audio signal is obtained by one or more microphones coupled to the user's vehicle and/or a wearable device of the user, such as a helmet, goggles, a hat, a media player, or the like. Then, the AEFS may determine vehicular threat information based at least in part on the data representing the audio signal. In some embodiments, the AEFS may analyze the received data in order to determine whether the first vehicle and the user are on a collision course. The audio data may be analyzed in various ways, including by performing audio analysis, frequency analysis (e.g., Doppler analysis), acoustic localization, or the like.

The AEFS may combine information of various types in order to determine vehicular threat information. For example, because image processing may be computationally expensive, rather than always processing all image data obtained from every possible source, the AEFS may use audio analysis to initially determine the approximate location of an oncoming vehicle, such as to the user's left, right, or rear. For example, having determined based on audio data that a vehicle may be approaching from the rear of the user, the AEFS may preferentially process image data from a rear-facing camera to further refine a threat analysis. As another example, the AEFS may incorporate information about the condition of a roadway (e.g., icy or wet) when determining whether a vehicle will be able to stop or maneuver in order to avoid an accident.

A. Ability Enhancement Facilitator System Overview

Figure 25A:
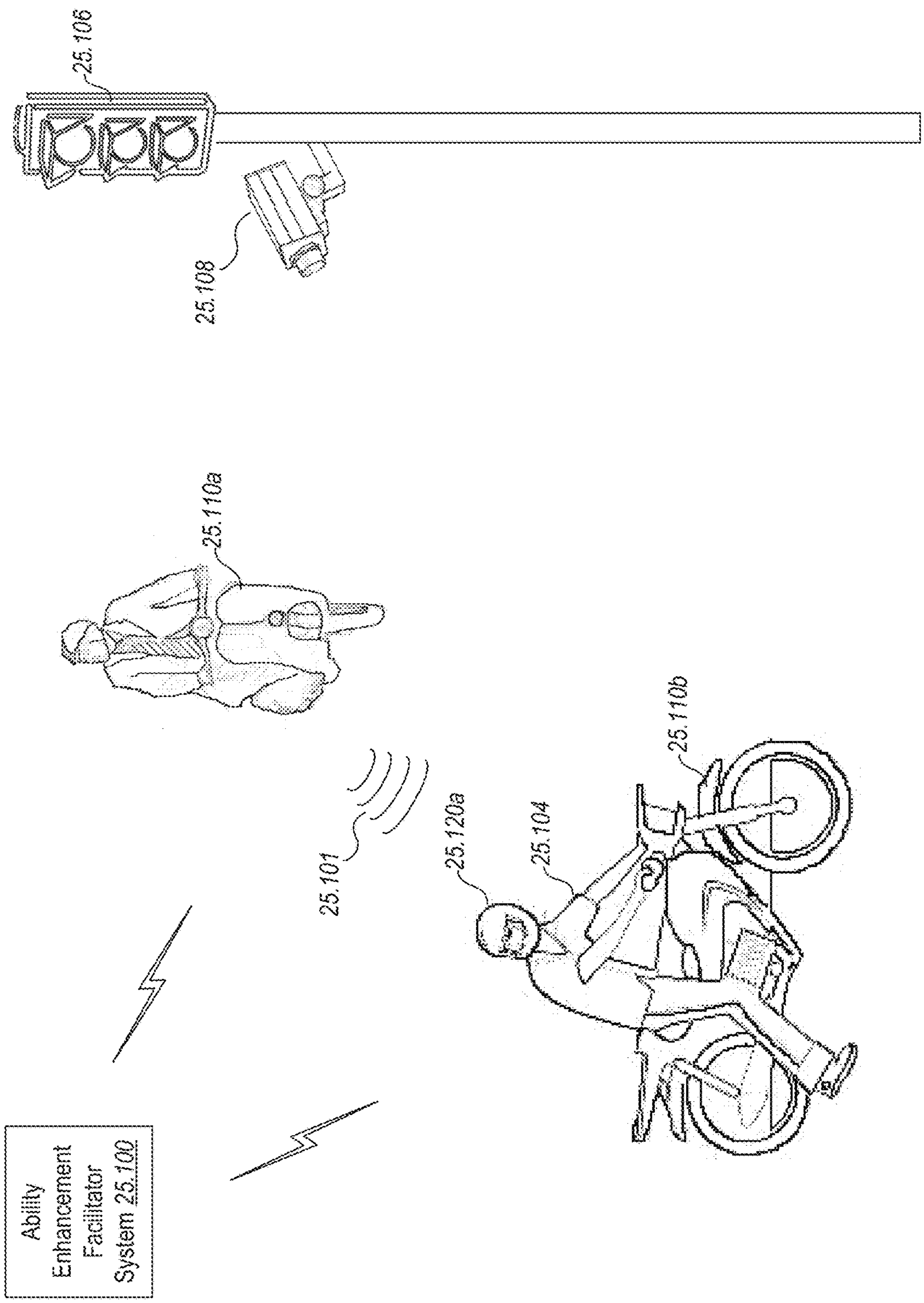
FIGS. 25A and 25B are various views of an example ability enhancement scenario according to an example embodiment.
Figure 25B:
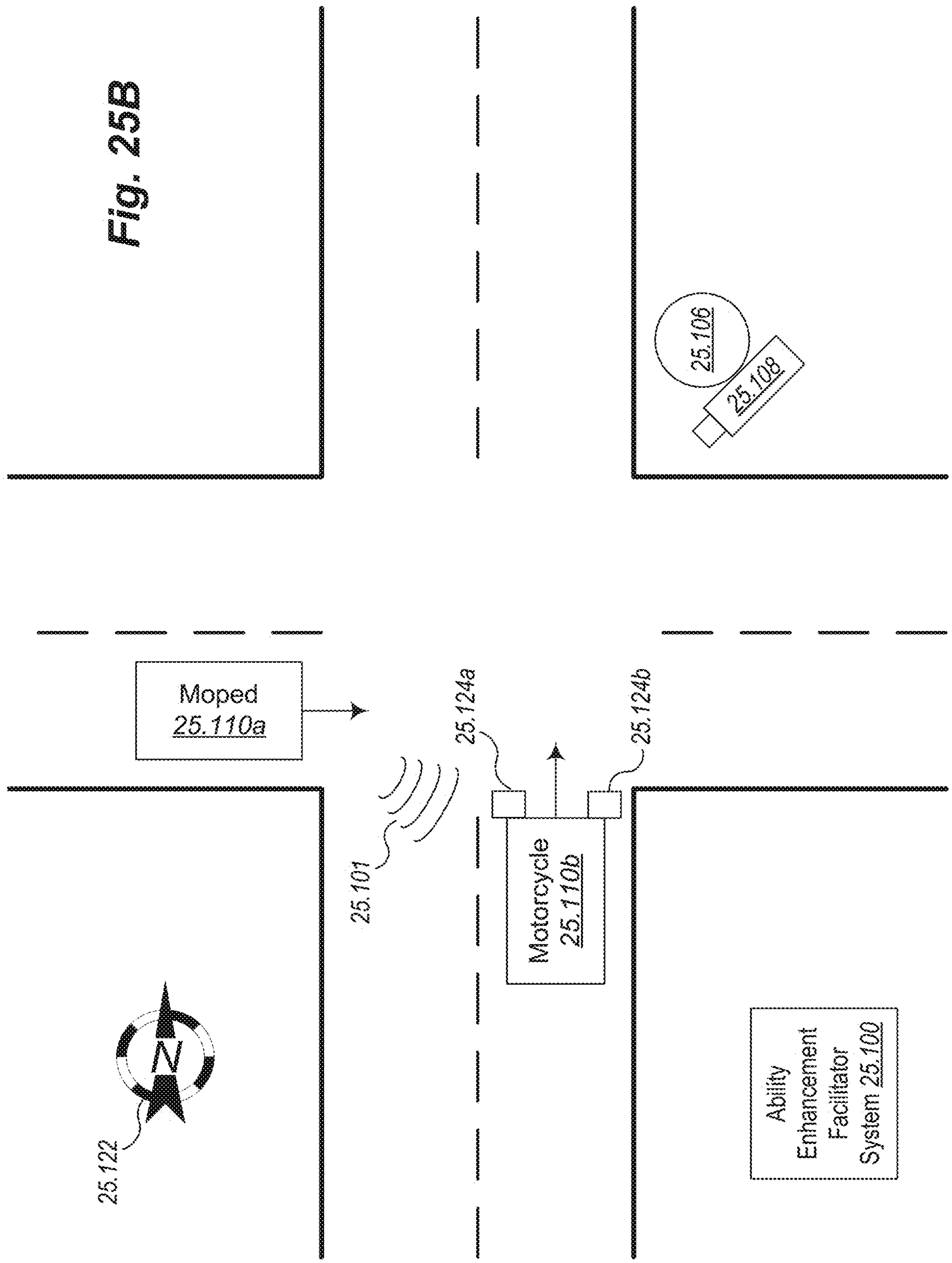

FIGS. 25A and 25B are various views of an example ability enhancement scenario according to an example embodiment. More particularly, FIGS. 25A and 25B respectively are perspective and top views of a traffic scenario which may result in a collision between two vehicles.

FIG. 25A is a perspective view of an example traffic scenario according to an example embodiment. The illustrated scenario includes two vehicles 25.110*a* (a moped) and 25.110*b* (a motorcycle). The motorcycle 25.110*b* is being ridden by a user 25.104 who is wearing a wearable device 25.120*a* (a helmet). An Ability Enhancement Facilitator System ("AEFS") 25.100 is enhancing the ability of the user 25.104 to operate his vehicle 25.110*b* via the wearable device 25.120*a*. The example scenario also includes a traffic signal 25.106 upon which is mounted a camera 25.108.

In this example, the moped 25.110*a* is driving towards the motorcycle 25.110*b* from a side street, at approximately a right angle with respect to the path of travel of the motorcycle 25.110*b*. The traffic signal 25.106 has just turned from red to green for the motorcycle 25.110*b*, and the user 25.104 is beginning to drive the motorcycle 25.110 into the intersection controlled by the traffic signal 25.106. The user 25.104 is assuming that the moped 25.110*a* will stop, because cross traffic will have a red light. However, in this example, the moped 25.110*a* may not stop in a timely manner, for one or more reasons, such as because the operator of the moped 25.110*a* has not seen the red light, because the moped 25.110*a* is moving at an excessive rate, because the operator of the moped 25.110*a* is impaired, because the surface conditions of the roadway are icy or slick, or the like. As will be discussed further below, the AEFS 25.100 will determine that the moped 25.110*a* and the motorcycle 25.110*b* are likely on a collision course, and inform the user 25.104 of this threat via the helmet 25.120*a*, so that the user may take evasive action to avoid a possible collision with the moped 25.110*a*.

The moped 25.110 emits or reflects a signal 25.101. In some embodiments, the signal 25.101 is an electromagnetic signal in the visible light spectrum that represents an image of the moped 25.110*a*. Other types of electromagnetic signals may be received and processed, including infrared radiation, radio waves, microwaves, or the like. Other types of signals are contemplated, including audio signals, such as an emitted engine noise, a reflected sonar signal, a vocalization (e.g., shout, scream), etc. The signal 25.101 may be received by a receiving detector/device/sensor, such as a camera or microphone (not shown) on the helmet 25.120*a* and/or the motorcycle 25.110*b*. In some embodiments, a computing and communication device within the helmet 25.120*a* receives and samples the signal 25.101 and transmits the samples or other representation to the AEFS 25.100. In other embodiments, other forms of data may be used to represent the signal 25.101, including frequency coefficients, compressed audio/video, or the like.

The AEFS 25.100 determines vehicular threat information by analyzing the received data that represents the signal 25.101. If the signal 25.101 is a visual signal, then the AEFS 25.100 may employ various image data processing techniques. For example, the AEFS 25.100 may perform object recognition to determine that received image data includes an image of a vehicle, such as the moped 25.110*a*. The AEFS 25.100 may also or instead process received image data to determine motion-related information with respect to the moped 25.110, including position, velocity, acceleration, or the like. The AEFS 25.100 may further identify the presence of other objects, including pedestrians, animals, structures, or the like, that may pose a threat to the user 25.104 or that may be themselves threatened (e.g., by actions of the user 25.104 and/or the moped 25.110*a*). Image processing also may be employed to determine other information, including road conditions (e.g., wet or icy roads), visibility conditions (e.g., glare or darkness), and the like.

If the signal 25.101 is an audio signal, then the AEFS 25.100 may use one or more audio analysis techniques to determine the vehicular threat information. In one embodiment, the AEFS 25.100 performs a Doppler analysis (e.g., by determining whether the frequency of the audio signal is increasing or decreasing) to determine that the object that is emitting the audio signal is approaching (and possibly at what rate) the user 25.104. In some embodiments, the AEFS 25.100 may determine the type of vehicle (e.g., a heavy truck, a passenger vehicle, a motorcycle, a moped) by analyzing the received data to identify an audio signature that is correlated with a particular engine type or size. For example, a lower frequency engine sound may be correlated with a larger vehicle size, and a higher frequency engine sound may be correlated with a smaller vehicle size.

In one embodiment, where the signal 25.101 is an audio signal, the AEFS 25.100 performs acoustic source localization to determine information about the trajectory of the moped 25.110*a*, including one or more of position, direction of travel, speed, acceleration, or the like. Acoustic source localization may include receiving data representing the audio signal 25.101 as measured by two or more microphones. For example, the helmet 25.120*a* may include four microphones (e.g., front, right, rear, and left) that each receive the audio signal 25.101. These microphones may be directional, such that they can be used to provide directional information (e.g., an angle between the helmet and the audio source). Such directional information may then be used by the AEFS 25.100 to triangulate the position of the moped 25.110*a*. As another example, the AEFS 25.100 may measure differences between the arrival time of the audio signal 25.101 at multiple distinct microphones on the helmet 25.120*a* or other location. The difference in arrival time, together with information about the distance between the microphones, can be used by the AEFS 25.100 to determine distances between each of the microphones and the audio source, such as the moped 25.110*a*. Distances between the microphones and the audio source can then be used to determine one or more locations at which the audio source may be located.

Determining vehicular threat information may also or instead include obtaining information such as the position, trajectory, and speed of the user 25.104, such as by receiving data representing such information from sensors, devices, and/or systems on board the motorcycle 25.110*b* and/or the helmet 25.120*a*. Such sources of information may include a speedometer, a geo-location system (e.g., GPS system), an accelerometer, or the like. Once the AEFS 25.100 has determined and/or obtained information such as the position, trajectory, and speed of the moped 25.110*a* and the user 25.104, the AEFS 25.100 may determine whether the moped

25.110*a* and the user 25.104 are likely to collide with one another. For example, the AEFS 25.100 may model the expected trajectories of the moped 25.110*a* and user 25.104 to determine whether they intersect at or about the same point in time.

The AEFS 25.100 may then present the determined vehicular threat information (e.g., that the moped 25.110*a* represents a hazard) to the user 25.104 via the helmet 25.120*a*. Presenting the vehicular threat information may include transmitting the information to the helmet 25.120*a*, where it is received and presented to the user. In one embodiment, the helmet 25.120*a* includes audio speakers that may be used to output an audio signal (e.g., an alarm or voice message) warning the user 25.104. In other embodiments, the helmet 25.120*a* includes a visual display, such as a heads-up display presented upon a face screen of the helmet 25.120*a*, which can be used to present a text message (e.g., "Look left") or an icon (e.g., a red arrow pointing left).

The AEFS 25.100 may also use information received from in-situ sensors and/or devices. For example, the AEFS 25.100 may use information received from a camera 25.108 that is mounted on the traffic signal 25.106 that controls the illustrated intersection. The AEFS 25.100 may receive image data that represents the moped 25.110*a* and/or the motorcycle 25.110*b*. The AEFS 25.100 may perform image recognition to determine the type and/or position of a vehicle that is approaching the intersection. The AEFS 25.100 may also or instead analyze multiple images (e.g., from a video signal) to determine the velocity of a vehicle. Other types of sensors or devices installed in or about a roadway may also or instead by used, including range sensors, speed sensors (e.g., radar guns), induction coils (e.g., mounted in the roadbed), temperature sensors, weather gauges, or the like.

FIG. 25B is a top view of the traffic scenario described with respect to FIG. 25A, above. FIG. 25B includes a legend 25.122 that indicates the compass directions. In this example, moped 25.110*a* is traveling eastbound and is about to enter the intersection. Motorcycle 25.110*b* is traveling northbound and is also about to enter the intersection. Also shown are the signal 25.101, the traffic signal 25.106, and the camera 25.108.

As noted above, the AEFS 25.100 may utilize data that represents a signal as detected by one or more detectors/sensors, such as microphones or cameras. In the example of FIG. 25B, the motorcycle 25.110*b* includes two sensors 25.124*a* and 25.124*b*, respectively mounted at the front left and front right of the motorcycle 25.110*b*.

In an image context, the AEFS 25.100 may perform image processing on image data obtained from one or more of the camera sensors 25.124*a* and 25.124*b*. As discussed, the image data may be processed to determine the presence of the moped, its type, its motion-related information (e.g., velocity), and the like. In some embodiments, image data may be processed without making any definite identification of a vehicle. For example, the AEFS 25.100 may process image data from sensors 25.124*a* and 25.124*b* to identify the presence of motion (without necessarily identifying any objects). Based on such an analysis, the AEFS 25.100 may determine that there is something approaching from the left of the motorcycle 25.110*b*, but that the right of the motorcycle 25.110*b* is relatively clear.

Differences between data obtained from multiple sensors may be exploited in various ways. In an image context, an image signal may be perceived or captured differently by the two (camera) sensors 25.124*a* and 25.124*b*. The AEFS 25.100 may exploit or otherwise analyze such differences to determine the location and/or motion of the moped 25.110*a*. For example, knowing the relative position and optical qualities of the two cameras, it is possible to analyze images captured by those cameras to triangulate a position of an object (e.g., the moped 25.110*a*) or a distance between the motorcycle 25.110*b* and the object.

In an audio context, an audio signal may be perceived differently by the two sensors 25.124*a* and 25.124*b*. For example, if the strength of the signal 25.101 is stronger as measured at microphone 25.124*a* than at microphone 25.124*b*, the AEFS 25.100 may infer that the signal 25.101 is originating from the driver's left of the motorcycle 25.110*b*, and thus that a vehicle is approaching from that direction. As another example, as the strength of an audio signal is known to decay with distance, and assuming an initial level (e.g., based on an average signal level of a vehicle engine) the AEFS 25.100 may determine a distance (or distance interval) between one or more of the microphones and the signal source.

The AEFS 25.100 may model vehicles and other objects, such as by representing their motion-related information, including position, speed, acceleration, mass and other properties. Such a model may then be used to determine whether objects are likely to collide. Note that the model may be probabilistic. For example the AEFS 25.100 may represent an object's position in space as a region that includes multiple positions that each have a corresponding likelihood that that the object is at that position. As another example, the AEFS 25.100 may represent the velocity of an object as a range of likely values, a probability distribution, or the like. Various frames of reference may be employed, including a user-centric frame, an absolute frame, or the like.

Figure 25C:
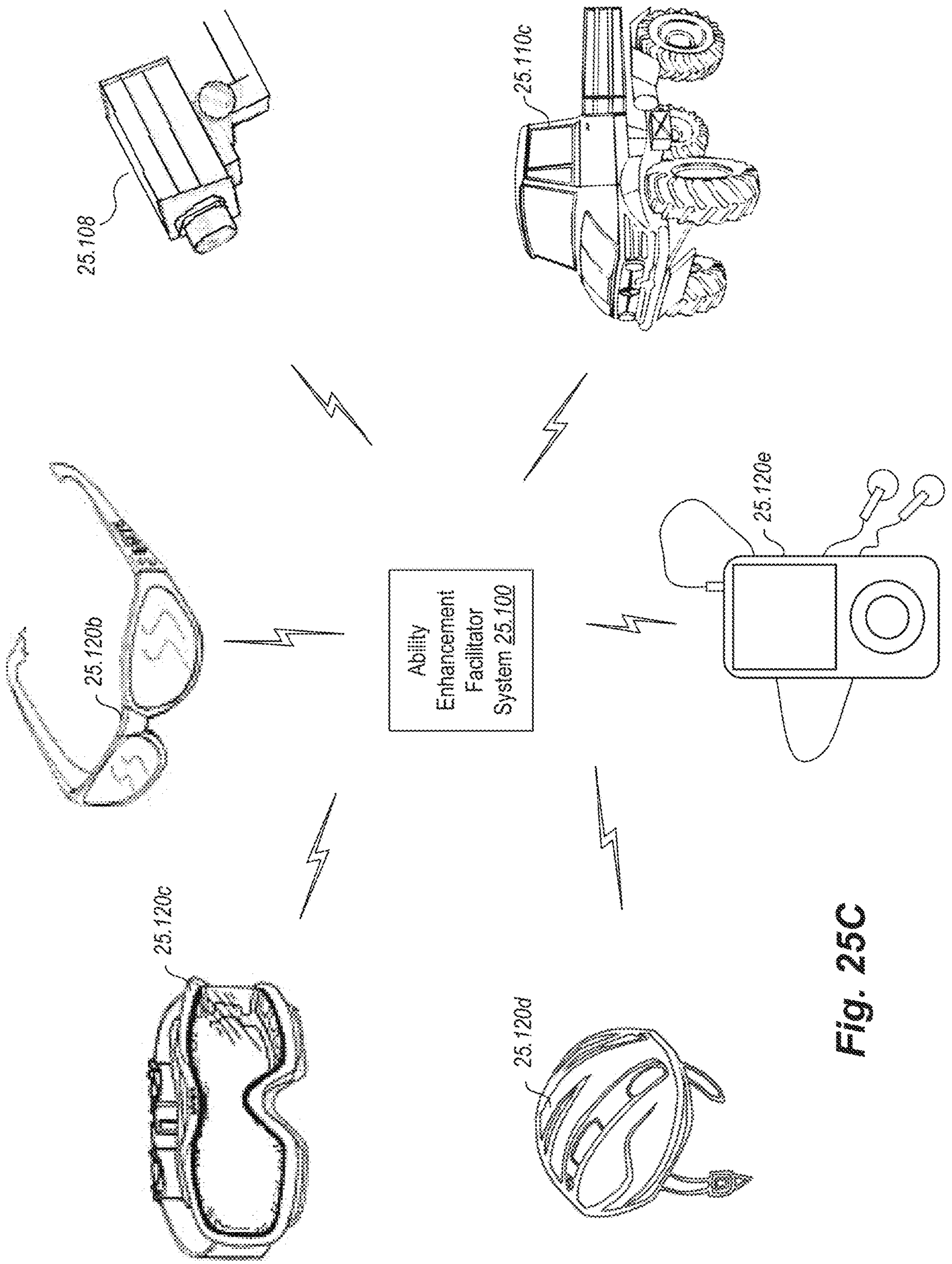
FIG. 25C is an example block diagram illustrating various devices in communication with an ability enhancement facilitator system according to example embodiments.

FIG. 25C is an example block diagram illustrating various devices in communication with an ability enhancement facilitator system according to example embodiments. In particular, FIG. 25C illustrates an AEFS 25.100 in communication with a variety of wearable devices 25.120*b*-120*e*, a camera 25.108, and a vehicle 25.110*c*.

The AEFS 25.100 may interact with various types of wearable devices 25.120, including a motorcycle helmet 25.120*a* (FIG. 25A), eyeglasses 25.120*b*, goggles 25.120*c*, a bicycle helmet 25.120*d*, a personal media device 25.120*e*, or the like. Wearable devices 25.120 may include any device modified to have sufficient computing and communication capability to interact with the AEFS 25.100, such as by presenting vehicular threat information received from the AEFS 25.100, providing data (e.g., audio data) for analysis to the AEFS 25.100, or the like.

In some embodiments, a wearable device may perform some or all of the functions of the AEFS 25.100, even though the AEFS 25.100 is depicted as separate in these examples. Some devices may have minimal processing power and thus perform only some of the functions. For example, the eyeglasses 25.120*b* may receive vehicular threat information from a remote AEFS 25.100, and display it on a heads-up display displayed on the inside of the lenses of the eyeglasses 25.120*b*. Other wearable devices may have sufficient processing power to perform more of the functions of the AEFS 25.100. For example, the personal media device 25.120*e* may have considerable processing power and as such be configured to perform acoustic source localization, collision detection analysis, or other more computational expensive functions.

Note that the wearable devices 25.120 may act in concert with one another or with other entities to perform functions of the AEFS 25.100. For example, the eyeglasses 25.120*b* may include a display mechanism that receives and displays vehicular threat information determined by the personal media device 25.120*e*. As another example, the goggles 25.120*c* may include a display mechanism that receives and displays vehicular threat information determined by a computing device in the helmet 25.120*a* or 25.120*d*. In a further example, one of the wearable devices 25.120 may receive and process audio data received by microphones mounted on the vehicle 25.110*c*.

The AEFS 25.100 may also or instead interact with vehicles 25.110 and/or computing devices installed thereon. As noted, a vehicle 25.110 may have one or more sensors or devices that may operate as (direct or indirect) sources of information for the AEFS 25.100. The vehicle 25.110*c*, for example, may include a speedometer, an accelerometer, one or more microphones, one or more range sensors, or the like. Data obtained by, at, or from such devices of vehicle 25.110*c* may be forwarded to the AEFS 25.100, possibly by a wearable device 25.120 of an operator of the vehicle 25.110*c*.

In some embodiments, the vehicle 25.110*c* may itself have or use an AEFS, and be configured to transmit warnings or other vehicular threat information to others. For example, an AEFS of the vehicle 25.110*c* may have determined that the moped 25.110*a* was driving with excessive speed just prior to the scenario depicted in FIG. 25B. The AEFS of the vehicle 25.110*c* may then share this information, such as with the AEFS 25.100. The AEFS 25.100 may accordingly receive and exploit this information when determining that the moped 25.110*a* poses a threat to the motorcycle 25.110*b*.

The AEFS 25.100 may also or instead interact with sensors and other devices that are installed on, in, or about roads or in other transportation related contexts, such as parking garages, racetracks, or the like. In this example, the AEFS 25.100 interacts with the camera 25.108 to obtain images of vehicles, pedestrians, or other objects present in a roadway. Other types of sensors or devices may include range sensors, infrared sensors, induction coils, radar guns, temperature gauges, precipitation gauges, or the like.

The AEFS 25.100 may further interact with information systems that are not shown in FIG. 25C. For example, the AEFS 25.100 may receive information from traffic information systems that are used to report traffic accidents, road conditions, construction delays, and other information about road conditions. The AEFS 25.100 may receive information from weather systems that provide information about current weather conditions. The AEFS 25.100 may receive and exploit statistical information, such as that drivers in particular regions are more aggressive, that red light violations are more frequent at particular intersections, that drivers are more likely to be intoxicated at particular times of day or year, or the like.

In some embodiments, the AEFS 25.100 may transmit information to law enforcement agencies and/or related computing systems. For example, if the AEFS 25.100 determines that a vehicle is driving erratically, it may transmit that fact along with information about the vehicle (e.g., make, model, color, license plate number, location) to a police computing system.

Note that in some embodiments, at least some of the described techniques may be performed without the utilization of any wearable devices 25.120. For example, a vehicle 25.110 may itself include the necessary computation, input, and output devices to perform functions of the AEFS 25.100. For example, the AEFS 25.100 may present vehicular threat information on output devices of a vehicle 25.110, such as a radio speaker, dashboard warning light, heads-up display, or the like. As another example, a computing device on a vehicle 25.110 may itself determine the vehicular threat information.

Figure 25D:
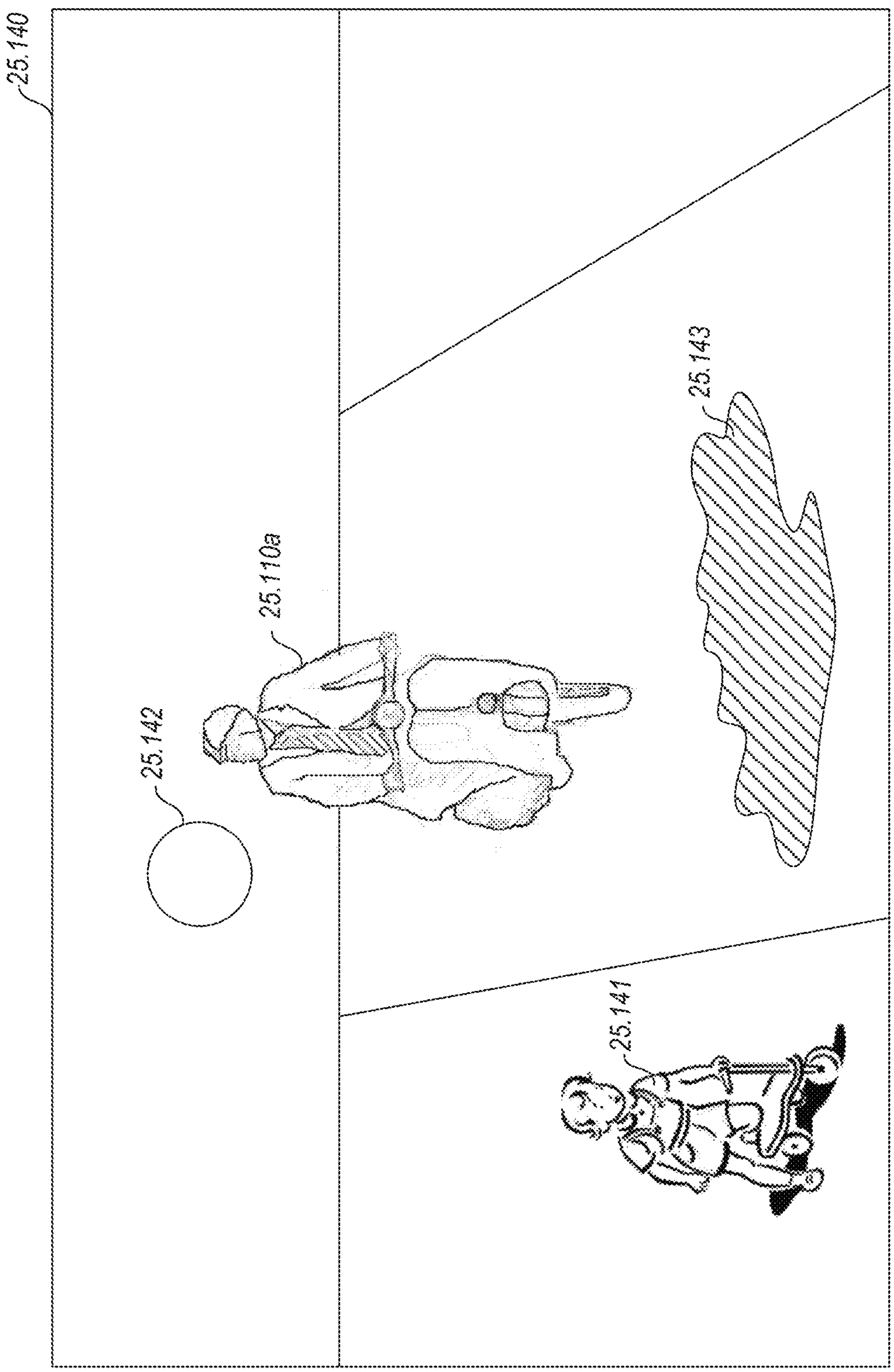
FIG. 25D is an example diagram illustrating an example image processed according to an example embodiment.

FIG. 25D is an example diagram illustrating an example image processed according to an example embodiment. In particular, FIG. 25D depicts an image 25.140 of the moped 25.110*a*. This image may be obtained from a camera (e.g., sensor 25.124*a*) on the left side of the motorcycle 25.110*b* in the scenario of FIG. 25B. Also visible in the image 25.140 are a child 25.141 on a scooter, the sun 25.142, and a puddle 25.143. The sun 25.142 is setting in the west, and is thus low in the sky, appearing nearly behind the moped 25.110*a*. In such conditions, visibility for the user 25.104 (not shown here) would be quite difficult.

In some embodiments, the AEFS 25.100 processes the image 25.140 to perform object identification. Upon processing the image 25.140, the AEFS 25.100 may identify the moped 25.110*a*, the child 25.141, the sun 25.142, and/or the puddle 25.143. A sequence of images, taken at different times (e.g., one tenth of a second apart) may be used to determine that the moped 25.110*a* is moving, how fast the moped 25.110*a* is moving, acceleration/deceleration of the moped 25.110*a*, or the like. Motion of other objects, such as the child 25.141 may also be tracked. Based on such motion-related information, the AEFS 25.100 may model the physics of the identified objects to determine whether a collision is likely.

Determining vehicular threat information may also or instead be based on factors related or relevant to objects other than the moped 25.110*a* or the user 25.104. For example, the AEFS 25.100 may determine that the puddle 25.143 will likely make it more difficult for the moped 25.110*a* to stop. Thus, even if the moped 25.110*a* is moving at a reasonable speed, he still may be unable to stop prior to entering the intersection due to the presence of the puddle 25.143. As another example, the AEFS 25.100 may determine that evasive action by the user 25.104 and/or the moped 25.110*a* may cause injury to the child 25.141. As a further example, the AEFS 25.100 may determine that it may be difficult for the user 25.104 to see the moped 25.110*a* and/or the child 25.141 due to the position of the sun 25.142. Such information may be incorporated into any models, predictions, or determinations made or maintained by the AEFS 25.100.

Figure 26:
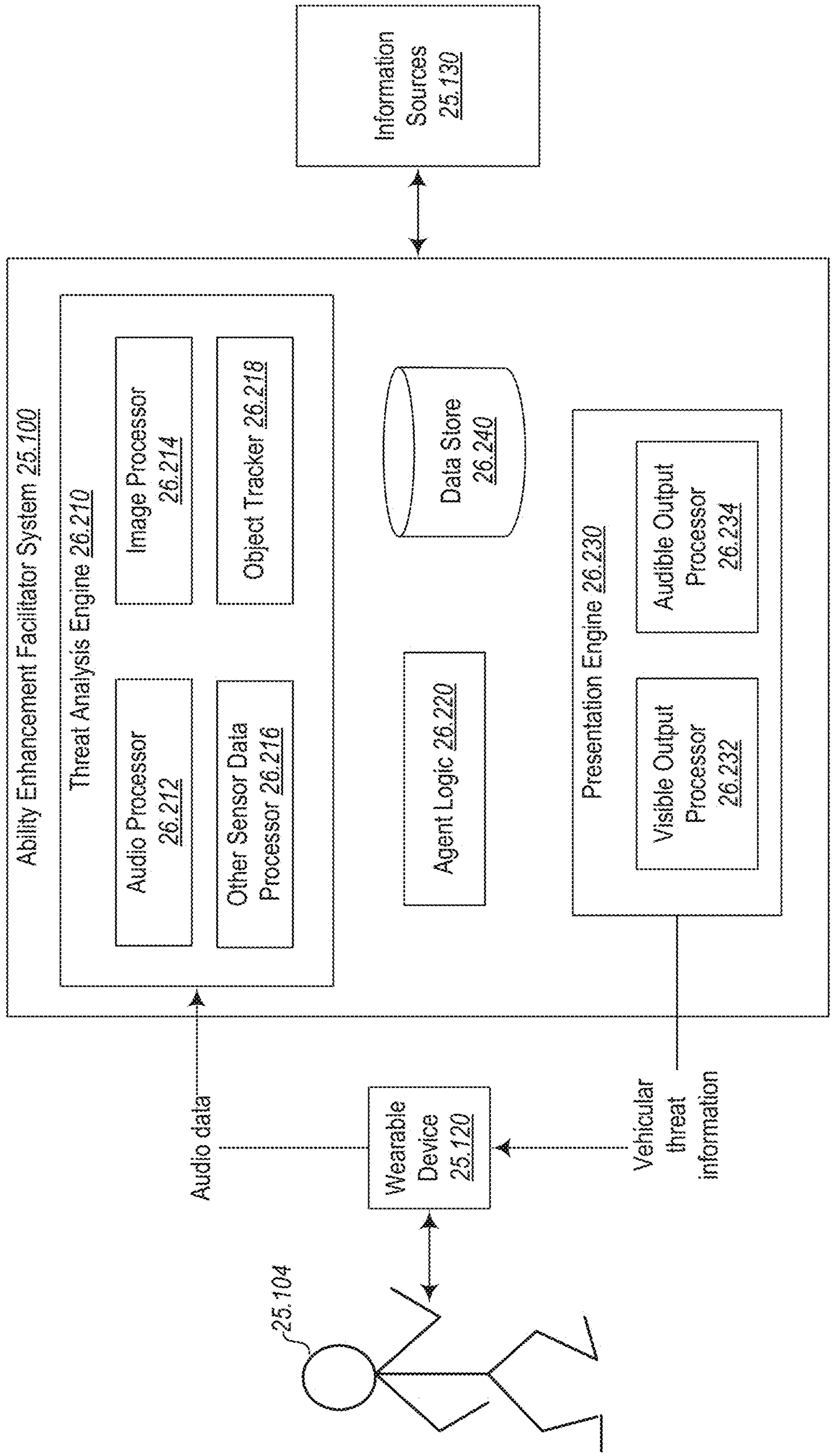
FIG. 26 is an example functional block diagram of an example ability enhancement facilitator system according to an example embodiment.

FIG. 26 is an example functional block diagram of an example ability enhancement facilitator system according to an example embodiment. In the illustrated embodiment of FIG. 26, the AEFS 25.100 includes a threat analysis engine 26.210, agent logic 26.220, a presentation engine 26.230, and a data store 26.240. The AEFS 25.100 is shown interacting with a wearable device 25.120 and information sources 25.130. The information sources 25.130 include any sensors, devices, systems, or the like that provide information to the AEFS 25.100, including but not limited to vehicle-based devices (e.g., speedometers), in-situ devices (e.g., road-side cameras), and information systems (e.g., traffic systems).

The threat analysis engine 26.210 includes an audio processor 26.212, an image processor 26.214, other sensor data processors 26.216, and an object tracker 26.218. In the illustrated example, the audio processor 26.212 processes audio data received from the wearable device 25.120. As noted, such data may be received from other sources as well or instead, including directly from a vehicle-mounted microphone, or the like. The audio processor 26.212 may perform various types of signal processing, including audio level analysis, frequency analysis, acoustic source localization, or the like. Based on such signal processing, the audio processor 26.212 may determine strength, direction of audio signals, audio source distance, audio source type, or the like. Outputs of the audio processor 26.212 (e.g., that an object is approaching from a particular angle) may be provided to the object tracker 26.218 and/or stored in the data store 26.240.

The image processor 26.214 receives and processes image data that may be received from sources such as the wearable device 25.120 and/or information sources 25.130. For example, the image processor 26.214 may receive image data from a camera of the wearable device 25.120, and perform object recognition to determine the type and/or position of a vehicle that is approaching the user 25.104. As another example, the image processor 26.214 may receive a video signal (e.g., a sequence or stream of images) and process them to determine the type, position, and/or velocity of a vehicle that is approaching the user 25.104. Multiple images may be processed to determine the presence or absence of motion, even if no object recognition is performed. Outputs of the image processor 26.214 (e.g., position and velocity information, vehicle type information) may be provided to the object tracker 26.218 and/or stored in the data store 26.240.

The other sensor data processor 26.216 receives and processes data received from other sensors or sources. For example, the other sensor data processor 26.216 may receive and/or determine information about the position and/or movements of the user and/or one or more vehicles, such as based on GPS systems, speedometers, accelerometers, or other devices. As another example, the other sensor data processor 26.216 may receive and process conditions information (e.g., temperature, precipitation) from the information sources 25.130 and determine that road conditions are currently icy. Outputs of the other sensor data processor 26.216 (e.g., that the user is moving at 5 miles per hour) may be provided to the object tracker 26.218 and/or stored in the data store 26.240.

The object tracker 26.218 manages a geospatial object model that includes information about objects known to the AEFS 25.100. The object tracker 26.218 receives and merges information about object types, positions, velocity, acceleration, direction of travel, and the like, from one or more of the processors 26.212, 26.214, 26.216, and/or other sources. Based on such information, the object tracker 26.218 may identify the presence of objects as well as their likely positions, paths, and the like. The object tracker 26.218 may continually update this model as new information becomes available and/or as time passes (e.g., by plotting a likely current position of an object based on its last measured position and trajectory). The object tracker 26.218 may also maintain confidence levels corresponding to elements of the geo-spatial model, such as a likelihood that a vehicle is at a particular position or moving at a particular velocity, that a particular object is a vehicle and not a pedestrian, or the like.

The agent logic 26.220 implements the core intelligence of the AEFS 25.100. The agent logic 26.220 may include a reasoning engine (e.g., a rules engine, decision trees, Bayesian inference engine) that combines information from multiple sources to determine vehicular threat information. For example, the agent logic 26.220 may combine information from the object tracker 26.218, such as that there is a determined likelihood of a collision at an intersection, with information from one of the information sources 25.130, such as that the intersection is the scene of common red-light violations, and decide that the likelihood of a collision is high enough to transmit a warning to the user 25.104. As another example, the agent logic 26.220 may, in the face of multiple distinct threats to the user, determine which threat is the most significant and cause the user to avoid the more significant threat, such as by not directing the user 25.104 to slam on the brakes when a bicycle is approaching from the side but a truck is approaching from the rear, because being rear-ended by the truck would have more serious consequences than being hit from the side by the bicycle.

The presentation engine 26.230 includes a visible output processor 26.232 and an audible output processor 26.234. The visible output processor 26.232 may prepare, format, and/or cause information to be displayed on a display device, such as a display of the wearable device 25.120 or some other display (e.g., a heads-up display of a vehicle 25.110 being driven by the user 25.104). The agent logic 26.220 may use or invoke the visible output processor 26.232 to prepare and display information, such as by formatting or otherwise modifying vehicular threat information to fit on a particular type or size of display. The audible output processor 26.234 may include or use other components for generating audible output, such as tones, sounds, voices, or the like. In some embodiments, the agent logic 26.220 may use or invoke the audible output processor 26.234 in order to convert a textual message (e.g., a warning message, a threat identification) into audio output suitable for presentation via the wearable device 25.120, for example by employing a text-to-speech processor.

Note that one or more of the illustrated components/modules may not be present in some embodiments. For example, in embodiments that do not perform image or video processing, the AEFS 25.100 may not include an image processor 26.214. As another example, in embodiments that do not perform audio output, the AEFS 25.100 may not include an audible output processor 26.234.

Note also that the AEFS 25.100 may act in service of multiple users 25.104. In some embodiments, the AEFS 25.100 may determine vehicular threat information concurrently for multiple distinct users. Such embodiments may further facilitate the sharing of vehicular threat information. For example, vehicular threat information determined as between two vehicles may be relevant and thus shared with a third vehicle that is in proximity to the other two vehicles.

B. Example Processes

FIGS. 27.1-27.112 are example flow diagrams of ability enhancement processes performed by example embodiments.

FIG. 27.1 is an example flow diagram of example logic for enhancing ability in a transportation-related context. The illustrated logic in this and the following flow diagrams may be performed by, for example, one or more components of the AEFS 100 described with respect to FIG. 26, above. As noted, one or more functions of the AEFS 100 may be performed at various locations, including at a wearable device, in a vehicle of a user, in some other vehicle, in an in-situ road-side computing system, or the like. More particularly, FIG. 27.1 illustrates a process 27.100 that includes operations performed by or at the following block(s).

At block 27.101, the process performs receiving image data, at least some of which represents an image of a first vehicle. The process may receive and consider image data, such as by performing image processing to identify vehicles or other hazards, to determine whether collisions may occur, determine motion-related information about the first vehicle (and possibly other entities), and the like. The image data may be obtained from various sources, including from a camera attached to the wearable device or a vehicle, a road-side camera, or the like.

At block 27.102, the process performs determining vehicular threat information based at least in part on the image data. Vehicular threat information may include information related to threats posed by the first vehicle (e.g., to the user or to some other entity), by a vehicle occupied by the user (e.g., to the first vehicle or to some other entity), or the like. Note that vehicular threats may be posed by vehicles to non-vehicles, including pedestrians, animals, structures, or the like. Vehicular threats may also include those threats posed by non-vehicles (e.g., structures, pedestrians) to vehicles. Vehicular threat information may be determined in various ways, including by analyzing image data to identify objects, such as vehicles, pedestrians, fixed objects, and the like. In some embodiments, determining the vehicular threat information may also or instead include determining motion-related information about identified objects, including position, velocity, direction of travel, accelerations, or the like. Determining the vehicular threat information may also or instead include predicting whether the path of the user and one or more identified objects may intersect.

At block 27.103, the process performs presenting the vehicular threat information via a wearable device of the user. The determined threat information may be presented in various ways, such as by presenting an audible or visible warning or other indication that the first vehicle is approaching the user. Different types of wearable devices are contemplated, including helmets, eyeglasses, goggles, hats, and the like. In other embodiments, the vehicular threat information may also or instead be presented in other ways, such as via an output device on a vehicle of the user, in-situ output devices (e.g., traffic signs, road-side speakers), or the like.

FIG. 27.2 is an example flow diagram of example logic illustrating an example embodiment of process 27.100 of FIG. 27.1. More particularly, FIG. 27.2 illustrates a process 27.200 that includes the process 27.100, wherein the receiving image data includes operations performed by or at one or more of the following block(s).

At block 27.201, the process performs receiving image data from a camera of a vehicle that is occupied by the user. The user's vehicle may include one or more cameras that may capture views to the front, sides, and/or rear of the vehicle, and provide these images to the process for image processing or other analysis.

FIG. 27.3 is an example flow diagram of example logic illustrating an example embodiment of process 27.200 of FIG. 27.2. More particularly, FIG. 27.3 illustrates a process 27.300 that includes the process 27.200, wherein the vehicle is operated by the user. In some embodiments, the user's vehicle is being driven or otherwise operated by the user.

FIG. 27.4 is an example flow diagram of example logic illustrating an example embodiment of process 27.200 of FIG. 27.2. More particularly, FIG. 27.4 illustrates a process 27.400 that includes the process 27.200, wherein the vehicle is operating autonomously. In some embodiments, the user's vehicle is operating autonomously, such as by utilizing a guidance or other control system to direct the operation of the vehicle.

FIG. 27.5 is an example flow diagram of example logic illustrating an example embodiment of process 27.100 of FIG. 27.1. More particularly, FIG. 27.5 illustrates a process 27.500 that includes the process 27.100, wherein the receiving image data includes operations performed by or at one or more of the following block(s).

At block 27.501, the process performs receiving image data from a camera of the wearable device. For example, where the wearable device is a helmet, the helmet may include one or more helmet cameras that may capture views to the front, sides, and/or rear of the helmet.

FIG. 27.6 is an example flow diagram of example logic illustrating an example embodiment of process 27.100 of FIG. 27.1. More particularly, FIG. 27.6 illustrates a process 27.600 that includes the process 27.100, wherein the receiving image data includes operations performed by or at one or more of the following block(s).

At block 27.601, the process performs receiving image data from a camera of the first vehicle. In some embodiments, the first vehicle may itself have cameras and broadcast or otherwise transmit image data obtained via that camera.

FIG. 27.7 is an example flow diagram of example logic illustrating an example embodiment of process 27.100 of FIG. 27.1. More particularly, FIG. 27.7 illustrates a process 27.700 that includes the process 27.100, wherein the receiving image data includes operations performed by or at one or more of the following block(s).

At block 27.701, the process performs receiving image data from a camera of a vehicle that is not the first vehicle and that is not occupied by the user. In some embodiments, other vehicles in the roadway may have cameras and broadcast or otherwise transmit image data obtained via those cameras. For example, some vehicle traveling between the user and the first vehicle may transmit images of the first vehicle to be received by the process as image data.

FIG. 27.8 is an example flow diagram of example logic illustrating an example embodiment of process 27.100 of FIG. 27.1. More particularly, FIG. 27.8 illustrates a process 27.800 that includes the process 27.100, wherein the receiving image data includes operations performed by or at one or more of the following block(s).

At block 27.801, the process performs receiving image data from a road-side camera. In some embodiments, road side cameras, such as may be mounted on traffic lights, utility poles, buildings, or the like may transmit image data to the process.

FIG. 27.9 is an example flow diagram of example logic illustrating an example embodiment of process 27.100 of FIG. 27.1. More particularly, FIG. 27.9 illustrates a process 27.900 that includes the process 27.100, wherein the receiving image data includes operations performed by or at one or more of the following block(s).

At block 27.901, the process performs receiving video data that includes multiple images of the first vehicle taken at different times. In some embodiments, the image data comprises video data in compressed or raw form. The video data typically includes (or can be reconstructed or decompressed to derive) multiple sequential images taken at distinct times.

FIG. 27.10 is an example flow diagram of example logic illustrating an example embodiment of process 27.900 of FIG. 27.9. More particularly, FIG. 27.10 illustrates a process 27.1000 that includes the process 27.900, wherein the receiving video data that includes multiple images of the first vehicle taken at different times includes operations performed by or at one or more of the following block(s).

At block 27.1001, the process performs receiving a first image of the first vehicle taken at a first time.

At block 27.1002, the process performs receiving a second image of the second vehicle taken at a second time, wherein the first and second times are sufficiently different such that velocity and/or direction of travel of the first vehicle may be determined with respect to positions of the first vehicle shown in the first and second images. Various time intervals between images may be utilized. For example, it may not be necessary to receive video data having a high frame rate (e.g., 30 frames per second or higher), because it may be preferable to determine motion or other properties of the first vehicle based on images that are taken at larger time intervals (e.g., one tenth of a second, one quarter of a second). In some embodiments, transmission bandwidth may be saved by transmitting and receiving reduced frame rate image streams.

FIG. 27.11 is an example flow diagram of example logic illustrating an example embodiment of process 27.100 of FIG. 27.1. More particularly, FIG. 27.11 illustrates a process 27.1100 that includes the process 27.100, wherein the determining vehicular threat information includes operations performed by or at one or more of the following block(s).

At block 27.1101, the process performs determining a threat posed by the first vehicle to the user. As noted, the vehicular threat information may indicate a threat posed by the first vehicle to the user, such as that the first vehicle may collide with the user unless evasive action is taken.

FIG. 27.12 is an example flow diagram of example logic illustrating an example embodiment of process 27.100 of FIG. 27.1. More particularly, FIG. 27.12 illustrates a process 27.1200 that includes the process 27.100, wherein the determining vehicular threat information includes operations performed by or at one or more of the following block(s).

At block 27.1201, the process performs determining a threat posed by the first vehicle to some other entity besides the user. As noted, the vehicular threat information may indicate a threat posed by the first vehicle to some other person or thing, such as that the first vehicle may collide with the other entity. The other entity may be a vehicle occupied by the user, a vehicle not occupied by the user, a pedestrian, a structure, or any other object that may come into proximity with the first vehicle.

FIG. 27.13 is an example flow diagram of example logic illustrating an example embodiment of process 27.100 of FIG. 27.1. More particularly, FIG. 27.13 illustrates a process 27.1300 that includes the process 27.100, wherein the determining vehicular threat information includes operations performed by or at one or more of the following block(s).

At block 27.1301, the process performs determining a threat posed by a vehicle occupied by the user to the first vehicle. The vehicular threat information may indicate a threat posed by the user's vehicle (e.g., as a driver or passenger) to the first vehicle, such as because a collision may occur between the two vehicles.

FIG. 27.14 is an example flow diagram of example logic illustrating an example embodiment of process 27.100 of FIG. 27.1. More particularly, FIG. 27.14 illustrates a process 27.1400 that includes the process 27.100, wherein the determining vehicular threat information includes operations performed by or at one or more of the following block(s).

At block 27.1401, the process performs determining a threat posed by a vehicle occupied by the user to some other entity besides the first vehicle. The vehicular threat information may indicate a threat posed by the user's vehicle to some other person or thing, such as due to a potential collision. The other entity may be some other vehicle, a pedestrian, a structure, or any other object that may come into proximity with the user's vehicle.

FIG. 27.15 is an example flow diagram of example logic illustrating an example embodiment of process 27.100 of FIG. 27.1. More particularly, FIG. 27.15 illustrates a process 27.1500 that includes the process 27.100, wherein the determining vehicular threat information includes operations performed by or at one or more of the following block(s).

At block 27.1501, the process performs identifying the first vehicle in the image data. Image processing techniques may be employed to identify the presence of a vehicle, its type (e.g., car or truck), its size, license plate number, color, or other identifying information about the first vehicle.

FIG. 27.16 is an example flow diagram of example logic illustrating an example embodiment of process 27.100 of FIG. 27.1. More particularly, FIG. 27.16 illustrates a process 27.1600 that includes the process 27.100, wherein the determining vehicular threat information includes operations performed by or at one or more of the following block(s).

At block 27.1601, the process performs determining whether the first vehicle is moving towards the user based on multiple images represented by the image data. In some embodiments, a video feed or other sequence of images may be analyzed to determine the relative motion of the first vehicle. For example, if the first vehicle appears to be becoming larger over a sequence of images, then it is likely that the first vehicle is moving towards the user.

FIG. 27.17 is an example flow diagram of example logic illustrating an example embodiment of process 27.100 of FIG. 27.1. More particularly, FIG. 27.17 illustrates a process 27.1700 that includes the process 27.100, wherein the determining vehicular threat information includes operations performed by or at one or more of the following block(s).

At block 27.1701, the process performs determining motion-related information about the first vehicle, based on one or more images of the first vehicle. Motion-related information may include information about the mechanics (e.g., kinematics, dynamics) of the first vehicle, including position, velocity, direction of travel, acceleration, mass, or the like. Motion-related information may be determined for vehicles that are at rest. Motion-related information may be determined and expressed with respect to various frames of reference, including the user's frame of reference, the frame of reference of the first vehicle, a fixed frame of reference, or the like.

FIG. 27.18 is an example flow diagram of example logic illustrating an example embodiment of process 27.1700 of FIG. 27.17. More particularly, FIG. 27.18 illustrates a process 27.1800 that includes the process 27.1700, wherein the determining motion-related information about the first vehicle includes operations performed by or at one or more of the following block(s).

At block 27.1801, the process performs determining the motion-related information with respect to timestamps associated with the one or more images. In some embodiments, the received images include timestamps or other indicators that can be used to determine a time interval between the images. In other cases, the time interval may be known a priori or expressed in other ways, such as in terms of a frame rate associated with an image or video stream.

FIG. 27.19 is an example flow diagram of example logic illustrating an example embodiment of process 27.1700 of FIG. 27.17. More particularly, FIG. 27.19 illustrates a process 27.1900 that includes the process 27.1700, wherein the determining motion-related information about the first vehicle includes operations performed by or at one or more of the following block(s).

At block 27.1901, the process performs determining a position of the first vehicle. The position of the first vehicle may be expressed absolutely, such as via a GPS coordinate or similar representation, or relatively, such as with respect to the position of the user (e.g., 20 meters away from the first user). In addition, the position of the first vehicle may be represented as a point or collection of points (e.g., a region, arc, or line).

FIG. 27.20 is an example flow diagram of example logic illustrating an example embodiment of process 27.1700 of FIG. 27.17. More particularly, FIG. 27.20 illustrates a process 27.2000 that includes the process 27.1700, wherein the determining motion-related information about the first vehicle includes operations performed by or at one or more of the following block(s).

At block 27.2001, the process performs determining a velocity of the first vehicle. The process may determine the velocity of the first vehicle in absolute or relative terms (e.g., with respect to the velocity of the user). The velocity may be expressed or represented as a magnitude (e.g., 10 meters per second), a vector (e.g., having a magnitude and a direction), or the like.

FIG. 27.21 is an example flow diagram of example logic illustrating an example embodiment of process 27.2000 of FIG. 27.20. More particularly, FIG. 27.21 illustrates a process 27.2100 that includes the process 27.2000, wherein the determining a velocity of the first vehicle includes operations performed by or at one or more of the following block(s).

At block 27.2101, the process performs determining the velocity with respect to a fixed frame of reference. In some embodiments, a fixed, global, or absolute frame of reference may be utilized.

FIG. 27.22 is an example flow diagram of example logic illustrating an example embodiment of process 27.2000 of FIG. 27.20. More particularly, FIG. 27.22 illustrates a process 27.2200 that includes the process 27.2000, wherein the determining a velocity of the first vehicle includes operations performed by or at one or more of the following block(s).

At block 27.2201, the process performs determining the velocity with respect to a frame of reference of the user. In some embodiments, velocity is expressed with respect to the user's frame of reference. In such cases, a stationary (e.g., parked) vehicle will appear to be approaching the user if the user is driving towards the first vehicle.

FIG. 27.23 is an example flow diagram of example logic illustrating an example embodiment of process 27.1700 of FIG. 27.17. More particularly, FIG. 27.23 illustrates a process 27.2300 that includes the process 27.1700, wherein the determining motion-related information about the first vehicle includes operations performed by or at one or more of the following block(s).

At block 27.2301, the process performs determining a direction of travel of the first vehicle. The process may determine a direction in which the first vehicle is traveling, such as with respect to the user and/or some absolute coordinate system or frame of reference.

FIG. 27.24 is an example flow diagram of example logic illustrating an example embodiment of process 27.1700 of FIG. 27.17. More particularly, FIG. 27.24 illustrates a process 27.2400 that includes the process 27.1700, wherein the determining motion-related information about the first vehicle includes operations performed by or at one or more of the following block(s).

At block 27.2401, the process performs determining acceleration of the first vehicle. In some embodiments, acceleration of the first vehicle may be determined, for example by determining a rate of change of the velocity of the first vehicle observed over time.

FIG. 27.25 is an example flow diagram of example logic illustrating an example embodiment of process 27.1700 of FIG. 27.17. More particularly, FIG. 27.25 illustrates a process 27.2500 that includes the process 27.1700, wherein the determining motion-related information about the first vehicle includes operations performed by or at one or more of the following block(s).

At block 27.2501, the process performs determining mass of the first vehicle. Mass of the first vehicle may be determined in various ways, including by identifying the type of the first vehicle (e.g., car, truck, motorcycle), determining the size of the first vehicle based on its appearance in an image, or the like.

FIG. 27.26 is an example flow diagram of example logic illustrating an example embodiment of process 27.100 of FIG. 27.1. More particularly, FIG. 27.26 illustrates a process 27.2600 that includes the process 27.100, wherein the determining vehicular threat information includes operations performed by or at one or more of the following block(s).

At block 27.2601, the process performs determining that the first vehicle is driving erratically. The first vehicle may be driving erratically for a number of reasons, including due to a medical condition (e.g., a heart attack, bad eyesight, shortness of breath), drug/alcohol impairment, distractions (e.g., text messaging, crying children, loud music), or the like.

FIG. 27.27 is an example flow diagram of example logic illustrating an example embodiment of process 27.100 of FIG. 27.1. More particularly, FIG. 27.27 illustrates a process 27.2700 that includes the process 27.100, wherein the determining vehicular threat information includes operations performed by or at one or more of the following block(s).

At block 27.2701, the process performs determining that the first vehicle is driving with excessive speed. Excessive speed may be determined relatively, such as with respect to the average traffic speed on a road segment, posted speed limit, or the like. For example, a vehicle may be determined to be driving with excessive speed if the vehicle is driving more than 20% over the posted speed limit. Other thresholds (e.g., 10% over, 25% over) and/or baselines (e.g., average observed speed) are contemplated.

FIG. 27.28 is an example flow diagram of example logic illustrating an example embodiment of process 27.100 of FIG. 27.1. More particularly, FIG. 27.28 illustrates a process 27.2800 that includes the process 27.100, wherein the determining vehicular threat information includes operations performed by or at one or more of the following block(s).

At block 27.2801, the process performs identifying objects other than the first vehicle in the image data. Image processing techniques may be employed by the process to identify other objects of interest, including road hazards (e.g., utility poles, ditches, drop-offs), pedestrians, other vehicles, or the like.

FIG. 27.29 is an example flow diagram of example logic illustrating an example embodiment of process 27.100 of FIG. 27.1. More particularly, FIG. 27.29 illustrates a process 27.2900 that includes the process 27.100, wherein the determining vehicular threat information includes operations performed by or at one or more of the following block(s).

At block 27.2901, the process performs determining driving conditions based on the image data. Image processing techniques may be employed by the process to determine driving conditions, such as surface conditions (e.g., icy, wet), lighting conditions (e.g., glare, darkness), or the like.

FIG. 27.30 is an example flow diagram of example logic illustrating an example embodiment of process 27.100 of FIG. 27.1. More particularly, FIG. 27.30 illustrates a process 27.3000 that includes the process 27.100, and which further includes operations performed by or at the following block(s).

At block 27.3001, the process performs determining vehicular threat information that is not related to the first vehicle. The process may determine vehicular threat information that is not due to the first vehicle, including based on a variety of other factors or information, such as driving conditions, the presence or absence of other vehicles, the presence or absence of pedestrians, or the like.

FIG. 27.31 is an example flow diagram of example logic illustrating an example embodiment of process 27.3000 of FIG. 27.30. More particularly, FIG. 27.31 illustrates a process 27.3100 that includes the process 27.3000, wherein the determining vehicular threat information that is not related to the first vehicle includes operations performed by or at one or more of the following block(s).

At block 27.3101, the process performs receiving and processing image data that includes images of objects and/or conditions aside from the first vehicle. At least some of the received image data may include images of things other than the first vehicle, such as other vehicles, pedestrians, driving conditions, and the like.

FIG. 27.32 is an example flow diagram of example logic illustrating an example embodiment of process 27.3100 of FIG. 27.31. More particularly, FIG. 27.32 illustrates a process 27.3200 that includes the process 27.3100, wherein the receiving and processing image data that includes images of objects and/or conditions aside from the first vehicle includes operations performed by or at one or more of the following block(s).

At block 27.3201, the process performs receiving image data of at least one of a stationary object, a pedestrian, and/or an animal. A stationary object may be a fence, guardrail, utility pole, building, parked vehicle, or the like.

FIG. 27.33 is an example flow diagram of example logic illustrating an example embodiment of process 27.3000 of FIG. 27.30. More particularly, FIG. 27.33 illustrates a process 27.3300 that includes the process 27.3000, wherein the determining vehicular threat information that is not related to the first vehicle includes operations performed by or at one or more of the following block(s).

At block 27.3301, the process performs processing the image data to determine the vehicular threat information that is not related to the first vehicle. For example, the process may determine that a difficult lighting condition exists due to glare or overexposure detected in the image data. As another example, the process may identify a pedestrian in the roadway depicted in the image data. As another example, the process may determine that poor road surface conditions exist.

FIG. 27.34 is an example flow diagram of example logic illustrating an example embodiment of process 27.3000 of FIG. 27.30. More particularly, FIG. 27.34 illustrates a process 27.3400 that includes the process 27.3000, wherein the determining vehicular threat information that is not related to the first vehicle includes operations performed by or at one or more of the following block(s).

At block 27.3401, the process performs processing data other than the image data to determine the vehicular threat information that is not related to the first vehicle. The process may analyze data other than image data, such as weather data (e.g., temperature, precipitation), time of day, traffic information, position or motion sensor information (e.g., obtained from GPS systems or accelerometers), or the like.

FIG. 27.35 is an example flow diagram of example logic illustrating an example embodiment of process 27.3000 of FIG. 27.30. More particularly, FIG. 27.35 illustrates a process 27.3500 that includes the process 27.3000, wherein the determining vehicular threat information that is not related to the first vehicle includes operations performed by or at one or more of the following block(s).

At block 27.3501, the process performs determining that poor driving conditions exist. Poor driving conditions may include or be based on weather information (e.g., snow, rain, ice, temperature), time information (e.g., night or day), lighting information (e.g., a light sensor indicating that the user is traveling towards the setting sun), or the like.

FIG. 27.36 is an example flow diagram of example logic illustrating an example embodiment of process 27.3000 of FIG. 27.30. More particularly, FIG. 27.36 illustrates a process 27.3600 that includes the process 27.3000, wherein the determining vehicular threat information that is not related to the first vehicle includes operations performed by or at one or more of the following block(s).

At block 27.3601, the process performs determining that a limited visibility condition exists. Limited visibility may be due to the time of day (e.g., at dusk, dawn, or night), weather (e.g., fog, rain), or the like.

FIG. 27.37 is an example flow diagram of example logic illustrating an example embodiment of process 27.3000 of FIG. 27.30. More particularly, FIG. 27.37 illustrates a process 27.3700 that includes the process 27.3000, wherein the determining vehicular threat information that is not related to the first vehicle includes operations performed by or at one or more of the following block(s).

At block 27.3701, the process performs determining that there is slow traffic in proximity to the user. The process may receive and integrate information from traffic information systems (e.g., that report accidents), other vehicles (e.g., that are reporting their speeds), or the like.

FIG. 27.38 is an example flow diagram of example logic illustrating an example embodiment of process 27.3700 of FIG. 27.37. More particularly, FIG. 27.38 illustrates a process 27.3800 that includes the process 27.3700, wherein the determining that there is slow traffic in proximity to the user includes operations performed by or at one or more of the following block(s).

At block 27.3801, the process performs receiving information from a traffic information system regarding traffic congestion on a road traveled by the user. Traffic information systems may provide fine-grained traffic information, such as current average speeds measured on road segments in proximity to the user.

FIG. 27.39 is an example flow diagram of example logic illustrating an example embodiment of process 27.3700 of FIG. 27.37. More particularly, FIG. 27.39 illustrates a process 27.3900 that includes the process 27.3700, wherein the determining that there is slow traffic in proximity to the user includes operations performed by or at one or more of the following block(s).

At block 27.3901, the process performs determining that one or more vehicles are traveling slower than an average or posted speed for a road traveled by the user. Slow travel may be determined based on the speed of one or more vehicles with respect to various baselines, such as average observed speed (e.g., recorded over time, based on time of day, etc.), posted speed limits, recommended speeds based on conditions, or the like.

FIG. 27.40 is an example flow diagram of example logic illustrating an example embodiment of process 27.3000 of FIG. 27.30. More particularly, FIG. 27.40 illustrates a process 27.4000 that includes the process 27.3000, wherein the determining vehicular threat information that is not related to the first vehicle includes operations performed by or at one or more of the following block(s).

At block 27.4001, the process performs determining that poor surface conditions exist on a roadway traveled by the user. Poor surface conditions may be due to weather (e.g., ice, snow, rain), temperature, surface type (e.g., gravel road), foreign materials (e.g., oil), or the like.

FIG. 27.41 is an example flow diagram of example logic illustrating an example embodiment of process 27.3000 of FIG. 27.30. More particularly, FIG. 27.41 illustrates a process 27.4100 that includes the process 27.3000, wherein the determining vehicular threat information that is not related to the first vehicle includes operations performed by or at one or more of the following block(s).

At block 27.4101, the process performs determining that there is a pedestrian in proximity to the user. The presence of pedestrians may be determined in various ways. In some embodiments, the process may utilize image processing techniques to recognize pedestrians in received image data. In other embodiments pedestrians may wear devices that transmit their location and/or presence. In other embodiments, pedestrians may be detected based on their heat signature, such as by an infrared sensor on the wearable device, user vehicle, or the like.

FIG. 27.42 is an example flow diagram of example logic illustrating an example embodiment of process 27.3000 of FIG. 27.30. More particularly, FIG. 27.42 illustrates a process 27.4200 that includes the process 27.3000, wherein the determining vehicular threat information that is not related to the first vehicle includes operations performed by or at one or more of the following block(s).

At block 27.4201, the process performs determining that there is an accident in proximity to the user. Accidents may be identified based on traffic information systems that report accidents, vehicle-based systems that transmit when collisions have occurred, or the like.

FIG. 27.43 is an example flow diagram of example logic illustrating an example embodiment of process 27.3000 of FIG. 27.30. More particularly, FIG. 27.43 illustrates a process 27.4300 that includes the process 27.3000, wherein the determining vehicular threat information that is not related to the first vehicle includes operations performed by or at one or more of the following block(s).

At block 27.4301, the process performs determining that there is an animal in proximity to the user. The presence of an animal may be determined as discussed with respect to pedestrians, above.

FIG. 27.44 is an example flow diagram of example logic illustrating an example embodiment of process 27.100 of FIG. 27.1. More particularly, FIG. 27.44 illustrates a process 27.4400 that includes the process 27.100, wherein the determining vehicular threat information includes operations performed by or at one or more of the following block(s).

At block 27.4401, the process performs determining the vehicular threat information based on motion-related information that is not based on images of the first vehicle. The process may consider a variety of motion-related information received from various sources, such as the wearable device, a vehicle of the user, the first vehicle, or the like. The motion-related information may include information about the mechanics (e.g., position, velocity, acceleration, mass) of the user and/or the first vehicle.

FIG. 27.45 is an example flow diagram of example logic illustrating an example embodiment of process 27.4400 of FIG. 27.44. More particularly, FIG. 27.45 illustrates a process 27.4500 that includes the process 27.4400, wherein the determining the vehicular threat information based on motion-related information that is not based on images of the first vehicle includes operations performed by or at one or more of the following block(s).

At block 27.4501, the process performs determining the vehicular threat information based on information about position, velocity, and/or acceleration of the user obtained from sensors in the wearable device. The wearable device may include position sensors (e.g., GPS), accelerometers, or other devices configured to provide motion-related information about the user to the process.

FIG. 27.46 is an example flow diagram of example logic illustrating an example embodiment of process 27.4400 of FIG. 27.44. More particularly, FIG. 27.46 illustrates a process 27.4600 that includes the process 27.4400, wherein the determining the vehicular threat information based on motion-related information that is not based on images of the first vehicle includes operations performed by or at one or more of the following block(s).

At block 27.4601, the process performs determining the vehicular threat information based on information about position, velocity, and/or acceleration of the user obtained from devices in a vehicle of the user. A vehicle occupied or operated by the user may include position sensors (e.g., GPS), accelerometers, speedometers, or other devices configured to provide motion-related information about the user to the process.

FIG. 27.47 is an example flow diagram of example logic illustrating an example embodiment of process 27.4400 of FIG. 27.44. More particularly, FIG. 27.47 illustrates a process 27.4700 that includes the process 27.4400, wherein the determining the vehicular threat information based on motion-related information that is not based on images of the first vehicle includes operations performed by or at one or more of the following block(s).

At block 27.4701, the process performs determining the vehicular threat information based on information about position, velocity, and/or acceleration of the first vehicle obtained from devices of the first vehicle. The first vehicle may include position sensors (e.g., GPS), accelerometers, speedometers, or other devices configured to provide motion-related information about the user to the process. In other embodiments, motion-related information may be obtained from other sources, such as a radar gun deployed at the side of a road, from other vehicles, or the like.

FIG. 27.48 is an example flow diagram of example logic illustrating an example embodiment of process 27.100 of FIG. 27.1. More particularly, FIG. 27.48 illustrates a process 27.4800 that includes the process 27.100, wherein the determining vehicular threat information includes operations performed by or at one or more of the following block(s).

At block 27.4801, the process performs determining the vehicular threat information based on gaze information associated with the user. In some embodiments, the process may consider the direction in which the user is looking when determining the vehicular threat information. For example, the vehicular threat information may depend on whether the user is or is not looking at the first vehicle, as discussed further below.

FIG. 27.49 is an example flow diagram of example logic illustrating an example embodiment of process 27.4800 of FIG. 27.48. More particularly, FIG. 27.49 illustrates a process 27.4900 that includes the process 27.4800, and which further includes operations performed by or at the following block(s).

At block 27.4901, the process performs receiving an indication of a direction in which the user is looking. In some embodiments, an orientation sensor such as a gyroscope or accelerometer may be employed to determine the orientation of the user's head, face, or other body part. In some embodiments, a camera or other image sensing device may track the orientation of the user's eyes.

At block 27.4902, the process performs determining that the user is not looking towards the first vehicle. As noted, the process may track the position of the first vehicle. Given this information, coupled with information about the direction of the user's gaze, the process may determine whether or not the user is (or likely is) looking in the direction of the first vehicle.

At block 27.4903, the process performs in response to determining that the user is not looking towards the first vehicle, directing the user to look towards the first vehicle. When it is determined that the user is not looking at the first vehicle, the process may warn or otherwise direct the user to look in that direction, such as by saying or otherwise presenting "Look right!", "Car on your left," or similar message.

FIG. 27.50 is an example flow diagram of example logic illustrating an example embodiment of process 27.100 of FIG. 27.1. More particularly, FIG. 27.50 illustrates a process 27.5000 that includes the process 27.100, and which further includes operations performed by or at the following block(s).

At block 27.5001, the process performs identifying multiple threats to the user. The process may in some cases identify multiple potential threats, such as one car approaching the user from behind and another car approaching the user from the left.

At block 27.5002, the process performs identifying a first one of the multiple threats that is more significant than at least one other of the multiple threats. The process may rank, order, or otherwise evaluate the relative significance or risk presented by each of the identified threats. For example, the process may determine that a truck approaching from the right is a bigger risk than a bicycle approaching from behind. On the other hand, if the truck is moving very slowly (thus leaving more time for the truck and/or the user to avoid it) compared to the bicycle, the process may instead determine that the bicycle is the bigger risk.

At block 27.5003, the process performs instructing the user to avoid the first one of the multiple threats. Instructing the user may include outputting a command or suggestion to take (or not take) a particular course of action.

FIG. 27.51 is an example flow diagram of example logic illustrating an example embodiment of process 27.5000 of FIG. 27.50. More particularly, FIG. 27.51 illustrates a process 27.5100 that includes the process 27.5000, and which further includes operations performed by or at the following block(s).

At block 27.5101, the process performs modeling multiple potential accidents that each correspond to one of the multiple threats to determine a collision force associated with each accident. In some embodiments, the process models the physics of various objects to determine potential collisions and possibly their severity and/or likelihood. For example, the process may determine an expected force of a collision based on factors such as object mass, velocity, acceleration, deceleration, or the like.

At block 27.5102, the process performs selecting the first threat based at least in part on which of the multiple accidents has the highest collision force. In some embodiments, the process considers the threat having the highest associated collision force when determining most significant threat, because that threat will likely result in the greatest injury to the user.

FIG. 27.52 is an example flow diagram of example logic illustrating an example embodiment of process 27.5000 of FIG. 27.50. More particularly, FIG. 27.52 illustrates a process 27.5200 that includes the process 27.5000, and which further includes operations performed by or at the following block(s).

At block 27.5201, the process performs determining a likelihood of an accident associated with each of the multiple threats. In some embodiments, the process associates a likelihood (probability) with each of the multiple threats. Such a probability may be determined with respect to a physical model that represents uncertainty with respect to the mechanics of the various objects that it models.

At block 27.5202, the process performs selecting the first threat based at least in part on which of the multiple threats has the highest associated likelihood. The process may consider the threat having the highest associated likelihood when determining the most significant threat.

FIG. 27.53 is an example flow diagram of example logic illustrating an example embodiment of process 27.5000 of FIG. 27.50. More particularly, FIG. 27.53 illustrates a process 27.5300 that includes the process 27.5000, and which further includes operations performed by or at the following block(s).

At block 27.5301, the process performs determining a mass of an object associated with each of the multiple threats. In some embodiments, the process may consider the mass of threat objects, based on the assumption that those objects having higher mass (e.g., a truck) pose greater threats than those having a low mass (e.g., a pedestrian).

At block 27.5302, the process performs selecting the first threat based at least in part on which of the objects has the highest mass.

FIG. 27.54 is an example flow diagram of example logic illustrating an example embodiment of process 27.5000 of FIG. 27.50. More particularly, FIG. 27.54 illustrates a process 27.5400 that includes the process 27.5000, wherein the identifying a first one of the multiple threats that is more significant than at least one other of the multiple threats includes operations performed by or at one or more of the following block(s).

At block 27.5401, the process performs selecting the most significant threat from the multiple threats.

FIG. 27.55 is an example flow diagram of example logic illustrating an example embodiment of process 27.100 of FIG. 27.1. More particularly, FIG. 27.55 illustrates a process 27.5500 that includes the process 27.100, and which further includes operations performed by or at the following block(s).

At block 27.5501, the process performs determining that an evasive action with respect to the first vehicle poses a threat to some other object. The process may consider whether potential evasive actions pose threats to other objects. For example, the process may analyze whether directing the user to turn right would cause the user to collide with a pedestrian or some fixed object, which may actually result in a worse outcome (e.g., for the user and/or the pedestrian) than colliding with the first vehicle.

At block 27.5502, the process performs instructing the user to take some other evasive action that poses a lesser threat to the some other object. The process may rank or otherwise order evasive actions (e.g., slow down, turn left, turn right) based at least in part on the risks or threats those evasive actions pose to other entities.

FIG. 27.56 is an example flow diagram of example logic illustrating an example embodiment of process 27.100 of FIG. 27.1. More particularly, FIG. 27.56 illustrates a process 27.5600 that includes the process 27.100, and which further includes operations performed by or at the following block(s).

At block 27.5601, the process performs identifying multiple threats that each have an associated likelihood and cost. In some embodiments, the process may perform a cost-minimization analysis, in which it considers multiple threats, including threats posed to the user and to others, and selects a threat that minimizes or reduces expected costs. The process may also consider threats posed by actions taken by the user to avoid other threats.

At block 27.5602, the process performs determining a course of action that minimizes an expected cost with respect to the multiple threats. Expected cost of a threat may be expressed as a product of the likelihood of damage associated with the threat and the cost associated with such damage.

FIG. 27.57 is an example flow diagram of example logic illustrating an example embodiment of process 27.5600 of FIG. 27.56. More particularly, FIG. 27.57 illustrates a process 27.5700 that includes the process 27.5600, wherein the cost is based on one or more of a cost of damage to a vehicle, a cost of injury or death of a human, a cost of injury or death of an animal, a cost of damage to a structure, a cost of emotional distress, and/or cost to a business or person based on negative publicity associated with an accident.

FIG. 27.58 is an example flow diagram of example logic illustrating an example embodiment of process 27.5600 of FIG. 27.56. More particularly, FIG. 27.58 illustrates a process 27.5800 that includes the process 27.5600, wherein the identifying multiple threats includes operations performed by or at one or more of the following block(s).

At block 27.5801, the process performs identifying multiple threats that are each related to different persons or things. In some embodiments, the process considers risks related to multiple distinct entities, possibly including the user.

FIG. 27.59 is an example flow diagram of example logic illustrating an example embodiment of process 27.5600 of FIG. 27.56. More particularly, FIG. 27.59 illustrates a process 27.5900 that includes the process 27.5600, wherein the identifying multiple threats includes operations performed by or at one or more of the following block(s).

At block 27.5901, the process performs identifying multiple threats that are each related to the user. In some embodiments, the process also or only considers risks that are related to the user.

FIG. 27.60 is an example flow diagram of example logic illustrating an example embodiment of process 27.5600 of FIG. 27.56. More particularly, FIG. 27.60 illustrates a process 27.6000 that includes the process 27.5600, wherein the determining a course of action that minimizes an expected cost includes operations performed by or at one or more of the following block(s).

At block 27.6001, the process performs minimizing expected costs to the user posed by the multiple threats. In some embodiments, the process attempts to minimize those costs borne by the user. Note that this may cause the process to recommend a course of action that is not optimal from a societal perspective, such as by directing the user to drive his car over a pedestrian rather than to crash into a car or structure.

FIG. 27.61 is an example flow diagram of example logic illustrating an example embodiment of process 27.5600 of FIG. 27.56. More particularly, FIG. 27.61 illustrates a process 27.6100 that includes the process 27.5600, wherein the determining a course of action that minimizes an expected cost includes operations performed by or at one or more of the following block(s).

At block 27.6101, the process performs minimizing overall expected costs posed by the multiple threats, the overall expected costs being a sum of expected costs borne by the user and other persons/things. In some embodiments, the process attempts to minimize social costs, that is, the costs borne by the various parties to an accident. Note that this may cause the process to recommend a course of action that may have a high cost to the user (e.g., crashing into a wall and damaging the user's car) to spare an even higher cost to another person (e.g., killing a pedestrian).

FIG. 27.62 is an example flow diagram of example logic illustrating an example embodiment of process 27.100 of FIG. 27.1. More particularly, FIG. 27.62 illustrates a process 27.6200 that includes the process 27.100, wherein the presenting the vehicular threat information includes operations performed by or at one or more of the following block(s).

At block 27.6201, the process performs presenting the vehicular threat information via an audio output device of the wearable device. The process may play an alarm, bell, chime, voice message, or the like that warns or otherwise informs the user of the vehicular threat information. The wearable device may include audio speakers operable to output audio signals, including as part of a set of earphones, earbuds, a headset, a helmet, or the like.

FIG. 27.63 is an example flow diagram of example logic illustrating an example embodiment of process 27.100 of FIG. 27.1. More particularly, FIG. 27.63 illustrates a process 27.6300 that includes the process 27.100, wherein the presenting the vehicular threat information includes operations performed by or at one or more of the following block(s).

At block 27.6301, the process performs presenting the vehicular threat information via a visual display device of the wearable device. In some embodiments, the wearable device includes a display screen or other mechanism for presenting visual information. For example, when the wearable device is a helmet, a face shield of the helmet may be used as a type of heads-up display for presenting the vehicular threat information.

FIG. 27.64 is an example flow diagram of example logic illustrating an example embodiment of process 27.6300 of FIG. 27.63. More particularly, FIG. 27.64 illustrates a process 27.6400 that includes the process 27.6300, wherein the presenting the vehicular threat information via a visual display device includes operations performed by or at one or more of the following block(s).

At block 27.6401, the process performs displaying an indicator that instructs the user to look towards the first vehicle. The displayed indicator may be textual (e.g., "Look right!"), iconic (e.g., an arrow), or the like.

FIG. 27.65 is an example flow diagram of example logic illustrating an example embodiment of process 27.6300 of FIG. 27.63. More particularly, FIG. 27.65 illustrates a process 27.6500 that includes the process 27.6300, wherein the presenting the vehicular threat information via a visual display device includes operations performed by or at one or more of the following block(s).

At block 27.6501, the process performs displaying an indicator that instructs the user to accelerate, decelerate, and/or turn. An example indicator may be or include the text "Speed up," "slow down," "turn left," or similar language.

FIG. 27.66 is an example flow diagram of example logic illustrating an example embodiment of process 27.100 of FIG. 27.1. More particularly, FIG. 27.66 illustrates a process 27.6600 that includes the process 27.100, wherein the presenting the vehicular threat information includes operations performed by or at one or more of the following block(s).

At block 27.6601, the process performs directing the user to accelerate.

FIG. 27.67 is an example flow diagram of example logic illustrating an example embodiment of process 27.100 of FIG. 27.1. More particularly, FIG. 27.67 illustrates a process 27.6700 that includes the process 27.100, wherein the presenting the vehicular threat information includes operations performed by or at one or more of the following block(s).

At block 27.6701, the process performs directing the user to decelerate.

FIG. 27.68 is an example flow diagram of example logic illustrating an example embodiment of process 27.100 of FIG. 27.1. More particularly, FIG. 27.68 illustrates a process 27.6800 that includes the process 27.100, wherein the presenting the vehicular threat information includes operations performed by or at one or more of the following block(s).

At block 27.6801, the process performs directing the user to turn.

FIG. 27.69 is an example flow diagram of example logic illustrating an example embodiment of process 27.100 of FIG. 27.1. More particularly, FIG. 27.69 illustrates a process 27.6900 that includes the process 27.100, and which further includes operations performed by or at the following block(s).

At block 27.6901, the process performs transmitting to the first vehicle a warning based on the vehicular threat information. The process may send or otherwise transmit a warning or other message to the first vehicle that instructs the operator of the first vehicle to take evasive action. The instruction to the first vehicle may be complimentary to any instructions given to the user, such that if both instructions are followed, the risk of collision decreases. In this manner, the process may help avoid a situation in which the user and the operator of the first vehicle take actions that actually increase the risk of collision, such as may occur when the user and the first vehicle are approaching head but do not turn away from one another.

FIG. 27.70 is an example flow diagram of example logic illustrating an example embodiment of process 27.100 of FIG. 27.1. More particularly, FIG. 27.70 illustrates a process 27.7000 that includes the process 27.100, and which further includes operations performed by or at the following block(s).

At block 27.7001, the process performs presenting the vehicular threat information via an output device of a vehicle of the user, the output device including a visual display and/or an audio speaker. In some embodiments, the process may use other devices to output the vehicular threat information, such as output devices of a vehicle of the user, including a car stereo, dashboard display, or the like.

FIG. 27.71 is an example flow diagram of example logic illustrating an example embodiment of process 27.100 of FIG. 27.1. More particularly, FIG. 27.71 illustrates a process 27.7100 that includes the process 27.100, wherein the wearable device is a helmet worn by the user. Various types of helmets are contemplated, including motorcycle helmets, bicycle helmets, and the like.

FIG. 27.72 is an example flow diagram of example logic illustrating an example embodiment of process 27.100 of FIG. 27.1. More particularly, FIG. 27.72 illustrates a process 27.7200 that includes the process 27.100, wherein the wearable device is goggles worn by the user.

FIG. 27.73 is an example flow diagram of example logic illustrating an example embodiment of process 27.100 of FIG. 27.1. More particularly, FIG. 27.73 illustrates a process 27.7300 that includes the process 27.100, wherein the wearable device is eyeglasses worn by the user.

FIG. 27.74 is an example flow diagram of example logic illustrating an example embodiment of process 27.100 of FIG. 27.1. More particularly, FIG. 27.74 illustrates a process 27.7400 that includes the process 27.100, wherein the presenting the vehicular threat information includes operations performed by or at one or more of the following block(s).

At block 27.7401, the process performs presenting the vehicular threat information via goggles worn by the user. The goggles may include a small display, an audio speaker, or haptic output device, or the like.

FIG. 27.75 is an example flow diagram of example logic illustrating an example embodiment of process 27.100 of FIG. 27.1. More particularly, FIG. 27.75 illustrates a process 27.7500 that includes the process 27.100, wherein the presenting the vehicular threat information includes operations performed by or at one or more of the following block(s).

At block 27.7501, the process performs presenting the vehicular threat information via a helmet worn by the user. The helmet may include an audio speaker or visual output device, such as a display that presents information on the inside of the face screen of the helmet. Other output devices, including haptic devices, are contemplated.

FIG. 27.76 is an example flow diagram of example logic illustrating an example embodiment of process 27.100 of FIG. 27.1. More particularly, FIG. 27.76 illustrates a process 27.7600 that includes the process 27.100, wherein the presenting the vehicular threat information includes operations performed by or at one or more of the following block(s).

At block 27.7601, the process performs presenting the vehicular threat information via a hat worn by the user. The hat may include an audio speaker or similar output device.

FIG. 27.77 is an example flow diagram of example logic illustrating an example embodiment of process 27.100 of FIG. 27.1. More particularly, FIG. 27.77 illustrates a process 27.7700 that includes the process 27.100, wherein the presenting the vehicular threat information includes operations performed by or at one or more of the following block(s).

At block 27.7701, the process performs presenting the vehicular threat information via eyeglasses worn by the user. The eyeglasses may include a small display, an audio speaker, or haptic output device, or the like.

FIG. 27.78 is an example flow diagram of example logic illustrating an example embodiment of process 27.100 of FIG. 27.1. More particularly, FIG. 27.78 illustrates a process 27.7800 that includes the process 27.100, wherein the presenting the vehicular threat information includes operations performed by or at one or more of the following block(s).

At block 27.7801, the process performs presenting the vehicular threat information via audio speakers that are part of at least one of earphones, a headset, earbuds, and/or a hearing aid. The audio speakers may be integrated into the wearable device. In other embodiments, other audio speakers (e.g., of a car stereo) may be employed instead or in addition.

FIG. 27.79 is an example flow diagram of example logic illustrating an example embodiment of process 27.100 of FIG. 27.1. More particularly, FIG. 27.79 illustrates a process 27.7900 that includes the process 27.100, and which further includes operations performed by or at the following block(s).

At block 27.7901, the process performs performing the receiving image data, the determining vehicular threat information, and/or the presenting the vehicular threat information on a computing device in the wearable device of the user. In some embodiments, a computing device of or in the wearable device may be responsible for performing one or more of the operations of the process. For example, a computing device situated within a helmet worn by the user may receive and analyze audio data to determine and present the vehicular threat information to the user.

FIG. 27.80 is an example flow diagram of example logic illustrating an example embodiment of process 27.100 of FIG. 27.1. More particularly, FIG. 27.80 illustrates a process 27.8000 that includes the process 27.100, and which further includes operations performed by or at the following block(s).

At block 27.8001, the process performs performing the receiving image data, the determining vehicular threat information, and/or the presenting the vehicular threat information on a road-side computing system. In some embodiments, an in-situ computing system may be responsible for performing one or more of the operations of the process. For example, a computing system situated at or about a street intersection may receive and analyze audio signals of vehicles that are entering or nearing the intersection. Such an architecture may be beneficial when the wearable device is a "thin" device that does not have sufficient processing power to, for example, determine whether the first vehicle is approaching the user.

At block 27.8002, the process performs transmitting the vehicular threat information from the road-side computing system to the wearable device of the user. For example, when the road-side computing system determines that two vehicles may be on a collision course, the computing system can transmit vehicular threat information to the wearable device so that the user can take evasive action and avoid a possible accident.

FIG. 27.81 is an example flow diagram of example logic illustrating an example embodiment of process 27.100 of FIG. 27.1. More particularly, FIG. 27.81 illustrates a process 27.8100 that includes the process 27.100, and which further includes operations performed by or at the following block(s).

At block 27.8101, the process performs performing the receiving image data, the determining vehicular threat information, and/or the presenting the vehicular threat information on a computing system in the first vehicle. In some embodiments, a computing system in the first vehicle performs one or more of the operations of the process. Such an architecture may be beneficial when the wearable device is a "thin" device that does not have sufficient processing power to, for example, determine whether the first vehicle is approaching the user.

At block 27.8102, the process performs transmitting the vehicular threat information from the computing system to the wearable device of the user.

FIG. 27.82 is an example flow diagram of example logic illustrating an example embodiment of process 27.100 of FIG. 27.1. More particularly, FIG. 27.82 illustrates a process 27.8200 that includes the process 27.100, and which further includes operations performed by or at the following block(s).

At block 27.8201, the process performs performing the receiving image data, the determining vehicular threat information, and/or the presenting the vehicular threat information on a computing system in a second vehicle, wherein the user is not traveling in the second vehicle. In some embodiments, other vehicles that are not carrying the user and are not the same as the first user may perform one or more of the operations of the process. In general, computing systems/devices situated in or at multiple vehicles, wearable devices, or fixed stations in a roadway may each perform operations related to determining vehicular threat information, which may then be shared with other users and devices to improve traffic flow, avoid collisions, and generally enhance the abilities of users of the roadway.

At block 27.8202, the process performs transmitting the vehicular threat information from the computing system to the wearable device of the user.

FIG. 27.83 is an example flow diagram of example logic illustrating an example embodiment of process 27.100 of FIG. 27.1. More particularly, FIG. 27.83 illustrates a process 27.8300 that includes the process 27.100, and which further includes operations performed by or at the following block(s).

At block 27.8301, the process performs receiving data representing an audio signal emitted by the first vehicle. The data representing the audio signal may be raw audio samples, compressed audio data, frequency coefficients, or the like. The data representing the audio signal may represent the sound made by the first vehicle, such as from its engine, a horn, tires, or any other source of sound. The data representing the audio signal may include sounds from other sources, including other vehicles, pedestrians, or the like. The audio signal may be obtained at or about a user who is a pedestrian or who is in a vehicle that is not the first vehicle, either as the operator or a passenger.

At block 27.8302, the process performs determining the vehicular threat information based further on the data representing the audio signal. As discussed further below, determining the vehicular threat information based on audio may include acoustic source localization, frequency analysis, or other techniques that can identify the presence, position, or motion of objects.

FIG. 27.84 is an example flow diagram of example logic illustrating an example embodiment of process 27.8300 of FIG. 27.83. More particularly, FIG. 27.84 illustrates a process 27.8400 that includes the process 27.8300, wherein the receiving data representing an audio signal emitted by the first vehicle includes operations performed by or at one or more of the following block(s).

At block 27.8401, the process performs receiving data obtained at a microphone array that includes multiple microphones. In some embodiments, a microphone array having two or more microphones is employed to receive audio signals. Differences between the received audio signals may be utilized to perform acoustic source localization or other functions, as discussed further herein.

FIG. 27.85 is an example flow diagram of example logic illustrating an example embodiment of process 27.8400 of FIG. 27.84. More particularly, FIG. 27.85 illustrates a process 27.8500 that includes the process 27.8400, wherein the receiving data obtained at a microphone array includes operations performed by or at one or more of the following block(s).

At block 27.8501, the process performs receiving data obtained at a microphone array, the microphone array coupled to a vehicle of the user. In some embodiments, such as when the user is operating or otherwise traveling in a vehicle of his own (that is not the same as the first vehicle), the microphone array may be coupled or attached to the user's vehicle, such as by having a microphone located at each of the four corners of the user's vehicle.

FIG. 27.86 is an example flow diagram of example logic illustrating an example embodiment of process 27.8400 of FIG. 27.84. More particularly, FIG. 27.86 illustrates a process 27.8600 that includes the process 27.8400, wherein the receiving data obtained at a microphone array includes operations performed by or at one or more of the following block(s).

At block 27.8601, the process performs receiving data obtained at a microphone array, the microphone array coupled to the wearable device. For example, if the wearable device is a helmet, then a first microphone may be located on the left side of the helmet while a second microphone may be located on the right side of the helmet.

FIG. 27.87 is an example flow diagram of example logic illustrating an example embodiment of process 27.8300 of FIG. 27.83. More particularly, FIG. 27.87 illustrates a process 27.8700 that includes the process 27.8300, wherein the determining the vehicular threat information based further on the data representing the audio signal includes operations performed by or at one or more of the following block(s).

At block 27.8701, the process performs performing acoustic source localization to determine a position of the first vehicle based on multiple audio signals received via multiple microphones. The process may determine a position of the first vehicle by analyzing audio signals received via multiple distinct microphones. For example, engine noise of the first vehicle may have different characteristics (e.g., in volume, in time of arrival, in frequency) as received by different microphones. Differences between the audio signal measured at different microphones may be exploited to determine one or more positions (e.g., points, arcs, lines, regions) at which the first vehicle may be located.

FIG. 27.88 is an example flow diagram of example logic illustrating an example embodiment of process 27.8700 of FIG. 27.87. More particularly, FIG. 27.88 illustrates a process 27.8800 that includes the process 27.8700, wherein the performing acoustic source localization includes operations performed by or at one or more of the following block(s).

At block 27.8801, the process performs receiving an audio signal via a first one of the multiple microphones, the audio signal representing a sound created by the first vehicle. In one approach, at least two microphones are employed. By measuring differences in the arrival time of an audio signal at the two microphones, the position of the first vehicle may be determined. The determined position may be a point, a line, an area, or the like.

At block 27.8802, the process performs receiving the audio signal via a second one of the multiple microphones.

At block 27.8803, the process performs determining the position of the first vehicle by determining a difference between an arrival time of the audio signal at the first microphone and an arrival time of the audio signal at the second microphone. In some embodiments, given information about the distance between the two microphones and the speed of sound, the process may determine the respective distances between each of the two microphones and the first vehicle. Given these two distances (along with the distance between the microphones), the process can solve for the one or more positions at which the first vehicle may be located.

FIG. 27.89 is an example flow diagram of example logic illustrating an example embodiment of process 27.8700 of FIG. 27.87. More particularly, FIG. 27.89 illustrates a process 27.8900 that includes the process 27.8700, wherein the performing acoustic source localization includes operations performed by or at one or more of the following block(s).

At block 27.8901, the process performs triangulating the position of the first vehicle based on a first and second angle, the first angle measured between a first one of the multiple microphones and the first vehicle, the second angle measured between a second one of the multiple microphones and the first vehicle. In some embodiments, the microphones may be directional, in that they may be used to determine the direction from which the sound is coming. Given such information, the process may use triangulation techniques to determine the position of the first vehicle.

FIG. 27.90 is an example flow diagram of example logic illustrating an example embodiment of process 27.8300 of FIG. 27.83. More particularly, FIG. 27.90 illustrates a process 27.9000 that includes the process 27.8300, wherein the determining the vehicular threat information based further on the data representing the audio signal includes operations performed by or at one or more of the following block(s).

At block 27.9001, the process performs performing a Doppler analysis of the data representing the audio signal to determine whether the first vehicle is approaching the user. The process may analyze whether the frequency of the audio signal is shifting in order to determine whether the first vehicle is approaching or departing the position of the user. For example, if the frequency is shifting higher, the first vehicle may be determined to be approaching the user. Note that the determination is typically made from the frame of reference of the user (who may be moving or not). Thus, the first vehicle may be determined to be approaching the user when, as viewed from a fixed frame of reference, the user is approaching the first vehicle (e.g., a moving user traveling towards a stationary vehicle) or the first vehicle is approaching the user (e.g., a moving vehicle approaching a stationary user). In other embodiments, other frames of reference may be employed, such as a fixed frame, a frame associated with the first vehicle, or the like.

FIG. 27.91 is an example flow diagram of example logic illustrating an example embodiment of process 27.9000 of FIG. 27.90. More particularly, FIG. 27.91 illustrates a process 27.9100 that includes the process 27.9000, wherein the performing a Doppler analysis includes operations performed by or at one or more of the following block(s).

At block 27.9101, the process performs determining whether frequency of the audio signal is increasing or decreasing.

FIG. 27.92 is an example flow diagram of example logic illustrating an example embodiment of process 27.8300 of FIG. 27.83. More particularly, FIG. 27.92 illustrates a process 27.9200 that includes the process 27.8300, wherein the determining the vehicular threat information based further on the data representing the audio signal includes operations performed by or at one or more of the following block(s).

At block 27.9201, the process performs performing a volume analysis of the data representing the audio signal to determine whether the first vehicle is approaching the user. The process may analyze whether the volume (e.g., amplitude) of the audio signal is shifting in order to determine whether the first vehicle is approaching or departing the position of the user. As noted, different embodiments may use different frames of reference when making this determination.

FIG. 27.93 is an example flow diagram of example logic illustrating an example embodiment of process 27.9200 of FIG. 27.92. More particularly, FIG. 27.93 illustrates a process 27.9300 that includes the process 27.9200, wherein the performing a volume analysis includes operations performed by or at one or more of the following block(s).

At block 27.9301, the process performs determining whether volume of the audio signal is increasing or decreasing.

FIG. 27.94 is an example flow diagram of example logic illustrating an example embodiment of process 27.100 of FIG. 27.1. More particularly, FIG. 27.94 illustrates a process 27.9400 that includes the process 27.100, and which further includes operations performed by or at the following block(s).

At block 27.9401, the process performs receiving data representing the first vehicle obtained at a road-based device. In some embodiments, the process may also consider data received from devices that are located in or about the roadway traveled by the user. Such devices may include cameras, loop coils, motion sensors, and the like.

At block 27.9402, the process performs determining the vehicular threat information based further on the data representing the first vehicle. For example, the process may determine that a car is approaching the user by analyzing an image taken from a camera that is mounted on or near a traffic signal over an intersection. As another example, the process may determine the speed of a vehicle with reference to data obtained from a radar gun/detector.

FIG. 27.95 is an example flow diagram of example logic illustrating an example embodiment of process 27.9400 of FIG. 27.94. More particularly, FIG. 27.95 illustrates a process 27.9500 that includes the process 27.9400, wherein the receiving data representing the first vehicle obtained at a road-based device includes operations performed by or at one or more of the following block(s).

At block 27.9501, the process performs receiving the data from a sensor deployed at an intersection. Various types of sensors are contemplated, including cameras, range sensors (e.g., sonar, radar, LIDAR, IR-based), magnetic coils, audio sensors, or the like.

FIG. 27.96 is an example flow diagram of example logic illustrating an example embodiment of process 27.9400 of FIG. 27.94. More particularly, FIG. 27.96 illustrates a process 27.9600 that includes the process 27.9400, wherein the receiving data representing the first vehicle obtained at a road-based device includes operations performed by or at one or more of the following block(s).

At block 27.9601, the process performs receiving an image of the first vehicle from a camera deployed at an intersection. For example, the process may receive images from a camera that is fixed to a traffic light or other signal at an intersection.

FIG. 27.97 is an example flow diagram of example logic illustrating an example embodiment of process 27.9400 of FIG. 27.94. More particularly, FIG. 27.97 illustrates a process 27.9700 that includes the process 27.9400, wherein the receiving data representing the first vehicle obtained at a road-based device includes operations performed by or at one or more of the following block(s).

At block 27.9701, the process performs receiving ranging data from a range sensor deployed at an intersection, the ranging data representing a distance between the first vehicle and the intersection. For example, the process may receive a distance (e.g., 75 meters) measured between some known point in the intersection (e.g., the position of the range sensor) and an oncoming vehicle.

FIG. 27.98 is an example flow diagram of example logic illustrating an example embodiment of process 27.9400 of FIG. 27.94. More particularly, FIG. 27.98 illustrates a process 27.9800 that includes the process 27.9400, wherein the receiving data representing the first vehicle obtained at a road-based device includes operations performed by or at one or more of the following block(s).

At block 27.9801, the process performs receiving data from an induction loop deployed in a road surface, the induction loop configured to detect the presence and/or velocity of the first vehicle. Induction loops may be embedded in the roadway and configured to detect the presence of vehicles passing over them. Some types of loops and/or processing may be employed to detect other information, including velocity, vehicle size, and the like.

FIG. 27.99 is an example flow diagram of example logic illustrating an example embodiment of process 27.9400 of FIG. 27.94. More particularly, FIG. 27.99 illustrates a process 27.9900 that includes the process 27.9400, wherein the determining the vehicular threat information based further on the data representing the first vehicle includes operations performed by or at one or more of the following block(s).

At block 27.9901, the process performs identifying the first vehicle in an image obtained from the road-based sensor. Image processing techniques may be employed to identify the presence of a vehicle, its type (e.g., car or truck), its size, or other information.

FIG. 27.100 is an example flow diagram of example logic illustrating an example embodiment of process 27.9400 of FIG. 27.94. More particularly, FIG. 27.100 illustrates a process 27.10000 that includes the process 27.9400, wherein the determining the vehicular threat information based further on the data representing the first vehicle includes operations performed by or at one or more of the following block(s).

At block 27.10001, the process performs determining a trajectory of the first vehicle based on multiple images obtained from the road-based device. In some embodiments, a video feed or other sequence of images may be analyzed to determine the position, speed, and/or direction of travel of the first vehicle.

FIG. 27.101 is an example flow diagram of example logic illustrating an example embodiment of process 27.100 of FIG. 27.1. More particularly, FIG. 27.101 illustrates a process 27.10100 that includes the process 27.100, and which further includes operations performed by or at the following block(s).

At block 27.10101, the process performs receiving data representing vehicular threat information relevant to a second vehicle, the second vehicle not being used for travel by the user. As noted, vehicular threat information may in some embodiments be shared amongst vehicles and entities present in a roadway. For example, a vehicle that is traveling just ahead of the user may determine that it is threatened by the first vehicle. This information may be shared with the user so that the user can also take evasive action, such as by slowing down or changing course.

At block 27.10102, the process performs determining the vehicular threat information based on the data representing vehicular threat information relevant to the second vehicle. Having received vehicular threat information from the second vehicle, the process may determine that it is also relevant to the user, and then accordingly present it to the user.

FIG. 27.102 is an example flow diagram of example logic illustrating an example embodiment of process 27.10100 of FIG. 27.101. More particularly, FIG. 27.102 illustrates a process 27.10200 that includes the process 27.10100, wherein the receiving data representing vehicular threat information relevant to a second vehicle includes operations performed by or at one or more of the following block(s).

At block 27.10201, the process performs receiving from the second vehicle an indication of stalled or slow traffic encountered by the second vehicle. Various types of threat information relevant to the second vehicle may be provided to the process, such as that there is stalled or slow traffic ahead of the second vehicle.

FIG. 27.103 is an example flow diagram of example logic illustrating an example embodiment of process 27.10100 of FIG. 27.101. More particularly, FIG. 27.103 illustrates a process 27.10300 that includes the process 27.10100, wherein the receiving data representing vehicular threat information relevant to a second vehicle includes operations performed by or at one or more of the following block(s).

At block 27.10301, the process performs receiving from the second vehicle an indication of poor driving conditions experienced by the second vehicle. The second vehicle may share the fact that it is experiencing poor driving conditions, such as an icy or wet roadway.

FIG. 27.104 is an example flow diagram of example logic illustrating an example embodiment of process 27.10100 of FIG. 27.101. More particularly, FIG. 27.104 illustrates a process 27.10400 that includes the process 27.10100, wherein the receiving data representing vehicular threat information relevant to a second vehicle includes operations performed by or at one or more of the following block(s).

At block 27.10401, the process performs receiving from the second vehicle an indication that the first vehicle is driving erratically. The second vehicle may share a determination that the first vehicle is driving erratically, such as by swerving, driving with excessive speed, driving too slowly, or the like.

FIG. 27.105 is an example flow diagram of example logic illustrating an example embodiment of process 27.10100 of FIG. 27.101. More particularly, FIG. 27.105 illustrates a process 27.10500 that includes the process 27.10100, wherein the receiving data representing vehicular threat information relevant to a second vehicle includes operations performed by or at one or more of the following block(s).

At block 27.10501, the process performs receiving from the second vehicle an image of the first vehicle. The second vehicle may include one or more cameras, and may share images obtained via those cameras with other entities.

FIG. 27.106 is an example flow diagram of example logic illustrating an example embodiment of process 27.100 of FIG. 27.1. More particularly, FIG. 27.106 illustrates a process 27.10600 that includes the process 27.100, and which further includes operations performed by or at the following block(s).

At block 27.10601, the process performs transmitting the vehicular threat information to a second vehicle. As noted, vehicular threat information may in some embodiments be shared amongst vehicles and entities present in a roadway. In this example, the vehicular threat information is transmitted to a second vehicle (e.g., one following behind the user), so that the second vehicle may benefit from the determined vehicular threat information as well.

FIG. 27.107 is an example flow diagram of example logic illustrating an example embodiment of process 27.10600 of FIG. 27.106. More particularly, FIG. 27.107 illustrates a process 27.10700 that includes the process 27.10600, wherein the transmitting the vehicular threat information to a second vehicle includes operations performed by or at one or more of the following block(s).

At block 27.10701, the process performs transmitting the vehicular threat information to an intermediary server system for distribution to other vehicles in proximity to the user. In some embodiments, intermediary systems may operate as relays for sharing the vehicular threat information with other vehicles and users of a roadway.

FIG. 27.108 is an example flow diagram of example logic illustrating an example embodiment of process 27.100 of FIG. 27.1. More particularly, FIG. 27.108 illustrates a process 27.10800 that includes the process 27.100, and which further includes operations performed by or at the following block(s).

At block 27.10801, the process performs transmitting the vehicular threat information to a law enforcement entity. In some embodiments, the process shares the vehicular threat information with law enforcement entities, including computer or other information systems managed or operated by such entities. For example, if the process determines that the first vehicle is driving erratically, the process may transmit that determination and/or information about the first vehicle with the police.

FIG. 27.109 is an example flow diagram of example logic illustrating an example embodiment of process 27.10800 of FIG. 27.108. More particularly, FIG. 27.109 illustrates a process 27.10900 that includes the process 27.10800, and which further includes operations performed by or at the following block(s).

At block 27.10901, the process performs determining a license place identifier of the first vehicle based on the image data. The process may perform image processing (e.g., optical character recognition) to determine the license number on the license plate of the first vehicle.

At block 27.10902, the process performs transmitting the license plate identifier to the law enforcement entity.

FIG. 27.110 is an example flow diagram of example logic illustrating an example embodiment of process 27.10800 of FIG. 27.108. More particularly, FIG. 27.110 illustrates a process 27.11000 that includes the process 27.10800, and which further includes operations performed by or at the following block(s).

At block 27.11001, the process performs determining a vehicle description of the first vehicle based on the image data. Image processing may be utilized to determine a vehicle description, including one or more of type, make, year, and/or color of the first vehicle.

At block 27.11002, the process performs transmitting the vehicle description to the law enforcement entity.

FIG. 27.111 is an example flow diagram of example logic illustrating an example embodiment of process 27.10800 of FIG. 27.108. More particularly, FIG. 27.111 illustrates a process 27.11100 that includes the process 27.10800, and which further includes operations performed by or at the following block(s).

At block 27.11101, the process performs determining a location associated with the first vehicle. The process may reference a GPS system to determine the current location of the user and/or the first vehicle, and then provide an indication of that location to the police or other agency. The location may be or include a coordinate, a street or intersection name, a name of a municipality, or the like.

At block 27.11102, the process performs transmitting an indication of the location to the law enforcement entity.

FIG. 27.112 is an example flow diagram of example logic illustrating an example embodiment of process 27.10800 of FIG. 27.108. More particularly, FIG. 27.112 illustrates a process 27.11200 that includes the process 27.10800, and which further includes operations performed by or at the following block(s).

At block 27.11201, the process performs determining a direction of travel of the first vehicle. As discussed above, the process may determine direction of travel in various ways, such as by modeling the motion of the first vehicle. Such a direction may then be provided to the police or other agency, such as by reporting that the first vehicle is traveling northbound.

At block 27.11202, the process performs transmitting an indication of the direction of travel to the law enforcement entity.

C. Example Computing System Implementation

Figure 28:
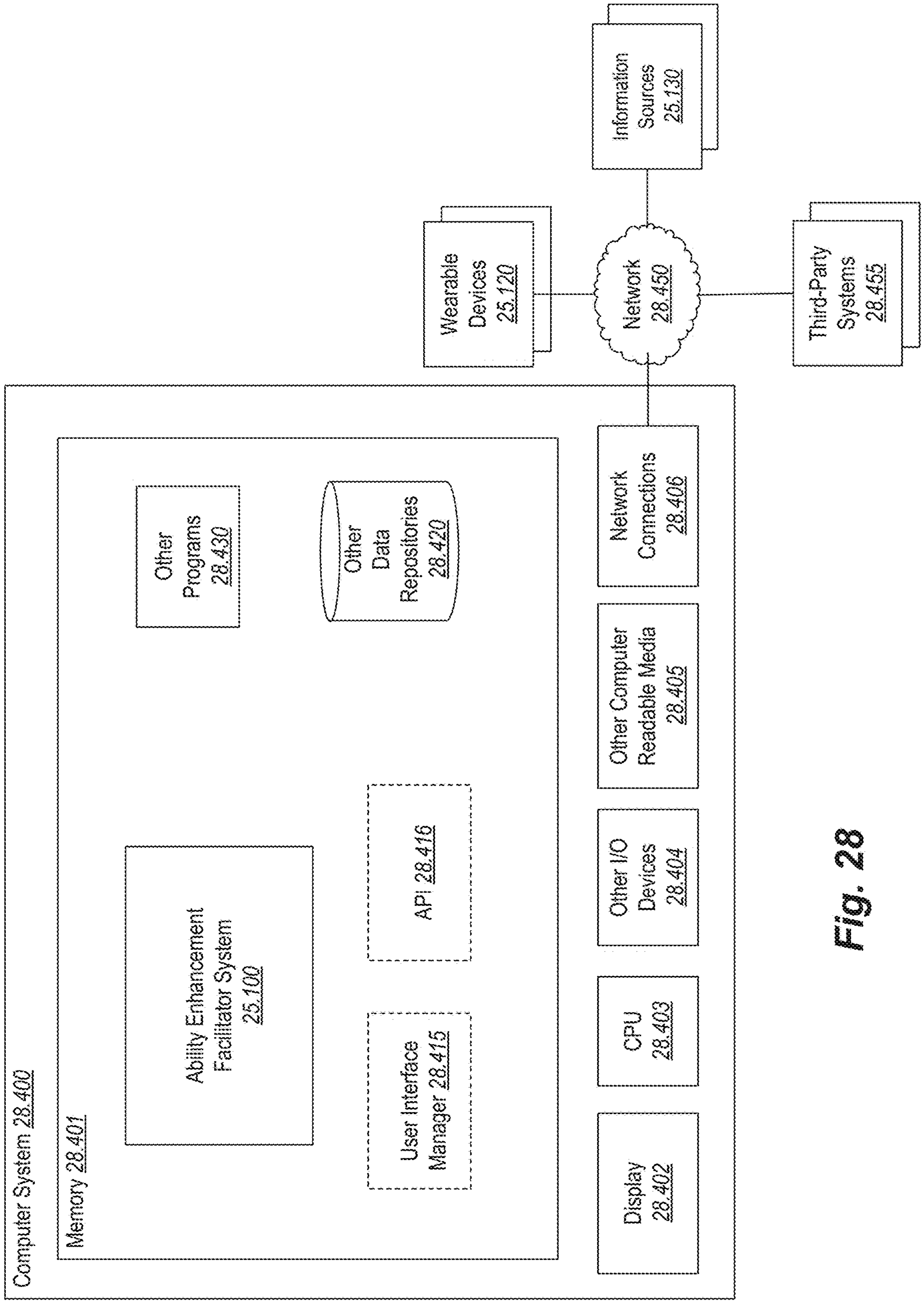
FIG. 28 is an example block diagram of an example computing system for implementing an ability enhancement facilitator system according to an example embodiment.

FIG. 28 is an example block diagram of an example computing system for implementing an ability enhancement facilitator system according to an example embodiment. In particular, FIG. 28 shows a computing system 28.400 that may be utilized to implement an AEFS 25.100.

Note that one or more general purpose or special purpose computing systems/devices may be used to implement the AEFS 25.100. In addition, the computing system 28.400 may comprise one or more distinct computing systems/devices and may span distributed locations. Furthermore, each block shown may represent one or more such blocks as appropriate to a specific embodiment or may be combined with other blocks. Also, the AEFS 25.100 may be implemented in software, hardware, firmware, or in some combination to achieve the capabilities described herein.

In the embodiment shown, computing system 28.400 comprises a computer memory ("memory") 28.401, a display 28.402, one or more Central Processing Units ("CPU") 28.403, Input/Output devices 28.404 (e.g., keyboard, mouse, CRT or LCD display, and the like), other computer-readable media 28.405, and network connections 28.406. The AEFS 25.100 is shown residing in memory 28.401. In other embodiments, some portion of the contents, some or all of the components of the AEFS 25.100 may be stored on and/or transmitted over the other computer-readable media 28.405. The components of the AEFS 25.100 preferably execute on one or more CPUs 28.403 and implement techniques described herein. Other code or programs 28.430 (e.g., an administrative interface, a Web server, and the like) and potentially other data repositories, such as data repository 28.420, also reside in the memory 28.401, and preferably execute on one or more CPUs 28.403. Of note, one or more of the components in FIG. 28 may not be present in any specific implementation. For example, some embodiments may not provide other computer readable media 28.405 or a display 28.402.

The AEFS 25.100 interacts via the network 28.450 with wearable devices 25.120, information sources 25.130, and third-party systems/applications 28.455. The network 28.450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 28.455 may include any systems that provide data to, or utilize data from, the AEFS 25.100, including Web browsers, vehicle-based client systems, traffic tracking, monitoring, or prediction systems, and the like.

The AEFS 25.100 is shown executing in the memory 28.401 of the computing system 28.400. Also included in the memory are a user interface manager 28.415 and an application program interface ("API") 28.416. The user interface manager 28.415 and the API 28.416 are drawn in dashed lines to indicate that in other embodiments, functions performed by one or more of these components may be performed externally to the AEFS 25.100.

The UI manager 28.415 provides a view and a controller that facilitate user interaction with the AEFS 25.100 and its various components. For example, the UI manager 28.415 may provide interactive access to the AEFS 25.100, such that users can configure the operation of the AEFS 25.100, such as by providing the AEFS 25.100 with information about common routes traveled, vehicle types used, driving patterns, or the like. The UI manager 28.415 may also manage and/or implement various output abstractions, such that the AEFS 25.100 can cause vehicular threat information to be displayed on different media, devices, or systems. In some embodiments, access to the functionality of the UI manager 28.415 may be provided via a Web server, possibly executing as one of the other programs 28.430. In such embodiments, a user operating a Web browser executing on one of the third-party systems 28.455 can interact with the AEFS 25.100 via the UI manager 28.415.

The API 28.416 provides programmatic access to one or more functions of the AEFS 25.100. For example, the API 28.416 may provide a programmatic interface to one or more functions of the AEFS 25.100 that may be invoked by one of the other programs 28.430 or some other module. In this manner, the API 28.416 facilitates the development of third-party software, such as user interfaces, plug-ins, adapters (e.g., for integrating functions of the AEFS 25.100 into vehicle-based client systems or devices), and the like.

In addition, the API 28.416 may be in at least some embodiments invoked or otherwise accessed via remote entities, such as code executing on one of the wearable devices 25.120, information sources 25.130, and/or one of the third-party systems/applications 28.455, to access various functions of the AEFS 25.100. For example, an information source 25.130 such as a radar gun installed at an intersection may push motion-related information (e.g., velocity) about vehicles to the AEFS 25.100 via the API 28.416. As another example, a weather information system may push current conditions information (e.g., temperature, precipitation) to the AEFS 25.100 via the API 28.416. The API 28.416 may also be configured to provide management widgets (e.g., code modules) that can be integrated into the third-party applications 28.455 and that are configured to interact with the AEFS 25.100 to make at least some of the described functionality available within the context of other applications (e.g., mobile apps).

In an example embodiment, components/modules of the AEFS 25.100 are implemented using standard programming techniques. For example, the AEFS 25.100 may be implemented as a "native" executable running on the CPU 28.403, along with one or more static or dynamic libraries. In other embodiments, the AEFS 25.100 may be implemented as instructions processed by a virtual machine that executes as one of the other programs 28.430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 25.100, such as in the data store 28.420 (or 26.240), can be available by standard mechanisms such as through C, C++, C #, and Java APIs; libraries for accessing files, databases, or other data repositories; through scripting languages such as XML; or through Web servers, FTP servers, or other types of servers providing access to stored data. The data store 28.420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 25.100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

VIII. Determining Threats Based on Information from Road-Based Devices in a Transportation-Related Context Embodiments described herein provide enhanced computer- and network-based methods and systems for ability enhancement and, more particularly, for enhancing a user's ability to operate or function in a transportation-related context (e.g., as a pedestrian or vehicle operator) by performing threat detection based at least in part on analyzing information received from road-based devices, such as a camera, microphone, or other sensor deployed at the side of a road, at an intersection, or other road-based location. The received information may include image data, audio data, or other data/signals that represent vehicles and other objects or conditions present in a roadway or other context. Example embodiments provide an Ability Enhancement Facilitator System ("AEFS") that performs at least some of the described techniques. Embodiments of the AEFS may augment, enhance, or improve the senses (e.g., hearing), faculties (e.g., memory, language comprehension), and/or other abilities (e.g., driving, riding a bike, walking/running) of a user.

In some embodiments, the AEFS is configured to identify threats (e.g., posed by vehicles to a user of a roadway, posed by a user to vehicles or other users of a roadway), and to provide information about such threats to the user so that he may take evasive action. Identifying threats may include analyzing information about a vehicle that is present in the roadway in order to determine whether the user and the vehicle may be on a collision course. The analyzed information may include or be represented by image data (e.g., pictures or video of a roadway and its surrounding environment), audio data (e.g., sounds reflected from or emitted by a vehicle), range information (e.g., provided by a sonar or infrared range sensor), conditions information (e.g., weather, temperature, time of day), or the like. The user may be a pedestrian (e.g., a walker, a jogger), an operator of a motorized (e.g., car, motorcycle, moped, scooter) or non-motorized vehicle (e.g., bicycle, pedicab, rickshaw), a vehicle passenger, or the like. In some embodiments, the vehicle may be operating autonomously. In some embodiments, the user wears a wearable device (e.g., a helmet, goggles, eyeglasses, hat) that is configured to at least present determined vehicular threat information to the user.

The AEFS may determine threats based on information received from various sources. Road-based sources may provide image, audio, or other types of data to the AEFS. The road-based sources may include sensors, devices, or systems that are deployed at, within, or about a roadway or intersection. For example, cameras, microphones, range sensors, velocity sensors, and the like may be affixed to utility or traffic signal support structures (e.g., poles, posts). As another example, induction coils embedded within a road can provide information to the AEFS about the presence and/or velocity of vehicles traveling over the road.

In some embodiments, the AEFS is configured to receive image data, at least some of which represents an image of a first vehicle. The image data may be obtained from various sources, including a camera of a wearable device of a user, a camera on a vehicle of the user, a road-side camera, a camera on some other vehicle, or the like. The image data may represent electromagnetic signals of various types or in various ranges, including visual signals (e.g., signals having a wavelength in the range of about 390-750 nm), infrared signals (e.g., signals having a wavelength in the range of about 750 nm-300 micrometers), or the like.

Then, the AEFS determines vehicular threat information based at least in part on the image data. In some embodiments, the AEFS may analyze the received image data in order to identify the first vehicle and/or to determine whether the first vehicle represents a threat to the user, such as because the first vehicle and the user may be on a collision course. The image data may be analyzed in various ways, including by identifying objects (e.g., to recognize that a vehicle or some other object is shown in the image data), determining motion-related information (e.g., position, velocity, acceleration, mass) about objects, or the like.

Next, the AEFS informs the user of the determined vehicular threat information via a wearable device of the user. Typically, the user's wearable device (e.g., a helmet) will include one or more output devices, such as audio speakers, visual display devices (e.g., warning lights, screens, heads-up displays), haptic devices, and the like. The AEFS may present the vehicular threat information via one or more of these output devices. For example, the AEFS may visually display or speak the words "Car on left." As another example, the AEFS may visually display a leftward pointing arrow on a heads-up screen displayed on a face screen of the user's helmet. Presenting the vehicular threat information may also or instead include presenting a recommended course of action (e.g., to slow down, to speed up, to turn) to mitigate the determined vehicular threat.

The AEFS may use other or additional sources or types of information. For example, in some embodiments, the AEFS is configured to receive data representing an audio signal emitted by a first vehicle. The audio signal is typically obtained in proximity to a user, who may be a pedestrian or traveling in a vehicle as an operator or a passenger. In some embodiments, the audio signal is obtained by one or more microphones coupled to a road-side structure, the user's vehicle and/or a wearable device of the user, such as a helmet, goggles, a hat, a media player, or the like. Then, the AEFS may determine vehicular threat information based at least in part on the data representing the audio signal. In some embodiments, the AEFS may analyze the received data in order to determine whether the first vehicle and the user are on a collision course. The audio data may be analyzed in various ways, including by performing audio analysis, frequency analysis (e.g., Doppler analysis), acoustic localization, or the like.

The AEFS may combine information of various types in order to determine threat information. For example, because image processing may be computationally expensive, rather than always processing all image data obtained from every possible source, the AEFS may use audio analysis to initially determine the approximate location of an oncoming vehicle, such as to the user's left, right, or rear. For example, having determined based on audio data that a vehicle may be approaching from the rear of the user, the AEFS may preferentially process image data from a rear-facing camera to further refine a threat analysis. As another example, the AEFS may incorporate information about the condition of a roadway (e.g., icy or wet) when determining whether a vehicle will be able to stop or maneuver in order to avoid an accident.

A. Ability Enhancement Facilitator System Overview

Figure 29A:
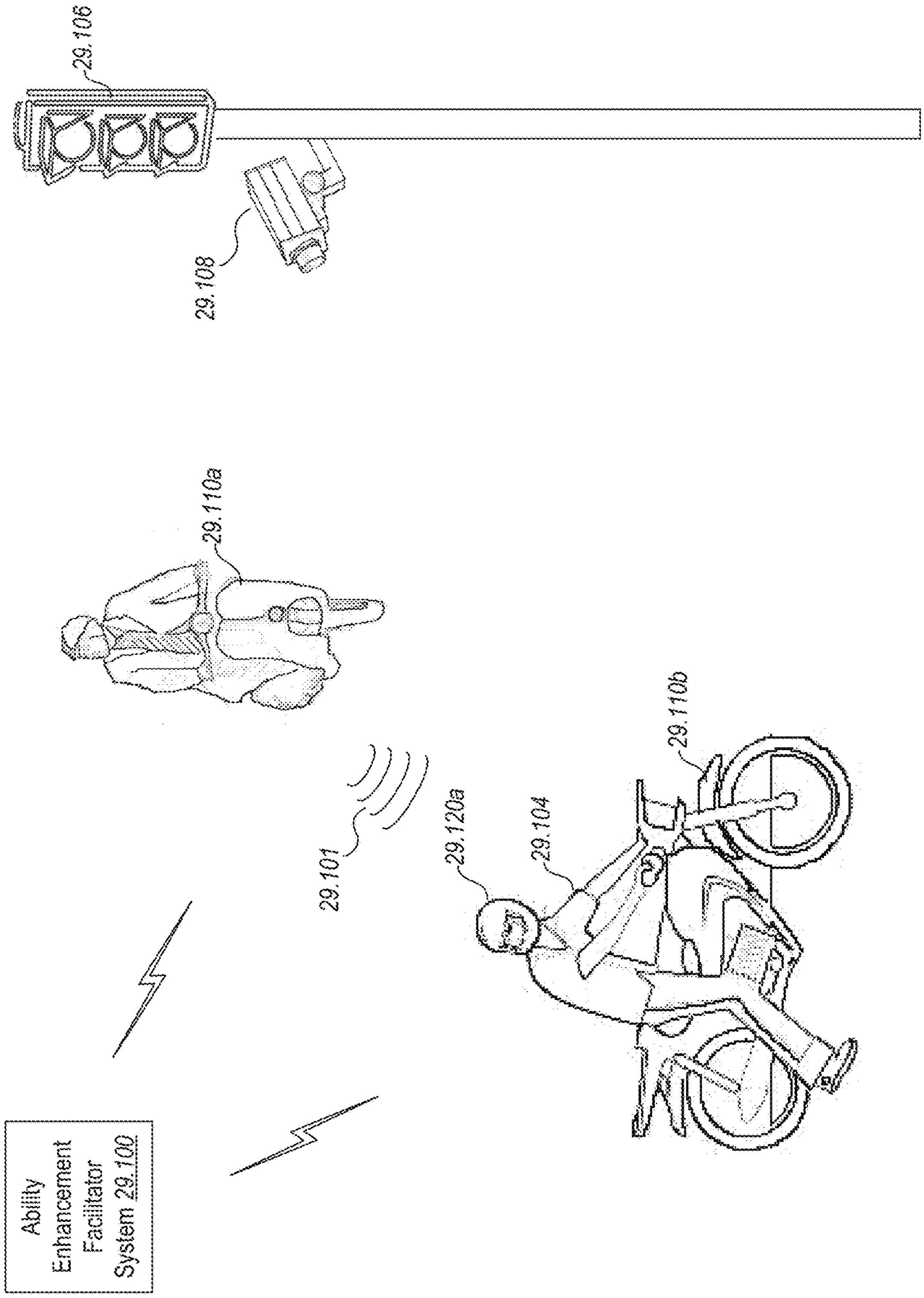
FIGS. 29A and 29B are various views of an example ability enhancement scenario according to an example embodiment.
Figure 29B:
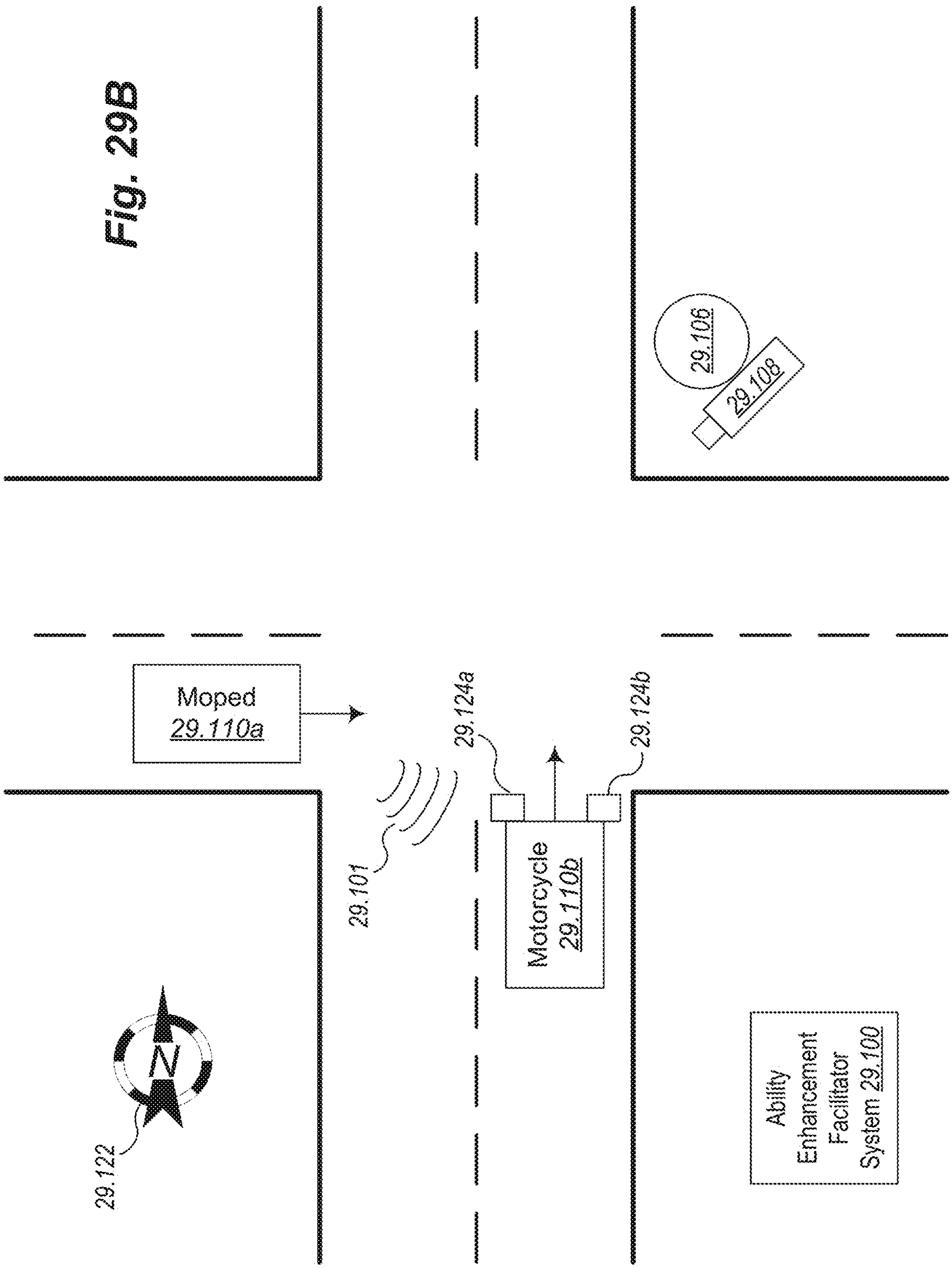

FIGS. 29A and 29B are various views of an example ability enhancement scenario according to an example embodiment. More particularly, FIGS. 29A and 29B respectively are perspective and top views of a traffic scenario which may result in a collision between two vehicles.

FIG. 29A is a perspective view of an example traffic scenario according to an example embodiment. The illustrated scenario includes two vehicles 29.110*a* (a moped) and 29.110*b* (a motorcycle). The motorcycle 29.110*b* is being ridden by a user 29.104 who is wearing a wearable device 29.120*a* (a helmet). An Ability Enhancement Facilitator System ("AEFS") 29.100 is enhancing the ability of the user 29.104 to operate his vehicle 29.110*b* via the wearable device 29.120*a*. The example scenario also includes a traffic signal 29.106 upon which is mounted a camera 29.108.

In this example, the moped 29.110*a* is driving towards the motorcycle 29.110*b* from a side street, at approximately a right angle with respect to the path of travel of the motorcycle 29.110*b*. The traffic signal 29.106 has just turned from red to green for the motorcycle 29.110*b*, and the user 29.104 is beginning to drive the motorcycle 29.110 into the intersection controlled by the traffic signal 29.106. The user 29.104 is assuming that the moped 29.110*a* will stop, because cross traffic will have a red light. However, in this example, the moped 29.110*a* may not stop in a timely manner, for one or more reasons, such as because the operator of the moped 29.110*a* has not seen the red light, because the moped 29.110*a* is moving at an excessive rate, because the operator of the moped 29.110*a* is impaired, because the surface conditions of the roadway are icy or slick, or the like. As will be discussed further below, the AEFS 29.100 will determine that the moped 29.110*a* and the motorcycle 29.110*b* are likely on a collision course, and inform the user 29.104 of this threat via the helmet 29.120*a*, so that the user may take evasive action to avoid a possible collision with the moped 29.110*a*.

The moped 29.110 emits or reflects a signal 29.101. In some embodiments, the signal 29.101 is an electromagnetic signal in the visible light spectrum that represents an image of the moped 29.110*a*. Other types of electromagnetic signals may be received and processed, including infrared radiation, radio waves, microwaves, or the like. Other types of signals are contemplated, including audio signals, such as an emitted engine noise, a reflected sonar signal, a vocalization (e.g., shout, scream), etc. The signal 29.101 may be received by a receiving detector/device/sensor, such as a camera or microphone (not shown) on the helmet 29.120*a* and/or the motorcycle 29.110*b*. In some embodiments, a computing and communication device within the helmet 29.120*a* receives and samples the signal 29.101 and transmits the samples or other representation to the AEFS 29.100. In other embodiments, other forms of data may be used to represent the signal 29.101, including frequency coefficients, compressed audio/video, or the like.

The AEFS 29.100 determines vehicular threat information by analyzing the received data that represents the signal 29.101. If the signal 29.101 is a visual signal, then the AEFS 29.100 may employ various image data processing techniques. For example, the AEFS 29.100 may perform object recognition to determine that received image data includes an image of a vehicle, such as the moped 29.110*a*. The AEFS 29.100 may also or instead process received image data to determine motion-related information with respect to the moped 29.110, including position, velocity, acceleration, or the like. The AEFS 29.100 may further identify the presence of other objects, including pedestrians, animals, structures, or the like, that may pose a threat to the user 29.104 or that may be themselves threatened (e.g., by actions of the user 29.104 and/or the moped 29.110*a*). Image processing also may be employed to determine other information, including road conditions (e.g., wet or icy roads), visibility conditions (e.g., glare or darkness), and the like.

If the signal 29.101 is an audio signal, then the AEFS 29.100 may use one or more audio analysis techniques to determine the vehicular threat information. In one embodiment, the AEFS 29.100 performs a Doppler analysis (e.g., by determining whether the frequency of the audio signal is increasing or decreasing) to determine that the object that is emitting the audio signal is approaching (and possibly at what rate) the user 29.104. In some embodiments, the AEFS

29.100 may determine the type of vehicle (e.g., a heavy truck, a passenger vehicle, a motorcycle, a moped) by analyzing the received data to identify an audio signature that is correlated with a particular engine type or size. For example, a lower frequency engine sound may be correlated with a larger vehicle size, and a higher frequency engine sound may be correlated with a smaller vehicle size.

In one embodiment, where the signal 29.101 is an audio signal, the AEFS 29.100 performs acoustic source localization to determine information about the trajectory of the moped 29.110*a*, including one or more of position, direction of travel, speed, acceleration, or the like. Acoustic source localization may include receiving data representing the audio signal 29.101 as measured by two or more microphones. For example, the helmet 29.120*a* may include four microphones (e.g., front, right, rear, and left) that each receive the audio signal 29.101. These microphones may be directional, such that they can be used to provide directional information (e.g., an angle between the helmet and the audio source). Such directional information may then be used by the AEFS 29.100 to triangulate the position of the moped 29.110*a*. As another example, the AEFS 29.100 may measure differences between the arrival time of the audio signal 29.101 at multiple distinct microphones on the helmet 29.120*a* or other location. The difference in arrival time, together with information about the distance between the microphones, can be used by the AEFS 29.100 to determine distances between each of the microphones and the audio source, such as the moped 29.110*a*. Distances between the microphones and the audio source can then be used to determine one or more locations at which the audio source may be located.

Determining vehicular threat information may also or instead include obtaining information such as the position, trajectory, and speed of the user 29.104, such as by receiving data representing such information from sensors, devices, and/or systems on board the motorcycle 29.110*b* and/or the helmet 29.120*a*. Such sources of information may include a speedometer, a geo-location system (e.g., GPS system), an accelerometer, or the like. Once the AEFS 29.100 has determined and/or obtained information such as the position, trajectory, and speed of the moped 29.110*a* and the user 29.104, the AEFS 29.100 may determine whether the moped 29.110*a* and the user 29.104 are likely to collide with one another. For example, the AEFS 29.100 may model the expected trajectories of the moped 29.110*a* and user 29.104 to determine whether they intersect at or about the same point in time.

The AEFS 29.100 may then present the determined vehicular threat information (e.g., that the moped 29.110*a* represents a hazard) to the user 29.104 via the helmet 29.120*a*. Presenting the vehicular threat information may include transmitting the information to the helmet 29.120*a*, where it is received and presented to the user. In one embodiment, the helmet 29.120*a* includes audio speakers that may be used to output an audio signal (e.g., an alarm or voice message) warning the user 29.104. In other embodiments, the helmet 29.120*a* includes a visual display, such as a heads-up display presented upon a face screen of the helmet 29.120*a*, which can be used to present a text message (e.g., "Look left") or an icon (e.g., a red arrow pointing left).

As noted, the AEFS 29.100 may also use information received from road-based sensors and/or devices. For example, the AEFS 29.100 may use information received from a camera 29.108 that is mounted on the traffic signal 29.106 that controls the illustrated intersection. The AEFS 29.100 may receive image data that represents the moped 29.110*a* and/or the motorcycle 29.110*b*. The AEFS 29.100 may perform image recognition to determine the type and/or position of a vehicle that is approaching the intersection. The AEFS 29.100 may also or instead analyze multiple images (e.g., from a video signal) to determine the velocity of a vehicle. Other types of sensors or devices installed in or about a roadway may also or instead by used, including range sensors, speed sensors (e.g., radar guns), induction coils (e.g., loops mounted in the roadbed), temperature sensors, weather gauges, or the like.

FIG. 29B is a top view of the traffic scenario described with respect to FIG. 29A, above. FIG. 29B includes a legend 29.122 that indicates the compass directions. In this example, moped 29.110*a* is traveling eastbound and is about to enter the intersection. Motorcycle 29.110*b* is traveling northbound and is also about to enter the intersection. Also shown are the signal 29.101, the traffic signal 29.106, and the camera 29.108.

As noted above, the AEFS 29.100 may utilize data that represents a signal as detected by one or more detectors/sensors, such as microphones or cameras. In the example of FIG. 29B, the motorcycle 29.110*b* includes two sensors 29.124*a* and 29.124*b*, respectively mounted at the front left and front right of the motorcycle 29.110*b*.

In an image context, the AEFS 29.100 may perform image processing on image data obtained from one or more of the camera sensors 29.124*a* and 29.124*b*. As discussed, the image data may be processed to determine the presence of the moped, its type, its motion-related information (e.g., velocity), and the like. In some embodiments, image data may be processed without making any definite identification of a vehicle. For example, the AEFS 29.100 may process image data from sensors 29.124*a* and 29.124*b* to identify the presence of motion (without necessarily identifying any objects). Based on such an analysis, the AEFS 29.100 may determine that there is something approaching from the left of the motorcycle 29.110*b*, but that the right of the motorcycle 29.110*b* is relatively clear.

Differences between data obtained from multiple sensors may be exploited in various ways. In an image context, an image signal may be perceived or captured differently by the two (camera) sensors 29.124*a* and 29.124*b*. The AEFS 29.100 may exploit or otherwise analyze such differences to determine the location and/or motion of the moped 29.110*a*. For example, knowing the relative position and optical qualities of the two cameras, it is possible to analyze images captured by those cameras to triangulate a position of an object (e.g., the moped 29.110*a*) or a distance between the motorcycle 29.110*b* and the object.

In an audio context, an audio signal may be perceived differently by the two sensors 29.124*a* and 29.124*b*. For example, if the strength of the signal 29.101 is stronger as measured at microphone 29.124*a* than at microphone 29.124*b*, the AEFS 29.100 may infer that the signal 29.101 is originating from the driver's left of the motorcycle 29.110*b*, and thus that a vehicle is approaching from that direction. As another example, as the strength of an audio signal is known to decay with distance, and assuming an initial level (e.g., based on an average signal level of a vehicle engine) the AEFS 29.100 may determine a distance (or distance interval) between one or more of the microphones and the signal source.

The AEFS 29.100 may model vehicles and other objects, such as by representing their motion-related information, including position, speed, acceleration, mass and other properties. Such a model may then be used to determine whether objects are likely to collide. Note that the model may be probabilistic. For example the AEFS 29.100 may represent an object's position in space as a region that includes multiple positions that each have a corresponding likelihood that that the object is at that position. As another example, the AEFS 29.100 may represent the velocity of an object as a range of likely values, a probability distribution, or the like. Various frames of reference may be employed, including a user-centric frame, an absolute frame, or the like.

Figure 29C:
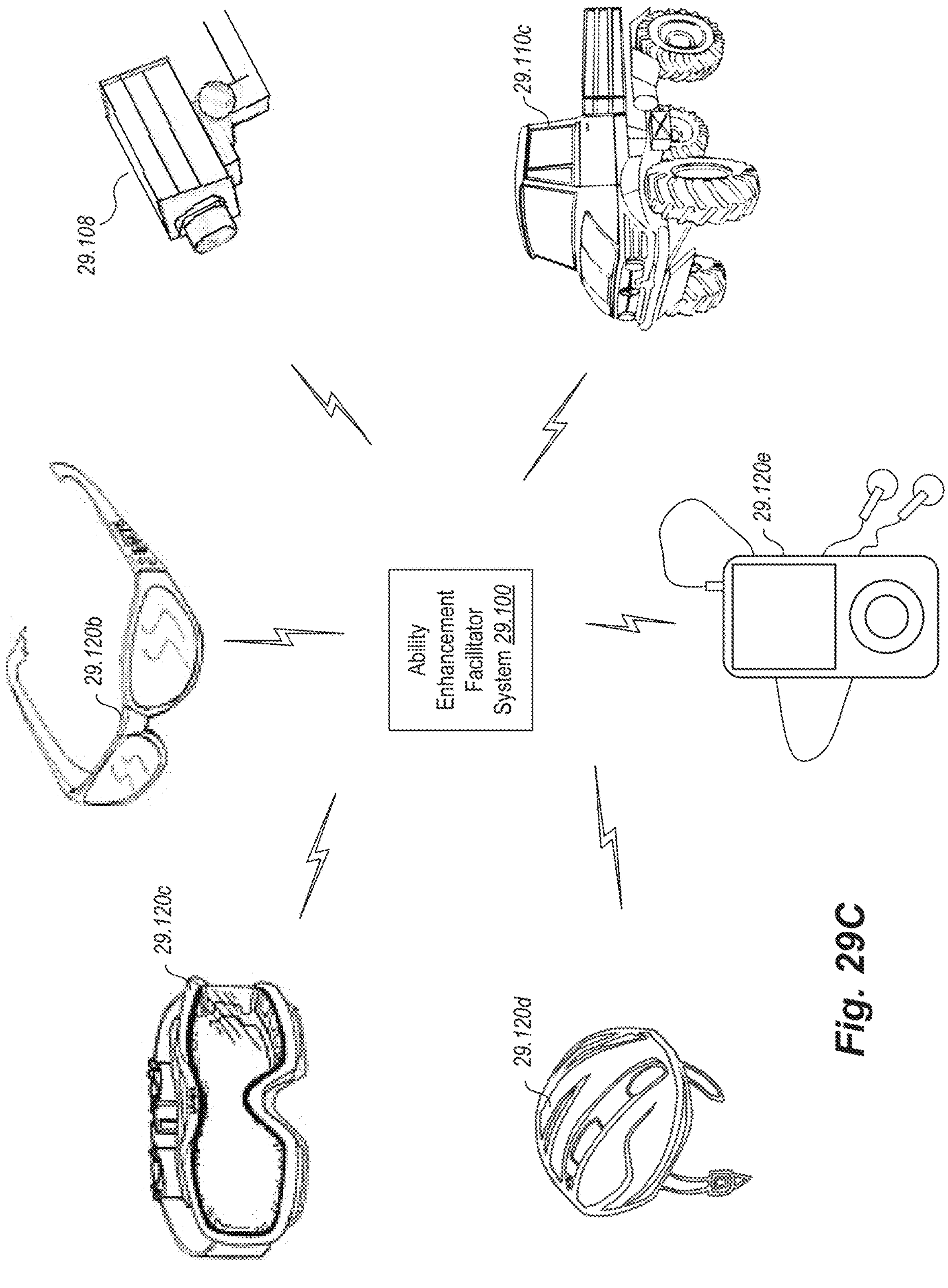
FIG. 29C is an example block diagram illustrating various devices in communication with an ability enhancement facilitator system according to example embodiments.

FIG. 29C is an example block diagram illustrating various devices in communication with an ability enhancement facilitator system according to example embodiments. In particular, FIG. 29C illustrates an AEFS 29.100 in communication with a variety of wearable devices 29.120*b*-120*e*, a camera 29.108, and a vehicle 29.110*c*.

The AEFS 29.100 may interact with various types of wearable devices 29.120, including a motorcycle helmet 29.120*a* (FIG. 29A), eyeglasses 29.120*b*, goggles 29.120*c*, a bicycle helmet 29.120*d*, a personal media device 29.120*e*, or the like. Wearable devices 29.120 may include any device modified to have sufficient computing and communication capability to interact with the AEFS 29.100, such as by presenting vehicular threat information received from the AEFS 29.100, providing data (e.g., audio data) for analysis to the AEFS 29.100, or the like.

In some embodiments, a wearable device may perform some or all of the functions of the AEFS 29.100, even though the AEFS 29.100 is depicted as separate in these examples. Some devices may have minimal processing power and thus perform only some of the functions. For example, the eyeglasses 29.120*b* may receive vehicular threat information from a remote AEFS 29.100, and display it on a heads-up display displayed on the inside of the lenses of the eyeglasses 29.120*b*. Other wearable devices may have sufficient processing power to perform more of the functions of the AEFS 29.100. For example, the personal media device 29.120*e* may have considerable processing power and as such be configured to perform acoustic source localization, collision detection analysis, or other more computational expensive functions.

Note that the wearable devices 29.120 may act in concert with one another or with other entities to perform functions of the AEFS 29.100. For example, the eyeglasses 29.120*b* may include a display mechanism that receives and displays vehicular threat information determined by the personal media device 29.120*e*. As another example, the goggles 29.120*c* may include a display mechanism that receives and displays vehicular threat information determined by a computing device in the helmet 29.120*a* or 29.120*d*. In a further example, one of the wearable devices 29.120 may receive and process audio data received by microphones mounted on the vehicle 29.110*c*.

The AEFS 29.100 may also or instead interact with vehicles 29.110 and/or computing devices installed thereon. As noted, a vehicle 29.110 may have one or more sensors or devices that may operate as (direct or indirect) sources of information for the AEFS 29.100. The vehicle 29.110*c*, for example, may include a speedometer, an accelerometer, one or more microphones, one or more range sensors, or the like. Data obtained by, at, or from such devices of vehicle 29.110*c* may be forwarded to the AEFS 29.100, possibly by a wearable device 29.120 of an operator of the vehicle 29.110*c*.

In some embodiments, the vehicle 29.110*c* may itself have or use an AEFS, and be configured to transmit warnings or other vehicular threat information to others. For example, an AEFS of the vehicle 29.110*c* may have determined that the moped 29.110*a* was driving with excessive speed just prior to the scenario depicted in FIG. 29B. The AEFS of the vehicle 29.110*c* may then share this information, such as with the AEFS 29.100. The AEFS 29.100 may accordingly receive and exploit this information when determining that the moped 29.110*a* poses a threat to the motorcycle 29.110*b*.

The AEFS 29.100 may also or instead interact with sensors and other devices that are installed on, in, or about roads or in other transportation related contexts, such as parking garages, racetracks, or the like. In this example, the AEFS 29.100 interacts with the camera 29.108 to obtain images of vehicles, pedestrians, or other objects present in a roadway. Other types of sensors or devices may include range sensors, infrared sensors, induction coils, radar guns, temperature gauges, precipitation gauges, or the like.

The AEFS 29.100 may further interact with information systems that are not shown in FIG. 29C. For example, the AEFS 29.100 may receive information from traffic information systems that are used to report traffic accidents, road conditions, construction delays, and other information about road conditions. The AEFS 29.100 may receive information from weather systems that provide information about current weather conditions. The AEFS 29.100 may receive and exploit statistical information, such as that drivers in particular regions are more aggressive, that red light violations are more frequent at particular intersections, that drivers are more likely to be intoxicated at particular times of day or year, or the like.

In some embodiments, the AEFS 29.100 may transmit information to law enforcement agencies and/or related computing systems. For example, if the AEFS 29.100 determines that a vehicle is driving erratically, it may transmit that fact along with information about the vehicle (e.g., make, model, color, license plate number, location) to a police computing system.

Note that in some embodiments, at least some of the described techniques may be performed without the utilization of any wearable devices 29.120. For example, a vehicle 29.110 may itself include the necessary computation, input, and output devices to perform functions of the AEFS 29.100. For example, the AEFS 29.100 may present vehicular threat information on output devices of a vehicle 29.110, such as a radio speaker, dashboard warning light, heads-up display, or the like. As another example, a computing device on a vehicle 29.110 may itself determine the vehicular threat information.

Figure 29D:
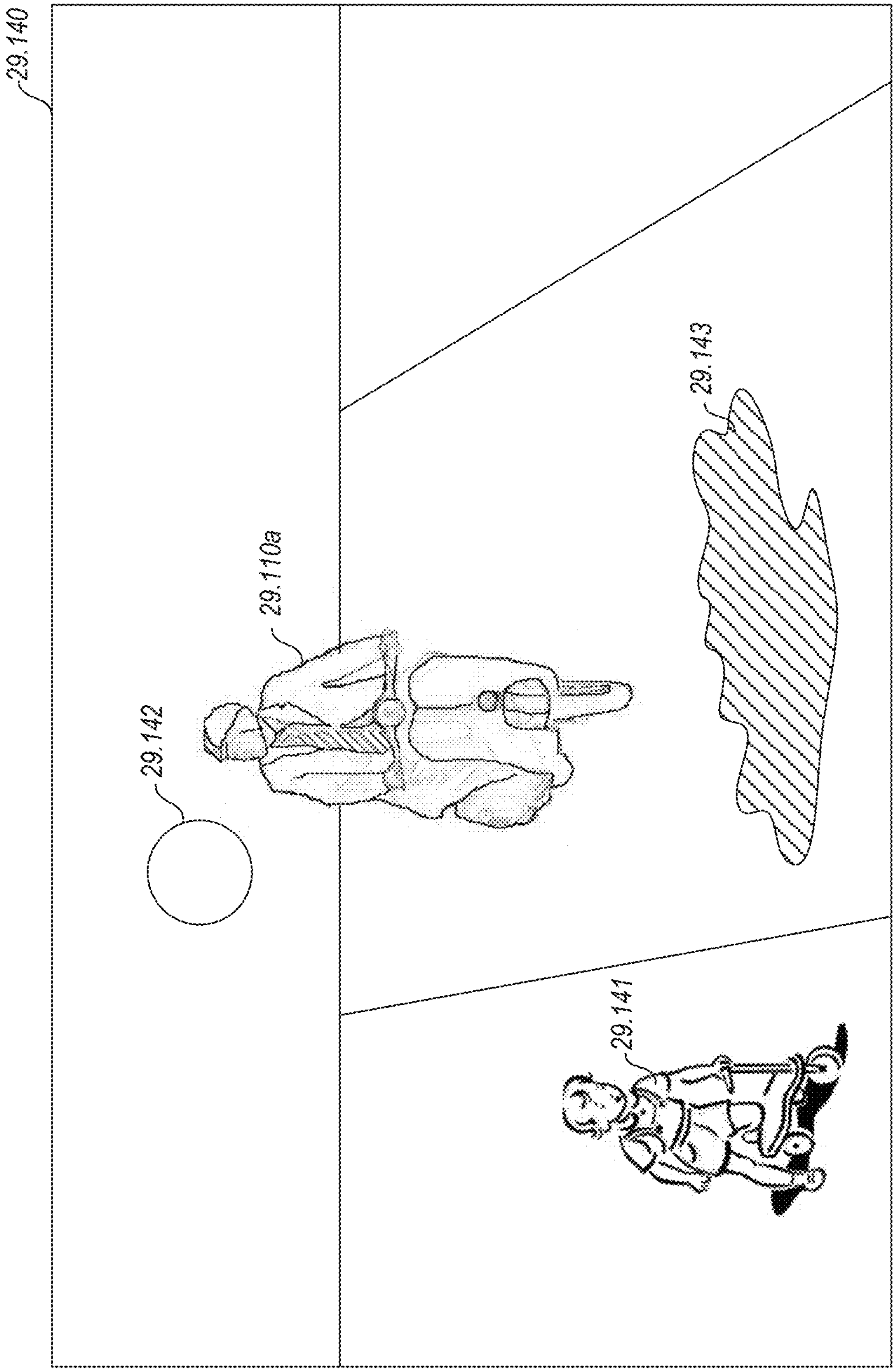
FIG. 29D is an example diagram illustrating an example image processed according to an example embodiment.

FIG. 29D is an example diagram illustrating an example image processed according to an example embodiment. In particular, FIG. 29D depicts an image 29.140 of the moped 29.110*a*. This image may be obtained from a camera (e.g., sensor 29.124*a*) on the left side of the motorcycle 29.110*b* in the scenario of FIG. 29B. The image may also or instead be obtained from camera 29.108 mounted on the traffic signal 29.106, as shown in FIG. 29B. Also visible in the image 29.140 are a child 29.141 on a scooter, the sun 29.142, and a puddle 29.143. The sun 29.142 is setting in the west, and is thus low in the sky, appearing nearly behind the moped 29.110*a*. In such conditions, visibility for the user 29.104 (not shown here) would be quite difficult.

In some embodiments, the AEFS 29.100 processes the image 29.140 to perform object identification. Upon processing the image 29.140, the AEFS 29.100 may identify the moped 29.110*a*, the child 29.141, the sun 29.142, the puddle 29.143, and/or the roadway 29.144. A sequence of images, taken at different times (e.g., one tenth of a second apart) may be used to determine that the moped 29.110*a* is moving, how fast the moped 29.110*a* is moving, acceleration/deceleration of the moped 29.110*a*, or the like. Motion of other objects, such as the child 29.141 may also be tracked. Based on such motion-related information, the AEFS 29.100 may model the physics of the identified objects to determine whether a collision is likely.

Determining vehicular threat information may also or instead be based on factors related or relevant to objects other than the moped 29.110*a* or the user 29.104. For example, the AEFS 29.100 may determine that the puddle 29.143 will likely make it more difficult for the moped 29.110*a* to stop. Thus, even if the moped 29.110*a* is moving at a reasonable speed, he still may be unable to stop prior to entering the intersection due to the presence of the puddle 29.143. As another example, the AEFS 29.100 may determine that evasive action by the user 29.104 and/or the moped 29.110*a* may cause injury to the child 29.141. As a further example, the AEFS 29.100 may determine that it may be difficult for the user 29.104 to see the moped 29.110*a* and/or the child 29.141 due to the position of the sun 29.142. Such information may be incorporated into any models, predictions, or determinations made or maintained by the AEFS 29.100.

Figure 29E:
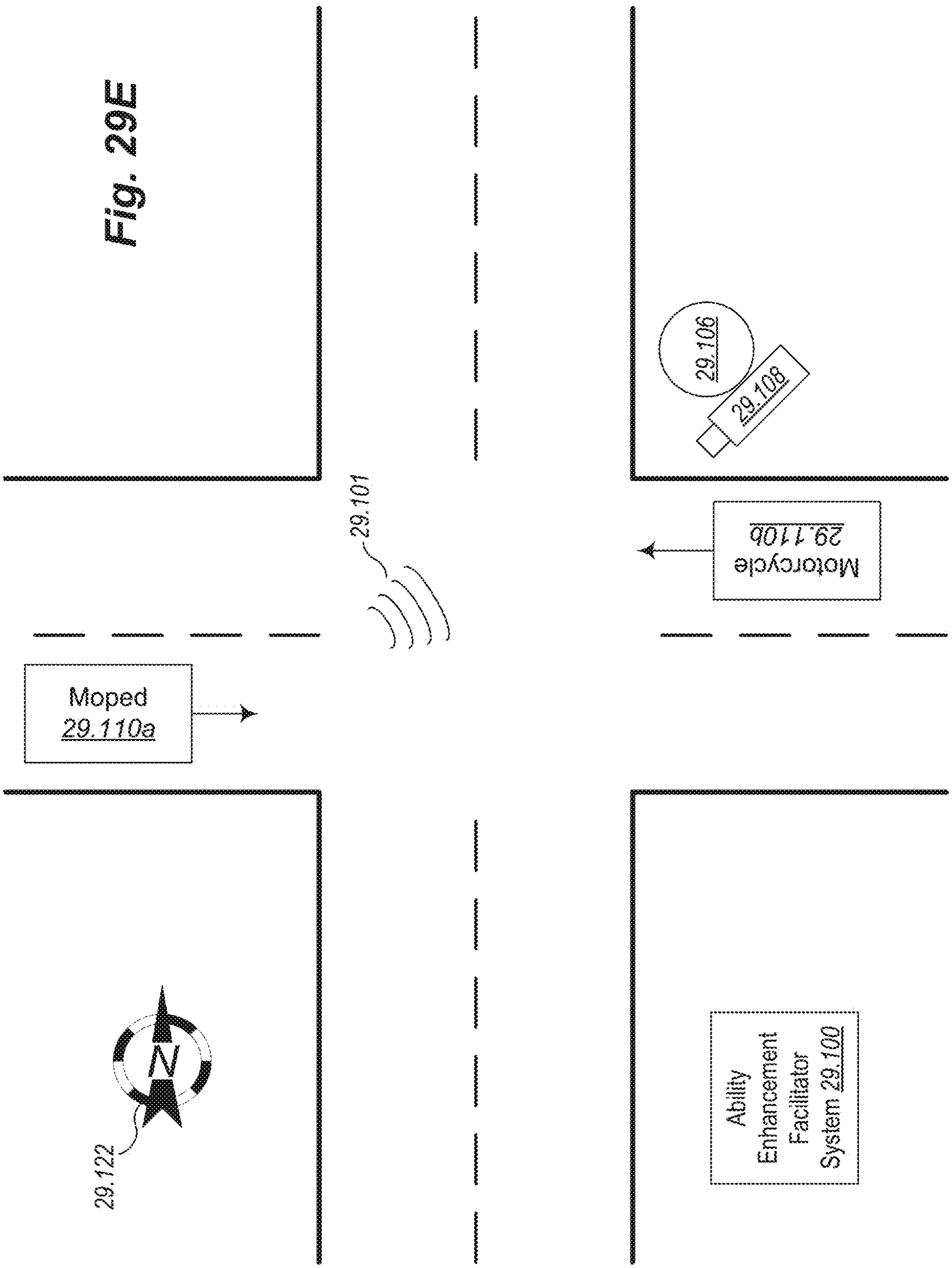
FIG. 29E is a second example ability enhancement scenario according to an example embodiment.

FIG. 29E is a second example ability enhancement scenario according to an example embodiment. In particular, FIG. 29E is a top view of a traffic scenario that is similar to that shown in FIG. 29B. However, in FIG. 29E, rather than approaching each other from right angles (as in FIG. 29B), the moped 29.110*a* and the motorcycle 29.110*b* are heading towards each other, each in their respective lanes. FIG. 29E includes a legend 29.122 that indicates the compass directions. The moped 29.110*a* is east bound, and the motorcycle 29.110*b* is west bound. The driver of the motorcycle 29.110*b* wishes to turn left, across the path of the oncoming moped 29.110*a*.

The scenario of FIG. 29E may commonly result in an accident. Such is the case particularly during signal changes, because it is difficult for the driver of the motorcycle 29.110*b* to determine whether the moped 29.110*a* is slowing down (e.g., to stop for a yellow light) or speeding up (e.g., to beat the yellow light). In addition, visibility conditions may make it more difficult for the driver of the motorcycle 29.110*b* to determine the speed of the moped 29.110*a*. For example, if the sun is setting behind the moped 29.110*a*, then the driver of the motorcycle 29.110*b* may not even have a clear view of the moped 29.110*a*. Also, surface conditions may make it difficult for the moped 29.110*a* to stop if the driver of the motorcycle 29.110*b* does decide to make the left turn ahead of the moped 29.110*a*. For example, a wet or oily road surface may increase the braking distance of the moped 29.110*a*.

In this example, the AEFS 29.100 determines that the driver of the motorcycle 29.110*b* intends to make a left turn. This determination may be based on the fact that the motorcycle 29.110*b* is slowing down or has activated its turn signals. In some embodiments, when the driver activates a turn signal, an indication of the activation is transmitted to the AEFS 29.100. The AEFS 29.100 then receives information (e.g., image data) about the moped 29.110*a* from the camera 29.108 and possibly one or more other sources (e.g., a camera, microphone, or other device on the motorcycle 29.110*b*; a device on the moped 29.110*a*; a road-embedded device). By analyzing the image data, the AEFS 29.100 can estimate the motion-related information (e.g., position, speed, acceleration) about the moped 29.110*a*. Based on this motion-related information, the AEFS 29.100 can determine threat information such as whether the moped 29.110*a* is slowing to stop or instead attempting to speed through the intersection. The AEFS 29.100 can then inform the user of the determined threat information, as discussed further with respect to FIG. 29F, below.

Figure 29F:
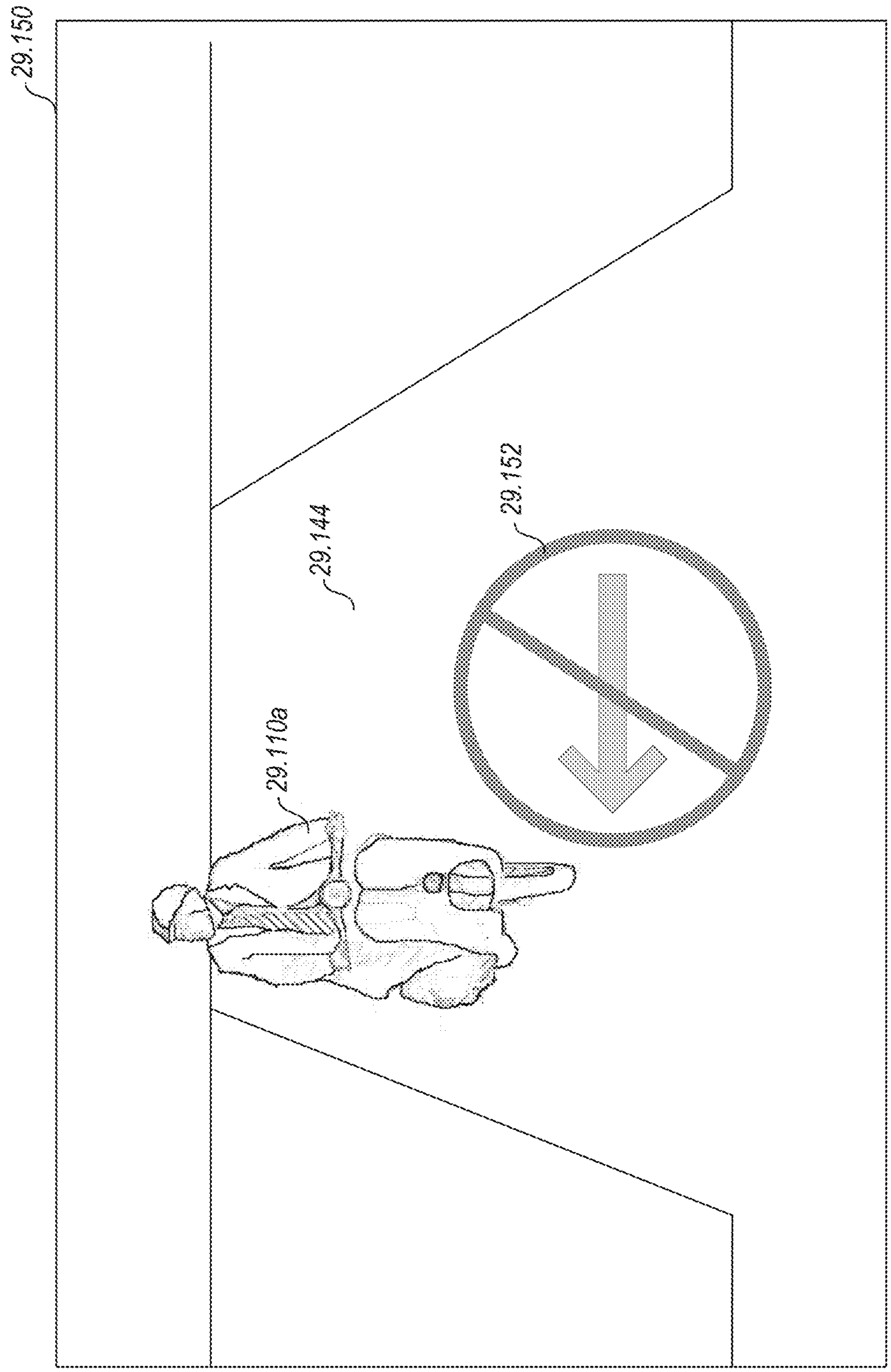
FIG. 29F is an example diagram illustrating an example user interface display according to an example embodiment.

FIG. 29F is an example diagram illustrating an example user interface display according to an example embodiment. FIG. 29F depicts a display 29.150 that includes a message 29.152. Also visible in the display 29.150 is the moped 29.110*a* and its driver, as well as the roadway 29.144.

The display 29.150 may be used by embodiments of the AEFS to present threat information to users. For example, as discussed with respect to the scenario of FIG. 29E, the AEFS may determine that the moped 29.110*a* is advancing too quickly for the motorcycle 29.110*b* to safely make a left turn. In response to this determination, the AEFS may present the message 29.152 on the display 29.150 in order to instruct the motorcycle 29.110*b* driver to avoid making a left turn in advance of the oncoming moped 29.110*a*. In this example, the message 29.152 is iconic and includes a left turn arrow surrounded by a circle with a line through it. Other types of messages and/or output modalities are contemplated, including textual (e.g., "No Turn"), audible (e.g., a chime, buzzer, alarm, or voice message), tactile (e.g., vibration of a steering wheel), or the like. The message 29.152 may be styled or decorated in various ways, including by use of colors, intermittence (e.g., flashing), size, or the like.

The display 29.150 may be provided in various ways. In one embodiment, the display 29.150 is presented by a heads-up display provided by a vehicle, such as the motorcycle 29.110*b*, a car, truck, or the like, where the display is presented on the wind screen or other surface. In another embodiment, the display 29.150 may be presented by a heads-up display provided by a wearable device, such as goggles or a helmet, where the display 29.150 is presented on a face or eye shield. In another embodiment, the display 29.150 may be presented by an LCD or similar screen in a dashboard or other portion of a vehicle.

Figure 30:
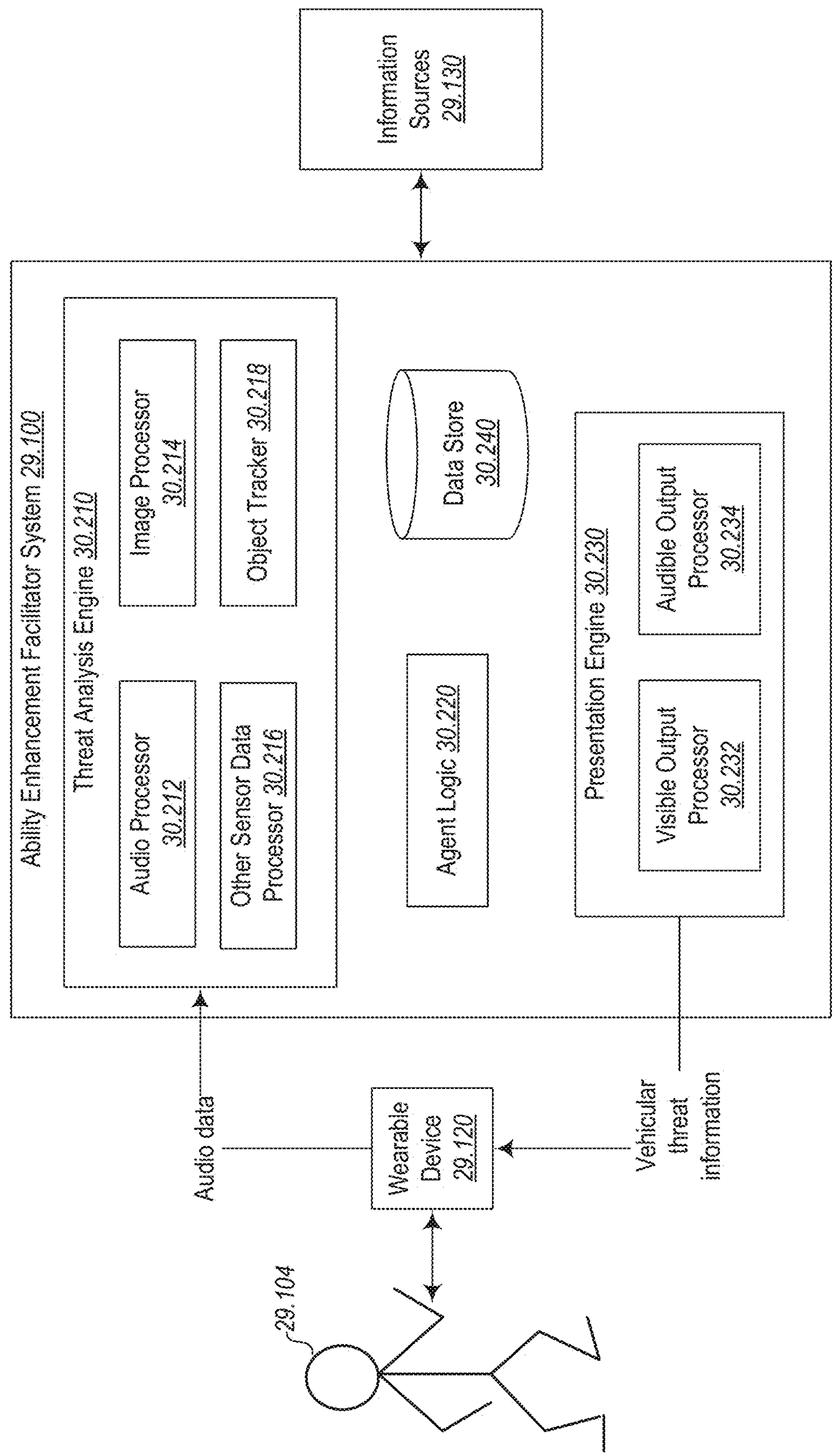
FIG. 30 is an example functional block diagram of an example ability enhancement facilitator system according to an example embodiment.

FIG. 30 is an example functional block diagram of an example ability enhancement facilitator system according to an example embodiment. In the illustrated embodiment of FIG. 30, the AEFS 29.100 includes a threat analysis engine 30.210, agent logic 30.220, a presentation engine 30.230, and a data store 30.240. The AEFS 29.100 is shown interacting with a wearable device 29.120 and information sources 29.130. The information sources 29.130 include any sensors, devices, systems, or the like that provide information to the AEFS 29.100, including but not limited to vehicle-based devices (e.g., speedometers), road-based devices (e.g., road-side cameras), and information systems (e.g., traffic systems).

The threat analysis engine 30.210 includes an audio processor 30.212, an image processor 30.214, other sensor data processors 30.216, and an object tracker 30.218. In the illustrated example, the audio processor 30.212 processes audio data received from the wearable device 29.120. As noted, such data may be received from other sources as well or instead, including directly from a vehicle-mounted microphone, or the like. The audio processor 30.212 may perform various types of signal processing, including audio level analysis, frequency analysis, acoustic source localization, or the like. Based on such signal processing, the audio processor 30.212 may determine strength, direction of audio signals, audio source distance, audio source type, or the like. Outputs of the audio processor 30.212 (e.g., that an object is approaching from a particular angle) may be provided to the object tracker 30.218 and/or stored in the data store 30.240.

The image processor 30.214 receives and processes image data that may be received from sources such as the wearable device 29.120 and/or information sources 29.130. For example, the image processor 30.214 may receive image data from a camera of the wearable device 29.120, and perform object recognition to determine the type and/or position of a vehicle that is approaching the user 29.104. As another example, the image processor 30.214 may receive a video signal (e.g., a sequence or stream of images) and process them to determine the type, position, and/or velocity of a vehicle that is approaching the user 29.104. Multiple images may be processed to determine the presence or absence of motion, even if no object recognition is performed. Outputs of the image processor 30.214 (e.g., position and velocity information, vehicle type information) may be provided to the object tracker 30.218 and/or stored in the data store 30.240.

The other sensor data processor 30.216 receives and processes data received from other sensors or sources. For example, the other sensor data processor 30.216 may receive and/or determine information about the position and/or movements of the user and/or one or more vehicles, such as based on GPS systems, speedometers, accelerometers, or other devices. As another example, the other sensor data processor 30.216 may receive and process conditions information (e.g., temperature, precipitation) from the information sources 29.130 and determine that road conditions are currently icy. Outputs of the other sensor data processor 30.216 (e.g., that the user is moving at 5 miles per hour) may be provided to the object tracker 30.218 and/or stored in the data store 30.240.

The object tracker 30.218 manages a geospatial object model that includes information about objects known to the AEFS 29.100. The object tracker 30.218 receives and merges information about object types, positions, velocity, acceleration, direction of travel, and the like, from one or more of the processors 30.212, 30.214, 30.216, and/or other sources. Based on such information, the object tracker 30.218 may identify the presence of objects as well as their likely positions, paths, and the like. The object tracker 30.218 may continually update this model as new information becomes available and/or as time passes (e.g., by plotting a likely current position of an object based on its last measured position and trajectory). The object tracker 30.218 may also maintain confidence levels corresponding to elements of the geo-spatial model, such as a likelihood that a vehicle is at a particular position or moving at a particular velocity, that a particular object is a vehicle and not a pedestrian, or the like.

The agent logic 30.220 implements the core intelligence of the AEFS 29.100. The agent logic 30.220 may include a reasoning engine (e.g., a rules engine, decision trees, Bayesian inference engine) that combines information from multiple sources to determine vehicular threat information. For example, the agent logic 30.220 may combine information from the object tracker 30.218, such as that there is a determined likelihood of a collision at an intersection, with information from one of the information sources 29.130, such as that the intersection is the scene of common red-light violations, and decide that the likelihood of a collision is high enough to transmit a warning to the user 29.104. As another example, the agent logic 30.220 may, in the face of multiple distinct threats to the user, determine which threat is the most significant and cause the user to avoid the more significant threat, such as by not directing the user 29.104 to slam on the brakes when a bicycle is approaching from the side but a truck is approaching from the rear, because being rear-ended by the truck would have more serious consequences than being hit from the side by the bicycle.

The presentation engine 30.230 includes a visible output processor 30.232 and an audible output processor 30.234. The visible output processor 30.232 may prepare, format, and/or cause information to be displayed on a display device, such as a display of the wearable device 29.120 or some other display (e.g., a heads-up display of a vehicle 29.110 being driven by the user 29.104). The agent logic 30.220 may use or invoke the visible output processor 30.232 to prepare and display information, such as by formatting or otherwise modifying vehicular threat information to fit on a particular type or size of display. The audible output processor 30.234 may include or use other components for generating audible output, such as tones, sounds, voices, or the like. In some embodiments, the agent logic 30.220 may use or invoke the audible output processor 30.234 in order to convert a textual message (e.g., a warning message, a threat identification) into audio output suitable for presentation via the wearable device 29.120, for example by employing a text-to-speech processor.

Note that one or more of the illustrated components/modules may not be present in some embodiments. For example, in embodiments that do not perform image or video processing, the AEFS 29.100 may not include an image processor 30.214. As another example, in embodiments that do not perform audio output, the AEFS 29.100 may not include an audible output processor 30.234.

Note also that the AEFS 29.100 may act in service of multiple users 29.104. In some embodiments, the AEFS 29.100 may determine vehicular threat information concurrently for multiple distinct users. Such embodiments may further facilitate the sharing of vehicular threat information. For example, vehicular threat information determined as between two vehicles may be relevant and thus shared with a third vehicle that is in proximity to the other two vehicles.

B. Example Processes

FIGS. 31.1-31.132 are example flow diagrams of ability enhancement processes performed by example embodiments.

FIG. 31.1 is an example flow diagram of example logic for enhancing ability in a transportation-related context. The illustrated logic in this and the following flow diagrams may be performed by, for example, one or more components of the AEFS 29.100 described with respect to FIG. 30, above. One or more functions of the AEFS 29.100 may be performed at various fixed locations, such as at a road-side computing system, a cloud- or server-based computing system, or the like. In some embodiments, one or more functions may be performed in mobile locations, including at a wearable device, a vehicle of a user, some other vehicle, or the like. More particularly, FIG. 31.1 illustrates a process 31.100 that includes operations performed by or at the following block(s).

At block 31.101, the process performs at a road-based device, receiving information about a first vehicle that is proximate to the road-based device. The process may receive various types of information about the first vehicle, including image data, audio data, motion-related information, and the like, as discussed further below. This information is received at a road-based device, which is typically a fixed device situated on, in, or about a roadway traveled by the first vehicle. Example devices include cameras, microphones, induction loops, radar guns, range sensors (e.g., sonar, radar, LIDAR, IR-based), and the like. The device may be fixed (permanently or removably) to a structure, such as a utility pole, a traffic control signal, a building, or the like. In other embodiments, the road-based device may instead or also be a mobile device, such as may be situated in the first vehicle, on the user's person, on a trailer parked by the side of a road, or the like.

At block 31.102, the process performs determining threat information based at least in part on the information about the first vehicle. Threat information may include information related to threats posed by the first vehicle (e.g., to the user or to some other entity), by a vehicle occupied by the user (e.g., to the first vehicle or to some other entity), or the like. Note that threats may be posed by vehicles to non-vehicles, including pedestrians, animals, structures, or the like. Threats may also include those threats posed by non-vehicles (e.g., structures, pedestrians) to vehicles. Threat information may be determined in various ways. For example, where the received information is image data, the process may analyze the image data to identify objects, such as vehicles, pedestrians, fixed objects, and the like. In some embodiments, determining the threat information may also or instead include determining motion-related information about identified objects, including position, velocity, direction of travel, accelerations, or the like. In some embodiments, the received information is motion-related information that is transmitted by vehicles traveling about the roadway. Determining the threat information may also or instead include predicting whether the path of the user and one or more identified objects may intersect. These and other variations are discussed further below.

At block 31.103, the process performs presenting the threat information via a wearable device of a user. The determined threat information may be presented in various ways, such as by presenting an audible or visible warning or other indication that the first vehicle is approaching the user. Different types of wearable devices are contemplated, including helmets, eyeglasses, goggles, hats, and the like. In other embodiments, the threat information may also or instead be presented in other ways, such as via an output device on a vehicle of the user, in-situ output devices (e.g., traffic signs, road-side speakers), or the like. In some embodiments, the process may cause traffic control signals or devices to automatically change state, such as by changing a traffic light from green to red to inhibit cars from entering an intersection.

FIG. 31.2 is an example flow diagram of example logic illustrating an example embodiment of process 31.100 of FIG. 31.1. More particularly, FIG. 31.2 illustrates a process 31.200 that includes the process 31.100, wherein the determining threat information includes operations performed by or at one or more of the following block(s).

At block 31.201, the process performs determining a threat posed by the first vehicle to the user. As noted, the threat information may indicate a threat posed by the first vehicle to the user, such as that the first vehicle may collide with the user unless evasive action is taken.

FIG. 31.3 is an example flow diagram of example logic illustrating an example embodiment of process 31.100 of FIG. 31.1. More particularly, FIG. 31.3 illustrates a process 31.300 that includes the process 31.100, wherein the determining threat information includes operations performed by or at one or more of the following block(s).

At block 31.301, the process performs determining a threat posed by the first vehicle to some other entity besides the user. As noted, the threat information may indicate a threat posed by the first vehicle to some other person or thing, such as that the first vehicle may collide with the other entity. The other entity may be a vehicle occupied by the user, a vehicle not occupied by the user, a pedestrian, a structure, or any other object that may come into proximity with the first vehicle.

FIG. 31.4 is an example flow diagram of example logic illustrating an example embodiment of process 31.100 of FIG. 31.1. More particularly, FIG. 31.4 illustrates a process 31.400 that includes the process 31.100, wherein the determining threat information includes operations performed by or at one or more of the following block(s).

At block 31.401, the process performs determining a threat posed by a vehicle occupied by the user to the first vehicle. The threat information may indicate a threat posed by the user's vehicle (e.g., as a driver or passenger) to the first vehicle, such as because a collision may occur between the two vehicles. The vehicle occupied by the user may be the first vehicle or some other vehicle.

FIG. 31.5 is an example flow diagram of example logic illustrating an example embodiment of process 31.100 of FIG. 31.1. More particularly, FIG. 31.5 illustrates a process 31.500 that includes the process 31.100, wherein the determining threat information includes operations performed by or at one or more of the following block(s).

At block 31.501, the process performs determining a threat posed by a vehicle occupied by the user to some other entity besides the first vehicle. The threat information may indicate a threat posed by the user's vehicle to some other person or thing, such as due to a potential collision. The other entity may be some other vehicle, a pedestrian, a structure, or any other object that may come into proximity with the user's vehicle.

FIG. 31.6 is an example flow diagram of example logic illustrating an example embodiment of process 31.100 of FIG. 31.1. More particularly, FIG. 31.6 illustrates a process 31.600 that includes the process 31.100, wherein the determining threat information includes operations performed by or at one or more of the following block(s).

At block 31.601, the process performs determining a likelihood that the first vehicle will collide with some other object. In some embodiments, the process may determine a probability or other measure of the likelihood that the first vehicle will collide with some other object, such as another vehicle, a structure, a person, or the like. Such a determination may be made by reference to an object model that models the motions of objects in the roadway based on observations or other information gathered about such objects.

FIG. 31.7 is an example flow diagram of example logic illustrating an example embodiment of process 31.600 of FIG. 31.6. More particularly, FIG. 31.7 illustrates a process 31.700 that includes the process 31.600, wherein the determining a likelihood that the first vehicle will collide with some other object includes operations performed by or at one or more of the following block(s).

At block 31.701, the process performs determining a likelihood that the first vehicle will collide with the user. For example, the process may determine a probability that the first vehicle will collide with the user or a vehicle occupied by the user.

FIG. 31.8 is an example flow diagram of example logic illustrating an example embodiment of process 31.600 of FIG. 31.6. More particularly, FIG. 31.8 illustrates a process 31.800 that includes the process 31.600, wherein the determining a likelihood that the first vehicle will collide with some other object includes operations performed by or at one or more of the following block(s).

At block 31.801, the process performs determining that the likelihood that the first vehicle will collide with some other object is greater than a threshold. In some embodiments, the process compares the determined collision likelihood with a threshold. When the likelihood exceeds the threshold, particular actions may be taken, such as presenting a warning to the user or directing the user to take evasive action.

FIG. 31.9 is an example flow diagram of example logic illustrating an example embodiment of process 31.100 of FIG. 31.1. More particularly, FIG. 31.9 illustrates a process 31.900 that includes the process 31.100, wherein the determining threat information includes operations performed by or at one or more of the following block(s).

At block 31.901, the process performs determining that the first vehicle is driving erratically. The first vehicle may be driving erratically for a number of reasons, including due to a medical condition (e.g., a heart attack, bad eyesight, shortness of breath), drug/alcohol impairment, distractions (e.g., text messaging, crying children, loud music), or the like. Driving erratically may include driving too fast, too slow, not staying within traffic lanes, or the like.

FIG. 31.10 is an example flow diagram of example logic illustrating an example embodiment of process 31.100 of FIG. 31.1. More particularly, FIG. 31.10 illustrates a process 31.1000 that includes the process 31.100, wherein the determining threat information includes operations performed by or at one or more of the following block(s).

At block 31.1001, the process performs determining that the first vehicle is driving with excessive speed. Excessive speed may be determined relatively, such as with respect to the average traffic speed on a road segment, posted speed limit, or the like. Similar techniques may be employed to determine if a vehicle is traveling too slowly.

FIG. 31.11 is an example flow diagram of example logic illustrating an example embodiment of process 31.1000 of FIG. 31.10. More particularly, FIG. 31.11 illustrates a process 31.1100 that includes the process 31.1000, wherein the determining that the first vehicle is driving with excessive speed includes operations performed by or at one or more of the following block(s).

At block 31.1101, the process performs determining that the first vehicle is traveling more than a threshold percentage faster than an average speed of traffic on a road segment. For example, a vehicle may be determined to be driving with excessive speed if the vehicle is driving more than 20% over a historical average speed for the road segment. Other thresholds (e.g., 10% over, 25% over) and/or baselines (e.g., average observed speed at a particular time of day) are contemplated.

FIG. 31.12 is an example flow diagram of example logic illustrating an example embodiment of process 31.1000 of FIG. 31.10. More particularly, FIG. 31.12 illustrates a process 31.1200 that includes the process 31.1000, wherein the determining that the first vehicle is driving with excessive speed includes operations performed by or at one or more of the following block(s).

At block 31.1201, the process performs determining that the first vehicle is traveling at a speed that is more than a threshold number of standard deviations over an average speed of traffic on a road segment. For example, a vehicle may be determined to be driving with excessive speed if the vehicle is driving more than one standard deviation over the historical average speed. Other baselines may be employed, including average speed for a particular time of day, average speed measured over a time window (e.g., 5 or 10 minutes) preceding the current time, or the like.

FIG. 31.13 is an example flow diagram of example logic illustrating an example embodiment of process 31.100 of FIG. 31.1. More particularly, FIG. 31.13 illustrates a process 31.1300 that includes the process 31.100, wherein the road-based device is a sensor attached to a structure proximate to the first vehicle. In some embodiments, the road-based device is attached to a building, utility pole, or some other fixed structure.

FIG. 31.14 is an example flow diagram of example logic illustrating an example embodiment of process 31.1300 of FIG. 31.13. More particularly, FIG. 31.14 illustrates a process 31.1400 that includes the process 31.1300, wherein the structure proximate to the first vehicle is one of a utility pole, a traffic control signal support, and/or a building.

FIG. 31.15 is an example flow diagram of example logic illustrating an example embodiment of process 31.1300 of FIG. 31.13. More particularly, FIG. 31.15 illustrates a process 31.1500 that includes the process 31.1300, wherein the receiving information about a first vehicle includes operations performed by or at one or more of the following block(s).

At block 31.1501, the process performs receiving an image of the first vehicle from a camera deployed at an intersection. For example, the process may receive images from a camera that is fixed to a traffic light or other signal at an intersection near the first vehicle.

FIG. 31.16 is an example flow diagram of example logic illustrating an example embodiment of process 31.1300 of FIG. 31.13. More particularly, FIG. 31.16 illustrates a process 31.1600 that includes the process 31.1300, wherein the receiving information about a first vehicle includes operations performed by or at one or more of the following block(s).

At block 31.1601, the process performs receiving ranging data from a range sensor deployed at an intersection, the ranging data representing a distance between the first vehicle and the intersection. For example, the process may receive a distance (e.g., 75 meters) measured between some known point in the intersection (e.g., the position of the range sensor) and an oncoming vehicle.

FIG. 31.17 is an example flow diagram of example logic illustrating an example embodiment of process 31.1300 of FIG. 31.13. More particularly, FIG. 31.17 illustrates a process 31.1700 that includes the process 31.1300, wherein the road-based device includes a camera. The camera may provide images of the first vehicle and other objects or conditions, which may be analyzed to determine the threat information, as discussed herein.

FIG. 31.18 is an example flow diagram of example logic illustrating an example embodiment of process 31.1300 of FIG. 31.13. More particularly, FIG. 31.18 illustrates a process 31.1800 that includes the process 31.1300, wherein the road-based device includes a microphone. The microphone may provide audio information, which may be used to perform acoustic source localization, as discussed herein.

FIG. 31.19 is an example flow diagram of example logic illustrating an example embodiment of process 31.1300 of FIG. 31.13. More particularly, FIG. 31.19 illustrates a process 31.1900 that includes the process 31.1300, wherein the road-based device includes a radar-based speed sensor. The radar-based speed sensor may provide distance and/or velocity information to the process. The speed sensor may take various forms, including a hand-held radar gun, a dashboard-mounted device, a trailer-mounted device, or the like.

FIG. 31.20 is an example flow diagram of example logic illustrating an example embodiment of process 31.1300 of FIG. 31.13. More particularly, FIG. 31.20 illustrates a process 31.2000 that includes the process 31.1300, wherein the road-based device includes a light detection and ranging-based speed sensor. The light detection and ranging-based speed sensor may use, for example, laser light to measure the vehicle speed and/or position.

FIG. 31.21 is an example flow diagram of example logic illustrating an example embodiment of process 31.1300 of FIG. 31.13. More particularly, FIG. 31.21 illustrates a process 31.2100 that includes the process 31.1300, wherein the road-based device includes a range sensor. Various technologies can be used to provide range information, including sonar, LIDAR, radar, or the like.

FIG. 31.22 is an example flow diagram of example logic illustrating an example embodiment of process 31.1300 of FIG. 31.13. More particularly, FIG. 31.22 illustrates a process 31.2200 that includes the process 31.1300, wherein the road-based device includes a receiver operable to receive motion-related information transmitted from the first vehicle, the motion-related information including at least one of a position of the first vehicle, a velocity of the first vehicle, and/or a trajectory of the first vehicle. In some embodiments, vehicles and/or other entities (e.g., pedestrians) traveling the roadway broadcast or otherwise transmit motion-related information, such as information about position and/or speed of a vehicle. The process may receive such information and use it to model the trajectories of various objects in the roadway to determine whether collisions are likely to occur.

FIG. 31.23 is an example flow diagram of example logic illustrating an example embodiment of process 31.100 of FIG. 31.1. More particularly, FIG. 31.23 illustrates a process 31.2300 that includes the process 31.100, wherein the road-based device is embedded in a roadway being traveled over by the first vehicle. The road-based device may be embedded, buried, or located beneath the surface of the roadway.

FIG. 31.24 is an example flow diagram of example logic illustrating an example embodiment of process 31.2300 of FIG. 31.23. More particularly, FIG. 31.24 illustrates a process 31.2400 that includes the process 31.2300, wherein the road-based device includes one or more induction loops embedded in the roadway, the one or more induction loops configured to detect the presence and/or velocity of the first vehicle. An induction loop detects the presence of a vehicle by generating an electrical current as the vehicle passes over the loop.

FIG. 31.25 is an example flow diagram of example logic illustrating an example embodiment of process 31.2400 of FIG. 31.24. More particularly, FIG. 31.25 illustrates a process 31.2500 that includes the process 31.2400, wherein the receiving information about a first vehicle includes operations performed by or at one or more of the following block(s).

At block 31.2501, the process performs receiving motion-related information from the induction loop, the motion-related information including at least one of a position of the first vehicle, a velocity of the first vehicle, and/or a trajectory of the first vehicle. As noted, induction loops may be embedded in the roadway and configured to detect the presence of vehicles passing over them. Some types of loops and/or processing may be employed to detect other information, including velocity, vehicle size, and the like. Multiple induction loops may be configured to work in concert to measure, for example, vehicle velocity.

FIG. 31.26 is an example flow diagram of example logic illustrating an example embodiment of process 31.100 of FIG. 31.1. More particularly, FIG. 31.26 illustrates a process 31.2600 that includes the process 31.100, wherein the receiving information about a first vehicle includes operations performed by or at one or more of the following block(s).

At block 31.2601, the process performs receiving the information about the first vehicle from a sensor attached to the first vehicle. The first vehicle may include one or more sensors that provide data to the process. For example, the first vehicle may include a camera, a microphone, a GPS receiver, or the like.

FIG. 31.27 is an example flow diagram of example logic illustrating an example embodiment of process 31.100 of FIG. 31.1. More particularly, FIG. 31.27 illustrates a process 31.2700 that includes the process 31.100, wherein the receiving information about a first vehicle includes operations performed by or at one or more of the following block(s).

At block 31.2701, the process performs receiving the information about the first vehicle from a sensor attached to a second vehicle. The process may obtain information from some other vehicle that is not the first vehicle, such as a vehicle that is behind or in front of the first vehicle.

FIG. 31.28 is an example flow diagram of example logic illustrating an example embodiment of process 31.2700 of FIG. 31.27. More particularly, FIG. 31.28 illustrates a process 31.2800 that includes the process 31.2700, wherein the second vehicle is an aerial vehicle. Aerial vehicles, including unmanned vehicles (e.g., drones) may be employed to track and provide information about the first vehicle. For example, a drone may be employed as an instrument platform that travels over a road segment (e.g., a segment of a highway) and feeds data to the process.

FIG. 31.29 is an example flow diagram of example logic illustrating an example embodiment of process 31.2700 of FIG. 31.27. More particularly, FIG. 31.29 illustrates a process 31.2900 that includes the process 31.2700, wherein the second vehicle is a satellite. In some embodiments, a satellite in low Earth orbit may provide data to the process.

FIG. 31.30 is an example flow diagram of example logic illustrating an example embodiment of process 31.100 of FIG. 31.1. More particularly, FIG. 31.30 illustrates a process 31.3000 that includes the process 31.100, wherein the receiving information about a first vehicle includes operations performed by or at one or more of the following block(s).

At block 31.3001, the process performs receiving the information about the first vehicle from a sensor attached to a vehicle that is occupied by the user. In some embodiments, the sensor is attached to a vehicle that is being driven or otherwise operated by the user.

FIG. 31.31 is an example flow diagram of example logic illustrating an example embodiment of process 31.100 of FIG. 31.1. More particularly, FIG. 31.31 illustrates a process 31.3100 that includes the process 31.100, wherein the receiving information about a first vehicle includes operations performed by or at one or more of the following block(s).

At block 31.3101, the process performs receiving the information about the first vehicle from a sensor attached to a vehicle that is operating autonomously. In some embodiments, the sensor is attached to a vehicle that is operating autonomously, such as by utilizing a guidance or other control system to direct the operation of the vehicle.

FIG. 31.32 is an example flow diagram of example logic illustrating an example embodiment of process 31.100 of FIG. 31.1. More particularly, FIG. 31.32 illustrates a process 31.3200 that includes the process 31.100, wherein the receiving information about a first vehicle includes operations performed by or at one or more of the following block(s).

At block 31.3201, the process performs receiving the information about the first vehicle from a sensor of the wearable device. The wearable device may include various devices, such as microphones, cameras, range sensors, or the like, that may provide data to the process.

FIG. 31.33 is an example flow diagram of example logic illustrating an example embodiment of process 31.100 of FIG. 31.1. More particularly, FIG. 31.33 illustrates a process 31.3300 that includes the process 31.100, and which further includes operations performed by or at the following block(s).

At block 31.3301, the process performs receiving motion-related information about the first vehicle and/or other objects moving about a roadway. The motion-related information may include information about the mechanics (e.g., position, velocity, acceleration, mass) of the user and/or the first vehicle.

FIG. 31.34 is an example flow diagram of example logic illustrating an example embodiment of process 31.3300 of FIG. 31.33. More particularly, FIG. 31.34 illustrates a process 31.3400 that includes the process 31.3300, wherein the receiving motion-related information includes operations performed by or at one or more of the following block(s).

At block 31.3401, the process performs receiving position information from a position sensor of the first vehicle. In some embodiments, a GPS receiver, dead reckoning, or some combination thereof may be used to track the position of the first vehicle as it moves down the roadway.

FIG. 31.35 is an example flow diagram of example logic illustrating an example embodiment of process 31.3300 of FIG. 31.33. More particularly, FIG. 31.35 illustrates a process 31.3500 that includes the process 31.3300, wherein the receiving motion-related information includes operations performed by or at one or more of the following block(s).

At block 31.3501, the process performs receiving velocity information from a velocity sensor of the first vehicle. In some embodiments, the first vehicle periodically (or on request) transmits its velocity (e.g., as measured by its speedometer) to the process.

FIG. 31.36 is an example flow diagram of example logic illustrating an example embodiment of process 31.3300 of FIG. 31.33. More particularly, FIG. 31.36 illustrates a process 31.3600 that includes the process 31.3300, wherein the determining threat information includes operations performed by or at one or more of the following block(s).

At block 31.3601, the process performs determining the threat information based on the motion-related information about the first vehicle. The process may also or instead consider a variety of motion-related information received from other sources, including the wearable device, some other vehicle, a fixed road-side sensor, or the like.

FIG. 31.37 is an example flow diagram of example logic illustrating an example embodiment of process 31.3600 of FIG. 31.36. More particularly, FIG. 31.37 illustrates a process 31.3700 that includes the process 31.3600, wherein the determining the threat information based on the motion-related information about the first vehicle includes operations performed by or at one or more of the following block(s).

At block 31.3701, the process performs determining the threat information based on information about position, velocity, and/or acceleration of the user obtained from sensors in the wearable device. The wearable device may include position sensors (e.g., GPS), accelerometers, or other devices configured to provide motion-related information about the user to the process.

FIG. 31.38 is an example flow diagram of example logic illustrating an example embodiment of process 31.3600 of FIG. 31.36. More particularly, FIG. 31.38 illustrates a process 31.3800 that includes the process 31.3600, wherein the determining the threat information based on the motion-related information about the first vehicle includes operations performed by or at one or more of the following block(s).

At block 31.3801, the process performs determining the threat information based on information about position, velocity, and/or acceleration of the user obtained from devices in a vehicle of the user. A vehicle occupied or operated by the user may include position sensors (e.g., GPS), accelerometers, speedometers, or other devices configured to provide motion-related information about the user to the process.

FIG. 31.39 is an example flow diagram of example logic illustrating an example embodiment of process 31.3600 of FIG. 31.36. More particularly, FIG. 31.39 illustrates a process 31.3900 that includes the process 31.3600, wherein the determining the threat information based on the motion-related information about the first vehicle includes operations performed by or at one or more of the following block(s).

At block 31.3901, the process performs determining the threat information based on information about position, velocity, and/or acceleration of the first vehicle obtained from devices of the first vehicle. The first vehicle may include position sensors (e.g., GPS), accelerometers, speedometers, or other devices configured to provide motion-related information about the user to the process. In other embodiments, motion-related information may be obtained from other sources, such as a radar gun deployed at the side of a road, from other vehicles, or the like.

FIG. 31.40 is an example flow diagram of example logic illustrating an example embodiment of process 31.100 of FIG. 31.1. More particularly, FIG. 31.40 illustrates a process 31.4000 that includes the process 31.100, wherein the receiving information about a first vehicle includes operations performed by or at one or more of the following block(s).

At block 31.4001, the process performs receiving image data from a camera, the image data representing an image of the first vehicle. The process may receive and consider image data, such as by performing image processing to identify vehicles or other hazards, to determine whether collisions may occur, determine motion-related information about the first vehicle (and possibly other entities), and the like. The image data may be obtained from various sources, including from a camera attached to the wearable device, a vehicle, a road-side structure, or the like.

FIG. 31.41 is an example flow diagram of example logic illustrating an example embodiment of process 31.4000 of FIG. 31.40. More particularly, FIG. 31.41 illustrates a process 31.4100 that includes the process 31.4000, wherein the receiving image data from a camera includes operations performed by or at one or more of the following block(s).

At block 31.4101, the process performs receiving an image from a camera that is attached to one of a road-side structure, the first vehicle, a second vehicle, a vehicle occupied by the user, or the wearable device.

FIG. 31.42 is an example flow diagram of example logic illustrating an example embodiment of process 31.4000 of FIG. 31.40. More particularly, FIG. 31.42 illustrates a process 31.4200 that includes the process 31.4000, wherein the receiving image data from a camera includes operations performed by or at one or more of the following block(s).

At block 31.4201, the process performs receiving video data that includes multiple images of the first vehicle taken at different times. In some embodiments, the image data comprises video data in compressed or raw form. The video data typically includes (or can be reconstructed or decompressed to derive) multiple sequential images taken at distinct times.

FIG. 31.43 is an example flow diagram of example logic illustrating an example embodiment of process 31.4200 of FIG. 31.42. More particularly, FIG. 31.43 illustrates a process 31.4300 that includes the process 31.4200, wherein the receiving video data that includes multiple images of the first vehicle taken at different times includes operations performed by or at one or more of the following block(s).

At block 31.4301, the process performs receiving a first image of the first vehicle taken at a first time.

At block 31.4302, the process performs receiving a second image of the first vehicle taken at a second time, wherein the first and second times are sufficiently different such that velocity and/or direction of travel of the first vehicle may be determined with respect to positions of the first vehicle shown in the first and second images. Various time intervals between images may be utilized. For example, it may not be necessary to receive video data having a high frame rate (e.g., 30 frames per second or higher), because it may be preferable to determine motion or other properties of the first vehicle based on images that are taken at larger time intervals (e.g., one tenth of a second, one quarter of a second). In some embodiments, transmission bandwidth may be saved by transmitting and receiving reduced frame rate image streams.

FIG. 31.44 is an example flow diagram of example logic illustrating an example embodiment of process 31.4000 of FIG. 31.40. More particularly, FIG. 31.44 illustrates a process 31.4400 that includes the process 31.4000, wherein the determining threat information includes operations performed by or at one or more of the following block(s).

At block 31.4401, the process performs identifying the first vehicle in the image data. Image processing techniques may be employed to identify the presence of a vehicle, its type (e.g., car or truck), its size, license plate number, color, or other identifying information about the first vehicle.

FIG. 31.45 is an example flow diagram of example logic illustrating an example embodiment of process 31.4000 of FIG. 31.40. More particularly, FIG. 31.45 illustrates a process 31.4500 that includes the process 31.4000, wherein the determining threat information includes operations performed by or at one or more of the following block(s).

At block 31.4501, the process performs determining whether the first vehicle is moving towards the user based on multiple images represented by the image data. In some embodiments, a video feed or other sequence of images may be analyzed to determine the relative motion of the first vehicle. For example, if the first vehicle appears to be becoming larger over a sequence of images, then it is likely that the first vehicle is moving towards the user.

FIG. 31.46 is an example flow diagram of example logic illustrating an example embodiment of process 31.4000 of FIG. 31.40. More particularly, FIG. 31.46 illustrates a process 31.4600 that includes the process 31.4000, wherein the determining threat information includes operations performed by or at one or more of the following block(s).

At block 31.4601, the process performs determining motion-related information about the first vehicle, based on one or more images of the first vehicle. Motion-related information may include information about the mechanics (e.g., kinematics, dynamics) of the first vehicle, including position, velocity, direction of travel, acceleration, mass, or the like. Motion-related information may be determined for vehicles that are at rest. Motion-related information may be determined and expressed with respect to various frames of reference, including the user's frame of reference, the frame of reference of the first vehicle, a fixed frame of reference, or the like.

FIG. 31.47 is an example flow diagram of example logic illustrating an example embodiment of process 31.4600 of FIG. 31.46. More particularly, FIG. 31.47 illustrates a process 31.4700 that includes the process 31.4600, wherein the determining motion-related information about the first vehicle includes operations performed by or at one or more of the following block(s).

At block 31.4701, the process performs determining the motion-related information with respect to timestamps associated with the one or more images. In some embodiments, the received images include timestamps or other indicators that can be used to determine a time interval between the images. In other cases, the time interval may be known a priori or expressed in other ways, such as in terms of a frame rate associated with an image or video stream.

FIG. 31.48 is an example flow diagram of example logic illustrating an example embodiment of process 31.4600 of FIG. 31.46. More particularly, FIG. 31.48 illustrates a process 31.4800 that includes the process 31.4600, wherein the determining motion-related information about the first vehicle includes operations performed by or at one or more of the following block(s).

At block 31.4801, the process performs determining a position of the first vehicle. The position of the first vehicle may be expressed absolutely, such as via a GPS coordinate or similar representation, or relatively, such as with respect to the position of the user (e.g., 20 meters away from the first user). In addition, the position of the first vehicle may be represented as a point or collection of points (e.g., a region, arc, or line).

FIG. 31.49 is an example flow diagram of example logic illustrating an example embodiment of process 31.4600 of FIG. 31.46. More particularly, FIG. 31.49 illustrates a process 31.4900 that includes the process 31.4600, wherein the determining motion-related information about the first vehicle includes operations performed by or at one or more of the following block(s).

At block 31.4901, the process performs determining a velocity of the first vehicle. The process may determine the velocity of the first vehicle in absolute or relative terms (e.g., with respect to the velocity of the user). The velocity may be expressed or represented as a magnitude (e.g., 10 meters per second), a vector (e.g., having a magnitude and a direction), or the like.

FIG. 31.50 is an example flow diagram of example logic illustrating an example embodiment of process 31.4900 of FIG. 31.49. More particularly, FIG. 31.50 illustrates a process 31.5000 that includes the process 31.4900, wherein the determining a velocity of the first vehicle includes operations performed by or at one or more of the following block(s).

At block 31.5001, the process performs determining the velocity with respect to a fixed frame of reference. In some embodiments, a fixed, global, or absolute frame of reference may be utilized.

FIG. 31.51 is an example flow diagram of example logic illustrating an example embodiment of process 31.4900 of FIG. 31.49. More particularly, FIG. 31.51 illustrates a process 31.5100 that includes the process 31.4900, wherein the determining a velocity of the first vehicle includes operations performed by or at one or more of the following block(s).

At block 31.5101, the process performs determining the velocity with respect to a frame of reference of the user. In some embodiments, velocity is expressed with respect to the user's frame of reference. In such cases, a stationary (e.g., parked) vehicle will appear to be approaching the user if the user is driving towards the first vehicle.

FIG. 31.52 is an example flow diagram of example logic illustrating an example embodiment of process 31.4600 of FIG. 31.46. More particularly, FIG. 31.52 illustrates a process 31.5200 that includes the process 31.4600, wherein the determining motion-related information about the first vehicle includes operations performed by or at one or more of the following block(s).

At block 31.5201, the process performs determining a direction of travel of the first vehicle. The process may determine a direction in which the first vehicle is traveling, such as with respect to the user and/or some absolute coordinate system or frame of reference.

FIG. 31.53 is an example flow diagram of example logic illustrating an example embodiment of process 31.4600 of FIG. 31.46. More particularly, FIG. 31.53 illustrates a process 31.5300 that includes the process 31.4600, wherein the determining motion-related information about the first vehicle includes operations performed by or at one or more of the following block(s).

At block 31.5301, the process performs determining acceleration of the first vehicle. In some embodiments, acceleration of the first vehicle may be determined, for example by determining a rate of change of the velocity of the first vehicle observed over time.

FIG. 31.54 is an example flow diagram of example logic illustrating an example embodiment of process 31.4600 of FIG. 31.46. More particularly, FIG. 31.54 illustrates a process 31.5400 that includes the process 31.4600, wherein the determining motion-related information about the first vehicle includes operations performed by or at one or more of the following block(s).

At block 31.5401, the process performs determining mass of the first vehicle. Mass of the first vehicle may be determined in various ways, including by identifying the type of the first vehicle (e.g., car, truck, motorcycle), determining the size of the first vehicle based on its appearance in an image, or the like.

FIG. 31.55 is an example flow diagram of example logic illustrating an example embodiment of process 31.4000 of FIG. 31.40. More particularly, FIG. 31.55 illustrates a process 31.5500 that includes the process 31.4000, wherein the determining threat information includes operations performed by or at one or more of the following block(s).

At block 31.5501, the process performs identifying objects other than the first vehicle in the image data. Image processing techniques may be employed by the process to identify other objects of interest, including road hazards (e.g., utility poles, ditches, drop-offs), pedestrians, other vehicles, or the like.

FIG. 31.56 is an example flow diagram of example logic illustrating an example embodiment of process 31.4000 of FIG. 31.40. More particularly, FIG. 31.56 illustrates a process 31.5600 that includes the process 31.4000, wherein the determining threat information includes operations performed by or at one or more of the following block(s).

At block 31.5601, the process performs determining driving conditions based on the image data. Image processing techniques may be employed by the process to determine driving conditions, such as surface conditions (e.g., icy, wet), lighting conditions (e.g., glare, darkness), or the like.

FIG. 31.57 is an example flow diagram of example logic illustrating an example embodiment of process 31.100 of FIG. 31.1. More particularly, FIG. 31.57 illustrates a process 31.5700 that includes the process 31.100, wherein the receiving information about a first vehicle includes operations performed by or at one or more of the following block(s).

At block 31.5701, the process performs receiving data representing an audio signal emitted or reflected by the first vehicle. The data representing the audio signal may be raw audio samples, compressed audio data, frequency coefficients, or the like. The data representing the audio signal may represent the sound made by the first vehicle, such as from its engine, a horn, tires, or any other source of sound. The data may also or instead represent audio reflected by the vehicle, such as a sonar ping. In some embodiments, the data representing the audio signal may also or instead include sounds from other sources, including other vehicles, pedestrians, or the like.

FIG. 31.58 is an example flow diagram of example logic illustrating an example embodiment of process 31.5700 of FIG. 31.57. More particularly, FIG. 31.58 illustrates a process 31.5800 that includes the process 31.5700, wherein the receiving data representing an audio signal emitted or reflected by the first vehicle includes operations performed by or at one or more of the following block(s).

At block 31.5801, the process performs receiving data obtained at a microphone array that includes multiple microphones. In some embodiments, a microphone array having two or more microphones is employed to receive audio signals. Differences between the received audio signals may be utilized to perform acoustic source localization or other functions, as discussed further herein.

FIG. 31.59 is an example flow diagram of example logic illustrating an example embodiment of process 31.5800 of FIG. 31.58. More particularly, FIG. 31.59 illustrates a process 31.5900 that includes the process 31.5800, wherein the receiving data obtained at a microphone array includes operations performed by or at one or more of the following block(s).

At block 31.5901, the process performs receiving data obtained at a microphone array, the microphone array coupled to a road-side structure. The array may be fixed to a utility pole, a traffic signal, or the like. In other cases, the microphone array may be situated elsewhere, including on the first vehicle, some other vehicle, the wearable device, or the like.

FIG. 31.60 is an example flow diagram of example logic illustrating an example embodiment of process 31.5700 of FIG. 31.57. More particularly, FIG. 31.60 illustrates a process 31.6000 that includes the process 31.5700, wherein the determining threat information includes operations performed by or at one or more of the following block(s).

At block 31.6001, the process performs determining the threat information based on the data representing the audio signal. As discussed further below, determining the threat information based on audio may include acoustic source localization, frequency analysis, or other techniques that can identify the presence, position, or motion of objects.

FIG. 31.61 is an example flow diagram of example logic illustrating an example embodiment of process 31.6000 of FIG. 31.60. More particularly, FIG. 31.61 illustrates a process 31.6100 that includes the process 31.6000, wherein the determining the threat information based on the data representing the audio signal includes operations performed by or at one or more of the following block(s).

At block 31.6101, the process performs performing acoustic source localization to determine a position of the first vehicle based on multiple audio signals received via multiple microphones. The process may determine a position of the first vehicle by analyzing audio signals received via multiple distinct microphones. For example, engine noise of the first vehicle may have different characteristics (e.g., in volume, in time of arrival, in frequency) as received by different microphones. Differences between the audio signal measured at different microphones may be exploited to determine one or more positions (e.g., points, arcs, lines, regions) at which the first vehicle may be located.

FIG. 31.62 is an example flow diagram of example logic illustrating an example embodiment of process 31.6100 of FIG. 31.61. More particularly, FIG. 31.62 illustrates a process 31.6200 that includes the process 31.6100, wherein the performing acoustic source localization includes operations performed by or at one or more of the following block(s).

At block 31.6201, the process performs receiving an audio signal via a first one of the multiple microphones, the audio signal representing a sound created by the first vehicle. In one approach, at least two microphones are employed. By measuring differences in the arrival time of an audio signal at the two microphones, the position of the first vehicle may be determined. The determined position may be a point, a line, an area, or the like.

At block 31.6202, the process performs receiving the audio signal via a second one of the multiple microphones.

At block 31.6203, the process performs determining the position of the first vehicle by determining a difference between an arrival time of the audio signal at the first microphone and an arrival time of the audio signal at the second microphone. In some embodiments, given information about the distance between the two microphones and the speed of sound, the process may determine the respective distances between each of the two microphones and the first vehicle. Given these two distances (along with the distance between the microphones), the process can solve for the one or more positions at which the first vehicle may be located.

FIG. 31.63 is an example flow diagram of example logic illustrating an example embodiment of process 31.6100 of FIG. 31.61. More particularly, FIG. 31.63 illustrates a process 31.6300 that includes the process 31.6100, wherein the performing acoustic source localization includes operations performed by or at one or more of the following block(s).

At block 31.6301, the process performs triangulating the position of the first vehicle based on a first and second angle, the first angle measured between a first one of the multiple microphones and the first vehicle, the second angle measured between a second one of the multiple microphones and the first vehicle. In some embodiments, the microphones may be directional, in that they may be used to determine the direction from which the sound is coming. Given such information, the process may use triangulation techniques to determine the position of the first vehicle.

FIG. 31.64 is an example flow diagram of example logic illustrating an example embodiment of process 31.6000 of FIG. 31.60. More particularly, FIG. 31.64 illustrates a process 31.6400 that includes the process 31.6000, wherein the determining the threat information based on the data representing the audio signal includes operations performed by or at one or more of the following block(s).

At block 31.6401, the process performs performing a Doppler analysis of the data representing the audio signal to determine whether the first vehicle is approaching the user. The process may analyze whether the frequency of the audio signal is shifting in order to determine whether the first vehicle is approaching or departing the position of the user. For example, if the frequency is shifting higher, the first vehicle may be determined to be approaching the user. Note that the determination is typically made from the frame of reference of the user (who may be moving or not). Thus, the first vehicle may be determined to be approaching the user when, as viewed from a fixed frame of reference, the user is approaching the first vehicle (e.g., a moving user traveling towards a stationary vehicle) or the first vehicle is approaching the user (e.g., a moving vehicle approaching a stationary user). In other embodiments, other frames of reference may be employed, such as a fixed frame, a frame associated with the first vehicle, or the like.

FIG. 31.65 is an example flow diagram of example logic illustrating an example embodiment of process 31.6400 of FIG. 31.64. More particularly, FIG. 31.65 illustrates a process 31.6500 that includes the process 31.6400, wherein the performing a Doppler analysis includes operations performed by or at one or more of the following block(s).

At block 31.6501, the process performs determining whether frequency of the audio signal is increasing or decreasing.

FIG. 31.66 is an example flow diagram of example logic illustrating an example embodiment of process 31.6000 of FIG. 31.60. More particularly, FIG. 31.66 illustrates a process 31.6600 that includes the process 31.6000, wherein the determining the threat information based on the data representing the audio signal includes operations performed by or at one or more of the following block(s).

At block 31.6601, the process performs performing a volume analysis of the data representing the audio signal to determine whether the first vehicle is approaching the user. The process may analyze whether the volume (e.g., amplitude) of the audio signal is shifting in order to determine whether the first vehicle is approaching or departing the position of the user. As noted, different embodiments may use different frames of reference when making this determination.

FIG. 31.67 is an example flow diagram of example logic illustrating an example embodiment of process 31.6600 of FIG. 31.66. More particularly, FIG. 31.67 illustrates a process 31.6700 that includes the process 31.6600, wherein the performing a volume analysis includes operations performed by or at one or more of the following block(s).

At block 31.6701, the process performs determining whether volume of the audio signal is increasing or decreasing.

FIG. 31.68 is an example flow diagram of example logic illustrating an example embodiment of process 31.100 of FIG. 31.1. More particularly, FIG. 31.68 illustrates a process 31.6800 that includes the process 31.100, wherein the determining threat information includes operations performed by or at one or more of the following block(s).

At block 31.6801, the process performs determining threat information that is not related to the first vehicle. The process may determine threat information that is not due or otherwise related to the first vehicle, including based on a variety of other factors or information, such as driving conditions, the presence or absence of other vehicles, the presence or absence of pedestrians, or the like.

FIG. 31.69 is an example flow diagram of example logic illustrating an example embodiment of process 31.6800 of FIG. 31.68. More particularly, FIG. 31.69 illustrates a process 31.6900 that includes the process 31.6800, wherein the determining threat information that is not related to the first vehicle includes operations performed by or at one or more of the following block(s).

At block 31.6901, the process performs receiving and processing information about objects and/or conditions aside from the first vehicle. At least some of the received information may include images of things other than the first vehicle, such as other vehicles, pedestrians, driving conditions, and the like.

FIG. 31.70 is an example flow diagram of example logic illustrating an example embodiment of process 31.6900 of FIG. 31.69. More particularly, FIG. 31.70 illustrates a process 31.7000 that includes the process 31.6900, wherein the receiving and processing information about objects and/or conditions aside from the first vehicle includes operations performed by or at one or more of the following block(s).

At block 31.7001, the process performs receiving information about at least one of a stationary object, a pedestrian, and/or an animal. A stationary object may be a fence, guardrail, utility pole, building, parked vehicle, or the like.

FIG. 31.71 is an example flow diagram of example logic illustrating an example embodiment of process 31.6800 of FIG. 31.68. More particularly, FIG. 31.71 illustrates a process 31.7100 that includes the process 31.6800, wherein the determining threat information that is not related to the first vehicle includes operations performed by or at one or more of the following block(s).

At block 31.7101, the process performs processing the information about the first vehicle to determine the threat information that is not related to the first vehicle. For example, when the received information is image data, the process may determine that a difficult lighting condition exists due to glare or overexposure detected in the image data. As another example, the process may identify a pedestrian in the roadway depicted in the image data. As another example, the process may determine that poor road surface conditions exist, such as due to water or oil on the road surface.

FIG. 31.72 is an example flow diagram of example logic illustrating an example embodiment of process 31.6800 of FIG. 31.68. More particularly, FIG. 31.72 illustrates a process 31.7200 that includes the process 31.6800, wherein the determining threat information that is not related to the first vehicle includes operations performed by or at one or more of the following block(s).

At block 31.7201, the process performs processing information other than the information about the first vehicle to determine the threat information that is not related to the first vehicle. The process may analyze data other than the received information about the first vehicle, such as weather data (e.g., temperature, precipitation), time of day, traffic information, position or motion sensor information (e.g., obtained from GPS systems or accelerometers) related to other vehicles, or the like.

FIG. 31.73 is an example flow diagram of example logic illustrating an example embodiment of process 31.6800 of FIG. 31.68. More particularly, FIG. 31.73 illustrates a process 31.7300 that includes the process 31.6800, wherein the determining threat information that is not related to the first vehicle includes operations performed by or at one or more of the following block(s).

At block 31.7301, the process performs determining that poor driving conditions exist. Poor driving conditions may include or be based on weather information (e.g., snow, rain, ice, temperature), time information (e.g., night or day), lighting information (e.g., a light sensor indicating that the user is traveling towards the setting sun), or the like.

FIG. 31.74 is an example flow diagram of example logic illustrating an example embodiment of process 31.7300 of FIG. 31.73. More particularly, FIG. 31.74 illustrates a process 31.7400 that includes the process 31.7300, wherein the determining that poor driving conditions exist includes operations performed by or at one or more of the following block(s).

At block 31.7401, the process performs determining that adverse weather conditions exist. Adverse weather conditions may be determined based on weather information received from a weather information system or sensor, such as indications of the current temperature, precipitation, or the like.

FIG. 31.75 is an example flow diagram of example logic illustrating an example embodiment of process 31.7300 of FIG. 31.73. More particularly, FIG. 31.75 illustrates a process 31.7500 that includes the process 31.7300, wherein the determining that poor driving conditions exist includes operations performed by or at one or more of the following block(s).

At block 31.7501, the process performs determining that a road construction project is present in proximity to the user. The process may receive information from a traffic information system that identifies road segments upon which road construction is present.

FIG. 31.76 is an example flow diagram of example logic illustrating an example embodiment of process 31.6800 of FIG. 31.68. More particularly, FIG. 31.76 illustrates a process 31.7600 that includes the process 31.6800, wherein the determining threat information that is not related to the first vehicle includes operations performed by or at one or more of the following block(s).

At block 31.7601, the process performs determining that a limited visibility condition exists. Limited visibility may be due to the time of day (e.g., at dusk, dawn, or night), weather (e.g., fog, rain), or the like.

FIG. 31.77 is an example flow diagram of example logic illustrating an example embodiment of process 31.6800 of FIG. 31.68. More particularly, FIG. 31.77 illustrates a process 31.7700 that includes the process 31.6800, wherein the determining threat information that is not related to the first vehicle includes operations performed by or at one or more of the following block(s).

At block 31.7701, the process performs determining that there is slow traffic in proximity to the user. The process may receive and integrate information from traffic information systems (e.g., that report accidents), other vehicles (e.g., that are reporting their speeds), or the like.

FIG. 31.78 is an example flow diagram of example logic illustrating an example embodiment of process 31.7700 of FIG. 31.77. More particularly, FIG. 31.78 illustrates a process 31.7800 that includes the process 31.7700, wherein the determining that there is slow traffic in proximity to the user includes operations performed by or at one or more of the following block(s).

At block 31.7801, the process performs receiving information from a traffic information system regarding traffic congestion on a road traveled by the user. Traffic information systems may provide fine-grained traffic information, such as current average speeds measured on road segments in proximity to the user.

FIG. 31.79 is an example flow diagram of example logic illustrating an example embodiment of process 31.7700 of FIG. 31.77. More particularly, FIG. 31.79 illustrates a process 31.7900 that includes the process 31.7700, wherein the determining that there is slow traffic in proximity to the user includes operations performed by or at one or more of the following block(s).

At block 31.7901, the process performs determining that one or more vehicles are traveling slower than an average or posted speed for a road traveled by the user. Slow travel may be determined based on the speed of one or more vehicles with respect to various baselines, such as average observed speed (e.g., recorded over time, based on time of day, etc.), posted speed limits, recommended speeds based on conditions, or the like.

FIG. 31.80 is an example flow diagram of example logic illustrating an example embodiment of process 31.6800 of FIG. 31.68. More particularly, FIG. 31.80 illustrates a process 31.8000 that includes the process 31.6800, wherein the determining threat information that is not related to the first vehicle includes operations performed by or at one or more of the following block(s).

At block 31.8001, the process performs determining that poor surface conditions exist on a roadway traveled by the user. Poor surface conditions may be due to weather (e.g., ice, snow, rain), temperature, surface type (e.g., gravel road), foreign materials (e.g., oil), or the like.

FIG. 31.81 is an example flow diagram of example logic illustrating an example embodiment of process 31.6800 of FIG. 31.68. More particularly, FIG. 31.81 illustrates a process 31.8100 that includes the process 31.6800, wherein the determining threat information that is not related to the first vehicle includes operations performed by or at one or more of the following block(s).

At block 31.8101, the process performs determining that there is a pedestrian in proximity to the user. The presence of pedestrians may be determined in various ways. In some embodiments, the process may utilize image processing techniques to recognize pedestrians in received image data. In other embodiments pedestrians may wear devices that transmit their location and/or presence. In other embodiments, pedestrians may be detected based on their heat signature, such as by an infrared sensor on the wearable device, user vehicle, or the like.

FIG. 31.82 is an example flow diagram of example logic illustrating an example embodiment of process 31.6800 of FIG. 31.68. More particularly, FIG. 31.82 illustrates a process 31.8200 that includes the process 31.6800, wherein the determining threat information that is not related to the first vehicle includes operations performed by or at one or more of the following block(s).

At block 31.8201, the process performs determining that there is an accident in proximity to the user. Accidents may be identified based on traffic information systems that report accidents, vehicle-based systems that transmit when collisions have occurred, or the like.

FIG. 31.83 is an example flow diagram of example logic illustrating an example embodiment of process 31.6800 of FIG. 31.68. More particularly, FIG. 31.83 illustrates a process 31.8300 that includes the process 31.6800, wherein the determining threat information that is not related to the first vehicle includes operations performed by or at one or more of the following block(s).

At block 31.8301, the process performs determining that there is an animal in proximity to the user. The presence of an animal may be determined as discussed with respect to pedestrians, above.

FIG. 31.84 is an example flow diagram of example logic illustrating an example embodiment of process 31.100 of FIG. 31.1. More particularly, FIG. 31.84 illustrates a process 31.8400 that includes the process 31.100, wherein the determining threat information includes operations performed by or at one or more of the following block(s).

At block 31.8401, the process performs determining the threat information based on gaze information associated with the user. In some embodiments, the process may consider the direction in which the user is looking when determining the threat information. For example, the threat information may depend on whether the user is or is not looking at the first vehicle, as discussed further below.

FIG. 31.85 is an example flow diagram of example logic illustrating an example embodiment of process 31.8400 of FIG. 31.84. More particularly, FIG. 31.85 illustrates a process 31.8500 that includes the process 31.8400, and which further includes operations performed by or at the following block(s).

At block 31.8501, the process performs receiving an indication of a direction in which the user is looking. In some embodiments, an orientation sensor such as a gyroscope or accelerometer may be employed to determine the orientation of the user's head, face, or other body part. In some embodiments, a camera or other image sensing device may track the orientation of the user's eyes.

At block 31.8502, the process performs determining that the user is not looking towards the first vehicle. As noted, the process may track the position of the first vehicle. Given this information, coupled with information about the direction of the user's gaze, the process may determine whether or not the user is (or likely is) looking in the direction of the first vehicle.

At block 31.8503, the process performs in response to determining that the user is not looking towards the first vehicle, directing the user to look towards the first vehicle. When it is determined that the user is not looking at the first vehicle, the process may warn or otherwise direct the user to look in that direction, such as by saying or otherwise presenting "Look right!", "Car on your left," or similar message.

FIG. 31.86 is an example flow diagram of example logic illustrating an example embodiment of process 31.100 of FIG. 31.1. More particularly, FIG. 31.86 illustrates a process 31.8600 that includes the process 31.100, and which further includes operations performed by or at the following block(s).

At block 31.8601, the process performs identifying multiple threats to the user. The process may in some cases identify multiple potential threats, such as one car approaching the user from behind and another car approaching the user from the left.

At block 31.8602, the process performs identifying a first one of the multiple threats that is more significant than at least one other of the multiple threats. The process may rank, order, or otherwise evaluate the relative significance or risk presented by each of the identified threats. For example, the process may determine that a truck approaching from the right is a bigger risk than a bicycle approaching from behind. On the other hand, if the truck is moving very slowly (thus leaving more time for the truck and/or the user to avoid it) compared to the bicycle, the process may instead determine that the bicycle is the bigger risk.

At block 31.8603, the process performs instructing the user to avoid the first one of the multiple threats. Instructing the user may include outputting a command or suggestion to take (or not take) a particular course of action.

FIG. 31.87 is an example flow diagram of example logic illustrating an example embodiment of process 31.8600 of FIG. 31.86. More particularly, FIG. 31.87 illustrates a process 31.8700 that includes the process 31.8600, and which further includes operations performed by or at the following block(s).

At block 31.8701, the process performs modeling multiple potential accidents that each correspond to one of the multiple threats to determine a collision force associated with each accident. In some embodiments, the process models the physics of various objects to determine potential collisions and possibly their severity and/or likelihood. For example, the process may determine an expected force of a collision based on factors such as object mass, velocity, acceleration, deceleration, or the like.

At block 31.8702, the process performs selecting the first threat based at least in part on which of the multiple accidents has the highest collision force. In some embodiments, the process considers the threat having the highest associated collision force when determining most significant threat, because that threat will likely result in the greatest injury to the user.

FIG. 31.88 is an example flow diagram of example logic illustrating an example embodiment of process 31.8600 of FIG. 31.86. More particularly, FIG. 31.88 illustrates a process 31.8800 that includes the process 31.8600, and which further includes operations performed by or at the following block(s).

At block 31.8801, the process performs determining a likelihood of an accident associated with each of the multiple threats. In some embodiments, the process associates a likelihood (probability) with each of the multiple threats. Such a probability may be determined with respect to a physical model that represents uncertainty with respect to the mechanics of the various objects that it models.

At block 31.8802, the process performs selecting the first threat based at least in part on which of the multiple threats has the highest associated likelihood. The process may consider the threat having the highest associated likelihood when determining the most significant threat.

FIG. 31.89 is an example flow diagram of example logic illustrating an example embodiment of process 31.8600 of FIG. 31.86. More particularly, FIG. 31.89 illustrates a process 31.8900 that includes the process 31.8600, and which further includes operations performed by or at the following block(s).

At block 31.8901, the process performs determining a mass of an object associated with each of the multiple threats. In some embodiments, the process may consider the mass of threat objects, based on the assumption that those objects having higher mass (e.g., a truck) pose greater threats than those having a low mass (e.g., a pedestrian).

At block 31.8902, the process performs selecting the first threat based at least in part on which of the objects has the highest mass.

FIG. 31.90 is an example flow diagram of example logic illustrating an example embodiment of process 31.8600 of FIG. 31.86. More particularly, FIG. 31.90 illustrates a process 31.9000 that includes the process 31.8600, wherein the identifying a first one of the multiple threats that is more significant than at least one other of the multiple threats includes operations performed by or at one or more of the following block(s).

At block 31.9001, the process performs selecting the most significant threat from the multiple threats. Threat significance may be based on a variety of factors, including likelihood, cost, potential injury type, and the like.

FIG. 31.91 is an example flow diagram of example logic illustrating an example embodiment of process 31.100 of FIG. 31.1. More particularly, FIG. 31.91 illustrates a process 31.9100 that includes the process 31.100, and which further includes operations performed by or at the following block(s).

At block 31.9101, the process performs determining that an evasive action with respect to the first vehicle poses a threat to some other object. The process may consider whether potential evasive actions pose threats to other objects. For example, the process may analyze whether directing the user to turn right would cause the user to collide with a pedestrian or some fixed object, which may actually result in a worse outcome (e.g., for the user and/or the pedestrian) than colliding with the first vehicle.

At block 31.9102, the process performs instructing the user to take some other evasive action that poses a lesser threat to the some other object. The process may rank or otherwise order evasive actions (e.g., slow down, turn left, turn right) based at least in part on the risks or threats those evasive actions pose to other entities.

FIG. 31.92 is an example flow diagram of example logic illustrating an example embodiment of process 31.100 of FIG. 31.1. More particularly, FIG. 31.92 illustrates a process 31.9200 that includes the process 31.100, and which further includes operations performed by or at the following block(s).

At block 31.9201, the process performs identifying multiple threats that each have an associated likelihood and cost. In some embodiments, the process may perform a cost-minimization analysis, in which it considers multiple threats, including threats posed to the user and to others, and selects a threat that minimizes or reduces expected costs. The process may also consider threats posed by actions taken by the user to avoid other threats.

At block 31.9202, the process performs determining a course of action that minimizes an expected cost with respect to the multiple threats. Expected cost of a threat may be expressed as a product of the likelihood of damage associated with the threat and the cost associated with such damage.

FIG. 31.93 is an example flow diagram of example logic illustrating an example embodiment of process 31.9200 of FIG. 31.92. More particularly, FIG. 31.93 illustrates a process 31.9300 that includes the process 31.9200, wherein the cost is based on one or more of a cost of damage to a vehicle, a cost of injury or death of a human, a cost of injury or death of an animal, a cost of damage to a structure, a cost of emotional distress, and/or cost to a business or person based on negative publicity associated with an accident.

FIG. 31.94 is an example flow diagram of example logic illustrating an example embodiment of process 31.9200 of FIG. 31.92. More particularly, FIG. 31.94 illustrates a process 31.9400 that includes the process 31.9200, wherein the identifying multiple threats includes operations performed by or at one or more of the following block(s).

At block 31.9401, the process performs identifying multiple threats that are each related to different persons or things. In some embodiments, the process considers risks related to multiple distinct entities, possibly including the user.

FIG. 31.95 is an example flow diagram of example logic illustrating an example embodiment of process 31.9200 of FIG. 31.92. More particularly, FIG. 31.95 illustrates a process 31.9500 that includes the process 31.9200, wherein the identifying multiple threats includes operations performed by or at one or more of the following block(s).

At block 31.9501, the process performs identifying multiple threats that are each related to the user. In some embodiments, the process also or only considers risks that are related to the user.

FIG. 31.96 is an example flow diagram of example logic illustrating an example embodiment of process 31.9200 of FIG. 31.92. More particularly, FIG. 31.96 illustrates a process 31.9600 that includes the process 31.9200, wherein the determining a course of action that minimizes an expected cost includes operations performed by or at one or more of the following block(s).

At block 31.9601, the process performs minimizing expected costs to the user posed by the multiple threats. In some embodiments, the process attempts to minimize those costs borne by the user. Note that this may cause the process to recommend a course of action that is not optimal from a societal perspective, such as by directing the user to drive his car over a pedestrian rather than to crash into a car or structure.

FIG. 31.97 is an example flow diagram of example logic illustrating an example embodiment of process 31.9200 of FIG. 31.92. More particularly, FIG. 31.97 illustrates a process 31.9700 that includes the process 31.9200, wherein the determining a course of action that minimizes an expected cost includes operations performed by or at one or more of the following block(s).

At block 31.9701, the process performs minimizing overall expected costs posed by the multiple threats, the overall expected costs being a sum of expected costs borne by the user and other persons/things. In some embodiments, the process attempts to minimize social costs, that is, the costs borne by the various parties to an accident. Note that this may cause the process to recommend a course of action that may have a high cost to the user (e.g., crashing into a wall and damaging the user's car) to spare an even higher cost to another person (e.g., killing a pedestrian).

FIG. 31.98 is an example flow diagram of example logic illustrating an example embodiment of process 31.100 of FIG. 31.1. More particularly, FIG. 31.98 illustrates a process 31.9800 that includes the process 31.100, wherein the presenting the threat information includes operations performed by or at one or more of the following block(s).

At block 31.9801, the process performs presenting the threat information via an audio output device of the wearable device. The process may play an alarm, bell, chime, voice message, or the like that warns or otherwise informs the user of the threat information. The wearable device may include audio speakers operable to output audio signals, including as part of a set of earphones, earbuds, a headset, a helmet, or the like.

FIG. 31.99 is an example flow diagram of example logic illustrating an example embodiment of process 31.100 of FIG. 31.1. More particularly, FIG. 31.99 illustrates a process 31.9900 that includes the process 31.100, wherein the presenting the threat information includes operations performed by or at one or more of the following block(s).

At block 31.9901, the process performs presenting the threat information via a visual display device of the wearable device. In some embodiments, the wearable device includes a display screen or other mechanism for presenting visual information. For example, when the wearable device is a helmet, a face shield of the helmet may be used as a type of heads-up display for presenting the threat information.

FIG. 31.100 is an example flow diagram of example logic illustrating an example embodiment of process 31.9900 of FIG. 31.99. More particularly, FIG. 31.100 illustrates a process 31.10000 that includes the process 31.9900, wherein the presenting the threat information via a visual display device includes operations performed by or at one or more of the following block(s).

At block 31.10001, the process performs displaying an indicator that instructs the user to look towards the first vehicle. The displayed indicator may be textual (e.g., "Look right!"), iconic (e.g., an arrow), or the like.

FIG. 31.101 is an example flow diagram of example logic illustrating an example embodiment of process 31.9900 of FIG. 31.99. More particularly, FIG. 31.101 illustrates a process 31.10100 that includes the process 31.9900, wherein the presenting the threat information via a visual display device includes operations performed by or at one or more of the following block(s).

At block 31.10101, the process performs displaying an indicator that instructs the user to accelerate, decelerate, and/or turn. An example indicator may be or include the text "Speed up," "slow down," "turn left," or similar language.

FIG. 31.102 is an example flow diagram of example logic illustrating an example embodiment of process 31.100 of FIG. 31.1. More particularly, FIG. 31.102 illustrates a process 31.10200 that includes the process 31.100, wherein the presenting the threat information includes operations performed by or at one or more of the following block(s).

At block 31.10201, the process performs directing the user to accelerate.

FIG. 31.103 is an example flow diagram of example logic illustrating an example embodiment of process 31.100 of FIG. 31.1. More particularly, FIG. 31.103 illustrates a process 31.10300 that includes the process 31.100, wherein the presenting the threat information includes operations performed by or at one or more of the following block(s).

At block 31.10301, the process performs directing the user to decelerate.

FIG. 31.104 is an example flow diagram of example logic illustrating an example embodiment of process 31.100 of FIG. 31.1. More particularly, FIG. 31.104 illustrates a process 31.10400 that includes the process 31.100, wherein the presenting the threat information includes operations performed by or at one or more of the following block(s).

At block 31.10401, the process performs directing the user to turn. In some embodiments, the process may provide "turn assistance," by helping drivers better understand when it is appropriate to make a turn across one or more lanes of oncoming traffic. In such an embodiment, the process tracks vehicles as they approach in intersection to determine whether a vehicle waiting to turn across oncoming lanes of traffic has sufficient cross the lanes without colliding with the approaching vehicles.

FIG. 31.105 is an example flow diagram of example logic illustrating an example embodiment of process 31.100 of FIG. 31.1. More particularly, FIG. 31.105 illustrates a process 31.10500 that includes the process 31.100, wherein the presenting the threat information includes operations performed by or at one or more of the following block(s).

At block 31.10501, the process performs directing the user not to turn. As noted, some embodiments provide a turn assistance feature for helping driving to make safe turns across lanes of oncoming traffic.

FIG. 31.106 is an example flow diagram of example logic illustrating an example embodiment of process 31.100 of FIG. 31.1. More particularly, FIG. 31.106 illustrates a process 31.10600 that includes the process 31.100, and which further includes operations performed by or at the following block(s).

At block 31.10601, the process performs transmitting to the first vehicle a warning based on the threat information.

The process may send or otherwise transmit a warning or other message to the first vehicle that instructs the operator of the first vehicle to take evasive action. The instruction to the first vehicle may be complimentary to any instructions given to the user, such that if both instructions are followed, the risk of collision decreases. In this manner, the process may help avoid a situation in which the user and the operator of the first vehicle take actions that actually increase the risk of collision, such as may occur when the user and the first vehicle are approaching head but do not turn away from one another.

FIG. 31.107 is an example flow diagram of example logic illustrating an example embodiment of process 31.100 of FIG. 31.1. More particularly, FIG. 31.107 illustrates a process 31.10700 that includes the process 31.100, and which further includes operations performed by or at the following block(s).

At block 31.10701, the process performs presenting the threat information via an output device of a vehicle of the user, the output device including a visual display and/or an audio speaker. In some embodiments, the process may use other devices to output the threat information, such as output devices of a vehicle of the user, including a car stereo, dashboard display, or the like.

FIG. 31.108 is an example flow diagram of example logic illustrating an example embodiment of process 31.100 of FIG. 31.1. More particularly, FIG. 31.108 illustrates a process 31.10800 that includes the process 31.100, wherein the wearable device is a helmet worn by the user. Various types of helmets are contemplated, including motorcycle helmets, bicycle helmets, and the like.

FIG. 31.109 is an example flow diagram of example logic illustrating an example embodiment of process 31.100 of FIG. 31.1. More particularly, FIG. 31.109 illustrates a process 31.10900 that includes the process 31.100, wherein the wearable device is goggles worn by the user.

FIG. 31.110 is an example flow diagram of example logic illustrating an example embodiment of process 31.100 of FIG. 31.1. More particularly, FIG. 31.110 illustrates a process 31.11000 that includes the process 31.100, wherein the wearable device is eyeglasses worn by the user.

FIG. 31.111 is an example flow diagram of example logic illustrating an example embodiment of process 31.100 of FIG. 31.1. More particularly, FIG. 31.111 illustrates a process 31.11100 that includes the process 31.100, wherein the presenting the threat information includes operations performed by or at one or more of the following block(s).

At block 31.11101, the process performs presenting the threat information via goggles worn by the user. The goggles may include a small display, an audio speaker, or haptic output device, or the like.

FIG. 31.112 is an example flow diagram of example logic illustrating an example embodiment of process 31.100 of FIG. 31.1. More particularly, FIG. 31.112 illustrates a process 31.11200 that includes the process 31.100, wherein the presenting the threat information includes operations performed by or at one or more of the following block(s).

At block 31.11201, the process performs presenting the threat information via a helmet worn by the user. The helmet may include an audio speaker or visual output device, such as a display that presents information on the inside of the face screen of the helmet. Other output devices, including haptic devices, are contemplated.

FIG. 31.113 is an example flow diagram of example logic illustrating an example embodiment of process 31.100 of FIG. 31.1. More particularly, FIG. 31.113 illustrates a process 31.11300 that includes the process 31.100, wherein the presenting the threat information includes operations performed by or at one or more of the following block(s).

At block 31.11301, the process performs presenting the threat information via a hat worn by the user. The hat may include an audio speaker or similar output device.

FIG. 31.114 is an example flow diagram of example logic illustrating an example embodiment of process 31.100 of FIG. 31.1. More particularly, FIG. 31.114 illustrates a process 31.11400 that includes the process 31.100, wherein the presenting the threat information includes operations performed by or at one or more of the following block(s).

At block 31.11401, the process performs presenting the threat information via eyeglasses worn by the user. The eyeglasses may include a small display, an audio speaker, or haptic output device, or the like.

FIG. 31.115 is an example flow diagram of example logic illustrating an example embodiment of process 31.100 of FIG. 31.1. More particularly, FIG. 31.115 illustrates a process 31.11500 that includes the process 31.100, wherein the presenting the threat information includes operations performed by or at one or more of the following block(s).

At block 31.11501, the process performs presenting the threat information via audio speakers that are part of at least one of earphones, a headset, earbuds, and/or a hearing aid. The audio speakers may be integrated into the wearable device. In other embodiments, other audio speakers (e.g., of a car stereo) may be employed instead or in addition.

FIG. 31.116 is an example flow diagram of example logic illustrating an example embodiment of process 31.100 of FIG. 31.1. More particularly, FIG. 31.116 illustrates a process 31.11600 that includes the process 31.100, and which further includes operations performed by or at the following block(s).

At block 31.11601, the process performs performing at the road-based device the determining threat information and/or the presenting the threat information. In some embodiments, the road-based device may be responsible for performing one or more of the operations of the process. For example, the road-based device may be or include a computing system situated at or about a street intersection configured to receive and analyze information about vehicles that are entering or nearing the intersection.

At block 31.11602, the process performs transmitting the threat information from the road-based device to the wearable device of the user. For example, when the road-based computing system determines that two vehicles may be on a collision course, the computing system can transmit threat information to the wearable device so that the user can take evasive action and avoid a possible accident.

FIG. 31.117 is an example flow diagram of example logic illustrating an example embodiment of process 31.100 of FIG. 31.1. More particularly, FIG. 31.117 illustrates a process 31.11700 that includes the process 31.100, and which further includes operations performed by or at the following block(s).

At block 31.11701, the process performs performing on a computing system that is remote from the road-based device the determining threat information and/or the presenting the threat information. In some embodiments, a remote computing system may be responsible for performing one or more of the operations of the process. For example, the road-based device may forward the received information to a cloud-based computing system where it is analyzed to determine the threat information.

At block 31.11702, the process performs transmitting the threat information from the road-based device to the wearable device of the user. The cloud-based computing system can transmit threat information to the wearable device so that the user can take evasive action and avoid a possible accident.

FIG. 31.118 is an example flow diagram of example logic illustrating an example embodiment of process 31.100 of FIG. 31.1. More particularly, FIG. 31.118 illustrates a process 31.11800 that includes the process 31.100, and which further includes operations performed by or at the following block(s).

At block 31.11801, the process performs receiving data representing threat information relevant to a second vehicle, the second vehicle not being used for travel by the user. As noted, threat information may in some embodiments be shared amongst vehicles, entities, devices, or systems present in a roadway. For example, a second vehicle may have stalled in an intersection that is being approached by the user. This second vehicle may then transmit the fact that it has stalled to the process, which in turn forwards an instruction to slow down to the user. As another example, the second vehicle may transmit an indication of an icy surface condition, which is then forwarded by the process to the user.

At block 31.11802, the process performs determining the threat information based on the data representing threat information relevant to the second vehicle. Having received threat information from the second vehicle, the process may determine that it is also relevant to the user, and then accordingly present it to the user.

FIG. 31.119 is an example flow diagram of example logic illustrating an example embodiment of process 31.11800 of FIG. 31.118. More particularly, FIG. 31.119 illustrates a process 31.11900 that includes the process 31.11800, wherein the receiving data representing threat information relevant to a second vehicle includes operations performed by or at one or more of the following block(s).

At block 31.11901, the process performs receiving from the second vehicle an indication of stalled or slow traffic encountered by the second vehicle. Various types of threat information relevant to the second vehicle may be provided to the process, such as that there is stalled or slow traffic ahead of the second vehicle.

FIG. 31.120 is an example flow diagram of example logic illustrating an example embodiment of process 31.11800 of FIG. 31.118. More particularly, FIG. 31.120 illustrates a process 31.12000 that includes the process 31.11800, wherein the receiving data representing threat information relevant to a second vehicle includes operations performed by or at one or more of the following block(s).

At block 31.12001, the process performs receiving from the second vehicle an indication of poor driving conditions experienced by the second vehicle. The second vehicle may share the fact that it is experiencing poor driving conditions, such as an icy or wet roadway.

FIG. 31.121 is an example flow diagram of example logic illustrating an example embodiment of process 31.11800 of FIG. 31.118. More particularly, FIG. 31.121 illustrates a process 31.12100 that includes the process 31.11800, wherein the receiving data representing threat information relevant to a second vehicle includes operations performed by or at one or more of the following block(s).

At block 31.12101, the process performs receiving from the second vehicle an indication that the first vehicle is driving erratically. The second vehicle may share a determination that the first vehicle is driving erratically, such as by swerving, driving with excessive speed, driving too slowly, or the like.

FIG. 31.122 is an example flow diagram of example logic illustrating an example embodiment of process 31.11800 of FIG. 31.118. More particularly, FIG. 31.122 illustrates a process 31.12200 that includes the process 31.11800, wherein the receiving data representing threat information relevant to a second vehicle includes operations performed by or at one or more of the following block(s).

At block 31.12201, the process performs receiving from the second vehicle an image of the first vehicle. The second vehicle may include one or more cameras, and may share images obtained via those cameras with other entities.

FIG. 31.123 is an example flow diagram of example logic illustrating an example embodiment of process 31.100 of FIG. 31.1. More particularly, FIG. 31.123 illustrates a process 31.12300 that includes the process 31.100, and which further includes operations performed by or at the following block(s).

At block 31.12301, the process performs transmitting the threat information to a second vehicle. As noted, threat information may in some embodiments be shared amongst vehicles, entities, devices, or systems present in a roadway. In this example, the threat information is transmitted to a second vehicle (e.g., one following behind the user), so that the second vehicle may benefit from the determined threat information as well.

FIG. 31.124 is an example flow diagram of example logic illustrating an example embodiment of process 31.12300 of FIG. 31.123. More particularly, FIG. 31.124 illustrates a process 31.12400 that includes the process 31.12300, wherein the transmitting the threat information to a second vehicle includes operations performed by or at one or more of the following block(s).

At block 31.12401, the process performs transmitting the threat information to an intermediary server system for distribution to other vehicles in proximity to the user. In some embodiments, intermediary systems may operate as relays for sharing the threat information with other vehicles and users of a roadway.

FIG. 31.125 is an example flow diagram of example logic illustrating an example embodiment of process 31.100 of FIG. 31.1. More particularly, FIG. 31.125 illustrates a process 31.12500 that includes the process 31.100, and which further includes operations performed by or at the following block(s).

At block 31.12501, the process performs transmitting the threat information to a second road-based device situated along a projected course of travel of the first vehicle. For example, the process may transmit the threat information to a second road-based device located at a next intersection or otherwise further along a roadway, so that the second road-based device can take appropriate action, such as warning other vehicles, pedestrians, or the like.

FIG. 31.126 is an example flow diagram of example logic illustrating an example embodiment of process 31.12500 of FIG. 31.125. More particularly, FIG. 31.126 illustrates a process 31.12600 that includes the process 31.12500, and which further includes operations performed by or at the following block(s).

At block 31.12601, the process performs causing the second road-based device to warn drivers that the first vehicle is driving erratically.

FIG. 31.127 is an example flow diagram of example logic illustrating an example embodiment of process 31.12500 of FIG. 31.125. More particularly, FIG. 31.127 illustrates a process 31.12700 that includes the process 31.12500, and which further includes operations performed by or at the following block(s).

At block 31.12701, the process performs causing the second road-based device to control a traffic control signal to inhibit a collision involving the first vehicle. For example, the second road-based device may change a signal from green to red in order to stop other vehicles from entering an intersection when it is determined that the first vehicle is running red lights.

FIG. 31.128 is an example flow diagram of example logic illustrating an example embodiment of process 31.100 of FIG. 31.1. More particularly, FIG. 31.128 illustrates a process 31.12800 that includes the process 31.100, and which further includes operations performed by or at the following block(s).

At block 31.12801, the process performs transmitting the threat information to a law enforcement entity. In some embodiments, the process shares the threat information with law enforcement entities, including computer or other information systems managed or operated by such entities. For example, if the process determines that the first vehicle is driving erratically, the process may transmit that determination and/or information about the first vehicle with the police.

FIG. 31.129 is an example flow diagram of example logic illustrating an example embodiment of process 31.12800 of FIG. 31.128. More particularly, FIG. 31.129 illustrates a process 31.12900 that includes the process 31.12800, and which further includes operations performed by or at the following block(s).

At block 31.12901, the process performs determining a license place identifier of the first vehicle based on the image data. The process may perform image processing (e.g., optical character recognition) to determine the license number on the license plate of the first vehicle.

At block 31.12902, the process performs transmitting the license plate identifier to the law enforcement entity.

FIG. 31.130 is an example flow diagram of example logic illustrating an example embodiment of process 31.12800 of FIG. 31.128. More particularly, FIG. 31.130 illustrates a process 31.13000 that includes the process 31.12800, and which further includes operations performed by or at the following block(s).

At block 31.13001, the process performs determining a vehicle description of the first vehicle based on the image data. Image processing may be utilized to determine a vehicle description, including one or more of type, make, year, and/or color of the first vehicle.

At block 31.13002, the process performs transmitting the vehicle description to the law enforcement entity.

FIG. 31.131 is an example flow diagram of example logic illustrating an example embodiment of process 31.12800 of FIG. 31.128. More particularly, FIG. 31.131 illustrates a process 31.13100 that includes the process 31.12800, and which further includes operations performed by or at the following block(s).

At block 31.13101, the process performs determining a location associated with the first vehicle. The process may reference a GPS system to determine the current location of the user and/or the first vehicle, and then provide an indication of that location to the police or other agency. The location may be or include a coordinate, a street or intersection name, a name of a municipality, or the like.

At block 31.13102, the process performs transmitting an indication of the location to the law enforcement entity.

FIG. 31.132 is an example flow diagram of example logic illustrating an example embodiment of process 31.12800 of FIG. 31.128. More particularly, FIG. 31.132 illustrates a process 31.13200 that includes the process 31.12800, and which further includes operations performed by or at the following block(s).

At block 31.13201, the process performs determining a direction of travel of the first vehicle. As discussed above, the process may determine direction of travel in various ways, such as by modeling the motion of the first vehicle. Such a direction may then be provided to the police or other agency, such as by reporting that the first vehicle is traveling northbound.

At block 31.13202, the process performs transmitting an indication of the direction of travel to the law enforcement entity.

C. Example Computing System Implementation

Figure 32:
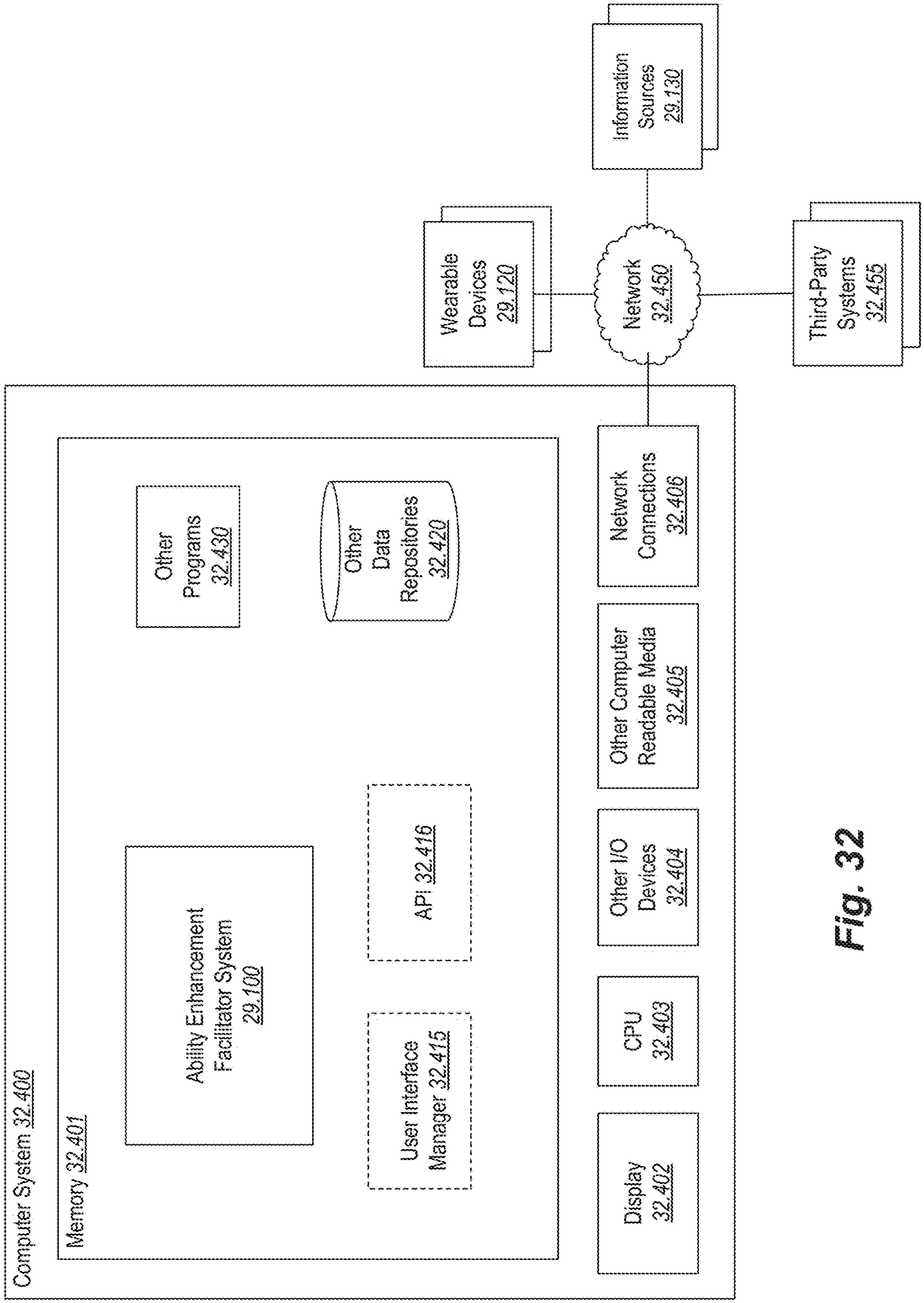
FIG. 32 is an example block diagram of an example computing system for implementing an ability enhancement facilitator system according to an example embodiment.

FIG. 32 is an example block diagram of an example computing system for implementing an ability enhancement facilitator system according to an example embodiment. In particular, FIG. 32 shows a computing system 32.400 that may be utilized to implement an AEFS 29.100.

Note that one or more general purpose or special purpose computing systems/devices may be used to implement the AEFS 29.100. In addition, the computing system 32.400 may comprise one or more distinct computing systems/devices and may span distributed locations. Furthermore, each block shown may represent one or more such blocks as appropriate to a specific embodiment or may be combined with other blocks. Also, the AEFS 29.100 may be implemented in software, hardware, firmware, or in some combination to achieve the capabilities described herein.

In the embodiment shown, computing system 32.400 comprises a computer memory ("memory") 32.401, a display 32.402, one or more Central Processing Units ("CPU") 32.403, Input/Output devices 32.404 (e.g., keyboard, mouse, CRT or LCD display, and the like), other computer-readable media 32.405, and network connections 32.406. The AEFS 29.100 is shown residing in memory 32.401. In other embodiments, some portion of the contents, some or all of the components of the AEFS 29.100 may be stored on and/or transmitted over the other computer-readable media 32.405. The components of the AEFS 29.100 preferably execute on one or more CPUs 32.403 and implement techniques described herein. Other code or programs 32.430 (e.g., an administrative interface, a Web server, and the like) and potentially other data repositories, such as data repository 32.420, also reside in the memory 32.401, and preferably execute on one or more CPUs 32.403. Of note, one or more of the components in FIG. 32 may not be present in any specific implementation. For example, some embodiments may not provide other computer readable media 32.405 or a display 32.402.

The AEFS 29.100 interacts via the network 32.450 with wearable devices 29.120, information sources 29.130, and third-party systems/applications 32.455. The network 32.450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 32.455 may include any systems that provide data to, or utilize data from, the AEFS 29.100, including Web browsers, vehicle-based client systems, traffic tracking, monitoring, or prediction systems, and the like.

The AEFS 29.100 is shown executing in the memory 32.401 of the computing system 32.400. Also included in the memory are a user interface manager 32.415 and an application program interface ("API") 32.416. The user interface manager 32.415 and the API 32.416 are drawn in dashed lines to indicate that in other embodiments, functions performed by one or more of these components may be performed externally to the AEFS 29.100.

The UI manager 32.415 provides a view and a controller that facilitate user interaction with the AEFS 29.100 and its various components. For example, the UI manager 32.415 may provide interactive access to the AEFS 29.100, such that users can configure the operation of the AEFS 29.100, such as by providing the AEFS 29.100 with information about common routes traveled, vehicle types used, driving patterns, or the like. The UI manager 32.415 may also manage and/or implement various output abstractions, such that the AEFS 29.100 can cause vehicular threat information to be displayed on different media, devices, or systems. In some embodiments, access to the functionality of the UI manager 32.415 may be provided via a Web server, possibly executing as one of the other programs 32.430. In such embodiments, a user operating a Web browser executing on one of the third-party systems 32.455 can interact with the AEFS 29.100 via the UI manager 32.415.

The API 32.416 provides programmatic access to one or more functions of the AEFS 29.100. For example, the API 32.416 may provide a programmatic interface to one or more functions of the AEFS 29.100 that may be invoked by one of the other programs 32.430 or some other module. In this manner, the API 32.416 facilitates the development of third-party software, such as user interfaces, plug-ins, adapters (e.g., for integrating functions of the AEFS 29.100 into vehicle-based client systems or devices), and the like.

In addition, the API 32.416 may be in at least some embodiments invoked or otherwise accessed via remote entities, such as code executing on one of the wearable devices 29.120, information sources 29.130, and/or one of the third-party systems/applications 32.455, to access various functions of the AEFS 29.100. For example, an information source 29.130 such as a radar gun installed at an intersection may push motion-related information (e.g., velocity) about vehicles to the AEFS 29.100 via the API 32.416. As another example, a weather information system may push current conditions information (e.g., temperature, precipitation) to the AEFS 29.100 via the API 32.416. The API 32.416 may also be configured to provide management widgets (e.g., code modules) that can be integrated into the third-party applications 32.455 and that are configured to interact with the AEFS 29.100 to make at least some of the described functionality available within the context of other applications (e.g., mobile apps).

In an example embodiment, components/modules of the AEFS 29.100 are implemented using standard programming techniques. For example, the AEFS 29.100 may be implemented as a "native" executable running on the CPU 32.403, along with one or more static or dynamic libraries. In other embodiments, the AEFS 29.100 may be implemented as instructions processed by a virtual machine that executes as one of the other programs 32.430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 29.100, such as in the data store 32.420 (or 30.240), can be available by standard mechanisms such as through C, C++, C #, and Java APIs; libraries for accessing files, databases, or other data repositories; through scripting languages such as XML; or through Web servers, FTP servers, or other types of servers providing access to stored data. The data store 32.420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 29.100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

IX. Presentation of Shared Threat Information in a Transportation-Related Context Embodiments described herein provide enhanced computer- and network-based methods and systems for ability enhancement and, more particularly, for enhancing a user's ability to operate or function in a transportation-related context (e.g., as a pedestrian or vehicle operator) by performing threat detection based at least in part on analyzing information received from road-based devices, such as a camera, microphone, or other sensor deployed at the side of a road, at an intersection, or other road-based location. The received information may include image data, audio data, or other data/signals that represent vehicles and other objects or conditions present in a roadway or other context. Example embodiments provide an Ability Enhancement Facilitator System ("AEFS") that performs at least some of the described techniques. Embodiments of the AEFS may augment, enhance, or improve the senses (e.g., hearing), faculties (e.g., memory, language comprehension), and/or other abilities (e.g., driving, riding a bike, walking/running) of a user.

In some embodiments, the AEFS is configured to identify threats (e.g., posed by vehicles to a user of a roadway, posed by a user to vehicles or other users of a roadway), and to provide information about such threats to a user so that he may take evasive action. Identifying threats may include analyzing information about a vehicle that is present in the roadway in order to determine whether the user and the vehicle may be on a collision course. The analyzed information may include or be represented by image data (e.g., pictures or video of a roadway and its surrounding environment), audio data (e.g., sounds reflected from or emitted by a vehicle), range information (e.g., provided by a sonar or infrared range sensor), conditions information (e.g., weather, temperature, time of day), or the like. The user may be a pedestrian (e.g., a walker, a jogger), an operator of a motorized (e.g., car, motorcycle, moped, scooter) or non-motorized vehicle (e.g., bicycle, pedicab, rickshaw), a vehicle passenger, or the like. In some embodiments, the vehicle may be operating autonomously. In some embodiments, the user wears a wearable device (e.g., a helmet, goggles, eyeglasses, hat) that is configured to at least present determined vehicular threat information to the user.

The AEFS may determine threats based on information received from various sources. Road-based sources may provide image, audio, or other types of data to the AEFS. The road-based sources may include sensors, devices, or systems that are deployed at, within, or about a roadway or intersection. For example, cameras, microphones, range sensors, velocity sensors, and the like may be affixed to utility or traffic signal support structures (e.g., poles, posts). As another example, induction coils embedded within a road can provide information to the AEFS about the presence and/or velocity of vehicles traveling over the road.

In some embodiments, the AEFS is configured to receive image data, at least some of which represents an image of a first vehicle. The image data may be obtained from various sources, including a camera of a wearable device of a user, a camera on a vehicle of the user, a road-side camera, a camera on some other vehicle, or the like. The image data may represent electromagnetic signals of various types or in various ranges, including visual signals (e.g., signals having a wavelength in the range of about 390-750 nm), infrared signals (e.g., signals having a wavelength in the range of about 750 nm-300 micrometers), or the like.

Then, the AEFS determines vehicular threat information based at least in part on the image data. In some embodiments, the AEFS may analyze the received image data in order to identify the first vehicle and/or to determine whether the first vehicle represents a threat to the user, such as because the first vehicle and the user may be on a collision course. The image data may be analyzed in various ways, including by identifying objects (e.g., to recognize that a vehicle or some other object is shown in the image data), determining motion-related information (e.g., position, velocity, acceleration, mass) about objects, or the like.

Next, the AEFS informs the user of the determined vehicular threat information via a wearable device of the user. Typically, the user's wearable device (e.g., a helmet) will include one or more output devices, such as audio speakers, visual display devices (e.g., warning lights, screens, heads-up displays), haptic devices, and the like. The AEFS may present the vehicular threat information via one or more of these output devices. For example, the AEFS may visually display or speak the words "Car on left." As another example, the AEFS may visually display a leftward pointing arrow on a heads-up screen displayed on a face screen of the user's helmet. Presenting the vehicular threat information may also or instead include presenting a recommended course of action (e.g., to slow down, to speed up, to turn) to mitigate the determined vehicular threat.

The AEFS may use other or additional sources or types of information. For example, in some embodiments, the AEFS is configured to receive data representing an audio signal emitted by a first vehicle. The audio signal is typically obtained in proximity to a user, who may be a pedestrian or traveling in a vehicle as an operator or a passenger. In some embodiments, the audio signal is obtained by one or more microphones coupled to a road-side structure, the user's vehicle and/or a wearable device of the user, such as a helmet, goggles, a hat, a media player, or the like. Then, the AEFS may determine vehicular threat information based at least in part on the data representing the audio signal. In some embodiments, the AEFS may analyze the received data in order to determine whether the first vehicle and the user are on a collision course. The audio data may be analyzed in various ways, including by performing audio analysis, frequency analysis (e.g., Doppler analysis), acoustic localization, or the like.

The AEFS may combine information of various types in order to determine threat information. For example, because image processing may be computationally expensive, rather than always processing all image data obtained from every possible source, the AEFS may use audio analysis to initially determine the approximate location of an oncoming vehicle, such as to the user's left, right, or rear. For example, having determined based on audio data that a vehicle may be approaching from the rear of the user, the AEFS may preferentially process image data from a rear-facing camera to further refine a threat analysis. As another example, the AEFS may incorporate information about the condition of a roadway (e.g., icy or wet) when determining whether a vehicle will be able to stop or maneuver in order to avoid an accident.

In some embodiments, an AEFS may utilize threat information received from other sources, including another AEFS. In particular, in some embodiments, vehicles and devices present in a transportation network may share threat information with one another in order to enhance the abilities of users of the transportation network. In this manner, increased processing power and enhanced responsiveness may be obtained from a network of devices operating in concert with one another.

In one embodiment, a first vehicle receives threat information from a remote device. The remote device may be or execute an AEFS, and may have a fixed (e.g., as a road-based device) or mobile (e.g., in another vehicle, worn by a pedestrian) position. The remote device may itself receive or utilize information from other devices, such as sensors (e.g., cameras, microphones, induction loops) or other computing devices that possibly execute another AEFS or some other system for determining threats.

The received threat information is typically based on information about objects or conditions proximate to the remote device. For example, where the remote device is a computing system located at an intersection, the computing system may process data received from various sensors that are deployed at or about the intersection. The information about objects or conditions may be or include image data, audio data, weather data, motion-related information, or the like.

In some embodiments, when a vehicle receives threat information, it determines whether the threat information is relevant to the safe operation of the vehicle. For example, the vehicle may receive threat information from an intersection-based device that is behind (and receding from) the vehicle. This information is likely not relevant to the vehicle, because the vehicle has already passed through the intersection. As another example, the vehicle may receive an indication of an icy road surface from a device that is ahead of the vehicle. This information is likely to be relevant, because the vehicle is approaching the location of the icy surface. Relevance may generally be determined based on various factors, including location, direction of travel, speed (e.g., an icy surface may not be relevant if the vehicle is moving very slowly), operator skill, or the like.

When a vehicle determines that received threat information is relevant, it may modify operation of the vehicle. Modifying vehicle operation may include presenting a message (e.g., a warning, an instruction) to the vehicle operator with regard to the threat. Modifying vehicle operation may also or instead include controlling the vehicle itself, such as by causing the vehicle to accelerate, decelerate, or turn.

A. Ability Enhancement Facilitator System Overview

Figure 33A:
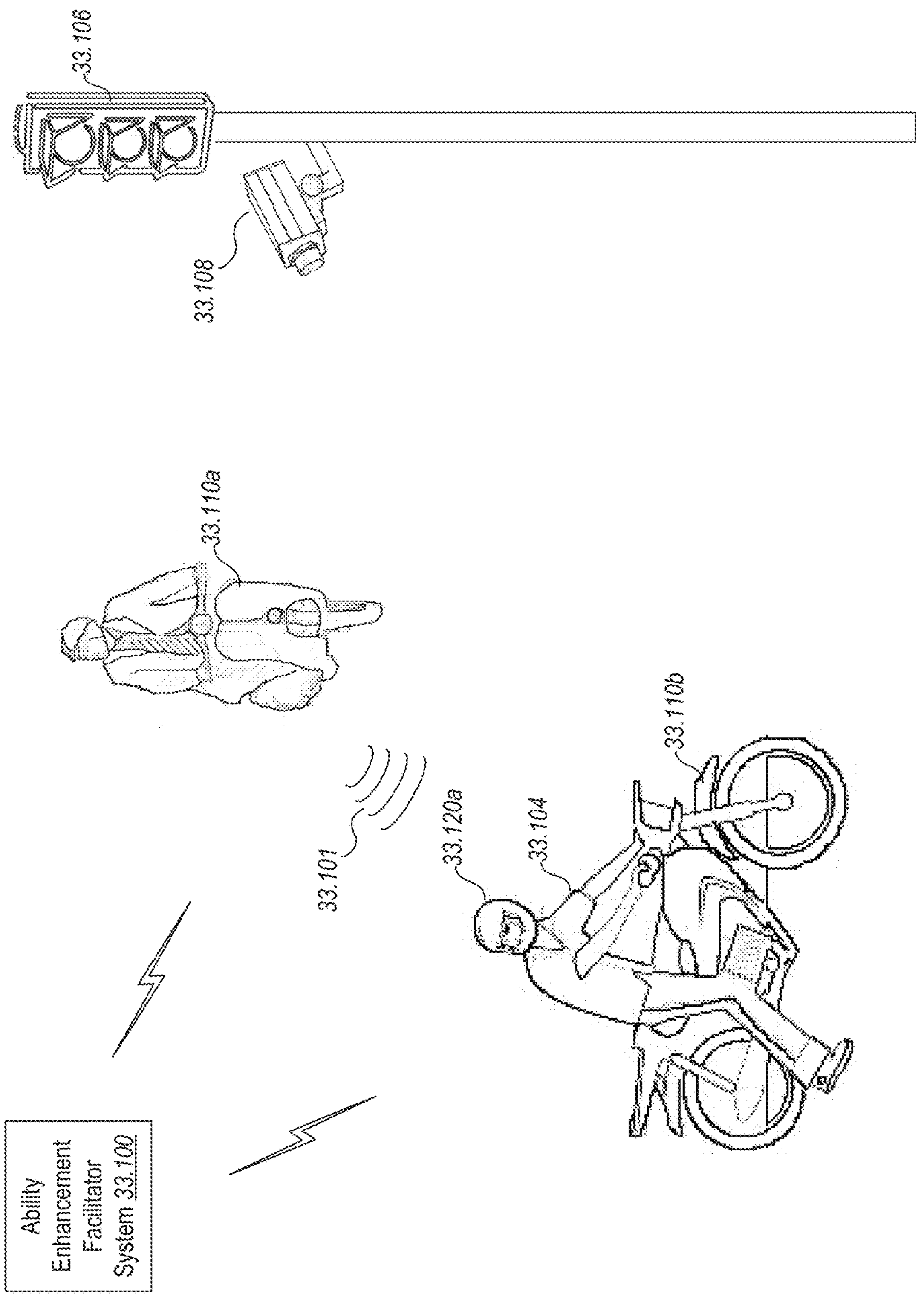
FIGS. 33A and 33B are various views of an example ability enhancement scenario according to an example embodiment.
Figure 33B:
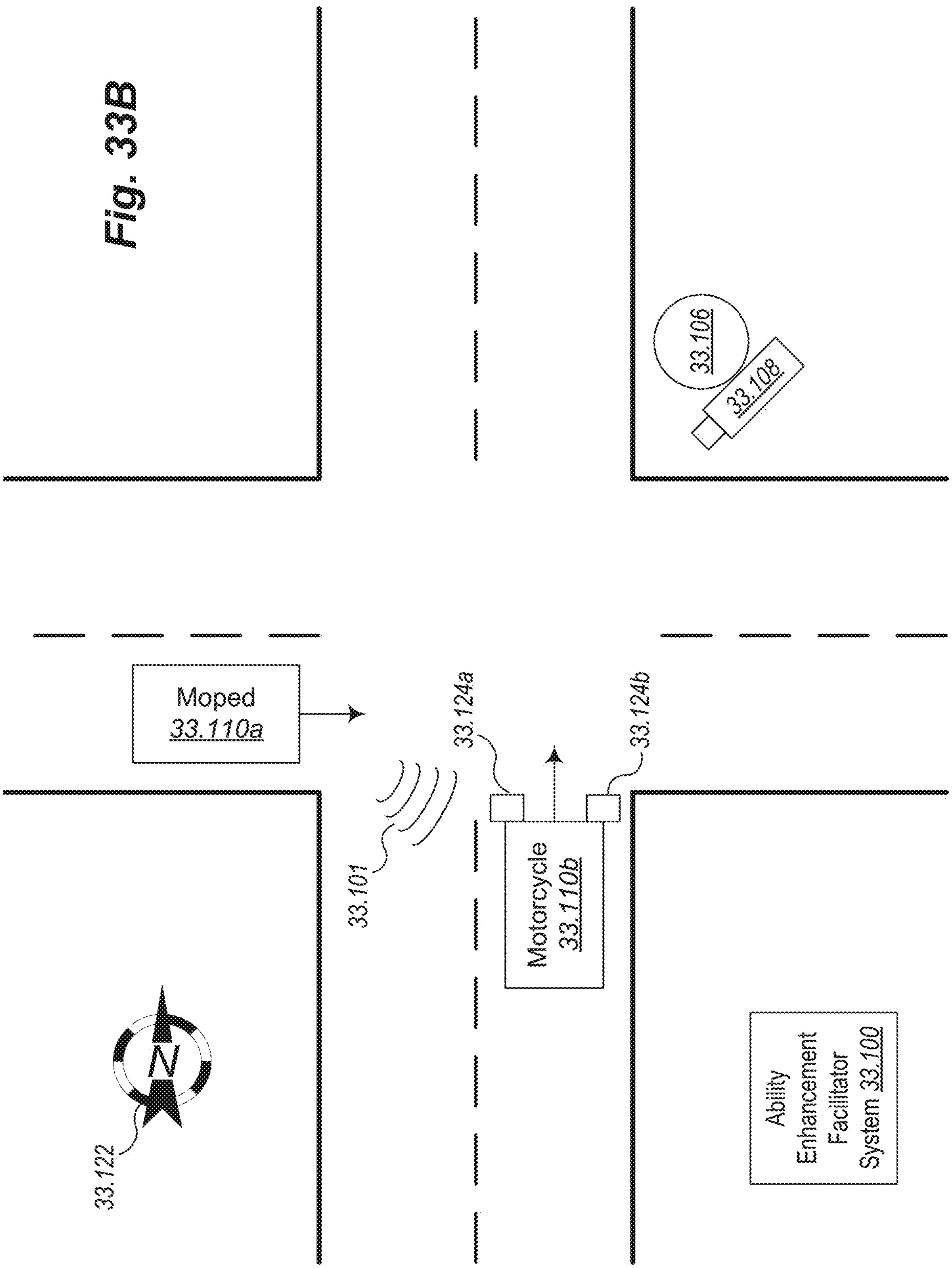

FIGS. 33A and 33B are various views of an example ability enhancement scenario according to an example embodiment. More particularly, FIGS. 33A and 33B respectively are perspective and top views of a traffic scenario which may result in a collision between two vehicles.

FIG. 33A is a perspective view of an example traffic scenario according to an example embodiment. The illustrated scenario includes two vehicles 33.110*a* (a moped) and 33.110*b* (a motorcycle). The motorcycle 33.110*b* is being ridden by a user 33.104 who is wearing a wearable device 33.120*a* (a helmet). An Ability Enhancement Facilitator System ("AEFS") 33.100 is enhancing the ability of the user 33.104 to operate his vehicle 33.110*b* via the wearable device 33.120*a*. The example scenario also includes a traffic signal 33.106 upon which is mounted a camera 33.108.

In this example, the moped 33.110*a* is driving towards the motorcycle 33.110*b* from a side street, at approximately a right angle with respect to the path of travel of the motorcycle 33.110*b*. The traffic signal 33.106 has just turned from red to green for the motorcycle 33.110*b*, and the user 33.104 is beginning to drive the motorcycle 33.110 into the intersection controlled by the traffic signal 33.106. The user 33.104 is assuming that the moped 33.110*a* will stop, because cross traffic will have a red light. However, in this example, the moped 33.110*a* may not stop in a timely manner, for one or more reasons, such as because the operator of the moped 33.110*a* has not seen the red light, because the moped 33.110*a* is moving at an excessive rate, because the operator of the moped 33.110*a* is impaired, because the surface conditions of the roadway are icy or slick, or the like. As will be discussed further below, the AEFS 33.100 will determine that the moped 33.110*a* and the motorcycle 33.110*b* are likely on a collision course, and inform the user 33.104 of this threat via the helmet 33.120*a*, so that the user may take evasive action to avoid a possible collision with the moped 33.110*a*.

The moped 33.110 emits or reflects a signal 33.101. In some embodiments, the signal 33.101 is an electromagnetic signal in the visible light spectrum that represents an image of the moped 33.110*a*. Other types of electromagnetic signals may be received and processed, including infrared radiation, radio waves, microwaves, or the like. Other types of signals are contemplated, including audio signals, such as an emitted engine noise, a reflected sonar signal, a vocalization (e.g., shout, scream), etc. The signal 33.101 may be received by a receiving detector/device/sensor, such as a camera or microphone (not shown) on the helmet 33.120*a* and/or the motorcycle 33.110*b*. In some embodiments, a computing and communication device within the helmet 33.120*a* receives and samples the signal 33.101 and transmits the samples or other representation to the AEFS 33.100. In other embodiments, other forms of data may be used to represent the signal 33.101, including frequency coefficients, compressed audio/video, or the like.

The AEFS 33.100 determines vehicular threat information by analyzing the received data that represents the signal 33.101. If the signal 33.101 is a visual signal, then the AEFS 33.100 may employ various image data processing techniques. For example, the AEFS 33.100 may perform object recognition to determine that received image data includes an image of a vehicle, such as the moped 33.110*a*. The AEFS 33.100 may also or instead process received image data to determine motion-related information with respect to the moped 33.110, including position, velocity, acceleration, or the like. The AEFS 33.100 may further identify the presence of other objects, including pedestrians, animals, structures, or the like, that may pose a threat to the user 33.104 or that may be themselves threatened (e.g., by actions of the user 33.104 and/or the moped 33.110*a*). Image processing also may be employed to determine other information, including road conditions (e.g., wet or icy roads), visibility conditions (e.g., glare or darkness), and the like.

If the signal 33.101 is an audio signal, then the AEFS 33.100 may use one or more audio analysis techniques to determine the vehicular threat information. In one embodiment, the AEFS 33.100 performs a Doppler analysis (e.g., by determining whether the frequency of the audio signal is increasing or decreasing) to determine that the object that is emitting the audio signal is approaching (and possibly at what rate) the user 33.104. In some embodiments, the AEFS

33.100 may determine the type of vehicle (e.g., a heavy truck, a passenger vehicle, a motorcycle, a moped) by analyzing the received data to identify an audio signature that is correlated with a particular engine type or size. For example, a lower frequency engine sound may be correlated with a larger vehicle size, and a higher frequency engine sound may be correlated with a smaller vehicle size.

In one embodiment, where the signal 33.101 is an audio signal, the AEFS 33.100 performs acoustic source localization to determine information about the trajectory of the moped 33.110*a*, including one or more of position, direction of travel, speed, acceleration, or the like. Acoustic source localization may include receiving data representing the audio signal 33.101 as measured by two or more microphones. For example, the helmet 33.120*a* may include four microphones (e.g., front, right, rear, and left) that each receive the audio signal 33.101. These microphones may be directional, such that they can be used to provide directional information (e.g., an angle between the helmet and the audio source). Such directional information may then be used by the AEFS 33.100 to triangulate the position of the moped 33.110*a*. As another example, the AEFS 33.100 may measure differences between the arrival time of the audio signal 33.101 at multiple distinct microphones on the helmet 33.120*a* or other location. The difference in arrival time, together with information about the distance between the microphones, can be used by the AEFS 33.100 to determine distances between each of the microphones and the audio source, such as the moped 33.110*a*. Distances between the microphones and the audio source can then be used to determine one or more locations at which the audio source may be located.

Determining vehicular threat information may also or instead include obtaining information such as the position, trajectory, and speed of the user 33.104, such as by receiving data representing such information from sensors, devices, and/or systems on board the motorcycle 33.110*b* and/or the helmet 33.120*a*. Such sources of information may include a speedometer, a geo-location system (e.g., GPS system), an accelerometer, or the like. Once the AEFS 33.100 has determined and/or obtained information such as the position, trajectory, and speed of the moped 33.110*a* and the user 33.104, the AEFS 33.100 may determine whether the moped 33.110*a* and the user 33.104 are likely to collide with one another. For example, the AEFS 33.100 may model the expected trajectories of the moped 33.110*a* and user 33.104 to determine whether they intersect at or about the same point in time.

The AEFS 33.100 may then present the determined vehicular threat information (e.g., that the moped 33.110*a* represents a hazard) to the user 33.104 via the helmet 33.120*a*. Presenting the vehicular threat information may include transmitting the information to the helmet 33.120*a*, where it is received and presented to the user. In one embodiment, the helmet 33.120*a* includes audio speakers that may be used to output an audio signal (e.g., an alarm or voice message) warning the user 33.104. In other embodiments, the helmet 33.120*a* includes a visual display, such as a heads-up display presented upon a face screen of the helmet 33.120*a*, which can be used to present a text message (e.g., "Look left") or an icon (e.g., a red arrow pointing left).

As noted, the AEFS 33.100 may also use information received from road-based sensors and/or devices. For example, the AEFS 33.100 may use information received from a camera 33.108 that is mounted on the traffic signal 33.106 that controls the illustrated intersection. The AEFS 33.100 may receive image data that represents the moped 33.110*a* and/or the motorcycle 33.110*b*. The AEFS 33.100 may perform image recognition to determine the type and/or position of a vehicle that is approaching the intersection. The AEFS 33.100 may also or instead analyze multiple images (e.g., from a video signal) to determine the velocity of a vehicle. Other types of sensors or devices installed in or about a roadway may also or instead by used, including range sensors, speed sensors (e.g., radar guns), induction coils (e.g., loops mounted in the roadbed), temperature sensors, weather gauges, or the like.

FIG. 33B is a top view of the traffic scenario described with respect to FIG. 33A, above. FIG. 33B includes a legend 33.122 that indicates the compass directions. In this example, moped 33.110*a* is traveling eastbound and is about to enter the intersection. Motorcycle 33.110*b* is traveling northbound and is also about to enter the intersection. Also shown are the signal 33.101, the traffic signal 33.106, and the camera 33.108.

As noted above, the AEFS 33.100 may utilize data that represents a signal as detected by one or more detectors/sensors, such as microphones or cameras. In the example of FIG. 33B, the motorcycle 33.110*b* includes two sensors 33.124*a* and 33.124*b*, respectively mounted at the front left and front right of the motorcycle 33.110*b*.

In an image context, the AEFS 33.100 may perform image processing on image data obtained from one or more of the camera sensors 33.124*a* and 33.124*b*. As discussed, the image data may be processed to determine the presence of the moped, its type, its motion-related information (e.g., velocity), and the like. In some embodiments, image data may be processed without making any definite identification of a vehicle. For example, the AEFS 33.100 may process image data from sensors 33.124*a* and 33.124*b* to identify the presence of motion (without necessarily identifying any objects). Based on such an analysis, the AEFS 33.100 may determine that there is something approaching from the left of the motorcycle 33.110*b*, but that the right of the motorcycle 33.110*b* is relatively clear.

Differences between data obtained from multiple sensors may be exploited in various ways. In an image context, an image signal may be perceived or captured differently by the two (camera) sensors 33.124*a* and 33.124*b*. The AEFS 33.100 may exploit or otherwise analyze such differences to determine the location and/or motion of the moped 33.110*a*. For example, knowing the relative position and optical qualities of the two cameras, it is possible to analyze images captured by those cameras to triangulate a position of an object (e.g., the moped 33.110*a*) or a distance between the motorcycle 33.110*b* and the object.

In an audio context, an audio signal may be perceived differently by the two sensors 33.124*a* and 33.124*b*. For example, if the strength of the signal 33.101 is stronger as measured at microphone 33.124*a* than at microphone 33.124*b*, the AEFS 33.100 may infer that the signal 33.101 is originating from the driver's left of the motorcycle 33.110*b*, and thus that a vehicle is approaching from that direction. As another example, as the strength of an audio signal is known to decay with distance, and assuming an initial level (e.g., based on an average signal level of a vehicle engine) the AEFS 33.100 may determine a distance (or distance interval) between one or more of the microphones and the signal source.

The AEFS 33.100 may model vehicles and other objects, such as by representing their motion-related information, including position, speed, acceleration, mass and other properties. Such a model may then be used to determine whether objects are likely to collide. Note that the model may be probabilistic. For example the AEFS 33.100 may represent an object's position in space as a region that includes multiple positions that each have a corresponding likelihood that that the object is at that position. As another example, the AEFS 33.100 may represent the velocity of an object as a range of likely values, a probability distribution, or the like. Various frames of reference may be employed, including a user-centric frame, an absolute frame, or the like.

Figure 33C:
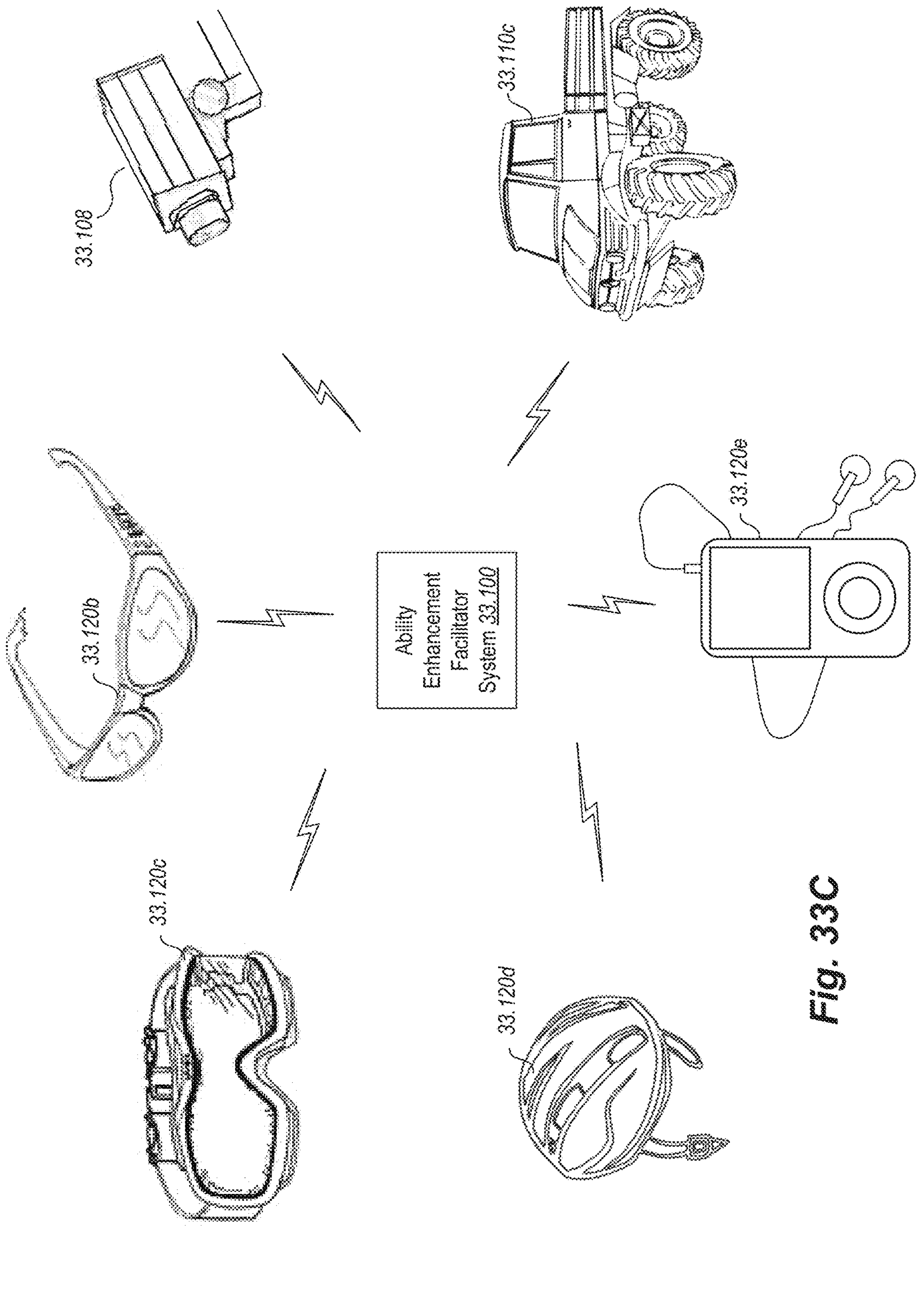
FIG. 33C is an example block diagram illustrating various devices in communication with an ability enhancement facilitator system according to example embodiments.

FIG. 33C is an example block diagram illustrating various devices in communication with an ability enhancement facilitator system according to example embodiments. In particular, FIG. 33C illustrates an AEFS 33.100 in communication with a variety of wearable devices 33.120*b*-33.120*e*, a camera 33.108, and a vehicle 33.110*c*.

The AEFS 33.100 may interact with various types of wearable devices 33.120, including a motorcycle helmet 33.120*a* (FIG. 33A), eyeglasses 33.120*b*, goggles 33.120*c*, a bicycle helmet 33.120*d*, a personal media device 33.120*e*, or the like. Wearable devices 33.120 may include any device modified to have sufficient computing and communication capability to interact with the AEFS 33.100, such as by presenting vehicular threat information received from the AEFS 33.100, providing data (e.g., audio data) for analysis to the AEFS 33.100, or the like.

In some embodiments, a wearable device may perform some or all of the functions of the AEFS 33.100, even though the AEFS 33.100 is depicted as separate in these examples. Some devices may have minimal processing power and thus perform only some of the functions. For example, the eyeglasses 33.120*b* may receive vehicular threat information from a remote AEFS 33.100, and display it on a heads-up display displayed on the inside of the lenses of the eyeglasses 33.120*b*. Other wearable devices may have sufficient processing power to perform more of the functions of the AEFS 33.100. For example, the personal media device 33.120*e* may have considerable processing power and as such be configured to perform acoustic source localization, collision detection analysis, or other more computational expensive functions.

Note that the wearable devices 33.120 may act in concert with one another or with other entities to perform functions of the AEFS 33.100. For example, the eyeglasses 33.120*b* may include a display mechanism that receives and displays vehicular threat information determined by the personal media device 33.120*e*. As another example, the goggles 33.120*c* may include a display mechanism that receives and displays vehicular threat information determined by a computing device in the helmet 33.120*a* or 33.120*d*. In a further example, one of the wearable devices 33.120 may receive and process audio data received by microphones mounted on the vehicle 33.110*c*.

The AEFS 33.100 may also or instead interact with vehicles 33.110 and/or computing devices installed thereon. As noted, a vehicle 33.110 may have one or more sensors or devices that may operate as (direct or indirect) sources of information for the AEFS 33.100. The vehicle 33.110*c*, for example, may include a speedometer, an accelerometer, one or more microphones, one or more range sensors, or the like. Data obtained by, at, or from such devices of vehicle 33.110*c* may be forwarded to the AEFS 33.100, possibly by a wearable device 33.120 of an operator of the vehicle 33.110*c*.

In some embodiments, the vehicle 33.110*c* may itself have or use an AEFS, and be configured to transmit warnings or other vehicular threat information to others. For example, an AEFS of the vehicle 33.110*c* may have determined that the moped 33.110*a* was driving with excessive speed just prior to the scenario depicted in FIG. 33B. The AEFS of the vehicle 33.110*c* may then share this information, such as with the AEFS 33.100. The AEFS 33.100 may accordingly receive and exploit this information when determining that the moped 33.110*a* poses a threat to the motorcycle 33.110*b*.

The AEFS 33.100 may also or instead interact with sensors and other devices that are installed on, in, or about roads or in other transportation related contexts, such as parking garages, racetracks, or the like. In this example, the AEFS 33.100 interacts with the camera 33.108 to obtain images of vehicles, pedestrians, or other objects present in a roadway. Other types of sensors or devices may include range sensors, infrared sensors, induction coils, radar guns, temperature gauges, precipitation gauges, or the like.

The AEFS 33.100 may further interact with information systems that are not shown in FIG. 33C. For example, the AEFS 33.100 may receive information from traffic information systems that are used to report traffic accidents, road conditions, construction delays, and other information about road conditions. The AEFS 33.100 may receive information from weather systems that provide information about current weather conditions. The AEFS 33.100 may receive and exploit statistical information, such as that drivers in particular regions are more aggressive, that red light violations are more frequent at particular intersections, that drivers are more likely to be intoxicated at particular times of day or year, or the like.

In some embodiments, the AEFS 33.100 may transmit information to law enforcement agencies and/or related computing systems. For example, if the AEFS 33.100 determines that a vehicle is driving erratically, it may transmit that fact along with information about the vehicle (e.g., make, model, color, license plate number, location) to a police computing system.

Note that in some embodiments, at least some of the described techniques may be performed without the utilization of any wearable devices 33.120. For example, a vehicle 33.110 may itself include the necessary computation, input, and output devices to perform functions of the AEFS 33.100. For example, the AEFS 33.100 may present vehicular threat information on output devices of a vehicle 33.110, such as a radio speaker, dashboard warning light, heads-up display, or the like. As another example, a computing device on a vehicle 33.110 may itself determine the vehicular threat information.

Figure 33D:
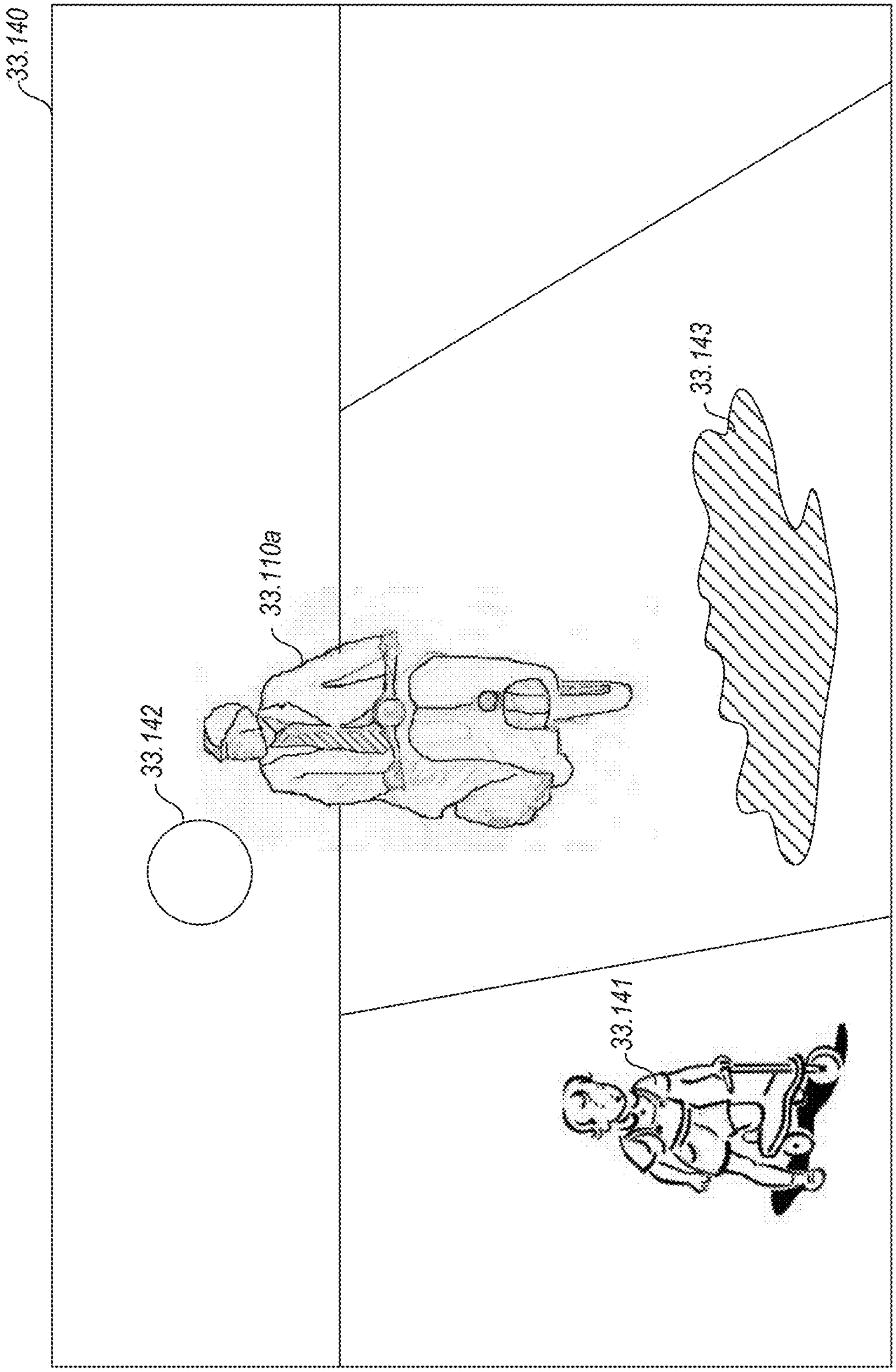
FIG. 33D is an example diagram illustrating an example image processed according to an example embodiment.

FIG. 33D is an example diagram illustrating an example image processed according to an example embodiment. In particular, FIG. 33D depicts an image 33.140 of the moped 33.110*a*. This image may be obtained from a camera (e.g., sensor 33.124*a*) on the left side of the motorcycle 33.110*b* in the scenario of FIG. 33B. The image may also or instead be obtained from camera 33.108 mounted on the traffic signal 33.106, as shown in FIG. 33B. Also visible in the image 33.140 are a child 33.141 on a scooter, the sun 33.142, and a puddle 33.143. The sun 33.142 is setting in the west, and is thus low in the sky, appearing nearly behind the moped 33.110*a*. In such conditions, visibility for the user 33.104 (not shown here) would be quite difficult.

In some embodiments, the AEFS 33.100 processes the image 33.140 to perform object identification. Upon processing the image 33.140, the AEFS 33.100 may identify the moped 33.110*a*, the child 33.141, the sun 33.142, the puddle 33.143, and/or the roadway 33.144. A sequence of images, taken at different times (e.g., one tenth of a second apart) may be used to determine that the moped 33.110*a* is moving, how fast the moped 33.110*a* is moving, acceleration/deceleration of the moped 33.110*a*, or the like. Motion of other objects, such as the child 33.141 may also be tracked. Based on such motion-related information, the AEFS 33.100 may model the physics of the identified objects to determine whether a collision is likely.

Determining vehicular threat information may also or instead be based on factors related or relevant to objects other than the moped 33.110*a* or the user 33.104. For example, the AEFS 33.100 may determine that the puddle 33.143 will likely make it more difficult for the moped 33.110*a* to stop. Thus, even if the moped 33.110*a* is moving at a reasonable speed, he still may be unable to stop prior to entering the intersection due to the presence of the puddle 33.143. As another example, the AEFS 33.100 may determine that evasive action by the user 33.104 and/or the moped 33.110*a* may cause injury to the child 33.141. As a further example, the AEFS 33.100 may determine that it may be difficult for the user 33.104 to see the moped 33.110*a* and/or the child 33.141 due to the position of the sun 33.142. Such information may be incorporated into any models, predictions, or determinations made or maintained by the AEFS 33.100.

Figure 33E:
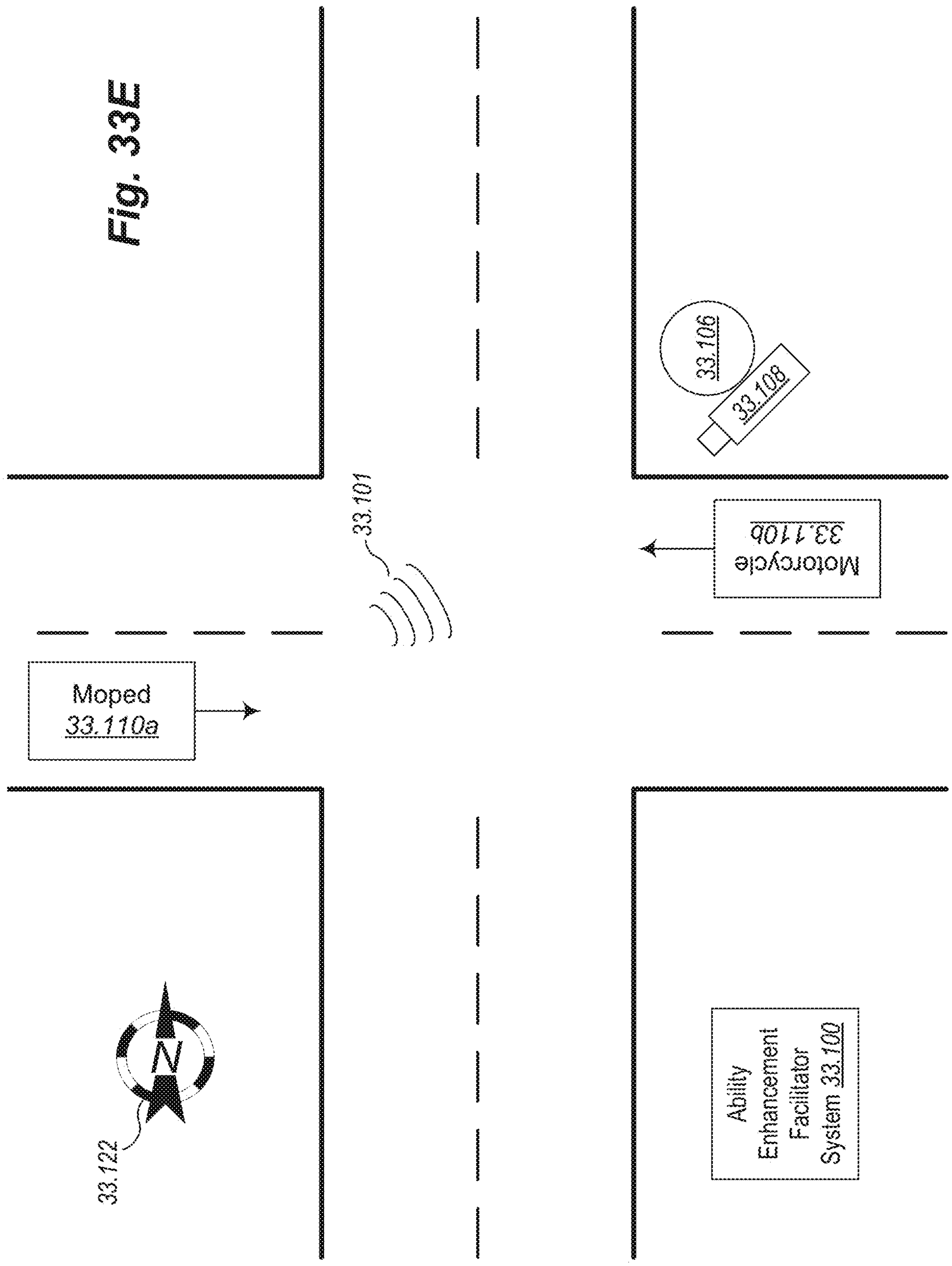
FIG. 33E is a second example ability enhancement scenario according to an example embodiment.

FIG. 33E is a second example ability enhancement scenario according to an example embodiment. In particular, FIG. 33E is a top view of a traffic scenario that is similar to that shown in FIG. 33B. However, in FIG. 33E, rather than approaching each other from right angles (as in FIG. 33B), the moped 33.110*a* and the motorcycle 33.110*b* are heading towards each other, each in their respective lanes. FIG. 33E includes a legend 33.122 that indicates the compass directions. The moped 33.110*a* is east bound, and the motorcycle 33.110*b* is west bound. The driver of the motorcycle 33.110*b* wishes to turn left, across the path of the oncoming moped 33.110*a*.

The scenario of FIG. 33E may commonly result in an accident. Such is the case particularly during signal changes, because it is difficult for the driver of the motorcycle 33.110*b* to determine whether the moped 33.110*a* is slowing down (e.g., to stop for a yellow light) or speeding up (e.g., to beat the yellow light). In addition, visibility conditions may make it more difficult for the driver of the motorcycle 33.110*b* to determine the speed of the moped 33.110*a*. For example, if the sun is setting behind the moped 33.110*a*, then the driver of the motorcycle 33.110*b* may not even have a clear view of the moped 33.110*a*. Also, surface conditions may make it difficult for the moped 33.110*a* to stop if the driver of the motorcycle 33.110*b* does decide to make the left turn ahead of the moped 33.110*a*. For example, a wet or oily road surface may increase the braking distance of the moped 33.110*a*.

In this example, the AEFS 33.100 determines that the driver of the motorcycle 33.110*b* intends to make a left turn. This determination may be based on the fact that the motorcycle 33.110*b* is slowing down or has activated its turn signals. In some embodiments, when the driver activates a turn signal, an indication of the activation is transmitted to the AEFS 33.100. The AEFS 33.100 then receives information (e.g., image data) about the moped 33.110*a* from the camera 33.108 and possibly one or more other sources (e.g., a camera, microphone, or other device on the motorcycle 33.110*b*; a device on the moped 33.110*a*; a road-embedded device). By analyzing the image data, the AEFS 33.100 can estimate the motion-related information (e.g., position, speed, acceleration) about the moped 33.110*a*. Based on this motion-related information, the AEFS 33.100 can determine threat information such as whether the moped 33.110*a* is slowing to stop or instead attempting to speed through the intersection. The AEFS 33.100 can then inform the user of the determined threat information, as discussed further with respect to FIG. 33F, below.

Figure 33F:
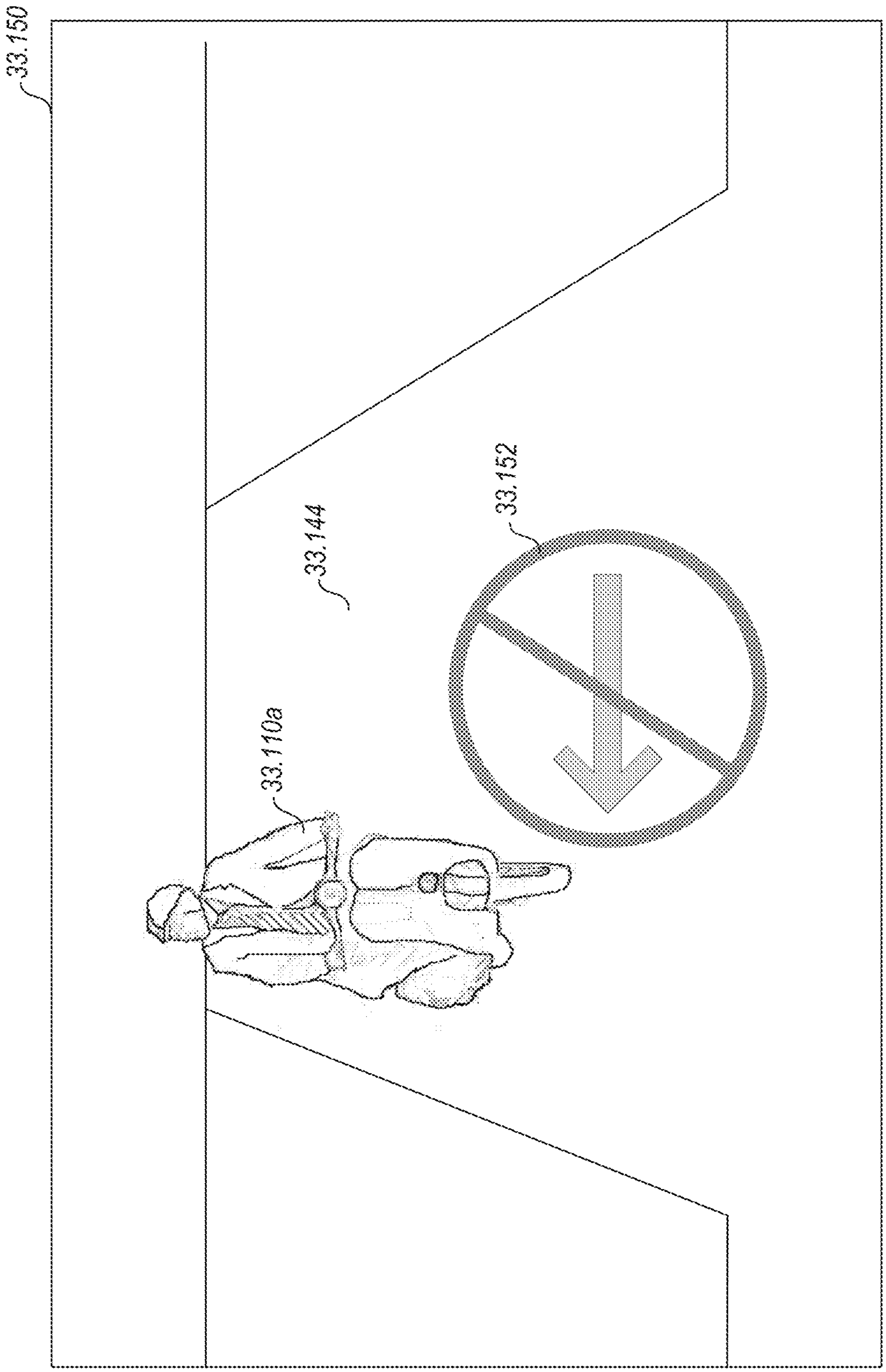
FIG. 33F is an example diagram illustrating an example user interface display according to an example embodiment.

FIG. 33F is an example diagram illustrating an example user interface display according to an example embodiment. FIG. 33F depicts a display 33.150 that includes a message 33.152. Also visible in the display 33.150 is the moped 33.110*a* and its driver, as well as the roadway 33.144.

The display 33.150 may be used by embodiments of the AEFS to present threat information to users. For example, as discussed with respect to the scenario of FIG. 33E, the AEFS may determine that the moped 33.110*a* is advancing too quickly for the motorcycle 33.110*b* to safely make a left turn. In response to this determination, the AEFS may present the message 33.152 on the display 33.150 in order to instruct the motorcycle 33.110*b* driver to avoid making a left turn in advance of the oncoming moped 33.110*a*. In this example, the message 33.152 is iconic and includes a left turn arrow surrounded by a circle with a line through it. Other types of messages and/or output modalities are contemplated, including textual (e.g., "No Turn"), audible (e.g., a chime, buzzer, alarm, or voice message), tactile (e.g., vibration of a steering wheel), or the like. The message 33.152 may be styled or decorated in various ways, including by use of colors, intermittence (e.g., flashing), size, or the like.

The display 33.150 may be provided in various ways. In one embodiment, the display 33.150 is presented by a heads-up display provided by a vehicle, such as the motorcycle 33.110*b*, a car, truck, or the like, where the display is presented on the wind screen or other surface. In another embodiment, the display 33.150 may be presented by a heads-up display provided by a wearable device, such as goggles or a helmet, where the display 33.150 is presented on a face or eye shield. In another embodiment, the display 33.150 may be presented by an LCD or similar screen in a dashboard or other portion of a vehicle.

Figure 34:
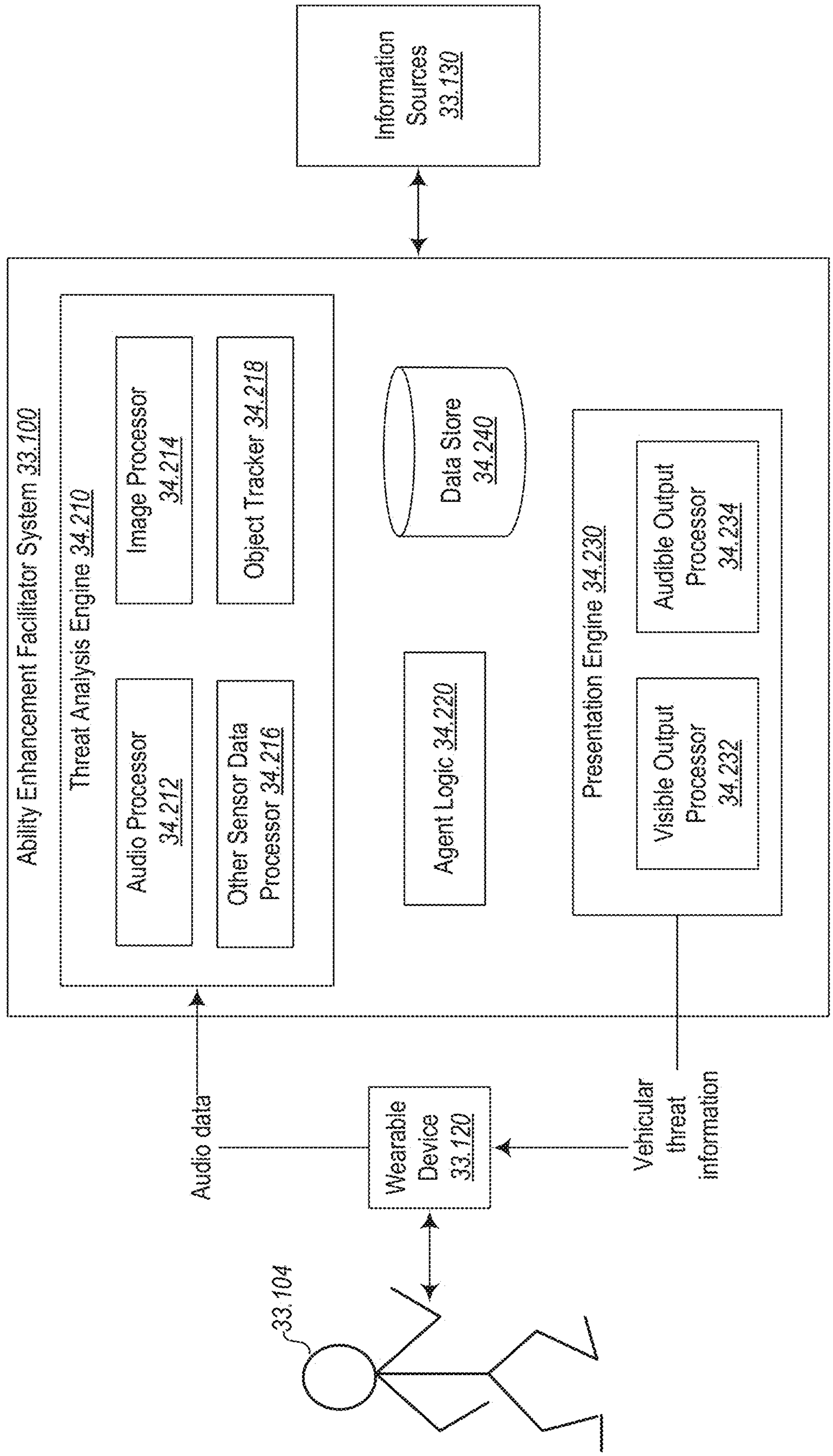
FIG. 34 is an example functional block diagram of an example ability enhancement facilitator system according to an example embodiment.

FIG. 34 is an example functional block diagram of an example ability enhancement facilitator system according to an example embodiment. In the illustrated embodiment of FIG. 34, the AEFS 33.100 includes a threat analysis engine 34.210, agent logic 34.220, a presentation engine 34.230, and a data store 34.240. The AEFS 33.100 is shown interacting with a presentation device 34.250 and information sources 33.130. The presentation device 34.250 may be part of a wearable device 33.120, part of a vehicle (e.g., a dashboard display, audio speaker, tactile feedback system), part of a road sign, or the like. The presentation device 34.250 is configured to provide one or more types of output, including visible, audible, tactile, or the like. The information sources 33.130 include any sensors, devices, systems, or the like that provide information to the AEFS 33.100, including but not limited to vehicle-based devices (e.g., speedometers), in-situ devices (e.g., road-side cameras), and information systems (e.g., traffic systems).

The threat analysis engine 34.210 includes an audio processor 34.212, an image processor 34.214, other sensor data processors 34.216, and an object tracker 34.218. In one example, the audio processor 34.212 processes audio data received from a wearable device 33.120. As noted, such data may be received from other sources as well or instead, including directly from a vehicle-mounted microphone, or the like. The audio processor 34.212 may perform various types of signal processing, including audio level analysis, frequency analysis, acoustic source localization, or the like. Based on such signal processing, the audio processor 34.212 may determine strength, direction of audio signals, audio source distance, audio source type, or the like. Outputs of the audio processor 34.212 (e.g., that an object is approaching from a particular angle) may be provided to the object tracker 34.218 and/or stored in the data store 34.240.

The image processor 34.214 receives and processes image data that may be received from sources such as a wearable device 33.120 and/or information sources 33.130. For example, the image processor 34.214 may receive image data from a camera of a wearable device 33.120, and perform object recognition to determine the type and/or position of a vehicle that is approaching the user 33.104. As another example, the image processor 34.214 may receive a video signal (e.g., a sequence or stream of images) and process them to determine the type, position, and/or velocity of a vehicle that is approaching the user 33.104. Multiple images may be processed to determine the presence or absence of motion, even if no object recognition is performed. Outputs of the image processor 34.214 (e.g., position and velocity information, vehicle type information) may be provided to the object tracker 34.218 and/or stored in the data store 34.240.

The other sensor data processor 34.216 receives and processes data received from other sensors or sources. For example, the other sensor data processor 34.216 may receive and/or determine information about the position and/or movements of the user and/or one or more vehicles, such as based on GPS systems, speedometers, accelerometers, or other devices. As another example, the other sensor data processor 34.216 may receive and process conditions information (e.g., temperature, precipitation) from the information sources 33.130 and determine that road conditions are currently icy. Outputs of the other sensor data processor 34.216 (e.g., that the user is moving at 5 miles per hour) may be provided to the object tracker 34.218 and/or stored in the data store 34.240.

The object tracker 34.218 manages a geospatial object model that includes information about objects known to the AEFS 33.100. The object tracker 34.218 receives and merges information about object types, positions, velocity, acceleration, direction of travel, and the like, from one or more of the processors 34.212, 34.214, 34.216, and/or other sources. Based on such information, the object tracker 34.218 may identify the presence of objects as well as their likely positions, paths, and the like. The object tracker 34.218 may continually update this model as new information becomes available and/or as time passes (e.g., by plotting a likely current position of an object based on its last measured position and trajectory). The object tracker 34.218 may also maintain confidence levels corresponding to elements of the geo-spatial model, such as a likelihood that a vehicle is at a particular position or moving at a particular velocity, that a particular object is a vehicle and not a pedestrian, or the like.

The agent logic 34.220 implements the core intelligence of the AEFS 33.100. The agent logic 34.220 may include a reasoning engine (e.g., a rules engine, decision trees, Bayesian inference engine) that combines information from multiple sources to determine vehicular threat information. For example, the agent logic 34.220 may combine information from the object tracker 34.218, such as that there is a determined likelihood of a collision at an intersection, with information from one of the information sources 33.130, such as that the intersection is the scene of common red-light violations, and decide that the likelihood of a collision is high enough to transmit a warning to the user 33.104. As another example, the agent logic 34.220 may, in the face of multiple distinct threats to the user, determine which threat is the most significant and cause the user to avoid the more significant threat, such as by not directing the user 33.104 to slam on the brakes when a bicycle is approaching from the side but a truck is approaching from the rear, because being rear-ended by the truck would have more serious consequences than being hit from the side by the bicycle.

The presentation engine 34.230 includes a visible output processor 34.232 and an audible output processor 34.234. The visible output processor 34.232 may prepare, format, and/or cause information to be displayed on a display device, such as a display of the presentation device 34.250 (e.g., a heads-up display of a vehicle 33.110 being driven by the user 33.104), a wearable device 33.120, or some other display. The agent logic 34.220 may use or invoke the visible output processor 34.232 to prepare and display information, such as by formatting or otherwise modifying vehicular threat information to fit on a particular type or size of display. The audible output processor 34.234 may include or use other components for generating audible output, such as tones, sounds, voices, or the like. In some embodiments, the agent logic 34.220 may use or invoke the audible output processor 34.234 in order to convert a textual message (e.g., a warning message, a threat identification) into audio output suitable for presentation via the presentation device 34.250, for example by employing a text-to-speech processor.

Note that one or more of the illustrated components/modules may not be present in some embodiments. For example, in embodiments that do not perform image or video processing, the AEFS 33.100 may not include an image processor 34.214. As another example, in embodiments that do not perform audio output, the AEFS 33.100 may not include an audible output processor 34.234.

Note also that the AEFS 33.100 may act in service of multiple users 33.104. In some embodiments, the AEFS 33.100 may determine vehicular threat information concurrently for multiple distinct users. Such embodiments may further facilitate the sharing of vehicular threat information. For example, vehicular threat information determined as between two vehicles may be relevant and thus shared with a third vehicle that is in proximity to the other two vehicles.

B. Example Processes

FIGS. 35.1-35.93 are example flow diagrams of ability enhancement processes performed by example embodiments.

FIG. 35.1 is an example flow diagram of example logic for enhancing ability in a transportation-related context. The illustrated logic in this and the following flow diagrams may be performed by, for example, one or more components of the AEFS 33.100 described with respect to FIG. 34, above. In general, one or more functions of the AEFS 33.100 may be performed at various locations, including at a wearable device, in a vehicle of a user, in some other vehicle, in a road-based computing system, a cloud-based computing system, or the like. In the illustrated example, at least some operations are performed at a vehicle, so that operation of the vehicle may be modified based on threat information received at the vehicle. More particularly, FIG. 35.1 illustrates a process 35.100 that includes operations performed by or at the following block(s).

At block 35.101, the process performs at a first vehicle, receiving threat information from a remote device, the threat information based at least in part on information about objects and/or conditions proximate to the remote device. In some embodiments, threat information determined by other devices or systems is received at the first vehicle. For example, the first vehicle may receive threat information from a road-based device that has determined that some other vehicle is driving erratically. As another example, the first vehicle may receive threat information from some other vehicle that has detected icy conditions on the roadway. The remote device may be any fixed device (e.g., at or about the roadway) or mobile device (e.g., located in another vehicle, on another person) that is capable of providing threat information to the process.

At block 35.102, the process performs determining that the threat information is relevant to safe operation of the first vehicle. The process may determine that the received threat information is relevant in various ways. For example, the process may determine whether the first vehicle is heading towards a location associated with the threat information (e.g., an upcoming intersection), and if so, present the threat information to the driver of the first vehicle.

At block 35.103, the process performs modifying operation of the first vehicle based on the threat information. Modifying the operation of the first vehicle may include presenting a message based on the threat information to the driver or other occupant of the first vehicle. Modifying the operation may also or instead include modifying controls (e.g., accelerator, brakes, steering wheel, lights) of the first vehicle.

FIG. 35.2 is an example flow diagram of example logic illustrating an example embodiment of process 35.100 of FIG. 35.1. More particularly, FIG. 35.2 illustrates a process 35.200 that includes the process 35.100, wherein the receiving threat information includes operations performed by or at one or more of the following block(s).

At block 35.201, the process performs receiving threat information determined based on information about driving conditions proximate to the remote device. Information about driving conditions may include or be based on weather information (e.g., snow, rain, ice, temperature), time information (e.g., night or day), lighting information (e.g., a light sensor indicating glare from the setting sun), or the like.

FIG. 35.3 is an example flow diagram of example logic illustrating an example embodiment of process 35.200 of FIG. 35.2. More particularly, FIG. 35.3 illustrates a process 35.300 that includes the process 35.200, wherein the information about driving conditions indicates that icy surface conditions are present proximate to the remote device. Icy surface conditions may be detected directly or inferred, such as based upon ambient temperature, humidity/precipitation, and the like.

FIG. 35.4 is an example flow diagram of example logic illustrating an example embodiment of process 35.200 of FIG. 35.2. More particularly, FIG. 35.4 illustrates a process 35.400 that includes the process 35.200, wherein the information about driving conditions indicates that wet surface conditions are present proximate to the remote device. Wet surface conditions may be detected directly or inferred, such as based on reports of precipitation received from a weather system.

FIG. 35.5 is an example flow diagram of example logic illustrating an example embodiment of process 35.200 of FIG. 35.2. More particularly, FIG. 35.5 illustrates a process 35.500 that includes the process 35.200, wherein the information about driving conditions indicates that oily surface conditions are present proximate to the remote device.

FIG. 35.6 is an example flow diagram of example logic illustrating an example embodiment of process 35.200 of FIG. 35.2. More particularly, FIG. 35.6 illustrates a process 35.600 that includes the process 35.200, wherein the information about driving conditions indicates that a limited visibility condition is present proximate to the remote device. Limited visibility may be due to the time of day (e.g., at dusk, dawn, or night), weather (e.g., fog, rain), or the like.

FIG. 35.7 is an example flow diagram of example logic illustrating an example embodiment of process 35.200 of FIG. 35.2. More particularly, FIG. 35.7 illustrates a process 35.700 that includes the process 35.200, wherein the information about driving conditions indicates that there is an accident proximate to the remote device. The presence of an accident may be determined based on information received from vehicle devices (e.g., accelerometers) that are configured to detect accidents, such as based on sudden deceleration.

FIG. 35.8 is an example flow diagram of example logic illustrating an example embodiment of process 35.100 of FIG. 35.1. More particularly, FIG. 35.8 illustrates a process 35.800 that includes the process 35.100, wherein the receiving threat information includes operations performed by or at one or more of the following block(s).

At block 35.801, the process performs receiving threat information determined based on information about a second vehicle proximate to the remote device. The information about the second vehicle may be or indicate unusual or out of the ordinary conditions with respect to the second vehicle, such as that the second vehicle is driving erratically, with excessive speed, or the like. The information about the second vehicle may be motion-related information (e.g., velocity, trajectory) or higher-order information, such as a determination that the second vehicle is driving erratically.

FIG. 35.9 is an example flow diagram of example logic illustrating an example embodiment of process 35.800 of FIG. 35.8. More particularly, FIG. 35.9 illustrates a process 35.900 that includes the process 35.800, wherein the information about a second vehicle indicates that the second vehicle is driving erratically. Erratic driving may be based on observations such as that the second vehicle is not staying within traffic lanes, is driving too slowly/quickly as compared to surrounding traffic, is not maintaining a uniform speed, or the like.

FIG. 35.10 is an example flow diagram of example logic illustrating an example embodiment of process 35.800 of FIG. 35.8. More particularly, FIG. 35.10 illustrates a process 35.1000 that includes the process 35.800, wherein the information about a second vehicle indicates that the second vehicle is driving with excessive speed. Excessive speed may be determined relatively, such as with respect to the average traffic speed on a road segment, posted speed limit, or the like. For example, a vehicle may be determined to be driving with excessive speed if the vehicle is driving more than 20% over a historical average speed for the road segment. Other thresholds (e.g., 10% over, 25% over) and/or baselines (e.g., average observed speed at a particular time of day) are contemplated. As another example, a vehicle may be determined to be driving with excessive speed if the vehicle is driving more than one standard deviation over the historical average speed. Other baselines may be employed, including average speed for a particular time of day, average speed measured over a time window (e.g., 5 or 10 minutes) preceding the current time, or the like. Similar techniques may be employed to determine if a vehicle is traveling too slowly.

FIG. 35.11 is an example flow diagram of example logic illustrating an example embodiment of process 35.800 of FIG. 35.8. More particularly, FIG. 35.11 illustrates a process 35.1100 that includes the process 35.800, wherein the information about a second vehicle indicates that the second vehicle is driving too slowly. Similar techniques to those discussed with respect to determining excessive speed, above, may be employed to determine whether a vehicle is driving too slowly.

FIG. 35.12 is an example flow diagram of example logic illustrating an example embodiment of process 35.100 of FIG. 35.1. More particularly, FIG. 35.12 illustrates a process 35.1200 that includes the process 35.100, wherein the receiving threat information includes operations performed by or at one or more of the following block(s).

At block 35.1201, the process performs receiving threat information determined based on information about a pedestrian proximate to the remote device. The information about the pedestrian may be or be based on an image of the pedestrian, an audio signal received from the pedestrian, an infrared heat signal of the pedestrian, location information received from a mobile device of the pedestrian, or the like.

FIG. 35.13 is an example flow diagram of example logic illustrating an example embodiment of process 35.1200 of FIG. 35.12. More particularly, FIG. 35.13 illustrates a process 35.1300 that includes the process 35.1200, wherein the information about a pedestrian indicates that a pedestrian is present in a roadway proximate to the remote device. Image processing techniques may be employed to determine whether a given image shows a pedestrian in a roadway. In another embodiment, the pedestrian may have a mobile device that transmits location information, which may be used to determine that the pedestrian is present in the roadway.

FIG. 35.14 is an example flow diagram of example logic illustrating an example embodiment of process 35.100 of FIG. 35.1. More particularly, FIG. 35.14 illustrates a process 35.1400 that includes the process 35.100, wherein the receiving threat information includes operations performed by or at one or more of the following block(s).

At block 35.1401, the process performs receiving threat information determined based on information about an object in a roadway proximate to the remote device. Other objects, including animals, refuse, tree limbs, parked vehicles, or the like may be considered.

FIG. 35.15 is an example flow diagram of example logic illustrating an example embodiment of process 35.100 of FIG. 35.1. More particularly, FIG. 35.15 illustrates a process 35.1500 that includes the process 35.100, wherein the receiving threat information includes operations performed by or at one or more of the following block(s).

At block 35.1501, the process performs receiving threat information determined at a second vehicle with respect to information about objects and/or conditions received at the second vehicle. In some embodiments, the threat information is determined by a second vehicle, such as by an AEFS or similar system that is present in the second vehicle (e.g., on a mobile device of an occupant or installed in the vehicle). In this manner, efforts made by other systems to determine threat information may be shared with this process, as well as possibly other systems, devices, or processes.

FIG. 35.16 is an example flow diagram of example logic illustrating an example embodiment of process 35.1500 of FIG. 35.15. More particularly, FIG. 35.16 illustrates a process 35.1600 that includes the process 35.1500, wherein the receiving threat information determined at a second vehicle includes operations performed by or at one or more of the following block(s).

At block 35.1601, the process performs receiving threat information determined by a wearable device of an occupant of the second vehicle. In some embodiments, the occupant of the second vehicle has a wearable device that executes an AEFS or similar system to determine the threat information. This threat information is then transmitted to, and received by, the process.

FIG. 35.17 is an example flow diagram of example logic illustrating an example embodiment of process 35.1500 of FIG. 35.15. More particularly, FIG. 35.17 illustrates a process 35.1700 that includes the process 35.1500, wherein the receiving threat information determined at a second vehicle includes operations performed by or at one or more of the following block(s).

At block 35.1701, the process performs receiving threat information determined by a computing device installed in the second vehicle. In some embodiments, the second vehicle includes a computing device that executes an AEFS or similar system to determine the threat information. This threat information is then transmitted to, and received by, the process.

FIG. 35.18 is an example flow diagram of example logic illustrating an example embodiment of process 35.1500 of FIG. 35.15. More particularly, FIG. 35.18 illustrates a process 35.1800 that includes the process 35.1500, wherein the receiving threat information determined at a second vehicle includes operations performed by or at one or more of the following block(s).

At block 35.1801, the process performs receiving motion-related information from a sensor attached to the second vehicle. The motion-related information may include information about the mechanics (e.g., position, velocity, acceleration, mass) of the second vehicle. Various types of sensors are contemplated, including speedometers, GPS receivers, accelerometers, and the like.

FIG. 35.19 is an example flow diagram of example logic illustrating an example embodiment of process 35.1800 of FIG. 35.18. More particularly, FIG. 35.19 illustrates a process 35.1900 that includes the process 35.1800, wherein the receiving motion-related information includes operations performed by or at one or more of the following block(s).

At block 35.1901, the process performs receiving position information from a position sensor of the second vehicle. In some embodiments, a GPS receiver, dead reckoning, or some combination thereof may be used to track the position of the first vehicle as it moves down the roadway.

FIG. 35.20 is an example flow diagram of example logic illustrating an example embodiment of process 35.1800 of FIG. 35.18. More particularly, FIG. 35.20 illustrates a process 35.2000 that includes the process 35.1800, wherein the receiving motion-related information includes operations performed by or at one or more of the following block(s).

At block 35.2001, the process performs receiving velocity information from a velocity sensor of the second vehicle. In some embodiments, a GPS receiver, a speedometer or other device is employed to determine the velocity of the second vehicle.

FIG. 35.21 is an example flow diagram of example logic illustrating an example embodiment of process 35.100 of FIG. 35.1. More particularly, FIG. 35.21 illustrates a process 35.2100 that includes the process 35.100, wherein the receiving threat information includes operations performed by or at one or more of the following block(s).

At block 35.2101, the process performs receiving threat information determined by a road-based device with respect to information about objects and/or conditions received at the road-based device. In some embodiments, the threat information is determined by a road-based device, such as a sensor or computing device. For example a computing device located at an intersection may determine threat information about vehicles and other objects entering into the intersection. This threat information may be shared with vehicles in the vicinity of the intersection, including the first vehicle. In this manner, efforts made by other systems to determine threat information may be shared with this process, as well as possibly other systems, devices, or processes.

FIG. 35.22 is an example flow diagram of example logic illustrating an example embodiment of process 35.2100 of FIG. 35.21. More particularly, FIG. 35.22 illustrates a process 35.2200 that includes the process 35.2100, wherein the receiving threat information determined by a road-based device includes operations performed by or at one or more of the following block(s).

At block 35.2201, the process performs receiving threat information determined by a road-based computing device configured to receive the information about objects and/or conditions from vehicles proximate to the road-based computing device. The road-based device may be a computing device that executes an AEFS or similar system, and that shares determined threat information with the process, as well as other systems in the vicinity of the road-based device. The road-based device may receive information from vehicles, such as motion-related information that can be employed to track and/or predict the motion of those vehicles. The road-based device may be place at or about locations that are frequent accident sites, such as intersections, blind corners, or the like.

FIG. 35.23 is an example flow diagram of example logic illustrating an example embodiment of process 35.2100 of FIG. 35.21. More particularly, FIG. 35.23 illustrates a process 35.2300 that includes the process 35.2100, wherein the receiving threat information determined by a road-based device includes operations performed by or at one or more of the following block(s).

At block 35.2301, the process performs receiving threat information determined by a road-based computing device configured to receive the information about objects and/or conditions from road-based sensors. The road-based computing device may receive information from road-based sensors, such as items attached to structures or embedded in the roadway, including cameras, ranging devices, speed sensors, or the like.

FIG. 35.24 is an example flow diagram of example logic illustrating an example embodiment of process 35.2100 of FIG. 35.21. More particularly, FIG. 35.24 illustrates a process 35.2400 that includes the process 35.2100, wherein the road-based device is a sensor attached to a structure proximate to the first vehicle. In some embodiments, the road-based device is attached to a building, utility pole, or some other fixed structure.

FIG. 35.25 is an example flow diagram of example logic illustrating an example embodiment of process 35.2400 of FIG. 35.24. More particularly, FIG. 35.25 illustrates a process 35.2500 that includes the process 35.2400, wherein the structure proximate to the first vehicle is one of a utility pole, a traffic control signal support, a building, a street light, a tunnel wall, a bridge, an overpass, a flyover, a communication tower, a traffic kiosk, an advertisement structure, a roadside sign, an information/regulatory display, and/or a vehicle toll reader.

FIG. 35.26 is an example flow diagram of example logic illustrating an example embodiment of process 35.2400 of FIG. 35.24. More particularly, FIG. 35.26 illustrates a process 35.2600 that includes the process 35.2400, wherein the receiving threat information determined by a road-based device includes operations performed by or at one or more of the following block(s).

At block 35.2601, the process performs receiving an image of a second vehicle from a camera deployed at an intersection. For example, the process may receive images of a second vehicle from a camera that is fixed to a traffic light or other signal at an intersection near the first vehicle.

FIG. 35.27 is an example flow diagram of example logic illustrating an example embodiment of process 35.2400 of FIG. 35.24. More particularly, FIG. 35.27 illustrates a process 35.2700 that includes the process 35.2400, wherein the receiving threat information determined by a road-based device includes operations performed by or at one or more of the following block(s).

At block 35.2701, the process performs receiving ranging data from a range sensor deployed at an intersection, the ranging data representing a distance between a second vehicle and the intersection. For example, the process may receive a distance (e.g., 75 meters) measured between some known point in the intersection (e.g., the position of the range sensor) and an oncoming vehicle.

FIG. 35.28 is an example flow diagram of example logic illustrating an example embodiment of process 35.2400 of FIG. 35.24. More particularly, FIG. 35.28 illustrates a process 35.2800 that includes the process 35.2400, wherein the road-based device includes a camera. The camera may provide images of the vehicles and other objects or conditions, which may be analyzed to determine the threat information, as discussed herein.

FIG. 35.29 is an example flow diagram of example logic illustrating an example embodiment of process 35.2400 of FIG. 35.24. More particularly, FIG. 35.29 illustrates a process 35.2900 that includes the process 35.2400, wherein the road-based device includes a microphone. The microphone may provide audio information that may be used to perform acoustic source localization, as discussed herein.

FIG. 35.30 is an example flow diagram of example logic illustrating an example embodiment of process 35.2400 of FIG. 35.24. More particularly, FIG. 35.30 illustrates a process 35.3000 that includes the process 35.2400, wherein the road-based device includes a radar gun. The radar gun may provide distance and/or velocity information to the process.

FIG. 35.31 is an example flow diagram of example logic illustrating an example embodiment of process 35.2400 of FIG. 35.24. More particularly, FIG. 35.31 illustrates a process 35.3100 that includes the process 35.2400, wherein the road-based device includes a range sensor. Various types of range sensors are contemplated, including laser-based, sonar-based, infrared, and the like.

FIG. 35.32 is an example flow diagram of example logic illustrating an example embodiment of process 35.2400 of FIG. 35.24. More particularly, FIG. 35.32 illustrates a process 35.3200 that includes the process 35.2400, wherein the road-based device includes a receiver operable to receive motion-related information transmitted from a second vehicle, the motion-related information including at least one of a position of the second vehicle, a velocity of the second vehicle, and/or a trajectory of the second vehicle. In some embodiments, vehicles and/or other entities (e.g., pedestrians) traveling the roadway broadcast or otherwise transmit motion-related information, such as information about position and/or speed of a vehicle. The process may receive such information and use it to model the trajectories of various objects in the roadway to determine whether collisions are likely to occur.

FIG. 35.33 is an example flow diagram of example logic illustrating an example embodiment of process 35.2100 of FIG. 35.21. More particularly, FIG. 35.33 illustrates a process 35.3300 that includes the process 35.2100, wherein the road-based device is embedded in a roadway. The road-based device may be embedded, buried, or located beneath the surface of the roadway.

FIG. 35.34 is an example flow diagram of example logic illustrating an example embodiment of process 35.3300 of FIG. 35.33. More particularly, FIG. 35.34 illustrates a process 35.3400 that includes the process 35.3300, wherein the road-based device includes an induction loop embedded in the roadway, the induction loop configured to detect the presence and/or velocity of a second vehicle. An induction loop detects the presence of a vehicle by generating an electrical current as the vehicle passes over the loop.

FIG. 35.35 is an example flow diagram of example logic illustrating an example embodiment of process 35.3400 of FIG. 35.34. More particularly, FIG. 35.35 illustrates a process 35.3500 that includes the process 35.3400, wherein the receiving threat information determined by a road-based device includes operations performed by or at one or more of the following block(s).

At block 35.3501, the process performs receiving motion-related information from the induction loop, the motion-related information including at least one of a position of the second vehicle, a velocity of the second vehicle, and/or a trajectory of the second vehicle. As noted, induction loops may be embedded in the roadway and configured to detect the presence of vehicles passing over them. Some types of loops and/or processing may be employed to detect other information, including velocity, vehicle size, and the like. Multiple induction loops may be configured to work in concert to measure, for example, vehicle velocity.

FIG. 35.36 is an example flow diagram of example logic illustrating an example embodiment of process 35.100 of FIG. 35.1. More particularly, FIG. 35.36 illustrates a process 35.3600 that includes the process 35.100, wherein the determining that the threat information is relevant to safe operation of the first vehicle includes operations performed by or at one or more of the following block(s).

At block 35.3601, the process performs determining a location associated with the remote device. In some embodiments, determining the threat information may be based on the relative locations of the first vehicle and the remote device. In general, the closer the first vehicle is to the remote device, the more likely that the threat information provided by that remote device is relevant to the first vehicle. For example, threat information provided by a device being approached by the first vehicle is likely to be more relevant than threat information provided by a device that is behind the first vehicle. The location may be expressed as a point or a region (e.g., a polygon, circle).

At block 35.3602, the process performs determining whether the first vehicle is approaching the location. The process may use information about the current position and direction of travel of the first vehicle (e.g., provided by a GPS receiver) and the location of the remote device.

FIG. 35.37 is an example flow diagram of example logic illustrating an example embodiment of process 35.3600 of FIG. 35.36. More particularly, FIG. 35.37 illustrates a process 35.3700 that includes the process 35.3600, wherein the location associated with the remote device includes the location of a road-based device. As noted, various types of road-based devices may be used, including computing devices, cameras, range sensors, induction loops, and the like.

FIG. 35.38 is an example flow diagram of example logic illustrating an example embodiment of process 35.3600 of FIG. 35.36. More particularly, FIG. 35.38 illustrates a process 35.3800 that includes the process 35.3600, wherein the location associated with the remote device includes a location of a second vehicle that includes the remote device. For example, the location may be a current or past location of a second vehicle that includes the remote device (e.g., speed sensor, range sensor).

FIG. 35.39 is an example flow diagram of example logic illustrating an example embodiment of process 35.3600 of FIG. 35.36. More particularly, FIG. 35.39 illustrates a process 35.3900 that includes the process 35.3600, wherein the determining whether the first vehicle is approaching the location includes operations performed by or at one or more of the following block(s).

At block 35.3901, the process performs determining whether the first vehicle is within a threshold distance from the location associated with the remote device. The process may determine whether the distance between the first vehicle and the device location is less than a threshold number. The threshold number may be a fixed number (e.g., 10, 20, 50, 100 meters) or be based on various factors including vehicle speeds, surface conditions, driver skill level, and the like. For example, a higher threshold number may be used if the surface conditions are icy and thus require a greater stopping distance.

FIG. 35.40 is an example flow diagram of example logic illustrating an example embodiment of process 35.3600 of FIG. 35.36. More particularly, FIG. 35.40 illustrates a process 35.4000 that includes the process 35.3600, wherein the determining whether the first vehicle is approaching the location includes operations performed by or at one or more of the following block(s).

At block 35.4001, the process performs determining whether the first vehicle is moving on trajectory that intersects the location associated with the remote device. The process may determine that the threat information is relevant if the first vehicle is moving on a trajectory that intersects (or nearly intersects) the location. In this manner, threat information about locations that are behind or to the side of the vehicle may be ignored or filtered out.

FIG. 35.41 is an example flow diagram of example logic illustrating an example embodiment of process 35.100 of FIG. 35.1. More particularly, FIG. 35.41 illustrates a process 35.4100 that includes the process 35.100, wherein the determining that the threat information is relevant to safe operation of the first vehicle includes operations performed by or at one or more of the following block(s).

At block 35.4101, the process performs determining a threat to the first vehicle based on the threat information. The process may determine that the threat represented by the threat information is also a threat to the first vehicle. For example, if the threat information identifies an erratic vehicle, that erratic vehicle may also pose a threat to the first vehicle. Alternatively, the process may determine a distinct threat to the first vehicle based on a threat represented by the threat information. For example, the threat information may indicate that the setting sun is causing a visibility problem for a second vehicle that happens to be approaching the first vehicle. From this, the process may infer that the second vehicle poses a threat (because the driver cannot see) to the first vehicle, even though the setting sun does not in and of itself pose a direct problem or threat for the first vehicle.

At block 35.4102, the process performs determining a likelihood associated with the threat. In some embodiments, probabilities may be associated with threats, based on various factors, such as levels of uncertainty associated with measurements or other data used by the process, aggregate risk levels (e.g., number of accidents per year in a given intersection), or the like.

At block 35.4103, the process performs determining that the likelihood is greater than a threshold level. The process may determine that threat information is relevant when the likelihood is above a particular threshold. The threshold may be fixed (e.g., 10%, 20%) or based on various factors including vehicle speeds, surface conditions, driver skill level, and the like.

FIG. 35.42 is an example flow diagram of example logic illustrating an example embodiment of process 35.4100 of FIG. 35.41. More particularly, FIG. 35.42 illustrates a process 35.4200 that includes the process 35.4100, wherein the determining a threat to the first vehicle based on the threat information includes operations performed by or at one or more of the following block(s).

At block 35.4201, the process performs predicting a path of an object identified by the threat information. The process may model the path of the object by using motion-related information obtained about or provided by the object. The path may include a vector that represents velocity and direction of travel. The path may also represent at-rest, non-moving objects.

At block 35.4202, the process performs predicting a path of the first vehicle. Similarly, the process may model the path of the first vehicle based on motion-related information.

At block 35.4203, the process performs determining, based on the paths of the object and the first vehicle, whether the first vehicle and the object will come within a threshold distance of one another. A threshold distance may be used to detect situations in which even though there is no collision, the first vehicle and the object pass uncomfortably close to one another (e.g., a "near miss"). Different thresholds are contemplated, including 0, 10 cm, 25 cm, and 1 m.

FIG. 35.43 is an example flow diagram of example logic illustrating an example embodiment of process 35.4100 of FIG. 35.41. More particularly, FIG. 35.43 illustrates a process 35.4300 that includes the process 35.4100, wherein the determining a likelihood associated with the threat includes operations performed by or at one or more of the following block(s).

At block 35.4301, the process performs determining a likelihood that the first vehicle will collide with a second vehicle identified by the threat information. In some cases, the object identified by the threat information may be a second vehicle, and the process may determine a likelihood of collision, based on current positions and trajectories of the two vehicles, uncertainty about the data used to determine the trajectories, and/or other factors.

FIG. 35.44 is an example flow diagram of example logic illustrating an example embodiment of process 35.4100 of FIG. 35.41. More particularly, FIG. 35.44 illustrates a process 35.4400 that includes the process 35.4100, wherein the determining a likelihood associated with the threat includes operations performed by or at one or more of the following block(s).

At block 35.4401, the process performs determining a likelihood that the first vehicle will collide with a pedestrian identified by the threat information. In some cases, the object identified by the threat information may be a pedestrian, and the process may determine a likelihood of collision between the first vehicle and the pedestrian, based on current positions and trajectories, uncertainty about the data used to determine the trajectories, and/or other factors.

FIG. 35.45 is an example flow diagram of example logic illustrating an example embodiment of process 35.4100 of FIG. 35.41. More particularly, FIG. 35.45 illustrates a process 35.4500 that includes the process 35.4100, wherein the determining a likelihood associated with the threat includes operations performed by or at one or more of the following block(s).

At block 35.4501, the process performs determining a likelihood that the first vehicle will collide with an animal identified by the threat information.

FIG. 35.46 is an example flow diagram of example logic illustrating an example embodiment of process 35.4100 of FIG. 35.41. More particularly, FIG. 35.46 illustrates a process 35.4600 that includes the process 35.4100, wherein the determining a likelihood associated with the threat includes operations performed by or at one or more of the following block(s).

At block 35.4601, the process performs determining a likelihood that surface conditions identified by the threat information will cause an operator to lose control of the first vehicle. In some cases, the threat information will identify hazard surface conditions, such as ice. The process may determine a likelihood that the operator of the first vehicle will not be able to control the vehicle in the presence of such surface conditions. Such a likelihood may be based on various factors, such as whether the vehicle is presently turning (and thus more likely to spin out in the presence of ice), whether the vehicle is braking, or the like. The likelihood may also be based on the specific type of surface condition, with icy conditions resulting in higher likelihoods than wet conditions, for example.

FIG. 35.47 is an example flow diagram of example logic illustrating an example embodiment of process 35.100 of FIG. 35.1. More particularly, FIG. 35.47 illustrates a process 35.4700 that includes the process 35.100, wherein the determining that the threat information is relevant to safe operation of the first vehicle includes operations performed by or at one or more of the following block(s).

At block 35.4701, the process performs determining that the threat information is relevant based on gaze information associated with an operator of the first vehicle. In some embodiments, the process may consider the direction in which the vehicle operator is looking when determining that the threat information is relevant. For example, the threat information may depend on whether the operator is or is not looking in the direction of a threat (e.g., another vehicle) identified by the threat information, as discussed further below.

FIG. 35.48 is an example flow diagram of example logic illustrating an example embodiment of process 35.4700 of FIG. 35.47. More particularly, FIG. 35.48 illustrates a process 35.4800 that includes the process 35.4700, and which further includes operations performed by or at the following block(s).

At block 35.4801, the process performs determining that the operator has not looked at the road for more than a threshold amount of time. In some cases, the process may consider whether the operator has taken his eyes off the road, such as to adjust the car radio, attend to a mobile phone, or the like.

FIG. 35.49 is an example flow diagram of example logic illustrating an example embodiment of process 35.4700 of FIG. 35.47. More particularly, FIG. 35.49 illustrates a process 35.4900 that includes the process 35.4700, and which further includes operations performed by or at the following block(s).

At block 35.4901, the process performs receiving an indication of a direction in which the operator is looking. In some embodiments, an orientation sensor such as a gyroscope or accelerometer may be employed to determine the orientation of the operator's head, face, eyes, or other body part. In some embodiments, a camera or other image sensing device may track the orientation of the operator's eyes.

At block 35.4902, the process performs determining that the operator is not looking towards an approaching second vehicle. As noted, received threat information (or a tracking system of employed by the process) may indicate the position of a second vehicle. Given this information, coupled with information about the direction of the operator's gaze, the process may determine whether or not the operator is (or likely is) looking in the direction of the second vehicle.

At block 35.4903, the process performs in response to determining that the operator is not looking towards the second vehicle, directing the operator to look towards the second vehicle. When it is determined that the operator is not looking at the second vehicle, the process may warn or otherwise direct the operator to look in that direction, such as by saying or otherwise presenting "Look right!", "Car on your left," or similar message.

FIG. 35.50 is an example flow diagram of example logic illustrating an example embodiment of process 35.100 of FIG. 35.1. More particularly, FIG. 35.50 illustrates a process 35.5000 that includes the process 35.100, wherein the modifying operation of the first vehicle includes operations performed by or at one or more of the following block(s).

At block 35.5001, the process performs presenting a message based on the threat information to an operator of the first vehicle. The process may present (e.g., display an image, play audio) a message, such as a warning or instruction that is based on the threat information. For example, if the threat information identifies icy surface conditions, the message may instruct or recommend that the operator slow down.

FIG. 35.51 is an example flow diagram of example logic illustrating an example embodiment of process 35.5000 of FIG. 35.50. More particularly, FIG. 35.51 illustrates a process 35.5100 that includes the process 35.5000, wherein the presenting a message based on the threat information to an operator of the first vehicle includes operations performed by or at one or more of the following block(s).

At block 35.5101, the process performs presenting a warning to the operator.

FIG. 35.52 is an example flow diagram of example logic illustrating an example embodiment of process 35.5000 of FIG. 35.50. More particularly, FIG. 35.52 illustrates a process 35.5200 that includes the process 35.5000, wherein the presenting a message based on the threat information to an operator of the first vehicle includes operations performed by or at one or more of the following block(s).

At block 35.5201, the process performs presenting an instruction to the operator.

FIG. 35.53 is an example flow diagram of example logic illustrating an example embodiment of process 35.5000 of FIG. 35.50. More particularly, FIG. 35.53 illustrates a process 35.5300 that includes the process 35.5000, wherein the presenting a message based on the threat information to an operator of the first vehicle includes operations performed by or at one or more of the following block(s).

At block 35.5301, the process performs directing the operator to accelerate or decelerate.

FIG. 35.54 is an example flow diagram of example logic illustrating an example embodiment of process 35.5000 of FIG. 35.50. More particularly, FIG. 35.54 illustrates a process 35.5400 that includes the process 35.5000, wherein the presenting a message based on the threat information to an operator of the first vehicle includes operations performed by or at one or more of the following block(s).

At block 35.5401, the process performs directing the operator to turn or not to turn. In some embodiments, the process may provide "turn assistance," by helping drivers better understand when it is appropriate to make a turn across one or more lanes of oncoming traffic. In such an embodiment, the process tracks vehicles as they approach an intersection to determine whether a vehicle waiting to turn across oncoming lanes of traffic has sufficient time, distance, or clearance to cross the lanes without colliding with the approaching vehicles.

FIG. 35.55 is an example flow diagram of example logic illustrating an example embodiment of process 35.5000 of FIG. 35.50. More particularly, FIG. 35.55 illustrates a process 35.5500 that includes the process 35.5000, wherein the presenting a message based on the threat information to an operator of the first vehicle includes operations performed by or at one or more of the following block(s).

At block 35.5501, the process performs presenting the message via an audio output device. The process may play an alarm, bell, chime, voice message, or the like that warns or otherwise informs the user of the threat information. The wearable device may include audio speakers operable to output audio signals, including as part of a set of earphones, earbuds, a headset, a helmet, or the like.

FIG. 35.56 is an example flow diagram of example logic illustrating an example embodiment of process 35.5500 of FIG. 35.55. More particularly, FIG. 35.56 illustrates a process 35.5600 that includes the process 35.5500, wherein the audio output device is a speaker of a wearable device of the operator.

FIG. 35.57 is an example flow diagram of example logic illustrating an example embodiment of process 35.5500 of FIG. 35.55. More particularly, FIG. 35.57 illustrates a process 35.5700 that includes the process 35.5500, wherein the audio output device is a speaker of an audio system of the first vehicle.

FIG. 35.58 is an example flow diagram of example logic illustrating an example embodiment of process 35.5500 of FIG. 35.55. More particularly, FIG. 35.58 illustrates a process 35.5800 that includes the process 35.5500, wherein the audio output device is a speaker of a mobile computing device present within the first vehicle. For example, there may be a tablet computer or smart phone resting on the seat or other location within the first vehicle.

FIG. 35.59 is an example flow diagram of example logic illustrating an example embodiment of process 35.5000 of FIG. 35.50. More particularly, FIG. 35.59 illustrates a process 35.5900 that includes the process 35.5000, wherein the presenting a message based on the threat information to an operator of the first vehicle includes operations performed by or at one or more of the following block(s).

At block 35.5901, the process performs presenting the message via a visual display device. In some embodiments, the wearable device includes a display screen or other mechanism for presenting visual information. For example, when the wearable device is a helmet, a face shield of the helmet may be used as a type of heads-up display for presenting the threat information.

FIG. 35.60 is an example flow diagram of example logic illustrating an example embodiment of process 35.5900 of FIG. 35.59. More particularly, FIG. 35.60 illustrates a process 35.6000 that includes the process 35.5900, wherein the visual display device is a display of a wearable device of the operator.

FIG. 35.61 is an example flow diagram of example logic illustrating an example embodiment of process 35.5900 of FIG. 35.59. More particularly, FIG. 35.61 illustrates a process 35.6100 that includes the process 35.5900, wherein the visual display device is a display of the first vehicle. The vehicle may include a heads-up display, a dashboard display, warning lights, or the like.

FIG. 35.62 is an example flow diagram of example logic illustrating an example embodiment of process 35.5900 of FIG. 35.59. More particularly, FIG. 35.62 illustrates a process 35.6200 that includes the process 35.5900, wherein the presenting a message based on the threat information to an operator of the first vehicle includes operations performed by or at one or more of the following block(s).

At block 35.6201, the process performs displaying an indicator that instructs the operator to look towards an oncoming vehicle identified by the threat information. The displayed indicator may be textual (e.g., "Look right!"), iconic (e.g., an arrow), or the like.

FIG. 35.63 is an example flow diagram of example logic illustrating an example embodiment of process 35.5900 of FIG. 35.59. More particularly, FIG. 35.63 illustrates a process 35.6300 that includes the process 35.5900, wherein the presenting a message based on the threat information to an operator of the first vehicle includes operations performed by or at one or more of the following block(s).

At block 35.6301, the process performs displaying an indicator that instructs the operator to accelerate, decelerate, and/or turn. An example indicator may be or include the text "Speed up," "slow down," "turn left," or similar language.

FIG. 35.64 is an example flow diagram of example logic illustrating an example embodiment of process 35.5000 of FIG. 35.50. More particularly, FIG. 35.64 illustrates a process 35.6400 that includes the process 35.5000, wherein the presenting a message based on the threat information to an operator of the first vehicle includes operations performed by or at one or more of the following block(s).

At block 35.6401, the process performs providing tactile feedback to the user. Tactile feedback may include temperature or positional changes of an object (e.g., steering wheel, seat, pedal) within the first vehicle.

FIG. 35.65 is an example flow diagram of example logic illustrating an example embodiment of process 35.6400 of FIG. 35.64. More particularly, FIG. 35.65 illustrates a process 35.6500 that includes the process 35.6400, wherein the providing tactile feedback to the user includes operations performed by or at one or more of the following block(s).

At block 35.6501, the process performs causing a steering device, seat, and/or pedal of the first vehicle to vibrate.

FIG. 35.66 is an example flow diagram of example logic illustrating an example embodiment of process 35.100 of FIG. 35.1. More particularly, FIG. 35.66 illustrates a process 35.6600 that includes the process 35.100, wherein the modifying operation of the first vehicle includes operations performed by or at one or more of the following block(s).

At block 35.6601, the process performs controlling the first vehicle. In some embodiments, the process may directly modify the operation of the first vehicle by controlling it in some manner, such as by changing the steering, braking, accelerating, or the like.

FIG. 35.67 is an example flow diagram of example logic illustrating an example embodiment of process 35.6600 of FIG. 35.66. More particularly, FIG. 35.67 illustrates a process 35.6700 that includes the process 35.6600, wherein the controlling the first vehicle includes operations performed by or at one or more of the following block(s).

At block 35.6701, the process performs decreasing speed of the first vehicle by applying brakes of the first vehicle and/or by reducing output of an engine of the first vehicle. The process may slow the vehicle by one or more of braking or reducing engine output.

FIG. 35.68 is an example flow diagram of example logic illustrating an example embodiment of process 35.6600 of FIG. 35.66. More particularly, FIG. 35.68 illustrates a process 35.6800 that includes the process 35.6600, wherein the controlling the first vehicle includes operations performed by or at one or more of the following block(s).

At block 35.6801, the process performs increasing speed of the first vehicle by releasing brakes of the first vehicle and/or by increasing output of an engine of the first vehicle. The process may speed up the vehicle by one or more of releasing the brakes or increasing engine output.

FIG. 35.69 is an example flow diagram of example logic illustrating an example embodiment of process 35.6600 of FIG. 35.66. More particularly, FIG. 35.69 illustrates a process 35.6900 that includes the process 35.6600, wherein the controlling the first vehicle includes operations performed by or at one or more of the following block(s).

At block 35.6901, the process performs changing direction of the first vehicle. The process may change direction of the vehicle by modifying the angle of the wheels of the vehicle.

FIG. 35.70 is an example flow diagram of example logic illustrating an example embodiment of process 35.100 of FIG. 35.1. More particularly, FIG. 35.70 illustrates a process 35.7000 that includes the process 35.100, wherein the receiving threat information includes operations performed by or at one or more of the following block(s).

At block 35.7001, the process performs receiving threat information determined based on image data. The process may receive threat information that is based on image data. Image data may be used for performing image processing to identify vehicles or other hazards, to determine whether collisions may occur, determine motion-related information about the first vehicle (and possibly other entities), and the like. The image data may be obtained from various sources, including from a camera attached to a wearable device, a vehicle, a road-side structure, or the like.

FIG. 35.71 is an example flow diagram of example logic illustrating an example embodiment of process 35.7000 of FIG. 35.70. More particularly, FIG. 35.71 illustrates a process 35.7100 that includes the process 35.7000, wherein the receiving threat information determined based on image data includes operations performed by or at one or more of the following block(s).

At block 35.7101, the process performs receiving threat information determined based on image data received from a camera that is attached to at least one of: a road-side structure, a wearable device of a pedestrian, or a second vehicle.

FIG. 35.72 is an example flow diagram of example logic illustrating an example embodiment of process 35.7000 of FIG. 35.70. More particularly, FIG. 35.72 illustrates a process 35.7200 that includes the process 35.7000, wherein the receiving threat information determined based on image data includes operations performed by or at one or more of the following block(s).

At block 35.7201, the process performs receiving threat information determined based on image data that includes multiple images of a second vehicle taken at different times. In some embodiments, the image data comprises video data in compressed or raw form. The video data typically includes (or can be reconstructed or decompressed to derive) multiple sequential images taken at distinct times. Various time intervals between images may be utilized. For example, it may not be necessary to receive video data having a high frame rate (e.g., 30 frames per second or higher), because it may be preferable to determine motion or other properties of the first vehicle based on images that are taken at larger time intervals (e.g., one tenth of a second, one quarter of a second). In some embodiments, transmission bandwidth may be saved by transmitting and receiving reduced frame rate image streams.

FIG. 35.73 is an example flow diagram of example logic illustrating an example embodiment of process 35.7000 of FIG. 35.70. More particularly, FIG. 35.73 illustrates a process 35.7300 that includes the process 35.7000, wherein the receiving threat information determined based on image data includes operations performed by or at one or more of the following block(s).

At block 35.7301, the process performs receiving threat information that includes motion-related information about a second vehicle based on one or more images of the second vehicle, the motion-related information including at least one of a position, velocity, acceleration, and/or mass of the second vehicle. Motion-related information may include information about the mechanics (e.g., kinematics, dynamics) of the second vehicle, including position, velocity, direction of travel, acceleration, mass, or the like. Motion-related information may be determined for vehicles that are at rest. Motion-related information may be determined and expressed with respect to various frames of reference, including the frame of reference of the first/second vehicle, a fixed frame of reference, a global frame of reference, or the like. For example, the position of the second vehicle may be expressed absolutely, such as via a GPS coordinate or similar representation, or relatively, such as with respect to the position of the user (e.g., 20 meters away from the first user). In addition, the position of the second vehicle may be represented as a point or collection of points (e.g., a region, arc, or line). As another example, the velocity of the second vehicle may be expressed in absolute or relative terms (e.g., with respect to the velocity of the first vehicle). The velocity may be expressed or represented as a magnitude (e.g., 10 meters per second), a vector (e.g., having a magnitude and a direction), or the like. In other embodiments, velocity may be expressed with respect to the first vehicle's frame of reference. In such cases, a stationary (e.g., parked) vehicle will appear to be approaching the user if the first vehicle is driving towards the second vehicle. In some embodiments, acceleration of the second vehicle may be determined, for example by determining a rate of change of the velocity of the second vehicle observed over time. Mass of the second vehicle may be determined in various ways, including by identifying the type of the second vehicle (e.g., car, truck, motorcycle), determining the size of the second vehicle based on its appearance in an image, or the like. In some embodiments, the images may include timestamps or other indicators that can be used to determine a time interval between the images. In other cases, the time interval may be known a priori or expressed in other ways, such as in terms of a frame rate associated with an image or video stream.

FIG. 35.74 is an example flow diagram of example logic illustrating an example embodiment of process 35.7000 of FIG. 35.70. More particularly, FIG. 35.74 illustrates a process 35.7400 that includes the process 35.7000, wherein the receiving threat information determined based on image data includes operations performed by or at one or more of the following block(s).

At block 35.7401, the process performs receiving threat information that identifies objects other than vehicles in the image data. Image processing techniques may be employed to identify other objects of interest, including road hazards (e.g., utility poles, ditches, drop-offs), pedestrians, other vehicles, or the like.

FIG. 35.75 is an example flow diagram of example logic illustrating an example embodiment of process 35.7000 of FIG. 35.70. More particularly, FIG. 35.75 illustrates a process 35.7500 that includes the process 35.7000, wherein the receiving threat information determined based on image data includes operations performed by or at one or more of the following block(s).

At block 35.7501, the process performs receiving threat information that includes driving conditions information based on the image data. Image processing techniques may be employed to determine driving conditions, such as surface conditions (e.g., icy, wet), lighting conditions (e.g., glare, darkness), or the like.

FIG. 35.76 is an example flow diagram of example logic illustrating an example embodiment of process 35.100 of FIG. 35.1. More particularly, FIG. 35.76 illustrates a process 35.7600 that includes the process 35.100, wherein the receiving threat information includes operations performed by or at one or more of the following block(s).

At block 35.7601, the process performs receiving threat information determined based on audio data representing an audio signal emitted or reflected by an object. The data representing the audio signal may be raw audio samples, compressed audio data, frequency coefficients, or the like. The data representing the audio signal may represent the sound made by the object, such as from a vehicle engine, a horn, tires, or any other source of sound. The data may also or instead represent audio reflected by an object, such as a sonar ping. The object may be a vehicle, a pedestrian, an animal, a fixed structure, or the like.

FIG. 35.77 is an example flow diagram of example logic illustrating an example embodiment of process 35.7600 of FIG. 35.76. More particularly, FIG. 35.77 illustrates a process 35.7700 that includes the process 35.7600, wherein the receiving threat information determined based on audio data includes operations performed by or at one or more of the following block(s).

At block 35.7701, the process performs receiving threat information determined based on audio data obtained at a microphone array that includes multiple microphones. In some embodiments, a microphone array having two or more microphones is employed to receive audio signals. Differences between the received audio signals may be utilized to perform acoustic source localization or other functions, as discussed further herein.

FIG. 35.78 is an example flow diagram of example logic illustrating an example embodiment of process 35.7700 of FIG. 35.77. More particularly, FIG. 35.78 illustrates a process 35.7800 that includes the process 35.7700, wherein the receiving threat information determined based on audio data obtained at a microphone array includes operations performed by or at one or more of the following block(s).

At block 35.7801, the process performs receiving threat information determined based on audio data obtained at a microphone array, the microphone array coupled to a roadside structure. The array may be fixed to a utility pole, a traffic signal, or the like. In other cases, the microphone array may be situated elsewhere, including on the first vehicle, some other vehicle, a wearable device of a person, or the like.

FIG. 35.79 is an example flow diagram of example logic illustrating an example embodiment of process 35.7600 of FIG. 35.76. More particularly, FIG. 35.79 illustrates a process 35.7900 that includes the process 35.7600, wherein the receiving threat information determined based on audio data includes operations performed by or at one or more of the following block(s).

At block 35.7901, the process performs receiving threat information determined based on acoustic source localization performed to determine a position of the object based on multiple audio signals received via multiple microphones. The position of the object may be determined by analyzing audio signals received via multiple distinct microphones. For example, engine noise of the second vehicle may have different characteristics (e.g., in volume, in time of arrival, in frequency) as received by different microphones. Differences between the audio signals measured at different microphones may be exploited to determine one or more positions (e.g., points, arcs, lines, regions) at which the object may be located. In one approach, at least two microphones are employed. By measuring differences in the arrival time of an audio signal at the two microphones, the position of the object may be determined. The determined position may be a point, a line, an area, or the like. In some embodiments, given information about the distance between the two microphones and the speed of sound, respective distances between each of the two microphones and the object may be determined. Given these two distances (along with the distance between the microphones), the process can solve for the one or more positions at which the second vehicle may be located. In some embodiments, the microphones may be directional, in that they may be used to determine the direction from which the sound is coming. Given such information, triangulation techniques may be employed to determine the position of the object.

FIG. 35.80 is an example flow diagram of example logic illustrating an example embodiment of process 35.100 of FIG. 35.1. More particularly, FIG. 35.80 illustrates a process 35.8000 that includes the process 35.100, and which further includes operations performed by or at the following block(s).

At block 35.8001, the process performs identifying multiple threats to the first vehicle, at least one of which is based on the threat information. The process may in some cases identify multiple potential threats, such as one car approaching the first vehicle from behind and another car approaching the first vehicle from the left.

At block 35.8002, the process performs identifying a first one of the multiple threats that is more significant than at least one other of the multiple threats. The process may rank, order, or otherwise evaluate the relative significance or risk presented by each of the identified threats. For example, the process may determine that a truck approaching from the right is a bigger risk than a bicycle approaching from behind. On the other hand, if the truck is moving very slowly (thus leaving more time for the truck and/or the first vehicle to avoid it) compared to the bicycle, the process may instead determine that the bicycle is the bigger risk.

At block 35.8003, the process performs instructing an operator of the first vehicle to avoid the first one of the multiple threats. Instructing the operator may include outputting a command or suggestion to take (or not take) a particular course of action.

FIG. 35.81 is an example flow diagram of example logic illustrating an example embodiment of process 35.8000 of FIG. 35.80. More particularly, FIG. 35.81 illustrates a process 35.8100 that includes the process 35.8000, wherein the identifying a first one of the multiple threats that is more significant than at least one other of the multiple threats includes operations performed by or at one or more of the following block(s).

At block 35.8101, the process performs selecting the most significant threat from the multiple threats.

FIG. 35.82 is an example flow diagram of example logic illustrating an example embodiment of process 35.8000 of FIG. 35.80. More particularly, FIG. 35.82 illustrates a process 35.8200 that includes the process 35.8000, and which further includes operations performed by or at the following block(s).

At block 35.8201, the process performs modeling multiple potential accidents that each correspond to one of the multiple threats to determine a collision force associated with each accident. In some embodiments, the process models the physics of various objects to determine potential collisions and possibly their severity and/or likelihood. For example, the process may determine an expected force of a collision based on factors such as object mass, velocity, acceleration, deceleration, or the like.

At block 35.8202, the process performs selecting the first threat based at least in part on which of the multiple accidents has the highest collision force. In some embodiments, the process considers the threat having the highest associated collision force when determining most significant threat, because that threat will likely result in the greatest injury to the first vehicle and/or its occupants.

FIG. 35.83 is an example flow diagram of example logic illustrating an example embodiment of process 35.8000 of FIG. 35.80. More particularly, FIG. 35.83 illustrates a process 35.8300 that includes the process 35.8000, and which further includes operations performed by or at the following block(s).

At block 35.8301, the process performs determining a likelihood of an accident associated with each of the multiple threats. In some embodiments, the process associates a likelihood (probability) with each of the multiple threats. Such a probability may be determined with respect to a physical model that represents uncertainty with respect to the mechanics of the various objects that it models.

At block 35.8302, the process performs selecting the first threat based at least in part on which of the multiple threats has the highest associated likelihood. The process may consider the threat having the highest associated likelihood when determining the most significant threat.

FIG. 35.84 is an example flow diagram of example logic illustrating an example embodiment of process 35.8000 of FIG. 35.80. More particularly, FIG. 35.84 illustrates a process 35.8400 that includes the process 35.8000, and which further includes operations performed by or at the following block(s).

At block 35.8401, the process performs determining a mass of an object associated with each of the multiple threats. In some embodiments, the process may consider the mass of threat objects, based on the assumption that those objects having higher mass (e.g., a truck) pose greater threats than those having a low mass (e.g., a pedestrian).

At block 35.8402, the process performs selecting the first threat based at least in part on which of the objects has the highest mass, without reference to velocity or acceleration of the object. Mass may thus be used as a proxy for collision force, particularly when it is difficult to determine other information (e.g., velocity) about objects.

FIG. 35.85 is an example flow diagram of example logic illustrating an example embodiment of process 35.100 of FIG. 35.1. More particularly, FIG. 35.85 illustrates a process 35.8500 that includes the process 35.100, and which further includes operations performed by or at the following block(s).

At block 35.8501, the process performs determining that an evasive action with respect to the threat information poses a threat to some other object. The process may consider whether potential evasive actions pose threats to other objects. For example, the process may analyze whether directing the operator of the first vehicle to turn right (to avoid a collision with a second vehicle) would cause the first vehicle to instead collide with a pedestrian or some fixed object, which may actually result in a worse outcome (e.g., for the operator and/or the pedestrian) than colliding with the second vehicle.

At block 35.8502, the process performs instructing an operator of the first vehicle to take some other evasive action that poses a lesser threat to the some other object. The process may rank or otherwise order evasive actions (e.g., slow down, turn left, turn right) based at least in part on the risks or threats those evasive actions pose to other entities.

FIG. 35.86 is an example flow diagram of example logic illustrating an example embodiment of process 35.100 of FIG. 35.1. More particularly, FIG. 35.86 illustrates a process 35.8600 that includes the process 35.100, and which further includes operations performed by or at the following block(s).

At block 35.8601, the process performs identifying multiple threats that each have an associated likelihood and cost, at least one of which is based on the threat information. In some embodiments, the process may perform a cost-minimization analysis, in which it considers multiple threats, including threats posed to the vehicle operator and to others, and selects a threat that minimizes or reduces expected costs. The process may also consider threats posed by actions taken by the vehicle operator to avoid other threats.

At block 35.8602, the process performs determining a course of action that minimizes an expected cost with respect to the multiple threats. The expected cost of a threat may be expressed as a product of the likelihood of damage associated with the threat and the cost associated with such damage.

FIG. 35.87 is an example flow diagram of example logic illustrating an example embodiment of process 35.8600 of FIG. 35.86. More particularly, FIG. 35.87 illustrates a process 35.8700 that includes the process 35.8600, wherein the cost is based on one or more of a cost of damage to a vehicle, a cost of injury or death of a human, a cost of injury or death of an animal, a cost of damage to a structure, a cost of contents or fixtures within a structure, a cost of emotional distress, and/or cost to a business or person based on negative publicity associated with an accident.

FIG. 35.88 is an example flow diagram of example logic illustrating an example embodiment of process 35.8600 of FIG. 35.86. More particularly, FIG. 35.88 illustrates a process 35.8800 that includes the process 35.8600, wherein the identifying multiple threats includes operations performed by or at one or more of the following block(s).

At block 35.8801, the process performs identifying multiple threats that are each related to different persons or things. In some embodiments, the process considers risks related to multiple distinct entities, possibly including the operator of the first vehicle.

FIG. 35.89 is an example flow diagram of example logic illustrating an example embodiment of process 35.8600 of FIG. 35.86. More particularly, FIG. 35.89 illustrates a process 35.8900 that includes the process 35.8600, wherein the identifying multiple threats includes operations performed by or at one or more of the following block(s).

At block 35.8901, the process performs identifying multiple threats that are each related to the first vehicle and/or an operator thereof. In some embodiments, the process also or only considers risks that are related to the operator of the first vehicle and/or the first vehicle itself.

FIG. 35.90 is an example flow diagram of example logic illustrating an example embodiment of process 35.8600 of FIG. 35.86. More particularly, FIG. 35.90 illustrates a process 35.9000 that includes the process 35.8600, wherein the determining a course of action that minimizes an expected cost includes operations performed by or at one or more of the following block(s).

At block 35.9001, the process performs minimizing expected costs to the operator of the first vehicle posed by the multiple threats. In some embodiments, the process attempts to minimize those costs borne by the operator of the first vehicle. Note that this may in some cases cause the process to recommend a course of action that is not optimal from a societal or aggregate perspective, such as by directing the operator to take an evasive action that may cause or contribute to an accident involving other vehicles. Such an action may spare the first vehicle and its operator, but cause a greater injury to other parties.

FIG. 35.91 is an example flow diagram of example logic illustrating an example embodiment of process 35.8600 of FIG. 35.86. More particularly, FIG. 35.91 illustrates a process 35.9100 that includes the process 35.8600, wherein the determining a course of action that minimizes an expected cost includes operations performed by or at one or more of the following block(s).

At block 35.9101, the process performs minimizing overall expected costs posed by the multiple threats, the overall expected costs being a sum of expected costs borne by an operator of the first vehicle and other persons/things. In some embodiments, the process attempts to minimize social costs, that is, the costs borne by the various parties to an accident. Note that this may cause the process to recommend a course of action that may have a high cost to the user (e.g., crashing into a wall and damaging the user's car) to spare an even higher cost to another person (e.g., killing a pedestrian).

FIG. 35.92 is an example flow diagram of example logic illustrating an example embodiment of process 35.100 of FIG. 35.1. More particularly, FIG. 35.92 illustrates a process 35.9200 that includes the process 35.100, and which further includes operations performed by or at the following block(s).

At block 35.9201, the process performs performing the receiving threat information, the determining that the threat information is relevant to safe operation of the first vehicle, and/or the modifying operation of the first vehicle at a computing system of the first vehicle.

FIG. 35.93 is an example flow diagram of example logic illustrating an example embodiment of process 35.100 of FIG. 35.1. More particularly, FIG. 35.93 illustrates a process 35.9300 that includes the process 35.100, and which further includes operations performed by or at the following block(s).

At block 35.9301, the process performs performing the determining that the threat information is relevant to safe operation of the first vehicle and/or the modifying operation of the first vehicle at a computing system remote from the first vehicle.

C. Example Computing System Implementation

Figure 36:
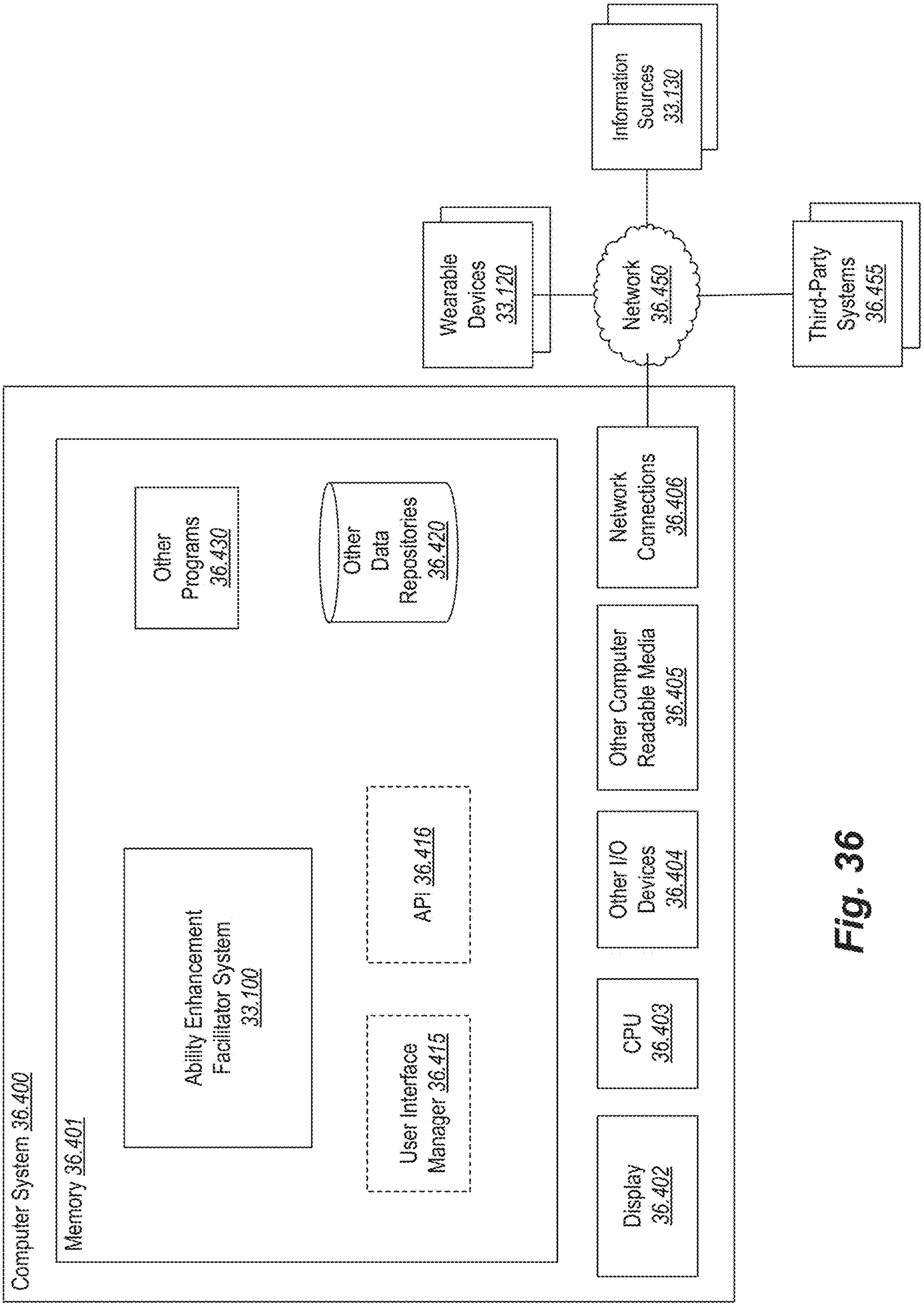
FIG. 36 is an example block diagram of an example computing system for implementing an ability enhancement facilitator system according to an example embodiment.

FIG. 36 is an example block diagram of an example computing system for implementing an ability enhancement facilitator system according to an example embodiment. In particular, FIG. 36 shows a computing system 36.400 that may be utilized to implement an AEFS 33.100.

Note that one or more general purpose or special purpose computing systems/devices may be used to implement the AEFS 33.100. In addition, the computing system 36.400 may comprise one or more distinct computing systems/devices and may span distributed locations. Furthermore, each block shown may represent one or more such blocks as appropriate to a specific embodiment or may be combined with other blocks. Also, the AEFS 33.100 may be implemented in software, hardware, firmware, or in some combination to achieve the capabilities described herein.

In the embodiment shown, computing system 36.400 comprises a computer memory ("memory") 36.401, a display 36.402, one or more Central Processing Units ("CPU") 36.403, Input/Output devices 36.404 (e.g., keyboard, mouse, CRT or LCD display, and the like), other computer-readable media 36.405, and network connections 36.406. The AEFS 33.100 is shown residing in memory 36.401. In other embodiments, some portion of the contents, some or all of the components of the AEFS 33.100 may be stored on and/or transmitted over the other computer-readable media 36.405. The components of the AEFS 33.100 preferably execute on one or more CPUs 36.403 and implement techniques described herein. Other code or programs 36.430 (e.g., an administrative interface, a Web server, and the like) and potentially other data repositories, such as data repository 36.420, also reside in the memory 36.401, and preferably execute on one or more CPUs 36.403. Of note, one or more of the components in FIG. 36 may not be present in any specific implementation. For example, some embodiments may not provide other computer readable media 36.405 or a display 36.402.

The AEFS 33.100 interacts via the network 36.450 with wearable devices 33.120, information sources 33.130, and third-party systems/applications 36.455. The AEFS 33.100 may also generally interact with other output devices, such as the presentation device 34.250 described with respect to FIG. 34. The network 36.450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 36.455 may include any systems that provide data to, or utilize data from, the AEFS 33.100, including Web browsers, vehicle-based client systems, traffic tracking, monitoring, or prediction systems, and the like.

The AEFS 33.100 is shown executing in the memory 36.401 of the computing system 36.400. Also included in the memory are a user interface manager 36.415 and an application program interface ("API") 36.416. The user interface manager 36.415 and the API 36.416 are drawn in dashed lines to indicate that in other embodiments, functions performed by one or more of these components may be performed externally to the AEFS 33.100.

The UI manager 36.415 provides a view and a controller that facilitate user interaction with the AEFS 33.100 and its various components. For example, the UI manager 36.415 may provide interactive access to the AEFS 33.100, such that users can configure the operation of the AEFS 33.100, such as by providing the AEFS 33.100 with information about common routes traveled, vehicle types used, driving patterns, or the like. The UI manager 36.415 may also manage and/or implement various output abstractions, such that the AEFS 33.100 can cause vehicular threat information to be displayed on different media, devices, or systems. In some embodiments, access to the functionality of the UI manager 36.415 may be provided via a Web server, possibly executing as one of the other programs 36.430. In such embodiments, a user operating a Web browser executing on one of the third-party systems 36.455 can interact with the AEFS 33.100 via the UI manager 36.415.

The API 36.416 provides programmatic access to one or more functions of the AEFS 33.100. For example, the API 36.416 may provide a programmatic interface to one or more functions of the AEFS 33.100 that may be invoked by one of the other programs 36.430 or some other module. In this manner, the API 36.416 facilitates the development of third-party software, such as user interfaces, plug-ins, adapters (e.g., for integrating functions of the AEFS 33.100 into vehicle-based client systems or devices), and the like.

In addition, the API 36.416 may be in at least some embodiments invoked or otherwise accessed via remote entities, such as code executing on one of the wearable devices 33.120, information sources 33.130, and/or one of the third-party systems/applications 36.455, to access various functions of the AEFS 33.100. For example, an information source 33.130 such as a radar gun installed at an intersection may push motion-related information (e.g., velocity) about vehicles to the AEFS 33.100 via the API 36.416. As another example, a weather information system may push current conditions information (e.g., temperature, precipitation) to the AEFS 33.100 via the API 36.416. The API 36.416 may also be configured to provide management widgets (e.g., code modules) that can be integrated into the third-party applications 36.455 and that are configured to interact with the AEFS 33.100 to make at least some of the described functionality available within the context of other applications (e.g., mobile apps).

In an example embodiment, components/modules of the AEFS 33.100 are implemented using standard programming techniques. For example, the AEFS 33.100 may be implemented as a "native" executable running on the CPU 36.403, along with one or more static or dynamic libraries. In other embodiments, the AEFS 33.100 may be implemented as instructions processed by a virtual machine that executes as one of the other programs 36.430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the AEFS 33.100, such as in the data store 36.420 (or 34.240), can be available by standard mechanisms such as through C, C++, C #, and Java APIs; libraries for accessing files, databases, or other data repositories; through scripting languages such as XML; or through Web servers, FTP servers, or other types of servers providing access to stored data. The data store 36.420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the AEFS 33.100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for ability enhancement are applicable to other architectures or in other settings. For example, instead of providing threat information to human users who are vehicle operators or pedestrians, some embodiments may provide such information to control systems that are installed in vehicles and that are configured to automatically take action to avoid collisions in response to such information. In addition, the techniques are not limited just to road-based vehicles (e.g., cars, bicycles), but are also applicable to airborne vehicles, including unmanned aerial vehicles (e.g., drones). Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for enhancing ability in a transportation-related context, the method comprising:

at a first vehicle, receiving threat information from a remote device, the threat information based at least in part on information about objects and/or conditions proximate to the remote device, the remote device including at least two cameras of a second vehicle, the at least two cameras of the second vehicle capturing views to the front, sides, and rear of the second vehicle, wherein image data of the at least two cameras includes images of the first vehicle, wherein the information about objects and/or conditions proximate to the remote device include one or more of image data, audio data, weather data, and motion-related information, and wherein the received threat information determined at the second vehicle with respect to information about objects and/or conditions received at the second vehicle;

determining that the threat information is relevant to safe operation of the first vehicle based on one or more of location of the first vehicle, direction of travel of the first vehicle, and speed of the first vehicle; and modifying operation of the first vehicle based on the threat information, wherein modifying operation of the first vehicle includes one or more of changing a steering of the first vehicle, changing a braking of the first vehicle, changing an acceleration of the first vehicle, changing a speed of the first vehicle, changing an engine output of the first vehicle, changing a direction of the first vehicle, and changing a position of the first vehicle.

2. The method of claim 1, wherein the receiving threat information includes: receiving threat information determined based on information about driving conditions proximate to the remote device.

3. The method of claim 2, wherein the information about driving conditions indicates that icy surface conditions, wet surface conditions, oily surface conditions, or a limited visibility condition is/are present proximate to the remote device.

4. The method of claim 2, wherein the information about driving conditions indicates that there is an accident proximate to the remote device.

5. The method of claim 1, further includes:

determining motion-related information of the first vehicle based on the images of the first vehicle from the at least two cameras of the second vehicle.

6. A non-transitory computer-readable medium including contents that are configured, when executed, to cause a computing system to perform a method for enhancing ability in a transportation-related context, the method comprising:

at a first vehicle, receiving threat information from a remote device, the threat information based at least in part on information about objects and/or conditions proximate to the remote device, the remote device including at least two cameras of a second vehicle, the at least two cameras of the second vehicle capturing views to the front, sides, and rear of the second vehicle, wherein image data of the at least two cameras includes images of the first vehicle, wherein the information about objects and/or conditions proximate to the remote device include one or more of image data, audio data, weather data, and motion-related information, and wherein the received threat information determined at the second vehicle with respect to information about objects and/or conditions received at the second vehicle;

determining that the threat information is relevant to safe operation of the first vehicle based on one or more of location of the first vehicle, direction of travel of the first vehicle, and speed of the first vehicle; and modifying operation of the first vehicle based on the threat information, wherein modifying operation of the first vehicle includes one or more of changing a steering of the first vehicle, changing a braking of the first vehicle, changing an acceleration of the first vehicle, changing a speed of the first vehicle, changing an engine output of the first vehicle, changing a direction of the first vehicle, and changing a position of the first vehicle.

7. The computer-readable medium of claim 6, wherein the receiving threat information includes: receiving threat information determined based on information about driving conditions proximate to the remote device.

8. A computing system for enhancing ability in a transportation-related context, the computing system comprising:

processor;

a memory;

a module that is stored in the memory and that is configured, when executed by the processor, to perform a method comprising:

at a first vehicle, receiving threat information from a remote device, the threat information based at least in part on information about objects and/or conditions proximate to the remote device, the remote including at least two cameras of a second vehicle, the at least two cameras of the second vehicle capturing views to the front, sides, and rear of the second vehicle, wherein image data of the at least two cameras includes images of the first vehicle, wherein the information about objects and/or conditions proximate to the remote device include one or more of image data, audio data, weather data, and motion-related information, and wherein the received threat information determined at the second vehicle with respect to information about objects and/or conditions received at the second vehicle;

determining that the threat information is relevant to safe operation of the first vehicle based on one or more of location of the first vehicle, direction of travel of the first vehicle, and speed of the first vehicle; and modifying operation of the first vehicle based on the threat information, wherein modifying operation of the first vehicle includes one or more of changing a steering of the first vehicle, changing a braking of the first vehicle, changing an acceleration of the first vehicle, changing a speed of the first vehicle, changing an engine output of the first vehicle, changing a direction of the first vehicle, and changing a position of the first vehicle.

9. The system of claim 8, wherein the receiving threat information includes: receiving threat information determined based on information about driving conditions proximate to the remote device.

10. The system of claim 9, wherein the information about driving conditions indicates that icy surface conditions, wet surface conditions, oily surface conditions, or a limited visibility condition is/are present proximate to the remote device.

11. The system of claim 9, wherein the information about driving conditions indicates that there is an accident proximate to the remote device.

12. The system of claim 8, further includes:

determining motion-related information of the first vehicle based on the images of the first vehicle from the at least two cameras of the second vehicle.

13. The computer-readable medium of claim 7, wherein the information about driving conditions indicates that icy surface conditions, wet surface conditions, oily surface conditions, or a limited visibility condition is/are present proximate to the remote device.

14. The computer-readable medium of claim 7, wherein the information about driving conditions indicates that there is an accident proximate to the remote device.

* * * * *